United States Patent [19]
Jones

[11] Patent Number: 5,956,741
[45] Date of Patent: Sep. 21, 1999

[54] INTERFACE FOR CONNECTING A BUS TO A RANDOM ACCESS MEMORY USING A SWING BUFFER AND A BUFFER MANAGER

[75] Inventor: Anthony Mark Jones, Yate Bristol, United Kingdom

[73] Assignee: Discovision Associates, Irvine, Calif.

[21] Appl. No.: 08/950,892

[22] Filed: Oct. 15, 1997

Related U.S. Application Data

[63] Continuation of application No. 08/810,780, Mar. 5, 1997, abandoned, which is a continuation of application No. 08/399,799, Mar. 7, 1995, abandoned.

[30] Foreign Application Priority Data

Mar. 24, 1994 [GB] United Kingdom .................... 9405914
Feb. 28, 1995 [GB] United Kingdom .................... 9503964

[51] Int. Cl.$^6$ ..................................................... G06F 12/00
[52] U.S. Cl. ................................................................ 711/1
[58] Field of Search ........................ 711/1, 200; 348/446, 348/398; 364/238.6, 239, 926.3, 926.6

[56] References Cited

U.S. PATENT DOCUMENTS

| | | | |
|---|---|---|---|
| 3,893,042 | 7/1975 | Whitman et al. ........................... | 331/55 |
| 3,962,685 | 6/1976 | Belle Isle ................................. | 395/597 |
| 4,107,780 | 8/1978 | Grimsdale et al. ...................... | 395/135 |
| 4,135,242 | 1/1979 | Ward et al. .............................. | 364/200 |
| 4,142,205 | 2/1979 | Iinuma .................................... | 348/394 |
| 4,149,242 | 4/1979 | Pirz ........................................ | 395/405 |
| 4,196,448 | 4/1980 | Whitehouse et al. ................... | 348/400 |
| 4,215,369 | 7/1980 | Iijima ...................................... | 348/387 |
| 4,225,920 | 9/1980 | Stokes .................................... | 364/200 |
| 4,236,228 | 11/1980 | Nagashima et al. ..................... | 365/114 |
| 4,251,864 | 2/1981 | Kindell et al. ........................... | 395/411 |
| 4,302,775 | 11/1981 | Widergren et al. ...................... | 348/406 |
| 4,334,246 | 6/1982 | Saran ..................................... | 358/261.1 |
| 4,356,550 | 10/1982 | Katzman et al. .................. | 395/182.12 |
| 4,433,308 | 2/1984 | Hirata ........................................ | 331/17 |
| 4,437,072 | 3/1984 | Asami ..................................... | 331/1 A |
| 4,442,503 | 4/1984 | Schutt et al. ............................ | 345/201 |

(List continued on next page.)

FOREIGN PATENT DOCUMENTS

| | | | |
|---|---|---|---|
| 0075893 A2 | 4/1983 | European Pat. Off. | ........ G06F 13/00 |
| 0196911 | 10/1986 | European Pat. Off. . | |

(List continued on next page.)

OTHER PUBLICATIONS

Chong, "A Data Flow Architecture For Digital Image Processing," Wescon Tech. Papers No. 4/6, Oct. 30, 1984, Anaheim, California, USA, pp. 1–10.

(List continued on next page.)

*Primary Examiner*—Eddie P. Chan
*Assistant Examiner*—Kevin Verbrug
*Attorney, Agent, or Firm*—Robert T. Braun; Donald Bollella; Clay E. Gaetje

[57] ABSTRACT

A configurable RAM interface connecting a bus to RAM is adapted to receiving large multiword variable length tokens at a high data arrival rate, using a swing buffer and a buffer manager. An address source provides complete addresses to the interface. The buffer manager has a state machine which transitions among a plurality of states, maintaining status information about the buffers, allocating the buffers for reference by a write address generator, clearing the buffers for occupation by subsequently arriving data, and maintaining status information concerning the buffers. The buffer manager also examines tokens of received data in order to update the status of the arrival buffer.

10 Claims, 46 Drawing Sheets

U.S. PATENT DOCUMENTS

| | | | |
|---|---|---|---|
| 4,467,443 | 8/1984 | Shima | 395/416 |
| 4,495,629 | 1/1985 | Zasio et al. | 377/70 |
| 4,507,731 | 3/1985 | Morrison | 395/411 |
| 4,540,903 | 9/1985 | Cooke et al. | 327/211 |
| 4,580,066 | 4/1986 | Berndt | 327/197 |
| 4,630,198 | 12/1986 | Iyuan | 395/250 |
| 4,630,230 | 12/1986 | Sundet | 395/496 |
| 4,646,151 | 2/1987 | Welles, II et al. | 348/513 |
| 4,679,163 | 7/1987 | Arnould et al. | 364/725 |
| 4,747,070 | 5/1988 | Trottier et al. | 395/515 |
| 4,785,349 | 11/1988 | Keith et al. | 348/390 |
| 4,789,927 | 12/1988 | Hannah | 395/800 |
| 4,799,677 | 1/1989 | Frederiksen | 463/43 |
| 4,807,028 | 2/1989 | Hatori et al. | 358/133 |
| 4,814,978 | 3/1989 | Dennis | 364/200 |
| 4,823,201 | 4/1989 | Simon et al. | 348/399 |
| 4,829,465 | 5/1989 | Knauer | 364/725 |
| 4,831,440 | 5/1989 | Borgers et al. | 348/403 |
| 4,866,510 | 9/1989 | Goodfellow et al. | 348/394 |
| 4,866,637 | 9/1989 | Gonzalez-Lopez et al. | 395/126 |
| 4,887,224 | 12/1989 | Okano et al. | 345/200 |
| 4,891,784 | 1/1990 | Kato et al. | 395/250 |
| 4,903,018 | 2/1990 | Wiebach et al. | 341/51 |
| 4,910,683 | 3/1990 | Bishop et al. | 395/127 |
| 4,912,668 | 3/1990 | Aubie et al. | 364/725 |
| 4,922,341 | 5/1990 | Strobach | 348/420 |
| 4,924,298 | 5/1990 | Kitamura | 348/394 |
| 4,924,308 | 5/1990 | Feuchtwanger | 348/384 |
| 4,975,595 | 12/1990 | Roberts et al. | 327/202 |
| 4,985,766 | 1/1991 | Morrison et al. | |
| 4,991,112 | 2/1991 | Callemyn | 395/433 |
| 5,003,204 | 3/1991 | Cushing et al. | 326/40 |
| 5,021,947 | 6/1991 | Campbell et al. | 364/200 |
| 5,027,212 | 6/1991 | Marlton et al. | 348/512 |
| 5,036,475 | 7/1991 | Ueda | 395/510 |
| 5,038,209 | 8/1991 | Hang | 348/419 |
| 5,050,166 | 9/1991 | Cantoni et al. | 370/94.1 |
| 5,053,985 | 10/1991 | Friedlander et al. | 364/725 |
| 5,057,793 | 10/1991 | Cowley et al. | 331/1 A |
| 5,060,242 | 10/1991 | Arbeiter | 375/241 |
| 5,081,450 | 1/1992 | Lucas et al. | 345/202 |
| 5,086,489 | 2/1992 | Shimura | 382/238 |
| 5,091,721 | 2/1992 | Hamori | 345/126 |
| 5,107,345 | 4/1992 | Lee | 358/432 |
| 5,111,292 | 5/1992 | Kuriacose et al. | 348/384 |
| 5,113,255 | 5/1992 | Nagata et al. | 348/416 |
| 5,122,873 | 6/1992 | Golin | 348/390 |
| 5,122,875 | 6/1992 | Raychaudhuri et al. | 348/390 |
| 5,124,790 | 6/1992 | Nakayama | 348/384 |
| 5,126,842 | 6/1992 | Andrews et al. | 348/384 |
| 5,129,059 | 7/1992 | Hannah | 395/517 |
| 5,130,568 | 7/1992 | Miller et al. | 327/202 |
| 5,134,487 | 7/1992 | Taguchi et al. | 348/384 |
| 5,134,697 | 7/1992 | Scheffler | 395/497.02 |
| 5,134,699 | 7/1992 | Aria et al. | 395/855 |
| 5,136,371 | 8/1992 | Savatier et al. | 348/419 |
| 5,142,380 | 8/1992 | Sakagami et al. | 358/432 |
| 5,146,325 | 9/1992 | Ng | 348/384 |
| 5,146,326 | 9/1992 | Hasegawa | 348/405 |
| 5,148,271 | 9/1992 | Kato et al. | 348/390 |
| 5,148,524 | 9/1992 | Harlin et al. | 395/519 |
| 5,151,875 | 9/1992 | Sato | 364/784 |
| 5,151,997 | 9/1992 | Bailey et al. | 395/800 |
| 5,159,449 | 10/1992 | Allmendinger | 348/390 |
| 5,161,221 | 11/1992 | Van Nostrand | 395/484 |
| 5,164,819 | 11/1992 | Music | 348/420 |
| 5,168,356 | 12/1992 | Acampora et al. | 348/409 |
| 5,168,375 | 12/1992 | Reisch et al. | 358/432 |
| 5,172,011 | 12/1992 | Leuthold et al. | 327/202 |
| 5,175,617 | 12/1992 | Wallace et al. | 348/384 |
| 5,179,372 | 1/1993 | West et al. | 345/189 |
| 5,182,642 | 1/1993 | Gersdorff et al. | 348/388 |
| 5,184,124 | 2/1993 | Molpus et al. | 341/50 |
| 5,185,819 | 2/1993 | Ng et al. | 382/234 |
| 5,189,526 | 2/1993 | Sasson | 358/432 |
| 5,191,548 | 3/1993 | Balkanski et al. | 364/725 |
| 5,193,002 | 3/1993 | Guichard et al. | 348/415 |
| 5,200,925 | 4/1993 | Morooka | 365/219 |
| 5,201,056 | 4/1993 | Daniel et al. | 395/800 |
| 5,202,847 | 4/1993 | Bolton et al. | 364/725 |
| 5,212,549 | 5/1993 | Ng et al. | 348/409 |
| 5,212,742 | 5/1993 | Normile et al. | 382/166 |
| 5,214,507 | 5/1993 | Aravind et al. | 348/390 |
| 5,216,724 | 6/1993 | Suzuki et al. | 382/135 |
| 5,223,926 | 6/1993 | Stone et al. | 348/396 |
| 5,227,863 | 7/1993 | Bilbrey et al. | 348/578 |
| 5,227,878 | 7/1993 | Puri et al. | 348/416 |
| 5,228,098 | 7/1993 | Crinon et al. | 382/240 |
| 5,229,863 | 7/1993 | Kao et al. | 358/426 |
| 5,231,484 | 7/1993 | Gonzales et al. | 348/405 |
| 5,231,486 | 7/1993 | Acampora et al. | 348/390 |
| 5,233,420 | 8/1993 | Piri et al. | 348/513 |
| 5,233,690 | 8/1993 | Sherlock et al. | 395/510 |
| 5,237,413 | 8/1993 | Israelsen et al. | 348/700 |
| 5,237,432 | 8/1993 | Calarco et al. | 358/451 |
| 5,241,222 | 8/1993 | Small et al. | 326/105 |
| 5,241,383 | 8/1993 | Chen et al. | 348/405 |
| 5,241,658 | 8/1993 | Masterson et al. | 395/509 |
| 5,247,612 | 9/1993 | Quinard | 395/515 |
| 5,249,146 | 9/1993 | Uramoto et al. | 364/725 |
| 5,253,058 | 10/1993 | Gharavi | 348/415 |
| 5,253,078 | 10/1993 | Balkanski et al. | 358/426 |
| 5,257,213 | 10/1993 | Kim et al. | 364/725 |
| 5,257,223 | 10/1993 | Dervisoglu | 365/154 |
| 5,257,350 | 10/1993 | Howard et al. | 395/501 |
| 5,258,725 | 11/1993 | Kinoshita | 331/17 |
| 5,260,781 | 11/1993 | Soloff et al. | 348/396 |
| 5,260,782 | 11/1993 | Hui | 348/409 |
| 5,261,047 | 11/1993 | Rivshin | 395/526 |
| 5,261,064 | 11/1993 | Wyland | 395/421.01 |
| 5,263,136 | 11/1993 | DeAguiar et al. | 395/511 |
| 5,267,334 | 11/1993 | Normille et al. | 382/236 |
| 5,276,513 | 1/1994 | van der Wal et al. | 348/416 |
| 5,276,681 | 1/1994 | Tobagi et al. | 370/229 |
| 5,276,784 | 1/1994 | Ohki | 395/127 |
| 5,276,832 | 1/1994 | Holman, Jr. | 395/403 |
| 5,278,520 | 1/1994 | Parker et al. | 331/1 A |
| 5,278,646 | 1/1994 | Civanlar et al. | 348/384 |
| 5,278,647 | 1/1994 | Hingorani et al. | 348/416 |
| 5,283,646 | 2/1994 | Bruder | 348/415 |
| 5,287,178 | 2/1994 | Acampora et al. | 348/384 |
| 5,287,193 | 2/1994 | Lin | 358/261.1 |
| 5,287,420 | 2/1994 | Barrett | 382/233 |
| 5,289,276 | 2/1994 | Siracusa et al. | 348/469 |
| 5,289,577 | 2/1994 | Gonzales et al. | 395/506 |
| 5,293,229 | 3/1994 | Iu | 348/415 |
| 5,294,894 | 3/1994 | Gebara | 331/1 A |
| 5,298,896 | 3/1994 | Lei et al. | 341/51 |
| 5,298,992 | 3/1994 | Pietras et al. | 348/415 |
| 5,299,025 | 3/1994 | Shirasawa | 358/400 |
| 5,300,949 | 4/1994 | Rodriguez et al. | 345/202 |
| 5,301,019 | 4/1994 | Citta | 348/416 |
| 5,301,032 | 4/1994 | Hong et al. | 358/261.2 |
| 5,301,040 | 4/1994 | Hoshi et al. | 358/465 |
| 5,301,136 | 4/1994 | McMillan, Jr. et al. | 364/725 |
| 5,301,242 | 4/1994 | Gonzales et al. | 382/239 |
| 5,301,272 | 4/1994 | Atkins | 395/501 |
| 5,303,342 | 4/1994 | Edge | 395/526 |
| 5,304,953 | 4/1994 | Heim et al. | 331/1 A |
| 5,305,438 | 4/1994 | MacKay et al. | 395/511 |
| 5,307,180 | 4/1994 | Williams et al. | 358/448 |
| 5,309,527 | 5/1994 | Ohki | 382/250 |

| | | | |
|---|---|---|---|
| 5,311,309 | 5/1994 | Ersoz et al. | 348/409 |
| 5,321,806 | 6/1994 | Meinerth et al. | 395/522 |
| 5,341,371 | 8/1994 | Simpson | 370/85.4 |
| 5,351,047 | 9/1994 | Behlen | 341/67 |
| 5,357,606 | 10/1994 | Adams | 395/517 |
| 5,369,405 | 11/1994 | Choi et al. | 341/63 |
| 5,369,418 | 11/1994 | Richards | 345/185 |
| 5,390,029 | 2/1995 | Williams et al. | 358/448 |
| 5,392,071 | 2/1995 | Richards et al. | 348/398 |
| 5,404,474 | 4/1995 | Crook et al. | 395/421.02 |
| 5,414,813 | 5/1995 | Shiobara | 395/200 |
| 5,421,028 | 5/1995 | Swanson | 395/800 |
| 5,426,606 | 6/1995 | Takai | 365/189.05 |
| 5,430,488 | 7/1995 | Hedley | 348/446 |
| 5,448,568 | 9/1995 | Delpuch et al. | 348/423 |
| 5,450,599 | 9/1995 | Horvath et al. | 395/800 |
| 5,457,482 | 10/1995 | Rhoden et al. | 345/201 |
| 5,457,780 | 10/1995 | Shaw et al. | 395/165 |
| 5,481,689 | 1/1996 | Stamm et al. | 395/412 |
| 5,486,876 | 1/1996 | Lew et al. | 348/719 |
| 5,495,291 | 2/1996 | Adams | 348/390 |
| 5,502,494 | 3/1996 | Auld | 348/426 |
| 5,502,573 | 3/1996 | Fujinami | 386/65 |
| 5,517,462 | 5/1996 | Iwamoto et al. | 365/233 |
| 5,572,691 | 11/1996 | Koudmani | 395/405 |
| 5,574,933 | 11/1996 | Horst | 395/800 |
| 5,579,052 | 11/1996 | Artieri | 348/416 |

FOREIGN PATENT DOCUMENTS

| | | |
|---|---|---|
| 0255767 | 2/1988 | European Pat. Off. . |
| 0321628 | 6/1989 | European Pat. Off. ........ G06F 13/42 |
| 0468480 | 1/1992 | European Pat. Off. . |
| 0572262 | 12/1993 | European Pat. Off. . |
| 0572263 | 12/1993 | European Pat. Off. . |
| 0576749 | 1/1994 | European Pat. Off. . |
| 0589734 | 3/1994 | European Pat. Off. . |
| 0639032 | 2/1995 | European Pat. Off. . |
| 61-80940 | 4/1986 | Japan .............................. H04M 9/00 |
| 2194085 | of 0000 | United Kingdom . |
| 2039106 | 7/1980 | United Kingdom ............ G06F 13/00 |
| 2045035 | 10/1980 | United Kingdom . |
| 2059724 | 4/1981 | United Kingdom . |
| 2171578 | 8/1986 | United Kingdom . |
| 2194085 | 2/1988 | United Kingdom . |
| 2268035 | 12/1993 | United Kingdom . |
| 2269070 | 1/1994 | United Kingdom . |

OTHER PUBLICATIONS

P. Yip, et al., "DIT and DIF Algorithm for Discrete Sine and Cosine Transforms" Proceedings of the International Symposium on Circuits and Systems, IEEE Press, New York, US, vol. 2/3, Jun. 5, 1985, Kyoto, JP, pp. 941–944.

Hsieh S. Hou, "A Fast Recursive Algorithm for Computing the Discrete Cosine Transform," IEEE Transactions on Acoustics, Speech, and Signal Processing, vol. 35, No. 10, Oct. 1987, IEEE Press, New York, US, pp. 1455–1461.

Komori et al., An Elastic Pipeline Mechanism By Self- -Timed Circuits, IEEE Journal Of Solid–State Circuits, vol. 23, No. 1, Feb. 1988, New York, NY, USA, pp. 111–117.

A. Gupta et al., "A Fast Recursive Algorithm for the Discrete Sine Transform," IEEE Transactions on Acoustics, Speech, and Signal Processing, vol. 38, No. 3, Mar. 1990, IEEE Press, New York, US, pp. 553–557.

H.R. Wu, et al., "A Two Dimensional Fast Cosine Transform Algorithm Based on Hou's Approach," IEEE Transaction on Acoustics, Speech, and Signal Processing, vol. 39, No. 2, Feb. 1991, IEEE Press, New York, US, pp. 544–546.

| 8 BIT VALUE | 16 BIT VALUE | 32 BIT VALUE | |
|---|---|---|---|
| | | BITS[7:0] | BASE + 3 |
| | | BITS[15:8] | BASE + 2 |
| | BITS[7:0] | BITS[23:16] | BASE + 1 |
| BITS[7:0] | BITS[15:8] | BITS[31:24] | BASE + 0 |

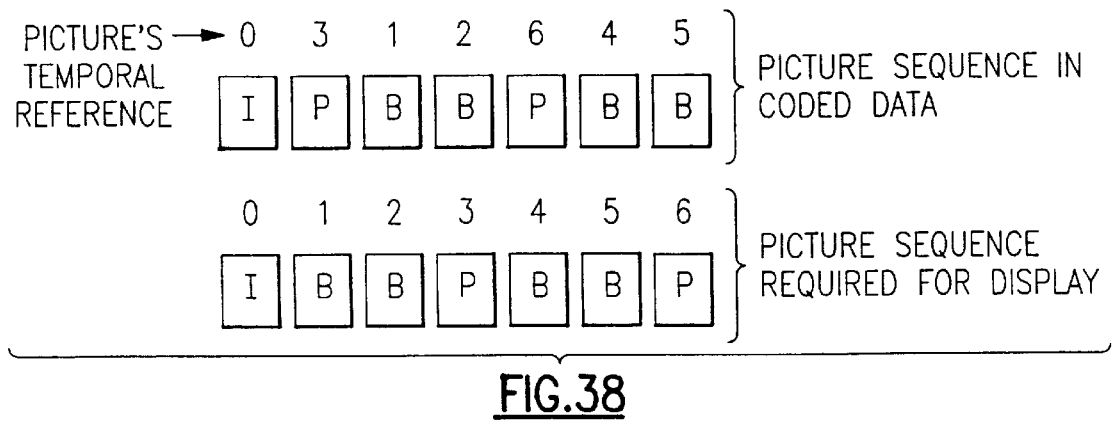
FIG.38
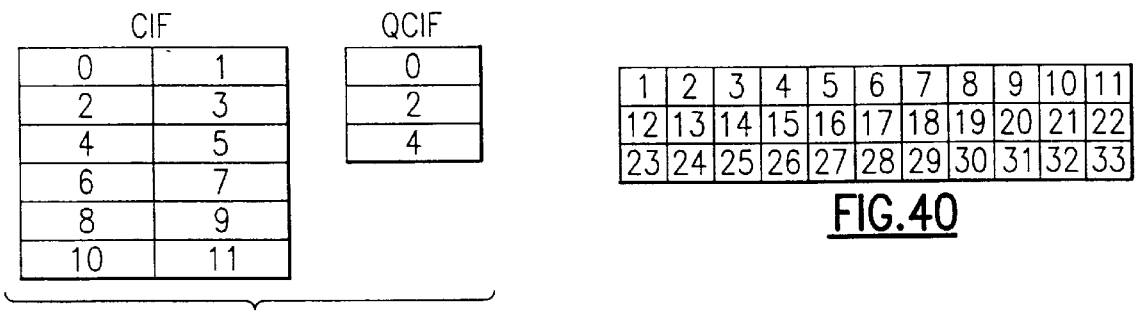
FIG.39
FIG.40
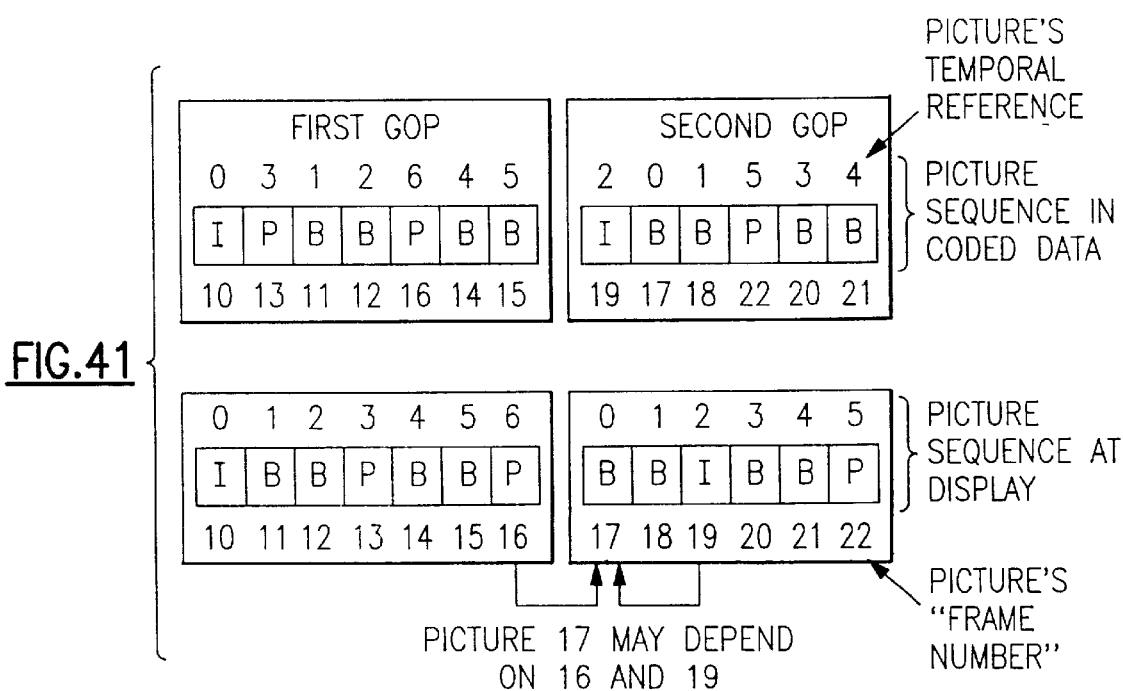
FIG.41

BUFFER OFFSET 0x00:
COMPONENT0 OFFSET 0x00 +......

| 00 | 01 | 02 | 03 | 04 | 05 | 06 | 07 | 08 | 09 | 0A | 0B |
|----|----|----|----|----|----|----|----|----|----|----|----|
| 0C | 0D | 0E | 0F | 10 | 11 | 12 | 13 | 14 | 15 | 16 | 17 |
| 18 | 19 | 1A | 1B | 1C | 1D | 1E | 1F | 20 | 21 | 22 | 23 |
| 24 | 25 | 26 | 27 | 28 | 29 | 2A | 2B | 2C | 2D | 2E | 2F |
| 30 | 31 | 32 | 33 | 34 | 35 | 36 | 37 | 38 | 39 | 3A | 3B |
| 3C | 3D | 3E | 3F | 40 | 41 | 42 | 43 | 44 | 45 | 46 | 47 |
| 48 | 49 | 4A | 4B | 4C | 4D | 4E | 4F | 50 | 51 | 52 | 53 |
| 54 | 55 | 56 | 57 | 58 | 59 | 5A | 5B | 5C | 5D | 5E | 5F |
| 60 | 61 | 62 | 63 | 64 | 65 | 66 | 67 | 68 | 69 | 6A | 6B |
| 6C | 6D | 6E | 6F | 70 | 71 | 72 | 73 | 74 | 75 | 76 | 77 |
| 78 | 79 | 7A | 7B | 7C | 7D | 7E | 7F | 80 | 81 | 82 | 83 |
| 84 | 85 | 86 | 87 | 88 | 89 | 8A | 8B | 8C | 8D | 8E | 8F |

COMPONENT1 OFFSET 0x100 +......

| 00 | 01 | 02 | 03 | 04 | 05 |
|----|----|----|----|----|----|
| 06 | 07 | 08 | 09 | 0A | 0B |
| 0C | 0D | 0E | 0F | 10 | 11 |
| 12 | 13 | 14 | 15 | 16 | 17 |
| 18 | 19 | 1A | 1B | 1C | 1D |
| 1E | 1F | 20 | 21 | 22 | 23 |

COMPONENT2 OFFSET 0x200 +......

| 00 | 01 | 02 | 03 | 04 | 05 |
|----|----|----|----|----|----|
| 06 | 07 | 08 | 09 | 0A | 0B |
| 0C | 0D | 0E | 0F | 10 | 11 |
| 12 | 13 | 14 | 15 | 16 | 17 |
| 18 | 19 | 1A | 1B | 1C | 1D |
| 1E | 1F | 20 | 21 | 22 | 23 |

FIG. 70

**=!z&!H261&fe+!z&H261&(QCIF+fe)+z&H261&QCIF

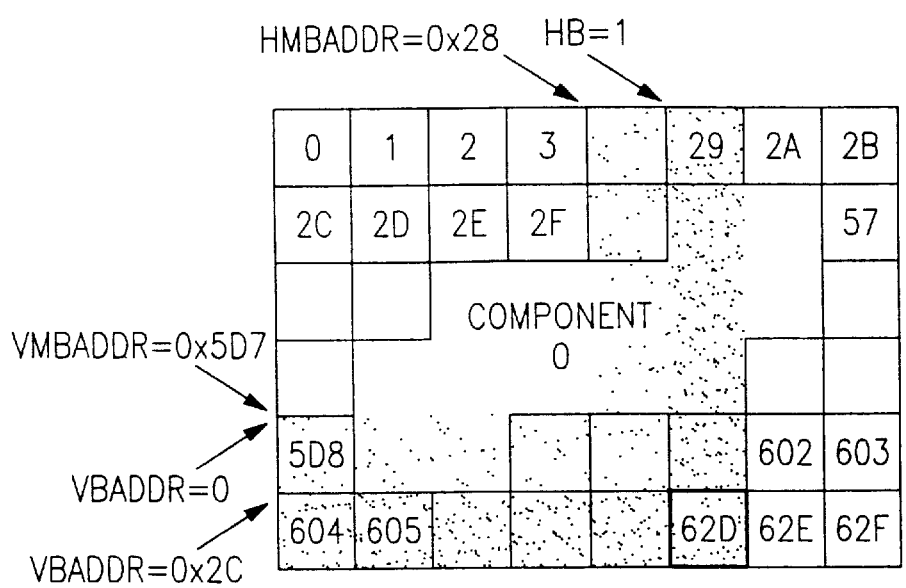
BLOCK ADDRESS=0+0+0x5D8+0x28+0x2C+1=0x62D
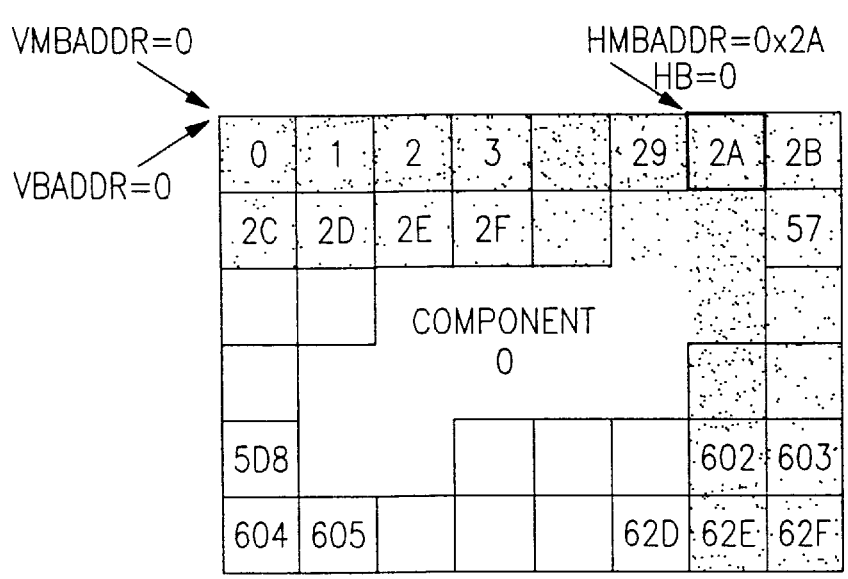
BLOCK ADDRESS=0+0+0+0x2A+0+0=0x2A
FIG.73

INTERFACE FOR CONNECTING A BUS TO A RANDOM ACCESS MEMORY USING A SWING BUFFER AND A BUFFER MANAGER

This application is a continuation of application Ser. No. 08/810,780, filed Mar. 5, 1997, now abandoned, which is a continuation of application Ser. No. 08/399,799, filed Mar. 7, 1995, now abandoned.

CROSS REFERENCE TO RELATED APPLICATIONS

This application is related to British Patent Application entitled "Video Decompression" as U.K. Serial No. 9405914.4 filed on Mar. 24, 1994 and British Patent Application entitled "Method and Apparatus for Interfacing with RAM" as U.K. Serial No. 9503964.0 filed on Feb. 28, 1995.

BACKGROUND OF THE INVENTION

The present invention relates to random access memory (RAM) and more particularly, to a method for interfacing with RAM.

SUMMARY OF THE INVENTION

The invention provides a RAM interface for connecting a bus to RAM comprising means for receiving from the bus and buffering a plurality of data words, means for receiving from the bus an address associated with the plurality of data words, means for generating a series of addresses in RAM into which the buffered data words will be written, the series of addresses being derived from the received address and means for writing the buffered data words into RAM at the generated address. The data word receiving and buffering means may include a swing buffer. The RAM may operate in a page addressing mode and the address generating means may include means for generating row addresses and means for generating column addresses based on the received address. The RAM may be a DRAM, the bus may include a two wire interface, the data word receiving and buffering means may include a two wire interface, the address receiving means may include a two wire interface and the plurality of data words as well as the received address may be in the form of a token. The RAM interface may further include means for determining whether the data word receiving means has received and buffered the plurality of data words.

The invention also provides a RAM interface for connecting a bus to RAM comprising a plurality of data words stored in RAM at predetermined addresses, means for receiving from the bus a RAM address associated with the plurality of data words, means for generating a series of RAM addresses for addressing the plurality of data words in RAM, the series of addresses being derived from the received address, means for buffering data words read from RAM and means for reading from RAM the plurality of data words, using the series of RAM addresses generated by the address generating means, and writing the data words into buffer means. The data word buffering means may include a swing buffer. The RAM may operate in a page addressing mode and the address generating means may include means for generating row addresses and means for generating column addresses based on the received address. The RAM may be a DRAM, the bus may include a two wire interface, the data word receiving and buffering means may include a two wire interface, the address receiving means may include a two wire interface and the plurality of data words as well as the received address may be in the form of a token. The RAM interface may further include means for determining whether the data word receiving means has received and buffered the plurality of data words.

BRIEF DESCRIPTION OF THE DRAWINGS

FIG. 2 is a block diagram of a spatial decoder;

FIG. 38 is a diagram illustrating an MPEG picture sequence;

FIG. 39 is a diagram illustrating an arrangement of a group of blocks according to the H.261 standard;

FIG. 40 is a diagram illustrating an arrangement of macroblocks according to the H.261 standard;

FIG. 41 is a diagram illustrating an example of an "open GOP;"

FIG. 70 illustrates storage block addresses in an exemplary picture format;

FIG. 73 shows exemplary address calculations;

Figure 1:
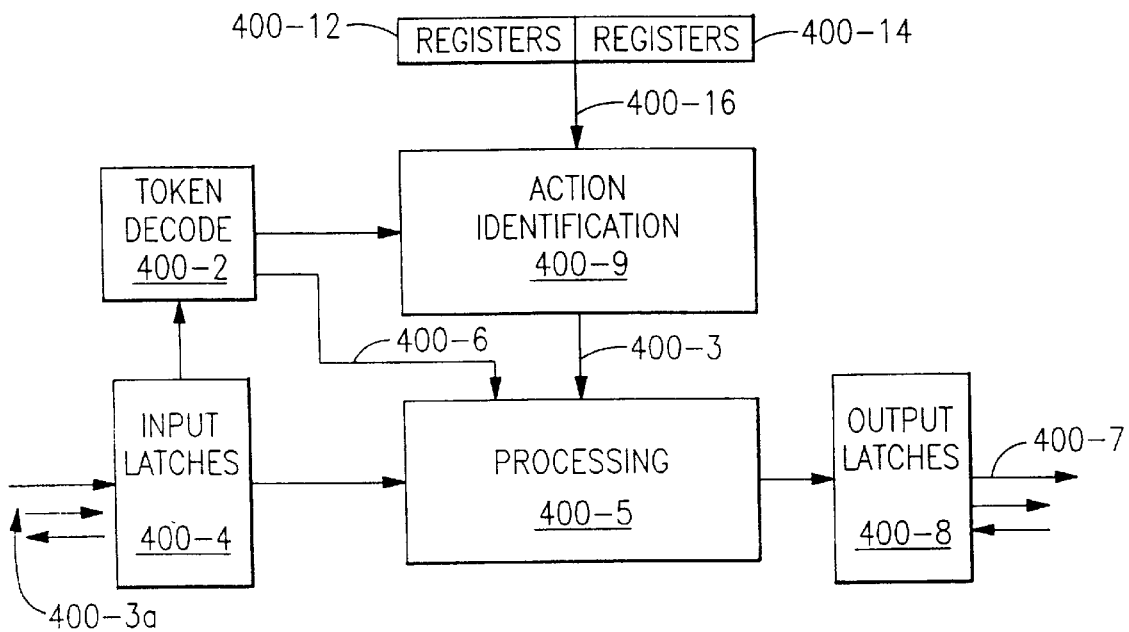
FIG. 1 is a block diagram of a reconfigurable processing stage.

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various ways. Also, it should be understood that the phraseology and terminology used herein is for the purpose of description and should not be regarded as limiting.

DETAILED DESCRIPTION OF THE INVENTION

Referring to exemplary FIG. 1, input latches 400-4 receive input over a first bus 400-3a. A first output from the input latches 400-4 is passed to a token decode 400-2. A second output from the input latches 400-4 is passed as a first input to the processing unit 400-5. A first output from the token decode 400-2 is passed over line 400-6 as a second input to the processing unit 400-5. A second output from the token decode 400-2 is passed over line 400-10 to an action identification unit 400-9. The action identification unit 400-9 also receives input from registers 400-12 and 400-14 over line 400-16. The output from the action identification unit 400-9 is passed over line 400-3 as a third input to the processing unit 400-5. The output from the processing unit 400-5 is passed to output latches 400-8. The output from the output latches 400-8 is passed over a second bus 400-7.

Referring to exemplary FIG. 2, the start code detector 401-1 receives input over a two-wire interface 401-2. A first output from the start code detector 401-1 is passed over line 401-3 to a first first-in first-out buffer (FIFO) 401-4. The output from the first FIFO 401-4 is passed over line 401-5 as a first input to a Huffman decoder 401-6. A second output from the start code detector 401-2 is passed over line 401-7 as a first input to a DRAM interface 401-8. The DRAM interface 401-8 also receives input from a buffer manager 401-9 over line 401-10. Signals are transmitted to and received from external DRAM (not shown) by the DRAM interface 401-8 over line 401-11. A first output from the DRAM interface 401-8 is passed over line 401-12 as a second input to the Huffman decoder 401-6.

The output from the Huffman decoder 401-6 is passed over line 401-13 as an input to an ITOD 401-14. The output from the ITOD 401-14 is passed over line 401-15 to an arithmetic logic unit (ALU) 401-16. A first output from the ALU 401-16 is passed over line 401-17 to a read-only memory (ROM) state machine 401-18. The output from the ROM state machine 401-18 is passed over line 401-19 as a third input to the Huffman decoder 401-6. A second output from the ALU 401-16 is passed over line 401-20 to a T/F 401-21.

A first output from the T/F 401-21 is passed over line 401-22 to a second FIFO 401-23. The output from the second FIFO 401-23 is passed over line 401-24 as a first input to an inverse modulator 401-25. A second output from the T/F 401-21 is passed over line 401-26 as a third input to the DRAM interface 401-8. A third output from the DRAM interface 401-8 is passed over line 401-27 as a second input to the inverse modulator 401-25. The output from the inverse modulator 401-25 is passed over line 401-28 as an input to an inverse quantizer 401-29. The output from the inverse quantizer 401-29 is passed over line 401-30 as an input to an inverse zig-zag (IZZ) 401-31. The output from the IZZ 401-31 is passed over line 401-32 as an input to an inverse discrete cosine transform (IDCT) 401-33. The output from the IDCT 401-33 is passed over line 401-34 to a temporal decoder (not shown).

Figure 3:
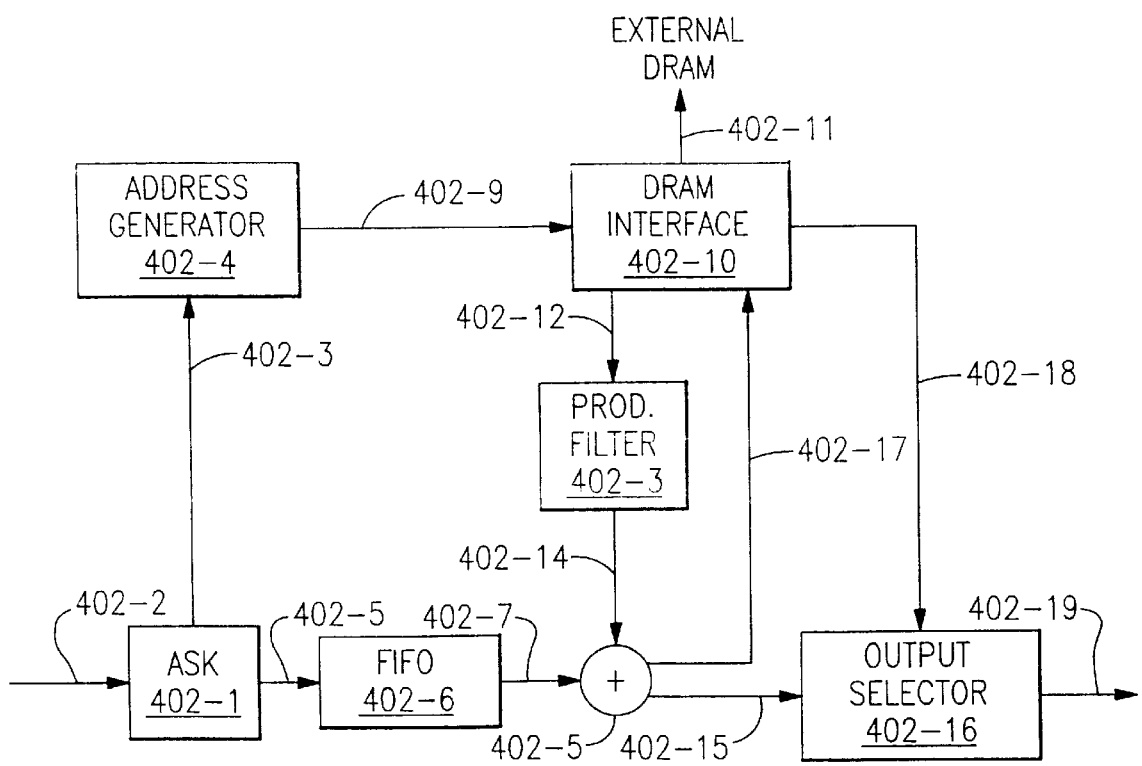
FIG. 3 is a block diagram of a temporal decoder.

Referring to exemplary FIG. 3, a fork 402-1 receives input over line 402-2. As a first output from the fork 402-1, the control tokens are passed over line 402-3 to an address generator 402-4. As a second output from the fork 402-1, the data is passed over line 402-5 to a FIFO 402-6. The output from the FIFO 402-6 is then passed over line 402-7 as a first input to a summing circuit 402-8. The output from the address generator 402-4 is passed over line 402-9 as a first input to a DRAM interface 402-10. Signals are transmitted to and received from external DRAM (not shown) by the DRAM interface 402-10 over line 402-11. A first output from the DRAM interface 402-10 is passed over line 402-12 to a prediction filter 402-13. The output from the prediction filter 402-13 is passed over line 402-14 as a second input to the summing circuit 402-8. A first output from the summing circuit 402-8 is passed over line 402-15 to output selector 402-16. A second output from the summing circuit 402-8 is passed over line 402-17 as a second input to the DRAM interface 402-10. A second output from the DRAM interface 402-10 is passed over line 402-18 as a second input to the output selector 402-16. The output from the output selector 402-16 is passed over line 402-19 to a video formatter (not shown).

Figure 4:
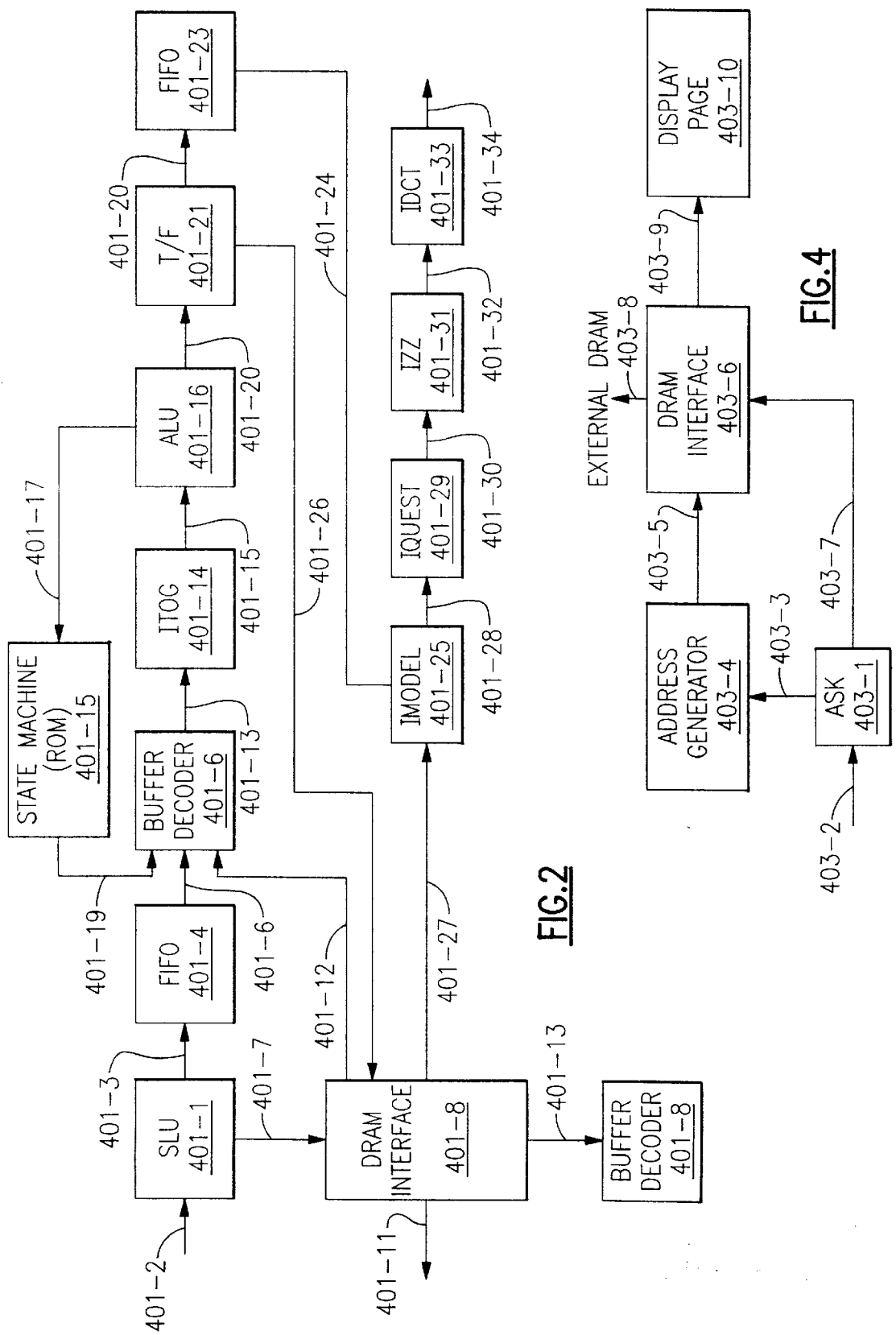
FIG. 4 is a block diagram of a video formatter.

Referring to exemplary FIG. 4, a fork 403-1 receives input over line 403-2. As a first output from the fork 403-2, the control tokens are passed over line 403-3 to an address generator 403-4. The output from the address generator 403-4 is passed over line 403-5 as a first input to a DRAM interface 403-6. As a second output from the fork 403-2, the data is passed over line 403-7 as a second input to the DRAM interface 403-6. Signals are transmitted to and received from external DRAM (not shown) by the DRAM interface 403-6 over line 403-8. The output from the DRAM interface 403-6 is passed over line 403-9 to a display pipe 403-10.

It will be apparent from the above descriptions that each line may comprise a plurality of lines, as necessary.

Figure 5:
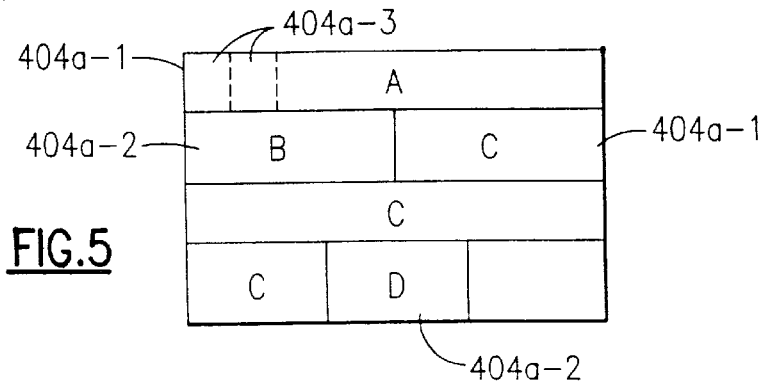
FIG. 5 is a memory map showing a first arrangement of macroblocks.

Referring to exemplary FIG. 5, in the MPEG standard a picture 404*a*-1 is encoded as one or more slices 404*a*-2. Each slice 404*a*-2 is in turn comprised of a plurality of blocks 404*a*-3, and is encoded row-by-row, left-to-right in each row. As is shown, each slice 404*a*-2 may span exactly one line 404*a*-A of blocks 404*a*-3, less than one line 404*a*-B of blocks 404*a*-3, or multiple lines 404*a*-C of blocks 404*a*-3.

Figure 6:
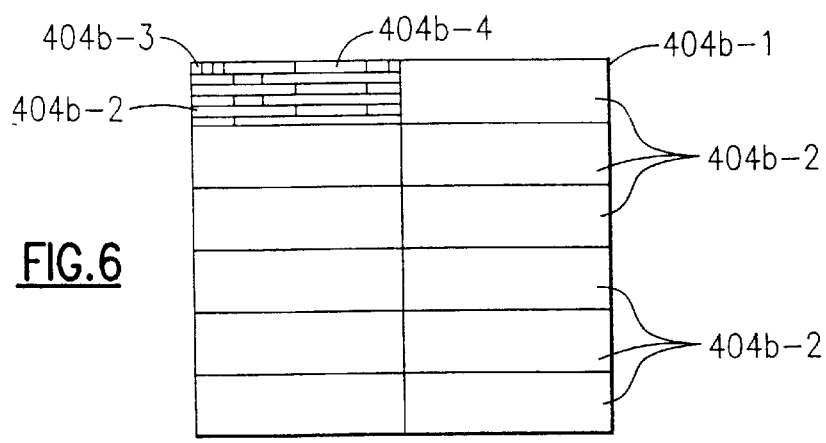
FIG. 6 is a memory map showing a second arrangement of macroblocks.

Referring to exemplary FIG. 6, in the JPEG and H.261 standards, the Common Interface Format (CIF) is used, wherein a picture 404*b*-1 is encoded as 6 rows each containing 2 groups of blocks (GOBs) 404*b*-2. Each GOB 404*b*-2 is in turn composed of either 3 rows or 6 rows of an indeterminate number of blocks 404*b*-3. Each GOB 404*b*-2 is encoded in a zigzag direction indicated by the arrow 404*b*-4. The GOBs 404*b*-2 are in turn processed row-by-row, left-to-right in each row.

Figure 7:
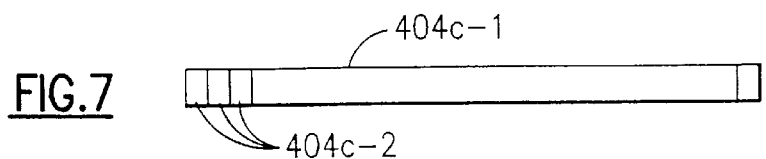
FIG. 7 is a memory map showing a further arrangement of macroblocks.

Referring to exemplary FIG. 7, it is shown that, for both MPEG and CIF, the output of the encoder is in the form of a data stream 404*c*-1. The decoder receives this data stream 404*c*-1. The decoder can then reconstruct the image according to the format used to encode it. In order to allow the decoder to recognize start and end points for each standard, the data stream 404*c*-1 is segmented into lengths of 33 blocks 404*c*-2.

Figure 8:
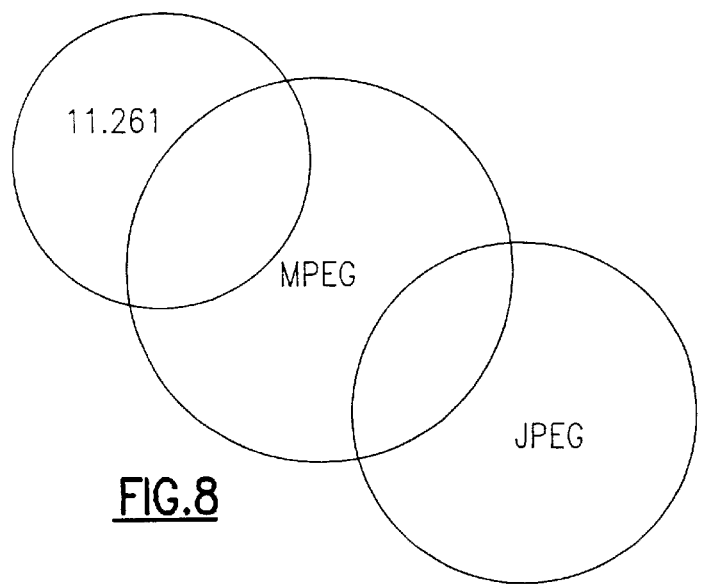
FIG. 8 shows a Venn diagram of possible table selection values.

Referring to exemplary FIG. 8, a Venn diagram is given, representing the range of values possible for the table selection from the Huffman decoder 401-6. The values possible for an MPEG decoder and an H.261 decoder overlap, indicating that a single table selection will decode both certain MPEG and certain H.261 formats. Likewise, the values possible for an MPEG decoder and a JPEG decoder overlap, indicating that a single table selection will decode both certain MPEG and certain JPEG formats. Additionally, it is shown that the H.261 values and the JPEG values do not overlap, indicating that no single table selection exists that will decode both formats.

Figure 9:
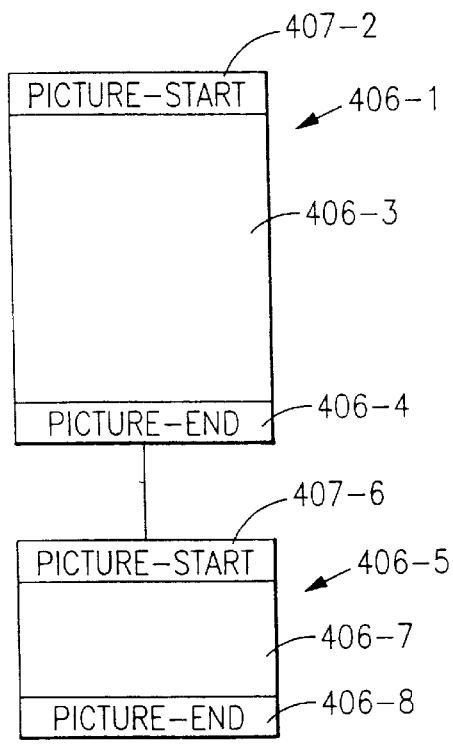
FIG. 9 shows the variable length of picture data used in the present invention.

Referring to exemplary FIG. 9, a first picture 407-1 to be processed contains a first picture-start token 407-2, first picture information of indeterminate length 407-3, and a first picture-end token 407-4. A second picture 407-5 to be processed contains a second picture start token 407-6, second picture information of indeterminate length 407-7, and a second picture-end token 407-8. The picture-start tokens 407-2 and 407-6 indicate the start of the pictures 407-1 and 407-5 to the processor. Likewise, the picture-end tokens 407-4 and 407-8 signify the end of the pictures 407-1 and 407-5 to the processor. This allows the processor to process picture information 407-3 and 407-7 of variable lengths.

Figure 10:
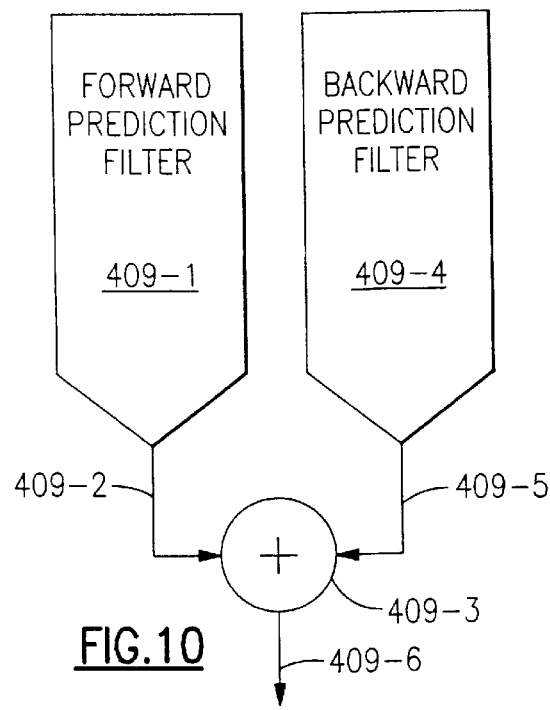
FIG. 10 is a pictorial representation of the prediction filtering process.

Referring to exemplary FIG. 10, a split 408-1 receives input over line 408-2. A first output from the split 408-1 is passed over line 408-3 to an address generator 408-4. The address generated by the address generator 408-4 is passed over line 408-5 to a DRAM interface 408-6. Signals are transmitted to and received from external DRAM (not shown) by the DRAM interface 408-6 over line 408-7. A first output from the DRAM interface 408-6 is passed over line 408-8 to a prediction filter 408-9. The output from the prediction filter 408-9 is passed over line 408-10 as a first input to a summing circuit 408-11. A second output from the split 408-1 is passed over line 408-12 as an input to a first-in first-out buffer (FIFO) 408-13. The output from the FIFO 408-13 is passed over line 408-14 as a second input to the summing circuit 408-11. The output from the summing circuit 408-11 is passed over line 408-15 to a write signal generator 408-16. A first output from the write signal generator 408-16 is passed over line 408-17 to the DRAM interface 408-6. A second output from the write signal generator 408-16 is passed over line 408-18 as a first input to a read signal generator 408-19. A second output from the DRAM interface 408-6 is passed over line 408-20 as a second input to the read signal generator 408-19. The output from the read signal generator 408-19 is passed over line 408-21 to a video formatter (not shown).

Referring to exemplary FIG. 10, a forward picture 409-1 is passed over line 409-2 as a first input to a summing circuit

409-3. A backward picture 409-4 is passed over line 409-5 as a second input to the summing circuit 409-3. The output from the 409-3 is passed over line 409-6.

Figure 11:
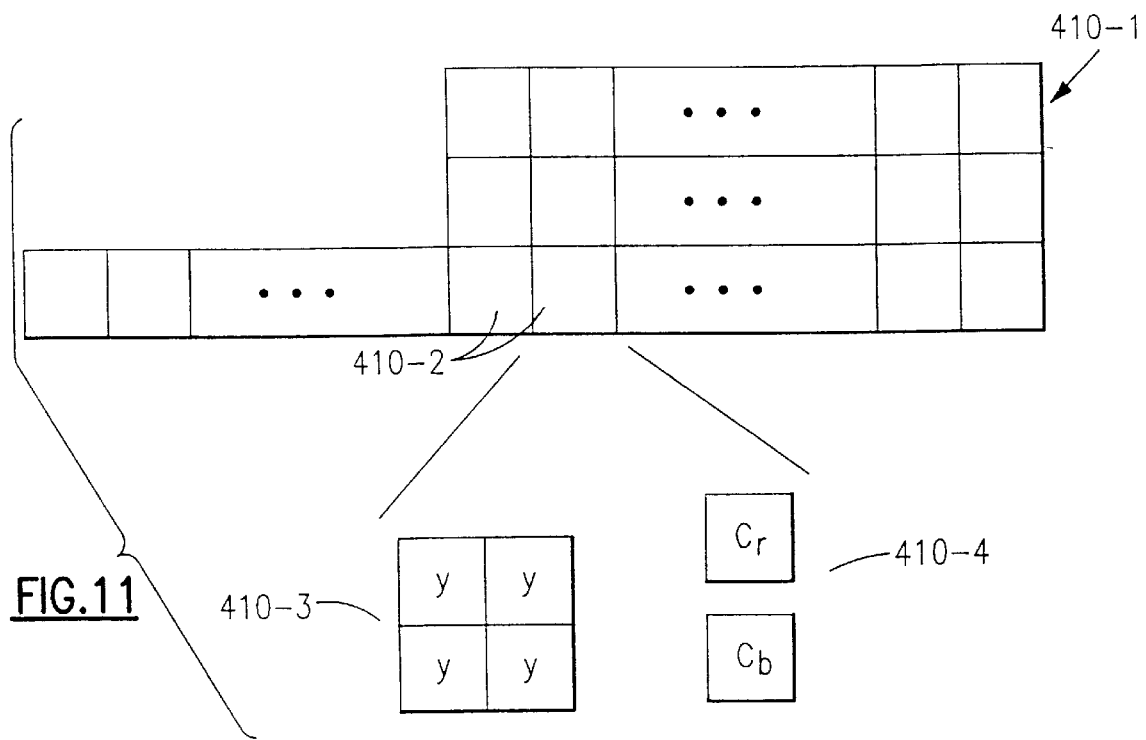
FIG. 11 shows a generalized representation of the macroblock structure.

Referring to exemplary FIG. 11, a slice 410-1 comprises one or more macroblocks 410-2. In turn, each macroblock 410-2 comprises four luminance blocks 410-3 and two chrominance blocks 410-4, and contains the information for an original 16×16 block of pixels. Each of the four luminance blocks 410-3 and two chrominance blocks 410-4 is 8×8 pixels in size. The four luminance blocks 410-3 contain a 1 pixel to 1 pixel mapping of the luminance (Y) information from the original 16×16 block of pixels. One chrominance block 410-4 contains a representation of the chrominance level of the blue color signal (Cb), and the other chrominance block 410-4 contains a representation of the chrominance level of the red color signal (Cr). Each chrominance level is subsampled such that each 8×8 chrominance block 410-4 contains the chrominance level of its color signal for the entire original 16×16 block of pixels.

Figure 12:
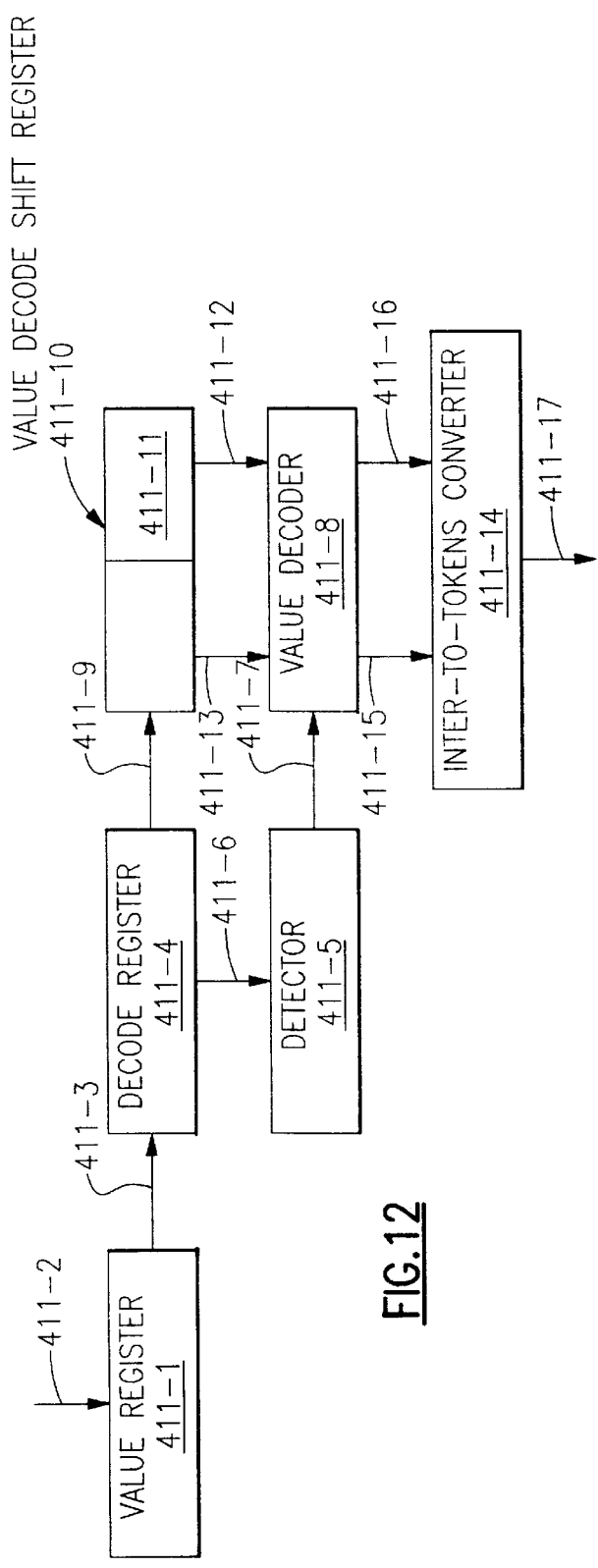
FIG. 12 shows a generalized block diagram of a start code detector.

Referring to exemplary FIG. 12, a value register 411-1 receives images over a line 411-2. The line 411-2 is eight bits wide, allowing for parallel transmission of eight bits at a time. The output from the value register 411-1 is passed serially over line 411-3 to a decode register 411-4. A first output from the decode register 411-4 is passed to a detector 411-5 over a line 411-6. The line 411-6 is twenty-four bits wide, allowing for parallel transmission of twenty-four bits at a time. The detector 411-5 detects the presence or absence of an image which corresponds to a standard-independent start code of 23 "zero" values followed by a single "one" value. An 8-bit data value image follows a valid start code image. On detecting the presence of a start code image, the detector 411-5 transmits a start image over a line 411-7 to a value decoder 411-8.

A second output from the decode register 411-4 is passed serially over line 411-9 to a value decode shift register 411-10. The value decode shift register 411-10 can hold a data value image fifteen bits long. The 8-bit data value following the start code image is shifted to the right of the value decode shift register 41 1-10, as indicated by area 411-11. This process eliminates overlapping start code images, as discussed below. A first output from the value decode shift register 411-10 is passed to the value decoder 411-8 over a line 411-12. The line 411-12 is fifteen bits wide, allowing for parallel transmission of fifteen bits at a time. The value decoder 411-8 decodes the value image using a first look-up table (not shown)similar to that given in Table 12-2 of the User's Manual. A second output from the value decode shift register 411-10 is passed to the value decoder 411-8 which passes a flag to an index-to-tokens converter 411-14 over a line 411-15. The value decoder 411-8 also passes information to the index-to-tokens converter 411-14 over a line 411-16. The information is either the data value image or start code index image obtained from the first look-up table. The flag indicates which form of information is passed. The line 411-16 is fifteen bits wide, allowing for parallel transmission of fifteen bits at a time. The index-to-tokens converter 411-14 converts the information to token images using a second look-up table (not shown) similar to that given in Table 12-3 if the User's Manual. The token images generated by the index-to-tokens converter 411-14 are then output over a line 411-17. The line 411-17 is 15 bits wide, allowing for parallel transmission of fifteen bits at a time.

Figure 13:
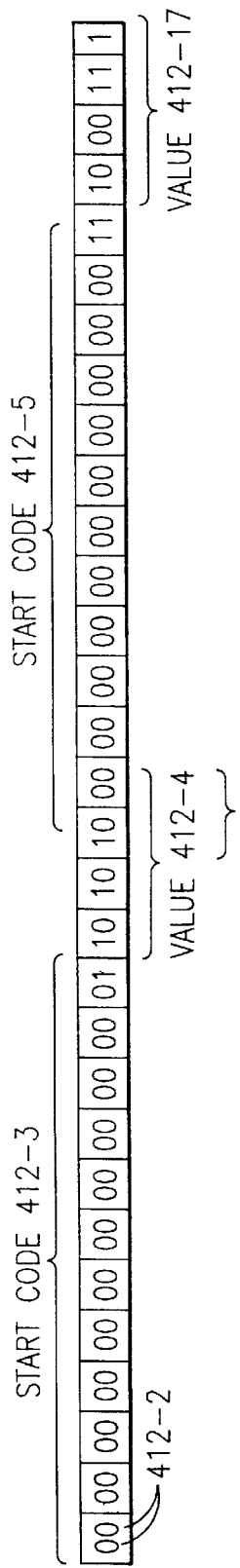
FIG. 13 shows a generalized block diagram of an index-to-tokens converter.

Referring to exemplary FIG. 13, a data stream 412-1 consisting of individual bits 412-1 is input to a start code detector (not shown). A first start code image 412-3 is detected by the start code detector (not shown). The start code detector (not shown) then receives a first data value image 412-4. Before processing the first data value image 412-4, the start code detector (not shown) may detect a second start code image 412-5, which overlaps the first data value image 412-4 at a length 412-6. If this occurs, the start code detector (not shown) does not process the first data value image 412-4, and instead receives and processes a second data value image 412-7.

Figure 14:
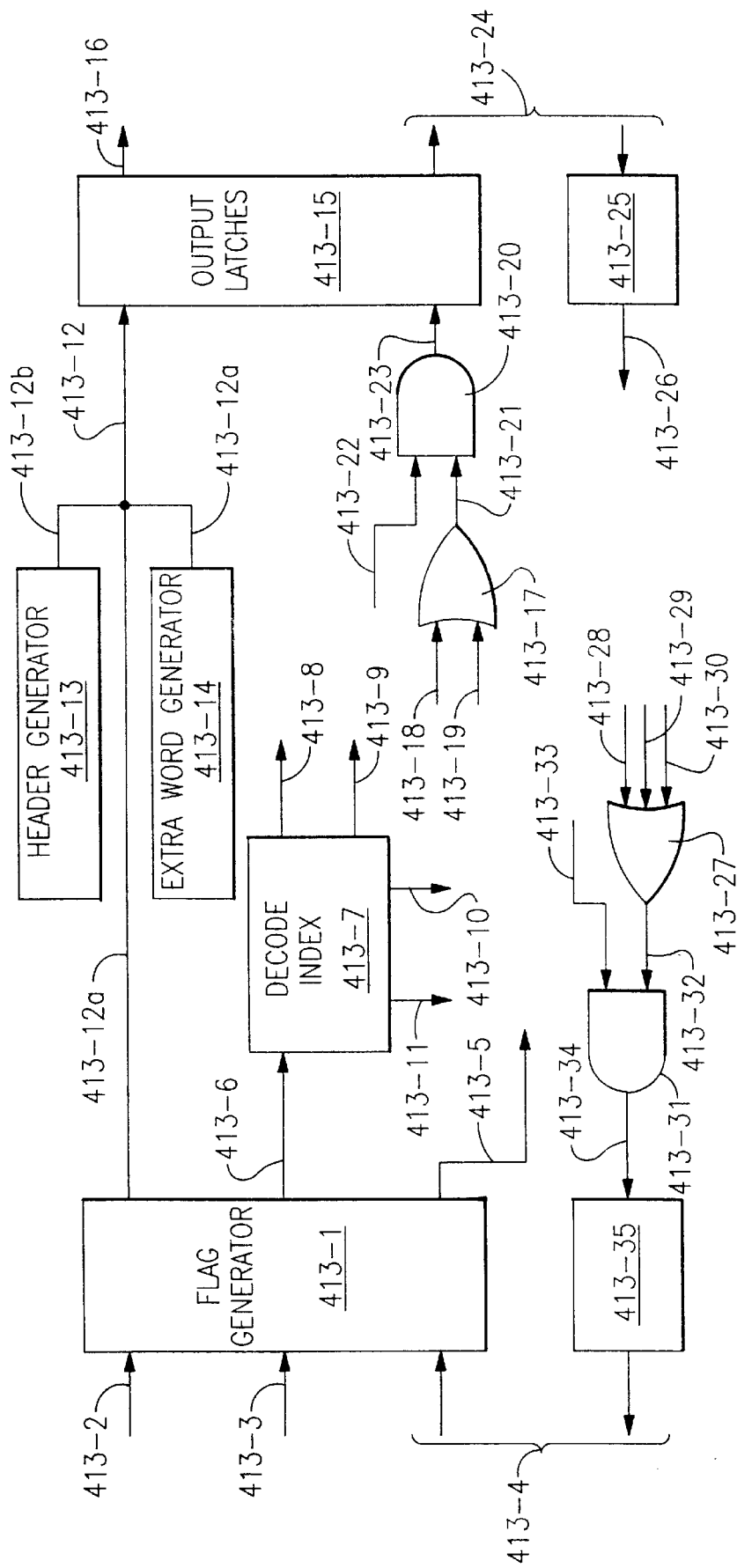
FIG. 14 is a block diagram depicting the relationship between the flag generator, decode index, header generator, extra word generator and output latches.

Referring to exemplary FIG. 14, a flag generator 413-1 receives data as a first input over a line 413-2. The line 413-2 is fifteen bits wide, allowing for parallel transmission of fifteen bits at a time. The flag generator 413-1 also receives a flag as a second input over a line 413-3, and receives an input valid image over a first two-wire interface 413-4. A first output from the flag generator 413-1 is passed over a line 413-5 to an input valid register (not shown). A second output from the flag generator 413-1 is passed over a line 413-6 to a decode index 413-7. The decode index 413-7 generates four outputs; a picture start image is passed over a line 413-8, a picture number image is passed over a line 413-9, an insert image is passed over a line 413-10, and a replace image is passed over a line 413-11. The data from the flag generator 413-1 is passed over a line 413-12a. A header generator 413-13 uses a look-up table to generate a replace image, which is passed over a line 413-12b. An extra word generator 413-14 uses the MPU to generate an insert image, which is passed over a line 413-12c. Line 413-12a, and line 413-12b combine to form a line 413-12, which is first input to output latches 413-15. The output latches 413-15 pass data over a line 413-16. The line 413-16 is fifteen bits wide, allowing for parallel transmission of fifteen bits at a time.

The input valid register (not shown) passes an image as a first input to a first OR gate 413-17 over a line 413-18. An insert image is passed over a line 413-19 as a second input to the first OR gate 267. The output from the first OR gate 413-17 is passed as a first input to a first AND gate 413-20 over a line 413-21. The logical negation of a remove image is passed over a line 413-22 as a second input to the first AND gate 413-20 and is passed as a second input to the output latches 413-15 over a line 413-23. The output latches 413-15 pass an output valid image over a second two-wire interface 413-24. An output accept image is received over the second two-wire interface 413-24 by an output accept latch 413-25. The output from the output accept latch 413-25 is passed to an output accept register (not shown) over a line 413-26.

The output accept register (not shown) passes an image as a first input to a second OR gate 413-27 over a line 413-28. The logical negation of the output from the input valid register is passed as a second input to the second OR gate 413-27 over a line 413-29. The remove image is passed over a line 413-30 as a third input to the second OR gate 413-27. The output from the second OR gate 413-27 is passed as a first input to a second AND gate 413-31 over a line 413-32. The logical negation of an insert image is passed as a second input to the second AND gate 413-31 over a line 413-33. The output from the second AND gate 413-31 is passed over a line 413-34 to an input accept latch 413-35. The output from the input accept latch 413-35 is passed over the first two-wire interface 413-4.

TABLE 400

| Format | Image Received | Tokens Generated |
|---|---|---|
| 1. H.261 | SEQUENCE START | SEQUENCE START |
| MPEG | PICTURE START | GROUP START |
| JPEG | (None) | PICTURE START |
|  |  | PICTURE DATA |
| 2. H.261 | (None) | PICTURE END |
| MPEG | (None) | PADDING |
| JPEG | (None) | FLUSH |
|  |  | STOP AFTER PICTURE |

As shown by Table 400, the detection of an image by the detector generates a sequence of machine independent control tokens. Each image listed in the "Image Received" column starts the generation of all machine independent control tokens listed in the group in the "Machine Independent Control Tokens Generated" column. Therefore, as shown in Line 1 of Table 400, whenever a sequence start image is received during H.261 processing or a picture start image is received during MPEG processing, the entire group of four control tokens is generated, each followed by its corresponding data value or data values. In addition, as shown in Line 2 of Table 400, the second group of four control tokens is generated at the proper time irrespective of images received by the detector.

TABLE 401

| DISPLAY ORDER: | I1 B2 B3 P4 B5 B6 P7 B8 B9 I10 |
|---|---|
| TRANSMIT ORDER: | I1 P4 B2 B3 P7 B5 B6 I10 B8 B9 |

As shown in line 1 of Table 401, the picture frames are displayed in numerical order. However, in order to reduce the number of frames that must be stored in memory, the frames are transmitted in a different order. It is useful to begin the analysis from an intraframe (I frame). The I1 frame is transmitted in the order it is to be displayed. The next predicted frame (P frame), P4, is then transmitted. Then, any bi-directionally interpolated frames (B frames) to be displayed between the I1 frame and P4 frame are transmitted, represented by frames B2 and B3. This allows the transmitted B frames to reference a previous frame (forward prediction) or a future frame (backward prediction). After transmitting all the B frames to be displayed between the I1 frame and the P4 frame, the next P frame, P7, is transmitted. Next, all the B frames to be displayed between the P4 and P7 frames are transmitted, corresponding to B5 and B6. Then, the next I frame, I10, is transmitted. Finally, all the B frames to be displayed between the P7 and I10 frames are transmitted, corresponding to frames B8 and B9. This ordering of transmitted frames requires only two frames to be kept in memory at any one time, and does not require the decoder to wait for the transmission of the next P frame or I frame to display an interjacent B frame.

MULTI-STANDARD CONFIGURATIONS

Since the compression standards are described with reference to the aforementioned U.S. Pat. No. 5,212,742, it is not required to repeat that information again.

As previously mentioned, the invention disclosed herein is usable for decompressing a variety of differently encoded, picture data bitstreams. In each of the different standards of encoding, some form of output formatter is required to take the data presented at the output of the spatial decoder operating alone, or the serial output of a spatial decoder and temporal decoder operating in combination, (as herein more detail described) and reformatting this output for use, including display in a computer or other display systems, including a video display system. The details of this formatting will vary significantly between encoding standards and/or the type of display selected.

In a first embodiment, an address generator is employed to store a block of formatted data, output from either the first decoder (spatial decoder) or the combination of the first decoder (spatial decoder) and the second decoder (the temporal decoder), and write the decoded information into and/or from a memory in a raster order. The video formatter described hereinafter provides a wide range of output signal combinations.

Figure 15:
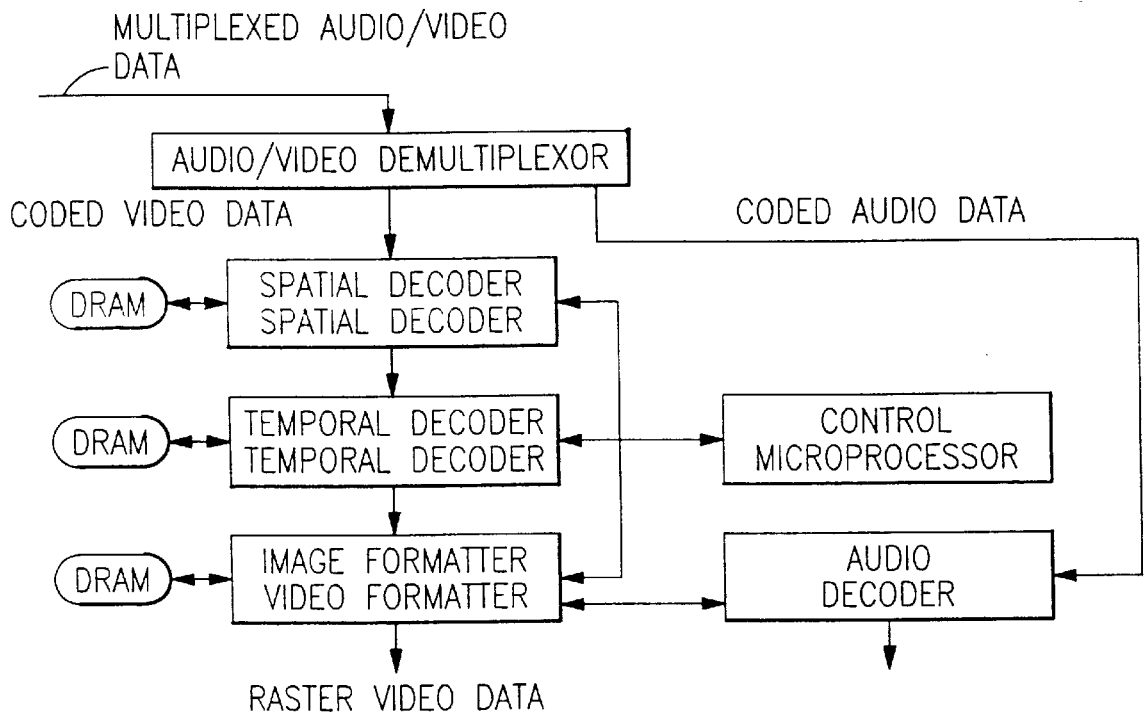

Referring to FIG. 15, entitled Typical Decoder System, there is shown a block diagram of the preferred multi-standard video decoder embodiment of the present invention. The spatial decoder and the temporal decoder are required to implement both an MPEG encoded signal and an H.261 video decoding system. The DRAM interfaces on both devices are configurable to allow the quantity of DRAM required to be reduced when working with small picture formats and at low coded data rates. The reconfiguration of these DRAMs will be further described hereinafter with reference to the DRAM interface. Typically, a single 4 megabyte DRAM is required by each of the temporal decoder and the spatial decoder circuits.

The spatial decoder performs all the required processing within a single picture. This reduces the redundancy within one picture.

The temporal decoder reduces the redundancy between the subject picture with relationship to a picture which arrives prior to the arrival of the subject picture, as well as a picture which arrives after the arrival of the subject picture. One aspect of the temporal decoder is to provide an address decode network which handles the complex addressing needs to read out the data associated with all of these pictures with the least number of circuits and with high speed and improved accuracy.

The data arrives through the start code detector, a FIFO register which precedes a Huffman decoder and parser, through a second FIFO register, an inverse modeler, an inverse quantizer, inverse zigzag and inverse DCT. The two FIFOs need not be on the chip. In one embodiment, the data does not flow through a FIFO that is on the chip. The data is applied to the DRAM interface block, and the FIFO-IN storage register and the FIFO-OUT register is off the chip in both cases. The blocks, whose operation is entirely independent of the standards, are shown with reference to the more detailed description.

The majority of the blocks shown in FIG. 2 are actually independent of the standard. The standard-independent blocks are the DRAM interface, the buffer manager which is generating addresses for the DRAM interface, the inverse modeler, the inverse zig-zag and the inverse DCT. The standard independent blocks within the Huffman decoder and parser include the ALU and the token formatter.

Referring to FIG. 3, the standard-independent blocks include the DRAM interface, the fork circuit, the FIFO register, the summer and the output selection. The standard dependent blocks are the address generation, which is different in H.261 and in MPEG, and the prediction filtering, which is reconfigurable to have the ability to do both H.261 and MPEG. The JPEG data will flow through the machine completely unaltered.

FIG. 4 is a high level block diagram of the video formatter. The vast majority of this chip is independent of the standard. The only items that are affected by the standard we are in is the way the data is written into the DRAM in the case of H.261, which differs from MPEG or JPEG; and that in H.261, it is not necessary to code every single picture. There is some timing information called a temporal reference which gives some information about when the pictures are intended to be displayed, and that is also handled by the address generation type of logic in the video formatter. The remainder of the circuitry shown in the video formatter, including all of the color space conversion, the up-sampling filters and all of the gamma correction RAMs, is entirely independent of the standard.

The start-code detector is dependent on the standard in that it has to recognize different Start-code patterns in the bitstream. For example, H.261 has a 16 bit start code, MPEG has a 24 bit start code and JPEG uses marker codes which are fairly different from the other start-codes. Once it has recognized those different start-codes, its operation is essentially independent of the standard. For instance, when it is doing searching, apart from the circuitry that is recognizing the different category of markers, a lot of the operation is very similar between the three different standards.

The next block is the state machine inside the Huffman decoder and parser. Here, the actual circuitry is almost identical in the three standards. The only element that is affected by which standard in operation is the reset address of the machine. If just the parser is reset, then it jumps to a different address for each standard. There are, in fact, four standards that are recognized. These standards are H.261, JPEG, MPEG and one other, where the parser enters a piece of code that is used for testing. This illustrates that the circuitry is identical in almost every aspect, but what is different is the program in the microcode for each of the standards. Thus, when operating in H.261, one program is running, and when a different program is running, there is no overlap between them. The same holds true for JPEG, which is a third, completely independent program.

The next block is the Huffman decoder. The diagrams are divided into two functions: the Huffman decoding and the index to data unit. Those two blocks operate together to do the Huffman decoding. Here, the algorithm that is used for Huffman decoding is the same, irrespective of the standard. So, the elements that change are elements such as which tables are used and whether or not the data coming into the Huffman decoder is inverted. Also, the Huffman decoder itself includes a state machine that understands some aspects of the coding standards. These different operations are selected in response to an instruction coming from the parser state machine, and the parser state machine knows, in fact, which standard it is operating in, because it will be operating with a program in each of the three standards and issues the correct command to the Huffman decoder at different times to achieve that.

The last block on the chip that is dependent on the standard is the inverse quantizer, where the mathematics that the inverse quantizer performs are different in the different standards. This is fairly straight-forward. The coding standard token is decoded and the inverse quantizer remembers which standard it is operating in. Then, any subsequent data tokens that happen after that but before another coded standard may come along, are dealt with in the way indicated by the coding standard that has been remembered inside the inverse quantizer. In the detailed description, there is a table illustrating different parameters in the different standards and what circuitry is responding to those different parameters or mathematics.

The address generation, with reference to H.261, differs in FIG. 3 and FIG. 4. The address generation in FIG. 2, which is generating addresses for the two FIFOs before and after the Huffman decoder, does not change depending on the coding standards. Even in H.261, the address generation that happens on that chip is unaltered. Essentially, the difference between these standards is that in MPEG and JPEG, there is an organization of macroblocks that are in linear lines going horizontally across pictures. As shown in FIG. 5, a first macroblock 404$a$ covers one line. A macroblock 404$a$-B covers less than a line. A macroblock 404$a$-C covers multiple lines. The division in MPEG is into slices, and a slice may be one horizontal line, 404$a$-A, or it may be part of a horizontal line 404$a$-B, or it may extend from one line into the next line, 404$a$-C. Each of these slices is made up of a row of macroblocks.

In H.261, the organization is rather different because the picture is divided into groups of blocks (GOB). A group of blocks is three rows of macroblocks high by eleven macroblocks wide. In the case of a CIF picture, there are twelve such groups of blocks. However, they are not organized one above the other. Rather, there are two groups of blocks next to each other and then six high, i.e., there are 6 GOB's vertically, and 2 GOB's horizontally.

In all other standards, when performing the addressing, the macroblocks are addressed in order as described above. More specifically, addressing proceeds along the lines and at the end of the line, the next line is started. In H.261, the order of the blocks is the same as described within a group of blocks, but as you go onto the next group of blocks, it is almost a zig-zag.

The present invention has circuitry to deal with that effect. That is the way in which the address generation in the spatial decoder and the video formatter varies for H.261. This is accomplished whenever information is written into the DRAM. It is written with the knowledge of the aforementioned address generation sequence so the place where it is physically located in the RAM is exactly the same as if this had been a MPEG picture of the same size. This means all of the address generation circuitry for reading things out of the DRAM, for instance when you are forming predictions, does not have to comprehend the fact that it is H.261 because the physical placement of the information in the memory is the same as it would have been if it had been in MPEG sequence. Thus, in all cases, it only affects the writing of data.

The other item identified on the list is that in the temporal decoder, there is an abstraction for H.261 where the circuitry pretends something is different from what is actually occurring. That is, each group of blocks is conceptually stretched out so that instead of having a rectangle which is 11×3 macroblocks, the macroblocks are stretched out into a long group (see FIG. 7) of 33 blocks which is one macroblock high. By doing that, exactly the same counting mechanisms used on the temporal decoder for counting through the groups of blocks are also used for MPEG.

There is a correspondence in the way that the circuitry is designed between an H.261 group of blocks and an MPEG slice. When H.261 data is processed after the Start Code Detector, each group of blocks is preceded by a slice start-code. The next group of blocks is preceded by the next slice start-code. The counting that goes on inside the temporal decoder for counting through this structure just pretends that it is a 33 macroblock-long group that is one macroblock high. The circuitry does not need to know anything particularly different, although it does have some circuitry for determining when it has gotten to every 11th interval. It knows when it reaches the 11th macroblock or the 22nd macroblock, because it actually has to reset some counters. That is done in a very simple piece of circuitry using another counter that counts each macroblock, and when it reaches 11, it resets to zero. The microcode interrogates that and does that work. All the circuitry in the temporal decoder is essentially independent of the standard with respect to the physical placement of the macroblocks.

In terms of multi-standardness, there are a number of different tables and the circuitry selects the appropriate table for the appropriate standard at the appropriate time. Each standard has multiple tables; the circuitry selects from the set at any given time. Within one standard, the circuitry selects one table at one time and another table another time. In a different standard, the circuitry selects a different set of tables. There is some commonality among those tables as shown in FIG. 8. For instance, one of the tables used in MPEG is also used in JPEG. The tables are not a completely isolated set. In FIG. 8, there is shown an H.261 set, the MPEG set and then the JPEG set. There is a much bigger overlap between the H.261 set and the MPEG set. They are quite common in the tables they utilize. There is a small overlap between MPEG and JPEG, and there is no overlap at all between H.261 and JPEG; the last have totally different sets of tables.

Most of the blocks are standard-independent. If a block is standard-independent, it need not be concerned with which standard is used. Each such block need not remember what coding standard is being processed. All of the blocks that do need to remember which coding standard they are processing, remember the standard as the coding standard token flows by them. In a situation when information encoded/decoded in a first coding standard is distributed through the machine, when a machine is changing standards, prior art machines under microprocessor control would choose do H.261. The MPU generates signals stating in multiple different places that the standard is changing. The MPU changes it at different times. Also, the MPU may flush the pipeline through.

By issuing a change of coding standard tokens at the start-code detector that is positioned as the first block in the pipeline, this change is easily handled. The token informs that a certain coding standard is beginning and that control instruction flows down the machine and configures all the other registers at the appropriate time. The MPU need not program each register.

The prediction token signals how to form predictions using the bits in the bitstream, depending on which standard is operating, and the circuitry translates the information that is in the standard, in the bitstream, into that common prediction mode token. That is performed in the Huffman decoder and parser state machine, which is a program on the machine where it is fairly easy to do that kind of programmable playing with bits and setting a certain bit, because of some certain condition. The start-code detector generates this prediction mode token. The token then flows down the machine to the circuitry of the spatial decoder, which is the device responsible for forming predictions. The circuitry of the spatial decoder interprets the token without having to know what standard it is operating in because the bits in it are invariant in the three different standards. It simply responds to that token. By careful uses of these tokens the design of other blocks in the machine is simplified. Although there may be some complications in the program, some benefits are received in that some of the hard wired logic which would be difficult to design for multi-standards can be used here.

JPEG STILL PICTURE DECODING

Figure 16:

Referring to FIG. 16 of the more detailed description, there is shown a block diagram of the JPEG still picture decoding system. A single spatial decoder with no off chip DRAM can rapidly decode baseline JPEG images. The spatial decoder will support all features of baseline JPEG encoding standards. However, the image size that can be decoded may be limited by the size of the output buffer provided.

The coding standards identify all of the standard-dependent types of information that are necessary for storage in the DRAMs associated with the spatial decoder using standard-independent circuitry.

MOTION PICTURE DECOMPRESSION

In the event that motion pictures are being decoded and decompressed through the steps of decoding, a further temporal decoder is necessary. The purpose of a temporal decoder is to combine the data decoded in the spatial decoder with pictures, previously decoded, that are intended for display either before or after the picture being currently decoded. The temporal decoder receives, in the picture coded data stream, information to identify this temporally-displaced information. The temporal decoder is organized to address temporally and spatially displaced information, retrieve it, and combine it in such a way as to decode the information located in one picture with the picture currently being decoded and ending with a resultant picture that is complete and is suitable for transmission to the video formatter for driving the display screen. Alternatively, the resultant picture can be stored for subsequent use in temporal decoding of subsequent pictures.

Generally, the temporal decoder performs the processing between pictures either earlier and/or later in time with reference to the picture currently being decoded. The temporal decoder reintroduces information that is not encoded within the coded representation of the picture, because it is redundant and is already available at the decoder. More specifically, it is probable that any given picture will contain similar information as pictures temporally surrounding it, both before and after. This similarity can be made greater if motion compensation is applied.

A temporal decoder is employed for handling the standard-dependent output information from the spatial decoder. This standard-dependent information for a single picture is distributed among several areas of DRAM in the sense that the decompressed output information, processed by the spatial decoder, is stored in other DRAM registers by other random access memories having still other machine-dependent, standard-independent address generation circuits for combining one picture of spatially decoded information packet of spatially decoded picture information, temporally displaced relative to the temporal position of the first picture. The temporal decoder and decompression circuit reduce the redundancy between related pictures.

Figure 17:
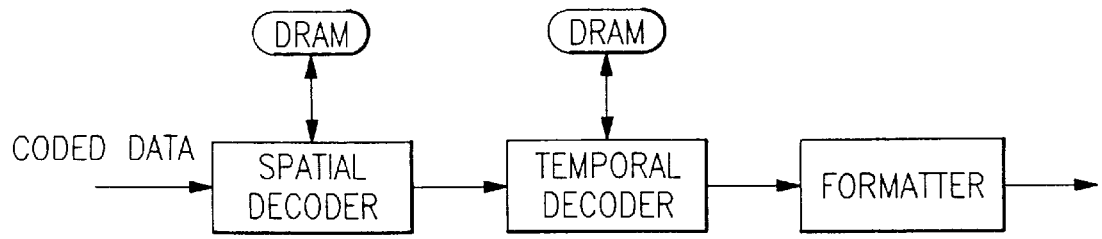

Referring again to the block diagram shown in FIG. 17, there is shown a block diagram of multi-standard circuits capable of decoding MPEG-encoded signals. However, larger logic DRAM buffers may be required to support the larger picture formats possible with MPEG.

The picture information is moving through the serial pipeline in 8 pel by 8 pel blocks. In one form of the invention, the address decoding circuitry handles these blocks (storing and retrieving) along such block boundaries.

The address decoding circuitry handles the storing and retrieving of such 8 by 8 blocks across such boundaries. This versatility is more completely described hereinafter.

A second temporal decoder is provided which passes the output of the first decoder circuit (the spatial decoder) directly to the video formatter for handling without signal processing delay.

The temporal decoder reorders the blocks of picture data for display by a display circuit. The address decode circuitry, described hereinafter, provides handling of this reordering.

One important feature of the temporal decoder is to add picture information together from a selection of pictures which have arrived earlier or later than the picture under processing. When we describe a picture in this context, we mean any one of the following:

1. The coded data representation of the picture;
2. The result, i.e., the final decoded picture resulting from the addition of a process step done by the decoder;
3. Previously decoded pictures read from the DRAM; and
4. The result of the spatial decoding, i.e., the extent of data between a picture-start token and a subsequent picture-end token.

After the picture data information is processed by the temporal decoder, it is either displayed or written back into a picture memory location. This information is then kept for further reference to be used in processing another different coded data picture.

Re-ordering of the MPEG encoded pictures for visual display involves the possibility that a scrambled picture can be achieved by varying the re-ordering feature of the temporal decoder.

RAM MEMORY MAP

The spatial decoder, temporal decoder and video formatter all use external DRAM. Preferably the same DRAM is used for all three devices. While all three devices used DRAM, and all three devices used a DRAM interface in conjunction with an address generator, what each implements in DRAM is different.

In brief, the spatial decoder implements two FIFOs in the common DRAM. Referring now to FIG. 2, one FIFO is positioned before the Huffman decoder and parser, and the other is positioned after the Huffman decoder and parser. The FIFOs are implemented in a relatively straightforward manner. For each FIFO, a particular portion of DRAM is set aside as the physical memory in which the FIFO will be implemented.

The address generator associated with the spatial decoder DRAM interface keeps track of FIFO addresses using two pointers. One pointer points to the first word stored in the FIFO, the other pointer points to the last word stored in the FIFO, thus allowing read/write operation on the appropriate word. When in the course of a read or write operation the end of the physical memory is reached, the address generator "wraps around" to the start of the physical memory.

In brief, the temporal decoder must be able to store two full pictures or frames of whatever encoding standard (MPEG or H.261) is specified. For simplicity, the physical memory in the DRAM into which the two frames are stored is split into two halves, with each half being dedicated (using appropriate pointers) to a particular one of the two pictures.

MPEG uses three different picture types: Intra (I), Predicted (P) and Bidirectionally interpolated (B). As previously mentioned, B pictures are based on predictions from two pictures. One picture is from the future and one from the past. I pictures require no further decoding by the temporal decoder, but must be stored in one of the two picture buffers for later use in decoding P and B pictures. Decoding P pictures requires forming predictions from a previously decoded P or I picture. The decoded P picture is stored in a picture buffer for use decoding P and B pictures. B pictures can require predictions form both of the picture buffers. However, B pictures are not stored in the external DRAM.

I and P pictures are not output from the temporal decoder as they are decoded. Instead, I and P pictures are written into one of the picture buffers, and are read out only when a subsequent I or P picture arrives for decoding. In other words, the temporal decoder relies on subsequent P or I pictures to flush previous pictures out of the two picture buffers, as discussed further in the section on flushing. In brief, the spatial decoder can provide a fake I or P picture at the end of a video sequence to flush out the last P or I picture. In turn, this fake picture is flushed when a subsequent video sequence starts.

The peak memory band width load occurs when decoding B pictures. The worst case is the B frame may be formed from predictions from both the picture buffers, with all predictions being made to half-pixel accuracy.

As previously described, the temporal decoder can be configured to provide MPEG picture reordering. With this picture reordering, the output of P and I pictures is delayed until the next P or I picture in the data stream starts to be decoded by the temporal decoder.

As the P or I pictures are reordered, certain tokens are stored temporarily on chip as the picture is written into the picture buffers. When the picture is read out for display, these stored tokens are retrieved. At the output of the temporal decoder, the DATA Tokens of the newly decoded P or I picture are replaced with DATA Tokens for the older P or I picture.

In contrast, H.261 makes predictions only from the picture just decoded. As each picture is decoded, it is written into one of the two picture buffers so it can be used in decoding the next picture. The only DRAM memory operations required are writing 8×8 blocks, and forming predictions with integer accuracy motion vectors.

In brief, the Video Formatter stores three frames or pictures. Three pictures need to be stored to accommodate such features as repeating or skipping pictures.

BITSTREAM CHARACTERISTICS

Referring specifically to the spatial decoder, it is helpful to review the bitstream characteristics of the encoded datastream as these characteristics must be handled by the circuitry of the spatial decoder and the temporal decoder. For example, under one or more compression standards, the compression ratio of the standard is achieved by varying the number of bits that it uses to code the pictures of a picture. The number of bits can vary by a wide margin. Specifically, this means that the length of a bitstream used to encode a referenced picture of a picture might be identified as being one unit long, another picture might be a number of units long, while still a third picture could be a fraction of that unit.

None of the existing standards (MPEG 1.2, JPEG, H.261) define a way of ending a picture, the implication being that when the next picture starts, the current one has finished. Additionally, the standards (H.261 specifically) allow incomplete pictures to be generated by the encoder.

In one preferred embodiment, the current invention provides a way of indicating the end of a picture by using one of its tokens: picture-end. The still encoded picture data leaving the start-code detector consists of pictures starting with a picture-start token and ending with a picture-end token, but still of widely varying length. There may be other information transmitted here (between the first and second picture), but it is known that the first picture has finished.

The data stream at the output of the spatial decoder consists of pictures, still with picture-starts and picture-ends, of the same length (number of bits) for a given sequence. The length of time between a picture-start and a picture-end may vary.

The video formatter takes these pictures of non-uniform time and displays them on a screen at a fixed picture rate determined by the type of display being driven. Different display rates are used throughout the world, e.g. PAL-NTSC television standards. It does this by selectively dropping or repeating pictures in a manner which is unique. Ordinary "frame rate converters," e.g. 2–3 pulldown, operate with a fixed input picture rate, whereas the video formatter can handle a variable input picture rate.

RECONFIGURABLE PROCESSING STAGE

FIG. 1 is a functional block diagram of a reconfigurable processing stage (RPS) 400-1. The organization of this RPS is shown in great detail in the accompanying "More Detailed Description" portion of this application. The RPS comprises a token decode circuit 400-2 which is employed to receive the tokens coming from a two wire interface 400-3 and input latches 400-4. The output of the token decode circuit 400-1 is applied to a processing unit 400-5 over the two-wire interface 400-6 and an action identification circuit 400-9. The processing circuit 400-5 is suitable for processing data under the control of the action identification circuit. After the processing is completed, the processing circuit 400-6 connects such completed signals to the output, two-wire interface bus 400-7 through output latches 400-8.

The action identification decode circuit 400-9 has an input from the token decode circuit 400-2 over a two-wire interface bus 400-10 and/or from memory circuits 400-12 and 400-14 over two-wire interface busses 400-16 and 400-18 respectively. The tokens from the token decode circuit 400-2 are applied simultaneously to the action identification circuit 400-9 and the processing circuit 400-5. The action identification functional block diagram in FIG. 1 is completely described in the tables and figures in the corresponding portions in the "More Detailed Description section of the invention".

The functional block diagram in FIG. 1 is used throughout the present invention to represent those stages in FIGS. 2, 3, and 4 which are not standard-independent circuits. The data flows through the token decode 400-2, through the processing unit 400-5 and onto the two-wire interface circuit 7 through the output latches in the 400-8. If the control token is recognized by the RPS, it is decoded in the token decode 400-1 and appropriate action will be taken. If it is not recognized, it will be passed unchanged to the output two-wire interface 400-7 through the output circuit 400-8. The present invention is operating as a pipeline processor having a two-wire interface for controlling the movement of control tokens through the pipeline. This feature of the invention is described in greater detail in the previously filed EPO patent application number 92306038.8.

The token decode circuit 400-1 is employed for identifying whether the token presently entering through the two-wire interface 400-7 is a data token or control token. In the event that the token being examined by the token decoder 400-1 is recognized, it is exited to the action identification circuit 400-6 with a proper index signal or flag signal indicating that action is to be taken. At the same time, the token decode circuit provides a proper flag or index signal to the processing circuitry to alert it to the presence of the token being handled by the action identification circuit 400-6. Control tokens may also be processed.

Referring to Section 3 of the "More Detailed Description," there is given a more detailed description of the types of tokens usable in the present invention. For the purpose of this portion of the specification, it is sufficient to note that the address carried by the control token is decoded in the decoder 400-1 and is used to access registers contained within the action identification circuit. When the token being examined is a recognized control token, the action identification circuit 400-6 uses its reconfiguration state circuit for distributing the control signals throughout the state machine. As previously mentioned, this activates the state machine of the action identification decoder, which then reconfigures itself. For example, it may change coding standards. In this way, the action identification circuit decodes the required action for handling the particular standard now passing through the state machine shown with reference to FIG. 1.

Similarly, the processing unit 400-2 which is under the control of the action identification circuit 400-6 is now ready to process the information contained in the data fields of the data token when it is appropriate for this to occur. On many occasions, a control token arrives first, reconfigures the action identification circuit 400-6 and is immediately followed by a data token which is then processed by the processing circuit 400-2. The control token exits the output circuit 400-5 over the output two-wire interface 400-4 immediately preceding the data token which has been processed within the processing block 400-2.

The action identification circuit, 400-9, is a state machine holding history state. The registers, 400-12 and 400-14 hold information that has been decoded from the token decoder and stored in these registers. Such registers can be either on-chip or-off chip as needed. These plurality of state registers contain action information connected to the action identification currently being identified in the action identification circuit 400-9. This action information has been stored from previously decoded tokens and can affect the action that is selected. The connection 400-10 is going straight from the token decode 400-2 to the action identification block 400-9. This is intended to show that the action can also be affected by the token that is currently being processed by the token decode circuit 400-2.

In general, there is shown token decoding and data processing. The data processing is performed as configured by the action identification circuit 400-9. The action is affected by a number of conditions and is affected by information generally derived from a previously decoded token or, more specifically, information stored from previously decoded tokens in register 400-12 and 400-14, the current token under processing, and the state and history information that the action identification unit 400-9 has itself acquired. A distinction is hereby shown between Control tokens and data tokens.

In any RPS, some tokens are viewed by that RPS block as being control tokens in that they affect the operation of the RPS presumably at some subsequent time. Another set of tokens are viewed by the RPS as data tokens. Such data tokens contain information which is processed by the RPS in a way that is determined by the design of the block of circuitry, the tokens that have been previously decoded and the state of the action identification circuit 400-9. Although a particular RPS identifies a certain set of tokens for that particular RPS control and another set of tokens as data, that is the view of it. Another RPS can have a different view of the same token. Some of the tokens that it views as being block A are data tokens while block B might decide that it is actually a control token. For example, the quantization table information, as far as the Huffman decoder and state machine is concerned, is data, because it arrives on its input as coded data, it gets formatted up into a series of 8 bit words, and they get formed into a token called a quantization table token which goes down the processing pipeline. As far as that machine is concerned, all of that was data; it was handling data, transforming one sort of data into another sort of data, which is clearly a function of the processing that block does. However, when that information gets to the inverse quantizer, it stores the information in that token in some registers. Those registers have been identified in this block diagram as 420 and 422. In fact, because there are 64 8-bit numbers and there are many registers, in general, many registers may be present. This information is viewed as control information, and then that control information affects the processing that is done on subsequent data tokens because it affects the number that you multiply each data word. There is an example where one block viewed that token as being data and another stage viewed it as being control.

What is present in the current invention is called token data, which almost universally is viewed as being data through the machine. One of the important aspects is that, in general, each block of circuitry that has a token decoder will be looking for a certain set of tokens, and any tokens that it does not recognize will be passed unaltered through the block so that subsequent blocks of circuitry downstream of the current block have the benefit of seeing those tokens and may respond to them. This is an important feature, namely there can be communication between blocks that are not adjacent to one another using the token mechanism.

Another important feature of the invention is that each of the blocks of circuitry has the processing capability within it to be able to perform the necessary operations for each of the standards, and the control as to which operations to do at a given time come as tokens. One processing element that differs between the different blocks to provide this capability is that in the state machine ROM of the parser, there are three separate entirely different programs, one for each of the standards that are dealt with. Which program is executed depends upon a token. The way that is handled is that when each of those three programs has within it the ability to handle decoding and the standard token as a piece of software, and when each of those programs sees the coding standard software, they look at the coding standard that is to be decoded next and then literally jump to the address in the microcode ROM for the start of that program. This is how this block deals with the multi-standardness.

Two things are affected by the different standards. First, it affects what the pattern of bits is in the bitstream that is recognized as a start-code or a marker code, so it reconfigures that shift register to see how long it is. Second, following the start-code in the microcode is a piece of information that notes what that start or marker code means, and then the coding of those bits differs between the three standards. It looks up in a table specific to the standard, something that is independent of the standard, which is the type of token that is produced in response to that. This type of token is independent of the standard in the sense that in the case of most tokens, each of the three standards has a certain marker code that produces it.

The inverse quantizer has the mathematical capability. It is a block that does math. It multiplies and adds, and has the functions to do all three standards which are configured by, basically, parameters. The block remembers the coding standard token as it flows by it in a register, and when data tokens turn up after, that it will remember what the standard is and it looks up what are the parameters that it needs to apply to the processing elements in order to perform that correct operation. It will look up whether K is set to 0, or whether it is set to 1 for a particular standard that it has remembered, and apply that to its processing circuitry.

In a similar sense the Huffman decoder has a number of tables within it, some for JPEG, some for MPEG and some for H.261. The majority of those tables, in fact, will service more than one of those standards. That is on the detail of the standard. The block works by receiving a command from the state machine that tells it which of those tables to use. So in fact, the Huffman decoder itself does not directly have a piece of state going into it, which is remembered within and which says what coding it is doing. But in combination, the parser state machine and Huffman decoder together have that information within them, so it is remembered in that way.

Regarding the spatial decoder, the address generation is modified. It is believed this is fairly direct and similar to the diagram that is shown in FIG. 1, in that a number of pieces of information are decoded from tokens, such as the prediction mode and coding standard. At least that and probably some more information as well, is recorded in the registers and that affects the progress of the address generator state machine as it steps through and counts through the macroblocks in the circuitry, one after the other. The last block would be the prediction filter block which is fairly direct and has one of two modes, either H.261 or MPEG. This is easily identified.

MULTI-STANDARD CODING

Another advantage of the present invention is the combination of the standard-independent indices generation circuits, which are strategically placed throughout the present invention in combination with the token decode circuits. For example, the present invention is employed for specifically decoding either the H.261 video standard, or the MPEG video standard or the JPEG video standard. These three coding standards specify similar processes to be done on the arriving data, but the structure of the datastreams is different. As previously discussed, it is one of the functions of the start-code detector circuit to detect MPEG start-codes, H.261 start-codes, and JPEG marker codes, and convert them all into one form of the present inventions which includes a token stream embodying the current coding standard. As previously described, the control tokens are passed through the pipeline processor, and are used, i.e., decoded, in the state machines to which they are relevant, and are passed through other state machines to which the tokens are not relevant. As a reminder, the data tokens are treated in the same fashion, insofar as they are processed only in the state machines that are configurable by the control tokens into processing such data tokens. In the remaining state machines, they pass through unchanged.

More specifically, a control token can consist of more than one word in the token. In that case, a bit known as the extension bit is set specifying the use of additional words in the token for carrying additional information. Certain of these additional control bits contain indices indicating information for use in corresponding state machines to create a set of standard-independent indices signals. The remaining portions of the token are used to indicate and identify the internal processing control function which is standard for all of the datastreams passing through the pipeline processor. In one form of the invention, the token extension is used to carry the current coding standard which is decoded by the relative token decode circuits distributed throughout the machine, and is used to reconfigure the action identification circuit 400-6 of blocks throughout the machine where appropriate to operate under a new coding standard. Additionally, the token decode circuit can indicate whether a control token is related to one of the selected standards for which the circuit was designed to handle.

More specifically, an MPEG start-code and a JPEG marker are followed by an 8 bit value. The H.261 Start-code is followed by a 4 bit value. In this context, the start-code detector, by detecting either a MPEG start-code or a JPEG marker, indicates that the following 8 bits contain the value associated with the start-code. Independently, it can then create a signal which indicates that it is either a MPEG start-code or a JPEG marker and not an H.261 start code. In this first instance, the 8 bit value is entered into a decode circuit, part of which creates a signal indicating the index and flag which is used within the current circuit for handling the tokens passing through the circuit; also used to insert portions of the control token which will be looked at thereafter to determine which standard is being handled. In this sense, the control token contains a portion indicating that it is related to an MPEG standard as well as a portion which indicates what type of operation should be performed on the accompanying data. As previously discussed, this information is utilized in the system to reconfigure the processing circuit which is used to perform the function required by the various standards created for that purpose.

For example, with reference to the H.261 start code, it is associated with a 4 bit value which follows immediately after the start code. The start-code detector passes this value into the token generator state machine. The value is applied to an 8 bit decoder which produces a 3 bit start number. The start number is employed to identify the picture-start of a picture number as indicated by the value.

In a further aspect of the invention, the present invention comprises a multi-stage parallel processing pipeline operating under the principles of the two-wire interface fully described in a pending patent application previously identified. Each of the stages comprises a machine generally taking the form of FIG. 1. The token decode stage is employed to direct the token presently entering the state machine into the action identification circuit or the processing circuit, as appropriate. The processing circuit has been previously reconfigured by the next previous control token into the form needed for handling the current coding standard, which is now entering the processing stage and carried by the next data token. Further, this aspect of the invention clearly indicates that succeeding state machines in the processing pipeline can be functioning under one coding standard, i.e., H.261, while a previous stage can be operating under a separate standard, such as MPEG.

A further aspect of the present invention is the use of same two-wire interface for carrying both the control tokens and the data tokens.

Another aspect of the present invention relates to the use of control tokens needed to decode a number of coding standards with a fixed number of reconfigurable processing blocks. More specifically, the picture-end control token is needed because it is important to have an indication of when a picture actually ends. Accordingly, in designing a multi-standard machine, it is necessary to create additional control tokens within the multi-standard pipeline processing machine which will then indicate which one of the standard decoding techniques to use. Such a control token is the picture-end signal. This picture-end token is used to:
a) indicate that the current picture has finished; and
b) to force the buffers to be flushed, and to push the current picture through the decoder to the display.

START-CODE DETECTOR

The start-code detector is capable of taking MPEG, JPEG and H.261 bitstreams and from them, generating a sequence of proprietary tokens which are meaningful to the rest of the decoder. As an example of how multi-standard decoding is achieved, the MPEG (1 and 2) picture-start-code, the H.261 picture-start-code and the JPEG start of scan (SOS) marker are treated as equivalent by the start-code detector, and all will generate an internal picture-start token. In a similar way, the MPEG sequence start code and the JPEG SOI (start of image) marker both generate a machine sequence start token. The H.261 has no equivalent start code, so the start code detector, in response to the first H.261 picture start code, will generate a sequence- start token.

None of these images are directly used in the operation of the present invention, other than in SAD, but rather a machine sequence start signal has been deemed to be equivalent to these images contained in the bitstream. It must be borne in mind that the machine picture-start alone is not a direct image of the picture-start in the standard but rather, it is a control token which is used in combination with other control tokens to provide standard-independent decoding which emulates the operation of the images in each of the coding standards. While emulation is not new, the combination of control tokens in combination with the reconfiguration of circuits according to the information carried by control tokens is deemed to be new alone or in further combination with indices and/or flags generated by the token decode circuit portion of a respective state machine.

The start-code detector creates sequence-start, group_start, sequence_end, slice_start, user-data, extra-data and picture- start tokens for application to the two-wire interface which passes through the present invention. Each of the blocks which operate in conjunction with these control tokens are configured by the contents of the tokens, or are configured by indices created by contents of the tokens, and are prepared to handle data which is expected to be received when the picture data token arrives at that station.

As previously described, one of the standards, such as H.261, does not have a sequence-start image in its datastream, nor does it have a picture-end image in its datastream. As previously described, the start-code detector indicates the picture-end point in the incoming bitstream and creates a picture-end control token. The present invention is designed to carry data words that are fully packed to contain a bit of information in each of the register positions selected for use in the present invention. For example, all 15 bits of data word being passed from the start-code detector into the drawn interface are required for proper operation. The start-code detector creates extra bits, called padding, which it inserts into the last word of a data token; this could take the length of any number of bits for the present invention. The selection of 15 data bits has been made.

A binary 0 followed by a number of binary 1's are automatically inserted to complete the 15 bit data word. This data is then passed through the coded data buffer and presented to the Huffman decoder, which removes the padding. Thus, an arbitrary number of bits have been passed through a buffer of fixed size and width.

In one embodiment, a slice-start control token is used to identify a slice of the picture. A slice-start control token is employed to segment the picture into smaller regions. The size of the region is chosen by the encoder, and the start code detector identifies this unique pattern of the slice code in order for the machine-dependent state machines, located downstream from the start code detector, to segment the picture being received into smaller regions. The size of the region is chosen by the encoder, recognized by the start-code detector and used by the recombination circuitry and control tokens to decompress the encoded picture. The slice-start-codes are principally used for error recovery.

The start-codes provide a unique method of starting up the decoder, and this will subsequently be described more particularly. There are a number of advantages in putting the start-code detector before the coded data buffer as opposed to placing the start code detector after the coded data buffer and before the Huffman decoder and video demultiplexer. Putting the start-code detector before the first buffer allows it to 1) assemble the tokens, 2) decode the standard control signals, such as start-codes, 3) pad the bitstream before the data goes into the buffer, and 4) create the proper sequence of control tokens to empty the buffers, pushing the available data from the buffers into the Huffman Decoder.

Most of the control token output by the start-code detector directly reflects syntactic elements of the various picture and video coding standards. In addition to these natural tokens, some usual invented and/or machine-dependent tokens are generated. The term "invented tokens" means those tokens which have been designed for use with the configuration of the present invention which are unique in themselves and are employed for aiding in the multi-standard nature of the present invention. Examples of the invented tokens include picture-end and coding-standard.

Tokens are also introduced to remove some of the syntactic differences between the coding standards and to function in co-operation with the error conditions. The automatic token generation is done after the serial analysis of the standard-dependent data. The SAD responds equally to tokens that have been supplied directly to the input of the Spatial Decoder and tokens that have been generated following the detection of the start-codes in the coded data.

The MPEG and H.261 coded video streams contain standard-dependent, nondata, identifiable bit patterns, one of which is hereinafter called a start image and/or standard-dependent code. A similar function is served in JPEG, by marker codes. These start/marker codes identify significant parts of the syntax of the coded datastream. The analysis of start/marker codes performed by the start code detector is the first stage in parsing the coded data.

The start/marker code patterns are designed so that they can be identified without decoding the entire bit stream. Thus, they can be used within the present invention to assist with error recovery and decoder start-up. The start-code detector provides facilities to detect errors in the coded data construction and to assist the start-up of the decoder.

The description prior to this section discusses the characteristics of the machine-dependent bitstream and its relationship with the addressing characteristics of the present invention. The following description is of the bitstream characteristics of the standard-dependent coded data with reference to the start code detector.

Each of the standard encoding systems employs a unique start-code configuration or image which has been selected to identify that particular specification. Each of the start-codes also carries with it a start-code value. The start- code value is employed to identify within the language of the standard the type of operation that the start-code is associated with. In designing a multi-standard decoder, one of the improvements is to further find a circuit design compatible with all such standards. The compatibility described herein is based upon the control token and data token configuration as previously described. Index signals, including flag signals, are circuit-generated within each state machine, and have been described hereinafter as appropriate.

The start and/or marker codes contained in the standards, as well as other standard words as opposed to data words, are sometimes identified as images to avoid confusion with the use of code and/or machine-dependent codes to refer to the contents of control and/or data tokens used in the machine.

The standard-dependent coded input picture input stream comprises data and start images of varying lengths. The start images carry with them a value telling the user what operation is to be performed on the data which immediately follows according to the standard. However, in a multi-standard pipeline processing system where compatibility is required for multiple standards, the design of the circuits has to be optimized for handling all functions in all standards. Accordingly, in many situations, unique start control tokens must be created which are compatible not only with the values contained in the values of the encoded signal standard image, but which are also capable of controlling the circuitry of the present invention to emulate the operation of the standard as represented by specified standard parameters as listed in each standard. All such standards are incorporated by reference into this specification.

It is important to understand the relationship between tokens which, alone or in combination with other control tokens, emulate the nondata information contained in the standard bitstream. A separate set of index signals, including flag signals, are generated by each state machine to handle some of the processing within that state machine. Values carried in the standards can be used to access machine-dependent control signals to emulate the handling of the standard data and non-data signals. The slice start is a two word token, and it is then entered onto the two wire interface as previously described.

A data source provides 8 bit data to the first functional stage in the spatial decoder: the start code detector. The start-code detector has three shift registers; the first shift register is 8 bits wide, the next is 24 bits wide, and the next is 15 bits wide. Each of the registers is part of the two wire interface which has already been described in the previous patent application. The data from the data source is loaded into the first register as a single 8 bit byte during one timing cycle. Thereafter, the contents of the first shift register is shifted one bit at a time into the decode (second) shift register. After 24 cycles, the 24 bit register is full.

Every 8 cycles, the 8 bit bytes are loaded into the first shift register. Each byte is loaded into the value shift register, and 8 additional cycles are used to empty it and load the shift register. Eight cycles are used to empty it, so after three of those operations or 24 cycles, there are still three bytes in the 24 bit register. The value decode shift register is still empty.

Assuming that there is now a picture start word in the 24 bit shift register, the detect cycle recognizes the picture-start-code pattern and gives a start signal as its output. The detector detects the fact that there is a start-code. Once the detector has detected a start, the byte following it is the value associated with that start-code, and this is currently sitting in the value register.

Since the contents of the detect shift register has been identified as a start-code, its contents must be removed from the two wire interface to ensure that no further processing takes place using these 3 bytes. The decode register is emptied, and the value decode shift register waits for the value to be shifted all the way over to such register.

The contents now of the low order bit positions of the value decode shift register contains a value associated with the picture-start signal. The spatial decoder equivalent to the standard picture-start signal will be identified by the name SD picture-start signal. The SD picture-start signal itself is going to now be contained in the token header, and the value is going to be contained in the extension word to the token header.

TOKENS

A picture-end token is a way of signaling the end of a picture in a multi-standard decoder.

A multi-standard token is a way of mapping MPEG, JPEG and H.261 data streams onto a single decoder using a mixture of standard dependent and standard independent hardware and control tokens.

A search-mode token is a technique for searching MPEG, JPEG and H.261 data streams which allows random access and enhanced error recovery.

A stop-after picture token is a method of achieving a clear end to decoding which signals the end of a picture and clears the decoder pipeline, i.e., channel change.

A padding token is a way of passing an arbitrary number of bits through a fixed size, fixed width buffer.

The present invention is directed to a pipeline processing system which has a variable configuration built upon the use of tokens and a two wire system. Two wire systems are known. However, the use of control tokens and data tokens in combination with a two wire system allows the designer to configure their system into a multi-standard system capable of having extended operating capabilities as compared with those systems which do not use the control token system.

The control tokens are generated by circuitry within the decoder processor and are created by the system designer to emulate the operation of a number of different type standard-dependent signals passing into the he serial pipeline processor for handling. The technique used is to study all the parameters of the multi-standards that are selected for processing by the serial processor and noting 1) their similarities, 2) their dis-similarities, 3) their needs and requirements and 4) selecting the correct token function to effectively process all of the standard signals sent into the serial processor. The functions of the tokens are to emulate the standards. A control token function is used partially as an emulation/translation between the standard dependent signals and as an element to transmit control information through the pipeline processor.

In the prior art system, a dedicated machine is designed according to well-known techniques to identify the standard and then set up the dedicated circuitry by way of microprocessor interfaces. Signals from the microprocessor are used to control the flow of data through the dedicated downstream components. The selection, timing and organization of this decompression function is under the control of fixed logic circuitry as assisted by signals coming from the microprocessor.

This is compared to the present invention in which the configuring of the downstream functional blocks is under the control of the control token. An option is provided for obtaining needed and/or alternative control from the MPU.

The tokens provide and make a sensible format for communicating information through the decompression circuit pipeline processor. In the design selected hereinafter and shown in the preferred embodiment, each word of a token is a minimum of 8 bits wide, and a single token can extend over one or more words. The width of the token is changeable and can be selected as any number of bits. An extension bit indicates whether a token is extended beyond the current word, i.e. if it is set to binary one in all words of a token, except the last word of a token. If the first word of a token has an extension bit of zero, this indicates that the token is only one word long.

Each token is identified by an address field that starts at bit 7 of the first word of the token. The address field is variable in length and can potentially extend over multiple words. In the preferred embodiment, the address is no longer than 8 bits long.

However, this not a limitation on the invention but on the magnitude of the processing steps elected to be accomplished by use of these tokens. It is to be noted under the extension bit identification label that the extension bit in words 1 and 2 is a 1, signifying that additional words will be coming thereafter. The extension bit in word 3 is a zero, therefore indicating the end of that token.

The token is also capable of variable bit length. For example, there are 9 bits in the token word plus the extension bit for a total of 10 bits. In the design of the present invention, output buses are of variable width. The output from the spatial decoder is 9 bits wide, or 10 bits wide when the extension bit is included. In the preferred embodiment, the only token that takes advantage of these extra bits is the data token; all other tokens ignore this extra bit. It should be understood that this not a limitation, but only an implementation.

Through the use of the data token and control token configuration, it is possible to vary the length of the data being carried by these data tokens in the sense of the number of bits in one word. For example, it has been discussed that data bits in word 1 of a data token can be combined with the data bits in word 2 of the same data token to form an 11 bit or 10 bit address for use in accessing the random access memories used throughout this serial decompression processor. This gives the present invention an additional degree of variability that indicates that the circuitry described and claimed herein has broad range of versatility to which it is entitled and to which the claims are directed.

For example, in general, as previously described, the data token carries data from one processing stage to the next. Consequently, the characteristics of this token change as it passes through the decoder. For example, at the input to the spatial decoder, data tokens carry bit serial coded video data packed into 8 bit words. Here, there is no limit to the length of each token. However, to show the versatility of this aspect of the invention (at the output of the spatial decoder circuit), each data token carries exactly 64 words and each word is 9 bits wide. More specifically, the standard encoding signal allows for different length messages to encode different intensities and details of pictures. The first picture of a group normally carries the longest number of data bits because it needs to provide the most information to the processing unit so that it can start the decompression with as much information as possible. Words which follow later are shorter in length because they contain the difference signals comparing the first words with reference to the second position on the scan information field.

In still other aspects of the invention, the words are interspersed with each other as required by the standard encoding system so that variable amounts of data are provided into the input of the spatial decoder. However, after the spatial decoder has functioned, the information is provided at its output at a picture format rate suitable for display on a screen. The output rate in terms of time of the spatial decoder may vary in order to interface with various display systems throughout the world, such as NTNC, PAL and SECAM. However, the picture data is still carried by data tokens consisting of 64 words.

In this manner, as the token is padding through each stage of the downstream stages of the pipeline decompression circuit, the decoder associated with each such stage looks at the identification part of the token and determines if this token is needed or useable by this particular stage in the process. In the event that it is not needed by that stage, it is then capable of being used as a multi-standard machine because the use of the identified tokens has been determined to function properly with relation to each of the standards as identified in the table. In this manner, the full description of the tokens, the assignment of those tokens by name to the various standards and the description of the token functions, in effect, gives a total and full description of the entire system which can be utilized by a person skilled in the art to create the logic requirements of this serial pipeline decompression system.

DRAM INTERFACE

A single high performance, configurable DRAM interface is used and described with reference to this invention. This interface is designed to directly drive the DRAMs required by spatial decoder, the temporal decoder and the video formatter. No external logic, buffers or components will be required to connect the DRAM interface to DRAMs in those systems. The interface is configurable in two ways:

1. The detailed timing of the interface can be configured to accommodate a variety of different DRAM types.
2. The width of the data interface to the DRAM can be configured to provide a cost/performance trade off for different applications.

The DRAM interface is a standard-independent block implemented on all three chips in the system, the spatial decoder, temporal decoder and video formatter. Referring now to FIGS. 2, 3, and 4, these figures show block diagrams that depict the relationship between the DRAM interface on the one hand, and on the other hand the remaining blocks of respective spatial decoder, temporal decoder and video formatter. On each chip the DRAM interface connects the chip to external DRAM. External DRAM is used because at present it is not practical to fabricate on the chips the relatively large amount of DRAM needed.

Of course, although the DRAM interface is standard-independent, it still must be configured to implement each of the multiple standards, H.261, JPEG and MPEG. How the DRAM interface is reconfigured for multi-standard operation is discussed further herein.

Key to understanding the operation of the DRAM interface is to understand the relationship between the DRAM interface and the address generator, and how the two communicate using the two wire interface. In brief, as its name implies, the address generator generates the addresses the DRAM interface needs to address the DRAM (e.g., to read from or to write to a particular address in DRAM). With a two-wire interface, reading and writing only occurs when the DRAM interface has both data (from preceding stages in the pipeline), and a valid address (from address generator). The use of a separate address generator simplifies the construction of both the address generator and the DRAM interface, as discussed further below.

The DRAM interface can operate from a clock which is asynchronous to both the address generator and to the clocks of the blocks which data is passed from and to. Special techniques have been used to handle this asynchronous nature of the operation.

Data is typically transferred between the DRAM interface and the rest of the chip in blocks of 64 bytes (the only exception being prediction data in the temporal decoder). Transfers take place by means of a device known as a "swing buffer". This is essentially a pair of RAMs operated in a double-buffered configuration, with the DRAM interface filling or emptying one RAM while another part of the chip empties or fills the other RAM. A separate bus which carries an address from an address generator is associated with each swing buffer.

Each of the chips has four swing buffers, but the function of these swing buffers is different in each case. In the spatial decoder, one swing buffer is used to transfer coded data to the DRAM, another to read coded data from the DRAM, the third to transfer tokenized data to the DRAM and the fourth to read tokenized data from the DRAM. In the temporal decoder, one swing buffer is used to write intra or predicted picture data to the DRAM, the second to read intra or predicted data from the DRAM and the other two to read forward and backward prediction data. In the video formatter, one swing buffer is used to transfer data to the DRAM and the other three are used to read data from the DRAM, one for each of luminance (Y) and the red and blue color difference data (Cr and Cb).

The following section describes the operation of a hypothetical DRAM interface which has one write swing buffer and one read swing buffer, which is essentially the same as the operation of the spatial decoder DRAM interface. This is illustrated in FIG. 18.

Figure 18:
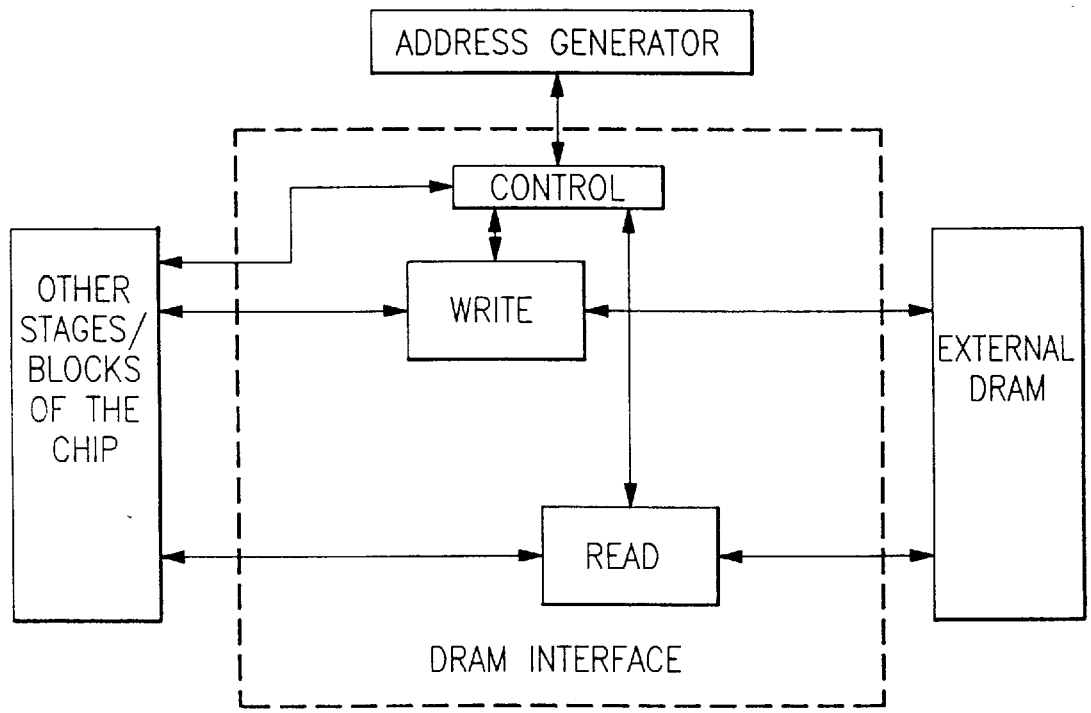
FIG. 18 is a block diagram of the decoder DRAM interface.

Referring to FIG. 18, the control interfaces between the address generator, the DRAM interface, and the remaining blocks of the chip which supply and take the data are all two wire interfaces. The address generator may either generate addresses as the result of receiving control tokens, or it may merely generate a fixed sequence of addresses (e.g., the FIFO buffers of the spatial decoder). The DRAM interface treats the two wire interfaces with the address generator in a special way. Instead of keeping the accept line high when it is ready to receive an address, it waits for the address generator to supply a valid address, processes that address and then sets the accept line high for one clock period. Thus, it implements a request/acknowledge (REQ/ACK) protocol.

A unique feature of the DRAM interface is its ability to communicate independently with the address generator and with the blocks which provide or accept the data. For example, the address generator may generate an address associated with the data in the write swing buffer, but no action will be taken until the write swing buffer signals that there is a block of data ready to be written to the external DRAM. Similarly, the write swing buffer may contain a block of data which is ready to be written to the external DRAM, but no action is taken until an address is supplied on the appropriate bus from the address generator. Further, once one of the RAMs in the write swing buffer has been filled with data, the other may be completely filled and "swung" to the DRAM interface side before the data input is stalled (the two-wire interface accept signal set low).

In understanding the operation of the DRAM interface, it is important to note that in a properly configured system, the DRAM interface will be able to transfer data between the swing buffers and the external DRAM at least as fast as the sum of all the average data rates between the swing buffers and the rest of the chip.

Each DRAM interface contains a method of determining which swing buffer it will service next. In general, this will either be a "round robin" (i.e., the swing buffer which is serviced is the next available swing buffer which has least recently had a turn), or a priority encoder, (i.e., in which some swing buffers have a higher priority than others). In both cases, an additional request will come from a refresh request generator which has a higher priority than all the other requests. The refresh request is generated from a refresh counter which can be programmed via the microprocessor interface.

Figure 19:
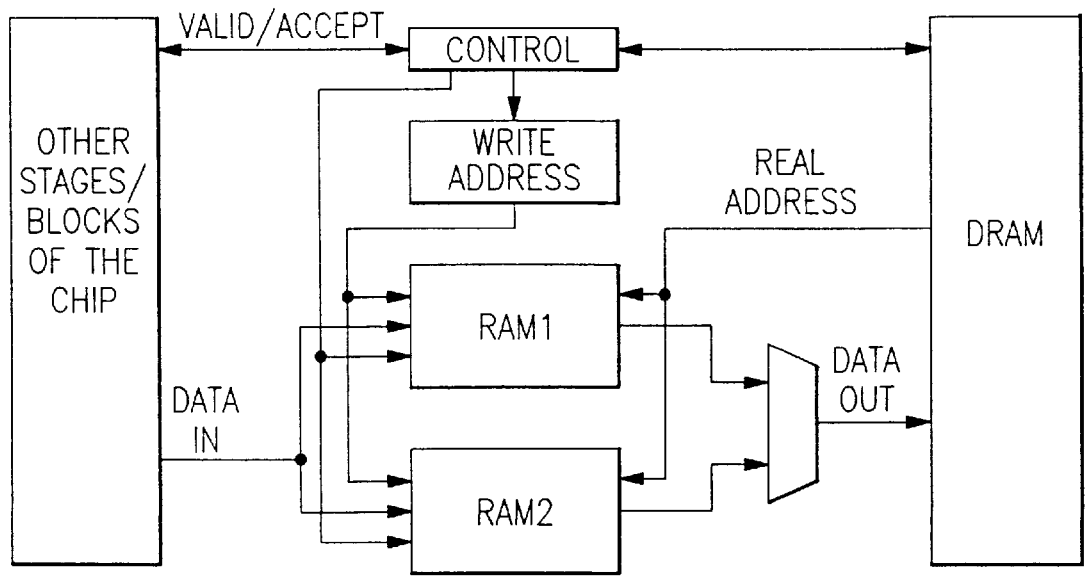
FIG. 19 is a block of a write swing buffer.

Referring now to FIG. 19, there is shown a block diagram of a write swing buffer. The write buffer interface includes two blocks of RAM, RAM1 and RAM2. As discussed further herein, data is written into RAM1 and RAM2 from the previous block or stage, under the control of the write address and control. From RAM1 and RAM2, the data is written into DRAM. When writing data into DRAM, the DRAM row address is provided by the address generator, and the column address is provided by the write address and control, as described further herein. In operation, valid data is presented at the input (data in). The data is received from the previous stage. As each piece of data is accepted by the DRAM interface, it is written into RAM1 and the write address control increments the RAM1 address to allow the next piece of data to be written into RAM1. Data continues to be written into RAM1 until either there is no more data, or RAM1 is full. When RAM1 is full, the input side gives up control and sends a signal to the read side to indicate that RAM1 is now ready to be read. This signal passes between two asynchronous clock regimes, and so passes through three synchronizing flip flops.

Provided RAM2 is empty, the next item of data to arrive on the input side is written into RAM2, otherwise, this occurs when RAM2 has emptied. When the round robin or priority encoder (depending on which is used by the particular chip) indicates that it is now the turn of this swing buffer to be read, the DRAM interface reads the contents of RAM1 and writes them to the external DRAM. A signal is then sent back across the asynchronous interface, to indicate that RAM1 is now ready to be filled again.

If the DRAM interface empties RAM1 and "swings" it before the input side has filled RAM2, then data can be accepted by the swing buffer continually. Otherwise, when RAM2 is filled, the swing buffer will set its accept single low until RAM1 has been "swung" back for use by the input side.

The operation of a read swing buffer is similar, but with the input and output data busses reversed.

The DRAM interface is designed to maximize the available memory bandwidth. Each 8×8 block of data is stored in the same DRAM page. In this way, full use can be made of DRAM fast page access modes, where one row address is supplied followed by many column addresses. In particular, row addresses are supplied by the address generator, while column addresses are supplied by the DRAM interface, as discussed further below.

In addition, the facility is provided to allow the data bus to the external DRAM to be 8, 16 or 32 bits wide, so that the amount of DRAM can be matched to the size and band width requirements of the particular application.

In this example (which is exactly how the DRAM interface on the spatial decoder works) the address generator provides the DRAM interface with block addresses for each of the read and write swing buffers. This address is used as the row address for the DRAM. The six bits of column address are supplied by the DRAM interface itself, and these bits are also used as the address for the swing buffer RAM. The data bus to the swing buffers is 32 bits wide, so if the bus width to the external DRAM is less than 32 bits, two or four external DRAM accesses must be made before the next word is read from a write swing buffer or the next word is written to a read swing buffer (read and write refer to the direction of transfer relative to the external DRAM).

The situation is more complex in the cases of the temporal decoder and the video formatter. The temporal decoder's addressing is more complex because of its predictive aspects as discussed further in this section. The video formatter's addressing is more complex because of multiple video output standard aspects, as discussed further in the sections relating to the video formatter.

As mentioned previously, the temporal decoder has four swing buffers: two are used to read and write decoded intra and predicted (I and P) picture data: these operate as described above. The other two are used to fetch prediction data; these buffers are more interesting.

Figure 20:
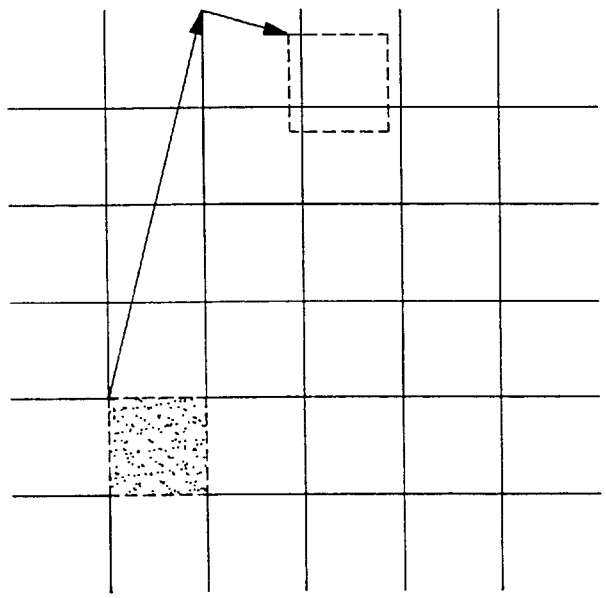
FIG. 20 is a pictorial diagram illustrating prediction data offset from the block being processed.

In general, prediction data will be offset from the position of the block being processed as specified in the motion vectors in x and y. Thus, the block of data to be fetched will not generally correspond to the block boundaries of the data as it was encoded (and written into the DRAM). This is illustrated in FIG. 20, where the shaded area represents the block that is being formed whereas the dotted outline the block from which it is being predicted. The address generator converts the address specified by the motion vectors to a block offset (a whole number of blocks), as shown by the big arrow, and a pixel offset, as shown by the little arrow.

In the address generator, the frame pointer, base block address and vector offset are added to form the address of the block to be retrieved from the DRAM. If the pixel offset is zero only one request is generated. If there is an offset in either the x or y dimension then two requests are generated—the original block address and the one either immediately below. With an offset in both x and y, four requests are generated. For each block which is to be fetched, the address generator calculates start and stop addresses is best illustrated by an example, and is outlined below.

Figure 21:
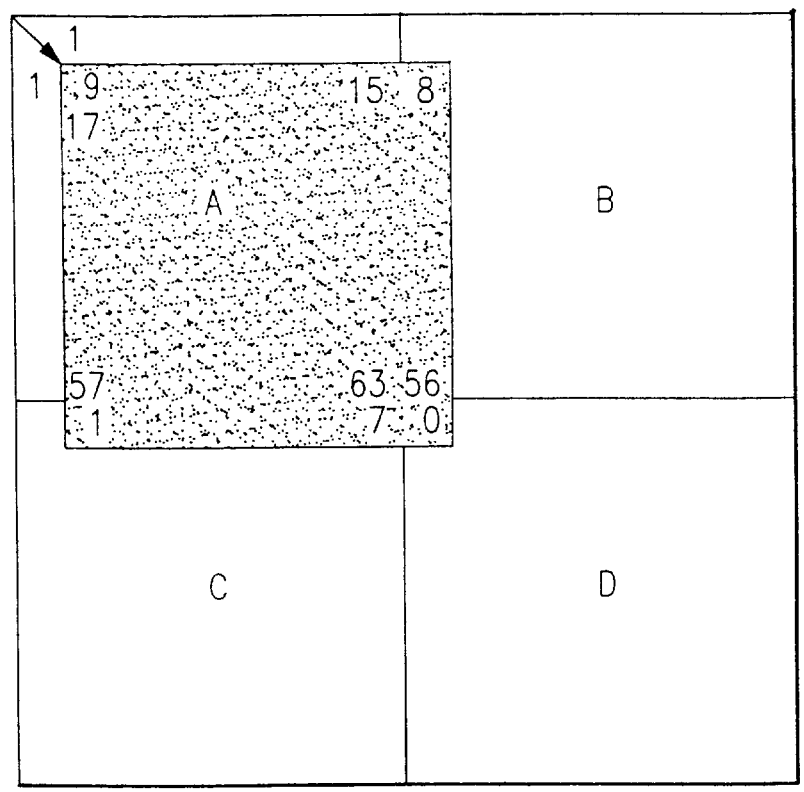
FIG. 21 is a pictorial diagram illustrating prediction data offset by (1,1)

Consider a pixel offset of (1,1), as illustrated by the shaded area in FIG. 21. The address generator makes four requests, labeled A through D in FIG. 21. The problem to be solved is how to provide the required sequence of row addresses quickly. The solution is to use "start/stop" technology, and this is described below.

Consider block A in FIG. 21. Reading must start at position (1,1) and end at position (7,7). Assume for the moment that one byte is being read at a time (i.e., an 8 bit DRAM interface). The x value in the co-ordinate pair forms the three LSBs of the address, the y value the three MSBs. The x and y start values are both 1, providing the address 9. Data is read from this address and the x value is incremented. The process is repeated until the x value reaches its stop value, at which point, the y value is incremented by 1 and the x start value is reloaded, giving an address of 17. As each byte of data is read the x value is again incremented until it reaches its stop value. The process is repeated until both x and y values have reached their stop values. Thus, the address sequence of 9, 10, 11, 12, 13, 14, 15, 17 . . . , 23, 25, . . . , 31, 33, . . . , . . . , 57, . . . , 63 is generated.

In a similar manner, the start and stop co-ordinates for block B are: (1,0) and (7,0), for block C: (0,1) and (0,7), and for block D: (0,0) and (0,0).

The next issue is where this data should be written. Clearly, looking at block A, the data read from address 9 should be written to address 0 in the swing buffer, the data from address 10 to address 1 in the swing buffer, and so on. Similarly, the data read from address 8 in block B should be written to address 15 in the swing buffer and the data from address 16 into address 15 in the swing buffer. This function turns out to have a very simple implementation, outlined below.

Consider block A. At the start of reading, the swing buffer address register is loaded with the inverse of the stop value, the y inverse stop value forming the 3 MSBs and the x inverse stop value forms the 3 LSBs. In this case, while the DRAM interface is reading address 9 in the external DRAM, the swing buffer address is zero. The swing buffer address register is then incremented as the external DRAM address register is incremented.

The discussion so far has centered on an 8 bit DRAM interface. In the case of a 16 or 32 bit interface a few slight modifications must be made. First, the pixel offset vector must be "clipped" so that it points to a 16 or 32 bit boundary.

In the example we have been using, for block A, the first DRAM read will point to address 0, and data in addresses 0 through 3 will be read. Next, the unwanted data must be discarded. This is performed by writing all the data into the swing buffer (which must now be physically bigger than was necessary in the 8 bit case) and reading with an offset. When performing MPEG half-pel interpolation, 9 bytes in x and/or y must be read from the DRAM interface. In this case the address generator provides the appropriate start and stop addresses and some additional logic in the DRAM interface is used, but there is no fundamental change in the way the DRAM interface operates.

The final point to note about the Temporal decoder DRAM interface is that additional information must be provided to the prediction filters to indicate what processing is required on the data. This consists of the following:

- a "last byte" signal indicating the last byte of a transfer (of 64,72 or 81 bytes);
- an H.261 flag;
- a bidirectional prediction flag;
- two bits to indicate the block's dimensions (8 or 9 bytes in x and y); and
- a two bit number to indicate the order of the blocks.

The last byte flag can be generated as the data is read out of the swing buffer. The other signals are derived from the address generator and are piped through the DRAM interface so that they are associated with the correct block of data as it is read out of the swing buffer by the prediction filter block.

In the video formatter data is written into the external DRAM in blocks but is read out in raster order. Writing is exactly the same as already described for the spatial decoder, but reading is a little more complex.

The data in the video formatter external DRAM is organized so that at least 8 blocks of data fit into a single page. These 8 blocks are 8 consecutive horizontal blocks. When rasterizing, 8 bytes need to be read out of each of 8 consecutive blocks and written into the swing buffer (i.e. the same row in each of the 8 blocks).

Considering the top row (and assuming a byte-wide interface), the x address (the three LSBS) is set to zero, as is the y address (3 MSBS). The x address is then incremented as each of the first 8 bytes are read out. At this point the top part of the address (bit 6 and above–LSB=bit 0) is incremented and the x address (3 LSBS) is reset to zero. This process is repeated until 64 bytes have been read. With a 16 or 32 bit wide interface to the external DRAM the x address is merely incremented by two or four instead of by one.

The address generator can signal to the DRAM interface that less than 64 bytes should be read (this may be required at the beginning or end of a raster line), although a multiple of 8 bytes is always read. This is achieved by using start and stop values. The start value is used for the top part of the address (bit 6 and above), and the stop value is compared with this and a signal generated which indicates when reading should stop.

The DRAM interface timing block uses timing chains to place the edges of the DRAM signals to a precision of a quarter of the system clock period. Two quadrature clocks from the phase locked loop are used. These are combined to form a notional 2x clock. Any one chain is then made from two shift registers in parallel, on opposite phases of the 2x clock.

First of all, there is one chain for the page start cycle and another for the read/write/refresh cycles. The length of each cycle is programmable via the microprocessor interface, after which the page start chain has a fixed length, and the cycle chain's length changes as appropriate during a page start.

On reset, the chains are cleared and a pulse is created. The pulse travels along the chains and is directed by the state information from the DRAM interface. The pulse generates the DRAM interface clock. Each DRAM interface clock period corresponds to one cycle of the DRAM. Thus, as the DRAM cycles have different lengths, the DRAM interface clock is not at a constant rate.

Further timing chains combine the pulse from the above chains with the information from DRAM interface to generate the output strobes and enables such as notcas, notras, notwe, notbe.

PREDICTION FILTERS

Figure 22:
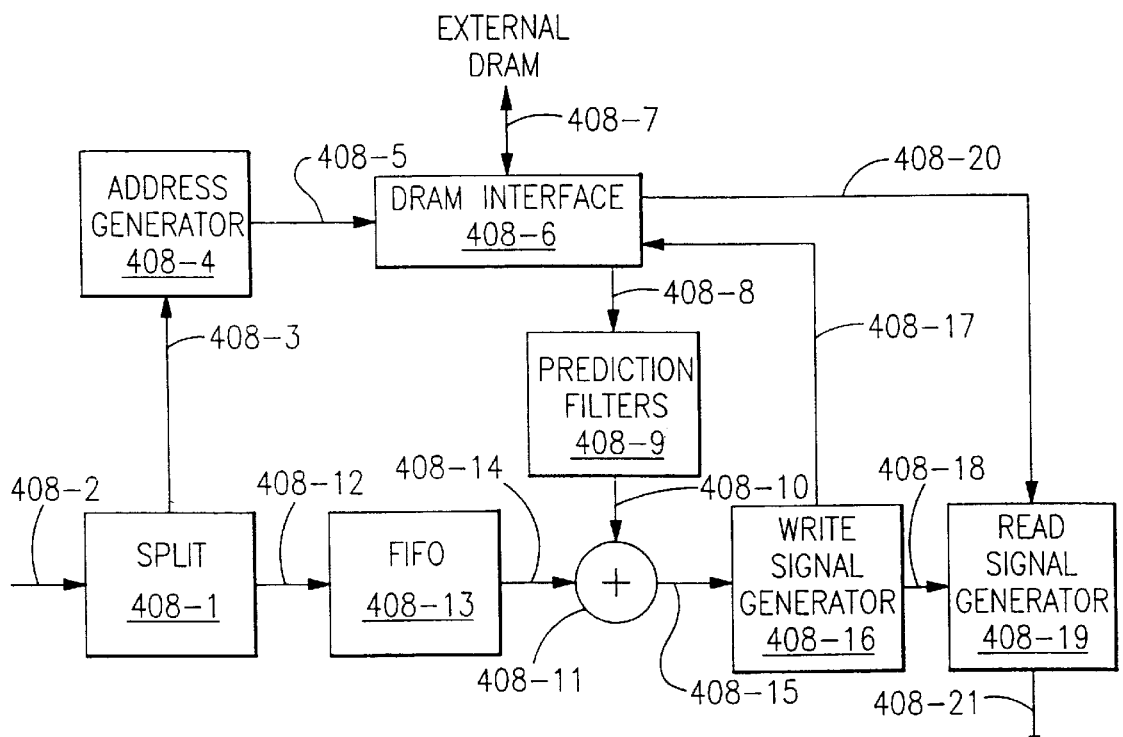
FIG. 22 is a block diagram of the temporal decoder including the prediction filters.
Figures 23, 24:
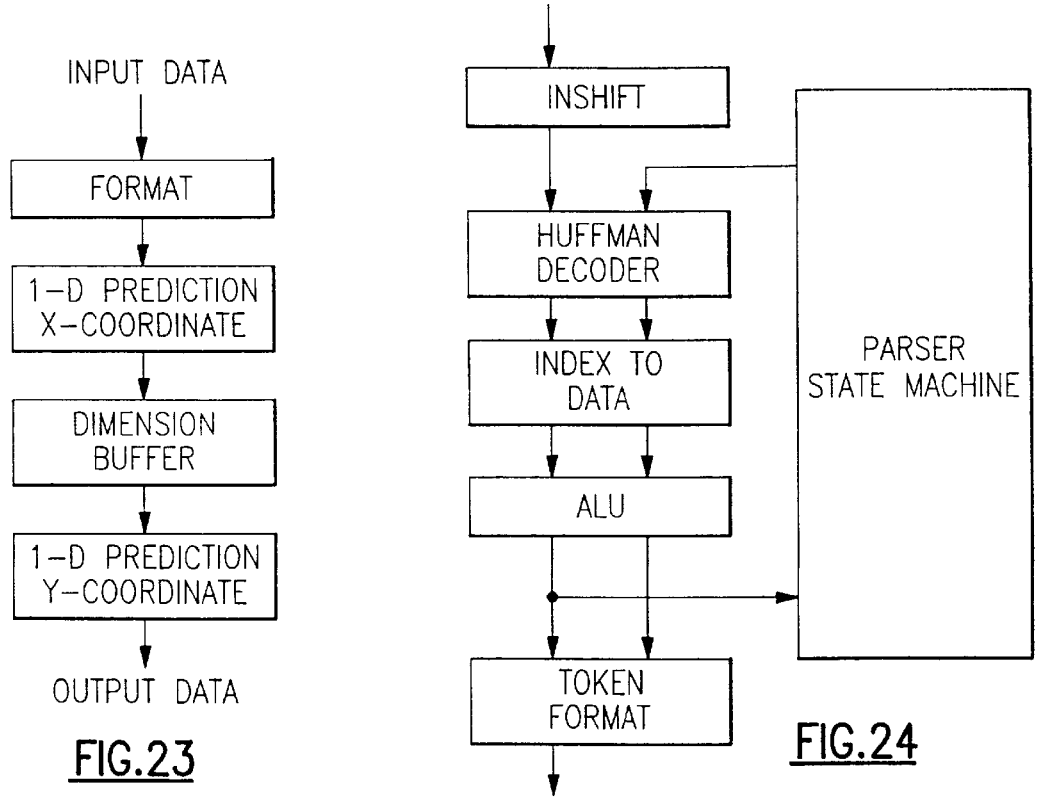
FIG. 23 is a block diagram illustrating the prediction filter.
FIG. 24 is a block diagram illustrating the Huffman decoder and parser state machine of the spatial decoder.

Referring now to FIGS. 3, 22, and 10, in FIG. 3, there is shown a block diagram of the temporal decoder, including the prediction filter. The relationship between the prediction filter and the rest of the elements of the temporal decoder is shown in greater detail in FIG. 22. The essence of the structure of the prediction filter is shown in FIGS. 10 and 23. A detailed description of the operation of the prediction filter can be found in the section, "More Detailed Description of the Invention."

In brief, the prediction filter is used in the MPEG and H.261 modes, but not in the JPEG mode. Recall that in the JPEG mode, the temporal decoder just passes the data through to the video formatter, without performing any substantive decoding beyond that accomplished by the spatial decoder. Referring now to FIG. 10, in the MPEG mode the forward and backward prediction filters are identical and filter the respective MPEG forward and backward prediction blocks. In the H.261 mode, only the forward prediction filter is used, since H.261 does not use backward prediction.

Each of the two prediction filters of the present invention is substantially the same. Referring now to FIGS. 10 and 23, there is shown in FIG. 23 a block diagram of the structure of a prediction filter. Each prediction filter consists of four blocks in series.

Data enters the format block, and is placed in a form that can be readily filtered. In the next block an I-D prediction is performed on the X-coordinate. After the necessary transposition is performed by the dimension buffer block, an I-D prediction is performed on the Y-coordinate. How the blocks perform the filtering is described in detail in the section entitled, "More Detailed Description of the Invention." What filtering operations are required are defined by the standard. In the case of H.261, the actual filtering performed is akin to that of a low pass filter.

Referring now to FIG. 22, multi-standard operation requires that the prediction filters be configurable to perform either MPEG or H.261 filtering, orto perform no filtering at all in JPEG mode. As with many other configurable aspects of the three chip system, the prediction filter is configured by means of tokens. Tokens are also used to inform the address generator of the particular mode of operation, so that the address generator can supply the prediction filter with the addresses of the needed data, which varies significantly between MPEG and JPEG.

ACCESSING REGISTERS

Most registers in the MPI can only be modified if the block with which they are associated is stopped, so groups of registers will typically be associated with an access register. The value zero in an access register indicates that the group of registers associated with that access register should not be modified, writing 1 to an access register requests that a block be stopped. The block may not stop immediately, a blocks access register will hold the value zero until it is stopped.

Any user software associated with the MPI to perform functions by way of the MPI should wait "after writing a 1 to a request access register" until 1 is read from the access register. If a user writes a value to a configuration register while its access register is set to zero the results are undefined.

MICRO-PROCESSOR INTERFACE

A standard byte wide micro-processor interface (MPI) is used on all circuits with in the spatial decoder and temporal decoder blocks. The MPI operates asynchronously with various spatial and temporal decoder clocks.

KEYHOLE ADDRESS LOCATIONS

Certain less frequently accessed memory map locations have been placed behind keyhole registers. A keyhole register has two registers associated with it, the first such register is a keyhole address register and the second register is a keyhole data register. The keyhole address specifies a location within an extended address space.

A read or a write operation to a keyhole data register accesses the locations specified by the keyhole address register. After accessing a keyhole data register the associated keyhole address register increments. Random access within the extended address space is only possible by writing in new value to the keyhole address register for each access. A circuit within the present invention may have more than one keyhole memory maps. There is no interaction between the different keyholes.

PICTURE-END

The picture-end function has the multi-standard advantage of being able to handle H.261 encoded picture information and MPEG as well as JPEG signals.

As previously described, each of the functional blocks is arranged to operate according to the state machine configuration shown with reference to FIG. 1.

In general, the picture-end function begins at the start-code detector which generates a picture-end control token. The picture-end control token is passed unaltered through the start-up control circuit, as previously described, because the start up control circuit does not react to the picture-end token. However, the picture-end control token passes along the DRAM interface and is used to flush out the write swing buffers in the DRAM interface. Normally, the contents of a swing buffer are only written to RAM when the buffer is full. However, a picture may end at a point where the buffer is not full, causing the picture data to become stuck. The picture-end token forces the data out of the swing buffer. Since the present invention is a multi-standard machine, the machine operates differently for each standard.

More specifically, the machine is fully described as operating pursuant to machine-dependent action cycles. For each standard, a selected number of the total available action cycles can be selected by a combination of control tokens and/or output signals from the MPU or can be selected by the design of the control tokens themselves. The H.261 standard is not bothered by an undefined end of picture. However, the present invention is organized to delay the information going into later blocks until all of the information has been collected in an upstream block and is uniquely prepared for application to the downstream block. Therefore, the picture-end signal is applied to the coded data buffer, and the control portion of the picture-end signal causes the contents of the data buffers to be read and applied to the Huffman decoder and video demultiplexer circuit.

Another advantage of the picture-end control token is to identify, for the use by the Huffman decoder demultiplexer, the end of picture even though it has not had the normal expected full range and/or number of signals ready to be applied to the Huffman decoder and video demultiplexer circuit. In this situation, the information held in the coded data buffer is applied to the Huffman decoder and video demultiplexer as a total picture, and the state machine of the Huffman decoder and video demultiplexer must handle it according to its system design. Another advantage of the picture-end control token is to completely empty the coded data buffer so that no stray information will be inadvertently left to remain in the off chip DRAM or in the swing buffers which provide the entry to the off chip DRAM as driven by the DRAM interface.

Another advantage of the picture-end function is its use in error recovery. For example, the amount of data being held in the coded data buffer is less than is normally used for describing the spatial information with reference to a single picture. Therefore, in one of the standard decoding/decompression techniques, the last picture will be held in the data buffer until it gets a full swing buffer. However, by definition, the buffer will never fill, and at some point the machine will determine that an error condition exits. So to the extent that a picture-end token is decoded and forces the data in the coded data buffers to be applied to the Huffman decoder and video demultiplexer, the final picture can be decoded and the information emptied from the buffers. The machine will not go into error recovery mode and successfully continues to process the codes data.

A further advantage in the use of a picture-end token is that the serial pipeline processor continues the processing of interrupt data. Through the use of a picture-end token, the serial pipeline processor is made to handle less than the expected amount of data and to continue processing. Usually, a prior art machine stops itself because of an error condition. As previously mentioned, we have described how the coded data buffer is counting macroblocks as they come into its storage areas. Also, the Huffman decode and video demultiplexer knows the extent of the information expected for decoding each picture. The state machine portion of the Huffman decode and video demultiplexer knows the number of blocks that it will process during each picture recovery cycle and when the incorrect number of blocks do not come from the coded data buffer, it would ordinarily go into its error recovery routine. However, with the picture-end control token having reconfigured the Huffman decode and video demultiplexer, it then continues functioning because the reconfiguration tells the Huffman decode and video demultiplexer that it is handling the proper amount of information.

Referring again to FIG. 1, the token decoder portion of the buffer manager detects the picture-end control token generated by the start code detector. Under normal operations, the buffer registers fill up and are emptied, as previously described with reference to the normal operation of the swing buffers. Normally, swing buffers are organized in pairs; the one fills up and swings while the empty one fills up as the full one is emptying in a flip-flop manner. The swing buffer which is partially full of data will not empty until it is totally filled and knows that it is time to empty. The picture-end control token is decoded in the token decode portion of the buffer manager, and forces the partially full swing buffer to empty itself into the coded data buffer, and ultimately to the Huffman decode and video demultiplexer either directly or through the DRAM interface.

FLUSHING OPERATION

A further advantage of the picture-end control token is its operation with a flush token. The flush token is not associated with either controlling the reconfiguration of the state machine or in providing data for the system, but only in completing prior partial signals for handling by the machine-dependent state machines. Each of the state machines recognizes a flush control token as information not to be processed. Accordingly, the flush token is used to fill up all of the remaining empty parts of the coded data buffers and allow a full set of information to be sent to the Huffman Decode and video demultiplexer.

The token decoder in the Huffman circuit will recognize the flush token and will ignore the pseudo data that the flush token forced into it. The Huffman decoder will then operate only on the data contents of the last picture buffer as it existed prior to the arrival of the picture-end token and flush token. A further advantage of the use of the picture-end tokens alone or in combination with a flush token is the reconfiguration and/or reorganization of the Huffman decode circuit. With the arrival of the picture-end token, the Huffman Decoder circuit knows that it will have less information than normally expected to decode the last picture. The Huffman decode circuit finishes processing the information contained in the last picture of the pictures, and outputs this information through the DRAM interface into the inverse modeler: Upon the identification of the last picture, the Huffman decoder goes into its cleanup mode and readjusts for the arrival of the next picture information.

FLUSH FUNCTION

The first token is used to pass through the entire pipeline processor and ensure that the buffers are emptied and other circuits are reconfigured to await the arrival of new data. More specifically, the present invention comprises a combination of a picture-end token, a padding word and a flush token indicating to the serial pipeline processor that the picture processing for the current picture form is completed. Thereafter, the various state machines need reconfiguring to await the arrival of new data for new handling.

STOP-AFTER PICTURE

The stop-after picture function is employed to shut down the processing of the serial pipeline decompressing circuit at a logical point in its operation. At this point, a picture-end token is generated indicating that data is finished coming in from the data input line, and the padding operation has been completed. The padding function fills partially empty data tokens. A flush token is then generated which passes through the serial pipeline system and pushes all the information out of the registers and forces the registers back into their neutral stand-by condition. The stop-after picture event is then generated and no more input is accepted until either the user or the system clears this state.

MULTI-STANDARD—SEARCH MODE

Another aspect of the present invention is the use of a search mode control token which is used to reconfigure the input to the serial pipeline processor to look at the incoming bitstream. When the search mode is set, the start-code detector searches only for a specific start-code or marker used in any one of the standards. Obviously, other images from other data bitstreams can be used for this purpose and can be used throughout this present invention, changing it from operation from the preferred embodiment to any other embodiment which is capable of use by the combination of control tokens, and data tokens along with the reconfiguration circuits provided.

The use of search mode is convenient in many situations including 1) if a break in the data bit stream occurs; 2) when the user breaks the data bitstream by purposely changing channels, arriving, for example, by a cable carrying compressed digital video; or 3) by user who activates fast forward or reverse from a controllable data source such as an optical disc or video disc. In general, a search mode is convenient when the user interrupts the normal processing of the serial pipeline at a point where the machine does not expect such an interruption.

When any of the search modes are set, the start code detector looks for incoming start images which are suitable for creating the machine independent tokens. All data coming into the start code detector prior to the identification of standard-dependent start images is discarded as meaningless and the machine stands in an idling condition waiting for this information.

The start code detector can be configured into any one of a number of configurations. For example, one of these conditions would be a search for a group of pictures or higher start-codes. This pattern would cause the start-code detector to discard all its input and look for the group-start standard image. When such an image is identified, the SAD generates a group-start token and the search mode is reset automatically.

It is important to note that a single circuit, the Huffman Decode and video demultiplexer circuit, is operating with a combination of input signals including the standard-independent set-up signals as well as the coding standard signals. The coding standard signals are conveying information directly from the incoming bitstream as required by the Huffman Decoder and video demultiplexer circuit, while the functioning of the Huffman decode and video demultiplexer circuit is under the operation of the standard independent sequence of signals.

This mode of operation has been selected because it is the most efficient and could have been designed wherein special control tokens are employed for conveying the standard-dependent input to the Huffman Decoder and video demultiplexer instead of conveying the actual signals themselves.

INVERSE MODELER

Inverse modeling is a feature of all three standards, and is the same for all three standards. In general, Data tokens in the token buffer contain information about the values of the quantized coefficients, and about the number of zeros between the coefficients that are represented (a form of run length coding). The inverse modeler simply expands the information about runs of zeros so that each Data token contains the requisite 64 values. Thereafter, the values in the Data Tokens are quantized coefficients which can be used by the Inverse Quantizer.

INVERSE QUANTIZER

The inverse quantizer is a required element in the decoding sequence, but has been implemented in such a way to allow the entire IC set to handle multi-standard data. The inverse quantizer lies between the inverse modeler and inverse DCT (IDCT).

For example, in the present invention, an adder in the inverse quantizer is used to add a constant to the pel decode number before the data moves on to the IDCT.

The IDCT uses the pel decode number, which will vary according to each standard used to encode the information. In order for the information to be properly decoded, a value of 1024 is added to the decode number by the Inverse Quantizer before the data continues on to the IDCT.

Using adders, already present in the inverse quantizer, to standardize the data prior to it reaching the IDCT, eliminates the need for additional circuitry or software in the IC, for handling data compressed by the various standards. Other operations allowing for multi-standard operation are performed during a "post quantization function" and are discussed below.

The control tokens accompanying the data are decoded and the various standardization routines that need to be performed by the inverse quantizer are identified in detail below. These "post quantization" functions are all implemented to avoid duplicate circuitry and to allow the IC to handle multi-standard encoded data.

HUFFMAN DECODER AND PARSER

Referring now to FIGS. 2 and 24, the spatial decoder includes a Huffman decoder for decoding the data that the various standards require to be Huffman encoded. While each of the standards, JPEG, MPEG and H.261, require certain data to be Huffman encoded, the Huffman decoding required by each standard differs in some significant ways. For the spatial decoder chip, rather than design and fabricate three separate Huffman decoders, one for each standard, the present invention saves valuable die space by identifying common aspects of each Huffman decoder, and fabricating these common aspects only once. Moreover, a clever multi-part algorithm is used that makes common more aspects of each Huffman decoder than would otherwise be the case.

In brief, the Huffman decoder works in conjunction with the other blocks shown in FIG. 24. These other blocks are the parser state machine, in shift, index to data, ALU, and token formatter. Connection between these blocks is governed by a two wire interface. A more detailed description of how these blocks function together to decode Huffman coded data is described in the section entitled, "More Detailed Description of the Invention." In this section, focus will be on particular aspects of the Huffman decoder that support multi-standard operation.

The parser state machine is a programmable state machine that acts to coordinate the operation of the other blocks. In response to data, the parser state machine controls the other blocks by generating a control word which is passed to the other blocks, side by side with the data upon which this control word acts. Passing the control word alongside the associated data is not only useful, it is essential, since these blocks are connected via a two-wire interface. The passing of the control word is indicated in FIG. 24 by a control line that runs beneath the data line that connects the blocks. Among other things, this code word identifies the particular standard that is being decoded.

The Huffman decoder also performs certain control functions. In particular, the Huffman decoder contains a state machine that can control certain functions of the index to data and ALU blocks. Control of these blocks by the Huffman decoder is necessary for proper decoding of block-level information, since having the parser state machine make these decisions would take too much time.

An important aspect of the Huffman decoder is the ability to invert the coded data bits as they are read into the Huffman decoder. This is needed to decode H.261 style Huffman codes, since the particular type of Huffman code used by H.261 (and substantially by MPEG) has the opposite polarity from the codes used by JPEG. The use of an inverter thereby allows substantially the same table to be used by the Huffman decoder for all three standards. Other aspects of how the Huffman decoder implements all three standards are discussed in further detail in the "More Detailed Description of the Invention" section.

The index to data block performs the second part of the multi-part algorithm. This block contains a look up table that provides the actual Huffman decoded data. Entries in the table are organized based on the index numbers generated by the Huffman decoder block.

The ALU implements the remaining parts of the multi-part algorithm. In particular, the ALU handles sign-extension. The ALU also includes a register file which holds vector predictions and DC predictions, the use of which is described in the sections related to prediction filters. The ALU further includes counters that count through the structure of the picture being decoded by the spatial decoder. In particular, the dimensions of the picture are programmed into registers associated with the counters, which facilitates detection of "start of picture," and start of macroblock codes.

The token formatter (TF) assembles decoded data into tokens that are passed onto the remaining stages or blocks in the spatial decoder.

The shift receives data from a FIFO that buffers the data passing through the start code detector. The data received by the in shift is generally of two types: data tokens, and start codes which the start code detector has replaced by their respective tokens, as discussed further in the token section. Most of the data will be data tokens that require decoding.

In shift serially sends data to the Huffman decoder. In the Huffman decoder, the Huffman encoded data is decoded in accordance with the first part of the multi-part algorithm. In particular, the particular Huffman code is identified, and then replaced with an index number.

The Huffman decoder also identifies certain data that requires special handling by the other blocks in FIG. 24. This data includes end of block and escape. Time is saved by detecting these in the Huffman decoder, rather than in the index to data.

This index number is then passed to the index to data block. In essence, the index to data block is a table look-up. In accordance with one aspect of the algorithm, the look-up table is little more than the Huffman code table specified by JPEG, but in the condensed data format that JPEG specifies for transferring an alternate JPEG table.

From the index to data block, the decoded index number or other data is passed, together with the accompanying control word, to the ALU, which performs the operations previously described.

From the ALU, the data and control word is passed to the token formatter (TF). In the token formatter, the data is combined as needed with the control word to form tokens. The tokens are then conveyed to the next stages of the spatial decoder.

INVERSE DISCRETE COSINE TRANSFORM

The inverse discrete cosine transform (IDCT) decompresses data related to the frequency of the DC component of the picture. When a particular picture is being compressed, the frequency of the light in the picture is quantized, reducing the overall amount of information needed to be stored. The IDCT takes this quantized data and decompresses it back into frequency information.

The IDCT operates on a portion of the picture which is 8×8 pixels in size. The math which performed on this data is largely governed by the particular standard used to encode the data. However, in the invention described below in detail, significant use is made of common mathematical functions between the standards to avoid unnecessary duplication of circuitry.

Using a particular scaling order, the symmetry between the upper and lower portions of the algorithms is increased, thus common mathematical functions can be reused, eliminating the need for additional circuitry.

The IDCT responds to a number of multi-standard tokens. The first portion of the IDCT checks the data entering to be sure that the Data tokens are of the correct size for processing. The token stream can be corrected in some situations if the error is not too large.

BUFFER MANAGER

The buffer manager receives incoming video information and supplies the address generators with information on the timing of the data's arrival, display and frame rate. Multiple buffers are used to allow changes in both the presentation and display rates. Presentation and display rates will generally vary according to the data which was encoded and the monitor on which the information is being displayed. Data arrival rates will generally vary according to errors in encoding, decoding or the source material used to create the data.

When information arrives at the buffer manager it is decompressed, but is in an order that is useful for the decompression circuits, not for the particular display unit being used. When a block of data enters the buffer manager, the buffer manager supplies information to the address generator so that the block of data can be placed in the order that the display device can use. In doing this, the buffer manager takes into account the frame rate conversion necessary to adjust the incoming data blocks so they are presentable on the particular display device being used.

The buffer manager primarily supplies information to the address generators, but is also required to interface with other elements of the system. For example, there is an interface with an input FIFO which transfers tokens to the buffer manager which in turn passes these tokens on to the write address generators.

The buffer manager also interfaces with the display address generators, receiving information that the display device is ready to display new data. The buffer manager also confirms that the display address generators have cleared information from a buffer for display.

The buffer manager keeps track of whether a particular buffer is empty, full, ready for use or in use. It keeps track of the presentation number associated with the particular data in each buffer. When the buffer manager determines the states of the buffers in part by making only one buffer at a time ready for display. Once a buffer is displayed, the buffer is in a "vacant" state. When the buffer manager receives a picture start, flush, valid or access token, it determines the status of each buffer and its readiness to accept new data.

The picture-start token causes the buffer manager to cycle through each buffer to find one which is capable of accepting the new data.

The buffer manager can also be configured to handle the multi-standard requirements dictated by the tokens it receives. For example, in the H.261 standard data may be skipped during display. If such a token arrives at the buffer manager, the data to be skipped will be flushed from the buffer in which it is stored.

Thus, by managing the buffers, data can be effectively displayed according to the standard used to encode the data, the rate at which the data is decoded and the particular type of display device being used. Further details of implementation are discussed below.

What has been described is a multi-standard video decompressive apparatus having a plurality of stages interconnected by a two wire interface arranged as a pipeline processing machine. Control tokens and data tokens pass over the single two wire interface for carrying both control signals and data signals in token format. A token decode circuit is positioned in certain of the stages for recognizing certain of the tokens as control tokens pertinent to that stage and for passing unrecognized control tokens along the pipeline. Reconfiguration processing circuits are positioned in selected stages and are responsive to a recognized control token for reconfiguring such a stage to handle an identified data token.

An improved parser/video demultiplexer has improved microcode for handling multi-standard decoding and improved error recovery. The Huffman decoder operates pursuant to an improved algorithm. The parser state machine and its interaction with the Huffman decoder is an additional improvement in the present invention.

Within the Huffman decoder, data tokens go through the IDCT and high level control tokens pass through and set a reset thereafter. The parser operates to generate a control token from data and send such a token down stream. An example of this is the quantiser scale token. Improved table selection and table identification circuitry is described. The state machine inside the Huffman decoder, the input inverter, and the ALU sign-extension are all aspects of the present invention. The inverse quantiser operates in the multi-standard configuration and also operates to reorder the arithmetic operation.

Improved address generation has been described with reference to prediction requests, with reference to the operation of the swing buffer, for handling groups of block picture for multi-standard operation, and for writing in multi-standard mode and reading in the same standard as the write. A multi-standard interpolating filter is also described.

GLOSSARY

BLOCK: An 8-row by 8-column matrix of pels, or 64 DCT coefficients (source, quantised or dequantised).

CHROMINANCE (COMPONENT): A matrix, block or single pel representing one of the two colour difference signals related to the primary colours in the manner defined in the bitstream. The symbols used for the colour difference signals are Cr and Cb.

CODED REPRESENTATION: A data element as represented in its encoded form.

CODED VIDEO BITSTREAM: A coded representation of a series of one or more pictures as defined in this specification.

CODED ORDER: The order in which the pictures are transmitted and decoded. This order is not necessarily the same as the display order.

COMPONENT: A matrix, block or single pel from one of the three matrices (luminance and two chrominance) that make up a picture.

COMPRESSION: Reduction in the number of bits used to represent an item of data.

DECODER: An embodiment of a decoding process.

DECODING (PROCESS): The process defined in this specification that reads an input coded bitstream and produces decoded pictures or audio samples.

DISPLAY ORDER: The order in which the decoded pictures are displayed. Normally this is the same order in which they were presented at the input of the encoder.

ENCODING (PROCESS): A process, not specified in this specification, that reads a stream of input pictures or audio samples and produces a valid coded bitstream as defined in this specification.

INTRA CODING: Coding of a macroblock or picture that uses information only from that macroblock or picture.

LUMINANCE (COMPONENT): A matrix, block or single pel representing a monochrome representation of the signal and related to the primary colours in the manner defined in the bitstream. The symbol used for luminance is Y.

MACROBLOCK: The four 8 by 8 blocks of luminance data and the two (for 4:2:0 chroma format) four (for 4:2:2 chroma format) or eight (for 4:4:4 chroma format) corresponding 8 by 8 blocks of chrominance data coming from a 16 by 16 section of luminance component of the picture. Macroblock is sometimes used to refer to the pel data and sometimes to the coded representation of the pel values and other data elements defined in the macroblock header of the syntax in this part of this specification. The usage is clear from the context.

MOTION COMPENSATION: The use of motion vectors to improve the efficiency of the prediction of pel values. The prediction uses motion vectors to provide offsets into the past and/or future reference pictures containing previously decoded pel values that are used to form the prediction error signal.

MOTION VECTOR: A two-dimensional vector used for motion compensation that provides an offset from the coordinate position in the current picture to the coordinates in a reference picture.

NON-INTRA CODING: Coding of a macroblock or picture that uses information both from itself and from macroblocks and pictures occurring at other times.

PEL: Picture element.

PICTURE: Source, coded or reconstructed image data. A source or reconstructed picture consists of three rectangular matrices of 8-bit numbers representing the luminance and two chrominance signals. For progressive video, a picture is identical to a frame, while for interlaced video, a picture can refer to a frame, or the top or the bottom field of the frame depending on the context.

PREDICTION: The use of a predictor to provide an estimate of the pel value or data element currently being decoded.

SLICE: A series of macroblocks.

START CODES [SYSTEM AND VIDEO]: 32-bit codes embedded in that coded bitstream that are unique. They are used for several purposes including identifying some of the structures in the coding syntax.

VARIABLE LENGTH CODING; VLC: A reversible procedure for coding that assigns shorter code-words to frequent events and longer code-words to less frequent events.

VIDEO SEQUENCE: A series of one or more pictures.

SECTION A.1

This is the detailed description for a multi-standard video decoder chip-set. It is divided into three main sections:

Description of features common to chips in the chip-set:
Tokens
Two wire interfaces
DRAM interface
Microprocessor interface
Clocks
Description of the Spatial Decoder chip
Description of the Temporal decoder chip The first description section covers the majority of the electrical design issues associated with using the chip-set.

A.1.1 Typographic conventions

A small set of typographic conventions is used to emphasize some classes of information:
NAMES_OF_TOKENS
wire_name active high signal
wire_name active low signal
register_name SECTION A.2 Video Decoder Family
30 MHz operation
Decodes MPEG, JPEG & H.261
Coded data rates to 25 Mb/s
Video data rates to 21 MB/s
MPEG resolutions up to 704×480, 30 Hz, 4:2:0
Flexible chroma sampling formats
Full JPEG baseline decoding
Glue-less page mode DRAM interface
208 pin PQFP package
Independent coded data and decoder clocks
Re-orders MPEG picture sequence The Video decoder family provides a low chip count solution for implementing high resolution digital video decoders. The chip-set is currently configurable to support three different video and picture coding systems: JPEG, MPEG and H.261.

Full JPEG baseline picture decoding is supported. 720× 480, 30 Hz, 4:2:2 JPEG encoded video can be decoded in real-time.

CIF and QCIF H.261 video can be decoded. Full feature MPEG video with formats up to 740×480, 30 Hz, 4:2:0 can be decoded.

A.2.1 System configurations

A.2.1.1 Output formatting

In each of the examples given below, some form of output formatter will be required to take the data presented at the output of the Spatial Decoder or Temporal Decoder and re-format it for a computer or display system. The details of this formatting will vary significantly between applications. In a simple case all that is required is an address generator to take the block formatted data output by the decoder chip and write it into memory in a raster order.

The Image Formatter (under development) is a single chip VLSI device providing a wide range of output formatting functions.

A.2.1.2 JPEG still picture decoding

A single Spatial Decoder, with no-off-chip DRAM, can rapidly decode baseline JPEG images. The Spatial Decoder will support all features of baseline JPEG. However, the image size that can be decoded may be limited by the size of the output buffer provided by the user. The characteristics of the output formatter may limit the chroma sampling formats and color spaces that can be supported.

A.2.1.3 JPEG video decoding

Adding off-chip DRAMs to the Spatial Decoder allows it to decode JPEG encoded video pictures in real-time. The size and speed of the required buffers required will depend on the video and coded data rates. The Temporal Decoder is not required to decode JPEG encoded video. However, if a Temporal Decoder is present in a multi-standard decoder chip-set it will pass data through when configured for JPEG operation.

A.2.1.4 H.261 decoding

The Spatial Decoder and the Temporal Decoder are required to implement an H.261 video decoder. The DRAM interfaces on both devices are configurable to allow the quantity of DRAM required to be reduced when working with small picture formats and at low coded data rates. Typically, a single 4 Mb (e.g. 512 k×8) DRAM will be required by each of the Spatial Decoder and the Temporal Decoder.

A.2.1.5 MPEG decoding

The configuration required for MPEG operation is the same as for H.261. However, larger DRAM buffers may be required to support the larger picture formats possible with MPEG.

SECTION A.3 Tokens

A.3.1 Token format

Tokens provide an extensible format for communicating information through the decoder chip-set. Each word of a Token is a minimum of 8 bits wide. A single Token can be spread over one or more words.

The extension bit indicates if a Token continues into another word. It is set to 1 in all words of a Token except the last one. If the first word of a Token has an extension bit of 0 this indicates that the Token is only one word long.

Each Token is identified by an Address Field that starts in bit 7 of the first word of the Token. The Address Field is of variable length and can potentially extend over multiple words (in the current chips no address is more than 8 bits long).

Some interfaces transfer more than 8 bits of data. For example, the output of the Spatial Decoder is 9 bits wide (10 bits including the extension bit). The only Token that takes advantage of these extra bits is the Data Token. All other Tokens ignore the extra bits.

A.3.2 The Data Token

The Data Token carries data from one processing stage to the next. Consequently, the characteristics of this Token change as it passes through the decoder. For example, at the input of the Spatial Decoder, Data Tokens carry bit serial coded video data packed into 8 bit words. Here there is no limit to the length of each Token. In contrast at the output of the Spatial Decoder each Data Token carries exactly 64 words, each word is 9 bits wide.

A.3.3 Using Token formatted data

In some applications it may be necessary to design circuitry that connects directly to the output of the Spatial Decoder or Temporal Decoder. In most cases it will be sufficient to collect Data Tokens and to detect a few Tokens that provide synchronization information (such as PICTURE_START). See sections A.16, "Connecting to the output of Spatial Decoder", and section A.19, "Connecting to the output of the Temporal decoder".

It is sufficient to observe activity on the extension bit to identify when each new Token starts. At this time the Address field can be tested to identify the Token. Unwanted or unrecognized Tokens can be consumed (and discarded) without knowledge of their content.

The data input to the Spatial Decoder can either be supplied as bytes of coded data, or in Data Tokens (see Section A.10, "Coded data input"). Supplying Tokens via the coded data port or the microprocessor interface allows many of the features of the decoder chip set to be configured from the data stream. This provides an alternative to doing the configuration via the micro processor interface.

TABLE A.3.1

Summary of Tokens

| 7 | 6 | 5 | 4 | 3 | 2 | 1 | 0 | Token Name | Reference |
|---|---|---|---|---|---|---|---|---|---|
| 0 | 0 | 1 |   |   |   |   |   | QUANT_SCALE |   |
| 0 | 1 | 0 |   |   |   |   |   | PREDICTION_MODE |   |
| 0 | 1 | 1 |   |   |   |   |   | (reserved) |   |
| 1 | 0 | 0 |   |   |   |   |   | MVD_FORWARDS |   |
| 1 | 0 | 1 |   |   |   |   |   | MVD_BACKWARDS |   |
| 0 | 0 | 0 | 0 | 1 |   |   |   | QUANT_TABLE |   |
| 0 | 0 | 0 | 0 | 0 | 1 |   |   | DATA |   |
| 1 | 1 | 0 | 0 | 0 | 0 |   |   | COMPONENT_NAME |   |
| 1 | 1 | 0 | 0 | 0 | 1 |   |   | DEFINE_SAMPLING |   |
| 1 | 1 | 0 | 0 | 1 | 0 |   |   | JPEG_TABLE_SELECT |   |
| 1 | 1 | 0 | 0 | 1 | 1 |   |   | MPEG_TABLE_SELECT |   |
| 1 | 1 | 0 | 1 | 0 | 0 |   |   | TEMPORAL_REFERENCE |   |
| 1 | 1 | 0 | 1 | 0 | 1 |   |   | MPEG_DCH_TABLE |   |
| 1 | 1 | 0 | 1 | 1 | 0 |   |   | (reserved) |   |
| 1 | 1 | 0 | 1 | 1 | 1 |   |   | (reserved) |   |
| 1 | 1 | 1 | 0 | 0 | 0 | 0 |   | (reserved)SAVE_STATE |   |
| 1 | 1 | 1 | 0 | 0 | 0 | 1 |   | (reserved)RESTORE_STATE |   |
| 1 | 1 | 1 | 0 | 0 | 1 | 0 |   | TIME_CODE |   |
| 1 | 1 | 1 | 0 | 0 | 1 | 1 |   | (reserved) |   |
| 0 | 0 | 0 | 0 | 0 | 0 | 0 | 0 | NULL |   |
| 0 | 0 | 0 | 0 | 0 | 0 | 0 | 1 | (reserved) |   |
| 0 | 0 | 0 | 0 | 0 | 0 | 1 | 0 | (reserved) |   |
| 0 | 0 | 0 | 0 | 0 | 0 | 1 | 1 | (reserved) |   |
| 0 | 0 | 0 | 1 | 0 | 0 | 0 | 0 | SEQUENCE_START |   |
| 0 | 0 | 0 | 1 | 0 | 0 | 0 | 1 | GROUP_START |   |
| 0 | 0 | 0 | 1 | 0 | 0 | 1 | 0 | PICTURE_START |   |
| 0 | 0 | 0 | 1 | 0 | 0 | 1 | 1 | SLICE_START |   |
| 0 | 0 | 0 | 1 | 0 | 1 | 0 | 0 | SEQUENCE_END |   |

TABLE A.3.1-continued

Summary of Tokens

| 7 | 6 | 5 | 4 | 3 | 2 | 1 | 0 | Token Name | Reference |
|---|---|---|---|---|---|---|---|---|---|
| 0 | 0 | 0 | 1 | 0 | 1 | 0 | 1 | CODING_STANDARD | |
| 0 | 0 | 0 | 1 | 0 | 1 | 1 | 0 | PICTURE_END | |
| 0 | 0 | 0 | 1 | 0 | 1 | 1 | 1 | FLUSH | |
| 0 | 0 | 0 | 1 | 1 | 0 | 0 | 0 | FIELD_INFO | |
| 0 | 0 | 0 | 1 | 1 | 0 | 0 | 1 | MAX_COMP_ID | |
| 0 | 0 | 0 | 1 | 1 | 0 | 1 | 0 | EXTENSION_DATA | |
| 0 | 0 | 0 | 1 | 1 | 0 | 1 | 1 | USER_DATA | |
| 0 | 0 | 0 | 1 | 1 | 1 | 0 | 0 | DHT_MARKER | |
| 0 | 0 | 0 | 1 | 1 | 1 | 0 | 1 | DQT_MARKER | |
| 0 | 0 | 0 | 1 | 1 | 1 | 1 | 0 | (reserved)DNL_MARKER | |
| 0 | 0 | 0 | 1 | 1 | 1 | 1 | 1 | (reserved)DRI_MARKER | |
| 1 | 1 | 1 | 0 | 1 | 0 | 0 | 0 | (reserved) | |
| 1 | 1 | 1 | 0 | 1 | 0 | 0 | 1 | (reserved) | |
| 1 | 1 | 1 | 0 | 1 | 0 | 1 | 0 | (reserved) | |
| 1 | 1 | 1 | 0 | 1 | 0 | 1 | 1 | (reserved) | |
| 1 | 1 | 1 | 0 | 1 | 1 | 0 | 0 | BIT_RATE | |
| 1 | 1 | 1 | 0 | 1 | 1 | 0 | 1 | VBV_BUFFER_SIZE | |
| 1 | 1 | 1 | 0 | 1 | 1 | 1 | 0 | VBV_DELAY | |
| 1 | 1 | 1 | 0 | 1 | 1 | 1 | 1 | PICTURE_TYPE | |
| 1 | 1 | 1 | 1 | 0 | 0 | 0 | 0 | PICTURE_RATE | |
| 1 | 1 | 1 | 1 | 0 | 0 | 0 | 1 | PEL_ASPECT | |
| 1 | 1 | 1 | 1 | 0 | 0 | 1 | 0 | HORIZONTAL_SIZE | |
| 1 | 1 | 1 | 1 | 0 | 0 | 1 | 1 | VERTICAL_SIZE | |
| 1 | 1 | 1 | 1 | 0 | 1 | 0 | 0 | BROKEN_CLOSED | |
| 1 | 1 | 1 | 1 | 0 | 1 | 0 | 1 | CONSTRAINED | |
| 1 | 1 | 1 | 1 | 0 | 1 | 1 | 0 | (reserved)SPECTRAL_LIMIT | |
| 1 | 1 | 1 | 1 | 0 | 1 | 1 | 1 | DEFINE_MAX_SAMPLING | |
| 1 | 1 | 1 | 1 | 1 | 0 | 0 | 0 | (reserved) | |
| 1 | 1 | 1 | 1 | 1 | 0 | 0 | 1 | (reserved) | |
| 1 | 1 | 1 | 1 | 1 | 0 | 1 | 0 | (reserved) | |
| 1 | 1 | 1 | 1 | 1 | 0 | 1 | 1 | (reserved) | |
| 1 | 1 | 1 | 1 | 1 | 1 | 0 | 0 | HORIZONTAL_MBS | |
| 1 | 1 | 1 | 1 | 1 | 1 | 0 | 1 | VERTICAL_MBS | |
| 1 | 1 | 1 | 1 | 1 | 1 | 1 | 0 | (reserved) | |
| 1 | 1 | 1 | 1 | 1 | 1 | 1 | 1 | (reserved) | |

A.3.4 Description of Tokens

This section documents the Tokens implemented in the Spatial Decoder and Temporal Decoder chips.

Note:

"r" signifies bits that are currently reserved and carry the value 0 unless indicated all integers are unsigned

TABLE A.3.2

Tokens implemented in the Spatial Decoder and Temporal Decoder

| E | 7 | 6 | 5 | 4 | 3 | 2 | 1 | 0 | Description |
|---|---|---|---|---|---|---|---|---|---|
| 1 | 1 | 1 | 1 | 0 | 1 | 1 | 0 | 0 | BIT_RATE test info only |
| 1 | r | r | r | r | r | r | b | b | Carries the MPEG bit rate parameter R. Generated by the Huffman |
| 1 | b | b | b | b | b | b | b | b | decoder when decoding an MPEG bitstream. |
| 0 | b | b | b | b | b | b | b | b | b - an 18 bit integer as defined by MPEG |
| 1 | 1 | 1 | 1 | 1 | 0 | 1 | 0 | 0 | BROKEN_CLOSED |
| 0 | r | r | r | r | r | r | c | b | Carries two MPEG flags bits: c - closed_gop b - broken_link |
| 1 | 0 | 0 | 0 | 1 | 0 | 1 | 0 | 1 | CODING_STANDARD |
| 0 | s | s | s | s | s | s | s | s | s - an 8 bit integer indicating the current coding standard. The values currently assigned are: 0 - H.261 1 - JPEG 2 - MPEG |
| 1 | 1 | 1 | 0 | 0 | 0 | 0 | c | c | COMPONENT_NAME |
| 0 | n | n | n | n | n | n | n | n | Communicates the relationship between a component ID and the component name. See also . . . c - 2 bit component ID n - 8 bit component "name" |
| 1 | 1 | 1 | 1 | 1 | 0 | 1 | 0 | 1 | CONSTRAINED |
| 0 | r | r | r | r | r | r | r | c | c - carries the constrained_parameters_flag decoded from an MPEG bitstream. |
| 1 | 0 | 0 | 0 | 0 | 0 | 1 | c | c | DATA |
| 1 | d | d | d | d | d | d | d | d | Carries data through the decoder chip-set. |

TABLE A.3.2-continued

Tokens implemented in the Spatial Decoder and Temporal Decoder

| E | 7 | 6 | 5 | 4 | 3 | 2 | 1 | 0 | Description |
|---|---|---|---|---|---|---|---|---|---|
| 0 | d | d | d | d | d | d | d | d | c - a 2 bit integer component ID (see A.3.5.1).This field is not defined for Tokens that carry coded data (rather than pixel information). |
| 1 | 1 | 1 | 1 | 1 | 0 | 1 | 1 | 1 | DEFINE_MAX_SAMPLING |
| 1 | r | r | r | r | r | r | h | h | Max. Horizontal and Vertical sampling numbers. These describe |
| 0 | r | r | r | r | r | r | v | v | the maximum number of blocks horizontally/vertically in any component of a macroblock. See A.3.5.2<br>h - 2 bit horizontal sampling number.<br>v - 2 bit vertical sampling number. |
| 1 | 1 | 1 | 0 | 0 | 0 | 1 | c | c | DEFINE_SAMPLING |
| 1 | r | r | r | r | r | r | h | h | Horizontal and Vertical sampling numbers for a particular colour |
| 0 | r | r | r | r | r | r | v | v | component. See A.3.5.2<br>c - 2 bit component ID.<br>h - 2 bit horizontal sampling number.<br>v - 2 bit vertical sampling number. |
| 0 | 0 | 0 | 0 | 0 | 1 | 1 | 0 | 0 | DHT_MARKER<br>The Token informs the Video Demux that the DATA Token that follows contains the specification of a Huffman table described using the JPEG "define Huffman table segment" syntax. This Token is only valid when the coding standard is configured as JPEG. This Token is generated by the start code detector during JPEG decoding when a DHT marker has been encountered in the data stream. |
| 0 | 0 | 0 | 0 | 0 | 1 | 1 | 1 | 0 | DNL_MARKER<br>This Token informs the Video Demux that the DATA Token that follows contains the JPEG parameter NL which specifies the number of lines in a frame.<br>This Token is generated by the start code detector during JPEG decoding when a DNL marker has been encountered in the data stream. |
| 0 | 0 | 0 | 0 | 0 | 1 | 1 | 0 | 1 | DQT_MARKER<br>This Token informs the Video Demux that the DATA Token that follows contains the specification of a quantisation table described using the JPEG "define quantisation table segment" syntax. This Token is only valid when the coding standard is configured as JPEG. The Video Demux generates a QUANT_TABLE Token containing the new quantisation table information.<br>This Token is generated by the start code detector during JPEG decoding when a DQT marker has been encountered in the data stream. |
| 0 | 0 | 0 | 0 | 0 | 1 | 1 | 1 | 1 | DRI_MARKER<br>This Token informs the Video Demux that the DATA Token that follows contains the JPEG parameter Ri which specifies the number of minimum coding units between restart markers.<br>This Token is generated by the start code detector during JPEG decoding when a DRI marker has been encountered in the data stream. |
| 1 | 0 | 0 | 0 | 1 | 1 | 0 | 1 | 0 | EXTENSION_DATA JPEG |
| 0 | v | v | v | v | v | v | v | v | This Token informs the Video Demux that the DATA Token that follows contains extension data. See A.11.3, "Conversion of start codes to Tokens". and A.14.6. "Receiving User and Extension data",<br>During JPEG operation the 8 bit field "v" carries the JPEG marker value. This allows the class of extension data to be identified. |
| 0 | 0 | 0 | 0 | 1 | 1 | 0 | 1 | 0 | EXTENSION_DATA MPEG<br>This Token informs the Video Demux that the DATA Token that follows contains extension data. See A.11.3. "Conversion of start codes to Tokens", and A.14.6, "Receiving User and Extension data", |
| 1 | 0 | 0 | 0 | 1 | 1 | 0 | 0 | 0 | FIELD_INFO |
| 0 | r | r | r | t | p | f | f | f | Carries information about the picture following to aid its display. This function is not signalled by any existing coding standard.<br>t - if the picture is an interlaced frame this bit indicates if the upper field is first (t=0) or second.<br>p - if pictures are fields this indicates if the next picture is upper (p=0) or lower in the frame.<br>f - a 3 bit number indicating position of the field in the 8 field PAL sequence. |
| 0 | 0 | 0 | 0 | 1 | 0 | 1 | 1 | 1 | FLUSH<br>Used to indicate the end of the current coded data and to push the end of the data stream through the decoder. |
| 0 | 0 | 0 | 0 | 1 | 0 | 0 | 0 | 1 | GROUP_START<br>Generated when the group of pictures start code is found when decoding MPEG or the frame marker is found when decoding |

TABLE A.3.2-continued

Tokens implemented in the Spatial Decoder and Temporal Decoder

| E | 7 | 6 | 5 | 4 | 3 | 2 | 1 | 0 | Description |
|---|---|---|---|---|---|---|---|---|---|
|   |   |   |   |   |   |   |   |   | JPEG. |
| 1 | 1 | 1 | 1 | 1 | 1 | 1 | 0 | 0 | HORIZONTAL_MBS |
| 1 | r | r | r | h | h | h | h | h | h - a 13 bit number integer indicating the horizontal width of the |
| 0 | h | h | h | h | h | h | h | h | picture in macroblocks. |
| 1 | 1 | 1 | 1 | 1 | 0 | 0 | 1 | 0 | HORIZONTAL_SIZE |
| 1 | h | h | h | h | h | h | h | h | h - 16 bit number integer indicating the horizontal width of the |
| 0 | h | h | h | h | h | h | h | h | picture in pixels. This can be any integer value. |
| 1 | 1 | 1 | 0 | 0 | 1 | 0 | c | c | JPEG_TABLE_SELECT |
| 0 | r | r | r | r | r | r | t | t | Informs the inverse quantiser which quantisation table to use on the specified colour component. <br> c - 2 bit component ID (see A.3.5.1 <br> t - 2 bit integer table number. |
| 1 | 0 | 0 | 0 | 1 | 1 | 0 | 0 | 1 | MAX_COMP_ID |
| 0 | r | r | r | r | r | r | m | m | m - 2 bit integer indicating the maximum value of component ID (see A.3.5.1 ) that will be used in the next picture. |
| 0 | 1 | 1 | 0 | 1 | 0 | 1 | c | c | MPEG_DCH_TABLE |
| 0 | r | r | r | r | r | r | t | t | Configures which DC coefficient Huffman table should be used for colour component cc. <br> c - 2 bit component ID (see A.3.5.1 <br> t - 2 bit integer table number. |
| 0 | 1 | 1 | 0 | 0 | 1 | 1 | d | n | MPEG_TABLE_SELECT <br> informs the inverse quantiser whether to use the default or user defined quantisation table for intra or non-intra information. <br> n - 0 indicates intra information, 1 non-intra. <br> d - 0 indicates default table, 1 user defined. |
| 1 | 1 | 0 | 1 | d | v | v | v | v | MVD_BACKWARDS |
| 0 | v | v | v | v | v | v | v | v | Carries one component (either vertical or horizontal) of the backwards motion vector. <br> d - 0 indicates x component, 1 the y component <br> v - 12 bit two's complement number. The LS8 provides half pixel resolution. |
| 1 | 1 | 0 | 0 | d | v | v | v | v | MVD_FORWARDS |
| 0 | v | v | v | v | v | v | v | v | Carries one component (either vertical or horizontal) of the forwards motion vector. <br> d - 0 indicates x component, 1 the y component <br> v - 12 bit two's complement number. The LS8 provides half pixel resolution. |
| 0 | 0 | 0 | 0 | 0 | 0 | 0 | 0 | 0 | NULL <br> Does nothing. |
| 1 | 1 | 1 | 1 | 1 | 0 | 0 | 0 | 1 | PEL_ASPECT |
| 0 | r | r | r | r | p | p | p | p | p - a 4 bit integer as defined by MPEG. |
| 0 | 0 | 0 | 0 | 0 | 1 | 0 | 1 | 0 | PICTURE_END <br> Inserted by the start code detector to indicate the end of the current. picture. |
| 1 | 1 | 1 | 1 | 1 | 0 | 0 | 0 | 0 | PICTURE_RATE |
| 0 | r | r | r | r | p | p | p | p | p - a 4 bit integer as defined by MPEG. |
| 1 | 0 | 0 | 0 | 1 | 0 | 0 | 1 | 0 | PICTURE_START |
| 0 | r | r | r | r | n | n | n | n | indicates the start of a new picture. <br> n - a 4 bit picture index allocated to the picture by the start code detector. |
| 1 | 1 | 1 | 1 | 0 | 1 | 1 | 1 | 1 | PICTURE_TYPE MPEG |
| 0 | r | r | r | r | r | r | p | p | p - a 2 bit integer indicating the picture coding type of the picture that follows: <br> 0 - Intra <br> 1 - Predicted <br> 2 - Bidirectionally Predicted <br> 3 - DC Intra |
| 1 | 1 | 1 | 1 | 0 | 1 | 1 | 1 | 1 | PICTURE_TYPE H.261 |
| 1 | r | r | r | r | r | r | 0 | 1 | Indicates various H.261 options are on (1) or off (0). These options |
| 0 | r | r | s | d | f | q | 1 | 1 | are always off for MPEG and JPEG: <br> s - Split Screen Indicator <br> d - Document Camera <br> f - Freeze Picture Release <br> Source picture format: <br> q = 0 - QCIF <br> q = 1 - CIF |
| 0 | 0 | 0 | 1 | 0 | h | y | x | b | f | PREDICTION_MODE <br> A set of flag bits that indicate the prediction mode for the macroblocks that follow: <br> f - forward prediction <br> b - backward prediction <br> x - reset forward vector predictor <br> y - reset backward vector predictor <br> h - enable H.261 loop filter |

TABLE A.3.2-continued

Tokens implemented in the Spatial Decoder and Temporal Decoder

| E | 7 | 6 | 5 | 4 | 3 | 2 | 1 | 0 | Description |
|---|---|---|---|---|---|---|---|---|---|
| 0 | 0 | 0 | 0 | 1 | s | s | s | s | QUANT_SCALE |
|   |   |   |   |   |   |   |   |   | informs the inverse quantiser of a new scale factor |
|   |   |   |   |   |   |   |   |   | s - 5 bit integer in range 1 . . . 31. The value 0 is reserved. |
| 1 | 0 | 0 | 0 | 0 | 1 | 1 | 1 | 1 | QUANT_TABLE |
| 1 | q | q | q | q | q | q | q | q | Loads the specified inverse quantiser table with 64 8 bit unsigned |
| 0 | q | q | q | q | q | q | q | q | integers. The values are in zig-zag order. |
|   |   |   |   |   |   |   |   |   | t - 2 bit integer specifying the inverse quantiser table to be loaded. |
| 0 | 0 | 0 | 0 | 1 | 0 | 1 | 0 | 0 | SEQUENCE_END |
|   |   |   |   |   |   |   |   |   | The MPEG sequence_end_code and the JPEG EOI marker cause |
|   |   |   |   |   |   |   |   |   | this token to be generated. |
| 0 | 0 | 0 | 0 | 1 | 0 | 0 | 0 | 0 | SEQUENCE_START |
|   |   |   |   |   |   |   |   |   | Generated by the MPEG sequence_start start code. |
| 1 | 0 | 0 | 0 | 1 | 0 | 0 | 1 | 1 | SLICE_START |
| 0 | s | s | s | s | s | s | s | s | Corresponds to the MPEG slice_start, the H.261 GOB and the |
|   |   |   |   |   |   |   |   |   | JPEG resync interval. The interpretation of 8 bit integer "s" differs |
|   |   |   |   |   |   |   |   |   | between coding standards: |
|   |   |   |   |   |   |   |   |   | MPEG - Slice Vertical Position -1. |
|   |   |   |   |   |   |   |   |   | H.261 - Group of Blocks Number - 1. |
|   |   |   |   |   |   |   |   |   | JPEG - resychronisation interval identification (4 LSBs only). |
| 1 | 1 | 1 | 0 | 1 | 0 | 0 | t | t | TEMPORAL_REFERENCE |
| 0 | t | t | t | t | t | t | t | t | t - carries the temporal reference. For MPEG this is a 10 bit integer. |
|   |   |   |   |   |   |   |   |   | For H.261 only the 5 LSBs are used, the MSBs will always be zero. |
| 1 | 1 | 1 | 1 | 0 | 0 | 1 | 0 | d | TIME_CODE |
| 1 | r | r | r | h | h | h | h | h | The MPEG time_code. |
| 1 | r | r | m | m | m | m | m | m | d - Drop frame flag |
| 1 | r | r | s | s | s | s | s | s | d - Drop |
| 0 | r | r | p | p | p | p | p | p | h - 5 bit integer specifying hours |
|   |   |   |   |   |   |   |   |   | m - 6 bit integer specifying minutes |
|   |   |   |   |   |   |   |   |   | s - 6 bit integer specifying seconds |
|   |   |   |   |   |   |   |   |   | p - 6 bit integer specifying pictures |
| 1 | 0 | 0 | 0 | 1 | 1 | 0 | 1 | 1 | USER_DATA JPEG |
| 0 | v | v | v | v | v | v | v | v | This Token informs the Video Demux that the DATA Token that |
|   |   |   |   |   |   |   |   |   | follows contains user data. See A.11.3, "Conversion of start codes |
|   |   |   |   |   |   |   |   |   | to Tokens", and A.14.6, "Receiving User and |
|   |   |   |   |   |   |   |   |   | Extension data". |
|   |   |   |   |   |   |   |   |   | During JPEG operation the 8 bit field "v" carries the JPEG marker |
|   |   |   |   |   |   |   |   |   | value. This allows the class of user data to be identified. |
| 0 | 0 | 0 | 0 | 1 | 1 | 0 | 1 | 1 | USER_DATA MPEG |
|   |   |   |   |   |   |   |   |   | This Token informs the Video Demux that the DATA Token that |
|   |   |   |   |   |   |   |   |   | follows contains user data. See A.11.3, "Conversion of start codes |
|   |   |   |   |   |   |   |   |   | to Tokens", and A.14.6, "Receiving User and |
|   |   |   |   |   |   |   |   |   | Extension data," |
| 1 | 1 | 1 | 1 | 0 | 1 | 1 | 0 | 1 | VBV_BUFFER_SIZE |
| 1 | r | r | r | r | r | r | s | s | s - a 10 bit integer as defined by MPEG. |
| 0 | s | s | s | s | s | s | s | s |  |
| 1 | 1 | 1 | 1 | 0 | 1 | 1 | 1 | 0 | VBV_DELAY |
| 1 | b | b | b | b | b | b | b | b | b - a 16 bit integer as defined by MPEG. |
| 0 | b | b | b | b | b | b | b | b |  |
| 1 | 1 | 1 | 1 | 1 | 1 | 1 | 1 | 0 | 1 VERTICAL_MBS |
| 1 | r | r | r | v | v | v | v | v | v - a 13 bit integer indicating the vertical size of the picture in |
| 0 | v | v | v | v | v | v | v | v | macroblocks. |
| 1 | 1 | 1 | 1 | 1 | 0 | 0 | 1 | 1 | VERTICAL_SIZE |
| 1 | v | v | v | v | v | v | v | v | v - a 16 bit integer indicating the vertical size of the picture in pixels. |
| 0 | v | v | v | v | v | v | v | v | This can be any integer value. |

The Component ID number is a 2 bit integer specifying a color component. With MPEG and H.261 the relationship is quite simple:

TABLE A.3.3

Component ID for MPEG and H.261

| Component ID | MPEG or H.261 colour component |
|---|---|
| 0 | Luminance (Y) |
| 1 | Blue difference signal (Cb/U) |
| 2 | Red difference signal (Cr/V) |
| 3 | Never used |

With JPEG the situation is more complex as JPEG does not limit the colour components that can be used. The decoder chips permit up to 4 different color components in each scan. The IDs are allocated sequentially as the specification of color components arrive at the decoder.

A.3.5.2 Horizontal and Vertical sampling numbers

For each of the 4 color components there is a specification for the number of blocks horizontally and vertically in a macroblock. This specification is a two bit integer which is one less than the number of blocks.

Figure 25:
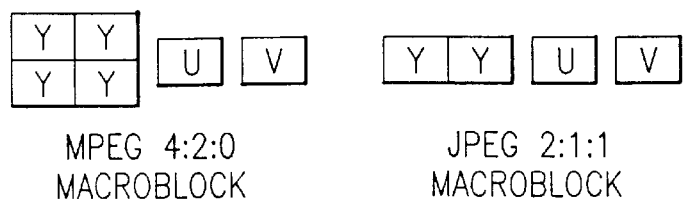
FIG. 25 is a diagram illustrating MPEG and JPEG macroblock structures

For example, in MPEG (or H.261) with 4:2:0 chroma sampling (FIG. 25) and component IDs allocated as per Table A.3.3.

TABLE A.3.4

Sampling numbers for 4:2:0/MPEG

| Component ID | Horizontal sampling number | Width in blocks | Vertical sampling number | Height in blocks |
|---|---|---|---|---|
| 0 | 1 | 2 | 1 | 2 |
| 1 | 0 | 1 | 0 | 1 |
| 2 | 0 | 1 | 0 | 1 |
| 3 | Not used | Not used | Not used | Not used |

With JPEG and 4:2:2 chroma sampling (allocation of component to component ID will vary between applications. See A.3.5.1. Note: JPEG requires a 2:1:1 structure for its macroblocks when processing 4:2:2 data.

TABLE A.3.5

Sampling numbers for 4:2:2 JPEG

| Component ID | Horizontal sampling number | Width in blocks | Vertical sampling number | Height in blocks |
|---|---|---|---|---|
| Y | 1 | 2 | 0 | 1 |
| U | 0 | 1 | 0 | 1 |
| V | 0 | 1 | 0 | 1 |

A.3.6 Special Token formats

Tokens such as DATA and QUANT_TABLE are used in their "extended form" within the decoder chip-set. In the extended form the Token includes some data. Coded data or pixel data in the case of DATA Tokens. Quantizer table information in the case of QUANT_TABLE.

A "non-extended form" of these Tokens is defined which is "empty". This form provides a place in the Token stream that can be filled by an extended version of the same Token. This form is mainly applicable to encoders, and so is not documented here.

A.3.7 Use of Tokens for different standards

Each standard uses a different sub-set of the defined Tokens.

TABLE A.3.6

Tokens for different standards

| Token Name | MPEG | JPEG | H.261 |
|---|---|---|---|
| BIT_RATE | ✓ | | |
| BROKEN_CLOSED | ✓ | | |
| CODING_STANDARD | ✓ | ✓ | ✓ |
| COMPONENT_NAME | | ✓ | |
| CONSTRAINED | ✓ | | |
| DATA | ✓ | ✓ | ✓ |
| DEFINE_MAX_SAMPLING | ✓ | ✓ | ✓ |
| DEFINE_SAMPLING | ✓ | ✓ | ✓ |
| DHT_MARKER | | ✓ | |
| DNL_MARKER | | ✓ | |
| DQT_MARKER | | ✓ | |
| DRI_MARKER | | ✓ | |
| EXTENSION_DATA | ✓ | ✓ | |
| FIELD_INFO | | | |
| FLUSH | ✓ | ✓ | ✓ |
| GROUP_START | ✓ | ✓ | |
| HORIZONTAL_MBS | ✓ | ✓ | ✓ |
| HORIZONTAL_SIZE | ✓ | ✓ | ✓ |
| JPEG_TABLE_SELECT | | ✓ | |
| MAX_COMP_ID | ✓ | ✓ | ✓ |
| MPEG_DCH_TABLE | ✓ | | |

TABLE A.3.6-continued

Tokens for different standards

| Token Name | MPEG | JPEG | H.261 |
|---|---|---|---|
| MPEG_TABLE_SELECT | ✓ | | |
| MVD_BACKWARDS | ✓ | | |
| MVD_FORWARDS | ✓ | | ✓ |
| NULL | ✓ | ✓ | ✓ |
| PEL_ASPECT | ✓ | | |
| PICTURE_END | ✓ | ✓ | ✓ |
| PICTURE_RATE | ✓ | | |
| PICTURE_START | ✓ | ✓ | ✓ |
| PICTURE_TYPE | ✓ | ✓ | ✓ |
| PREDICTION_MODE | ✓ | ✓ | ✓ |
| QUANT_SCALE | ✓ | | ✓ |
| QUANT_TABLE | ✓ | ✓ | |
| SEQUENCE_END | ✓ | ✓ | |
| SEQUENCE_START | ✓ | ✓ | ✓ |
| SLICE_START | ✓ | ✓ | ✓ |
| TEMPORAL_REFERENCE | ✓ | | ✓ |
| TIME_CODE | ✓ | | |
| USER_DATA | ✓ | ✓ | |
| VBV_BUFFER_SIZE | ✓ | | |
| VBV_DELAY | ✓ | | |
| VERTICAL_MBS | ✓ | ✓ | ✓ |
| VERTICAL_SIZE | ✓ | ✓ | ✓ |

SECTION A.4 The two wire interface

A.4.1 Two-wire interfaces and the Token Port

A simple two-wire valid/accept protocol is used at all levels in the chip-set to control the flow of information. Data is only transferred between blocks when both the sender and receiver are observed to be ready when the clock rises.

1) Data transfer
2) Receiver not ready
3) Sender not ready

If the sender is not ready (as in 3Sender not ready above) the input of the receiver must wait. If the receiver is not ready (as in 2Receiver not ready above) the sender will continue to present the same data on its output until it is accepted by the receiver.

When Token information is transferred between blocks the two-wire interface between the blocks is referred to as a Token Port. See section A.3 for a description of Tokens.

A.4.2 Where used

The decoder chip-set uses two-wire interfaces to connect the three chips. The coded data input to the Spatial Decoder is also a two-wire interface.

A.4.3 Bus signals

Figure 26:
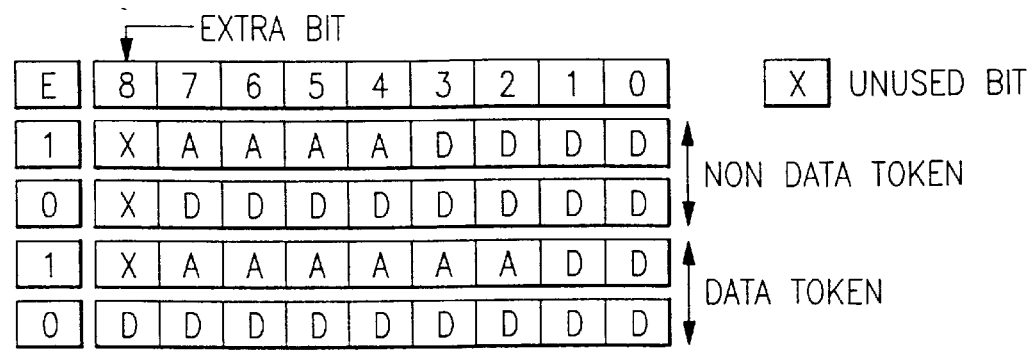
FIG. 26 is a diagram illustrating tokens on interfaces wider than 8 bits.

The width of the data word transferred by the two-wire interface varies depending upon the needs of the interface concerned (See FIG. 26, "Tokens on interfaces wider than 8 bits".

TABLE A.4.1

Two wire interface data width

| Interface | Data Width (bits) |
|---|---|
| Coded data input to Spatial Decoder | 8 |
| Output port of Spatial Decoder | 9 |
| Inut port of Temporal Decoder | 9 |
| Output port of Temporal Decoder | 8 |
| Input port of Image Formatter | 8.00 |

In addition to the data signals there are three other signals:

valid accept extension

A.4.3.1 The extension signal

The extension signal corresponds to the Token extension bit. See section A.3.1, "Token format."

A.4.4 Design considerations

The two wire interface is intended for short range, point to point communication between chips.

The decoder chips should be placed adjacent to each other, so as to minimize the length of the PCB tracks between chips. Where possible, track lengths should be kept below 25 mm. The PCB track capacitance should be kept to a minimum.

Figure 27:
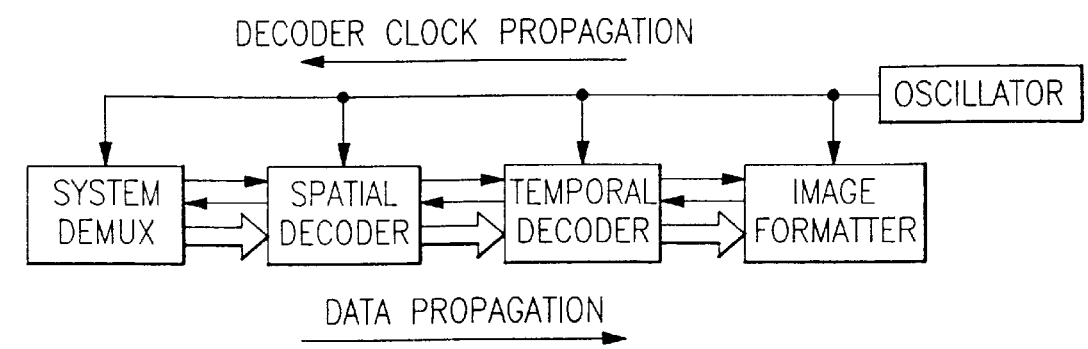
FIG. 27 is a diagram illustrating data propagation in a decoder.

The clock distribution should be designed to minimize the clock skew between chips. If there is any clock skew it should be arranged so that receiving chips see the clock before sending chips. FIG. 27 shows the two wire interface between the system de-mux chip and the coded data port of the Spatial Decoder operating from the main decoder clock. This is optional as this two wire interface can work from the coded data clock which can be asynchronous to the decoder clock. See. A.10.5, "Coded data clock." Similarly the display interface of the Image Formatter can operate from a clock that is asynchronous to the main decoder clock.

All chips communicating via two wire interfaces should operate from the same digital power supply.

A.4.5 Interface timing

TABLE A.4.2

Two wire interface timing

| | | 30 MHz | | | Note[a] |
|---|---|---|---|---|---|
| Num. | Characteristic | Min. | Max. | Unit | b |
| 1 | Input signal set-up time | 5 | | ns | |
| 2 | Input signal hold time | 0 | | ns | |
| 3 | Output signal drive time | | 23 | ns | |
| 4 | Output signal hold time | 2 | | ns | |

[a]Figures are preliminary and subject to change
b. Maximum signal loading is approximately 20 $_pF$ a. Figures are preliminary and subject to change
b. Maximum signal loading is 20 $_pF$

A.4.6 Signal levels

The two-wire interface uses CMOS inputs and output. $V_{1Hmin}$ is approx. 70% of $V_{DD}$ and $V_{1Lmax}$ is approx. 30% of $V_{DD}$. The values shown in Table A.4.3 are those for $V_{1H}$ and $V_{1L}$ at their respective worst case $V_{DD}$. $V_{DD}=5.0\pm0.25V$

TABLE A.4.3

DC electrical characteristics

| Symbol | Parameter | Min. | Max. | Units |
|---|---|---|---|---|
| $V_{IH}$ | Input logic '1' voltage | 3.68 | $V_{DD}$ + 0.5 | V |
| $V_{IL}$ | Input logic '0' voltage | GND − 0.5 | 1.43 | V |
| $V_{OH}$ | Output logic '1' voltage | $V_{DD}$ − 0.1 | | V[a] |
| | | $V_{DD}$ − 0.4 | | V[b] |
| $V_{OL}$ | Output logic '0' voltage | | 0.10 | V[c] |

TABLE A.4.3-continued

DC electrical characteristics

| Symbol | Parameter | Min. | Max. | Units |
|---|---|---|---|---|
| | | | 0.40 | V[d] |
| IIN | Input leakage current | | ±10 | µA |

[a]$I_{OH} \leq 1$ mA
[b]$I_{OH} \leq 4$ mA
[c]$I_{OL} \leq 1$ mA
[d]$I_{OL} \leq 4$ mA

A.4.7 Control clock

In general the clock controlling the transfers across the two wire interface is the chip's decoder_clock. The exception is the coded data port input to the Spatial Decoder. This is controlled by coded_clock. See section A.7.3 for details of the electrical specification of clock signals.

SECTION A.5 DRAM Interface

A.5.1 The DRAM interface

A single high performance, configurable, DRAM interface is used on all the video decoder chips. The interface is designed to directly drive the DRAMs required by the decoder chips. No external logic, buffers or components will be necessary to connect the DRAM interface to the DRAMs in most systems.

The interface is configurable in two ways:

The detail timing of the interface can be configured to accommodate a variety of different DRAM types The "width" of the DRAM interface can be configured to provide a cost/performance trade-off for different applications.

A.5.2 Interface signals

TABLE A.5.1

DRAM interface signals

| Signal Name | Input/Output | Description |
|---|---|---|
| DRAM_data[31:0] | I/O | The 32 bit wide DRAM data bus. Optionally this bus can be configured to be 16 or 8 bits wide. See Section A.5.8. |
| DRAM_addr[10:0] | O | The 22 bit wide DRAM interface address is time multiplexed over this 11 bit wide bus. |
| $\overline{RAS}$ | O | The DRAM Row Address Strobe signal |
| $\overline{CAS}$[3:0] | O | The Column Address Strobe signal. One signal is provided per byte of the interface's data bus. All the $\overline{CAS}$ signals are driven simultaneously. |
| $\overline{WE}$ | O | The DRAM Write Enable signal |
| $\overline{OE}$ | O | The DRAM Output Enable signal |
| DRAM_enable | I | This input signal, when low, makes all the output signals on the interface go high impedance. Note: on-chip data processing is not stopped when the DRAM interface is high impedance. So, errors will occur if the chip attempts to access DRAM while DRAM_enable is low. |

A.5.3 Configuring the DRAM interface

There are three groups of registers associated with the DRAM interface: interface timing configuration registers, interface bus configuration registers and refresh configuration registers. The refresh configuration registers (registers in Table A.5.4) should be configured last.

A.5.3.1 Conditions after reset

After reset the DRAM interface starts operation with a set of default timing parameters (that correspond to the slowest mode of operation). Initially the DRAM interface will continually execute refresh cycles (excluding all other transfers). This will continue until a value is written into refresh_interval. The DRAM interface will then be able to perform other types of transfer between refresh cycles.

A.5.3.2 Bus configuration

Bus configuration (registers in Table A.5.3) should only be done when no data transfers are being attempted by the interface. The interface is in this condition immediately after reset, and before a value is written into refresh_interval. The interface can be re-configured later, if required, only when no transfers are being attempted. See the Temporal Decoder chip_access register (A.18.3.1) and the Spatial Decoder buffer_manager access register (A.13.1.1).

A.5.3.3 Interface timing configuration

Modifications to the interface timing configuration information are controlled by the interface_timing_access register. Writing 1 to this register allows the interface timing registers (in Table A.5.2) to be modified. While interface_timing_access=1 the DRAM interface continues operation with its previous configuration. After writing 1 the user should wait until 1 can be read back from the interface_timing_access before writing to any of the interface timing registers.

When configuration is complete 0 should be written to the interface_timing_access. The new configuration will then be transferred to the DRAM interface.

A.5.3.4 Refresh configuration

The refresh interval of the DRAM interface of the present invention can only be configured once following reset. Until refresh_interval is configured the interface continually executes refresh cycles. This prevents any other data transfers. Data transfers can start after a value is written to refresh_interval.

Most DRAMs typically require a "pause" of between 100 $\mu$s and 500 $\mu$s after power is first applied followed by a number of refresh cycles before normal operation is possible. These DRAM start-up requirements should be satisfied before writing a value to refresh_interval.

A.5.3.5 Read access to configuration registers

All the DRAM interface registers of the present invention can be read at any time.

A.5.4 Interface timing (ticks)

The DRAM interface timing is derived from a Clock which is running at four times the input clock rate of the device (decoder_clock). This clock is generated by an on-chip PLL.

For brevity, periods of this high speed clock are referred to as ticks.

A.5.5 Interface registers

TABLE A.5.2

Interface timing configuration registers

| Register name | Size/ Dir | Reset State | Description |
|---|---|---|---|
| interface_timing_access | 1 bit rw | 0 | This function enable register allows access to the DRAM interface timing configuration registers. The configuration registers should not be modified while this register requests access to modify the configuration registers. After a 0 has been written to this register the DRAM interface will start to use the new values in the timing configuration registers. |
| page_start_length | 5 bit rw | 0 | Specifies the length at the access start in ticks The minimum value that can be used is 4 (meaning 4 ticks). 0 selects the maximum length at 32 ticks. |
| transfer_cycle_length | 4 bit rw | 0 | Specifies the length of the fast page read or write cycle in ticks. The minimum value that can be used is 4 (meaning 4 ticks). 0 selects the maximum length of 16 ticks. |
| refresh_cycle_length | 4 bit rw | 0 | Specifies the length of the refresh cycle in ticks. The minimum value that can be used is 4 (meaning 4 ticks). 0 selects the maximum length of 16 ticks. |
| RAS_falling | 4 bit rw | 0 | Specifies the number of ticks after the start of the access start that $\overline{RAS}$ falls. The minimum value that can be used is 4 (meaning 4 ticks). 0 selects the maximum length of 16 ticks. |
| CAS_falling | 4 bit rw | 8 | Specifies the number of ticks after the start of a read cycle, write cycle or access start that $\overline{CAS}$ falls. The minimum value that can be used is 1 (meaning 1 tick). 0 selects the maximum length of 16 ticks. |

TABLE A.5.3

Interface bus configuration registers

| Register name | Size/ Dir. | Reset State | Description |
|---|---|---|---|
| DRAM_data_width | 2 bit rw | 0 | Specifies the number of bits used on the DRAM interface data bus DRAM_data[31:0]. See A.5.8. |
| row_address_bits | 2 bit rw | 0 | Specifies the number of bits used for the row address portion of the DRAM interface address bus. See A.5.10. |
| DRAM_enable | 1 bit rw | 1 | Writing the value 0 in to this register forces the DRAM interface into a high impedence state. 0 will be read from this register if either the DRAM_enable signal is low or 0 has been written to the register. |
| CAS_strength RAS_strength addr_strength DRAM_data_strength OEWE_strength | 3 bit rw | 6 | These three bit registers configure the output drive strength of DRAM interface signals. This allows the interface to be configured for various different loads. See A.5.13. |

A.5.6 Interface operation

The DRAM interface uses fast page mode. Three different types of access are supported:

Read
Write
Refresh

Each read or write access transfers a burst of 1 to 64 bytes to a single DRAM page address. Read and write transfers are not mixed within a single access. Each successive access is treated as a random access to a new DRAM page.

TABLE A.5.4

Refresh configuration registers

| Register name | Size/ Dir. | Reset State | Description |
|---|---|---|---|
| refresh_interval | 8 bit rw | 0 | This value specifies the interval between refresh cycles in periods of 16 decoder_clock cycles. Values in the range 1 . . . 255 can be configured. The value 0 is automatically loaded after reset and forces the DRAM interface to continuously execute refresh cycles until a valid refresh interval is configured. It is recommended that refresh_Interval should be configured only once after each reset. |
| no_refresh | 1 bit rw | 0 | Writing the value 1 to this register prevents execution of any refresh cycles. |

A.5.7 Access structure

Each access is composed of two parts:

Access start
Data transfer

Each access starts with an access start and is followed by one or more data transfer cycles. There is a read, write and refresh variant of both the access start and the data transfer cycle.

At the end of the last data transfer in an access the interface enters its default state (see A.5.7.3) and remains in this state until a new access is ready to start. If a new access is ready to start when the last access finishes then the new access will start immediately.

A.5.7.1 Access start

The access start provides the page address for the read or write transfers and establishes some initial signal conditions. There are three different access starts:

Start of read
Start of write
Start of refresh

In each case, the timing of $\overline{RAS}$ and the row address is controlled by the registers RAS_falling and page_start length. The state of OE and DRAM_data[31:0] is held from the end of the previous data transfer until **$\overline{RAS}$ falls. The three different access start types are only different in how they drive and DRAM_data[31:0] when $\overline{RAS}$ falls. See FIG. 28.

TABLE A.5.5

DRAM Interface timing parameters

| Num. | Characteristic | Min. | Max. | Unit | Notes |
|---|---|---|---|---|---|
| 5 | $\overline{RAS}$ precharge period set by register RAS_falling | 4 | 16 | tick | |
| 6 | Access start duration set by register page_start_length | 4 | 32 | | |
| 7 | $\overline{CAS}$ precharge length set by register CAS_falling. | 1 | 16 | | a |
| 8 | Fast page read or write cycle length set by the register transfer_cycle_length. | 4 | 16 | | |
| 9 | Refresh cycle length set by the register refresh_cycle. | | | | |

[a]This value must be less than RAS_falling to ensure CAS before RAS refresh occurs.

a. This value must be less than RAS_falling to ensure $\overline{CAS}$ before $\overline{RAS}$ refresh occurs.

A.5.7.2 Data transfer

There are different types of data transfer cycles:

Fast page read cycle
Fast page late write cycle
Refresh cycle

A start of refresh is only followed by a single refresh cycle. A start of read (or write) can be followed by one or more fast page read (or write) cycles. At the start of the read cycle $\overline{CAS}$ is driven high and the new column address is driven.

An early write cycle is used. WE is driven low at the start of the first write transfer and remains low until the end of the last write transfer. The output data is driven with the address.

As a $\overline{CAS}$ before $\overline{RAS}$ refresh cycle is initiated by the start of refresh cycle there is no interface signal activity during the refresh cycle. The purpose of the refresh cycle is to meet the minimum $\overline{RAS}$ low period required by the DRAM.

A.5.7.3 Interface default state

The interface signals enter a default state at the end of an access:

$\overline{RAS}$, $\overline{CAS}$ and WE high

*data and OE remain in their previous state addr remains stable

A.5.8 Data bus width

The two bit register DRAM_data_width allows the width of the DRAM interface's data path to be configured. This allows the DRAM cost to be minimized when working with small picture formats.

TABLE A.5.6

Configuring DRAM_data_width

| DRAM_data_width | |
|---|---|
| 0[a] | 8 bit wide data bus on DRAM_data [31:24][b]. |
| 1 | 16 bit wide data bus on DRAM_data [31:16][b]. |
| 2 | 32 bit wide data bus on DRAM_data [31:0]. |

[a]Default after reset.
[b]Unused signals are held high impedance.

A.5.9 Row address width

The number of bits that are taken from the middle section of the 24 bit internal address to provide the row address is configured by the register, row_address_bits.

TABLE A.5.7

Configuring row_address_bits

| row_address_bits | Width of row address |
|---|---|
| 0 | 9 bits on DRAM-addr[8:0] |
| 1 | 10 bits on DRAM_addr[9:0] |
| 2 | 11 bits on DRAM_addr[10:0] |

A.5.10 Address bits

On-chip, a 24 bit address is generated. How this address is used to form the row and column addresses depends on the width of the data bus and the number of bits selected for the row address. Some configurations do not permit all the internal address bits to be used (and so produce "hidden bits").

The row address is extracted from the middle portion of the address. This maximizes the rate at which the DRAM is naturally refreshed.

TABLE A.5.8

Mapping between internal and external addresses

| row address width | row address translation internal → external | data bus width | column address translation internal → external | |
|---|---|---|---|---|
| 9 | [14:6] → [8:0] | 8 | [19:15] → [10:6] | [5:0] → [5:0] |
| | | 16 | [20:15] → [10:5] | [6:1] → [4:0] |

TABLE A.5.8-continued

Mapping between internal and external addresses

| row address width | row address translation internal → external | data bus width | column address translation internal → external | |
|---|---|---|---|---|
| | | 32 | [21:15] → [10:4] | [5:2] → [3:0] |
| 10 | [15:6] → [9:0] | 8 | [19:16] → [10:6] | [5:0] → [5:0] |
| | | 16 | [20:16] → [10:5] | [5:1] → [4:0] |
| | | 32 | [21:16] → [10:4] | [5:2] → [3:-0] |
| 11.00 | [16:6] → [10:0] | 8 | [19:17] → [10:6] | [5:0] → [5:0] |
| | | 16 | [20:17] → [10:5] | [5:1] → [4:0] |
| | | 32 | [21:17] → [10:4] | [5:2] → [3:0] |

A.5.10.1 Low order column address bits

The least significant 4 to 6 bits of the column address are used to provide addresses for fast page mode transfers of up to 64 bytes. The number of address bits required to control these transfers will depend on the width of the data bus (see A.5.8).

A.5.10.2 Decoding row address to access more DRAM banks

Where only a single bank of DRAM is used the width of the row address used will depend on the type of DRAM used. Applications that require more memory than can be provided by a single DRAM bank can configure a wider row address and then decode some row address bits to select a single DRAM bank.

NOTE: The row address is extracted from the middle of the internal address. If some bits of the row address are decoded to select banks of DRAM then all possible values of these "bank select bits" must select a bank of DRAM. Otherwise, holes will be left in the address space.

A.5.11 DRAM Interface enable

There are two ways to make all the output signals on the DRAM interface become high impedance: the DRAM_enable register and the DRAM_enable signal. Both the register and the signal must be at a logic 1 in order for the drivers on the DRAM interface to operate. If either is low then the interface is taken to high impedance.

Note: on-chip data processing is not stopped when the DRAM interface is at high impedance. So, errors will occur if the chip attempts to access DRAM while the interface is at high impedance.

The ability to take the DRAM interface to high impedance is provided to allow other devices to test or use the DRAM controlled by the Spatial Decoder (or the Temporal Decoder) when the Spatial Decoder (or the Temporal Decoder) is not in use. It is not intended to allow other devices to share the memory during normal operation.

A.5.12 Refresh

Unless disabled by writing to the register no_refresh the DRAM interface will automatically refresh the DRAM using a CAS before refresh cycle at an interval determined by the register refresh_interval.

The value in refresh_interval specifies the interval between $\overline{RAS}$ refresh cycles in periods of 16 decoder_clock cycles. Values in the range 1.255 can be configured. The value 0 is automatically loaded after reset and forces the DRAM interface to continuously execute refresh cycles (once enabled) until a valid refresh interval is configured. It is recommended that refresh_interval should be configured only once after each reset.

While reset is asserted, the DRAM interface is unable to refresh the DRAM. However, the reset time required by the decoder chips is sufficiently short, so that it should be possible to reset them and then to re-configure the DRAM interface before the DRAM contents decay.

A.5.13 Signal strengths

The drive strength of the outputs of the DRAM interface can be configured by the user using the 3 bit registers CAS_strength, RAS_strength, addr_strength, DRAM_data_strength, and OEWE_strength. The MSB of this 3 bit value selects either a fast or slow edge rate. The two less significant bits configure the output for different load capacitances.

The default strength after reset is 6, configuring the outputs to take approximately 10 ns to drive a signal between GND and $V_{DD}$ if loaded with $24_pF$.

TABLE A.5.9

Output strength configurations

| strength value | Drive characteristics |
| --- | --- |
| 0 | Approx. 4 ns/V into 6 pf load |
| 1 | Approx. 4 ns/V into 12 pf load |
| 2 | Approx. 4 ns/V into 24 pf load |
| 3 | Approx. 4 ns/V into 48 pf load |
| 4 | Approx. 2 ns/V into 6 pf load |
| 5 | Approx. 2 ns/V into 12 pf load |
| 6[a] | Approx. 2 ns/V into 24 pf load |
| 7 | Approx. 2 ns/V into 48 pf load |

[a]Default after reset

When an output is configured appropriately for the load it is driving, it will meet the AC electrical characteristics specified in Tables A.5.13 to A.5.16. When appropriately configured each output is approximately matched to its load and so minimal overshoot will occur after a signal transition.

A.5.14 Electrical specifications

All information provided in this section is preliminary and subject to revision.

TABLE A.5.10

Maximum Ratings[a]

| Symbol | Parameter | Min. | Max. | Units |
| --- | --- | --- | --- | --- |
| VDD | Supply voltage relative to GND | −0.5 | 6.5 | V |
| VIN | Input voltage on any pin | GND−0.5 | VDD + 0.5 | V |
| TA | Operating temperature | −40 | +85 | ° C. |
| TS | Storage temperature | −55 | +150 | ° C. | a. Stresses greater than those listed here may cause permanent damage to the device. This is a stress rating only and functional operation of the device at these, or any other conditions above those indicated in the operational sections of this specification, is not implied. Exposure to absolute maximum rating conditions for extended periods may affect reliability.

TABLE A.5.11

DC Operating conditions

| Symbol | Parameter | Min. | Max. | Units |
| --- | --- | --- | --- | --- |
| VDD | Supply voltage relative to GND | 4.75 | 5.25 | V |
| GND | Ground | 0 | 0 | V |
| VIH | Input logic "1" voltage | 2.0 | VDD + 0.5 | V |
| VIL | Input logic "0" voltage | GND−0.5 | 0.8 | V |
| TA | Operating temperature | 0 | 70 | ° C.[a] |

[a]With TBA linear ft/min transverse airflow a. With TBA linear ft/min transverse airflow

TABLE A.5.12

DC Electrical characteristics

| Symbol | Parameter | Min. | Max. | Units |
| --- | --- | --- | --- | --- |
| VOL | Output logic "0" voltage |  | 0.4 | V[a] |
| VOH | Output logic "1" voltage | 2.8 |  | V |
| IO | Output current | ±100 |  | µA[b] |
| IOZ | Output off state leakage current | ±20 |  | µA |
| IIZ | Input leakage current | ±10 |  | µA |
| IDD | RMS power supply current |  | 500 | mA |
| CIN | Input capacitance |  | 5 | pF |
| COUT | Output/IO capacitance |  | 5 | pF |

[a]AC parameters are specified using $V_{OLmax}$ = 0.8 V as the measurement level.
[b]This is the steady state drive capability of the interface. Transient currents may be much greater.

A.5.14.1 AC characteristics

TABLE A.5.13

Differences from nominal values for a strobe

| Num. | Parameter | Min. | Max. | Unit | Note[a] |
| --- | --- | --- | --- | --- | --- |
| 10 | Cycle time | −2 | +2 | ns | |
| 11 | Cycle time | −2 | +2 | ns | |
| 12 | High pulse | −5 | +2 | ns | |
| 13 | Low pulse | −11 | +2 | ns | |
| 14 | Cycle time | −8 | +2 | ns | |

[a]The driver strength of the signal must be configured appropriately for its load.

TABLE A.5.14

Differences from nominal values between two strobes

| Num. | Parameter | Min. | Max. | Unit | Note[a] |
| --- | --- | --- | --- | --- | --- |
| 15 | Strobe to strobe delay | −3 | +3 | ns | |
| 16 | Low hold time | −13 | +3 | ns | |
| 17 | Strobe to strobe precharge e.g. tCRP, tRCS, tRCH, tRRH, tRPC | −9 | +3 | ns | |
| | $\overline{CAS}$ precharge pulse between any two $\overline{CAS}$ signals on wide DRAMs e.g. tCP, or between $\overline{RAS}$ rising and $\overline{CAS}$ falling e.g. tRPC | −5 | +2 | ns | |
| 18.00 | Precharge before disable | −12 | +3 | ns | |

[a]The driver strength of the two signals must be configured appropriately for their loads.

a. The driver strength of the two signals must be configured appropriately for their loads.

TABLE A.5.15

Differences from nominal between a bus and a strobe

| Num. | Parameter | Min. | Max. | Unit | Note[a] |
|---|---|---|---|---|---|
| 19 | Set up time | −12 | +3 | ns | |
| 20 | Hold time | −12 | +3 | ns | |
| 21 | Address access time | −12 | +3 | ns | |
| 22 | Next valid after strobe | −12 | +3 | ns | |

[a] The driver strength of the bus and the strobe must be configured appropriately for their loads.

TABLE A.5.16

Differences from nominal between a bus and a strobe

| Num. | Parameter | Min. | Max. | Unit | Note |
|---|---|---|---|---|---|
| 23 | Read data set-up time before $\overline{CAS}$ signal starts to rise | 0 | | ns | |
| 24 | Read data hold time after $\overline{CAS}$ signal starts to go high | 0 | | ns | |

When reading from DRAM the DRAM interface samples DRAM_data[31:0] as the $\overline{CAS}$ signals rise.

When reading from DRAM the DRAM interface samples DRAM_data[31:0] as the $\overline{CAS}$ signals rise.

TABLE A.5.17

Cross-reference between "standard" DRAM parameter names and timing parameter numbers

| parameter | |
|---|---|
| name | number |
| tPC | 10 |
| tRC | 11 |
| tRP | 12 |
| tCP | |
| tCPN | |
| tRAS | 13 |
| tCAS | |
| tCAC | |
| tWP | |
| tRASP | |
| tRASC | |
| tACP/tCPA | 14 |
| tRCD | 15 |
| tCSR | |
| tRSH | 16 |
| tCSH | |
| tRWL | |
| tCWL | |
| tRAC | |
| tOAC/tOE | |
| tCHR | |
| tCRP | 17 |
| tRCS | |
| tRCH | |
| tRRH | |
| tRPC | |
| tCP | |
| tRPC | |
| tRHCP | 18 |
| tCPRH | |
| tASR | 19 |
| tASC | |
| tDS | |
| tRAH | 20 |
| tCAH | |
| tDH | |
| tAR | |
| tAA | 21 |

TABLE A.5.17-continued

Cross-reference between "standard" DRAM parameter names and timing parameter numbers

| parameter | |
|---|---|
| name | number |
| tRAL | |
| tRAD | 22 |

SECTION A.6 Microprocessor interface (MPI)

A standard byte wide microprocessor interface (MPI) is used on all chips in the video decoder chip-set. The MPI operates synchronously to various decoder chip clocks.

A.6.1 MPI signals

TABLE A.6.1

MPI interface signals

| Signal Name | Input/Output | Description |
|---|---|---|
| enable[1:0] | Input | Two active low chip enables. Both must be low to enable accesses via the MPI |
| $\overline{rw}$ | Input | High indicates that a device wishes to read values from the video chip. This signal should be stable while the chip is enabled. |
| addr[n:0] | Input | Address specifies one of 2 locations in the chip's memory map. This signal should be stable while the chip is enabled. |
| data[7:0] | Output | 8 bit wide data I/O port. These pins are high impedance if either enable signal is high. |
| $\overline{irq}$ | Output | An active low, open collector interrupt request signal. |

A.6.2 MPI electrical specifications

TABLE A.6.2

Absolute Maximum Ratings[a]

| Symbol | Parameter | Min. | Max. | Units |
|---|---|---|---|---|
| $V_{DD}$ | Supply voltage relative to GND | −0.5 | 6.5 | V |
| VIN | Input voltage on any pin | GND−0.5 | $V_{DD}$ + 0.5 | V |
| $T_A$ | Operating Temperature | −40 | +85 | °C. |
| $T_S$ | Storage Temperature | −55 | +150 | °C. |

TABLE A.6.3

DC Operating conditions

| Symbol | Parameter | Min. | Max. | Units |
|---|---|---|---|---|
| $V_{DD}$ | Supply voltage relative to GND | 4.75 | 5.25 | V |
| GND | Ground | 0 | 0 | V |
| VIH | Input logic "1" voltage | 2.0 | $V_{DD}$ + 0.5 | V[a] |
| $V_{IL}$ | Input logic "0" voltage | GND−0.5 | 0.8 | V[a] |
| $T_A$ | Operating temperature | 0 | 70 | °C.[b] |

[a] AC input parameters are measured at a 1.4 V measurement level.
[b] With TBA linear ft/min transverse airflow.

TABLE A.6.4

DC Electrical characteristics

| Symbol | Parameter | Min. | Max. | Units |
|---|---|---|---|---|
| $V_{OL}$ | Output logic '0' voltage | | 0.4 | V |
| $V_{OLoc}$ | Open collector output logic '0' voltage | | 0.4 | V[a] |
| $V_{OH}$ | Outpout logic '1' voltage | 2.4 | | V |
| $I_O$ | Output current | ± 100 | | $\mu$A[b] |
| $I_{Ooc}$ | Open collector output current | 4.0 | 8.0 | mA[c] |
| $I_{OZ}$ | Output off state leakage current | | ±20 | $\mu$A |
| IIN | Input leakage current | | ±10 | $\mu$A |
| $I_{DD}$ | RMS power supply current | | 500 | mA |
| cIN | input capacitance | | 5 | pF |
| $C_{OUT}$ | Output/IO capacitance | | 5 | pF |

[a] $I_O \leq I_{OOC\ min}$
[b] This is the steady state drive capability of the interface. Transient currents may be much greater.
[c] When asserted the open collector irq output pulls down with an impedance of 100Ω or less.

A.6.2.1 AC characteristics

TABLE A.6.5

Microprocessor interface read timing

| Num. | Characteristic | Min. | Max | Unit | Notes[a] |
|---|---|---|---|---|---|
| 25 | Enable low period | 100 | | ns | |
| 26 | Enable high period | 50 | | ns | |
| 27 | Address or rw set up to chip | 0 | | ns | |
| 28 | Address or rw hold from chip | 0 | | ns | |
| 29 | Output turn-on time | 20 | | ns | |
| 30 | Read data access time | | 70 | ns | b |
| 31 | Read data hold time | 5 | | ns | |
| 32 | Read data turn-off time | | 20 | | |

[a] The choice, in this example, of =e,ovs enable[0] to start the cycle and enable[1] to end it is arbitrary. These signal are of equal status.
[b] The access time is specified for a maximum load of 50 $_p$F on each of the data[7.0]. Larger loads may increase the access time.

TABLE A.6.6

Microprocessor interface write timing

| Num. | Characteristic | Min. | Max | Unit | Notes |
|---|---|---|---|---|---|
| 33 | Write data set-up time | 15 | | ns | a |
| 34 | Write dat hold time | 0 | | ns | |

[a] The choice, in this example, of $\overline{\text{enable}}$[0] to starte the cycle and $\overline{\text{enable}}$[1] to end it is arbitrary. These signal are of equal status.

A.6.3 Interrupts

"Event" is the term used to describe an on-chip condition that a user might want to observe. An event could indicate an error or it could be informative to the user software.

There are two single bit registers associated with each interrupt or "event". These are the condition event register and the condition mask register.

A.6.3.1 Condition event register

A one bit read/write register whose value is set to one by a condition occurring within the circuit. The register is set to one even if the condition only existed transiently (and has now gone away.) The register is then guaranteed to remain set to one until the user's software resets it (or the entire chip is reset).

The register is set to zero by writing the value one!
Writing zero to the register leaves the register unaltered.
The register must be set to zero by user software before another occurrence of this condition can be observed.

The register will be reset to zero on reset.

A.6.3.2 Condition mask register

A one bit read/write register which enables the generation of an interrupt request if the corresponding condition event register(s) is(are) set. If the condition event is already set when 1 is written to the condition mask register an interrupt request will be issued immediately.

The value 1 enables interrupts.

The register clears to zero on reset.

Unless stated otherwise a block will stop operation after generating an interrupt request and will re-start soon after either the condition event or the condition mask register is cleared.

A.6.3.3 Event and mask bits

Event bits and mask bits are always grouped into corresponding bit positions in consecutive bytes in the memory map (see Table A.9.6 and Table A.17.6). This allows interrupt service software to use the value read from the mask registers as a mask for the value in the event registers to identify which event generated the interrupt.

A.6.3.4 The chip event and mask

Each chip has a single "global" event bit that summarizes the event activity on the chip. The chip event register presents the OR of all the on-chip events that have 1 in their mask bit.

A 1 in the chip mask bit allows the chip to generate interrupts. A 0 in the chip mask bit prevents any on-chip events generating interrupt requests.

Writing 1 to 0 to the chip event has no effect. It will only clear when all the events (enabled by a 1 in their mask bit) have been cleared.

A.6.3.5 The irq signal

The irq signal is asserted if both the chip event bit and the chip event mask are set.

The irq signal is an active low, "open collector" output which requires an off-chip pull-up resistor. When active the irq output is pulled down by an impedance of 100 Ω or less.

A pull-up resistor of approx. 4 kΩ should be suitable for most applications.

A.6.4 Accessing registers

A.6.4.1 Stopping circuits to enable access

Most registers can only be modified if the block with which they are associated is stopped. So, groups of registers will normally be associated with an access register.

The value 0 in an access register indicates that the group of registers associated with that access register should not be modified. Writing 1 to an access requests that a block be stopped. The block may not stop immediately. A block's access register will hold the value 0 until it is stopped.

User software should wait (after writing 1 to request access) until 1 is read from the access register. If the user writes a value to a configuration register while its access register is set to 0 the results are undefined.

A.6.4.2 Registers holding integers

The least significant bit of any byte in the memory map is that associated with the signal data[0].

Figures 28, 29:
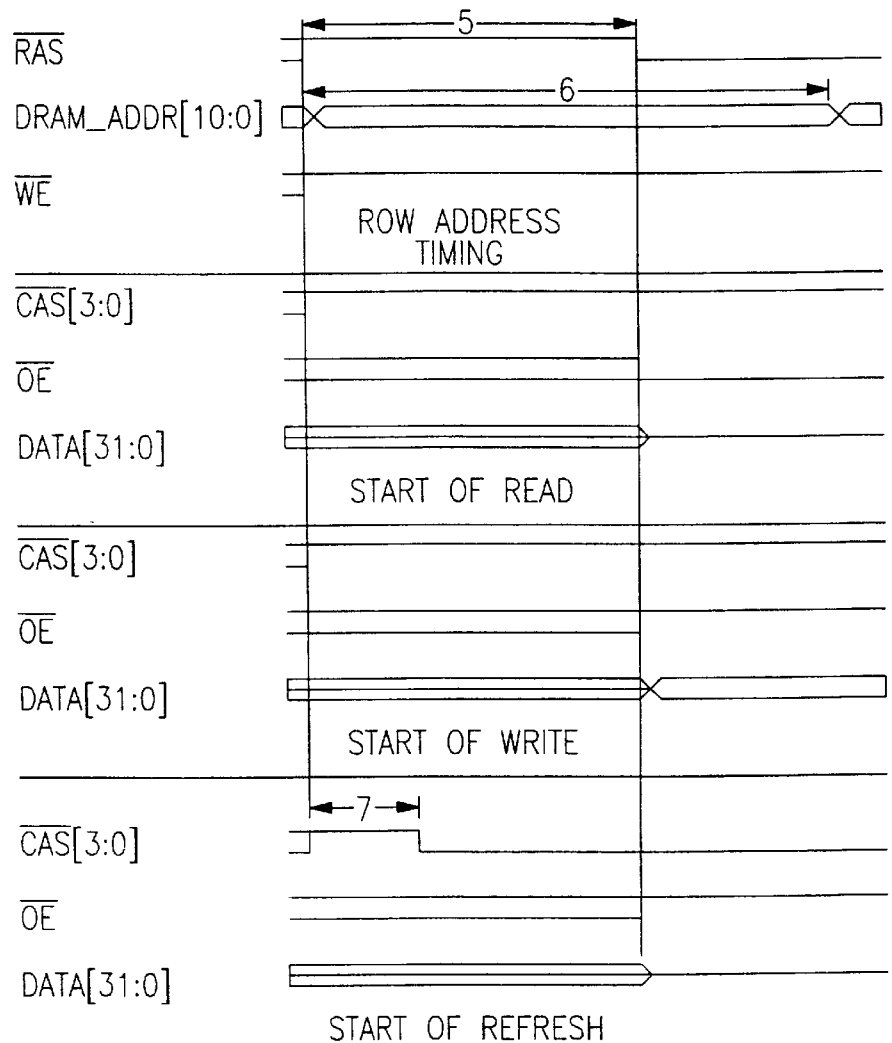
FIG. 28 is a timing diagram illustrating access start timing.
FIG. 29 is a diagram illustrating organization of large integers in a memory map.

Registers that hold integers values greater than 8 bits are split over either 2 or 4 consecutive byte locations in the memory map. The byte ordering is "big endian" as shown in FIG. 29.

No assumptions are made about the order in which bytes are written into multi-byte registers.

Unused bits in the memory map will return the 0 when read except for unused bits in registers holding signed integers. In this case the most significant bit of the register will be sign extended. For example, a 12 bit signed register will be sign extended to fill a 16 bit memory map location (two bytes). A 16 bit memory map location holding a 12 bit unsigned integer will return a 0 from its most significant bits.

A.6.4.3 Keyholed address locations

Certain less frequently accessed memory map locations have been placed behind "keyholes". A "keyhole" has two registers associated with it, a keyhole address register and a keyhole data register.

The keyhole address specifies a location within an extended address space. A read or a write operation to the keyhole data register accesses the location specified by the keyhole address register.

After accessing a keyhole data register the associated keyhole address register increments. Random access within the extended address space is only possible by writing a new value to the keyhole address register for each access.

A chip may have more than one "keyholed" memory map. There is no interaction between the different keyholes.

A.6.5 Special registers

A.6.5.1 Unused registers

Registers or bits described as "not used" are locations in the memory map that have not been used in the current implementation of the device. In general, the value 0 can be read from these locations. Writing 0 to these locations will have no effect.

To maintain compatibility with future variants of these products it is recommended that the user software should not depend upon values read from the unused locations. Similarly when configuring the device these locations should either be avoided or set to the value 0.

A.6.5.2 Reserved registers

Registers or bits described as "reserved" have undocumented effects on the behavior of the device and should not be accessed.

A.6.5.3 Test registers

Registers or bits described as "test registers" control various aspects of the device's testability. These registers have no application in the normal use of the devices and need not be accessed by normal device configuration and control software.

SECTION A.7 Clocks

Figure 30:
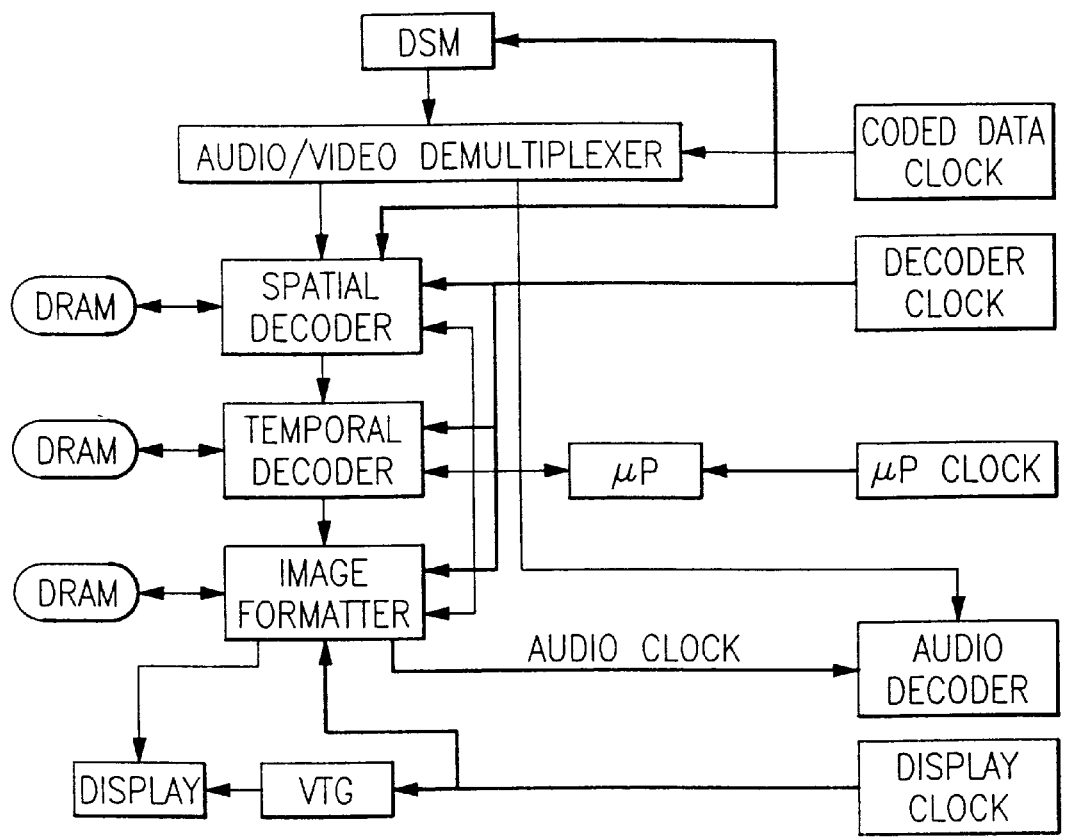
FIG. 30 is a block diagram illustrating clock regimes in a decoder.

Many different clocks can be identified in the video decoder system. Some are illustrated in FIG. 30.

As data passes between different clock regimes within the video decoder chip-set it is resynchronized (on-chip) to each new clock. The maximum frequency of any input clock is 30 Mhz. On each chip the microprocessor interface (MPI) operates asynchronously to the chip clocks. The Image Formatter can also generate a low frequency audio clock which is synchronous to the decoded video's picture rate. This clock can be used to provide audio/video synchronization.

A.7.1 Spatial Decoder clock signals

The Spatial Decoder has two different (and potentially asynchronous) clock inputs:

TABLE A.7.1

Spatial Decoder clocks

| Signal Name | Input/Output | Description |
|---|---|---|
| coded_clock | Input | This clock controls data transfer in to the coded data port of the Spatial Decoder. On-chip this clock controls the processing of the coded data until it reaches the coded data buffer. |
| decoder_clock | Input | The decoder clock controls the majority of the processing functions or the Spatial Decoder. The decoder clock also controls the transfer of data out of the Spatial Decoder through its output port. |

A.7.2 Temporal Decoder clock signals

The Temporal Decoder has only one clock input:

TABLE A.7.2

Temporal Decoder clocks

| Signal Name | Input/Output | Description |
|---|---|---|
| decoder_clock | Input | The decoder clock controls all of the processing functions on the Temporal Decoder. The decoder clock also controls transfer of data in to the Temporal Decoder through its input port and out via its output port. |

A.7.3 Electrical specifications

TABLE A.7.3

Input clock requirements

| | | 30 MHz | | | |
|---|---|---|---|---|---|
| Num. | Characteristic | Min. | Max. | Unit | Note |
| 35 | Clock period | 33 | | ns | |
| 36 | Clock high period | 13 | | ns | |
| 37 | Clock low period | 13 | | ns | |

TABLE A.7.4

Clock input conditions

| Symbol | Parameter | Min. | Max. | Units |
|---|---|---|---|---|
| $V_{IH}$ | Input logic '1' voltage | 3.68 | $V_{DD}$ + 0.5 | V |
| $V_{IL}$ | Input logic '0' voltage | GND–0.5 | 1.43 | V |
| $I_{OZ}$ | Input leakage current | | ±10 | μA |

A.7.3.1 CMOS levels

The clock input signals are CMOS inputs. $V_{IHmin}$ is approx. 70% Of $V_{DD}$ and $V_{ILmax}$ is approx. 30% of VDD. The values shown in Table A.7.4 are those for $V_{IH}$ and $V_{IL}$ at their respective worst case $V_{DD}$. $V_{DD}$=5.0±0.25V.

A.7.3.2 Stability of clocks

Clocks to drive the DRAM interface and the chip-to-chip interfaces are derived from the input clock signals. The timing specifications for these interfaces assume that the input clock timing is stable to within ±100 ps.

SECTION A.8 JTAG

As circuit boards become more densely populated, it is increasingly difficult to verify the connections between components by traditional means, such as in-circuit testing using a bed-of-nails approach. In an attempt to resolve the access problem and standardize on a methodology, the Joint Test Action Group (JTAG) was formed. The work of this group culminated in the "Standard Test Access Port and Boundary Scan Architecture", now adopted by the IEEE as standard 1149.1. The Spatial Decoder and Temporal Decoder comply with this standard.

The standard utilizes a boundary scan chain which serially connects each digital signal pin on the device. The test circuitry is transparent in normal operation, but in test mode the boundary scan chain allows test patterns to be shifted in, and applied to the pins of the device. The resultant signals appearing on the circuit board at the inputs to the JTAG device, may be scanned out and checked by relatively simple test equipment. By this means, the inter-component connections can be tested, as can areas of logic on the circuit board.

All JTAG operations are performed via the Test Access Port (TAP), which consists of five pins. The trst (Test Reset) pin resets the JTAG circuitry, to ensure that the device doesn't power-up in test mode. The tck (Test Clock) pin is used to clock serial test patterns into the tdi (Test Data Input) pin, and out of the tdo (Test Data Output) pin. Lastly, the operational mode of the JTAG circuitry is set by clocking the appropriate sequence of bits into the tms (Test Mode Select) pin.

The JTAG standard is extensible to provide for additional features at the discretion of the chip manufacturer. On the Spatial Decoder and Temporal Decoder, there are 9 user instructions, including three JTAG mandatory instructions. The extra instructions allow a degree of internal device testing to be performed, and provide additional external test flexibility. For example, all device outputs may be made to float by a simple JTAG sequence.

For full details of the facilities available and instructions on how to use the JTAG port, please see the separate JTAG Applications Notes.

A.8.1 Connection of JTAG pins in non-JTAG systems

TABLE A.8.1

How to connect JTAG inputs

| Signal | Direction | Description |
|---|---|---|
| trst | Input | This pin has an internal pull-up, but must be taken low at power-up even if the JTAG features are not being used. This may be achieved by connecting trst in common with the chip reset pin reset. |
| tdi tms | Input | These pins have internal pull-ups, and may be left disconnected if the JTAG circuitry is not being used. |
| tck | Input | This pin does not have a pull-up, and should be tied to ground if the JTAG circuitry is not used. |
| tdo | Output | High impedance except during JTAG scan operations. If JTAG is not being used, this pin may be left disconnected. |

A.8.2 Level of Conformance to IEEE 1149.1
A.8.2.1 Rules

All rules are adhered to, although the following should be noted:

TABLE A.8.2

JTAG Rules

| Rules | Description |
|---|---|
| 3.1.1(b) | The trst pin is provided. |
| 3.5.1(b) | Guaranteed for all public instructions (see IEEE 1149.1 5.2.1(c)). |
| 5.2.1(c) | Guaranteed for all public instructions. For some private instructions, the TDO pin may be active during any of the states Capture-DR, Exit 1-DR, Exit-2-DR & Pause-DR. |
| 5.3.1(a) | Power on-reset is achieved by use of the trst pin. |
| 6.2.1(e,f) | A code for the BYPASS instruction is loaded in the Test-Logic Reset state. |
| 7.1.1(d) | Un-allocated instruction codes are equivalent to BYPASS. |
| 7.2.1(c) | There is no device ID register. |
| 7.8.1(b) | Single-step operation requires external control of the system clock. |
| 7.9.1(. . .) | There is no RUNBIST facility. |
| 7.11.1(. . .) | There is no IDCODE instruction. |
| 7.12.1(. . .) | There is no USERCODE instruction. |
| 8.1.1(b) | There is no device identification register. |
| 8.2.1(c) | Guaranteed for all public instructions. The apparent length of the path from tdi to tdo may change under certain circumstances while private instruction codes are loaded. |
| 8.3.1(d–i) | Guaranteed for all public instructions. Data may be loaded at times other than on the rising edge of tck while private instructions codes are loaded. |
| 10.4.1(e) | During INTEST, the system clock pin must be controlled externally. |
| 10.6.1(c) | During INTEST, output pins are controlled by data shifted in via tdi. |

A.8.2.2 Recommendations

TABLE A.8.3

Recommendations met

| Recommendation | Description |
|---|---|
| 3.2.1(b) | tck is a high-impedance CMOS input. |
| 3.3.1(c) | tms has a high impedance pull-up. |
| 3.6.1(d) | (Applies to use of chip). |
| 3.7.1(a) | (Applies to use of chip). |
| 6.1.1(e) | The SAMPLE/PRELOAD instruction code is loaded during Capture-IR. |
| 7.2.1(f) | The INTEST instruction is supported. |
| 7.7.1(g) | Zeros are loaded at system output pins during EXTEST. |
| 7.7.2(h) | All system outputs may be set high-impedance. |
| 7.8.1(f) | Zeros are loaded at system input pins during INTEST. |
| 8.1.1(d,e) | Design-specific test data registers are not publicly accessible. |

TABLE A.8.4

Recommendations not implemented

| Recommendation | Description |
|---|---|
| 10.4.1(f) | During EXTEST, the signal driven into the on-chip logic from the system clock pin is that supplied externally. |

A.8.2.3 Permissions

TABLE A.8.5

Permissions met

| Permissions | Description |
|---|---|
| 3.2.1(c) | Guaranteed for all public instructions. |
| 6.1.1(f) | The instruction register is not used to capture design-specific information. |
| 7.2.1(g) | Several additional public instructions are provided. |
| 7.3.1(a) | Several private instruction codes are allocated. |
| 7.3.1(c) | (Rule?) Such instructions codes are documented. |
| 7.4.1(f) | Additional codes perform identically to BYPASS. |
| 10.1.1(i) | Each output pin has its own 3-state control. |
| 10.3.1(h) | A parallel latch is provided. |
| 10.3.1(i,j) | During EXTEST, input pins are controlled by data shifted in via tdi. |
| 10.6.1(d,e) | 3-state cells are not forced inactive in the Test-Logic-Reset state. |

SECTION A.9 Spatial Decoder

30 MH$_z$ operation

Decodes MPEG, JPEG & H.261

Coded data rates to 25 Mb/s

Video data rates to 21 MB/s

Flexible chroma sampling formats

Full JPEG baseline decoding

Glue-less DRAM interface

Single +5V supply

*208 pin PQFP package

Max. power dissipation 2.5W

Independent coded data and decoder clocks

Uses standard page mode DRAM

The Spatial Decoder is a configurable VLSI decoder chip for use in a variety of JPEG, MPEG and H.261 picture and video decoding applications.

In a minimum configuration, with no off-chip DRAM, the Spatial Decoder is a single chip, high speed JPEG decoder. Adding DRAM allows the Spatial Decoder to decode JPEG encoded video pictures. 720×480, 30 Hz, 4:2:2 "JPEG video" can be decoded in real-time.

With the Temporal Decoder the Spatial Decoder can be used to decode H.261 and MPEG (as well as JPEG). 704×480, 30 Hz, 4:2:0 MPEG video can be decoded.

A.9.1 Spatial Decoder Signals

TABLE A.9.1

Spatial Decoder Signals

| Signal Name | I/O | Pin Number | Description |
|---|---|---|---|
| coded_clock | I | 182 | Coded Data Port Used to supply |
| coded_data[7:0] | I | 172, 171, 169, 168, 167, 166, 164, 163 | coded data or Tokens to the Spatial Decoder. |
| coded_extn | I | 174 | See sections A.10.1 and A.4.1. |
| coded_valid | I | 162 | |
| coded_accept | O | 161 | |
| byte_mode | I | 176 | |
| enable[1:0] | I | 126, 127 | Micro Processor Interface (MPI). |
| rw | I | 125 | See section A.6.1 |
| addr[6:0] | I | 136, 135, 133, 132, 131, 130, 128 | |
| data[7:0] | O | 152, 151, 149, 147, 145, 143, 141, 140 | |
| irq | O | 154 | |
| DRAM_data[31:0] | I/O | 15, 17, 19, 20, 22, 25, 27, 30, 31, 33, 35, 38, 39, 42, 44, 47, 49, 57, 59, 61, 63, 66, 68, 70, 72, 74, 76, 79, 81, 83, 84, 85 | DRAM interface See section A.5.2. |
| DRAM_addr[10:0] | O | 184, 186, 188, 189, 192, 193, 195, 197, 199, 200, 203 | |
| RAS | O | 11 | |
| CAS[3:0] | O | 2, 4, 6, 8 | |
| WE | O | 12 | |
| OE | O | 204 | |
| DRAM_enable | I | 112 | |
| out_data[8:0] | O | 88, 89, 90, 92, 93, 94, 95, 97, 98 | Output Port. |
| out_extn | O | 87 | See section A.4.1. |
| out_valid | O | 99 | |
| out_accept | I | 100 | |
| tck | I | 115 | JTAG port. |
| tdi | I | 116 | See section A.8. |
| tdo | O | 120 | |
| tms | I | 117 | |
| trst | I | 121 | |
| decoder_clock | I | 177 | The main decoder clock. See section A.7. |
| reset | I | 160 | Reset |

TABLE A.9.2

Spatial Decoder Test signals

| Signal Name | I/O | Pin Number | Description |
|---|---|---|---|
| tph0ish | I | 122 | If override = 1 than tph0ish and tph1ish are |
| tph1ish | I | 123 | inputs for the on-chip two phase clock. |
| override | I | 110 | For normal operation set override = 0. tph0ish and tph1ish are ignored (so connect to GND or $V_{DD}$). |
| chiptest | I | 111 | Set chiptest = 0 for normal operation. |
| tloop | I | 114 | Connect to GND or $V_{DD}$ during normal operation. |
| ramtest | I | 109 | If ramtest = 1 test of the on-chip RAMS is enabled. Set ramtest = 0 for normal operation. |

TABLE A.9.2-continued

Spatial Decoder Test signals

| Signal Name | I/O | Pin Number | Description |
|---|---|---|---|
| pllselect | I | 178 | If pllselect = 0 the on-chip phase locked loops are disabled. Set pllselect = 1 for normal operation. |
| ti | I | 180 | Two clocks required by the DRAM interface during test operation. Connect to GND or $V_{DD}$ during normal operation. |
| tq | I | 179 | |
| pdout | O | 207 | These two pins are connections for an external filter for the phase lock loop. |
| pdin | I | 206 | |

TABLE A.9.3

Spatial Decoder Pin Assignments

| Signal Name | Pin | Signal Name | Pin | Signal Name | Pin | Signal Name | Pin |
|---|---|---|---|---|---|---|---|
| nc | 208 | nc | 156 | nc | 104 | nc | 52 |
| test pin | 207 | nc | 155 | nc | 103 | nc | 51 |
| test pin | 206 | irq | 154 | nc | 102 | nc | 50 |
| GND | 205 | nc | 153 | VDD | 101 | DRAM_data[15] | 49 |
| OE | 204 | data[7] | 152 | out_accept | 100 | nc | 48 |
| DRAM_addr[0] | 203 | data[6] | 151 | out_valid | 99 | DRAM_data[16] | 47 |
| VDD | 202 | nc | 150 | out_data[0] | 98 | nc | 46 |
| nc | 201 | data[5] | 149 | out_data[1] | 97 | GND | 45 |
| DRAM_addr[1] | 200 | nc | 148 | GND | 96 | DRAM_data[17] | 44 |
| DRAM_addr[2] | 199 | data[4] | 147 | out_data[2] | 95 | nc | 43 |
| GND | 198 | GND | 146 | out_data[3] | 94 | DRAM_data[18] | 42 |
| DRAM_addr[3] | 197 | data[3] | 145 | out_data[4] | 93 | VDD | 41 |
| nc | 196 | nc | 144 | out_data[5] | 92 | nc | 40 |
| DRAM_addr[4] | 195 | data[2] | 143 | VDD | 91 | DRAM_data[19] | 39 |
| VDD | 194 | nc | 142 | out_data[6] | 90 | DRAM_data[20] | 38 |
| DRAM_addr[5] | 193 | data[1] | 141 | out_data[7] | 89 | nc | 37 |
| DRAM_addr[6] | 192 | data[0] | 140 | out_data[8] | 88 | GND | 36 |
| nc | 191 | nc | 139 | out_extn | 87 | DRAM_data[21] | 35 |
| GND | 190 | VDD | 138 | GND | 86 | nc | 34 |
| DRAM_addr[7] | 189 | nc | 137 | DRAM_data[0] | 85 | DRAM_data[22] | 33 |
| DRAM_addr[8] | 188 | addr[6] | 136 | DRAM_data[1] | 84 | VDD | 32 |
| VDD | 187 | addr[5] | 135 | DRAM_data[2] | 83 | DRAM_data[23] | 31 |
| DRAM_addr[9] | 186 | GND | 134 | VDD | 82 | DRAM_data[24] | 30 |
| nc | 185 | addr[4] | 133 | DRAM_data[3] | 81 | nc | 29 |
| DRAM_addr[10] | 184 | addr[3] | 132 | nc | 80 | GND | 28 |
| GND | 183 | addr[2] | 131 | DRAM_data[4] | 79 | DRAM_data[25] | 27 |
| coded_clock | 182 | addr[1] | 130 | GND | 78 | nc | 26 |
| VDD | 181 | VDD | 129 | nc | 77 | DRAM_data[26] | 25 |
| test pin | 180 | addr[0] | 128 | DRAM_data[5] | 76 | nc | 24 |
| test pin | 179 | enable[0] | 127 | nc | 75 | VDD | 23 |
| test pin | 178 | enable[1] | 126 | DRAM_data[6] | 74 | DRAM_data[27] | 22 |
| decoder_clock | 177 | rw | 125 | VDD | 73 | nc | 21 |
| byte_mode | 176 | GND | 124 | DRAM_data[7] | 72 | DRAM_data[28] | 20 |
| GND | 175 | test pin | 123 | nc | 71 | DRAM_data[29] | 19 |
| coded_extn | 174 | test pin | 122 | DRAM_data[8] | 70 | GND | 18 |
| nc | 208 | nc | 156 | nc | 104 | nc | 52 |
| test pin | 207 | nc | 155 | nc | 103 | nc | 51 |
| test pin | 206 | irq | 154 | nc | 102 | nc | 50 |
| GND | 205 | nc | 153 | VDD | 101 | DRAM_data[15] | 49 |
| OE | 204 | data[7] | 152 | out_accept | 100 | nc | 48 |
| DRAM_addr[0] | 203 | data[6] | 151 | out_valid | 99 | DRAM_data[16] | 47 |
| VDD | 202 | nc | 150 | out_data[0] | 98 | nc | 46 |
| nc | 201 | data[5] | 149 | out_data[1] | 97 | GND | 45 |
| DRAM_addr[1] | 200 | nc | 148 | GND | 96 | DRAM_data[17] | 44 |

TABLE A.9.3-continued

Spatial Decoder Pin Assignments

| Signal Name | Pin | Signal Name | Pin | Signal Name | Pin | Signal Name | Pin |
|---|---|---|---|---|---|---|---|
| DRAM_addr[2] | 199 | data[4] | 147 | out_data[2] | 95 | nc | 43 |
| GND | 198 | GND | 146 | out_data[3] | 94 | DRAM_data[18] | 42 |
| DRAM_addr[3] | 197 | data[3] | 145 | out_data[4] | 93 | VDD | 41 |
| nc | 196 | nc | 144 | out_data[5] | 92 | nc | 40 |
| DRAM_addr[4] | 195 | data[2] | 143 | VDD | 91 | DRAM_data[19] | 39 |
| VDD | 194 | nc | 142 | out_data[6] | 90 | DRAM_data[20] | 38 |
| DRAM_addr[5] | 193 | data[1] | 141 | out_data[7] | 89 | nc | 37 |
| DRAM_addr[6] | 192 | data[0] | 140 | out_data[8] | 88 | GND | 36 |
| nc | 191 | nc | 139 | out_extn | 87 | DRAM_data[21] | 35 |
| GND | 190 | VDD | 138 | GND | 86 | nc | 34 |
| DRAM_addr[7] | 189 | nc | 137 | DRAM_data[0] | 85 | DRAM_data[22] | 33 |
| DRAM_addr[8] | 188 | addr[6] | 136 | DRAM_data[1] | 84 | VDD | 32 |
| VDD | 187 | addr[5] | 135 | DRAM_data[2] | 83 | DRAM_data[23] | 31 |
| DRAM_addr[9] | 186 | GND | 134 | VDD | 82 | DRAM_data[24] | 30 |
| nc | 185 | addr[4] | 133 | DRAM_data[3] | 81 | nc | 29 |
| DRAM_addr[10] | 184 | addr[3] | 132 | nc | 80 | GND | 28 |
| GND | 183 | addr[2] | 131 | DRAM_data[4] | 79 | DRAM_data[25] | 27 |
| coded_clock | 182 | addr[1] | 130 | GND | 78 | nc | 26 |
| VDD | 181 | VDD | 129 | nc | 77 | DRAM_data[26] | 25 |
| test pin | 180 | addr[0] | 128 | DRAM_data[5] | 76 | nc | 24 |
| test pin | 179 | $\overline{\text{enable}}$[0] | 127 | nc | 75 | VDD | 23 |
| test pin | 178 | $\overline{\text{enable}}$[1] | 126 | DRAM_data[6] | 74 | DRAM_data[27] | 22.00 |
| decoder_clock | 177 | $\overline{\text{rw}}$ | 125 | VDD | 73 | nc | 21 |
| byte_mode | 176 | GND | 124 | DRAM_data[7] | 72 | DRAM_data[28] | 20 |
| GND | 175 | test pin | 123 | nc | 71 | DRAM_data[29] | 19 |
| coded_extn | 174 | test pin | 122 | DRAM_data[8] | 70 | GND | 18 |
| nc | 173 | $\overline{\text{trst}}$ | 121 | GND | 69 | DRAM_data[30] | 17 |
| coded_data[7] | 172 | tdo | 120 | DRAM_data[9] | 68 | nc | 16 |
| coded_data[6] | 171 | nc | 119 | nc | 67 | DRAM_data[31] | 15 |
| VDD | 170 | VDD | 118 | DRAM_data[10] | 66 | VDD | 14 |
| coded_data[5] | 169 | tms | 117 | VDD | 65 | nc | 13 |
| coded_data[4] | 168 | tdl | 116 | nc | 64 | $\overline{\text{WE}}$ | 12 |
| coded_data[3] | 167 | tck | 115 | DRAM_data[11] | 63 | $\overline{\text{RAS}}$ | 11 |
| coded_data[2] | 166 | test pin | 114 | nc | 62 | nc | 10 |
| GND | 165 | GND | 113 | DRAM_data[12] | 61 | GND | 9 |
| coded_data[1] | 164 | DRAM_enable | 112 | GND | 60 | $\overline{\text{CAS}}$[0] | 8 |
| coded_data[0] | 163 | test pin | 111 | DRAM_data[13] | 59 | nc | 7 |
| coded_valid | 162 | test pin | 110 | nc | 58 | $\overline{\text{CAS}}$[1] | 6 |
| coded_accept | 161 | test pin | 109 | DRAM_data[14] | 57 | VDD | 5 |
| reset | 160 | nc | 108 | VDD | 56 | $\overline{\text{CAS}}$[2] | 4 |
| VDD | 159 | nc | 107 | nc | 55 | nc | 3 |
| nc | 158 | nc | 106 | nc | 54 | $\overline{\text{CAS}}$[3] | 2 |
| nc | 157 | nc | 105 | nc | 53 | nc | 1 |

A.9.1.1 "nc" no connect pins

The pins labeled nc in Table A.9.3 are not currently used and are reserved for future products. These pins should be left unconnected. They should not be connected to $V_{DD}$ GND, each other or any other signal.

A.9.1.2 VDD and GND pins

All the $V_{DD}$ and GND pins provided should be connected to the appropriate power supply. Correct device operation cannot be ensured unless all the $V_{DD}$ and GND pins are correctly used.

A.9.1.3 Test pin connections for normal operation

Nine pins on the Spatial Decoder are reserved for internal test use.

TABLE A.9.4

Default test pin connections

| Pin number | Connection |
|---|---|
| | Connect to GND for normal operation |
| | Connect to $V_{DD}$ for normal operation |
| | Leave Open Circuit for normal operation |

A.9.1.4 JTAG pins for normal operation

See section A.8.1.

A.9.2 Spatial Decoder memory map

TABLE A.9.5

Overview of Spatial Decoder memory map

| Addr. (hex) | Register Name | See Table |
|---|---|---|
| 0x00 ... 0x03 | Interrupt service area | A.9.6 |
| 0x04 ... 0x07 | Input circuit registers | A.9.7 |
| 0x08 ... 0x0F | Start code detector registers | |
| 0x10 ... 0x15 | Buffer start-up control registers | A.9.8 |
| 0x16 ... 0x17 | Not used | |
| 0x18 ... 0x23 | DRAM interface configuration registers | A.9.9 |
| 0x24 ... 0x26 | Buffer manager access and keyhole registers | A.9.10 |
| 0x27 | Not used | |
| 0x28 ... 0x2F | Huffman decoder registers | A.9.13 |
| 0x30 ... 0x3B | Not used | |
| 0x3C | Reserved | |
| 0x30 ... 0x3F | Not used | |
| 0x40 ... 0x7F | Test registers | |

TABLE A.9.6

Interrupt service area registers

| Addr. (hex) | Bit num. | Register Name |
|---|---|---|
| 0x00 | 7 | chip_event CED_EVENT_0 |
| | 6 | not used |
| | 5 | Illegal_length_count_event SCD_ILLEGAL_LENGTH_COUNT |
| | 4 | reserved may read 1 or 0 SCD_JPEG_OVERLAPPING_START |
| | 3 | overlapping_start_event SCD_NON_JPEG_OVERLAPPING_START |
| | 2 | unrecognised_start_event SCD_UNRECOGNISED_START |
| | 1 | stop_after_picture_event SCD_STOP_AFTER_PICTURE |
| | 0 | non_aligned_start_event SCD_NON_ALIGNED_START |
| 0x01 | 7 | chip_mask CED_MASK_0 |
| | 6 | not used |
| | 5 | Illegal_length_count_mask |
| | 4 | reserved write 0 to this location SCD_JPEG_OVERLAPPING_START |
| | 3 | non_jpeg_overlapping_start_mask |
| | 2 | unrecognised_start_mask |
| | 1 | stop_after_picture_mask |
| | 0 | non_aligned_start_mask |
| 0x02 | 7 | idct_too_few_event IDCT_DEFF_NUM |
| | 6 | idct_too_many_event_IDCT_SUPER_NUM |
| | 5 | accept_enable_event BS_STREAM_END_EVENT |
| | 4 | target_met_event BS_TARGET_MET_EVENT |
| | 3 | counter_flushed_too_early_event BS_FLUSH_BEFORE_TARGET_MET_EVENT |
| | 2 | counter_flushed_event BS_FLUSH_EVENT |
| | 1 | parser_event DEMUX_EVENT |
| | 0 | huffman_event HUFFMAN_EVENT |
| 0x03 | 7 | idct_too_few_mask |
| | 6 | idct_too_many_mask |
| | 5 | accept_enable_mask |
| | 4 | target_met_mask |
| | 3 | counter_flushed_too_early_mask |
| | 2 | counter_flushed_mask |
| | 1 | parser_mask |
| | 0 | huffman_mask |

TABLE A.9.7

Start code detector and input circuit registers

| Addr. (hex) | Bit num. | Register Name |
|---|---|---|
| 0x04 | 7 | coded_busy |
| | 6 | enable_mpi_input |
| | 5 | coded_extn |
| | 4:0 | not used |
| 0x05 | 7:0 | coded_data |
| 0x06 | 7:0 | not used |
| 0x07 | 7:0 | not used |
| 0x08 | 7:1 | not used |
| | 0 | start_code_detector_access also input_circuit_access CED_SCD_ACCESS |
| 0x09 | 7:4 | not used CED_SCD_CONTROL |
| | 3 | stop_after_picture |
| | 2 | discard_extension_data |
| | 1 | discard_user_data |
| | 0 | ignore_non_aligned |
| 0x0A | 7:5 | not used CED_SCD_STATUS |
| | 4 | insert_sequence_start |
| | 3 | discard_all_data |
| | 2:0 | start_code_search |
| 0x0B | 7:0 | Test register length_count |
| 0x0C | 7:0 | |

TABLE A.9.7-continued

Start code detector and input circuit registers

| Addr. (hex) | Bit num. | Register Name |
|---|---|---|
| 0x0D | 7:2 | not used |
| | 1:0 | start_code_detector_coding_standard |
| 0x0E | 7:0 | start_value |
| 0x0F | 7:4 | not used |
| | 3:0 | picture_number |

TABLE A.9.8

Buffer start-up registers

| Addr. (hex) | Bit num. | Register Name |
|---|---|---|
| 0x10 | 7:1 | not used |
| | 0 | startup_access CED_BS_ACCESS |
| 0x11 | 7:3 | not used |
| | 2:0 | bit_count_prescale CED_BS_PRESCALE |
| 0x12 | 7:0 | bit_count_target CED_BS_TARGET |
| 0x13 | 7:0 | bit_count CED_BS_COUNT |
| 0x14 | 7:1 | not used |
| | 0 | offchip_queue CED_BS_QUEUE |
| 0x15 | 7:1 | not used |
| | 0 | enable_stream CED_BS_ENABLE_NXT_STM |

TABLE A.9.9

DRAM interface configuration registers

| Addr. (hex) | Bit num. | Register Name |
|---|---|---|
| 0x18 | 7:5 | not used |
| | 4:0 | page_start_length CED_IT_PAGE_START_LENGTH |
| 0x19 | 7:4 | not used |
| | 3:0 | read_cycle_length |
| 0x1A | 7:4 | not used |
| | 3:0 | write_cycle_length |
| 0x1B | 7:4 | not used |
| | 3:0 | refresh_cycle_length |
| 0x1C | 7:4 | not used |
| | 3:0 | CAS_falling |
| 0x1D | 7:4 | not used |
| | 3:0 | RAS_falling |
| 0x1E | 7:1 | not used |
| | 0 | Interface_timing_access |
| 0x1F | 7:0 | refresh_Interval |
| 0x20 | 7 | not used |
| | 6:4 | DRAM_addr_strength[2:0] |
| | 3:1 | CAS_strength[2:0] |
| | 0 | RAS_strength[2] |
| 0x21 | 7:6 | RAS_strength[1:0] |
| | 5:3 | OEWE_strength[2:0] |
| | 2:0 | DRAM_data_strength[2:0] |
| 0x22 | 7 | ACCESS bit for pad strength etc.? not used CED_DRAM_CONFIGURE |
| | 6 | zero_buffers |
| | 5 | DRAM_enable |
| | 4 | no_refresh |
| | 3:2 | row_address_bits[1:0] |
| | 1:0 | DRAM_data_width[1:0] |
| 0x23 | 7:0 | Test registers CED_PLL_RES_CONFIG |

TABLE A.9.10

Buffer manager access and keyhole registers

| Addr. (hex) | Bit num. | Register Name |
|---|---|---|
| 0x24 | 7:1 | not used |
|  | 0 | buffer_manager_access |
| 0x25 | 7:6 | not used |
|  | 5:0 | buffer_manager_keyhole_address |
| 0x26 | 7:0 | buffer_manager_keyhole_data |

TABLE A.9.11

Buffer manager extended address space

| Addr. (hex) | Bit num. | Register Name |
|---|---|---|
| 0x00 | 7:0 | not used |
| 0x01 | 7:2 | |
|  | 1:0 | cdb_base |
| 0x02 | 7:0 | |
| 0x03 | 7:0 | |
| 0x04 | 7:0 | not used |
| 0x05 | 7:2 | |
|  | 1:0 | cdb_length |
| 0x06 | 7:0 | |
| 0x07 | 7:0 | |
| 0x08 | 7:0 | not used |
| 0x09 | 7:0 | cdb_read |
| 0x0A | 7:0 | |
| 0x0B | 7:0 | |
| 0x0C | 7:0 | not used |
| 0x0D | 7:0 | cdb_number |
| 0x0E | 7:0 | |
| 0x0F | 7:0 | |
| 0x10 | 7:0 | not used |
| 0x11 | 7:0 | tb_base |
| 0x12 | 7:0 | |
| 0x13 | 7:0 | |
| 0x14 | 7:0 | not used |
| 0x15 | 7:0 | tb_length |
| 0x16 | 7:0 | |
| 0x17 | 7:0 | |
| 0x18 | 7:0 | not used |
| 0x19 | 7:0 | tb_read |
| 0x1A | 7:0 | |
| 0x1B | 7:0 | |
| 0x1C | 7:0 | not used |
| 0x1D | 7:0 | tb_number |
| 0x1E | 7:0 | |
| 0x1F | 7:0 | |
| 0x20 | 7:0 | not used |
| 0x21 | 7:0 | buffer_limit |
| 0x22 | 7:0 | |
| 0x23 | 7:0 | |
| 0x24 | 7:4 | not used |
|  | 3 | cdb_full |
|  | 2 | cdb_empty |
|  | 1 | tb_full |
|  | 0 | tb_empty |

TABLE A.9.12

Video demux registers

| Addr. (hex) | Bit num. | Register Name |
|---|---|---|
| 0x28 | 7 | demux_access CED_H_CTRL[7] |
|  | 6:4 | huffman_error_code[2:0] CED_H_CTRL[6:4] |
|  | 3:0 | private huffman control bits [3] selects special CBP, [2] selects 4/8 bit fixed length CBP |

TABLE A.9.12-continued

Video demux registers

| Addr. (hex) | Bit num. | Register Name |
|---|---|---|
| 0x29 | 7:0 | parser_error_code CED_H_DMUX_ERR |
| 0x2A | 7:4 | not used |
|  | 3:0 | demux_keyhole_address |
| 0x2B | 7:0 | CED_H_KEYHOLE_ADDR |
| 0x2C | 7:0 | demux_keyhole_data CED_H_KEYHOLE |
| 0x2D | 7 | dummy_last_picture CED_H_ALU_REG0. r_dummy_last_frame_bit |
|  | 6 | field_info CED_H_ALU_REG0, r_field_into_bit |
|  | 5:1 | not used |
|  | 0.00 | continue CED_H_ALU_REG0, r_continue_bit |
| 0x2E | 7:0 | rom_revision CED_H_ALU_REG1 |
| 0x2F | 7:0 | private register |
|  | 7 | CED_H_TRACE_EVENT write 1 to single step. one will be read when the step has been completed. |
|  | 6 | CED_H_TRACE_MASK set to one to enter single step mode |
|  | 5 | CED_H_TRACE_RST partial reset when sequenced 1,0 |
|  | 4:0 | note used |

TABLE A.9.13

Video demux extended address space

| Addr. (hex) | Bit num. | Register Name |
|---|---|---|
| 0x00 0x0F | 7:0 | not used |
| 0x10 | 7:0 | horiz_pels r_horiz_pets |
| 0x11 | 7:0 | |
| 0x12 | 7:0 | vert_pets r_vert_pels |
| 0x13 | 7:0 | |
| 0x14 | 7:2 | not used |
|  | 1:0 | buffer_sizer_buffer_size |
| 0x15 | 7:0 | |
| 0x16 | 7:4 | not used |
|  | 3:0 | pel_aspect r_pel_aspect |
| 0x17 | 7:2 | not used |
|  | 1:0 | bit_rate r_bit_rate |
| 0x18 | 7:0 | |
| 0x19 | 7:0 | |
| 0x1A | 7:4 | not used |
|  | 3:0 | pic_rate r_pic_rate |
| 0x1B | 7:1 | not used |
|  | 0 | constrained r_constrained |
| 0x1C | 7:0 | picture_type |
| 0x1D | 7:0 | h261_pic_type |
| 0x1E | 7:2 | not used |
|  | 1:0 | broken_closed |
| 0x1F | 7:5 | not used |
|  | 4:0 | prediction_mode |
| 0x20 | 7:0 | vbv_delay |
| 0x21 | 7:0 | |
| 0x22 | 7:0 | private register MPEG full_pel_fwd, JPEG pending_frame_change |
| 0x23 | 7:0 | private register MPEG full_pel_bwd, JPEG restart_index |
| 0x24 | 7:0 | private register horiz_mb_copy |
| 0x25 | 7:0 | pic_number |
| 0x26 | 7:1 | not used |
|  | 1:0 | max_h |
| 0x27 | 7:1 | not used |
|  | 1:0 | max_v |
| 0x28 | 7:0 | private register scratch1 |
| 0x29 | 7:0 | private register scratch2 |
| 0x2A | 7:0 | private register scratch3 |

TABLE A.9.13-continued

Video demux extended address space

| Addr. (hex) | Bit num. | Register Name |
|---|---|---|
| 0x2B | 7:0 | nf MPEG unused 1, H261 ingob |
| 0x2C | 7:0 | private register MPEG first_group, JPEG first_scan |
| 0x2D | 7:0 | private register MPEG in_picture |
| 0x2E | 7 | dummy_last_picture r_rom_control |
|  | 6 | field_info |
|  | 5:1 | not used |
|  | 0 | continue |
| 0x2F | 7:0 | rom_revision |
| 0x30 | 7:2 | not used |
|  | 1:0 | dc_huff_0 |
| 0x31 | 7:2 | not used |
|  | 1:0 | dc_huff_1 |
| 0x32 | 7:2 | not used |
|  | 1:0 | dc_huff_2 |
| 0x33 | 7:2 | not used |
|  | 1:0 | dc_huff_3 |
| 0x34 | 7:2 | not used |
|  | 1:0 | ac_huff_0 |
| 0x35 | 7:2 | not used |
|  | 1:0 | ac_huff_1 |
| 0x36 | 7:2 | not used |
|  | 1:0 | ac_huff_2 |
| 0x37 | 7:2 | not used |
|  | 1:0 | ac_huff_3 |
| 0x38 | 7:2 | not used |
|  | 1:0 | tq_0 r_tq_0 |
| 0x39 | 7:2 | not used |
|  | 1:0 | tq_1 r_tq_1 |
| 0x3A | 7:2 | not used |
|  | 1:0 | tq_2 r_tq_2 |
| 0x3B | 7:2 | not used |
|  | 1:0 | tq_3 r_tq_3 |
| 0x3C | 7:0 | component_name_0 r_c_0 |
| 0x3D | 7:0 | component_name_1 r_c_1 |
| 0x3E | 7:0 | component_name_2 r_c_2 |
| 0x3F | 7:0 | component_name_3 r_c_3 |
| 0x40 0x63 | 7:0 | private registers |
| 0x40 | 7:0 | r_dc_pred_0 |
| 0x41 | 7:0 |  |
| 0x42 | 7:0 | r_dc_pred_1 |
| 0x43 | 7:0 |  |
| 0x44 | 7:0 | r_dc_pred_2 |
| 0x45 | 7:0 |  |
| 0x46 | 7:0 | r_dc_pred_3 |
| 0x47 | 7:0 |  |
| 0x48 0x4F | 7:0 | not used |
| 0x50 | 7:0 | r_prev_mhf |
| 0x51 | 7:0 |  |
| 0x52 | 7:0 | r_prev_mvf |
| 0x53 | 7:0 |  |
| 0x54 | 7:0 | r_prev_mhb |
| 0x55 | 7:0 |  |
| 0x56 | 7:0 | r_prev_mvb |
| 0x57 | 7:0 |  |
| 0x58 0x5F | 7:0 | not used |
| 0x60 | 7:0 | r_horiz_mbcnt |
| 0x61 | 7:0 |  |
| 0x62 | 7:0 | r_vert_mbcnt |
| 0x63 | 7:0 |  |
| 0x64 | 7:0 | horiz_macroblocks r_horiz_mbs |
| 0x65 | 7:0 |  |
| 0x66 | 7:0 | vert_macroblocks r_vert_mbs |
| 0x67 | 7:0 |  |
| 0x68 | 7:0 | private register r_restart_cnt |
| 0x69 | 7:0 |  |
| 0x6A | 7:0 | restart_Interval r_start_int |
| 0x6B | 7:0 |  |
| 0x6C | 7:0 | private register r_blk_h_cnt |
| 0x6D | 7:0 | private register r_blk_v_cnt |
| 0x6E | 7:0 | private register r_compid |
| 0x6F | 7:0 | max_component_id r_max_compid |
| 0x70 | 7:0 | coding_standard r_coding_std |
| 0x71 | 7:0 | private register r_pattern |
| 0x72 | 7:0 | private register r_fwd_r_size |
| 0x73 | 7:0 | private register r_bwd_r_size |
| 0x74 0x77 | 7:0 | not used |
| 0x78 | 7:2 | not used |
|  | 1:0 | blocks_h_0 r_blk_h_0 |
| 0x79 | 7:2 | not used |
|  | 1:0 | blocks_h_1 r_blk_h_1 |
| 0x7A | 7:2 | not used |
|  | 1:0 | blocks_h_2 r_blk_h_2 |
| 0x7B | 7:2 | not used |
|  | 1:0 | blocks_h_3 r_blk_h_3 |
| 0x7C | 7:2 | not used |
|  | 1:0 | blocks_v_0 r_blk_v_0 |
| 0x7D | 7:2 | not used |
|  | 1:0 | blocks_v_1 r_blk_v_1 |
| 0x7E | 7:2 | not used |
|  | 1:0 | blocks_v_2 r_blk_v_2 |
| 0x7F | 7:2 | not used |
|  | 1:0 | blocks_v_3 r_blk_v_3 |
| 0x7F 0xFF | 7:0 | not used |
| 0x100 0x10F | 7:0 | dc_bits_0[15:0] CED_H_KEY_DC_CPB0 |
| 0x110 0x11F | 7:0 | dc_bits_1[15:0] CED_H_KEY_DC_CPB1 |
| 0X120 0x13F | 7:0 | not used |
| 0x140 0x14F | 7:0 | ac_bits_0[15:0] CED_H_KEY_AC_CPB0 |
| 0x150 0x15F | 7:0 | ac_bits_1[15:0] CED_H_KEY_AC_CPB1 |
| 0x160 0x17F | 7:0 | not used |
| 0x180 | 7:0 | dc_zssss_0 CED_H_KEY_ZSSSS_INDEX0 |
| 0x181 | 7:0 | dc_zssss_1 CED_H_KEY_ZSSSS_INDEX1 |
| 0x182 0x187 | 7:0 | not used |
| 0x188 | 7:0 | ac_eob_0 CED_H_KEY_EOB_INDEX0 |
| 0x189 | 7:0 | ac_eob_1 CED_H_KEY_EOB_INDEX1 |
| 0x18A 0x18B | 7:0 | not used |
| 0x18C | 7:0 | ac_zrl_0 CED_H_KEY_ZRL_INDEX0 |
| 0x18D | 7:0 | ac_zrl_1 CED_H_KEY_ZRL_INDEX1 |
| 0x18E 0x1FF | 7:0 | not used |
| 0x200 0x2AF | 7:0 | ac_huffval_0[161:0] CED_H_KEY_AC_ITOD_0 |
| 0x2B0 0x2BF | 7:0 | dc_huffval_0[11:0] CED_H_KEY_DC_ITOD_0 |
| 0x2C0 0x2FF | 7:0 | not used |
| 0x300 0x3AF | 7:0 | ac_huffval_1[161:0] CED_H_KEY_AC_ITOD_1 |
| 0x3B0 0x3BF | 7:0 | dc_huffval_1[11:0] CED_H_KEY_DC_ITOD_1 |
| 0x3C0 0x7FF | 7:0 | not used |
| 0x800 0xACF | 7:0 | private registers |

TABLE A.9.13-continued

Video demux extended address space

| Addr. (hex) | Bit num. | Register Name |
|---|---|---|
| 0x800 0x80F | 7:0 | CED_KEY_TCOEFF_CPB |
| 0x810 0x81F | 7:0 | CED_KEY_CBP_CPB |
| 0x820 0x82F | 7:0 | CED_KEY_MBA_CPB |
| 0x830 0x83F | 7:0 | CED_KEY_MVD_CPB |
| 0x840 0x84F | 7:0 | CED_KEY_MTYPE_1_CPB |
| 0x850 0x85F | 7:0 | CED_KEY_MTYPE_P_CPB |
| 0x860 0x86F | 7:0 | CED_KEY_MTYPE_B_CPB |
| 0x870 0x88F | 7:0 | CED_KEY_MTYPE_H.261_CPB |
| 0x880 0x900 | 7:0 | not used |
| 0x901 | 7:0 | CED_KEY_HDSTROM_0 |
| 0x902 | 7:0 | CED_KEY_HDSTROM_1 |
| 0x903 0x90F | 7:0 | CED_KEY_HDSTROM_2 |
| 0x910 0xABF | 7:0 | not used |
| 0xAC0 | 7:0 | CED_KEY_DMX_WORD_0 |
| 0xAC1 | 7:0 | CED_KEY_DMX_WORD_1 |
| 0xAC2 | 7:0 | CED_KEY_DMX_WORD_2 |
| 0xAC3 | 7:0 | CED_KEY_DMX_WORD_3 |
| 0xAC4 | 7:0 | CED_KEY_DMX_WORD_4 |
| 0xAC5 | 7:0 | CED_KEY_DMX_WORD_5 |
| 0xAC6 | 7:0 | CED_KEY_DMX_WORD_6 |
| 0xAC7 | 7:0 | CED_KEY_DMX_WORD_7 |
| 0xAC8 | 7:0 | CED_KEY_DMX_WORD_8 |
| 0xAC9 | 7:0 | CED_KEY_DMX_WORD_9 |
| 0xACA 0xACB | 7:0 | not used |
| 0xACC | 7:0 | CED_KEY_DMX_AINCR |
| 0xACD | 7:0 | |
| 0xACE | 7:0 | CED_KEY_DMX_CC |
| 0xACF | 7:0 | |

TABLE A.9.14

Inverse quantiser registers

| Addr. (hex) | Bit num. | Register Name |
|---|---|---|
| | 7:1 | not used |
| 0x30 | 7:1 | not used |
| | 0.00 | iq_access |
| 0x31 | 7:2 | not used |
| | 1:0 | iq_coding_standard |
| 0x32 | 7:5 | not used |
| | 4:0 | test register iq_scale |
| 0x33 | 7:2 | not used |
| | 1:0 | test register iq_component |
| 0x34 | 7:2 | not used |
| | 1:0 | test register inverse_quantiser_prediction_mode |
| 0x35 | 7:0 | test register jpeg_indirection |
| 0x36 | 7:2 | not used |
| | 1:0 | test register mpeg_indirection |
| 0x37 | 7:0 | not used |
| 0x38 | 7:0 | iq_table_keyhole_address |
| 0x39 | 7:0 | iq_table_keyhole_data |

TABLE A.9.15

Iq table extended address space

| Addr. (hex) | Register Name |
|---|---|
| 0x00:0x3F | JPEG inverse quantisation table 0 MPEG default intra table |
| 0x40:0x7F | JPEG inverse quantisation table 1 MPEG default non-intra table |
| 0x80:0xBF | JPEG inverse quantisation table 2 MPEG down-loaded intra table |
| 0xC0:0xFF | JPEG inverse quantisation on table 3 MPEG down-loaded non-intra table |

SECTION A.10 Coded data input

Coded data and configuration Tokens can be supplied to the Spatial Decoder via two routes:

The coded data input port

The microprocessor interface (MPI)

The choice over which route(s) to use will depend upon the application and system environment. For example, at low data rates it might be possible to use a single microprocessor to both control the decoder chip-set and to do the system bitstream demultiplexing. In this case it may be possible to do the coded data input via the MPI. Alternatively, a high coded data rate might require that coded data be supplied via the coded data port.

In some applications it may be appropriate to employ a mixture of MPI and coded data port input.

A.10.1 The coded data port

TABLE A.10.1

Coded data port signals

| Signal Name | Input/ Output | Description |
|---|---|---|
| coded_clock | Input | A clock operating at up to 30 MHz controlling the operation of the input circuit |
| coded_data[7:0] | Input | The standard 11 wires required to implement |
| coded_extn | Input | a Token Port transferring 8 bit data values. |
| coded_valid | Input | See section A.4 for an electrical description |
| coded_accept | Output | of this interface. Circuits off-chip must package the coded data into Tokens. |
| byte_mode | Input | When high this signal indicates that information is to be transferred across the coded data port in byte mode rather than Token mode. |

The coded data port can be operated in two modes: Token mode and byte mode.

A.10.1.1 Token mode

If byte_mode is low then the coded data port operates as a Token Port in the normal way and accepts Tokens under the control of coded_valid and coded_accept. See section A.4 for details of the electrical operation of this interface.

The signal byte_mode is sampled at the same time as data [7:0], coded_extn and coded_valid, i.e., on the rising edge of coded_clock.

A.10.1.2 Byte mode

If byte_mode is high then a byte of data is transferred on data[7:0] under the control of the two wire interface control signals coded_valid and coded_accept. coded_extn is ignored. The bytes are subsequently assembled on-chip into DATA Tokens until the input mode is changed.

1) First word ("Head") of Token supplied in token mode.
2) Last word of Token supplied (coded extn goes low).
3) First byte of data supplied in byte mode. A new DATA Token is automatically started on-chip.

A.10.2 Supplying data via the MPI

Tokens can be supplied to the Spatial Decoder via the MPI by accessing the coded data input registers.

A.10.2.1 Writing Tokens via the MPI

The coded data registers are grouped into two bytes in the memory map to allow for efficient data transfer. The 8 data bits, coded_data[7:0], are in one location and the control registers, coded_busy, enable_mpi_input and coded_extn are in a second location.(See Table A.9.7).

When configured for Token input via the MPI the current Token is extended with the current value of coded_extn each time a value is written into coded data[7:0]. Software is responsible for setting coded_extn to 0 before the last word of any Token is written to coded_data[7:0].

For example a DATA Token is started by writing 1 into coded_extn and then 0×04 into coded_data[7:0]. The start of this new DATA Token then passes into the Spatial Decoder for processing.

Each time a new 8 bit value is written to coded_data[7:0] the current Token is extended. coded_extn need only be accessed again when terminating the current Token (for example to introduce another Token). The last word of the current Token is indicated by writing 0 to coded_extn followed by writing the last word of the current Token into coded_data[7:0].

TABLE A.10.2

Coded data input registers

| Register name | Size/ Dir. | Reset State | Description |
|---|---|---|---|
| coded_extn | 1 rw | x | Tokens can be supplied to the Spatial Decoder via the MPI by writing to these registers. |
| coded_data[7:0] | 8 w | x | |
| coded_busy | 1 r | 1 1 | The state of these registers indicates if the Spatial Decoder is able to accept Tokens written into coded_data[7:0]. The value 1 indicates that the interface is busy and unable to accept data. Behaviour is undefined if the user tries to write to coded_data[7:0] when coded_busy = 1. |
| enable_mpi_input | 1 rw | 0 | The value in this function enable registers controls whether coded data input to the spatial Decoder is via the coded data port (0) or via the MPI (1). |

Each time before writing to coded_data[7:0], coded_busy should be inspected to see if the interface is ready to accept more data.

A.10.3 Switching between input modes

Provided suitable precautions are observed it is practical to dynamically change the data input mode. In general, the transfer of a Token via any one route should be completed before switching modes.

TABLE A.10.3

Switching data input modes

| Previous mode | Next Mode | Behaviour |
|---|---|---|
| Byte | Token MPI input | The on-chip circuitry will use the last byte supplies in byte mode as the last byte of the DATA Token that it was constructing (i.e. the extn bit will be set to 0). Before accepting the next Token. |
| Token | Byte | The off-chip circuitry supplying the Token in Token mode is responsible for completing the Token (i.e. with the extn bit of the last byte of information set to 0) before selecting byte mode. |
| | MPI input | Access to input via the MPI will not be granted (i.e. coded_busy will remain set to 1) until the off-chip circuitry supplying the Token in Token mode has completed the Token (i.e. with the extn bit of the last byte of information set to 0). |
| MPI input | Byte MPI input | The control software must have completed the Token (i.e. with the extn bit of the last byte of information set to 0) before enable_mpi_input is set to 0. |

The first byte supplied in byte mode causes a DATA Token header to be generated on-chip. Any further bytes transferred in byte mode are thereafter appended to this DATA Token until the input mode changes.

The MPI register bit coded_busy and the signal coded_accept indicate on which interface the Spatial Decoder is willing to accept data. Correct observation of these signals ensures that no data is lost.

A.10.4 Rate of accepting coded data The input circuit passes Tokens to the start code detector (see section A.11). This analyses data in DATA Tokens bit serially. Its normal rate of processing is one bit per clock cycle (of coded_clock). So, most of the time it will decode a byte of coded data every 8 cycles of coded_clock. However, extra processing cycles are occasionally required. For example, when a non-DATA Token is supplied or when a start code is encountered in the coded data. When this occurs the start code detector will, for a short time, be unable to accept more information.

After the start code detector, data passes into the coded data buffer. If this buffer fills then the start code detector will be unable to accept more information.

No more coded data (or other Tokens) will be accepted on either the coded data port, or via the MPI, while the start code detector is unable to accept more information. This will be indicated by the state of the signal coded_accept and the register coded_busy.

By using coded_accept and/or coded_busy the user is guaranteed that no coded information will be lost. However, the system must either be able to buffer newly arriving coded data (or stop new data for arriving) if the Spatial Decoder is unable to accept data.

A.10.5 Coded data clock

The coded data port, the input circuit and other functions in the Spatial Decoder are controlled by coded_clock. This clock can be asynchronous to the main decoder_clock. Data transfer is synchronized to decoder_clock on-chip.

SECTION A.11 Start code detector

A.11.1 Startcodes

MPEG and H.261 coded video streams contain identifiable bit patterns called start codes. A similar function is served in JPEG by marker codes. Start/marker codes identify significant parts of the syntax of the coded data stream. The analysis of start/marker codes performed by the start code detector is the first stage in parsing the coded data.

The start/marker code patterns are designed so that they can be identified without decoding the entire bitstream. Thus, they can be used to help with error recovery and decoder start-up. The start code detector provides facilities to detect errors in the coded data construction and to assist the start-up of the decoder.

A.11.2 Start code detector registers

Many of the start code detector registers are in constant use by the start code detector. So, accessing these registers will be unreliable if the start code detector is processing data. The user is responsible for ensuring that the start code detector is halted before accessing its registers.

The register start_code_detector_access is used to halt the start code detector and so allow access to its registers. The start code detector will halt after it generates an interrupt.

There are further constraints on when the start code search and discard all data modes can be initiated. These are described in A.11.8 and A.11.5.1.

TABLE A.11.2

Start code detector test registers

| Register name | Size/Dir. | Reset State | Description |
|---|---|---|---|
| start_code_detector_access | 1 rw | 0 | Writing 1 to this register requests that the start code detector stop to allow access to its registers. The user should wait until the value 1 can be read from this register indicating that operation has stopped and access is possible. |
| illegal_length_count_event | 1 rw | 0 | An illegal length count will occur if while decoding JPEG data, a length count field is |
| illegal_length_count_mask | 1 rw | 0 | found carrying a value less than 2. This should only occur as the result of an error in the JPEG data. If the mask register is set to 1 then an interrupt can be generated and the start code detector will stop. Behaviour following an error is not predictable if this error is suppressed (mask register set to 0). See A.11.4.1 |
| jpeg_overlapping_start_event | 1 rw | 0 | If the coding standard is JPEG and the sequence 0xFF 0xFF is found while looking for |
| jpeg_overlapping_start_mask | 1 rw | 0 | a marker code this event will occur. This sequence is a legal stuffing sequence. If the mask register is set to 1 then an interrupt can be generated and the start code detector will stop. See A.11.4.2 |
| overlapping_start_event | 1 rw | 0 | If the coding standard is MPEG or H.261 and an overlapping start code is found while looking |
| overlapping_start_mask | 1 rw | 0 | for a start code this event will occur. If the mask register is set to 1 then an interrupt can be generated and the start code detector will stop. See A.11.4.2 |
| unrecognised_start_event | 1 rw | 0 | if an unrecognised start code is encountered this event will occur. If the mask register is set |
| unrecognised_start_mask | 1 rw | 0 | to 1 then an interrupt can be generated and the start code detector will stop. |
| start_value | 8 ro | x | The start code value read from the bitstream is available in the register start_value while the start code detector is halted. See A.11.4.3 on. During normal operation start_value contains the value of the most recently decoded start/marker code. Only the 4 LSBs of start_value are used during H.261 operation. The 4 MSBs will be zero. |
| stop_after_picture_event | 1 rw | 0 | If the register stop_after_picture is set to 1 then a stop after picture event will be generated |
| stop_after_picture_mask | 1 rw | 0 | after the end of a picture has passed through the start code detector. |
| stop_after_picture | 1 rw | 0 | If the mask register is set to 1 then an interrupt can be generated and the start code detector will stop. See A.11.5.1. stop_after_picture does not reset to 0 after the end of a picture has been detected so should be cleared directly. |
| non_aligned_start_event | 1 rw | 0 | When ignore_non_aligned is set to 1, start codes that are not byte aligned are ignored |
| non_aligned_start_mask | 1 rw | 0 | (treated as normal data) When ignore_non_aligned is set to 0 H.261 |
| ignore_non_aligned | 1 | 0 | and MPEG start codes will be detected |

TABLE A.11.2-continued

Start code detector test registers

| Register name | Size/Dir. | Reset State | Description |
|---|---|---|---|
| | rw | | regardless of byte alignment and the non-aligned start event will be generated. If the mask register is set to 1 then the event will cause an interrupt and the start code detector will stop. See A.11.6. If the coding standard is configured as JPEG Ignore_non_aligned is ignored and the non-aligned start event will never be generated. |
| discard_extension_data | 1 rw | 1 | When these registers are set to 1 extension or user data that cannot be decoded by the |
| discard_user_data | 1 rw | 1 | Spatial Decoder is discarded by the start code detector. See A.11.3.3. |
| discard_all_data | 1 rw | 0 | When set to 1 all data and Tokens are discarded by the start code detector. This continues until a FLUSH Token is supplied or the register is set to 0 directly. The FLUSH Token that resets this register is discarded and not output by the start code detector. See A.11.5.1. |
| insert_sequence_start | 1 rw | 1 | See A.11.7. |
| start_code_search | 3 rw | 5 | When this register is set to 0 the start code detector operates normally. When set to a higher value the start code detector discards data until the specified type of start code is detected. When the specified start code is detected the register is set to 0 and normal operation follows. See A.11.8. |
| start_code_detector_coding_standard | 2 rw | 0 | This register configures the coding standard used by the start code detector. The register can be loaded directly or by using a CODING_STANDARD Token. Whenever the start code detector generates a CODING_STANDARD Token (see A.11.7.4) it carries its current coding standard configuration. This Token will then configure the coding standard used by all other parts of the decoder chip-set. See A.21.1 and A.11.7. |
| picture_number | 4 rw | 0 | Each time the start coded detector detects a picture start code in the data stream (or the H.261 or JPEG equivalent) a PICTURE_START Token is generated which carries the current value of picture_number. This register then increments. |
| length_count | 16 r0 | 0 | This register contains the current value of the JPEG length count. This register is modified under the control of the coded data clock and should only be read via the MPI when the start code detector is stopped. |

A.11.3 Conversion of start codes to Tokens

In normal operation the function of the start code detector is to identify start codes in the data stream and then convert them to the appropriate start code Token. In the simplest case, data is supplied to the Spatial Decoder in a single long DATA Token. The output is a number of shorter DATA Tokens interleaved with start code Tokens.

Alternatively, the input data could be divided up into a number of shorter DATA Tokens. There is no restriction on how the coded data is divided into DATA Tokens other than that each DATA Token must contain 8×n bits where n is an integer.

Other Tokens can be supplied directly to the input. These are passed through the start code detector with no processing. These Tokens can only be inserted just before the location of a start code in the coded data.

A.11.3.1 Start code formats

Three different start code formats are recognized by the start code detector of the present invention. This is configured via the register start_code_detector_coding standard.

TABLE A.11.3

Start code formats

| Coding Standard | Start Code Pattern (hex) | Size of start code value |
|---|---|---|
| MPEG | 0x00 0x00 0x01 <value> | 8 bit |
| JPEG | 0xFF <value> | 8 bit |
| H.261 | 0x00 0x01 <value> | 4 bit |

A.11.3.2 Start code Token equivalents

Having detected a start code the start code detector studies the value associated with the start code and generates an appropriate Token. In general the Tokens are named after the relevant MPEG syntax. The coding standard currently selected configures the relationship between start code value and Token generated.

TABLE A.11.4

Tokens from start code values

| Start code Token generated | MPEG (hex) | H.261 (hex) | Start Code Value JPEG (hex) | JPEG (name) |
|---|---|---|---|---|
| PICTURE_START | 0x00 | 0x00 | 0xDA | SOS |
| SLICE_START[a] | 0x01 to 0xAF | 0x01 to 0xOC | 0xD0 to 0xD7 | $RST_0$ to $RST_7$ |
| SEQUENCE_START | 0xB3 | | 0xD8 | SO1 |
| SEQUENCE_END | 0xB7 | | 0xD9 | EO1 |
| GROUP_START | 0xB8 | | 0xC0 | $SOF_0$[b] |
| USER_DATA | 0xB2 | | 0xE0 to 0xEF | $APP_0$ to $APP_F$ |
| | | | 0xFE | COM |
| EXTENSION_DATA | 0xB5 | | 0xC8 | JPG |
| | | | 0xF0 to 0xFD | $JPG_0$ to $JPG_D$ |
| | | | 0x02 to 0xBF | RES |
| | | | 0xC1 to 0xCB | $SOF_1$ to $SOF_{11}$ |
| | | | 0xCC | DAC |
| DHT_MARKER | | | 0xC4 | DHT |
| DNL_MARKER | | | 0xDC | DNL |
| DQT_MARKER | | | 0xDB | DQT |
| DRI_MARKER | | | 0xDD | DRI |

[a]This Token contains an 8 bit data field which is loaded with a value determined by the start code value.
[b]Indicated start of baseline DCT encoded data.

A.11.3.3 Extended features of the coding standards

The coding standards provide a number of mechanisms to allow data to be embedded in the data stream whose use is not currently defined by the coding standard. This might be application specific "user data" that provides extra facilities for a particular manufacturer. Alternatively it might be "extension data". The coding standards authorities reserved the right to use the extension data to add features to the coding standard in the future.

Two distinct mechanisms are employed. JPEG precedes blocks of user and extension data with marker codes. However, H.261 inserts "extra information" indicated by an extra information bit in the coded data. MPEG uses both these techniques.

MPEG/JPEG blocks of user and extension data preceded by start/marker codes can be detected by the start code detector. H.261/MPEG "extra information" is detected by the Huffman decoder. See A.14.7, "Receiving Extra Information".

The registers discard_extension_data and discard_user_data allow the start code detector to be configured to discard user data and extension data. If this data is not discarded at the start code detector it can be accessed when it reaches the Video Demux see A.14.6, "Receiving User and Extension data".

The Spatial Decoder supports the baseline features of JPEG. The non-baseline features of JPEG are viewed as extension data by the Spatial Decoder. So, all JPEG marker codes that precede data for non-baseline JPEG are treated as extension data.

A.11.3.4 JPEG Table definitions

JPEG supports down loaded Huffman and quantizer tables. In a JPEG file the definition of these tables is preceded by the marker codes DNL and DQT. The start code detector generates the Tokens DHT_MARKER and DQT_MARKER when these marker codes are detected. These Tokens indicate to the Video Demux that the DATA Token following contains coded data describing Huffman or quantizer table (using the formats described in JPEG).

A.11.4 Error detection

The start code detector can detect certain errors in the coded data and provides some facilities to allow the decoder to recover after an error is detected (see A.11.8, "Start code searching").

A.11.4.1 Illegal JPEG length count

Most JPEG marker codes have a 16 bit length count field associated with them. This field indicates how much data is associated with this marker code. Length counts of 0 and 1 are illegal. An illegal length should only occur following a data error. This will generate an interrupt if illegal_length_count_mask is set to 1.

Recovery from errors in JPEG data is likely to require additional application specific data due to the difficulty of searching for start codes in JPEG data (see A.11.8.1).

A.11.4.2 Overlapping start/marker codes

Figure 31:
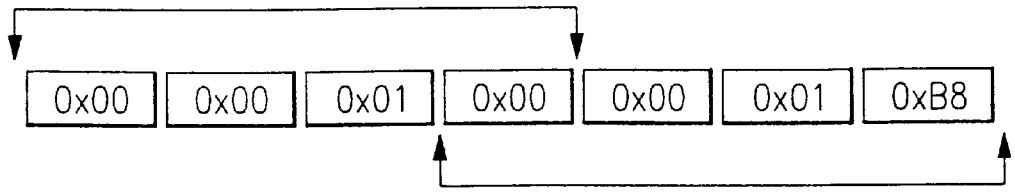
FIG. 31 is a diagram illustrating overlapping MPEG start codes.

Overlapping start codes should only occur following a data error. An MPEG, byte aligned, overlapping start code is illustrated in FIG. 31. Here the start code detector first sees a pattern that looks like a picture start code. Next the start code detector sees that this picture start code is overlapped with a group start. The start code detector generates an overlapping start event. The start code detector will generate an interrupt and stop if overlapping_start_mask is set to 1.

It is impossible to tell which of the two start codes is the correct one and which was caused by a data error. However, the start code detector discards the first start code and will proceed decoding the second start code "as if it is correct" after the overlapping start code event has been serviced. If there are a series of overlapped start codes, the start code detector will discard all but the last (generating an event for each overlapping start code).

Figure 32:
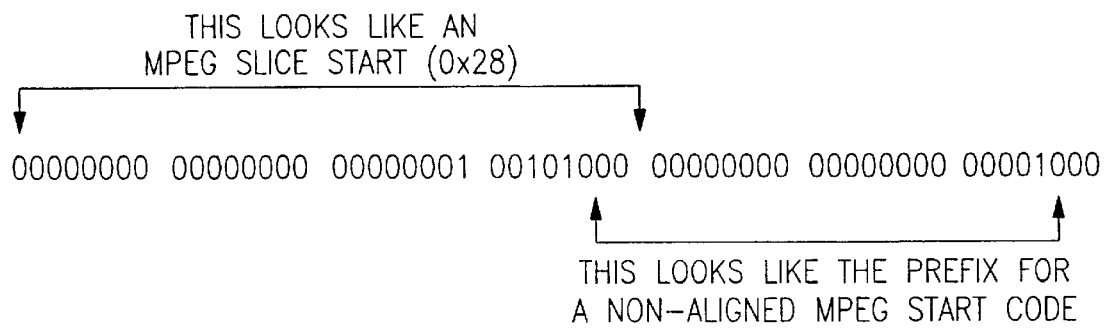
FIG. 32 is a diagram illustrating overlapping MPEG start codes.

Similar errors are possible in non byte-aligned systems (H.261 or possibly MPEG). Here the state of ignore_non_aligned must also be considered. FIG. 32 illustrates an example where the first start code found is byte aligned, but it overlaps a non-aligned start code. If ignore_non aligned is set to 1 then the second overlapping start code will be treated as data by the start code detector and so no overlapping start code event will occur. This conceals a possible data communications error. If ignore_non_aligned is set to 0 then the start code detector will see the second, non aligned, start code and will see that it overlaps the first start code.

A.11.4.3 Unrecognized start codes

The start code detector can generate an interrupt when an unrecognized start code is detected (if unrecognized start_mask=1). The value of the start code that caused this interrupt can be read from the register start_value.

The start code value 0×B4 (sequence error) is used in MPEG decoder systems to indicate a channel or media error. For example, this start code may be inserted into the data by an ECC circuit if it detects an error that it was unable to correct.

A.11.4.4 Sequence of event generation

Certain coded data patterns (probably indicating an error condition) will cause more than one of the above error conditions to occur within a short space of time. The sequence in which the start code detector examines the coded data for error conditions is:

1) Non-aligned start codes;
2) Overlapping start codes; and
3) Unrecognized start codes.

So, if a non-aligned start code overlaps another, later, start code, the first event generated will be associated with the non-aligned start code. After this event has been serviced the Start code detector's operation will proceed, detecting the overlapped start code a short time later.

The start code detector only attempts to recognize the start code after all tests for non-aligned and overlapping start codes are complete.

A.11.5 Decoder start-up and shutdown

The start code detector provides facilities to allow the current decoding task to be completed cleanly and for a new task to be started.

There are limitations on using these techniques with JPEG coded video as data segments can contain values that emulate marker codes (see A.11.8.1).

A.11.5.1 Clean end to decoding

The start code detector can be configured to generate an interrupt and stop once the data for the current picture is complete. This is done by setting stop_after_picture=1 and stop_after_picture_mask=1.

Once the end of a picture passes through the start code detector a FLUSH Token is generated (A.11.7.2), an interrupt is generated, and the start code detector stops. The picture just completed will be decoded in the normal way. In some applications it may be appropriate to detect the FLUSH arriving at the output of the decoder chip-set as this will indicate the end of the current video sequence. For example, the display could freeze on the last picture output.

When the start code detector stops there may be data from the "old" video sequence "trapped" in user implemented buffers between the media and the decode chips. Setting the register discard_all_data will cause the Spatial Decoder to consume and discard this data. This will continue until a FLUSH Token reaches the start code detector or discard_all_data is reset via the microprocessor interface.

Having discarded any data from the "old" sequence the decoder is now ready to start work on a new sequence.

A.11.5.2 When to start discard all mode

The discard all mode will start immediately after a 1 is written into the discard_all_data register. The result will be unpredictable if this is done when the start code detector is actively processing data.

Discard all mode can be safely initiated after any of the start code detector events (non-aligned start event etc.) has generated an interrupt.

A.11.5.3 Starting a new sequence

If it is not known where the start of a new coded video sequence is within some coded data, then the start code search mechanism can be used. This discards any unwanted data that precedes the start of the sequence. See A.11.8.

A.11.5.4 Jumping between sequences

This section illustrates an application of the techniques described above. The objective is to "jump" from one part of one coded video sequence to another. In this example the filing system only allows access to "blocks" of data. This block structure might be derived from the sector size of a disc or a block error correction system. So, the position of entry and exit points in the coded video data may not be related to the filing system block structure.

The stop_after_picture and discard_all_data mechanisms allow unwanted data from the old video sequence to be discarded. Inserting a FLUSH Token after the end of the last filing system data block resets the discard_all_data mode. The start code search mode can then be used to discard any data in the next data block that precedes a suitable entry point.

A.11.6 Byte alignment

The different coding schemes have quite different views about byte alignment of start/marker codes in the data stream.

H.261 views communications as being bit serial. So, there is no concept of byte alignment of start codes. By setting ignore_non_aligned=0 the start code detector is able to detect start codes with any bit alignment. By setting non-aligned_start_mask=0, the start code non-alignment interrupt is suppressed.

In contrast JPEG was designed for a computer environment where byte alignment is guaranteed. So, marker codes should only be detected when byte aligned. When the coding standard is configured as JPEG the register ignore_non_aligned is ignored and the non-aligned start event will never be generated. However, setting ignore_non_aligned=1 and non_aligned_start_mask=0 is recommended to ensure compatibility with future products.

MPEG was designed to meet the needs of both communications (bit serial) and computer (byte oriented) systems. Start codes in MPEG data should normally be byte aligned. However, the standard is designed to allow bit serial searching for start codes (no MPEG bit pattern, with any bit alignment, will look like a start code, unless it is a start code). So, an MPEG decoder can be designed that will tolerate loss of byte alignment in serial data communications.

If a non-aligned start code is found it will normally indicate that a communication error has previously occurred. If the error is a "bit-slip" in a bit-serial communications system then data containing this error will have already been passed to the decoder. This error is likely to cause other errors within the decoder. New data arriving at the start code detector can continue to be decoded after this loss of byte alignment.

By setting ignore_non_aligned=0 and non_aligned_start_mask=1 an interrupt can be generated if a non-aligned start code is detected. The response will depend upon the application. All subsequent start codes will be non-aligned (until byte alignment is restored). So, setting non_aligned_start_mask=0 after byte alignment has been lost may be appropriate.

TABLE A.11.5

Configuring for byte alignment

|  | MPEG | JPEG | H.261 |
|---|---|---|---|
| Ignore_non_aligned | 0 | 1 | 0 |
| non_aligned_start_mask | 1 | 0 | 0 |

A.11.7 Automatic Token generation

Most of the Tokens output by the start code detector directly reflect syntactic elements of the various picture and video coding standards. In addition to these "natural" Tokens, some useful "invented" Tokens are generated. Examples of these are PICTURE_END and CODING_STANDARD. Tokens are also introduced to remove some of the syntactic differences between the coding standards and to "tidy up" under error conditions.

Figure 33:
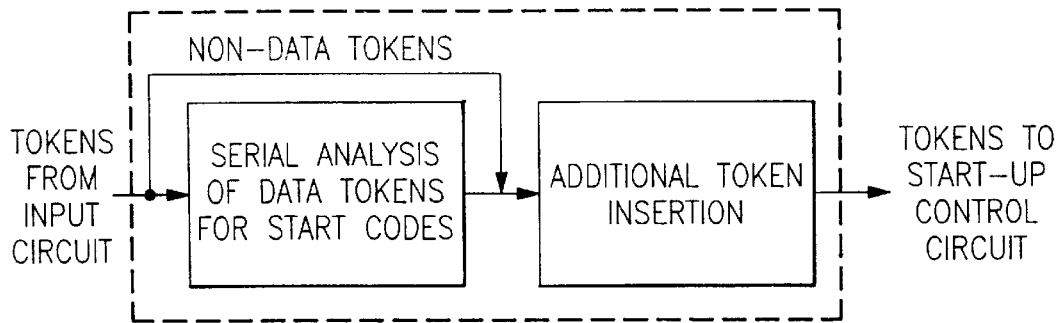
FIG. 33 is a diagram illustrating a start code detector.

This automatic Token generation is done after the serial analysis of the coded data (see FIG. 33, "The start code detector"). So, it responds equally to Tokens that have been supplied directly to the input of the Spatial Decoder and Tokens that have been generated following the detection of start codes in the coded data.

A.11.7.1 Indicating the end of a picture

In general, the coding standards don't explicitly signal the end of a picture. The start code detector generates a PICTURE_END Token when it finds information that indicates that the current picture has been completed.

The Tokens that cause PICTURE_END to be generated are: SEQUENCE_START, GROUP_START, PICTURE_START, SEQUENCE_END and FLUSH.

A.11.7.2 Stop after picture end option

If the register stop_after_picture is set then the start code detector will stop after a PICTURE_END Token has passed through. A FLUSH Token is inserted after the PICTURE_END to "push" the tail end of the coded data through the decoder. See A.11.5.1.

A.11.7.3 Introducing sequence start for H.261

H.261 does not have a syntactic element equivalent to sequence start (see Table A.11.4). If the register insert_sequence_start is set then the start code detector will ensure that there is one SEQUENCE_START Token before the next PICTURE_START, i.e., if the start code detector does not see a SEQUENCE_START before a PICTURE_START one will be introduced. No SEQUENCE_START will be introduced if one is already present.

This function should not be used with MPEG or JPEG.

A.11.7.4 Setting coding standard for each sequence

All SEQUENCE_START Tokens leaving the start code detector are always preceded by a CODING_STANDARD Token. This Token is loaded with the start code detector's current coding standard. This sets the coding standard for the entire decoder chip set for each new video sequence.

A.11.8 Start code searching

The start code detector can be used to search through a coded data stream for a specified type of start code. This allows the decoder to re-commence decoding from a specified level within the syntax of some coded data (after discarding any data that precedes it). Applications for this include:

start-up of a decoder after jumping into a coded data file at an unknown position (e.g. random accessing).

to seek to a known point in the data to assist recovery after a data error.

Table A.11.6 shows the MPEG start codes searched, for different configurations of start_code_search. The equivalent H.261 and JPEG start/marker codes can be seen in Table A.11.4.

TABLE A.11.6

Start code search modes

| start_code-search | Start codes searched for ... |
|---|---|
| 0[a] | Normal operation |
| 1 | Reserved (will behave as discard data) |
| 2 |  |
| 3 | sequence start |
| 4 | group or sequence start |
| 5[b] | picture, group or sequence start |
| 6 | slice, picture, group or sequence start |
| 7 | the next start or marker code |

[a]A FLUSH Token places the Start Code Detector in this search mode.
[b]This is the default mode after reset.

When a non-zero value is written into the start_code_search register the start code detector will start to discard all incoming data until the specified start code is detected. The start_code_search register will then reset to 0 and normal operation will continue.

The start code search will start immediately after a non-zero value is written into the start_code_search register. The result will be unpredictable if this is done when the start code detector is actively processing data. So, before initiating a start code search, the start code detector should be stopped while no data is being processed. The start code detector is always in this condition if any of the start code detector events (non-aligned start event etc.) has just generated an interrupt.

A.11.8.1 Limitations on using start code search with JPEG

Most JPEG marker codes have a 16 bit length count field associated with them. This field indicates the length of a data segment associated with the marker code. This segment may contain values that emulate marker codes. In normal operation the start code detector doesn't look for start codes in these segments of data.

If a random access into some JPEG coded data "lands" in such a segment the start code search mechanism cannot be used reliably. In general JPEG coded video will require additional external information to identify entry points for random access.

SECTION A.12 Decoder start-up control

A.12.1 Overview of decoder start-up

In a decoder, video display will normally be delayed a short time after coded data is first available. During this delay coded data accumulates in the buffers in the decoder. This pre-filling of the buffers ensures that the buffers never empty during decoding and so ensures that the decoder is able to decode new pictures at regular intervals.

Two facilities are required to correctly start-up a decoder. First there must be a mechanism to measure how much data has been provided to the decoder, second there must be a mechanism to prevent the display of a new video stream. The Spatial Decoder provides a bit counter near its input to measure how much data has arrived and an output gate near its output to prevent the start of a new video stream being output.

There are three levels of complexity for the control of these facilities: Output gate always open; basic control; ;and advanced control.

With the output gate always open picture output will start as soon as possible after coded data starts to arrive at the decoder. This is appropriate for still picture decoding or where display is being delayed by some other mechanism.

The difference between basic and advanced control relates to how many short video streams can be accommodated in the decoder's buffers at any time. Basic control is sufficient for most applications. Advanced control allows user software to help the decoder manage the start-up of several very short video streams.

A.12.2 MPEG video buffer verifier

MPEG describes a "video buffer verifier" (VBV) for constant data rate systems. Using the VBV information allows the decoder to pre-fill its buffers before it starts to display pictures. This pre-filling ensures that the decoder's buffers never empty during decoding. For a full description of the VBV see the draft MPEG specification.

In summary, each MPEG picture carries a vbv_delay parameter. This parameter specifies how long the coded data buffer of an "ideal decoder" should fill with coded data before the first picture is decoded. Having observed the start-up delay for the first picture the requirements of all subsequent pictures will be met automatically.

MPEG, therefore, specifies the start-up requirements as a delay. However, in a constant bit rate system this delay can readily be converted to a bit count. This is the basis on which the start-up control of the Spatial Decoder operates.

A.12.3 Definition of a stream

In this chapter we use the term stream to avoid confusion with the MPEG term sequence. By stream we mean a quantity of video data that is "interesting" to an application. So, a stream could be many MPEG sequences or it could be a single picture.

The decoder start-up facilities described in this chapter relate to meeting the VBV requirements of the first picture in a stream. The requirements of subsequent pictures in that stream are met automatically.

A.12.4 Start-up control registers

TABLE A.12.1

Decoder start-up registers

| Register name | Size/ Dir | Reset State | Description |
| --- | --- | --- | --- |
| startup_access CED_BS_ACCESS | 1 rw | 0 | Writing 1 to this register requests that the bit counter and gate opening logic stop to allow access to their configuration registers. |
| bit_count CED_BS_COUNT | 8 rw | 0 | This bit counter is incremented as coded data leaves the start code detector. The number of |
| bit_count_prescale CED_BS_PRESCALE | 3 rw | 0 | bits required to increment bit_count once is aprox, $2^{(\text{bit\_count\_prescale-1})} \times 512$. The bit counter starts counting bits after a FLUSH Token passes through the bit counter It is reset to zero and then stops incrementing after the bit count target has been met. |
| bit_count_target CED_BS_TARGET | 8 rw | x | This register specifies the bit count target. A target met event is generated whenever the following condition becomes true: bit_count >= bit_count_target |
| target_met_event BS_TARGET_MET_EVENT | 1 rw | 0 | When the bit count target is met this event will be generated. If the mask register is set to 1 |
| target_met_mask | 1 rw | 0 | then an interrupt can be generated, however, the bit counter will NOT stop processing data. This event will occur when the bit counter increments to its target. It will also occur if a target value is written which is less than or equal to the current value of the bit counter. Writing 0 to bit_count_target will always generate a target met event |
| counter_flushed_event BS_FLUSH_EVENT | 1 rw | 0 | When a FLUSH Token passes through the bit count circuit this event will occur. If the mask |
| counter_flushed_mask | 1 rw | 0 | register is set to 1 then an interrupt can be generated and the bit counter will stop. |
| counter_flushed_too_early_event BS_FLUSH_BEFORE_TARGET_MET_EVENT | 1 rw | 0 | If a FLUSH Token passes through the bit count circuit this event will occur if the target has not |
| counter_flushed_too_early_mask | 1 rw | 0 | been met this event will occur. If the mask register is set to 1 then an interrupt can be generated and the bit counter will stop. See A.12.10. |
| offchip_queue CED_BS_QUEUE | 1 rw | 0 | Setting this register to 1 configures the gate opening logic to require microprocessor support. When this register is set to 0 the output gate control logic will automatically control the operation of the output gate. See sections A.12.6 and A.12.7. |
| enable_stream CED_BS_ENABLE_NXT_STM | 1 rw | 0 | When an off-chip queue is in use writing to enable_stream controls the behaviour of the |

TABLE A.12.1-continued

Decoder start-up registers

| Register name | Size/ Dir | Reset State | Description |
|---|---|---|---|
| accept_enable_event<br>BS_STREAM_END_EVENT<br>accept_enable_mask | 1<br>rw<br>1<br>rw | 0<br>0 | output gate after the end of a stream passes through it.<br>A one in this register enables the output gate to open.<br>The register will be reset when an accept_enable interrupt is generated.<br>This event indicates that a FLUSH Token has passed through the output gate (causing it to close) and that an enable was available to allow the gate to open<br>If the mask register is set to 1 then an interrupt can be generated and the register enable_stream will be reset. See A.12.7.1. |

A.12.5 Output gate always open

The output gate can be fixed open. This is appropriate where still pictures are being decoded, or when some other mechanism is available to manage the start-up of the video decoder.

The following configurations are required after reset (having gained access to the start-up control logic by writing 1 to startup_access):

set offchip_queue=1 set enable_stream=1 ensure that all the decoder start-up event mask registers are set to 0 disabling their interrupts (this is the default state after reset).

(See A.12.7.1 for an explanation of why this holds the output gate open.)

A.12.6 Basic operation

Basic control of the start-up logic is sufficient for the majority of MPEG video applications. In this mode the bit counter communicates directly with the output gate. The output gate will close automatically as the end of a video stream passes through it (indicated by a FLUSH Token.) The gate will stay closed until an enable is provided by the bit counter circuitry when a stream has attained its start-up bit count.

The following configurations are required after reset (having gained access to the start-up control logic by writing 1 to startup_access):

set bit_count_prescale approximately for the expected range of coded data rates set counter_flushed_too_early_mask=1 to enable this error condition to be detected Two interrupt service routines are required:

Video Demux service to obtain the value of vbv_delay for the first picture in each new stream _Counter flushed too early service to react to this condition The video demux can generate an interrupt when it decodes the vbv_delay for a new video stream (i.e., the first picture to arrive at the video demux after a FLUSH). The interrupt service routine should compute an appropriate value for bit_count_target and write it. When the bit counter reaches this target it will insert an enable into a short queue between the bit counter and the output gate. When the output gate opens it removes an enable from this queue.

A.12.6.1 Starting a new stream shortly after another finishes

We'll call the MPEG stream which is about to finish A and the MPEG stream about to start B. A FLUSH Token should be inserted after the end of A. This pushes the last of its coded data through the decoder and alerts the various sections of the decoder to expect a new stream.

Normally, the bit counter will have reset to zero, A having already met its start-up conditions. After the FLUSH the bit counter will start counting the bits in stream B. When the Video Demux has decoded the vbv_delay from the first picture in stream B an interrupt will be generated allowing the bit counter to be configured.

As the FLUSH marking the end of stream A passes through the output gate, the gate will close. The gate will remain closed until B meets its start-up conditions. Depending on a number of factors such as: the start-up delay for stream B and the depth of the buffers it is possible that B will have already met its start-up conditions when the output gate closes. In this case there will be an enable waiting in the queue and the output gate will open immediately. Otherwise, stream B will have to wait until it meets its start-up requirements.

A.12.6.2 A succession of short streams

The depth of the queue between the bit counter and the output gate is sufficient to allow 3 separate video streams to have met their start-up conditions and to be waiting for a previous stream to finish being decoded. This situation will only occur if very short streams are being decoded or if the off-chip buffers are very large (compared to the picture format being decoded).

Figure 34:
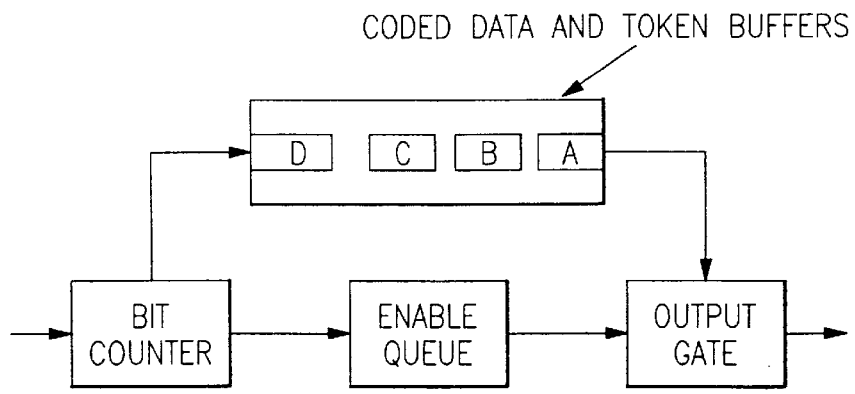
FIG. 34 is a diagram illustrating queuing of enabled data streams prior to output thereof.

In FIG. 34 stream A is being decoded (the output gate is open). Streams B and C have met their start-up conditions and are entirely contained within the buffers managed by the Spatial Decoder. Stream D is still arriving at the input of the Spatial Decoder.

Enables for streams B and C are in the queue. So, when stream A is completed B will be able to start immediately. Similarly C can follow immediately behind B.

If A is still passing through the output gate when D meets its start-up target an enable will be added to the queue, filling the queue. If no enables have been removed from the queue by the time the end of D passes the bit counter (i.e., A is still passing through the output gate) no new stream will be able to start through the bit counter. Coded data will be held up at the input until A completes and an enable is removed from the queue as the output gate is opened to allow B through.

A.12.7 Advanced operation

Advanced control of the start-up logic allows user software to infinitely extend the length of the enable queue described in A.12.6, "Basic operation". This level of control will only be required where the video decoder must accommodate a series of short video streams longer than that described in A.12.6.2, "A succession of short streams".

In addition to the configuration required for Basic operation the following configurations are required after reset (having gained access to the start-up control logic by writing 1 to start_up access):

set offchip_queue=1 set accept_enable_mask=1 to enable interrupts when an enable has been removed from the queue set target_met_mask=1 to enable interrupts when a stream's bit count target is met Two additional interrupt service routines are required:

accept enable interrupt

Target met interrupt

When a target met interrupt occurs the service routine should add an enable to its off-chip enable queue.

A.12.7.1 Output gate logic behavior

Writing a 1 to the enable_stream register loads an enable into a short queue.

When a FLUSH (marking the end of a stream) passes through the output gate the gate will close. If there is an enable available at the end of the queue the gate will open and generate an accept_enable_event. If accept_enable_mask is set to one an interrupt can be generated and an enable is removed from the end of the queue (the register enable_stream is reset).

If accept_enable_mask is set to zero no interrupt is generated following the accept_enable_event and the enable is NOT removed from the end of the queue. This mechanism can be used to keep the output gate open as described in A.12.5.

A.12.8 Bit counting

The bit counter starts counting after a FLUSH Token passes through the bit counter. This FLUSH Token indicates the end of the last video stream. The bit counter continues counting until it meets the bit count target set in the bit_count_target register. A target met event is then generated and the bit counter resets to zero and waits for the next FLUSH Token.

The bit counter will also stop incrementing when it reaches its maximum count (255).

A.12.9 Bit count prescale $2^{(bit\_count\_prescale+1)} \times 512$ bits are required to increment the bit counter once. bit_count prescale is a 3 bit register that can hold a value between 0 and 7.

TABLE A.12.2

Example bit counter ranges

| n | Range (bits) | Resolution (bits) |
|---|---|---|
| 0 | 0 to 262144 | 1024 |
| 1 | 0 to 524288 | 2048 |
| 7 | 0 to 31457280 | 122880 |

The bit count is approximate as some elements of the video stream will already have been Tokenized (e.g., the start codes) and includes non-data Tokens.

A.12.10 Counter flushed too early

If a FLUSH token arrives at the bit counter before the bit count target is attained an event is generated which can cause an interrupt (if counter_flushed_too_early_mask=1). If the interrupt is generated then the bit counter circuit will stop, preventing further data input. It is the responsibility of the user's software to decide when to open the output gate after this event has occurred. The output gate can be made to open by writing 0 as the bit count target.

These circumstances should only arise when trying to decode video streams that last only a few pictures.

SECTION A.13 Buffer Management

The Spatial Decoder manages two logical data buffers: the coded data buffer (CDB) and the Token buffer (TB).

The CDB buffers coded data between the start code detector and the input of the Huffman decoder. This provides buffering for low data rate coded video data. The TB buffers data between the output of the Huffman decoder and the input of the spatial video decoding circuits (inverse modeler, quantizer and DCT).

Both buffers are held in a single off-chip DRAM array. The addresses for these buffers are generated by the buffer manager.

A.13.1 Buffer manager registers

The Spatial Decoder buffer manager is intended to be configured once immediately after the device is reset. In normal operation there is no requirement to reconfigure the buffer manager.

After reset is removed from the Spatial Decoder the buffer manager is halted (with its access register, buffer_manager_access, set to 1) awaiting configuration. After the registers have been configured buffer_manager_access can be set to 0 and decoding can commence.

Most of the registers used in the buffer manager cannot be accessed reliably while the buffer manager is operating. Before any of the buffer manager registers are accessed buffer_manager_access must be set to 1 to halt the buffer manager. Due to the operation of the buffer manager it may take several clock cycles for the buffer manager to halt after 1 is written to buffer_manager_access. This makes it essential to observe the protocol of waiting until the value 1 can be read from buffer_manager_access. The time taken to obtain and release access should be taken into consideration when polling such registers as cdb_full and cdb_empty to monitor buffer conditions.

TABLE A.13.1

Buffer manager registers

| Register name | Size/Dir. | Reset State | Description |
|---|---|---|---|
| buffer_manager_access | 1 rw | 1 | This access bit stops the operation of the buffer manager so that its various registers can be accessed reliably. See A.6.4.1. Note: this access register is unusual as its default state after reset is 1.i.e. after reset the buffer manager is halted awaiting configuration via the microprocessor interface. |
| buffer_manager_keyhole_address | 6 rw | x | Keyhole access to the extended address space used for the buffer manager registers shown below. See A.6.4.3 for more |
| buffer_manager_keyhole_data | 8 rw | x | information about accessing registers througn a keyhole. |
| buffer_limit | 18 rw | x | This specifies the overall size of the DRAM array attached to the Spatial Decoder. All buffer addresses are caculated MCC this buffer size and so will wrap around within the DRAM provided. |
| cdb_base tb_base | 18 rw | x | These registers point to the base of the data (cdb) and Token (tb) buffers. |
| cdb_length tb_length | 18 rw | x | These registers specify and the length (i.e. size) of the coded data (ddb) and Token (tb) buffers. |
| cdb_read tb_read | 18 ro | x | These registers hold an offset from the buffer base and indicate where data will be read from next. |
| cdb_number tb_number | 18 ro | x | These registers show how much data is current held in the buffers. |
| cdb_full tb_full | 1 ro | x | These registers will be set to 1 if the coded data (cdb) or Token to buffers fills. |
| cdb_empty tb_empty | 1 ro | x | The registers will be set to 1 if the coded data (cdb) of Token (tb) buffer empties. |

A.13.1.1 Buffer manager pointer values

Data is transferred between the Spatial Decoder and the off_chip DRAM in 64 byte bursts (using the DRAM's fast page mode). All the buffer pointers and length registers refer to these 64 byte (512 bit) blocks of data. So, the buffer manager's 18 bit registers describe a 256 k block linear address space (i.e., 128 Mb).

The 64 byte transfer is independent of the width (8, 16 or 32 bits) of the DRAM interface.

A.13.2 Use of the buffer manager registers

The Spatial Decoder buffer manager has two sets of registers that define two similar buffers. The buffer limit register (buffer_limit) defines the physical upper limit of the memory space. All addresses are calculated modulo this number.

Within the limits of the available memory the extent of each buffer is defined by two registers: the buffer base (cdb_base and tb_base) and the buffer length (cdb_length and tb_length). All the registers described thus far must be configured before the buffers can be used.

The current status of each buffer is visible in 4 registers. The buffer read register (cdb_read and tb_read) indicates an offset from the buffer base from which data will be read next. The buffer number registers (cdb_number and tb_number) indicate the amount of data currently held by buffers. The status bits cdb_full, tb_full, cdb_empty and tb_empty indicate if the buffers are full or empty.

As stated in A.13.1.1, the unit for all the above mentioned registers is a 512 bit block of data. For example, the value read from cdb_number should be multiplied by 512 to obtain the number of bits in the coded data buffer.

A.13.3 Zero buffers

Still picture applications (e.g., using JPEG) that do not have a "real-time" requirement will not need the large off-chip buffers supported by the buffer manager. In this case the DRAM interface can be configured (by writing 1 to the zero_buffers register) to ignore the buffer manager and instead provide a 128 bit stream on-chip FIFO for the coded data buffer and the Token buffers.

The zero buffers option may also be appropriate for applications working at low data rates and with small picture formats.

Note: the zero_buffers register is part of the DRAM interface and so should be set only during the post-reset configuration of the DRAM interface.

A.13.4 Buffer operation

The data transfer through the buffers is handshaken. It is guaranteed that no data errors will occur if the buffer fills or empties. If a buffer fills then the circuits trying to send data to the buffer will be halted until there is room in the buffer. If a buffer continues to be full more processing stages "up stream" of the buffer will halt until the Spatial Decoder is unable to accept data on its input port. Similarly, if a buffer empties, then the circuits trying to remove data from the buffer will halt until data is available.

As described in A.13.2 the position and size of the coded data and Token buffer are specified by the buffer base and length registers. The user is responsible for configuring these registers and for ensuring that there is no conflict in memory usage between the two buffers.

SECTION A.14 Video Demux

The Video Demux completes the task of converting coded data into Tokens started by the start code detector. There are four main processing blocks in the Video Demux: Parser, Huffman decoder, Macroblock counter and ALU.

The Parser follows the syntax of the coded video data and instructs the other units. The Huffman decoder converts variable length coded (VLC) data into integers. The Macroblock counter keeps track of which section of a picture is being decoded.

A.14.1 Video Demux registers

TABLE A.14.1

Top level Video Demux registers

| Register name | Size/Dir. | Reset State | Description |
|---|---|---|---|
| demux_access<br>buffer empties<br>CED_H_CTRL(7) | 1<br><br>rw | 0 | This access bit stops the operation of the Video Demux so that it's various registers can be accessed reliably. See A.6.4.1. |
| huffman_error_code<br>CED_H_CTRL[6:4] | 3<br>ro | | When the Video Demux stops following the generation of a huffman_event interrupt request this 3 bit register holds a value indicating why the interrupt was generated. See A.14.5.1. |
| parser_error_code<br>CED_H_DMUX_ERR | 8<br>ro | | When the Video Demux stops following the generation of a parser_event interrupt request this 8 bit register holds a value indicating why the interrupt was generated. See A.14.5.2. |
| demux_keyhole_addresss<br>CED_H_KEYHOLE_ADDR | 12<br>rw | x | Keyhole access to the Video Demux's extended address space. See A.6.4.2 for more information about accessing registers |
| demux_keyhole_data<br>CED_H_KEYHOLE | 8<br>rw | x | through a keyhole.<br>Tables A.14.2, A.14.3 and A.14.4 describe the registers that can be accessed via the keyhole. |
| dummy_last_picture<br>CED_H_ALU_REG0<br>r_rom_control<br>r_dummy_last_frame_bit | 1<br>rw | 0 | When this register is set to 1 the Video Demux will generate information for a "dummy" intra picture as the last picture of an MPEG sequence. This function is useful when the Temporal Decoder is configured for automatic picture re-ordering (See A.18.3.5. "Picture sequence re-ordering" to flush the last P or I picture out of the Temporal Decoder.<br>No "dummy" picture is required if:<br>• the Temporal Decoder is not configured for re-ordering<br>• another MPEG sequence will be decoded immediately (as this will also flush out the last picture)<br>• the coding standard is not MPEG |
| field_info<br>CED_H_ALU_REG0<br>r_rom_control<br>r_field_info_bit | 1<br>rw | 0 | When this register is set to 1 the first byte of any MPEG extra_information_picture is placed in the FIELD_INFO Token. See A.14.7.1. |
| continue<br>CED_H_ALU_REG0<br>r_rom_control<br>r_continue_bit | 1<br>rw | 0 | This register allows user software to control how much extra, user or extension data it wants to receive when is it is detected by the decoder. See A.14.6 and A.14.7. |
| rom_revision<br>CED_H_ALU_REG1<br>r_rom_revision | 8<br>ro | | Immediately following reset this holds a copy of the microcode RCM revision number.<br>This register is also used to present to control software data values read from the coded data. See A.14.6, "Receiving User and Extension data" and A.14.7, "Receiving Extra Information". |
| huffman_event | 1<br>rw | 0 | A Huffman event is generated if an error is found in the coded data. See A.14.51 for a description of these events. |
| huffman_mask | 1<br>rw | 0 | If the mask register is set to 1 then an interrupt can be generated and the Video Demux will stop. If the mask regster is set to 0 then no interrupt is generated and the Video Demux will attempt to recover from the error. |
| parser_event | 1<br>rw | 0 | A Parser event can be is response to errors in the coded date or to the arrival of information at the Video Demux that require software intervention. See A.14.5.2 for a description of these events. |
| parser_event | 1<br>rw | 0 | If the mask register is set to 1 then an interrupt can be generate and the Video Demux will stop. If the mask register is set to 0 the no interrupt is generated and the Video Demux will attempt to continue. |

TABLE A.14.2 video demux picture

| Register name | Size/Dir. | Reset State | Description |
|---|---|---|---|
| component_name_0<br>component_name_1<br>component_name_2<br>component_name_3 | 8<br>rw | x | During JPEG operation the register component_name_n holds an 8 bit value indicating (to an application) which colour component has the component ID n. |
| horiz_pels | 16<br>rw | x | These registers hold the horizontal and vertical dimensions of the video being decoded in pixels. |
| vert_pels | 16<br>rw | x | See section A.14.2. |
| phoriz_macroblocks | 16<br>rw | x | These registers hold the horizontal and vertical dimensions of the video being decoded in macroblocks. |
| vert_macroblocks | 16<br>rw | x | See section A.14.2. |
| max_h | 2<br>rw | x | These registers hold the macroblock width and height in blocks (8 × 8 pixels). The values 0 to 3 indicate a width/height or 1 to 4 blocks. |
| max_v | 2<br>rw | x | See secton A.14.2. |
| max_component_id | 2 | x | The values 0 to 3 indicate that 1 to 4 different video components are currently |

TABLE A.14.2-continued video demux picture

| Register name | Size/Dir. | Reset State | Description |
|---|---|---|---|
| | rw | | being decoded. See section A.14.2 |
| Nf | 8 rw | x | During JREG operation this register holds the parameter Nf (number of image components in frame). |
| blocks_h_0 blocks_h_1 blocks_h_2 blocks_h_3 | 2 rw | x | For each of the 4 colour components the registers blocks_h_n and blocks_v_n hold the number of blocks honzontally and vertically in a macroblock for the colour component with component ID n. See section A.14.2. |
| blocks_v_0 blocks_v_1 blocks_v_2 blocks_v_3 | 2 rw | x | |
| tq_0 tq_1 tq_2 tq_3 | 2 rw | x | The two bit value held by the register tq_n describes which inverse Quantisation table is to be used when decoding data with component ID n. |

A.14.1.1 Register loading and Token generation

Many of the registers in the Video Demux hold values that relate directly to parameters normally communicated in the coded picture/video data. For example, the horiz_pels register corresponds to the MPEG sequence header information, horizontal_size, and the JPEG frame header parameter, X. These registers are loaded by the Video Demux when the appropriate coded data is

TABLE A.14.3

Video demux Huffman table registers

| Reister name | Size/Dir. | Reset State | Decsription |
|---|---|---|---|
| dc_huff_0 dc_huff_1 dc_huff_2 dc_huff_3 ac_huff_0 ac_huff_1 ac_huff_2 ac_hufl_3 | 2 rw 2 rw | | The two bit value held by the register dc_huff_n describes which Huffman decoding table is to be used when decoding the DC coefficients of data with component ID n. Similarly ac_huff_n describes the table to be used when decoding AC coefficients. Baseline JPEG requires up to two Huffman tables per scan. The only tables implemented are 0 and 1. |
| dc_bits_0[15:0] dc_bits_1[15:0] ac_bits_0[15:0] ac_bits_1[15:0] | 8 rw 8 rw | | Each of these is a table of 16, eight bit values. They provide the BITS information (see JPEG Huffman table specification) which form part of the description of two DC and two AC Huffman tables. See section A.14.3.1 |
| dc_huffval_0[11:0] dc_huffval_1[11:0] | 8 rw | | Each of these is a table of 12, eight bit values. They provide the HUFFVAL information (see JPEG Huffman table specificaton) which form part of the description of two AC Huffman tables. See section A.14.3.1. |
| ac_huffval_0[161:0] ac_huffval_1[161:0] | 8 rw | | Each of these is a table of 162, eight bit values. They provide the HUFFAVL information (see JPEG Huffman table specification) which form part of the description of two DC Huffman tables. See section A.14.3.1. |
| dc_zssss_0 dc_zssss_1 ac_eob_0 ac_eob_1 ac_zrl_0 ac_zrl_1 | 8 rw 8 rw 8 rw | | These 8 bit registers hold values that are "special cased" to accelerate the decoding of certain frequently used JPEG VLCs. dc_ssss - magnitude of DC coefficient is 0. ac_eob - end of block ac_zrl - run of 16 zeros | decoded. These registers are also associated with a Token. For example, the register, horiz_pels, is associated with Token, HORIZONTAL_SIZE. The Token is generated by the Video Demux when

TABLE A.14.4

Other Video Demux registers

| Register name | Size/Dir. | Reset State | Description |
|---|---|---|---|
| buffer_size | 10 rw | | This register is loaded when decoding MPEG data with a value indicating the size of VBV buffer required in an ideal decoder. This value is not used by the decoder chips. However, the value it holds may be useful to user software when configuring the coded data buffer size and to determine whether the decoder is capable of decoding a particular MPEG data file. |
| pel_aspect | 4 rw | | This register is loaded when decoding MPEG data with a value indicating the pel aspect ratio. The value is a 4 bit integer that is used as an index into a table defined by MPEG. See the MPEG standard for a definition of this table. This value is not used by the decoder chips. However, the value it holds may be useful to user software when configuring a display or output device. |
| bit_rate | 18 rw | | This register is loaded when decoding MPEG data with a value indicating the coded data rate. See the MPEG standard for a definition of this value, This value is not used by the decoder chips. However, the value it holds may be useful to user software when configuring the decoder start-up registers. |
| pic_rate | 4 rw | | This register is loaded when decoding MPEG data with a value indicating the picture rate. See the MPEG standard for a definition of this value. This value is not used by the decoder chips. However, the value it holds may be useful to user software when configuring a display or output device. |
| constrained | 1 rw | | This register is loaded when decoding MPEG data to indicate if the coded data meets MPEG's constrained parameters. See the MPEG standard for a definition of this flag. This value is not used by the decoder chips. However, the value it holds may be useful to user software to determine whether the decoder is capable of decoding a particular MPEG data file. |
| picture_type | 2 rw | | During MPEG operation this register holds the picture type of the picture being decoded. |
| h_261_pic_type | 8 rw | | This register is loaded when decoding H.261 data. It holds information about the picture format. |

| 7 | 6 | 5 | 4 | 3 | 2 | 1 | 0 |
|---|---|---|---|---|---|---|---|
| r | r | s | d | f | q | r | r |

Flags:
s - Split Screen Indicator
d - Document Camera
r - Freeze Picture Release
This value is not used by the decoder chips. However, the information should be used when configuring horiz_pels, vert_pels and the display or output device.

| Register name | Size/Dir. | Reset State | Description |
|---|---|---|---|
| broken_closed | 2 rw | | During MPEG operation this register holds the broken_link and closed_gap information for the group of pictures being decoded. |

| 7 | 6 | 5 | 4 | 3 | 2 | 1 | 0 |
|---|---|---|---|---|---|---|---|
| r | r | r | r | r | r | c | b |

Flags:
c - closed_gap

| Register name | Size/Dir. | Reset State | Description |
|---|---|---|---|
| prediction_mode | 5 rw | | During MPEG and H.261 operation this register holds the current value of prediction mode. |

TABLE A.14.4-continued

Other Video Demux registers

| Register name | Size/Dir. | Reset State | Description |
|---|---|---|---|
| | | | |

| 7 | 6 | 5 | 4 | 3 | 2 | 1 | 0 |
|---|---|---|---|---|---|---|---|
| r | r | r | h | y | x | b | f |

Flags:
h - enable H.261 loop filter
y - reset backward vector prediction.

| Register name | Size/Dir. | Reset State | Description |
|---|---|---|---|
| vbv_delay | 16 rw | | This register is loaded when decoding MPEF data with a value indicating the minimum start-up delay before decoding should start. See the MPEG standard for a definition of this value. This value is not used by the decoder chips. However, the value it holds may be useful to user software when configuring the decoder start-up registers. |
| pic_number | 8 rw | | This register holds the picture number for the pictures that is currently being decoded by the Video Demux. This number was generated by the start code detector when this picture arrived there. See Table A.11.2 for a description of the picture number. |
| dummy_last_picture | 1 rw | 0 | These registers are also visible at the top level. See Table A.14.1. |
| field_info | 1 rw | 0 | |
| continue | 1 rw | 0 | |
| rom_revision | 8 rw | | |
| coding_standard | 2 ro | | This register is loaded by the CODING_STANDARD Token to configure the Video Demux's mode of operation. See section A.21.1. |
| restart_interval | 8 rw | | This register is loaded when decoding JPEG data with a value indicating the minimum start-up delay before decoding should start. See the MPEG standard for a definition of this value. |

(or soon after) the coded data is decoded. The Token can also be supplied directly to the input of the Spatial Decoder. In this case, the value carried by the Token will configure the Video Demux register associated with it.

TABLE A.14.5

Register to Token cross reference

| Register | Token | standard | comment |
|---|---|---|---|
| component_name_n | COMPONENT_NAME | JPEG | in coded data. |
| | | MPEG | not used in standard |
| | | H.261 | |
| horiz_pels | HORIZONTAL_SIZE | MPEG | in coded data. |
| vert_pels | VERTICAL_SIZE | JPEG | |
| | | H.261 | automatically derived from picture type. |
| horiz_macroblocks | HORIZONTAL_MBS | MPEG | control software must derive from |
| vert_macroblocks | VERTICAL_MBS | JPEG | horizontal and vertical picture size. |
| | | H.261 | automatically derived from picture type. |
| max_h | DEFINE_MAX_SAMPLING | MPEG | control software must configure. Sampling structure is fixed by standard. |
| max_v | | | |
| | | JPEG | in coded data. |
| | | H.261 | automatically configured for 4:2:0 video. |
| max_component_id | MAX_COMP_ID | MPEG | control software must configure. Sampling structure is fixed by standard. |
| | | JPEG | in coded data. |
| | | H.261 | automatically configured for 4:2:0 |

TABLE A.14.5-continued

Register to Token cross reference

| Register | Token | standard | comment |
|---|---|---|---|
| tq_0 | JPEG_TABLE_SELECT | JPEG | video.<br>in coded data. |
| tq_1 | | MPEG | not used in standard. |
| tq_2 | | H.261 | |
| tq_3 | | | |
| blocks_h_0 | DEFINE_SAMPLING | MPEG | control software must configure. Sampling structure is fixed by standard. |
| blocks_h_1 | | | |
| blocks_h_2 | | | |
| blocks_h_3 | | JPEG | in coded data. |
| blocks_v_0 | | H.261 | automatically configured for 4:2:0 video. |
| blocks_v_1 | | | |
| blocks_v_2 | | | |
| blocks_v_3 | | | |
| dc_huff_0 | in scan header data | JPEG | in coded data. |
| dc_huff_1 | MPEG_DCH_TABLE | MPEG | control software must configure |
| dc_huff_2 | | H.261 | not used in standard. |
| dc_huff_3 | | | |
| ac_huff_0 | in scan header data | JPEG | in coded data. |
| ac_huff_1 | | MPEG | not used in standard. |
| ac_huff_2 | | H.261 | |
| ac_huff_3 | | | |
| dc_bits_0[15.0] | in DATA Token following | JPEG | in coded data. |
| dc_bits_1[15:0] | DHT_MARKER Token | | |
| dc_huffval_0[11:0] | | MPEG | control software must configure. |
| dc_huffval_1[11:0] | | H.261 | not used in standard |
| dc_zssss_0 | | | |
| dc_zssss_1 | | | |
| ac_bits_0[15:0] | in DATA Token following | JPEG | in coded data. |
| ac_bits_1[15:0] | DHT_MARKER Token | | |
| ac_huffval_0[161:0] | | MPEG | not used in standard. |
| ac_huffval_1[161:0] | | H.261 | |
| ac_eob_0 | | | |
| ac_eob_1 | | | |
| ac_zrl_0 | | | |
| ac_zrl_1 | | | |
| buffer_size | VBV_BUFFER_SIZE | MPEG | in coded data. |
| | | JPEG | not used in standard. |
| | | H.261 | |
| pel_aspect | PEL_ASPECT | MPEG | in coded data. |
| | | JPEG | not used in standard. |
| | | H.261 | |
| bit_rate | BIT_RATE | MPEG | in coded data. |
| | | JPEG | not used in standard. |
| | | H.261 | |
| pic_rate | PICTURE_RATE | MPEG | in coded data. |
| | | JPEG | not used in standard. |
| | | H.261 | |
| constrained | CONSTRAINED | MPEG | in coded data. |
| | | JPEG | not used in standard. |
| | | H.261 | |
| picture_type | PICTURE_TYPE | MPEG | in coded data. |
| | | JPEG | not used in standard |
| | | H.261 | |
| broken_closed | BROKEN_CLOSED | MPEG | in coded data. |
| | | JPEG | not used in standard. |
| | | H.261 | |
| prediction_mode | PREDICTION_MODE | MPEG | in coded data. |
| | | JPEG | not used in standard. |
| | | H.261 | |
| h_261_pic_type | PICTURE_TYPE<br>(when standard is H.261) | MPEG<br>JPEG<br>H.261 | not relevant<br><br>in coded data. |
| vbv_delay | VBV_DELAY | MPEG | in coded data. |
| | | JPEG | not used in standard. |
| | | H.261 | |
| pic_number | Carried by:<br>PICTURE_START | MPEG<br>JPEG<br>H.261 | Generated by start code detector. |
| coding_standard | CODING_STANDARD | MPEG<br>JPEG<br>H.261 | configured in start code by control software detector. |

A.14.2 Picture structure

Picture dimensions are described to the Spatial Decoder in 2 different units: pixels and macroblocks. JPEG and MPEG both communicate picture dimensions in pixels. The dimensions in pixels indicate the area of the buffer that contains the valid data, this may be smaller than the total buffer size. The dimensions in macroblocks indicate the size of buffer required by the decoder. The macroblock dimensions must be derived by the user from the pixel dimensions. The Spatial Decoder registers associated with this information are: horiz_pels, vert_pels, horiz_macroblocks and vert_macroblocks.

The Spatial Decoder registers blocks_h_n, blocks_v_n, max_h, max_v and max_component_id specify the composition of macroblocks (minimum coding units in JPEG). Each is a 2 bit register that can hold values in the range 0 to 3. All except max_component_id specify a block count of 1 to 4. For example, if register max_h holds 1 then a macroblock is two blocks wide. max_component_id specifies the number of different color components involved.

TABLE A.14.6

Configuration for various macroblock formats

|  | 2:1:1 | 4:2:2 | 4:2:0 | 1:1:1 |
|---|---|---|---|---|
| max_h | 1 | 1 | 1 | 0 |
| max_v | 0 | 1 | 1 | 0 |
| max_component_id | 2 | 2 | 2 | 2 |
| blocks_h_0 | 1 | 1 | 1 | 0 |
| blocks_h_1 | 0 | 0 | 0 | 0 |
| blocks_h_2 | 0 | 0 | 0 | 0 |
| blocks_h_3 | x | x | x | x |
| blocks_v_0 | 0 | 1 | 1 | 0 |
| blocks_v_1 | 0 | 1 | 0 | 0 |
| blocks_v_2 | 0 | 1 | 0 | 0 |
| blocks_v_3 | x | x | x | x |

A.14.3 Huffman tables
A.14.3.1 JPEG style Huffman table descriptions

Huffman table descriptions are provided to the Spatial Decoder using the format used by JPEG to communicate between an encoder and a decoder. There are two elements to each table description: BITS and HUFFVAL. For a full description of how tables are encoded see the JPEG specification.

A.14.3.1.1 BITS

BITS is a table of values that describes how many different symbols are encoded with each length of VLC. Each entry is an 8 bit value. JPEG permits VLCs with up to 16 bits long, so there are 16 entries in each table.

The BITS[0] describes how many different 1 bit VLCs there are, BITS[1] describes how many different 2 bit VLCs there are, etc.

A.14.3.1.2 HUFFVAL

HUFFVAL is table of 8 bit data values in order of increasing VLC length. The size of this table will depend on the number of different symbols that can be encoded by the VLC.

The JPEG specification describes how Huffman coding tables can be encoded into this format or decoded from it.

A.14.3.1.3 Configuration by Tokens

In a JPEG bitstream the DHT marker precedes the description of the Huffman tables used to code AC and DC coefficients. When the start code detector recognizes a DHT marker it generates a DHT_MARKER Token and places the Huffman table description in the following DATA Token (see A.11.3.4).

Configuration of AC and DC coefficient Huffman tables within the Spatial Decoder can be achieved by supplying DATA and DHT_MARKER Tokens to the input of the Spatial Decoder while the Spatial Decoder is configured for JPEG operation. This mechanism can be used for configuring the DC coefficient Huffman tables required for MPEG operation, however, the coding standard of the Spatial Decoder must be set to JPEG while the tables are down loaded.

TABLE A.14.7

Huffman table configuration via Tokens

| E | 7 | 6 | 5 | 4 | 3 | 2 | 1 | 0 | Token Name | | |
|---|---|---|---|---|---|---|---|---|---|---|---|
| 1 | 0 | 0 | 0 | 1 | 0 | 1 | 0 | 1 | CODING_STANDARD | | |
| 0 | 0 | 0 | 0 | 0 | 0 | 0 | 0 | 1 | 1 = JPEG | | |
| 0 | 0 | 0 | 0 | 1 | 1 | 1 | 0 | | DHT_MARKER | | |
| 1 | 0 | 0 | 0 | 0 | 0 | 1 | x | x | $DAT_{Th}A$ | | |
| 1 | t | t | t | t | t | t | t | t | - Value indicating which Huffman table is to be loaded. JPEG allows 4 tables to be downloaded. Values 0x00 and 0x01 specify DC coefficient coding tables 0 and 1. Values 0x10 and 0x11 specifies AC coefficient coding tables 0 and 1. | This sequence can be repeated to allow several tables to be described in a single Token. |
| 1 | n | n | n | n | n | n | n | n | $L_i$ - 16 words carrying BITS information | | |
| 1 | n | n | n | n | n | n | n | n | | | |
| 1 | n | n | n | n | n | n | n | n | $V_{ij}$ - Words carrying HUFFVAL information (the number of words depends on the number of different symbols). e - the extension bit will be 0 if this is the end of the DATA Token or 1 if another table description is contained in the same DATA Token. | | |
| e | n | n | n | n | n | n | n | n | | | |

A.14.3.1.4 Configuration by MPI

The AC and DC coefficient Huffman tables can also be written directly to registers via the MPI. See Table A.14.3.

The registers dc_bits_0[15:0] and dc_bits_1[15:0] hold the BITS values for tables 0×00 and 0×01.

The registers ac_bits_0[15:0] and ac_bits_1[15:0] hold the BITS values for tables 0×10 and 0×11.

The registers dc_huffval_0[11:0] and dc_huffval_1[11:0] hold the HUFFVAL values for tables 0×00 and 0×01.

The registers ac_huffval_0[161:0] and ac_huffval_1[161:0] hold the HUFFVAL values for tables 0×10 and 0×11.

A.14.4 Configuring for different standards

The Video Demux supports the requirements of MPEG, JPEG and H.261. The coding standard is configured automatically by the CODING_STANDARD Token generated by the start code detector.

A.14.4.1 H.261 Huffman tables

All the Huffman tables required to decode H.261 are held in ROMs within the Spatial Decoder and so require no user intervention.

A.14.4.2 H.261 Picture structure

H.261 is defined as supporting only two picture formats: CIF and QCIF. The picture format in use is signalled in the PTYPE section of the bitstream. When this data is decoded by the Spatial Decoder it is placed in the h_261_pic_type registers and the PICTURE_TYPE Token. In addition all the picture and macroblock construction registers are configured automatically.

The information in the various registers is also placed into their related Tokens (see Table A.14.5), this ensures that other decoder chips (such as the Temporal Decoder) are correctly configured.

A.14.4.3 MPEG Huffman tables

The majority of the Huffman coding tables required to decode MPEG are held in ROMs within the Spatial Decoder and so require no user intervention. The exceptions are the tables required for decoding the DC coefficients of Intra macroblocks. Two tables are required, one for chroma the other for luma. These must be configured by user software before decoding is possible.

TABLE A.14.8

Automatic settings for H.261

| MACROBLOCK CONSTRUCTION | CIF/ OCIF | PICTURE CONSTRUCTION. | CIF | OCIF |
|---|---|---|---|---|
| max_h | 1 | horiz_pels | 352 | 176 |
| max_v | 1 | vert_pels | 288 | 144 |
| max_component_id | 2 | horiz_macroblocks | 22 | 11 |
| blocks_h_0 | 1 | vert_macroblocks | 18 | 9 |
| blocks_h_1 | 0 | | | |
| blocks_h_2 | 0 | | | |
| blocks_v_0 | 1 | | | |
| blocks_v_1 | 0 | | | |
| blocks_v_2 | 0 | | | |

Table A.14.10 shows the sequence of Tokens required to configure the DC coefficient Huffman tables within the Spatial Decoder. The same results can be obtained by writing this information to registers via the MPI.

The registers dc_huff_n control which DC coefficient Huffman tables are used with which color component. Table A.14.9 shows how they should be configured for MPEG operation. This can be done directly via the MPI or by using the MPEG_DCH_TABLE Token.

TABLE A.14.9

MPEG DC Huffman table selection via MPI

| dc_huff_0 | 0 |
|---|---|
| dc_huff_1 | 1 |
| dc_huff_2 | 1 |
| dc_huff_3 | x |

TABLE A.14.10

MPEG DC Huffman table configuration

| E | (7:0) | Token Name |
|---|---|---|
| 1 | 0x15 | CODING_STANDARD |
| 0 | 0x01 | 1 = JPEG |
| 0 | 0x1C | DHT_MARKER |
| 1 | 0x04 | DATA (could be any colour component, 0 is used in this example) |

TABLE A.14.10-continued

MPEG DC Huffman table configuration

| E | (7:0) | Token Name |
|---|---|---|
| 1 | 0x00 | 0 indicates that this Huffman table is DC coefficient coding table 0 |
| 1 | 0x00 | 16 words carrying BITS information describing a total of |
| 1 | 0x02 | 9 different VLCs: |
| 1 | 0x03 | 2,2 bit codes |
| 1 | 0x01 | 3,3 bit codes |
| 1 | 0x01 | 1,4 bit codes |
| 1 | 0x01 | 1,5 bit codes |
| 1 | 0x01 | 1,6 bit codes |
| 1 | 0x00 | 1,7 bit codes |
| 1 | 0x00 | If configuring via the MPI rather than with Tokens |
| 1 | 0x00 | these values would be |
| 1 | 0x00 | written into the dc_bits_0[15:0] registers. |
| 1 | 0x00 | |
| 1 | 0x00 | |
| 1 | 0x00 | |
| 1 | 0x00 | |
| 1 | 0x00 | |
| 1 | 0x01 | 9 words carrying HUFFVAL information |
| 1 | 0x02 | If configuring via the MPI rather than with tokens |
| 1 | 0x00 | these values would be |
| 1 | 0x03 | written into the dc_huffval_0[11:0] registers. |
| 1 | 0x04 | |
| 1 | 0x05 | |
| 1 | 0x06 | |
| 1 | 0x07 | |
| 1 | 0x08 | |
| 0 | 0x1C | DHT_MARKER |
| 1 | 0x04 | DATA (could be any colour component, 0 is used in this example) |
| 1 | 0x01 | 1 indicates that this Huffman table is DC coefficient coding table 1 |
| 1 | 0x00 | 16 words carrying BITS information describing a total of |
| 1.00 | 0x03 | 9 different VLCs: |
| 1 | 0x01 | 3,2 bit codes |
| 1 | 0x01 | 1,3 bit codes |
| 1 | 0x01 | 1,4 bit codes |
| 1 | 0x01 | 1,5 bit codes |
| 1 | 0x01 | 1,6 bit codes |
| 1 | 0x01 | 1,7 bit codes |
| 1 | 0x00 | 1,8 bit codes |
| 1 | 0x00 | If configuring via the MPI rather than with Tokens |
| 1 | 0x00 | these values would be |
| 1 | 0x00 | written into the dc_bits_1[15:0] registers. |
| 1 | 0x00 | |
| 1 | 0x00 | |
| 1 | 0x00 | |
| 1 | 0x00 | |
| 1 | 0x00 | 9 words carrying HUFFVAL information |
| 1 | 0x01 | If configuring via the MPI rather than with Tokens |
| 1 | 0x02 | these values would be |
| 1 | 0x03 | written into the dc_huffval_1[11:0] registers. |
| 1 | 0x04 | |
| 1 | 0x05 | |
| 1 | 0x06 | |
| 1 | 0x07 | |
| 0 | 0x08 | |
| 1 | 0xD4 | MPEG_DCH_TABLE |
| 0 | 0x00 | Configure so table 0 is used for component 0 |
| 1 | 0xD5 | MPEG_DCH_TABLE |
| 0 | 0x01 | Configure so table 0 is used for component 1 |
| 1 | 0xD6 | MPEG_DCH_TABLE |
| 0 | 0x01 | Configure so table 0 is used for component 2 |
| 1 | 0x15 | CODING_STANDARD |
| 0 | 0x02 | 2 = JPEG |

A.14.4.4 MPEG Picture structure

The macroblock construction defined for MPEG is the same as that used by H.261. The picture dimensions are encoded in the coded data.

For standard 4:2:0 operation the macroblock characteristics should be configured as indicated in Table A.14.8. This can be done either by writing to the registers as indicated or by applying the equivalent Tokens (see Table A.14.5) to the input of the Spatial Decoder.

The approach taken to configuring the picture dimensions will depend upon the application. If the picture format is known before decoding starts then the picture construction registers listed in Table A.14.8 can be initialized with appropriate values. Alternatively, the picture dimensions can be decoded from the coded data and used to configure the Spatial Decoder. In this case the user must service the parser error ERR_MPEG_SEQUENCE, see A.14.8, "Changes at the MPEG sequence layer".

A.14.4.5 JPEG

Within baseline JPEG there are a number of encoder options that significantly alter the complexity of the control software required to operate the decoder. In general the Spatial Decoder has been designed so that the support required is minimal where the following condition is met:

Number of color components per frame is less than 5 ($N_f \leq 4$)

A.14.4.6 JPEG Huffman tables

JPEG allows Huffman coding tables to be down loaded to the decoder. These tables are used when decoding the VLCs describing the coefficients. Two tables are permitted per scan for decoding DC coefficients and two for the AC coefficients.

There are three different types of JPEG file: Interchange format, an abbreviated format for compressed image data and abbreviated format for table data. In an interchange format file there is both compressed image data and a definition of all the tables (Huffman, Quantisation etc.) required to decode the image data. The abbreviated image data format file omits the table definitions. The abbreviated table format file contains just the table definitions.

The Spatial Decoder will accept all three formats. However, abbreviated image data files can only be decoded if all the required tables have been defined. This definition can be done by either of the other two JPEG file types, or alternatively, the tables could be set up by user software.

If each scan uses a different set of Huffman tables then the table definitions are placed (by the encoder) in the coded data before each scan. These are automatically loaded by the Spatial Decoder for use during this and any subsequent scans.

To improve the performance of the Huffman decoding certain commonly used symbols are specially cased. These are: DC coefficient with magnitude 0, end of block AC coefficients and run of 16 zero AC coefficients. The values for these special cases should be written into the appropriate registers.

A.14.4.6.1 Table selection

The registers dc_huff_n and ac_huff_n control which AC and DC coefficient Huffman tables are used with which color component. During JPEG operation these relationships are defined by the $Td_j$ and $Ta_j$ fields of the scan header syntax.

A.14.4.7 JPEG Picture structure

There are two distinct levels of baseline JPEG decoding supported by the Spatial Decoder: up to 4 components per frame ($N_f \leq 4$) and more than 4 components per frame ($N_f > 4$). If $N_f > 4$ the control software required becomes more complex.

A.14.4.7.1 $N_f \leq 4$

The frame component specification parameters contained in the JPEG frame header configure the macroblock construction registers (see Table A.14.8) when they are decoded. No user intervention is required as all the specifications required to decode the 4 different color components are defined.

For further details of the options provided by JPEG the reader should study the JPEG specification. Also, there is a short description of JPEG picture formats in Section A.16.1.

A.14.4.7.2 JPEG with more than 4 components

The Spatial Decoder can decode JPEG files containing up to 256 different color components (the maximum permitted by JPEG). However, more user intervention is required if more than 4 color components are to be decoded. JPEG only allows a maximum of 4 components in any scan.

A.14.4.8 Non-standard variants

The Spatial Decoder supports some picture formats beyond those defined by JPEG and MPEG.

JPEG limits minimum coding units to contain no more than 10 blocks per scan. This limit does not apply to the Spatial Decoder, it can process any minimum coding unit that can be described by blocks_h_n, blocks_v_n, max_h and max_v.

MPEG is only defined for 4:2:0 macroblocks (see Table A.14.8). The Spatial Decoder can process three other component macroblock structures, for example 4:2:2.

A.14.5 Video events and errors

The Video Demux can generate two types of events: parser events and Huffman events. See A.6.3, "Interrupts", for a description of how to handle events and interrupts.

A.14.5.1 Huffman events

Huffman events are generated by the Huffman decoder. The event indicated in huffman_event and huffman_mask determines whether an interrupt is generated. If huffman_mask is set to 1 an interrupt will be generated and the Huffman decoder will halt. The register huffman_error_code[2:0] will hold a value indicating the cause of the event.

If 1 is written to huffman_event after servicing the interrupt the Huffman decoder will attempt to recover from the error. Also if huffman_mask was set to 0 (masking the interrupt and not halting the Huffman decoder) the Huffman decoder will attempt to recover from the error automatically.

A.14.5.2 Parser events

Parser events are generated by the Parser. The event is indicated in parser_event. parser_mask determines whether an interrupt is generated. If parser_mask is set to 1 an interrupt will be generated and the Parser will halt. The register parser_error_code[7:0] will hold a value indicating the cause of the event.

If 1 is written to parser_event after servicing the interrupt the Parser will start operation again. If the event indicated a bitstream error the Video Demux will attempt to recover from the error.

If parser_mask was set to 0 the Parser will set its event bit but will not generate an interrupt or halt. It will continue operation and attempt to recover from the error automatically.

TABLE A.14.11

Huffman error codes

| huffman_error [2] | [1] | [0] | Description |
|---|---|---|---|
| 0 | 0 | 0 | No error. This error should not occur during normal operation. |
| X | 0 | 1 | Failed to find terminal code in VLC within 16 bits. |
| X | 1 | 0 | Found serial data when Token expected. |
| X | 1 | 1 | Found Token when serial data expected. |
| 1 | X | X | Information describing more than 64 coefficients for a single block was decoded indicating a bitstream error. The block output by the Video Demux will contain only 64 coefficients. |

TABLE A.14.12

Parser error codes

| parser_error_code[7:0] | Description |
|---|---|
| 0x00 | ERR_NO_ERROR<br>No Parser error has occured, this event should not occur during normal operation. |
| 0x10 | ERR_EXTENSION_TOKEN<br>An EXTENSION_DATA Token has been detected by the Parser. The detection of this Token should preceed a DATA Token that contains the extension data. See A.14.6. |
| 0x11 | ERR_EXTENSION_DATA<br>Following the detection of an EXTENSION_DATA Token, a DATA Token containing the extension data has been detected. See A.14.6. |
| 0x12 | ERR_USER_TOKEN<br>A USER_DATA Token has been detected by the Parser. The detection of this Token should preceed a DATA Token that contains the user data. See A.14.6. |
| 0x13 | ERR_USER_DATA<br>Following the detection of a USER_DATA Token, a DATA Token containing the user data has been detedcted. See A.14.6. |
| 0x20 | ERR_PSPARE<br>H.261 PSARE information has been detected see A.14.7. |
| 0x21 | ERR_GSPARE<br>H.261 GSARE information has been detected see A.14.7. |
| 0x22 | ERR_PTYPE<br>The value of the H.261 picture type has changed. The register h_261_pic_type can be inspected to see what the new value is. |
| 0x30 | ERR_JPEG_FRAME |
| 0x31 | ERR_JPEG_FRAME_LAST |
| 0x32 | ERR_JPEG_SCAN<br>Picture size or Ns changed |
| 0x33 | ERR_JPEG_SCAN_COMP<br>Component Change. |
| 0x34 | ERR_DNL_MARKER |
| 0x40 | ERR_MPEG_SEQUENCE<br>One of the parameters communicated in the MPEG sequence layer has changed. See A.14.8. |
| 0x41 | ERR_EXTRA_PICTURE<br>MPEG extra_information_picture has been detected see A.14.7. |
| 0x42 | ERR_EXTRA_SLICE<br>MPEG extra_information_slice has been detected see A.14.7. |
| 0x43 | ERR_VBV_DELAY<br>The VBV_DELAY parameter for the first picture in a new MPEG video sequence has been detected by the Video Demux. The new value of delay is available in the register |

TABLE A.14.12-continued

Parser error codes

| parser_error_code[7:0] | Description |
|---|---|
| | vbv_delay. The first picture of a new sequence is defined as the first picture after a sequence end, FLUSH or reset. |
| 0x80 | ERR_SHORT_TOKEN An incorrectly formed Token has been detected. This error should not occur during normal operation. |
| 0x90 | ERR_H261_PIC_END_UNEXPECTED During H.261 operation the end of a picture has been encountered at an unexpected position. This is likely to indicate an error in the coded data. |
| 0x91 | ERR_GN_BACKUP During H.261 operation a group of blocks has been encountered with a group number less than that expected. This is likely to indicate an error in the coded data. |
| 0x92 | ERR_GN_SKIP_GOB During H.261 operation a group of blocks has been encountered with a group number greater than that expected. This is likely to indicate an error in the coded data. |
| 0xA0 | ERR_NBASE_TAB During JPEG operation there has been an attempt to down load a Huffman table that is not supported by baseline JPEG (baseline JPEG only supports tables 0 and 1 for entropy coding). |
| 0xA1 | ERR_QUANT_PRECISION During JPEG operation there has been an attempt to down load a quantisation table that is not supported by baseline JPEG (baseline JPEG only supports 8 bit precision in quantisation tables). |
| 0xA2 | ERR_SAMPLE_PRECISION During JPEG operation there has been an attempt to specify a sample precision greater than that supported by baseline JPEG (baseline JPEG only supports 8 bit precision). |
| 0xA3 | ERR_NBASE_SCAN One or more of the JPEG scan header parameters Ss, Se, Ah and Al is set to a value not supported by baseline JPEG (indicating spectral selection and/or successive approximation which are not supported in baseline JPEG). |
| 0xA4 | ERR_UNEXPECTED_DNL During JPEG operation a DNL marker has been encountered in a scan that is not the first scan in a frame. |
| 0xA5 | ERR_EOS_UNEXPECTED During JPEG operation an EOS marker has been encountered in an unexpected place. |
| 0xA6 | ERR_RESTART_SKIP During JPEG operation a restart marker has been encountered either in in an unexpected place or the value of the restart marker is unexpected. If a restart marker is not found when one is expected the Huffman event "Found serial data when Token expected" will be generated. |
| 0xB0 | ERR_SKIP_INTRA During MPEG operation, a macro block with a macro block address increment greater than 1 has been found within an intra (1) picture. This is illegal and probably indicates a bitstream error. |
| 0xB1 | ERR_SKIP_DINTRA During MPEG operation, a macro block with a macro block address increment greater than 1 has been found within an DC only (D) picture. This is illegal and probably indicates a bitstream error. |
| 0xB2 | ERR_BAD_MARKER During MPEG operation, a marker bit did not have the expected value. This probably indicates a bitstream error. |
| 0xB3 | ERR_D_MBTYPE During MPEG operation, within a DC only (D) picture, a macroblock was found with a macroblock type other than 1. This is illegal and probably indicates a bitstream error. |
| 0xB4 | ERR_D_MBEND During MPEG operation, within a DC only (D) picture, a macroblock was found with 0 in it's end of macroblock bit. This is illegal and probably indicates a bitstream error. |
| 0xB5 | ERR_SVP_BACKUP During MPEG operation, a slice has been encountered with a slice vertical position less than that expected. This is likely to indicate an error in the coded data. |
| 0xB6 | ERR_SVP_SKIP_ROWS During MPEG operation, a slice has been encountered with a slice vertical position greater than that expected. This is likely to indicate an error in the coded data. |
| 0xB7 | ERR_FST_MBA_BACKUP During MPEG operation, a macroblock has been encountered with a macro block address less than that expected. This is likely to indicate an error in the coded data. |
| 0xB8 | ERR_FST_MBA_SKIP During MPEG operation, a macroblock has been encountered with a macro block address greater than that expected. This is likely to indicate an error in the coded data. |
| 0xB9 | ERR_PICTURE_END_UNEXPECTED During MPEG operation, a PICTURE_END Token has been encountered in an unexpected place. This is likely to indicate an error in the coded data. |
| 0xE0 . . . 0xEF | Errors reserved for internal test programs |
| 0xE0 | ERR_TST_PROGRAM Mysteriously arrived in the test program. |
| 0xE1 | ERR_NO_PROGRAM If the test program is not compiled in |
| 0xE2 | ERR_TST_END End of Test |
| 0xF0 . . . 0xFF | Reserved errors |
| 0xF0 | ERR_UCODE_ADDR fell off the end of the world |
| 0xF1 | ERR_NOT_IMPLEMENTED |

Each standard uses a different sub-set of the defined Parser error codes.

TABLE A.14.13

Parser error codes and the different standards

| Token Name | MPEG | JPEG | H.261 |
|---|---|---|---|
| ERR_NO_ERROR | ✓ | ✓ | ✓ |
| ERR_EXTENSION_TOKEN | ✓ | ✓ | |
| ERR_EXTENSION_DATA | ✓ | ✓ | |
| ERR_USER_TOKEN | ✓ | ✓ | |
| ERR_USER_DATA | ✓ | ✓ | |
| ERR_PSPARE | | | ✓ |
| ERR_GSPARE | | | ✓ |
| ERR_PTYPE | | | ✓ |
| ERR_JPEG_FRAME | | ✓ | |
| ERR_JPEG_FRAME_LAST | | ✓ | |
| ERR_JPEG_SCAN | | ✓ | |
| ERR_JPEG_SCAN_COMP | | ✓ | |
| ERR_DNL_MARKER | | ✓ | |
| ERR_MPEG_SEQUENCE | ✓ | | |

TABLE A.14.13-continued

Parser error codes and the different standards

| Token Name | MPEG | JPEG | H.261 |
|---|---|---|---|
| ERR_EXTRA_PICTURE | ✓ | | |
| ERR_EXTRA_SLICE | ✓ | | |
| ERR_VBV_DELAY | ✓ | | |
| ERR_SHORT_TOKEN | ✓ | ✓ | ✓ |
| ERR_H261_PIC_END_UNEXPECTED | | | ✓ |
| ERR_GN_BACKUP | | | ✓ |
| ERR_GN_SKIP_GOB | | | ✓ |
| ERR_NBASE_TAB | | ✓ | |
| ERR_QUANT_PRECISION | | ✓ | |
| ERR_SAMPLE_PRECISION | | ✓ | |
| ERR_NBASE_SCAN | | ✓ | |
| ERR_UNEXPECTED_DNL | | ✓ | |
| ERR_EOS_UNEXPECTED | | ✓ | |
| ERR_RESTART_SKIP | | ✓ | |
| ERR_SKIP_INTRA | ✓ | | |
| ERR_SKIP_DINTRA | ✓ | | |
| ERR_BAD_MARKER | ✓ | | |
| ERR_D_MBTYPE | ✓ | | |
| ERR_D_MBEND | ✓ | | |
| ERR_SVP_BACKUP | ✓ | | |
| ERR_SVP_SKIP_ROWS | ✓ | | |
| ERR_FST_MBA_BACKUP | ✓ | | |
| ERR_FST_MBA_SKIP | ✓ | | |
| ERR_PICTURE_END_UNEXPECTED | ✓ | | |
| ERR_TST_PROGRAM | ✓ | ✓ | ✓ |
| ERR_NO_PROGRAM | ✓ | ✓ | ✓ |
| ERR_TST_END | ✓ | ✓ | ✓ |
| ERR_UCODE_ADDR | ✓ | ✓ | ✓ |
| ERR_NOT_IMPLEMENTED | ✓ | ✓ | ✓ |

A.14.6 Receiving User and Extension data

MPEG and JPEG use similar mechanisms to embed user and extension data. The data is preceded by a start/marker code. The start code detector can be configured to delete this data (see A.11.3.3) if the application has no interest in such data.

A.14.6.1 Identifying the source of the data

The Parser events, ERR_EXTENSION_TOKEN and ERR_USER_TOKEN indicate the arrival of the EXTENSION_DATA or USER_DATA Token at the Video Demux. If these Tokens have been generated by the start code detector (see A.11.3.3) they will carry the value of the start/marker code that caused the start code detector to generate the Token (see Table A.11.4). This value can be read by reading the rom_revision register while servicing the Parser interrupt. The Video Demux will remain halted until 1 is written to parser_event (see A.6.3, "Interrupts").

A.14.6.2 Reading the data

The EXTENSION_DATA and USER_DATA Tokens are expected to be immediately followed by a DATA Token carrying the extension or user data. The arrival of this DATA Token at the Video Demux will generate either an ERR_EXTENSION_DATA or an ERR_USER_DATA Parser event. The first byte of the DATA Token can be read by reading the rom_revision register while servicing the interrupt.

The state of the Video Demux register continue determines behavior after the event is cleared. If this register holds the value 0 then any remaining data in the DATA Token will be consumed by the Video Demux and no events will be generated. If the continue is set to 1 then an event will be generated as each byte of extension or user data arrives at the Video Demux. This continues until the DATA Token is exhausted or continue is set to 0. The first byte of the extension/user data is always presented via the rom_revision register regardless of the state of continue. There is no event indicating that the last byte of extension/user data has been read.

A.14.7 Receiving Extra Information

H.261 and MPEG allow information extending the coding standard to be embedded within pictures and groups of blocks (H.261) or slices (MPEG). The mechanism is different from that used for extension and user data (described in Section A.14.6). No start code precedes the data and so it cannot be deleted by the start code detector.

During H.261 operation the Parser events ERR_PSPARE and ERR_GSPARE indicate the detection of this information. The corresponding events during MPEG operation are ERR_EXTRA_PICTURE and ERR_EXTRA_SLICE.

When the Parser event is generated the first byte of the extra information is presented through the register rom_revision.

The state of the Video Demux register continue determines behavior after the event is cleared. If this register holds the value 0 then any remaining extra information will be consumed by the Video Demux and no events will be generated. If the continue is set to 1 then an event will be generated as each byte of extra information arrives at the Video Demux. This continues until the extra information is exhausted or continue is set to 0.

NOTE:
1) The first byte of the extension/user data always presented via the rom_revision register regardless of the state of continue.
2) There is no event indicating that the last byte of extension/user data has been read.

A.14.7.1 Generation of the FIELD_INFO Token

During MPEG operation if the register field_info is set to 1 then the first byte of any extra_information_picture is placed in the FIELD_INFO Token. This behavior is not covered by the standardization activities of MPEG. Table A.3.2 shows the definition of the FIELD_INFO Token.

If field_info is set to 1 no Parser event will be generated for the first byte of extra_information_picture. Events will be generated for any subsequent bytes of extra_information_picture. If there is only a single byte of extra_information_picture no Parser event will occur.

A.14.8 Changes at the MPEG sequence layer

The MPEG sequence header describes the following characteristic of the video about to be decoded:

horizontal and vertical size
pixel aspect ratio
picture rate
coded data rate
video buffer verifier buffer size If any of these parameters change when the Spatial Decoder decodes a sequence header then the Parser event ERR_MPEG_SEQUENCE will be generated.

A.14.8.1 Change in picture size

If the picture size has changed the user software should read the values in horiz_pels and vert_pels and compute new values to be loaded into the registers horiz_macroblocks and vert_macroblocks.

SECTION A.15 Spatial Decoding

In accordance with the present invention, the spatial decoding occurs between the output of the Token buffer and the output of the Spatial Decoder.

There are three main units: the inverse modeler, the inverse quantizer and the inverse discrete cosine transformer. At the input to this section (from the Token buffer) DATA Tokens contain a run and level representation of the quantized coefficients. At the output (of the inverse DCT) DATA Tokens contain 8×8 blocks of pixel information.

A.15.1 The Inverse Modeler

DATA Tokens in the Token buffer contain information about the values of quantized coefficients and the number of zeros between the coefficients that are represented. The Inverse Modeler expands the information about runs of zeros so that each DATA Token should contain 64 values. At this point the values in the DATA Tokens are quantized coefficients.

The inverse modeling process is the same regardless of the coding standard. No configuration is required.

For a better understanding of the modeling and inverse modeling function the reader can examine any of the picture coding standards.

A.15.2 Inverse Quantiser

In an encoder the quantiser divides down the output of the DCT to reduce the resolution of the DCT coefficients. In a decoder the function of the inverse quantiser is to multiply up these quantized DCT coefficients to restore them to an approximation of their original values.

A.15.2.1 Overview of the standard quantisation schemes

There are significant differences in the quantisation schemes used by each of the different coding standards. To obtain a detailed understanding of the quantisation schemes used by each of the standards the reader should study the relevant coding standards documents.

The register iq_coding_standard configures the operation of the inverse quantiser to meet the requirements of the different standards. In normal operation this coding register is automatically loaded by the CODING_STANDARD Token. See section A.21.1 for more information about coding standard configuration.

The main difference between the quantisation schemes is the source of the numbers by which the quantized coefficients are multiplied. These are outlined below. There are also detail differences in the arithmetic operations required (rounding etc.), which are not described here.

A.15.2.1.1 H.261 IQ overview

In H.261 a single "scale factor" is used to scale the coefficients. The encoder can change this scale factor periodically to regulate the data rate produced. Slightly different rules apply to the "DC" coefficient in intra coded blocks.

A.15.2.1.2 JPEG IQ overview

Baseline JPEG allows a picture to contain up to 4 different color components in each scan. For each of these 4 color components a 64 entry quantisation table can be specified. Each entry in these tables is used as the "scale" factor for one of the 64 quantized coefficients.

The values for the JPEG quantisation tables are contained in the coded JPEG data and will be loaded automatically into the quantisation tables.

A.15.2.1.3 MPEG IQ overview

MPEG uses both H.261 and JPEG quantisation techniques. Like JPEG, 4 quantisation tables, each with 64 entries, can be used. However, use of the tables is quite different.

Two "types" of data are considered: intra and non-intra. A different table is used for each data type. Two "default" tables are defined by MPEG. One is for use with intra data and the other with non-intra data (see Table A.15.2 and Table A.15.3). These default tables must be written into the quantisation table memory of the Spatial Decoder before MPEG decoding is possible.

MPEG also allows two "down loaded" quantisation tables. One is for use with intra data and the other with non-intra data. The values for these tables are contained in the MPEG data stream and will be loaded into the quantisation table memory automatically.

The value output from the tables is modified by a scale factor.

A.15.2.2 Inverse quantizer registers

TABLE A.15.1

Inverse quantizer registers

| Register name | Size/Dir | Reset | Description |
|---|---|---|---|
| iq_access | 1 rw | 0 rw | This access bit stops the operation of the inverse quantiser so that its various registers can be accessed reliably. See A.6.4.1 |
| iq_coding_standard | 2 rw | 0 | This register configures the coding standard used by the inverse quantiser. The register can be loaded directly or by a CODING_STANDARD Token. See A.21.1 |
| iq_keyhole_address | 8 rw | X | Keyhole access to the which holds the 4 quantiser tables. See A.6.4.3 for more information about accessing registers through a keyhole. |
| iq_keyhole_data | 8 rw | X | |

The iq_access register must be set before the quantisation table memory can be accessed. The quantisation table memory will return the value zero if an attempt is made to read it while iq_access is set to 0.

A.15.2.3 Configuring the inverse quantiser

In normal operation there is no need to configure the inverse quantiser's coding standard as this will be automatically configured by the CODING_STANDARD Token.

For H.261 operation the quantiser tables are not used. No special configuration is required. For JPEG operation the tables required by the inverse quantiser should be automatically loaded with information extracted from the coded data.

MPEG operation requires that the default quantisation tables are loaded. This should be done while iq_access is set to 1. The values in Table A.15.2 should be written into locations 0x00 to 0x3F of the inverse quantiser's extended address space (accessible through the keyhole registers iq_keyhole_address and iq_keyhole_data). Similarly, the values in Table A.15.3 should be written into locations 0x40 to 0x7F of the inverse quantiser's extended address space.

TABLE A.15.2

Default MPEG table for intra coded blocks

| $i^a$ | $W_{i,o}^b$ | i | $W_{i,o}$ | i | $W_{i,o}$ | i | $W_{i,o}$ |
|---|---|---|---|---|---|---|---|
| 0 | 8 | 16 | 27 | 32 | 29 | 48 | 35 |
| 1 | 16 | 17 | 27 | 33 | 29 | 49 | 38 |
| 2 | 16 | 18 | 26 | 34 | 27 | 50 | 38 |
| 3 | 19 | 19 | 26 | 35 | 27 | 51 | 40 |
| 4 | 16 | 20 | 26 | 36 | 29 | 52 | 40 |

TABLE A.15.2-continued

Default MPEG table for intra coded blocks

| $i^a$ | $W_{i,0}^b$ | i | $W_{i,0}$ | i | $W_{i,0}$ | i | $W_{i,0}$ |
|---|---|---|---|---|---|---|---|
| 5 | 19 | 21 | 26 | 37 | 29 | 53 | 40 |
| 6 | 22 | 22 | 27 | 38 | 32 | 54 | 48 |
| 7 | 22 | 23 | 27 | 39 | 32 | 55 | 48 |
| 8 | 22 | 24 | 27 | 40 | 34 | 56 | 46 |
| 9 | 22 | 25 | 29 | 41 | 34 | 57 | 46 |
| 10 | 22 | 26 | 29 | 42 | 37 | 58 | 56 |
| 11 | 22 | 27 | 29 | 43 | 38 | 59 | 56 |
| 12 | 26 | 28 | 34 | 44 | 37 | 60 | 58 |
| 13 | 24 | 29 | 34 | 45 | 35 | 61 | 69 |
| 14 | 26 | 30 | 34 | 46 | 35 | 62 | 69.00 |
| 15 | 27 | 31 | 29 | 47 | 34 | 63 | 83 |

[a] Offset from start of quantization table memory
[b] Quantization table value.

TABLE A.15.3

Default MPEG table for non-intra coded blocks

| i | $W_{i,1}$ | i | $W_{i,1}$ | i | $W_{i,1}$ | i | $W_{i,1}$ |
|---|---|---|---|---|---|---|---|
| 0 | 16 | 16 | 16 | 32 | 16 | 48 | 16 |
| 1 | 16 | 17 | 16 | 33 | 16 | 49 | 16 |
| 2 | 16 | 18 | 16 | 34 | 16 | 50 | 16 |
| 3 | 16 | 19 | 16 | 35 | 16 | 51 | 16 |
| 4 | 16 | 20 | 16 | 36 | 16 | 52 | 16 |
| 5 | 16 | 21 | 16 | 37 | 16 | 53 | 16 |
| 6 | 16 | 22 | 16 | 38 | 16 | 54 | 16 |
| 7 | 16 | 23 | 16 | 39 | 16 | 55 | 16 |
| 8 | 16 | 24 | 16 | 40 | 16 | 56 | 16 |
| 9 | 16 | 25 | 16 | 41 | 16 | 57 | 16 |
| 10 | 16 | 26 | 16 | 42 | 16 | 58 | 16 |
| 11 | 16 | 27 | 16 | 43 | 16 | 59 | 16 |
| 12 | 16 | 28 | 16 | 44 | 16 | 60 | 16 |
| 13 | 16 | 29 | 16 | 45 | 16 | 61 | 16 |
| 14 | 16 | 30 | 16 | 46 | 16 | 62 | 16 |
| 15 | 16 | 31 | 16 | 47 | 16 | 63 | 16 |

TABLE A.15.3-continued

Default MPEG table for non-intra coded blocks

A.15.2.4 Configuring tables from Tokens

As an alternative to configuring the inverse quantiser tables via the MPI they can be initialized by Tokens. These Tokens can be supplied via either the coded data port or the MPI.

The QUANT_TABLE Token is described in Table A.3.2. It has a two bit field tt which specifies which of the 4 (0 to 3) table locations is defined by the Token. For MPEG operation the default definitions of tables 0 and 1 need to be loaded.

A.15.2.5 Quantization table values

For both JPEG and MPEG the quantisation table entries are 8 bit numbers. The values 255 to 1 are legal. The value 0 is illegal.

A.15.2.6 Number ordering of quantisation tables

The quantisation table values are used in "zig-zag" scan order (see the coding standards). The tables should be viewed as a one dimensional array of 64 values (rather than a 8×8 array). The table entries at lower addresses correspond to the lower frequency DCT coefficients.

When quantisation table values are carried by a QUANT_TABLE Token the first value after the Token header is the table entry for the "DC" coefficient.

A.15.2.7 Inverse quantizer test registers

TABLE A.15.4

Inverse quantiser test registers

| Register Name | Size | Dir | Reset | Description |
|---|---|---|---|---|
| iq_quant_scale | 5 | | | This register holds the current value of the quantisation scale factor. It is |
| | | rw | | loaded by the QUANT_SCALE Token. This is not used during JPEG operation. |
| iq_component | 2 | | | This register holds the two bit component ID taken from the most recent |
| | | rw | | DATA Token head. This value is involved in the selection of the quantiser table.<br>The register will also hold the table ID after a QUANT_TABLE Token<br>arrives to load the table. |
| iq_prediction_mode | 2 | | | This holds the two LSBs of the most recent PREDICTION_MODE |
| | | rw | | Token. |
| iq_jpeg_indirection | 8 | | | This register relates the two bit component ID number of a DATA Token |
| | | rw | | to the table number of the quantisation table that should be used.<br>Bits 1:0 specify the table number that will be sued with component 0<br>Bits 3:2 specify the table number that will be sued with component 1<br>Bits 5:4 specify the table number that will be sued with component 2<br>Bits 7:6 specify the table number that will be sued with component 3<br>This register is loaded by JPEG_TABLE_SELECT Tokens. |
| iq_mpeg_indirection | 2 | | 0 | This two bit register records whether to use default or down loaded quantisation tables with the intra and non-intra data.<br>A 0 in the bit position indicates that the default table should be used. A 1 |
| | | rw | | indicates that a down loaded table should be used.<br>Bit 0 refers to intra data. Bit 1 refers to non-intra data. This register is normally loaded by the Token MPEG_TABLE_SELECT. |

A.15.3 Inverse Discrete Cosine Transform

The inverse discrete transform processor of the present invention meets the requirements set out in CCITT recommendation H.261, the IEEE specification P1180 and complies with the requirements described in current draft revision of MPEG.

The inverse discrete cosine transform process is the same regardless of which coding standard is used. No configuration by the user is required.

There are two events associated with the inverse discrete transform processor.

a collection of pictures could be encoded together to provide a mechanism for encoding video.

Figure 35:
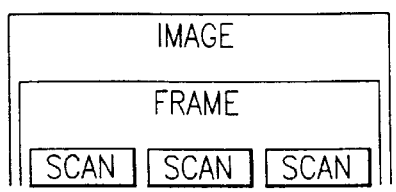
FIG. 35 is a diagram illustrating an overview of the JPEG baseline sequential structure.

The Spatial Decoder supports JPEG's baseline sequential mode of operation. There are three main levels in the syntax: Image, Frame and Scan. A sequential image only contains a single frame. A frame can contain between 1 and 256 different image (color) components. These image components can be grouped, in a variety of ways, into scans. Each scan can contain between 1 and 4 image components (see FIG. 35 "Overview of JPEG baseline sequential structure").

TABLE A.15.5

Inverse DCT event registers

| Register name | Size/Dir. | Reset State | Description |
|---|---|---|---|
| idct_too_few_event | 1 rw | 0 | The Inverse DCT requires that all DATA Tokens contain exactly 64 values. If less than 64 values are found then the too-few event will be generated. If the mask register is set to 1 then an interrupt can be generated and the inverse DCT will halt. This event should only occur following an error in the coded data. |
| idct_too_few_mask | 1 rw | 0 | |
| idct_too_many_event | 1 rw | 0 | The Inverse DCT requires that all DATA Tokens contain exactly 64 values. If more than 64 values are found then the too-many event will be generated. If the mask register is set to 1 then an interrupt can be generated and the inverse DCT will halt. This event should only occur following an error in the coded data. |
| idct_too_many_mask | 1 rw | 0 | |

For a better understanding of the DCT and inverse DCT function the reader can examine any of the picture coding standards

SECTION A.16 Connecting the output of Spatial Decoder

The output of the Spatial Decoder is a standard Token Port with 9 bit wide data words. See Section A.4 for more information about the electrical behavior of the interface.

The Tokens present at the output will depend on the coding standard employed. This section just looks at the output of the Spatial Decoder when configured for JPEG operation. This section also describes the Token sequence seen at the output of the Temporal Decoder during JPEG operation as the Temporal Decoder doesn't modify the Token sequence that results from decoding JPEG.

MPEG and H.261 both require the use of the Temporal Decoder. See section A.19 for information about connecting to the output of the Temporal Decoder when configured for MPEG and H.261 operation.

This section identifies which of the Tokens are available at the output of the Spatial Decoder and which are most useful when designing circuits to display that output. Other Tokens will be present, but are not needed to display the output and, therefore, are not discussed here.

This section concentrates on showing:

How the start and end of sequences can be identified.

How the start and end of pictures can be identified.

How to identify when to display the picture.

How to identify where in the display the picture data should be placed.

A.16.1 Structure of JPEG pictures

This section provides an overview of some features of the JPEG syntax. Please refer to the coding standard for full details.

JPEG provides a variety of mechanisms for encoding individual pictures. JPEG makes no attempt to describe how If a scan contains a single image component it is non-interleaved, if it contains more than one image component it is an interleaved scan. A frame can contain a mixture of interleaved and non-interleaved scans. The number of scans that a frame can contain is determined by the 256 limit on the number of image components that a frame can contain.

Within an interleaved scan data is organized into minimum coding units (MCUs) which are analogous to the macroblock used in MPEG and H.261. These MCUs are raster ordered within a picture. In a non-interleaved scan the MCU is a single 8×8 block. Again these are raster organized.

The Spatial Decoder can readily decode JPEG data containing 1 to 4 different color components. Files describing greater numbers of components can be decoded. However, some reconfiguration between scans may be required to accommodate the next set of components to be decoded.

A.16.2 Token sequence

Figure 36:
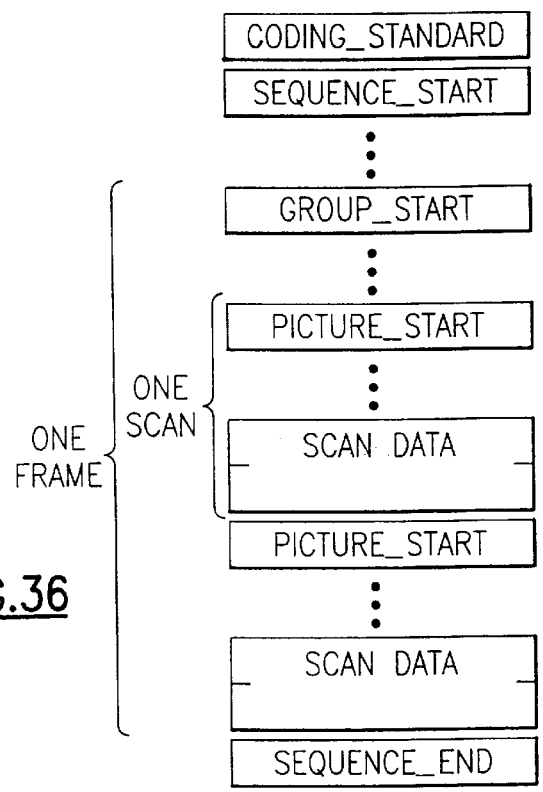
FIG. 36 is a diagram illustrating a tokenized JPEG picture.

The JPEG markers codes are converted to an analogous MPEG named Token by the start code detector (see Table A.11.4, see FIG. 36 "Tokenized JPEG picture").

SECTION A.17 Temporal Decoder

30 MHz operation

Provides temporal decoding for MPEG & H.261 video decoders

H.261 CIF and QCIF formats

MPEG video resolutions up to 704×480, 30 Hz, 4:2:0

Flexible chroma sampling formats

Can re-order the MPEG picture sequence

Glue-less DRAM interface

Single +5V supply 208 pin PQFP package

Max. power dissipation 2.5W

Uses standard page mode DRAM

The Temporal Decoder is a companion chip to the Spatial Decoder. It provides the temporal decoding required by H.261 and MPEG.

The Temporal Decoder implements all the prediction forming features required by MPEG and H.261. With a single 4 Mb DRAM (e.g., 512 k×8) the Temporal Decoder can decode CIF and QCIF H.261 video. With 8 Mb of DRAM (e.g., two 256 k×16) the 704×480, 30 Hz, 4:2:0 MPEG video can be decoded.

The Temporal Decoder is not required for Intra coding schemes (such as JPEG). If included in a multi-standard decoder the Temporal Decoder will pass decoded JPEG pictures through to its output.

A.17.1 Temporal Decoder Signals

TABLE A.17.3

Temporal Decoder Pin Assignments

| Signal Name | Pin |
|---|---|
| nc | 208 |
| test pin | 207 |
| test pin | 206 |
| GND | 205 |
| OE | 204 |
| DRAM_addr[0] | 203 |

TABLE A.17.1

Temporal Decoder signals

| Signal Name | I/O | Pin Number | Description |
|---|---|---|---|
| in_data[8:0] | I | 173, 172, 171, 169, 168, 167, 166, 164, 163 | Input Port. This is a standard two wire interface normally connected to the |
| in_extn | I | 174 | Output Port of the Spatial Decoder. |
| in_valid | I | 162 | See sections A.4 and |
| in_accept | O | 161 | A.18.1. |
| enable[1:0] | I | 126, 127 | Micro Processor Interface (MPI). |
| rw | I | 125 | See A.6.1 |
| addr[7:0] | I | 137, 136, 135, 133, 132, 131, 130, 128 | |
| data[7:0] | O | 152, 151, 149, 147, 145, 143, 141, 140 | |
| irq | O | 154 | |
| DRAM_data[31:0] | I/O | 15, 17, 19, 20, 22, 25, 27, 30, 31, 33, 35, 38, 39, 42, 44, 47, 49, 57, 59, 61, 63, 66, 68, 70, 72, 74, 76, 79, 81, 83, 84, 85 | DRAM interface. |
| DRAM_addr[10:0] | O | 184, 186, 188, 189, 192, 193, 195, 197, 199, 200, 203 | See section A.5.2. |
| RAS | O | 11 | |
| CAS[3:0] | O | 2468 | |
| WE | O | 12 | |
| OE | O | 204.00 | |
| DRAM_enable | I | 112 | |
| out_data[7:0] | O | 89, 90, 92, 93, 94, 95, 97, 98 | Output Port. This is a standard two wire |
| out_extn | O | 87 | interface. |
| out_valid | O | 99 | See sections A.4 and A.19. |
| out_accept | I | 100 | |
| tck | I | 115 | JTAG port. |
| tdi | I | 116 | See section A.8 |
| tdo | O | 120 | |
| tms | I | 117 | |
| trst | I | 121 | |
| decoder_clock | I | 177 | The main decoder clock. See Table A.7.2 |
| reset | I | 160 | Reset. |

TABLE A.17.2

Temporal Decoder Test signals

| Signal Name | I/O | Pin Num. | Description |
|---|---|---|---|
| tph0ish | I | 122 | if override = 1 then tph0ish and tph1ish are inputs for the on-chip |
| tph1ish | I | 123 | two phase clock. |
| override | I | 110 | For normal operation set override = 0. tph0ish and tph1ish are ignored (so connect to GND or VDD). |
| chiptest | I | 111 | Set chiptest = 0 for normal operation. |
| tloop | I | 114 | Connect to GND or VDD during normal operation. |
| ramtest | I | 109 | If ramtest = 1 test of the on-chip RAMs is enabled. Set ramtest = 0 for normal operation. |
| pllselect | I | 178 | If pllselect = 0 the on-chip phase locked loops are disabled. Set pllselect = 1 for normal operation. |
| ti | I | 180 | Two clocks required by the DRAM interface during test operation. |
| tq | I | 179 | Connect to GND or $V_{DD}$ during normal operation. |
| pdout | O | 207 | These two pins are connections for an |
| pdin | I | 206 | external filter for the phase lock loop. |

TABLE A.17.3-continued

Temporal Decoder Pin Assignments

| Signal Name | Pin |
| --- | --- |
| VDD | 202 |
| nc | 201 |
| DRAM_addr[1] | 200 |
| DRAM_addr[2] | 199 |
| GND | 198 |
| DRAM_addr[3] | 197 |
| nc | 196 |
| DRAM_addr[4] | 195 |
| VDD | 194 |
| DRAM_addr[5] | 193 |
| DRAM_addr[6] | 192 |
| nc | 191 |
| GND | 190 |
| DRAM_addr[7] | 189 |
| DRAM_addr[8] | 188 |
| VDD | 187 |
| DRAM_addr[9] | 186 |
| nc | 185 |
| DRAM_addr[10] | 184 |
| GND | 183 |
| nc | 182 |
| VDD | 181 |
| test pin | 180 |
| test pin | 179 |
| test pin | 178 |
| decoder_clock | 177 |
| nc | 176 |
| GND | 175 |
| in_extn | 174 |
| in_data[8] | 173 |
| in_data[7] | 172 |
| in_data[6] | 171 |
| VDD | 170 |
| in_data[5] | 169 |
| in_data[4] | 168 |
| in_data[3] | 167 |
| in_data[2] | 166 |
| GND | 165 |
| in_data[1] | 164 |
| in_data[0] | 163 |
| in_valid | 162 |
| in_accept | 161 |
| reset | 160 |
| VDD | 159 |
| nc | 158 |
| nc | 157 |
| nc | 156 |
| nc | 155 |
| irq | 154 |
| nc | 153 |
| data[7] | 152 |
| data[6] | 151 |
| nc | 150 |
| data[5] | 149 |
| nc | 148 |
| data[4] | 147 |
| GND | 146 |
| data[3] | 145 |
| nc | 144 |
| data[2] | 143 |
| nc | 142 |
| data[1] | 141 |
| data[0] | 140 |
| nc | 139 |
| VDD | 138 |
| addr[7] | 137 |
| addr[6] | 136 |
| addr[5] | 135 |
| GND | 134 |
| addr[4] | 133 |
| addr[3] | 132 |
| addr[2] | 131 |
| addr[1] | 130 |
| VDD | 129 |
| addr[0] | 128 |

TABLE A.17.3-continued

Temporal Decoder Pin Assignments

| Signal Name | Pin |
| --- | --- |
| $\overline{\text{enable}}$[0] | 127 |
| $\overline{\text{enable}}$[1] | 126 |
| $\overline{\text{rw}}$ | 125 |
| GND | 124 |
| test pin | 123 |
| test pin | 122 |
| trst | 121 |
| tdo | 120 |
| nc | 119 |
| VDD | 118 |
| tms | 117 |
| tdi | 116 |
| tck | 115 |
| test pin | 114 |
| GND | 113 |
| DRAM_enable | 112 |
| test pin | 111 |
| test pin | 110 |
| test pin | 109 |
| nc | 108 |
| nc | 107 |
| nc | 106 |
| nc | 105 |
| nc | 104 |
| nc | 103 |
| nc | 102 |
| VDD | 101 |
| out_accept | 100 |
| out_valid | 99 |
| out_data[0] | 98 |
| out_data[1] | 97 |
| GND | 96 |
| out_data[2] | 95 |
| out_data[3] | 94 |
| out_data[4] | 93 |
| out_data[5] | 92 |
| VDD | 91 |
| out_data[6] | 90 |
| out_data[7] | 89 |
| nc | 88 |
| out_extn | 87 |
| GND | 86 |
| DRAM_data[0] | 85 |
| DRAM_data[1] | 84 |
| DRAM_data[2] | 83 |
| VDD | 82 |
| DRAM_data[3] | 81 |
| nc | 80 |
| DRAM_data[4] | 79 |
| GND | 78 |
| nc | 77 |
| DRAM_data[5] | 76 |
| nc | 75 |
| DRAM_data[6] | 74 |
| VDD | 73 |
| DRAM_data[7] | 72 |
| nc | 71 |
| DRAM_data[8] | 70 |
| GND | 69 |
| DRAM_data[9] | 68 |
| nc | 67 |
| DRAM_data[10] | 66 |
| VDD | 65 |
| nc | 64 |
| DRAM_data[11] | 63 |
| nc | 62 |
| DRAM_data[12] | 61 |
| GND | 60 |
| DRAM_data[13] | 59 |
| nc | 58 |
| DRAM_data[14] | 57 |
| VDD | 56 |
| nc | 55 |
| nc | 54 |
| nc | 53 |

TABLE A.17.3-continued

Temporal Decoder Pin Assignments

| Signal Name | Pin |
|---|---|
| nc | 52 |
| nc | 51 |
| nc | 50 |
| DRAM_data[15] | 49 |
| nc | 48 |
| DRAM_data[16] | 47 |
| nc | 46 |
| GND | 45 |
| DRAM_data[17] | 44 |
| nc | 43 |
| DRAM_data[18] | 42 |
| VDD | 41 |
| nc | 40 |
| DRAM_data[19] | 39 |
| DRAM_data[20] | 38 |
| nc | 37 |
| GND | 36 |
| DRAM_data[21] | 35 |
| nc | 34 |
| DRAM_data[22] | 33 |
| VDD | 32 |
| DRAM_data[23] | 31 |
| DRAM_data[24] | 30 |
| nc | 29 |
| GND | 28 |
| DRAM_data[25] | 27 |
| nc | 26 |
| DRAM_data[26] | 25 |
| nc | 24 |
| VDD | 23 |
| DRAM_data[27] | 22 |
| nc | 21 |
| DRAM_data[28] | 20 |
| DRAM_data[29] | 19 |
| GND | 18 |
| DRAM_data[30] | 17 |
| nc | 16 |
| DRAM_data[31] | 15 |
| VDD | 14 |
| nc | 13 |
| $\overline{WE}$ | 12 |
| $\overline{RAS}$ | 11 |
| nc | 10 |
| GND | 9 |
| $\overline{CAS}$[0] | 8 |
| nc | 7 |
| $\overline{CAS}$[1] | 6 |
| VDD | 5 |
| $\overline{CAS}$[2] | 4 |
| nc | 3 |
| $\overline{CAS}$[3] | 2 |
| nc | 1 |

A.17.1.1 "nc" no connect pins

The pins labeled nc in Table A.17.3 are not currently used in the present invention and are reserved for future products. These pins should be left unconnected. They should not be connected to $V_{DD}$, GND, each other or any other signal.

A.17.1.2 $V_{DD}$ and GND pins

All the $V_{DD}$ and GND pins provided must be connected to the appropriate power supply. The device will not operate correctly unless all the $V_{DD}$ and GND pins are correctly used.

A.17.1.3 Test pin connections for normal operation

Nine pins on the Temporal Decoder are reserved for internal test use.

TABLE A.17.4

Default test pin connections

| Pin number | Connection |
|---|---|
| | Connect to GND for normal operation |
| | Connect to VDD for normal operation |
| | Leave Open Circuit for normal operation |

A.17.1.4 JTAG pins for normal operation

See Section A.8.1.

TABLE A.17.5

Overview of Temporal Decoder memory map

| Addr. (hex) | Register Name | See table |
|---|---|---|
| 0x00 ... 0x01 | Interrupt service area | A.17.6 |
| 0x02 ... 0x07 | Not used | |
| 0x08 | Chip access | A.17.7 |
| 0x09 ... 0x0F | Not used | |
| 0x10 | Picture sequencing | A.17.8 |
| 0x11 ... 0x1F | Not used | |
| 0x20 ... 0x2E | DRAM interface configuration registers | A.17.9 |
| 0x2F ... 0x3F | Not used | |
| 0x40 ... 0x53 | Buffer configuration | A.17.8 |
| 0x54 ... 0x5F | Not used | |
| 0x60 ... 0xFF | Test registers | A.17.11 |

TABLE A.17.6

Interrupt service area registers

| Addr. (hex) | Bit num. | Register Name |
|---|---|---|
| 0x00 | 7 | chip_event |
| | 6:2 | not used |
| | 1 | chip_stopped_event |
| | 0 | count_error_event |
| 0x01 | 7 | chip_mask |
| | 6:2 | not used |
| | 1 | chip_stopped_mask |
| | 0 | count_error_mask |

TABLE A.17.7

Chip access register

| Addr. (hex) | Bit num. | Register Name |
|---|---|---|
| 0x08 | 7:1 | not used |
| | 0 | chip_access |

TABLE A.17.8

Picture sequencing

| Addr. (hex) | Bit num. | Register Name |
|---|---|---|
| 0x10 | 7:1 | not used |
| | 0 | MPEG_reordering |

TABLE A.17.9

DRAM interface configuration registers

| Addr. (hex) | Bit num. | Register Name |
|---|---|---|
| 0x20 | 7:5 | not used |
|  | 4:0 | page_start_length[4:0] |
| 0x21 | 7:4 | not used |
|  | 3:0 | read_cycle_length[3:0] |
| 0x22 | 7:4 | not used |
|  | 3:0 | write_cycle_length[3:0] |
| 0x23 | 7:4 | not used |
|  | 3:0 | refresh_cycle_length[3:0] |
| 0x24 | 7:4 | not used |
|  | 3:0 | CAS_falling[3:0] |
| 0x25 | 7:4 | not used |
|  | 3:0 | RAS_falling[3:0] |
| 0x26 | 7:1 | not used |
|  | 0 | interface_timing_access |
| 0x27 | 7:0 | not used |
| 0x28 | 7:6 | RAS_strength[2:0] |
|  | 5:3 | OEWE_strength[3:0] |
|  | 2:0 | DRAM_data_strength[3:0] |
| 0x29 | 7 | not used |
|  | 6:4 | DRAM_addr_strength[3:0] |
|  | 3:1 | CAS_strength[3:0] |
|  | 0 | RAS_strength[3] |
| 0x28 | 7 | not used |
|  | 6:4 | DRAM_addr_strength[3:0] |
|  | 3:1 | CAS_strength[3:0] |
|  | 0 | RAS_strength[3] |
| 0x29 | 7:6 | RAS_strength[2:0] |
|  | 5:3 | OEWE_strength[3:0] |
|  | 2:0 | DRAM_data_strength[3:0] |
| 0x2A | 7:0 | refresh_interval |
| 0x2B | 7:0 | not used |
| 0x2C | 7:6 | not used |
|  | 5 | DRAM_enable |
|  | 4 | no_refresh |
|  | 3:2 | row_address_bits[1:0] |
|  | 1:0 | DRAM_data_width[1:0] |
| 0x2D | 7:0 | not used |
| 0x2E | 7:0 | Test registers |

TABLE A.17.10

Buffer configuration registers

| Addr. (hex) | Bit num. | Registered Name |
|---|---|---|
| 0x40 | 7:0 | not used |
| 0x41 | 7:2 |  |
|  | 1:0 | picture_buffer_0[17:0] |
| 0x42 | 7:0 |  |
| 0x43 | 7:0 |  |
| 0x44 | 7:0 | not used |
| 0x45 | 7:2 |  |
|  | 1:0 | picture_buffer_1[17:0] |
| 0x46 | 7:0 |  |
| 0x47 | 7:0 |  |
| 0x48 | 7:0 | not used |
| 0x49 | 7:1 |  |
| 0x40 | 7:0 | not used |
|  | 0.00 | component_offset_0[16:0] |
| 0x4A | 7:0 |  |
| 0x4B | 7:0 |  |
| 0x4C | 7:0 | not used |
| 0x4D | 7:1 |  |
|  | 0 | component_offset_1[16:0] |
| 0x4E | 7:0 |  |
| 0x4F | 7:0 |  |
| 0x50 | 7:0 | not used |
| 0x51 | 7:1 |  |
|  | 0 | component_offset_2[16:0] |

TABLE A.17.10-continued

Buffer configuration registers

| Addr. (hex) | Bit num. | Registered Name |
|---|---|---|
| 0x52 | 7:0 |  |
| 0x53 | 7:0 |  |

TABLE A.17.11

Test registers

| Addr. (hex) | Bit num. | Register Name |
|---|---|---|
| 0x2E | 7...4 | PLL resistors |
|  | 3...0 |  |
| 0x60 | 7...6 | not used |
|  | 5...4 | coding_standard[1:0] |
|  | 3...2 | picture_type[1:0] |
|  | 1 | H261_filt |
|  | 0 | H261_s_f |
| 0x61 | 7...6 | component_id |
|  | 5...4 | prediction_mode |
|  | 3...0 | max_sampling |
| 0x62 | 7...0 | samp_h |
| 0x63 | 7...0 | samp_v |
| 0x64 | 7...0 | back_h |
| 0x65 | 7...0 |  |
| 0x66 | 7...0 | back_v |
| 0x67 | 7...0 |  |
| 0x68 | 7...0 | forw_h |
| 0x69 | 7...0 |  |
| 0x6A | 7...0 | forw_v |
| 0x6B | 7...0 |  |
| 0x6C | 7...0 | width_in_mb |
| 0x6D | 7...0 |  |

SECTION A.18 Temporal Decoder Operation

A.18.1 Data input

The input data port of the Temporal Decoder is a standard Token Port with 9 bit wide data words. In most applications this will be connected directly to the output Token Port of the Spatial Decoder. See Section A.4 for more information about the electrical behavior of this interface.

A.18.2 Automatic configuration

Parameters relating to the coded video's picture format are automatically loaded into registers within the Temporal Decoder by Tokens generated by the Spatial Decoder.

TABLE A.18.1

Configuration of Temporal Decoder via Tokens

Figure 37:
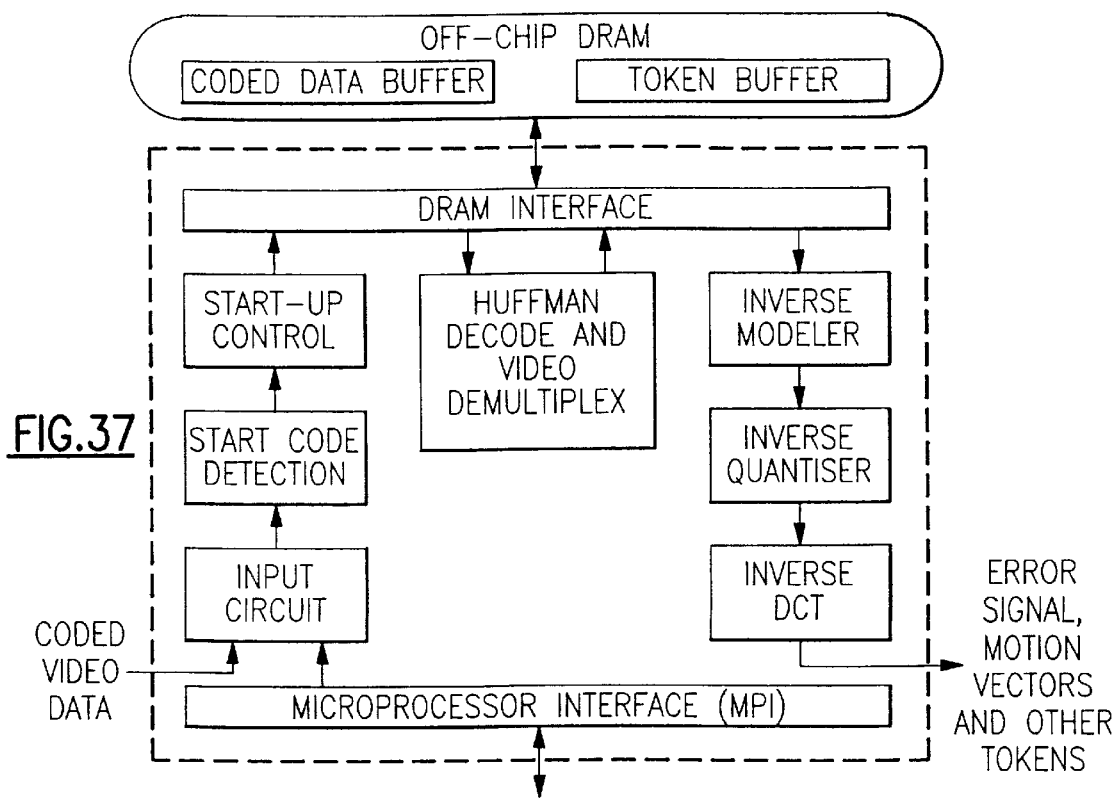
FIG. 37 is a block diagram of a spatial decoder.

| Token | Configuration performed |
|---|---|
| CODING_STANDARD | The coding standard of the Temporal Decoder is automatically configured by the CODING_STANDARD Token. This is generated by the Spatial Decoder each time a new sequence is started. See FIG. 37 "Setting the coding standard". |
| DEFINE_SAMPLING | The horizontal and vertical chroma sampling information for each of the color components is automatically configured by DEFINE_SAMPLING Tokens. |
| HORIZONTAL_MBS | The horizontal width of pictures in macro blocks is automatically configured by HORIZONTAL_MBS Token. |

A.18.3 Manual configuration

The user must configure (via the microprocessor interface) application dependent factors.

A.18.3.1 When to configure

The Temporal Decoder should only be configured when no data processing is taking place. This is the default state after reset is removed.

The Temporal Decoder can be stopped to allow re-configuration by writing 1 to the chip_access register. After configuration is complete 0 should be written to chip_access.

See Section A.5.3 for details of when to configure the DRAM interface.

A.18.3.2 DRAM interface

The DRAM interface timing must be configured before it is possible to decode predictively coded video (e.g., H.261 or MPEG). See Section A.5, "DRAM Interface".

As documented in Section A.3.5.1, "Component Identification number", component 0 will be the luminance component and components 1 and 2 will be chrominance.

An example configuration of the component offset registers is to set component_offset_0 to 0 so that component 0 starts at the picture buffer pointer. component_offset_1 could be set to ⁴⁄₆ of the picture buffer size and component_offset_2 could be set to ⁵⁄₆ of the picture buffer size.

A.18.3.5 Picture sequence re-ordering

MPEG uses three different picture types: Intra (I), Predicted (P) and Bidirectionally interpolated (B). B pictures are based on predictions from two pictures: one from the future and one from the past. The picture order is modified at the encoder so that I and P picture can be

TABLE A.18.2

Temporal Decoder registers

| Register name | Size/ Dir. | Reset State | Description |
|---|---|---|---|
| chip_access | 1 rw | 1 | Writing 1 to chip_access requests that the Temporal Decoder halt operation to allow re-configuration. The Temporal Decoder will continue operating normally until reaches the end of the current video sequence. After reset is removed chip_access=1 i.e. the Temporal Decoder is halted. When the chip stops a chip stopped event will occur. If chip_stopped_mask = 1 an interrupt will be generated. |
| chip_stopped_event | 1 rw | 0 | |
| chip_stopped_mask | 1 rw | 0 | |
| count_error_event | 1 rw | 0 | The Temporal Decoder has an adder that adds predictions to error data. If there is a difference between the number of error data bytes and the number of prediction data bytes then a count error event is generated. If count_error_mask = 1 an interrupt will be generated and prediction forming will stop. This event should only arise following a hardware error. |
| count_error_mask | 1 rw | 0 | |
| picture_buffer_0 | 18 rw | x | These specify the base addresses for the picture buffers. |
| picture_buffer_1 | 18 rw | x | |
| component_offset_2 | 17 rw | x | These specify the offset from the picture buffer pointer at which each of the colour components is stored. Data with component ID = n is stored starting at the position indicated by component_offset_n. See A.3.5.1, "Component Identification number". |
| component_offset_1 | 17 rw | x | |
| component_offset_2 | 17 rw | x | |
| MPEG_recordering | 1 rw | 0 | Setting this register to 1 makes the Temporal Decoder change the picture order from the non-causal MPEG picture sequence to the correct display order by the See A.18.3.5 This register should is ignored during JPEG and H.261 operation. |

A.18.3.3 Numbers in picture buffer registers

The picture buffer pointers (18 bit) and the component offset (17 bit) registers specify a block (8×8 bytes) address, not a byte address.

A.18.3.4 Picture buffer allocation

To decode predictively coded video (either H.261 or MPEG) the Temporal Decoder must manage two picture buffers. See Section A.18.4 and A.18.4.4 for more information about how these buffers are used.

The user must ensure that there is sufficient memory above each of the picture buffer pointers (picture_buffer_0 and picture_buffer_1) to store a single picture of the required video format (without overlapping with the other picture buffer). Normally, one of the picture buffer pointers will be set to 0 (i.e., the bottom of memory) and the other will be set to point to the middle of the memory space.

A.18.3.4.1 Normal configuration for MPEG or H.261

H.261 and MPEG both use a 4:1:1 ratio between the different color components (i.e., there are 4 times as many luminance pels as there are pels in either of the chrominance components).

decoded from the coded data before they are required to decode B pictures.

The picture sequence must be corrected before these pictures can be displayed. The Temporal Decoder can provide this picture re-ordering (by setting register MPEG_reordering=1). Alternatively, the user may wish to implement the picture re-ordering as part of his display interface function. Configuring the Temporal Decoder to provide picture re-ordering may reduce the video resolution that can be decoded, see A.18.5.

A.18.4 Prediction forming

The prediction forming requirements of H.261 decoding and MPEG decoding are quite different. The CODING_STANDARD Token automatically configures the Temporal Decoder to accommodate the prediction requirements of the different standards.

A.18.4.1 JPEG Operation

When configured for JPEG operation no predictions are performed.

A.18.4.2 H.261 Operation

In H.261 predictions are only from the picture just decoded. Motion vectors are only ever specified to integer pixel accuracy. The encoder can specify that a low pass filter be applied to the result of any prediction.

As each picture is decoded it is written in to a picture buffer in the off-chip DRAM so that it can be used in decoding the next picture. Decoded pictures appear at the output of the Temporal Decoder as they are written into the off-chip DRAM.

For full details of prediction, and the arithmetic operations involved, the reader is directed to the H.261 standard. The Temporal Decoder is fully compliant with the requirements of H.261.

A.18.4.3 MPEG Operation (without re-ordering)

The operation of the Temporal Decoder changes for each of the three different MPEG picture types (I, P and B).

"I" pictures require no further decoding by the Temporal Decoder, but must be stored in a picture buffer for later use in decoding P and B pictures.

Decoding P pictures requires forming predictions from a previously decoded P or I picture. The decoded P picture is stored in a picture buffer for use in decoding P and B pictures. MPEG allows motion vectors specified to half pixel accuracy. On-chip filters provide interpolation to support this half pixel accuracy.

B pictures can require predictions from both of the picture buffers. As with P pictures, half pixel motion vector resolution accuracy requires on chip interpolation of the picture information. B pictures are not stored in the off-chip buffers.

All pictures appear at the output port of the Temporal Decoder as they are decoded. So, the picture sequence will be that in the coded MPEG data (see the upper part of FIG. 38).

For full details of prediction, and the arithmetic operations involved, the reader is directed to the proposed MPEG standard draft. These requirements are met by the Temporal Decoder.

A.18.4.4 MPEG Operation (with re-ordering)

When configured for- MPEG operation with picture re-ordering (MPEG_reordering=1) the prediction forming operations are as described above in Section A.18.4.3. However, additional data transfers are performed to re-order the picture sequence.

B picture decoding is as described in section A.18.4.3. I and P pictures are not output as they are decoded. Instead they are written into the off-chip buffers (as previously described) and are read out only when a subsequent I or P picture arrives for decoding.

A.18.4.4.1 Decoder start-up characteristics

The output of the first I picture is delayed until the subsequent P (or I) picture starts to decode. This should be taken into consideration when estimating the start-up characteristics of a video decoder.

A.18.4.4.2 Decoder shut-down characteristics

The Temporal Decoder relies on subsequent P or I pictures to flush previous pictures out of its off-chip buffers. This has consequences at the end of video sequences and when starting new video sequences. The Spatial Decoder provides facilities to create a "fake" I/P picture at the end of a video sequence to flush out the last P (or I) picture. However, this "fake" picture will be flushed out when a subsequent video sequence starts.

The Spatial Decoder provides the option to suppress this "fake" picture. This may be useful where it is known that a new video sequence will be supplied to the ___decoder immediately after an old sequence finishes. The first picture in this new sequence will flush out the last picture of the previous sequence.

A.18.5 Video resolution

The video resolution that the Temporal Decoder can support when decoding MPEG is limited by the memory bandwidth of its DRAM interface. For MPEG two cases need to be considered: with and without MPEG picture re-ordering.

Sections A.18.5.2 and A.18.5.3 discuss the worst case requirements required by the current draft of the MPEG specification. Subsets of MPEG can be envisioned that have lower memory bandwidth requirements. For example, using only integer resolution motion vectors or not using B pictures significantly reduces the memory bandwidth requirements. Such subsets are not analyzed here.

A.18.5.1 Characteristics of DRAM interface

The number of cycles taken to transfer data across the DRAM interface depends on a number of factors:

The timing configuration of the DRAM interface to suite the DRAM employed

The data bus width (8, 16 or 32 bits)

The type of data transfer:
  8x8 block read or write
  for prediction to half pixel accuracy
  for prediction to integer pixel accuracy See section A.5, "DRAM Interface", for more information about the detail configuration of the DRAM interface.

Table A.18.3 shows how many DRAM interface "cycles" are required for each type of data transfer.

TABLE A.18.3

Data transfer times for Temporal Decoder

| Data bus width (bits) | read or write 8x8 block | form prediction (half pixel accuracy) | form prediction (integer pixel accuracy) |
|---|---|---|---|
| 8 | 1 page address + 64 transfers | 4 page address + 81 transfers | 4 page address + 64 transfers |
| 16 | 1 page address + 32 transfers | 4 page address + 45 transfers | 4 page address + 40 transfers |
| 32 | 1 page address + 16 transfers | 4 page address + 27 transfers | 4 page address + 24 transfers |

Table A.18.4 takes the figures in Table A.18.3 and evaluates them for a "typical" DRAM. In this example a 27 MHz clock is assumed. The access start takes 11 ticks (102 ns) and the data transfer takes 6 ticks (56 ns).

A.18.5.2 MPEG resolution without re-ordering

The peak memory bandwidth load occurs when decoding B pictures. In a "worst case" the B frame may be formed from predictions from both the picture buffers with all predictions being to half pixel accuracy.

TABLE A.18.4

Illustration with "typical" DRAM

| Data bus width (bits) | read or write 8 × 8 block | form prediction (half pixel accuracy) | form prediction (integer pixel accuracy) |
|---|---|---|---|
| 8 | 3657 ns | 4907 ns | 3963 ns |
| 16 | 1880 ns | 2907 ns | 2185 ns |
| 32 | 991 ns | 1907 ns | 1741 ns |

Using the example figures from Table A.18.4 we can see that it will take the DRAM interface 3815 ns to read the data required for two accurate half pixel accurate predictions (via a 32 bit wide interface). The resolution that the Temporal Decoder can support is determined by the number of these predictions that can be performed within one picture time. In this example the Temporal Decoder can process 8737 8×8 blocks in a single 33 ms picture period (e.g., for 30 Hz video).

If the required video format is 704×480 then each picture contains 7920 8×8 blocks (taking into consideration the 4:2:0 chroma sampling). It can be seen that this video format consumes approx. 91% of the available DRAM interface bandwidth (before any other factors such as DRAM refresh are taken into consideration). So, the Temporal Decoder can support this video format.

A.18.5.3 MPEG resolution with re-ordering

When MPEG picture re-ordering is employed the worst case scenario is encountered while P pictures are being decoded. At this time there are 3 loads on the DRAM interface:

form predictions write back the result read out the previous P or I picture

Using the example figures from Table A.18.3 we can find the time it takes for each of these tasks when a 32 bit wide interface is available. Forming the prediction takes 1907 ns/n and the read and the write each take 991 ns, a total of 3889 ns. This permits the Temporal Decoder to process 8485 8×8 blocks in a 33 ms period.

So, processing 704×480 video will use approximately 93% of the available memory bandwidth (ignoring refresh).

A.18.5.4 H.261

H.261 only supports two picture formats CIF (352×288) and QCIF (172×144) at picture rates up to 30 Hz. A CIF picture contains 2376 8×8 blocks. The only memory operations required are writing 8×8 blocks and forming predictions with integer accuracy motion vectors.

Using the example figures from Table A.18.4 for an 8 bit wide memory interface it can be seen that writing each block will take 3657 ns while forming the prediction for one block will take 3963 ns a total of 7620 ns per block. So, the processing time for a single CIF picture is about 18 ms, comfortably less than the 33 ms required to support 30 Hz video.

A.18.5.5 JPEG

The resolution of JPEG "video" that can be supported will be determined by the capabilities of the Spatial Decoder of the invention or the display interface not the Temporal Decoder.

A.18.6 Events and Errors

A.18.6.1 Chip Stopped

Writing 1 to chip_access requests that the Temporal Decoder halt operation to allow re-configuration. The Temporal Decoder will continue operating normally until it reaches the end of the current video sequence. After reset is removed chip_access=1 i.e. the Temporal Decoder is halted.

When the chip stops, a chip stopped event will occur. If chip_stopped_mask=1 an interrupt will be generated.

A.18.6.2 Count Error

The Temporal Decoder contains an adder that adds predictions to error data. If there is a difference between the number of error data bytes and the number of prediction data bytes then a count error event is generated.

If count_error_mask=1 an interrupt will be generated and prediction forming will stop.

Writing 1 to count_error_event clears the event and allows the Temporal Decoder to proceed. The DATA Token that caused the error will then proceed. However, the DATA Token that caused the error will not be of the correct length (64 bytes). This is likely to cause further problems.

A count error should only arise if a significant hardware error has occurred.

SECTION A.19 Connecting to the output of the Temporal Decoder

The output of the Temporal Decoder is a standard Token Port with 8 bit wide data words. See Section A.4 for more information about the electrical behavior of the interface.

The Tokens present at the output will depend on the coding standard employed and, in the case of MPEG, whether the pictures are being re-ordered. This section identifies which of the Tokens available at the output of the Temporal decoder are the most useful when designing circuits to display that output. Other Tokens will be present, but are not needed to display the output, and so, are not discussed here.

This section concentrates on showing:

How the start and end of sequences can be identified.

How the start and end of pictures can be identified.

How to identify when to display the picture.

How to identify where in the display the picture data should be placed.

A.19.1 JPEG output

The Token sequence output by the Temporal Decoder when decoding JPEG data is identical to that seen at the output of Spatial Decoder. However, the Temporal Decoder tests intra data Tokens for negative values (resulting from the finite arithmetic precision of the IDCT in the Spatial Decoder) and replaces them with zero.

See Section A.16 for further discussion of the output sequence observed during JPEG operation.

A.19.2 H.261 Output

A.19.2.1 Start and end of sessions

H.261 doesn't signal the start and end of the video stream within the video data. This is implied by the application. For example, the sequence starts when the telecommunication connection is made and ends when the line is dropped. So, the highest layer in the video syntax is the "picture layer".

The start code detector of the Spatial Decoder allows SEQUENCE_START and CODING_STANDARD Tokens to be inserted automatically before the first PICTURE_START. See sections A.11.7.3 and A.11.7.4.

At the end of an H.261 session (e.g., when the line is dropped) the user should insert a FLUSH Token after the end of the coded data. This has a number of effects (see Appendix A.31.1:

It ensures that PICTURE_END is generated to signal the end of the last picture.

It ensures that the end of the coded data is pushed through the decoder.

A.19.2.2 Acquiring pictures

Each picture is composed of a hierarchy of elements, these are referred to as layers in the syntax.

The sequence of Tokens at the output of the Temporal Decoder when decoding H.261 reflects this structure.

A.19.2.2.1 Picture layer

Each picture is preceded by a PICTURE_START Token and is followed by a PICTURE_END Token. H.261 doesn't naturally contain a picture end. This Token is inserted automatically by the start code detector of the Spatial Decoder.

After the PICTURE_START Token there will be TEMPORAL_REFERENCE and PICTURE_TYPE Tokens. The TEMPORAL_REFERENCE Token carries a 10 bit number (of which only the 5 LSBs are used in H.261) that indicates when the picture should be displayed. This should be studied by any display system as H.261 encoders can omit pictures from the sequence (to achieve lower data rates). Omission of pictures can be detected by the temporal reference incrementing by more than one between successive pictures.

The PICTURE_TYPE Token carries information about the picture format. A display system may study this information to detect if CIF or QCIF pictures are being decoded. However, information about the picture format is also available by studying registers within the Huffman decoder.

A.19.2.2.2 Group of Blocks Layer

Each H.261 picture is composed of a number of "groups of blocks". Each of these is preceded by a SLICE_START Token (derived from the H.261 group number and group start code). This Token carries an 8 bit value that indicates where in the display the group of blocks should be placed. This provides an opportunity for the decoder to resynchronize after data errors. It also provides the encoder with a mechanism to skip blocks if there are areas of a picture that do not require additional information to describe them. By the time SLICE_START reaches the output of the Temporal Decoder this information is effectively redundant as the Spatial Decoder and Temporal Decoder have already used the information to ensure that each picture contains the correct number of blocks in the correct positions. So, it should be possible _to compute where to position a block of data output by the Temporal Decoder just by counting the number of blocks that have been output since the start of the picture.

The number carried by SLICE_START is one less than the H.261 group of blocks number (see the H.261 standard for more information). FIG. 39 shows the positioning of H.261 groups of blocks within CIF and QCIF pictures. NOTE: the block numbering shown is that carried by SLICE_START. This is different from the H.261 convention for numbering these groups.

Between the SLICE_START (which indicates the start of each group of blocks) and the first macroblock there may be other Tokens. These can be ignored as they are not required to display the picture data.

A.19.2.2.3 Macroblock layer

The sequence of macroblocks within each group of blocks is defined by H.261. There is no special Token information describing the position of each macroblock. The user should count through the macroblock sequence to determine where to display each piece of information.

FIG. 40 shows the sequence in which macroblocks are placed in each group of blocks.

Each macroblock contains 6 DATA Tokens. The sequence of DATA Tokens in each group of 6 is defined by the H.261 macroblock structure. Each DATA Token should contain exactly 64 data bytes for an 8×8 area of pixels of a single color component. The color component is carried in a 2 bit number in the DATA Token (see section A.3.5.1). However, the sequence of the colour components in H.261 is defined.

Each group of DATA Tokens is preceded by a number of Tokens communicating information about motion vectors, quantizer scale factors, etc. These Tokens are not required to allow the pictures to be displayed and so can be ignored.

Each DATA Token contains 64 data bytes for an 8×8 of a single colour component. These are in a raster order.

A.19.3 MPEG output

MPEG has more layers in its syntax. These embody concepts such as a video sequence and the group of pictures.

A.19.3.1 MPEG Sequence layer

A sequence can have multiple entry points (sequence starts) but should have only a single exit point (sequence end). When an MPEG sequence header code is decoded the Spatial Decoder generates a CODING_STANDARD Token followed by a SEQUENCE_START Token.

After the SEQUENCE_START there will be a number of Tokens of sequence header information that describe the video format etc. See the draft MPEG standard for the information that is signalled in the sequence header and Table A.3.2 for information about how this data is converted into Tokens. This information describing the video format is also available in registers in the Huffman decoder.

This sequence header information may occur several times within an MPEG sequence, if that sequence has several entry points.

A.19.3.2 Group of pictures layer

An MPEG group of pictures provides a different type of "entry" point to that provided at a sequence start. The sequence header provides information about the picture/video format. So if the decoder has no knowledge of the video format used in a sequence it must start at a sequence start. However, once the video format is configured into the decoder it should be possible to start decoding at any group of pictures.

MPEG doesn't limit the number of pictures in a group. However, in many applications a group will correspond to about 0.5 seconds, as this provides a reasonable granularity of random access.

The start of a group of pictures is indicated by a GROUP_START Token. The header information provided after GROUP_START includes two useful Tokens: TIME_CODE and BROKEN_CLOSED.

TIME_CODE carries a subset of the SMPTE time code information. This may be useful in synchronizing the video decoder to other signals. BROKEN_CLOSED carries the MPEG closed_gap and broken_link bits. See Section A.19.3.8 for more on the implications of random access and decoding edited video sequences.

A.19.3.3 Picture layer

The start of a new picture is indicated by the PICTURE_START Token. After this there will be TEMPORAL_REFERENCE and PICTURE_TYPE Tokens. The temporal reference information may be useful if the Temporal Decoder is not configured to provide picture re-ordering. The picture type information may be useful if a display system wants to specially process B pictures at the start of an open GOP (see Section A.19.3.8).

Each picture is composed of a number of slices.

A.19.3.4 Slice layer

Section A.19.2.2.2 discusses the group of blocks used in H.261. The slice in MPEG serves a similar function. However, the slice structure is not fixed by the standard. The 8 bit value carried by the SLICE_START Token is one less than the "slice vertical position" communicated by MPEG. See the draft MPEG standard for a description of the slice layer.

By the time SLICE_START reaches the output of the Temporal Decoder this information is effectively redundant as the Spatial Decoder and Temporal Decoder have already used the information to ensure that each picture contains the correct number of blocks in the correct positions. So, it should be possible to compute where to position a block of data output by the Temporal Decoder just by counting the number of blocks that have been output since the start of the picture.

See section A.19.3.7 for discussion of the effects of using MPEG picture reordering.

A.19.3.5 Macroblock layer

Each macroblock contains 6 blocks. These appear at the output of the Temporal Decoder in raster order (as specified by the draft MPEG specification).

A.19.3.6 Block layer

Each macroblock contains 6 DATA Tokens. The sequence of DATA Tokens in each group of 6 is defined by the draft MPEG specification (this is the same as the H.261 macroblock structure). Each DATA token should contain exactly 64 data bytes for an 8×8 area of pixels of a single colour component. The colour component is carried in a 2 bit number in the DATA Token (see A.3.5.1). However, the sequence of the colour components in MPEG is defined.

Each group of DATA Tokens is preceded by a number of Tokens communicating information about motion vectors, quantizer scale factors etc. These Tokens are not required to allow the pictures to be displayed and so can be ignored.

A.19.3.7 Effect of MPEG picture re-ordering

As described in A.18.3.5 the Temporal Decoder can be configured to provide MPEG picture re-ordering (MPEG_reordering=1). The output of P and I pictures is delayed until the next P/I picture in the data stream starts to be decoded by the Temporal Decoder. At the output of the Temporal Decoder the DATA Tokens of the newly decoded P/I picture are replaced with DATA Tokens from the older P/I picture.

When reordering P/I pictures the PICTURE_START, TEMPORAL_REFERENCE and PICTURE_TYPE Tokens of the picture are stored temporarily on-chip as the picture is written into the off-chip picture buffers. When the picture is read out for display these stored Tokens are retrieved. So, re-ordered P/I pictures have the correct values for PICTURE_START, TEMPORAL_REFERENCE and PICTURE_TYPE.

All other tokens below the picture layer are not re-ordered. As the re-ordered P/I picture is read-out for display it picks up the lower level non-DATA tokens of the picture that has just been decoded. So, these sub-picture layer Tokens should be ignored.

A.19.3.8 Random access and edited sequences

The Spatial Decoder provides facilities to help correct video decoding of edited MPEG video data and after a random access into MPEG video data.

A.19.3.8.1 Open GOPs

A group of pictures (GOP) can start with B pictures that are predicted from a P picture in a previous GOP. This is called an "open GOP". FIG. 41 illustrates this. Pictures 17 and 18 are B pictures at the start of the second GOP. If the GOP is "open" then the encoder may have encoded these two pictures using predictions from the P picture 16 and also the I picture 19. Alternatively the encoder could have restricted itself to using predictions from only the I picture 19. In this case the second GOP is a "closed GOP".

If a decoder starts decoding the video at the first GOP it will have no problems when it encounters the second GOP even if that GOP is open. This is because it will have already decoded the P picture 16. However, if the decoder makes a random access and starts decoding at the second GOP it cannot decode B17 and B18 if they depend on P16 (i.e., if the GOP is open).

If the Spatial Decoder encounters an open GOP as the first GOP after it is reset or receives a FLUSH Token it will assume that a random access to an open GOP has occurred. In this case the Huffman decoder will consume the data for the B pictures in the normal way. However, it will output B pictures predicted with (0,0) motion vectors off the I picture. The effect will be that pictures B17 and B18 (in the example above) will be identical to I19.

This behaviour ensures correct maintenance of the MPEG VBV rules. Also it ensures that B pictures exist in the output at positions in the output stream expected by the other data channels. For example, the MPEG system layer provides presentation time information relating audio data to video data. The video presentation time stamps refer to the first displayed picture in a GOP, i.e. the picture with temporal reference 0. In the example above, the first displayed picture after a random access to the second GOP is B17.

The BROKEN_CLOSED Token carries the MPEG closed_gop bit. So, at the output of the Temporal Decoder it is possible to determine if the B pictures output are genuine or "substitutes" introduced by the Spatial Decoder. Some applications may wish to take special measures when these "substitute" pictures are present.

A.19.3.8.2 Edited video

If an application edits an MPEG video sequence it may break the relationship between two GOPs. If the GOP after the edit is an open GOP it will no longer be possible to correctly decode the B pictures at the beginning of the GOP. The application editing the MPEG data can set the broken_link bit in the GOP after the edit to indicate to the decoder that it will not be able to decode these B pictures.

If the Spatial Decoder encounters a GOP with a broken link the Huffman decoder will decode the data for the B pictures in the normal way. However, it will output B pictures predicted with (0,0) motion vectors off the I picture. The result will be that pictures B17 and B18 (in the example above) will be identical to I19.

The BROKEN_CLOSED Token carries the MPEG broken_link bit. So, at the output of the Temporal Decoder it is possible to determine if the B pictures output are genuine or "substitutes" introduced by the Spatial Decoder. Some applications may wish to take special measures when these "substitute" pictures are present.

SECTION A.20 Late Write DRAM Interface

The interface is configurable in two ways:

The detail timing of the interface can be configured to accommodate a variety of different DRAM types The "width" of the DRAM interface can be configured to provide a cost/performance trade-off

TABLE A.20.1

DRAM interface signals

| Signal Name | Input/Output | Description |
|---|---|---|
| DRAM_data[31:0] | I/O | The 32 bit wide DRAM data bus. Optionally this bus can be configured to be 16 or 8 bits wide. |
| DRAM_addr[10:0] | O | The 22 bit wide DRAM interface address is time multiplexed over this 11 bit wide bus. |

TABLE A.20.1-continued

DRAM interface signals

| Signal Name | Input/Output | Description |
|---|---|---|
| $\overline{RAS}$ | O | The DRAM Row Address Strobe signal |
| $\overline{CAS}$[3:0] | O | The DRAM Column Address Strobe signal. One signal is provided per byte of the interface's data bus. All the $\overline{CAS}$ signals are driven simultaneously. |
| $\overline{WE}$ | O | The DRAM Write Enable signal |
| $\overline{OE}$ | O | The DRAM Output Enable signal |
| DRAM_enable | I | This input signal, when low makes all the output signals on the interface go high impedance and stops activity on the DRAM interface. |

TABLE A.20.2

DRAM interface configuration registers

| Register name | Size/Dir. | Reset State | Description |
|---|---|---|---|
| modify_DRAM_timing | 1 bit rw | 0 | This function enable register allows access to the DRAM interface timing configuration registers. The configuration registers should not be modified while this register holds the value zero. Writing a one of this register requests access to modify the configuration registers After a zero has been written to this register the DRAM interface and start to use the new values in the timing configuration registers. |
| page_start_length | 5 bit rw | 0 | Specifies the length of the access start in ticks. The minimum value that can be used is 4 (meaning 4 ticks). 0 selects the maximum length of 32 ticks. |
| read_cycle_length | 4 bit rw | 0 | Specifies the length of the fast page read cycle in ticks. The minimum value that can be used is 4 (meaning 4 ticks). 0 selects the maximum length of 16 ticks. |
| write_cycle_length | 4 bit rw | 0 | Specifies the length of the fast page late write cycle in ticks. The minimum value that can be used is 4 (meaning 4 ticks). 0 selects the maximum length of 16 ticks. |
| refresh_cycle_length | 4 bit rw | 0 | Specifies the length of the refresh cycle in ticks. The minimum value that can be used is 4 (meaning 4 ticks). 0 selects the maximum length of 16 ticks. |
| RAS_falling | 4 bit rw | 0 | Specifies the number of ticks after the start of the access start that $\overline{RAS}$ falls. The minimum value that can be used is 4 (meaning 4 ticks). 0 selects the maximum length of 16 ticks. |
| CAS_falling | 4 bit rw | 8 | Specifies the number of ticks after the start of a read cycle, write cycle or access start that $\overline{CAS}$ falls. The minimum value that can be used is 1 (meaning 1 tick). 0 selects the maximum length of 16 ticks. |
| DRAM_data_width | 2 bit rw | 0 | Specifies the number of bits used on the DRAM interface data bus DRAM_data[31:0]. See A.20.4. |
| row_address_bits | 2 bit rw | 0 | Specifies the number of bits used for the row address portion of the DRAM interface address bus. See A.20.5. |
| DRAM_enable | 1 bit rw | 1 | Writing the value 0 in to this register forces the DRAM interface into a high impedance state. 0 will be read from this register if either the DRAM_enable signals low or 0 has been written to the register. |
| refresh_interval | 8 bit rw | 0 | This value specifies the interval between refresh cycles in periods of 16 decoder_clock cycles. Values in the range 1..255 can be configured. The value 0 is automatically loaded after reset and |

TABLE A.20.2-continued

DRAM interface configuration registers

| Register name | Size/ Dir. | Reset State | Description |
|---|---|---|---|
| | | | forces the DRAM interface to continuously execute refresh cycles until a valid refresh interval is configured. It is recommended that refresh_interval should be configured only after each reset. |
| no_refresh | 1 bit rw | 0 | Writing the value 1 to this register prevents execution of any refresh cycles. |
| CAS_strength RAS_strength addr_strength DRAM_data_strength OEWE_strength | 3 bit rw | 6 | These three bit registers configure the output drive strength of DRAM interface signals. This allows the interface to be configured for various different loads. See A.20.8. |

A.20.1 Interface timing (ticks)

The DRAM interface timing is derived from a clock which is running at four times the input clock rate of the device (decoder_clock). This clock is generated by an on-chip PLL.

For brevity, periods of this high speed clock are referred to as ticks.

A.20.2 Interface operation

The interface uses of the DRAM fast page mode. Three different types of access are supported: read; write; and refresh.

Each read or write access transfers a burst of between 1 and 64 bytes at a single DRAM page address. Read and write transfers are not mixed within a single access. Each successive access is treated as a random access to a new DRAM page.

A.20.3 Access structure

Each access is composed of two parts: access start, and data transfer.

Each access starts with an access start and is followed by one or more data transfer cycles. There is a read, write and refresh variant of both the access start and the data transfer cycle.

At the end of the last data transfer in an access the interface enters its default state and remains in this state until a new access is ready to start. If a new access is ready to start when the last access finishes then the new access will start immediately.

A.20.3.1 Access start

The access start provides the page address for the read or write transfers and establishes some initial signal conditions. There are three different access starts:, Start of read; Start of write; and Start of refresh.

Figure 42:
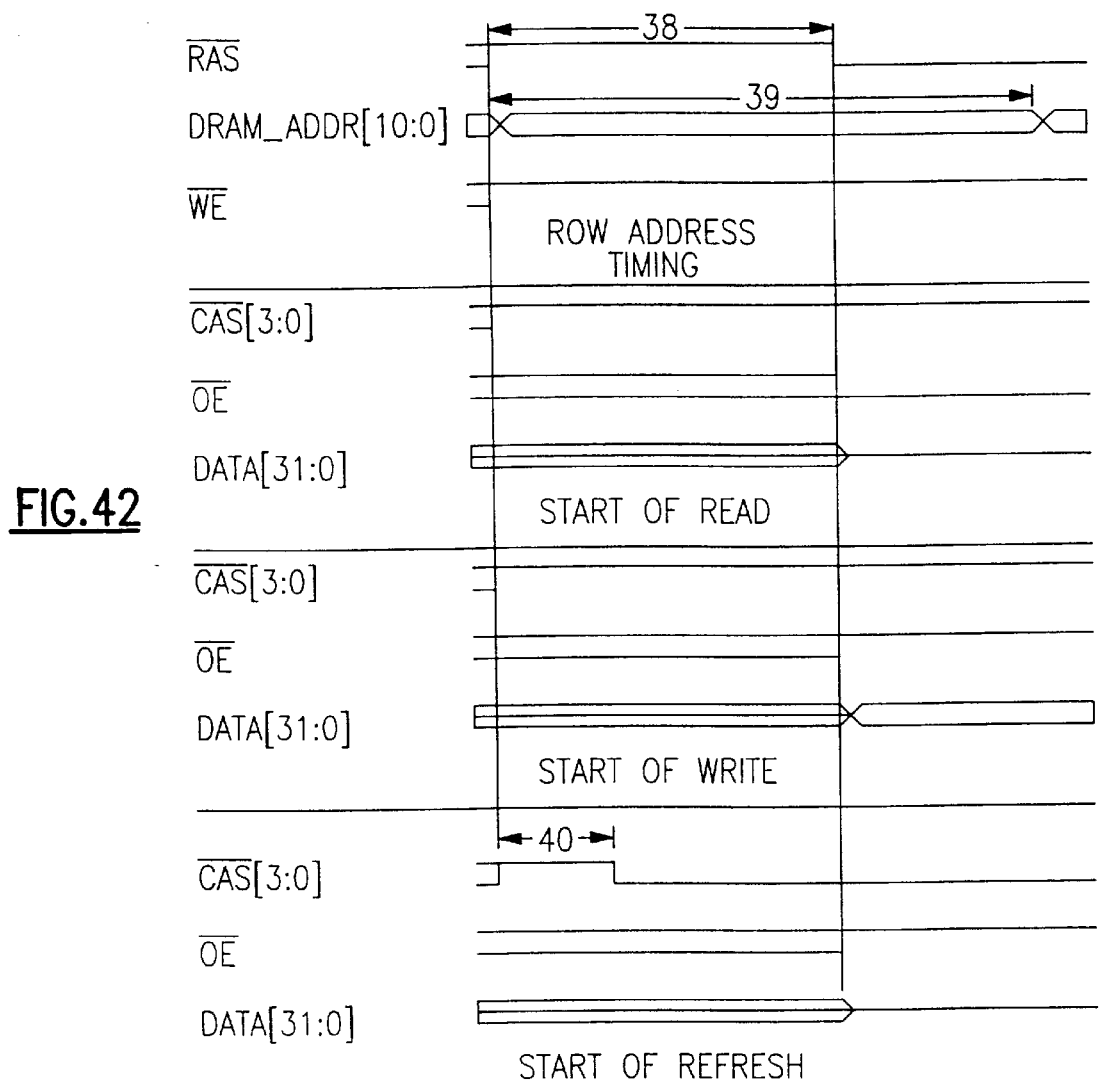
FIG. 42 is a timing diagram illustrating access start timing.

In each case the timing of $\overline{RAS}$ and the row address is controlled by the registers RAS_falling and page_start_length. The state of $\overline{OE}$ and DRAM_data[31:0] is held from the end of the previous data transfer until $\overline{RAS}$ falls. The three different access start types are only different in how they drive $\overline{OE}$ and DRAM_data[31:0] when $\overline{RAS}$ falls. See FIG. 42.

TABLE A.20.3

Access start parameters

| Num. | Characteristic | Min. | Max. | Unit | Notes |
|---|---|---|---|---|---|
| 38 | $\overline{RAS}$ precharge period set by register RAS_falling | 4 | 16 | tick | |
| 39 | Access start duration set by register page_start_length | 4 | 32 | | |
| 40 | $\overline{CAS}$ precharge length set by register CAS_falling. | 1 | 16 | | a |
| 41 | Fast page read cycle length set by the register read_cycle_length. | 4 | 16 | | |
| 42 | Fast page write cycle length set by the register write_cycle_length. | 4 | 16 | | |
| 43 | $\overline{WE}$ falls one tick after $\overline{CAS}$. | | | | |
| 44 | Refresh cycle length set by the register refresh_cycle. | 4 | 16 | | |

<sup>a</sup>This value must be less than RAS_falling to ensure $\overline{CAS}$ before $\overline{RAS}$ refresh occurs.

A.20.3.2 Data transfer

There are three different types of data transfer cycle: fast page read cycle; fast page late write cycle; and refresh cycle.

A start of refresh is only followed by a single refresh cycle. A start of read (or write) can be followed by one or more fast page read (or write) cycles.

At the start of the read cycle $\overline{CAS}$ is driven high and the new column address is driven.

A late write cycle is used. $\overline{WE}$ is driven low one tick after $\overline{CAS}$. The output data is driven one tick after the address.

As a $\overline{CAS}$ before $\overline{RAS}$ refresh cycle is initiated by the start of refresh cycle there is no interface signal activity during a refresh cycle. The purpose of the refresh cycle is to meet the minimum $\overline{RAS}$ low period required by the DRAM.

A.20.3.3 Interface default state

The interface signals enter a default state at the end of an access:

$\overline{RAS}$, $\overline{CAS}$ and $\overline{WE}$ high data and $\overline{OE}$ remain in their previous state addr remains stable

A.20.4 Data bus width

The two bit register DRAM_data_width allows the width of the DRAM interfaces data path to be configured. This allows the DRAM cost to be minimized when working with small picture formats.

TBLE A.20.4

Configuring DRAM_data_width

| DRAM_data_width | |
|---|---|
| 0[a] | 8 bit wide data bus on DRAM_data[31:24][b]. |
| 1 | 16 bit wide data bus on DRAM_data[31:16][b]. |
| 2 | 32 bit wide data bus on DRAM_data[31:0]. |

[a]Default after reset.
[b]Unused signals are held high impedance.

A.20.5 Address bits

On-chip, a 24 bit address is generated. How this address is used to form the row and column addresses depends on the width of the data bus and the number of bits selected for the row address. Some configurations don't permit all the internal address bits to be used (and so produce "hidden bits").

The row address is extracted from the middle portion of the address. This maximizes the rate at which the DRAM is naturally refreshed.

A.20.5.1 Low order column address bits

The least significant 4 to 6 bits of the column address are used to provide addresses for fast page mode transfers of up to 64 bytes. The number of address bits required to control these transfers will depend on the width of the data bus (see A.20.4).

A.20.5.2 Row address bits

The number of bits taken from the middle section of the 24 bit internal address to provide the row address is configured by the register row_address_bits.

TABLE A.20.5

Configuring row_address_bits

| row_address_bits | Width of row address |
|---|---|
| 0 | 9 bits |
| 1 | 10 bits |
| 2 | 11 bits |

The width of row address used will depend on the type of DRAM used and whether the MSBs of the row address are decoded off-chip to access multiple banks of DRAM.

NOTE: The row address is extracted from the middle of the internal address. If some bits of the row address are decoded to select banks of DRAM then all possible values of these "bank select bits" must select a bank of DRAM. Otherwise, holes will be left in the address space.

TABLE A.20.6

Selecting a value for row_address_bits

| row_address_bits | row address bits | bank select | DRAM depth |
|---|---|---|---|
| 0 | DRAM_addr[8:0] | | 256k |
| 1 | DRAM_addr[8:0] | DRAM_addr[9] | 256k |
| | DRAM_addr[9:0] | | 512k |
| | DRAM_addr[9:0] | | 1024k |
| 2 | DRAM_addr[8:0] | DRAM_addr[10:9] | 256k |
| | DRAM_addr[9:0] | DRAM_addr[10] | 512k |
| | DRAM_addr[9:0] | DRAM_addr[10] | 1024k |
| | DRAM_addr[10:0] | | 2048k |
| | DRAM_addr[10:0] | | 4096k |

A.20.6 DRAM Interface enable

There are two ways to make all the output signals on the DRAM interface become high impedance. The DRAM_enable register and the DRAM_enable signal. Both the register and the signal must be at a logic 1 for the DRAM interface to operate. If either is low then the interface is taken to high impedance and data transfers through the interface are halted.

The ability to take the DRAM interface to high impedance is provided to allow other devices to test or to use the DRAM controlled by the Spatial Decoder (or the Temporal Decoder) when the Spatial Decoder (or the Temporal Decoder) is not in use. It is not intended to allow other devices to share the memory during normal operation.

A.20.7 Refresh

Unless disabled by writing to the register no_refresh the DRAM interface will automatically refresh the DRAM using a CAS before RAS refresh cycle at an interval determined by the register refresh_interval.

The value in refresh_interval specifies the interval between refresh cycles in periods of 16 decoder_clock cycles. Values in the range 1 to 255 can be configured. The value 0 is automatically loaded after reset and forces the DRAM interface to continuously execute refresh cycles (once enabled) until a valid refresh interval is configured. It is recommended that refresh_interval should be configured only once after each reset.

A.20.8 Signal strengths

The drive strength of the outputs of the DRAM interface can be configured by the user using the 3 bit registers CAS_strength, RAS strength, addr_strength, DRAM_data_strength, OEWE_strength. The MSB of this 3 bit value selects either a fast or slow edge rate. The two less significant bits configure the output for different load capacitances.

The default strength after reset is 6, configuring the outputs to take approximately 10 ns to drive signal between GND and $V_{DD}$ if loaded with $12_pF$.

TABLE A.20.7

Output strength configurations

| Strength value | Drive characteristics |
|---|---|
| 0 | Approx. 4 ns/V into 6 pf load |
| 1 | Approx. 4 ns/V into 12 pf load |
| 2 | Approx. 4 ns/V into 24 pf load |
| 3 | Approx. 4 ns/V into 48 pf load |
| 4 | Approx. 2 ns/V into 6 pf load |
| 5 | Approx. 2 ns/V into 12 pf load |
| 6[a] | Approx. 2 ns/V into 24 pf load |
| 7 | Approx. 2 ns/V into 48 pf load |

[a]Default after reset

When an output is configured approximately for the load it is driving it will meet the AC electrical characteristics specified in Tables A.20.11 to Table A.20.12. When appropriately configured each output is approximately matched to it's load and so minimal overshoot will occur after a signal transition.

A.20.9 After reset

After reset the DRAM interface configuration registers are all reset to their default values. Most significant of these default configurations are:

The DRAM interface is disabled and allowed to go high impedance.

The refresh interval is configured to the special value 0 which means execute refresh cycle continuously after the interface is re-enabled.

The DRAM interface is set to its slowest configuration.

Most DRAMs require a "pause" of between 100 ps and 500 ps after power is first applied followed by a number of refresh cycles before normal operation is possible.

Immediately after reset the DRAM interface is inactive until both the DRAM_enable signal and the DRAM_enable register are set. When these have been set the DRAM interface will execute refresh cycles (approximately every 400 ns, depending upon the clock frequency used) until the DRAM interface is configured.

The user is responsible for ensuring that the DRAM's "pause" after power-up and for allowing sufficient time after enabling the DRAM interface to ensure that the required number of refresh cycles have occurred before data transfers are attempted.

While $\overline{\text{reset}}$ is asserted the DRAM interface is unable to refresh the DRAM. However, the reset time required by the decoder chips is sufficiently short so that it should be possible to reset them and to then re-enable the DRAM interface before the DRAM contents decay. This may be required during debugging.

A.20.10 Electrical specifications

TABLE A.20.8

Maximum Ratings[a]

| Symbol | Parameter | Min | Max. | Units |
|---|---|---|---|---|
| $V_{DD}$ | Supply voltage relative to GND | −0.5 | 6.5 | V |
| $V_{IN}$ | Input voltage on any pin | GND − 0.5 | $V_{DD}$ + 0.5 | V |
| $T_A$ | Operating temperature | −40 | +85 | °C. |
| $T_S$ | Storage temperature | −55 | +150 | °C. | a. Stresses greater than those listed here may cause permanent damage to the device. This is a stress rating only and functional operation of the device at these, or any other conditions above those indicated in the operational sections of this specification, is not implied. Exposure to absolute maximum rating conditions for extended periods may affect reliability.

TABLE A.20.9

DC Operating conditions

| Symbol | Parameter | Min. | Max. | Units |
|---|---|---|---|---|
| $V_{DD}$ | Supply voltage relative to GND | 4.75 | 5.25 | V |
| GND | Ground | 0 | 0 | V |
| $V_{IH}$ | Input logic "1" voltage | 2.0 | $V_{DD}$ + 0.5 | V |
| $V_{IL}$ | Input logic "0" voltage | GND − 0.5 | 0.8 | V |
| TA | Operating temperature | 0 | 70 | °C.[a] |

[a]With TBA linear ft/min transverse airflow

TABLE A.20.10

DC Electrical characteristics

| Symbol | Parameter | Min. | Max. | Units |
|---|---|---|---|---|
| $V_{OL}$ | Output logic '0' voltage | | 0.4 | V[a] |
| $V_{OH}$ | Output logic '1' voltage | 2.8 | | V |
| $I_O$ | Output current | ±100 | | |
| $I_{OZ}$ | Output off state leakage current | ±20 | | μA[b] |
| $I_{IZ}$ | Input leakage current | ±10 | | μA |
| $I_{DD}$ | RMS power supply current | | 500 | mA |
| $C_{IN}$ | Input capacitance | | 5 | pF |
| $C_{OUT}$ | Output/IO capacitance | | 5 | pF |

[a]AC parameters are specified using $V_{OL,max}$ = 0.8 V as the measurement level.
[b]This is the steady state drive capability of the interface. Transient currents may be much greater.

TABLE A.20.11

Differences from nominal values for a strobe

| Num. | Parameter | Min. | Max. | Unit | Note[a] |
|---|---|---|---|---|---|
| 45 | Cycle time e.g. tPC | −2 | +2 | ns | |
| 46 | Cycle time e.g. tRC | −2 | −2 | ns | |
| 47 | High pulse e.g. tRP, tCP, TCPN | −5 | +2 | ns | |
| 48 | Low pulse e.g. tRAS, tCAS, tCAC, tWP, tRASP, tRASC | −11 | +2 | ns | |
| 49 | Cycle time e.g. tACP/tCPA | −8 | +2 | ns | |

[a]The driver strength of the signal must be configured appropriately for its load

TABLE A.20.12

Differences from nominal values between two strobes

| Num. | Parameter | Min. | Max. | Unit | Note[a] |
|---|---|---|---|---|---|
| 50 | Strobe to strobe delay e.g. tRCD, tCSR | −3 | +3 | ns | |
| 51 | Low hold time e.g. tRSH, tCSH, tRWL, tCWL, tRAC, tOAC/OE, tCHR | −13 | +3 | ns | |
| 52 | Strobe to strobe precharge e.g. tCRP, tRCS, tRCH, tRRH, tRPC | −9 | +3 | ns | |
| | $\overline{\text{CAS}}$ precharge pulse between any two $\overline{\text{CAS}}$ signals on wide DRAMs e.g. tCP, or between $\overline{\text{RAS}}$ rising and $\overline{\text{CAS}}$ falling e.g. tRPC | −5 | +2 | ns | |
| 53.00 | Precharge before disable e.g. tRHCP/CPRH | −12 | +3 | ns | |

[a]The driver strength of the two signals must be configured appropriately for their loads.

PART B—DETAILED DESCRIPTION

SECTION B.1 Start code detector

B.1.1 Overview

The Start Code Detector (SCD) is the first block on the Spatial Decoder. Its primary purpose is to detect MPEG, JPEG and H.261 Start Codes in the input data stream and to replace them with relevant Tokens. It also allows user access to the input data stream via the microprocessor interface, and performs preliminary formatting and "tidying up" of the token data stream.

Start Codes are 24, 16 and 8 bits wide for MPEG, H.261, and JPEG, respectively. The Start Code Detector takes the incoming data in bytes, either from the upi or a token/byte port and shifts it through three shift registers. The first is an 8 bit parallel in serial out, the second is of programmable length (16 or 24 bits) and is where the start codes are detected, and the third is 15 bits wide and is used to reformat the data into 15 bit tokens. There are also two "tag" Shift Registers (SR) running parallel with the second and third SRs. These contain tags to indicate whether or not the associated bit in the data SR is good or not. Incoming bytes that are not part of a DATA Token and are unrecognized by the SCD, are allowed to bypass the shift registers and are output when all three shift registers are flushed (empty) and the contents output successfully. Recognized non-data tokens are used to configure the SCD, spring traps, or set flags. They also bypass the shift registers and are output unchanged.

B.1.2 Major Blocks

The hardware consists of 10 state machines(see block diagram). All blocks have a one page schematic and a corresponding M description.

B.1.2.1 Input Circuit (scdipc.sch, ipim.M)

The input circuit has three modes of operation: token, byte and upi. These allow data to be input either as a raw byte stream (but still using the two-wire interface), as a token stream, or by the user via the upi. In all cases the input circuit will always output the correct DATA Tokens by generating DATA Token headers where appropriate. Transitions to and from upi mode are synchronized to the system clocks and the upi may be forced to wait until a safe point in the data stream before gaining access. The Byte-mode pin determines whether the input circuit is in token or byte mode.

B.1.2.2 Token decoder (scdipnew.sch, scdipnem.M)

This block decodes the incoming tokens and issues commands to the other blocks.

TABLE B.1.1.

Recognized input tokens

| Input Token | Command issued | Comments |
|---|---|---|
| NULL | WAIT | NULLS are removed |
| DATA | NORMAL | Load next byte into first SR |
| CODING_STD | BYPASS | Flush shift registers, perform padding, output and switch to bypass mode. Load CODING_STANDARD register. |
| FLUSH | BYPASS | Flush SRs with padding, output and switch to bypass mode. |
| ELSE (unrecognised token) | BYPASS | Flush SRs with padding, output and switch to bypass mode. |

Note: A change in CODING_STANDARD is passed to all blocks via the two-wire interface after the SRs are flushed. This ensures that the change from one data stream to another happens at the correct point throughout the SCD. This principle is applied throughout the presentation so that a change in the coding standard can flow through the whole chip prior to the new stream.

Note: A change in CODING_STANDARD is passed to all blocks via the two-wire interface after the SRs are flushed. This ensures that the change from one data stream to another happens at the correct point throughout the SCD. This principle is applied throughout the CD1101 so that a change in coding standard flows through the whole chip preceding to the new stream.

B.1.2.3 JPEG (scdjpeg.sch scdjpegm.M)

Start codes (Markers) in JPEG are sufficiently different that JPEG has a state machine all to itself. This block handles all the JPEG marker detection, length counting/checking, and removal of data. Detected JPEG markers are flagged as start codes (with v_not_t—see later text) and the command from scdipnew is overridden and forced to bypass. The operation is best described in code.

```
switch (state)
{
   case (LOOKING):
      if (input == 0xff)
      {
         state = GETVALUE;/*Found a marker*/
         remove; /*Marker gets removed*/
      }
      else
         state = LOOKING;
   break;
   case (GETVALUE);
      if (input == 0xff)
      {
         state = GETVALUE; /*Overlapping markers*/
         remove;
      }
      else if (input ==0x00)
      {
         state = LOOKING;/*Wasn't a marker*/
         insert(0xff);/*Put the 0xff back*/
      }
      else
      {
      command = BYPASS;/*override command*/
         if(lc)/*Does the marker have a length count*/
            state = GETLC0;
         else
            state = LOOKING;
      break;
      case (GETLC0):
         loadlc0;/*Load the top length count byte*/
         state = GETLC1;
         remove;
      break;
      case(GETLC1)
         loadlc1;
         remove;
         state = DECLC;
      break;
      case (DECLC):
         lcnt = lcnt − 2
         state = CHECKLC;
      break;
      case(CHECKLC):
         if(lcnt == 0)
            state = LOOKING;/*No more to do*/
         else if (lcnt < 0)
            state = LOOKING;/*generate Illegal_Length_Error*/
         else
            state = COUNT;
      break;
      case (COUNT):
         decrement length count until 1
         if(lc <= 1)
            state = LOOKING;
}
```

B.1.2.4 Input Shifter (scinshft.sch, scinshm.M)

The basic operation of this block is quite simple. It takes a byte of data from the input, loads the shift register and shifts it out. However, it also obeys the commands from the input decoder and handles the transitions to and from bypass mode (flushing the other SRs): On receiving a BYPASS command, the associated byte is not loaded into the shift register. Instead "rubbish" (tag=1) is shifted out to force any data held in the other shift registers to the output. The block then waits for a "flushed" signal indicating that this "rubbish" has appeared at the token reconstructer. The input byte is then passed directly to the token reconstructer.

B.1.2.5 Start code detector (scdetect.sch, scdetm.M)

This block includes two shift registers which are programmable to 16 or 24 bits, start code detection logic and "valid contents" detection logic. MPEG start codes require the full 24 bits whereas H.261 requires only 16.

The first SR is for data and the second carries tags which indicate whether the bits in the data SR are valid—there are no gaps or stalls (in the two-wire interface sense) in the SRs but the bits they contain can be invalid (rubbish) whilst they are being flushed. On detection of a start code the tag shift register bits are set in order to invalidate the contents of the detector SR.

A start code cannot be detected unless the SR contents are all valid. Non byte-aligned start codes are detected and may be flagged. When a start code is detected, it cannot be definitely flagged until an overlapping start code has been checked for. To achieve this, the "value" of the detected start code (the byte following it) is shifted right through scinshift, scdetect and into scoshift. Having arrived at scoshift without the detection of another start code, overlapping start codes have been eliminated and it is flagged as a valid start code.

B.1.2.6 Output Shifter (scoshift.sch, scoshm.M)

The basic operation is to take serial data (and tags) from scdetect, pack it into 15 bit words and output them. Other functions are:

B.1.2.6.1 Data padding

The output consists of 15 bit words but the input consists of an arbitrary number of bits. In order to flush therefore we need to add bits to make the last word up to 15 bits. These extra bits are called padding and must be recognized and removed by the Huffman block. Padding is defined to be:

After the last data bit, a "zero" is inserted followed by sufficient "ones" to make up a 15 bit word.

The data word containing the padding is output with a low extension bit to indicate that it is the end of a data token.

B.1.2.6.2 Generation of "flushed"

This involves detecting when all SRs are flushed and signaling this to the input shifter. When the "rubbish" inserted by the input shifter reaches the end of the output shifter, and the output shifter has completed its padding, a "flushed" signal is generated. This "flushed" signal must pass through the token reconstructer before it is safe for the input shifter to enter bypass mode.

B.1.2.6.3 Flagging valid start codes

If scdetect indicates that it has found a start code, padding is performed and the current data is output. The start code value (the next byte) is shifted through the detector to eliminate overlapping start codes. If the "value" arrives at the output shifter without another start code being detected, it was not overlapped and the value is passed out with a flag v_not_t (ValueNotToken) to indicate that it is a start code value. If however, another start code is detected (by scdetect) whilst the output shifter is waiting for the value, an overlapping_start_error is generated, the first value is discarded and the system then waits for the second value. This value can also be overlapped, the same procedure to be repeated until a non-overlapped start code is found.

B.1.2.6.4 Tidying up after a start code

Having detected and output a good start code, a new DATA header is generated when data (not rubbish) starts arriving.

B.1.2.7 Data stream reconstructer (sctokrec.sch, sctokrem.M)

This block has 2 input two-wire interfaces: one from scinshift for bypassed tokens, and one from scoshift for packed data and start codes. Switching between the two sources is only allowed when the current token (from either source) has been completed (low extension bit arrived).

B.1.2.8 Start value to start number conversion (scdromhw.sch, scdrom.M)

The process of converting start values into tokens is done in two stages. This block deals mainly with coding standard dependent issues reducing the 520 odd potential codes down to 16 coding standard independent indices.

As mentioned earlier, start values (including JPEG ones) are distinguished from all other data by a flag (value_not_token). If v_not_t is high, this block converts the 4 or 8 bit value, depending on the CODING_STANDARD, into a 4 bit start_number which is independent of the standard, and flags any unrecognized start codes.

The start numbers are as follows:

TABLE B.1.2.

| Start/Marker Code | Index (start_number) | Resulting Token |
|---|---|---|
| Start Code numbers (indices) | | |
| not_a_start_code | 0 | |
| sequence_start_code | 1 | SEQUENCE_START |
| group_start_code | 2 | GROUP_START |
| picture_start_code | 3 | PICTURE_START |
| slice_start_code | 4 | SLICE_START |
| user_data_start_code | 5 | USER_DATA |
| extension_start_code | 6 | EXTENSION_DATA |
| sequence_end_code | 7 | SEQUENCE_END |
| JPEG Markers | | |
| DHT | 8 | DHT |
| DQT | 9 | DOT |
| DNL | 10 | DNL |
| DRI | 11 | DRI |
| JPEG markers that can be mapped onto tokens for MPEG/H.261 | | |
| SOS | picture_start_code | PICTURE_START |
| SOI | sequence_start_code | SEQUENCE_START |
| EOI | sequence_end_code | SEQUENCE_END |
| SOF0 | group_start_code | GROUP_START |
| JPEG markers that generate extn or user data | | |
| JPG | extension_start_code | EXTENSION_DATA |
| JPGn | extension_start_code | EXTENSION_DATA |
| APPn | user_data_start_code | USER_DATA |
| COM | user_data_start_code | USER_DATA |

NOTE: All unrecognised JPEG markers generate an extn_start_code index

B.1.2.9 Start number to token conversion (sconvert.sch, sconverm.M)

The second stage of the conversion is where the above start numbers (or indices) are converted into tokens. This block also handles token extensions where appropriate, discarding of extension and user data, and search modes.

Search modes are a means of entering a data stream at a random point. The search mode can be set to one of eight values:

0: Normal Operation—find next start code.
½: System level searches not implemented on Spatial Decoder
3: Search for Sequence or higher
4: Search for group or higher
5: Search for picture or higher
6: Search for slice or higher
7: Search for next start code Any non-zero search mode causes data to be discarded until the desired start code (or higher in the syntax) is detected.

This block also adds the token extensions to PICTURE and SLICE start tokens:

PICTURE_START is extended with PICTURE_NUMBER, a four bit count of pictures. SLICE_START is extended with svp (slice vertical position). This is the "value" of the start code minus one (MPEG, H.261), and minus 0×D0 (JPEG).

B.1.2.10 Data Stream Formatting (scinsert.sch, scinserx.M)

Conditional insertion of PICTURE_END, FLUSH, CODING_STANDARD, SEQUENCE_START, and generation of the STOP_AFTER_PICTURE event. Its function is best simplified and described in software:

```
switch (input_data)
case(FLUSH)
    1. if (in_picture)
        output = PICTURE_END
    2. output = FLUSH
    3. if (in_picture & stop_after_picture)
        sap_error = HIGH
        in_picture = FALSE;
    4. in_picture = FALSE;
    break
case (SEQUENCE_START)
    1. if(in_picture)
        output = PICTURE_END
    2. if in_picture & stop_after_picture)
        2a. output = FLUSH
        2b. sap_error = HIGH
            in_picture = FALSE
    3. output = CODING_STANDARD
    4. output = standard
    5. output = SEQUENCE_START
    6. in_picture = FALSE;
    break
case (SEQUENCE_END) case (GROUP_START):
    1. if (in_picture)
        output = PICTURE_END
    2. if (in_picture & stop_after_picture)
        2a. output = FLUSH
        2b. sap_error = HIGH
            in_picture = FALSE
    3. output = SEQUENCE_END or GROUP_START
    4. in_picture = FALSE;
    break
    case (PICTURE_END)
    1. output = PICTURE_END
    2. if (stop_after_picture)
        2a. output = FLUSH
        2b. sap_error = HIGH
    3. in_picture = FALSE
    break
case (PICTURE_START)
    1. if (in_picture)
        output = PICTURE_END
    2. if (in_picture & stop_after_picture)
        2a. output = FLUSH
        2b. sap_error = HIGH
    3. if (insert_sequence_start)
        3a. output = CODING_STANDARD
        3b. output = standard
        3c. output = SEQUENCE_START
            insert_sequence_start = FALSE
    4. output = PICTURE_START
        in_picture = TRUE
    break
    default: Just pass it through
```

SECTION B.2 Huffman Decoder and Parser

B.2.1 Introduction

This section is a discussion of the Huffman Decoder and Parser circuitry.

Figure 43:
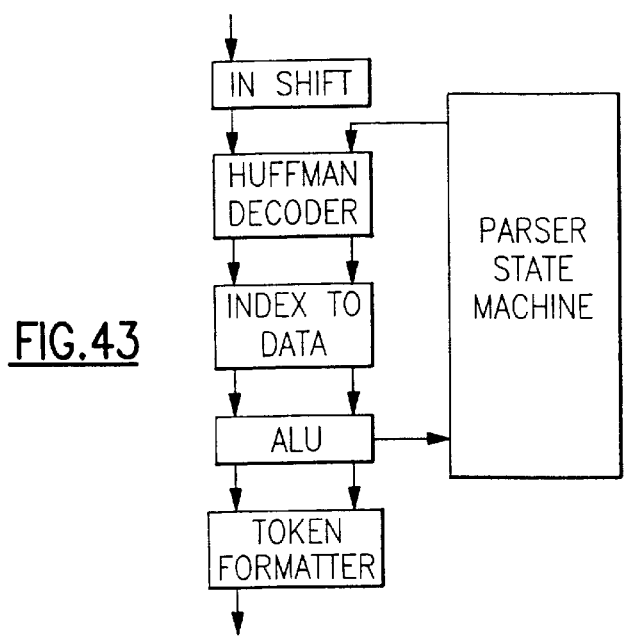
FIG. 43 is a block diagram of a Huffman decoder and parser.

FIG. 43 shows a high level block diagram of the Huffman decoder and parser. Many signals and buses are omitted from this diagram in the interests of clarity, in particular there are several places where data is fed backwards (within the large loop that is shown).

In essence the Huffman decoder and parser consist of a number of dedicated processing blocks (shown along the bottom of the diagram) which are controlled by a programmable state machine.

Data is received from the coded data buffer by the "Inshift" block. At this point there are essentially two types of information which will be encountered: Coded data which is carried by DATA Tokens and start codes which have already been replaced by their respective Tokens by the Start Code Detector. It is possible that other Tokens will be encountered but all Tokens (other than the DATA Tokens) are treated in the same way. Tokens (start codes) are treated as a special case as the vast majority of the data will still be encoded (in H.261, JPEG or MPEG).

All data which is carried by the DATA Tokens is transferred to the Huffman Decoder in a serial form (bit-by-bit). This data of course includes many fields which are not Huffman coded but are fixed length coded. Nevertheless this data is still passed to the Huffman Decoder serially. In the case of Huffman encoded data the Huffman Decoder only performs the first stage of decoding in which the actual Huffman code is replaced by an index number. If there are N district Huffman codes in the particular code table which is being decoded then this "Huffman Index" lies in the range 0 to N−1.

The Index to Data unit is a relatively simple block of circuitry which performs table look-up operations. It draws its name from the second stage of the Huffman decoding process in which the index number obtained in the Huffman Decoder is converted into the actual decoded data by a simple table look-up. The ALU is provided to implement other transformations on the decoded data. While the Index to Data Unit is suitable for relatively arbitrary mappings the ALU may be used where arithmetic is more appropriate. The ALU includes a register file which it can manipulate to implement various parts of the decoding algorithms. In particular the registers which hold vector predictions and DC predictions are included in this block. The ALU is based around a simple adder with operand selection logic. It also includes dedicated circuitry for sign-extension type operations. It is likely that a shift operation will be implemented but this will be performed in a serial manner; there will be no barrel shifter.

The Token Formatter has the task of finally assembling decoded data into Tokens which can be passed onto the rest of the decoder. The Parser State Machine has the task of coordinating the operation of the other blocks. In essence it is a very simple state machine, it produces a very wide "micro-code" control word which is passed to the other blocks. FIG. 43 shows that the instruction word is passed from block-to-block by the side of the data. This is indeed the case and it is important to understand that transfers between the different blocks are controlled by two-wire interfaces.

For example, a typical instruction might decode a Huffman code, transform it in the Index to Data unit, modify that result in the ALU and then this result is formed into a Token word. A single microcode instruction word is produced which contains all of the information to do this. The command is passed directly to the Huffman Decoder which requests data bits one-by-one from the "Inshift" block until it has decoded a complete symbol. Once this occurs the decoded index value is passed along with the original microcode word to the index to data unit. The Huffman Decoder will require several cycles to perform this in and indeed the number of cycles is actually determined by the data which is decoded. The Index to Data Unit will then map this value using a table which is identified in the microcode instruction word. This value is again passed onto the next block, the ALU along with the original microcode word. Once the ALU has completed the appropriate operation (the number of cycles may again be data dependent) it passes the appropriate data onto the Token Format block along with the microcode word which controls the way in which the Token word is formed.

The ALU has a number of status wires or "condition codes" which are passed back to the Parser State Machine. This allows the State Machine to execute conditional jump instructions. In fact all instructions are conditional jump instructions; one of the conditions that may be selected is hard-wired to the value "False". By selecting this condition a "no jump" instruction may be constructed.

The ALU includes a bank of counters that are used to count through the structure of the picture. The dimensions of the picture are programmed into registers associated with the counters that appear to the "microprogrammer" as part of the register bank. Several of the condition codes are outputs from this counter bank which allows conditional jumps based on "start of picture", "start of macroblock" and the like.

The Parser State Machine is also referred to as the "Demultiplex State Machine". Both terms are used in this document.

Input Shifter

The Input Shifter is a very simple piece of circuitry consisting of a two pipeline stage datapath ("hfidp") and controlling Zcells ("hfi").

In the first pipeline stage Token decoding takes place. Only the DATA token is recognized. Data contained in a DATA token is shifted one bit at a time into the Huffman Decoder. The second pipeline stage is the shift register. In the very last word of a DATA token special coding takes place such that it is possible to transmit an arbitrary number of bits through the coded data buffer. The following are all possible patterns in the last data word.

TABLE B.2.1

Possible Patterns in the Last Data Word

| E | D | C | B | A | 9 | 8 | 7 | 6 | 5 | 4 | 3 | 2 | 1 | 0 | No. of Bits |
|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | None |
| X | 0 | 1 | 1 | 1 | 1 | 1 | 1 | 1 | 1 | 1 | 1 | 1 | 1 | 1 | 1 |
| X | X | 0 | 1 | 1 | 1 | 1 | 1 | 1 | 1 | 1 | 1 | 1 | 1 | 1 | 2 |
| X | X | X | 0 | 1 | 1 | 1 | 1 | 1 | 1 | 1 | 1 | 1 | 1 | 1 | 3 |
| X | X | X | X | 0 | 1 | 1 | 1 | 1 | 1 | 1 | 1 | 1 | 1 | 1 | 4 |
| X | X | X | X | X | 0 | 1 | 1 | 1 | 1 | 1 | 1 | 1 | 1 | 1 | 5 |
| X | X | X | X | X | X | 0 | 1 | 1 | 1 | 1 | 1 | 1 | 1 | 1 | 6 |
| X | X | X | X | X | X | X | 0 | 1 | 1 | 1 | 1 | 1 | 1 | 1 | 7 |
| X | X | X | X | X | X | X | X | 0 | 1 | 1 | 1 | 1 | 1 | 1 | 8 |
| X | X | X | X | X | X | X | X | X | 0 | 1 | 1 | 1 | 1 | 1 | 9 |
| X | X | X | X | X | X | X | X | X | X | 0 | 1 | 1 | 1 | 1 | 10 |
| X | X | X | X | X | X | X | X | X | X | X | 0 | 1 | 1 | 1 | 11 |
| X | X | X | X | X | X | X | X | X | X | X | X | 0 | 1 | 1 | 12 |
| X | X | X | X | X | X | X | X | X | X | X | X | X | 0 | 1 | 13 |
| X | X | X | X | X | X | X | X | X | X | X | X | X | X | 0 | 14 |

As the data bits are shifted left, one by one, in the shift register the bit pattern "0 followed by all ones" is looked for. This indicates that the remaining bits in the shift register are not valid and they are discarded. This action only takes place in the last word of a DATA Token.

All other Tokens are passed to the Huffman Decoder in parallel. They are still loaded into the second pipeline stage but no shifting takes place. The DATA header is discarded and is not passed to the Huffman at all. Two "valid" wires (out_valid and serial_valid) are provided. Only one is ever asserted at a time and it indicates what type of data is being presented at that moment.

B.2.2 Huffman Decoder

The Huffman Decoder has a number of modes of operation. The most obvious is that it can decode Huffman Codes, turning them into a Huffman Index Numbers. In addition it can decode fixed length codes of a length (in bits) determined by the instruction word. The Huffman Decoder can also accept Tokens from the Inshift block.

The Huffman Decoder includes a very small state machine. This is used when decoding block-level information. This is because it takes too long for the Parser State machine to make decisions (since it must wait for data to flow through the Index to Data Unit and the ALU before it can make a decision about that data and issue a new command). When this state machine is used the Huffman Decoder itself issues commands to the Index to Data Unit and ALU. The Huffman Decoder State Machine cannot control all of the microcode instruction bits so that it cannot issue the full range of commands to the other blocks.

B.2.2.1 Theory of Operation

When decoding Huffman codes the Huffman Decoder uses an arithmetic procedure to decode the incoming code into a Huffman Index Number. This number lies between 0 and N−1 (for a code table that has N entries). Bits are accepted one by one from the Input shifter.

In order to control the operation of the machine a number of tables are required. These specify for each possible number of bits in a code (1 to 16 bits) how many codes there are of that length. This information is not enough to specify a general Huffman code. However in MPEG, H.261 and JPEG the Huffman codes are chosen such that this information alone can specify the Huffman Code table. There is unfortunately just one exception to this; the Tcoefficient table from H.261 which is also used in MPEG. This requires an additional table that is described elsewhere (the exception was deliberately introduced in H.261 to avoid start code emulation).

It is most important to realize that the tables used by this Huffman Decoder are precisely the same as those transmitted in JPEG. This allows these tables to be used directly while other designs of Huffman decoders would have required the generation of internal tables from the transmitted ones. This would have required extra storage and extra processing to do the conversion. Since the tables in MPEG and H.261 (with the exception noted above) can be described in the same way a multi-standard decoder becomes practical.

The following fragment of "C" illustrates the decoding process:

```
int total = 0;
int s = 0;
int bit = 0;
unsigned long code = 0;
int index = 0;
while (index>=total)
if(bit>=max_bits)
fail("huff_decode: ran off end of huff table\n");
   code=(code<<1) Inext_bit0;
   index=code-s+total;
total+=codes_per_bit[bit];
   s=(s+codes_per_bit[bit])<<1;
   bit++;
}
```

The process is fairly directly mapped into the silicon implementation although advantage is taken of the fact that certain intermediate values can be calculated in clock phases before they are required.

From the code fragment we see that:

$EQ1.\ total_{n+1}=total_n+cpb_n$ $EQ2.\ 'S_{n+1}=2\ ('S_n+cpb_n)$ $EQ3.\ code_{n+1}=2code_n+bit_n$ $EQ4.\ index_{n+1}=2code_n+bit_n+total_n-'S_n$ Unfortunately in the hardware it proved easier to use a modified set of equations in which a variable "shifted" is used in place of the variable "s". In this case;

$EQ.5\ shifted_{n+1}=2shifted_n+cpb_n$ it turns out that:

$EQ6.\ :_n=2shifted_n$ and so substituting this back into Equation 4 we see that:

$EQ7.\ index_{n+1}=2\ (code_n-shifted_n)+total_n+bit_n$

In addition to calculating successive values of "index" it is necessary to know when the calculation is completed. From the "C" code fragment we see that we are done when:

$EQ8.\ index_{n+1}<total_{n+1}$

Substituting from Equation 7 and Equation 1 we see that we are done when:

$EQ\ 9.\ 2\ (code_n-shifted_n)+bit_n-cpb_n<0$

In the hardware implementation the common term in Equation 7 and Equation 9, $(code_n-shifted_n)$ is calculated one phase before the remainder of these equations are evaluated to give the final result and the information that the calculation is "done".

In various pieces of "C" code, notably the behavioural compiled code Huffman Decoder and the sm4code projects the "C" fragment is used almost directly but the variable "s" is actually called "shifted". Thus there are two different variables called "shifted". One in the "C" code and the other in the hardware implementation. These two variables differ by a factor of two.

B.2.2.1.1 Inverting the Data Bits

There is one other piece of information required to correctly decode the Huffman codes. This is the polarity of the coded data. It turns out that H.261 and JPEG use opposite conventions. This reflects itself in the fact that the start codes in H.261 are zero bits whilst the marker bytes in JPEG are one bits.

In order to deal with both conventions it is necessary to invert the coded data bits as they are read into the Huffman Decoder in order to decode H.261 style Huffman codes. This is done in the obvious manner using an exclusive OR gate. The inversion is only performed for Huffman codes as when decoding fixed length codes the data is not inverted.

MPEG uses a mix of the two conventions; in those aspects inherited from H.261 the H.261 convention is used. In those inherited from JPEG (the decoding of DC intra coefficients) the JPEG convention is used.

B.2.2.1.2 Transform Coefficients Table

When using the transform coefficients table in H.261 and MPEG there are number of anomalies. First the table in MPEG is a super-set of the table in H.261. In our hardware implementation there is no distinction drawn between the two standards and this means that an H.261 stream that contains codes from the extended part of the table (i.e. MPEG codes) will be decoded in the "correct" manner. Of course other aspects of the standard may well be broken. For example these extended codes will cause start code emulation in H.261.

Secondly the transform coefficient table has an anomaly that means that it is not describable in the normal manner with the codes-per-bit tables. This anomaly occurs with the codes of length six bits. These code words are systematically substituted by alternate code words. In an encoder the correct result is obtained by first encoding in the normal manner. Then for all codes that are six bits or longer the first six bits are substituted by another six bits by a simple table look-up operation. In a decoder the decoding process is interrupted just before the sixth bit is decoded, the code words are substituted using a table look-up and the decoding continues.

In this case there are only ten possible six-bit codes so the necessary look-up table is very small. The operation is further helped by the fact that the upper two bits of the code are unaltered by the operation. As a result it is not necessary to use a true look-up table. Instead a small collection of gates are hard-wired to give the appropriate transformation. The module that does this is called "hftcfrng". This type of code substitution is defined herein as a "ring" since each code from the set of possible codes is replaced by another code from that set (no new codes are introduced or old codes omitted).

Furthermore, a unique implementation is used for the very first coefficient in a block. In this case it is impossible for an end-of-block code to occur so the table is modified so that the most commonly occurring symbol can use the code that would otherwise be interpreted as end-of-block. This may save one bit. It turns out that with the architecture for decoding this is easily accommodated. In short, for the first bit of the first coefficient the decoding is deemed "done" if "index" has the value zero. Since after decoding only one bit the only two possible values for "index" zero and one, it is only necessary to test one bit.

B.2.2.1.3 Register and Adder Size

The Huffman Decoder can deal with Huffman codes that may be as long as 16 bits. However the decoding machine is only eight bits wide. This is possible because we know that the largest possible value of the decoded Huffman Index number is 255. In fact this could only happen in extended JPEG and in the current application the limit is somewhat lower (but larger than 128, so 7 bits will not suffice).

It turns out that for all legal Huffman codes not only the final value of "index" but all intermediate values lie in the range 0 to 255. However for an illegal code (i.e. an attempt to decode a code that is not in the current code table; probably due to a data error) the index value may exceed 255. Since we are using an eight bit machine it is possible that at the end of decoding the final value of "index" does not exceed 255 because the more significant bits that tell us an error has occurred have been discarded. For this reason if at any time during decoding the index value exceeds 255 (i.e. carry out of the adder that forms index) an error occurs and decoding is abandoned.

Twelve bits of "code" are preserved. This is not necessary for decoding Huffman codes where an eight bit register would have been sufficient. These upper bits are required for fixed length codes where up to twelve bits may be read.

B.2.2.1.4 Operation for Fixed Length Codes

For fixed length codes the "codes per bit" value is forced to zero. This means that "total" and "shifted" remain at zero throughout the operation and "index" is therefore the same as code. In fact the adders etc. only allow an eight bit value to be produced for "index". Because of this the upper bits of the output word are taken directly from the "code" register when decoding fixed length codes. When decoding Huffman codes these upper bits are forced to zero.

The fact that sufficient bits have been read from the input is calculated in the obvious manner. A comparator compares the desired number of bits with the "bit" counter.

B.2.2.2 Decoding Coefficient Data

The Parser State Machine is really only used for fairly high-level decoding. The very lowest level decoding within an eight-by-eight block of data is not directly handled by this state machine. The Parser State Machine gives a command to the Huffman Decoder of the form "decode a block". The Huffman Decoder, Index to Data Unit and ALU work together under the control of a dedicated state machine (essentially in the Huffman Decoder). This arrangement allows very high performance decoding of entropy coded coefficient data. There are other feedback paths operational in this mode of operation. For instance in JPEG decoding where the VLCs are decoded to provide SIZE and RUN information the SIZE information is fed back directly from the output of the Index to Data to the Huffman Decoder to instruct the Huffman Decoder how many FLC bits to read. In addition there are several accelerators implemented. For instance using the same example all VLC values which yield a SIZE of zero are explicitly trapped by looking at the Huffman Index Value before the Index to Data stage. This means that in the case of non-zero SIZE values the Huffman Decoder can proceed to read one FLC bit BEFORE the actual value of SIZE is known. This means that no clock cycles are wasted because this reading of the first FLC bit overlaps the single clock cycle required to perform the table look-up in the Index to Data stage.

B.2.2.2.1 MPEG and H.261 AC Coefficient Data

Figure 44:
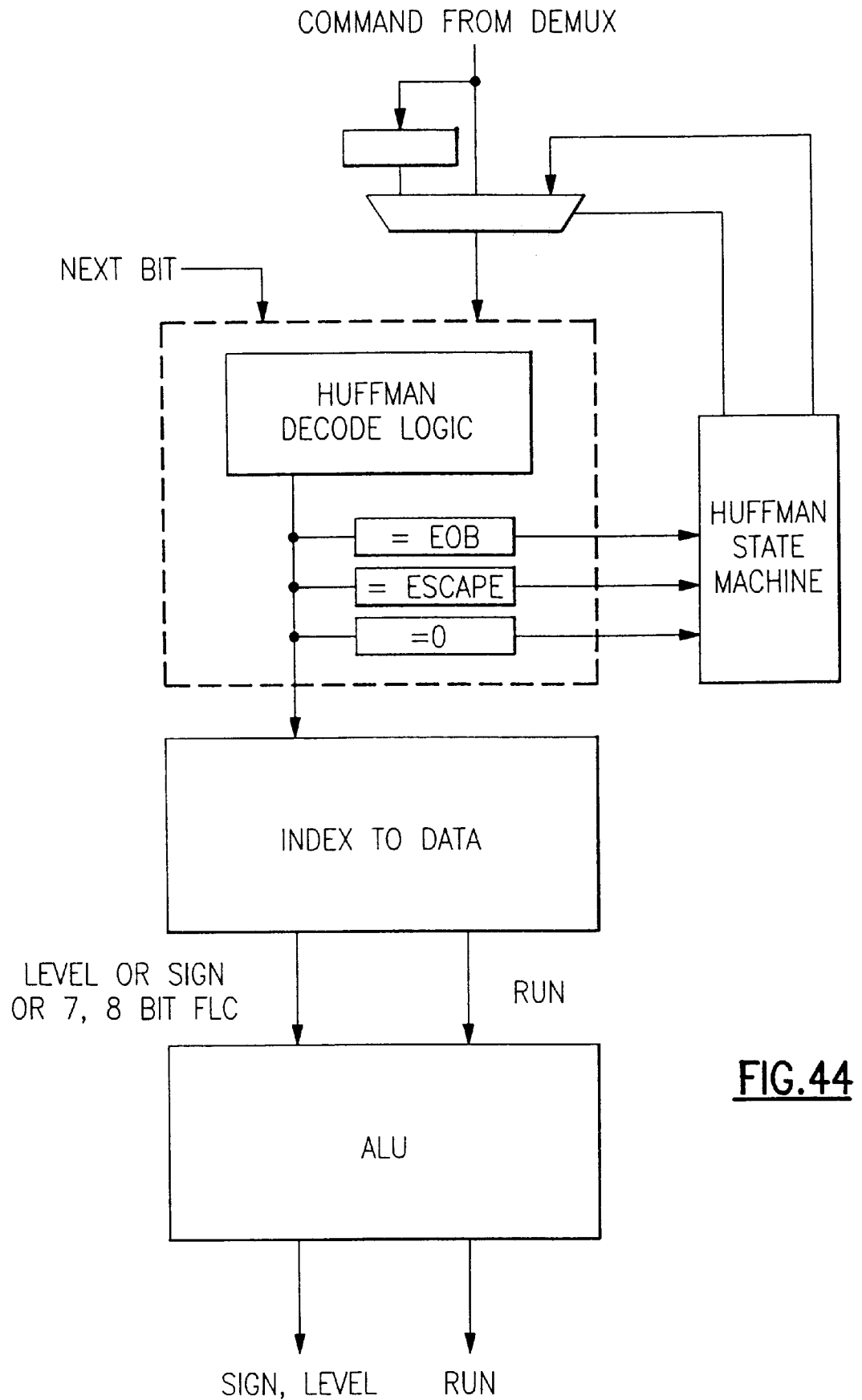
FIG. 44 is a block diagram illustrating the process of H.261 and MPEG AC coefficient decoding.
Figure 45:
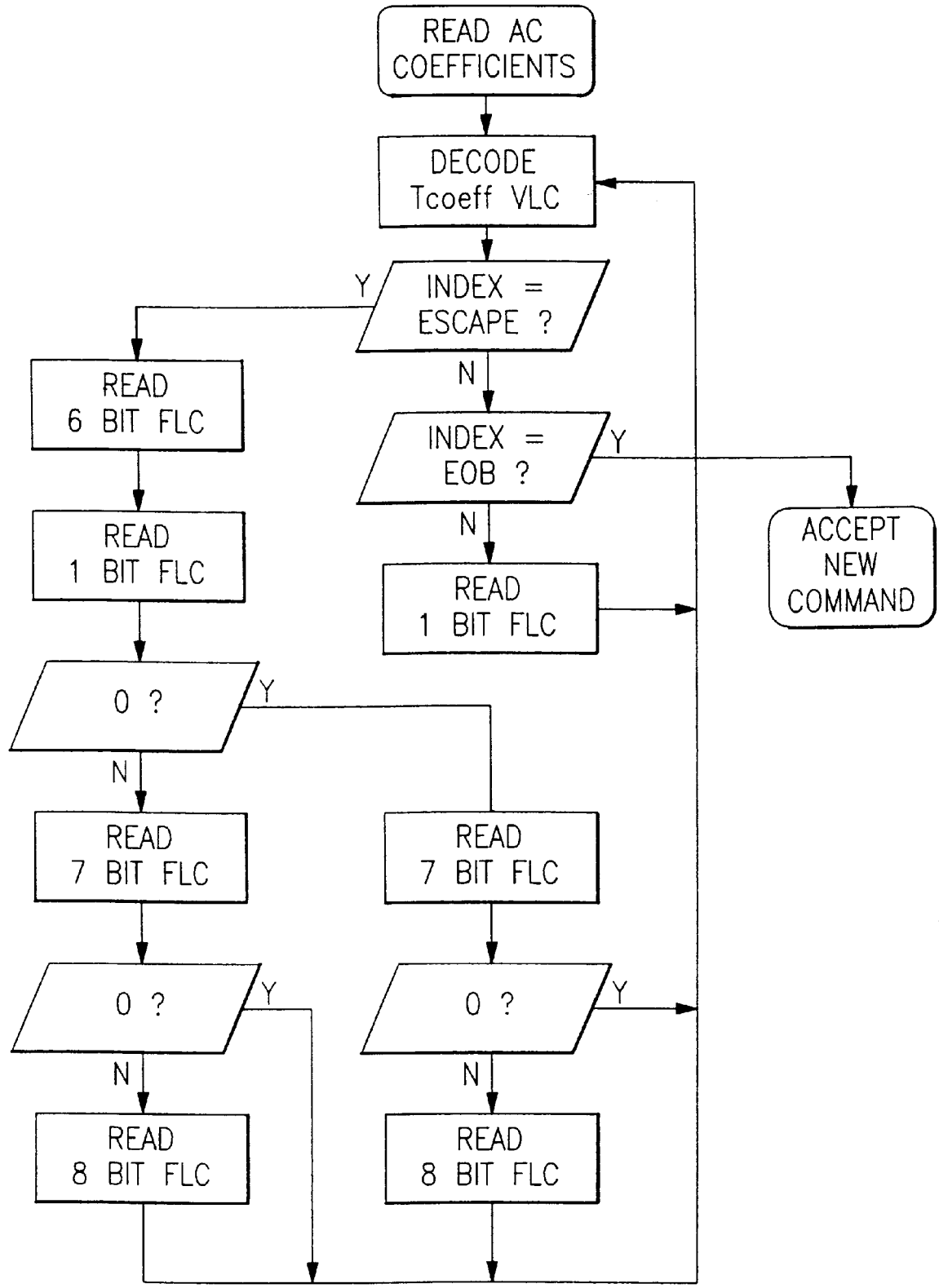
FIG. 45 is a flow chart further illustrating the process of H.261 and MPEG AC coefficient decoding.

FIG. 44 shows the way in which AC Coefficients are decoded in MPEG and H.261. A flow chart detailing the operation of the Huffman Decoder is given in FIG. 45.

The process starts by reading a VLC code. In the normal course of events the Huffman index is mapped directly into values representing the six bit RUN and the absolute value of the coefficient. A one bit FLC is then read giving the sign of the coefficient. The ALU assembles the absolute value of the coefficient with this sign bit to provide the final value of the coefficient.

The data format at this point is sign-magnitude anyway so there is little difficulty in this operation. The RUN value is passed on an auxiliary bus of six bits while the coefficients value (LEVEL) is passed on the normal data bus.

Two special cases exist and these are trapped by looking at the value of the decoded index before the Index to Data operation. These are End of Block (EOB) and Escape coded data. In the case of EOB the fact that this occurred is passed along through the Index to Data and ALU blocks so that the Token Formatter can correctly close the open DATA Token.

Escape coded data is more complicated. First six bits of RUN are read, these are passed directly through the Index to Data and are stored in the ALU. Then one bit of FLC is read. This is the most significant bit of the eight bits of escape that are described in MPEG and H.261 and it gives the sign of the level. The sign is explicitly read in this implementation because it is necessary to send different commands to the ALU for negative values and positive values. This allows the ALU to convert the twos complement value in the bit stream into sign magnitude. In either case the remaining seven bits of FLC are then read. If this has the value zero then a further eight bits must be read.

The Huffman Decoder's internal state machine is responsible for generating commands to control itself and also to control the Index to Data, the ALU and the Token Formatter. As shown in FIG. 44 the Huffman Decoder's instruction comes from one of three sources, the Demultiplexer state machine, the Huffman state machine or an instruction stored in a register that has previously been received from the Demultiplexer state machine. Essentially the original instruction from the Demultiplexer state machine (that causes the Huffman State Machine to take over control and read coefficients) is retained in a register, each time a new VLC is required it is used. All the other instructions for the decoding are supplied by the Huffman State Machine.

B.2.2.2.2 MPEG DC Coefficient Data

This is handled in the same way as JPEG DC Coefficient Data. The same (loadable) tables are used and it is the responsibility of the controlling microprocessor to ensure that their contents are correct. The only real difference from the MPEG standard is that the predictors are reset to zero (like in JPEG) the correction for this being made in the Inverse Quantizer.

B.2.2.2.3 JPEG Coefficient Data

Figure 46:
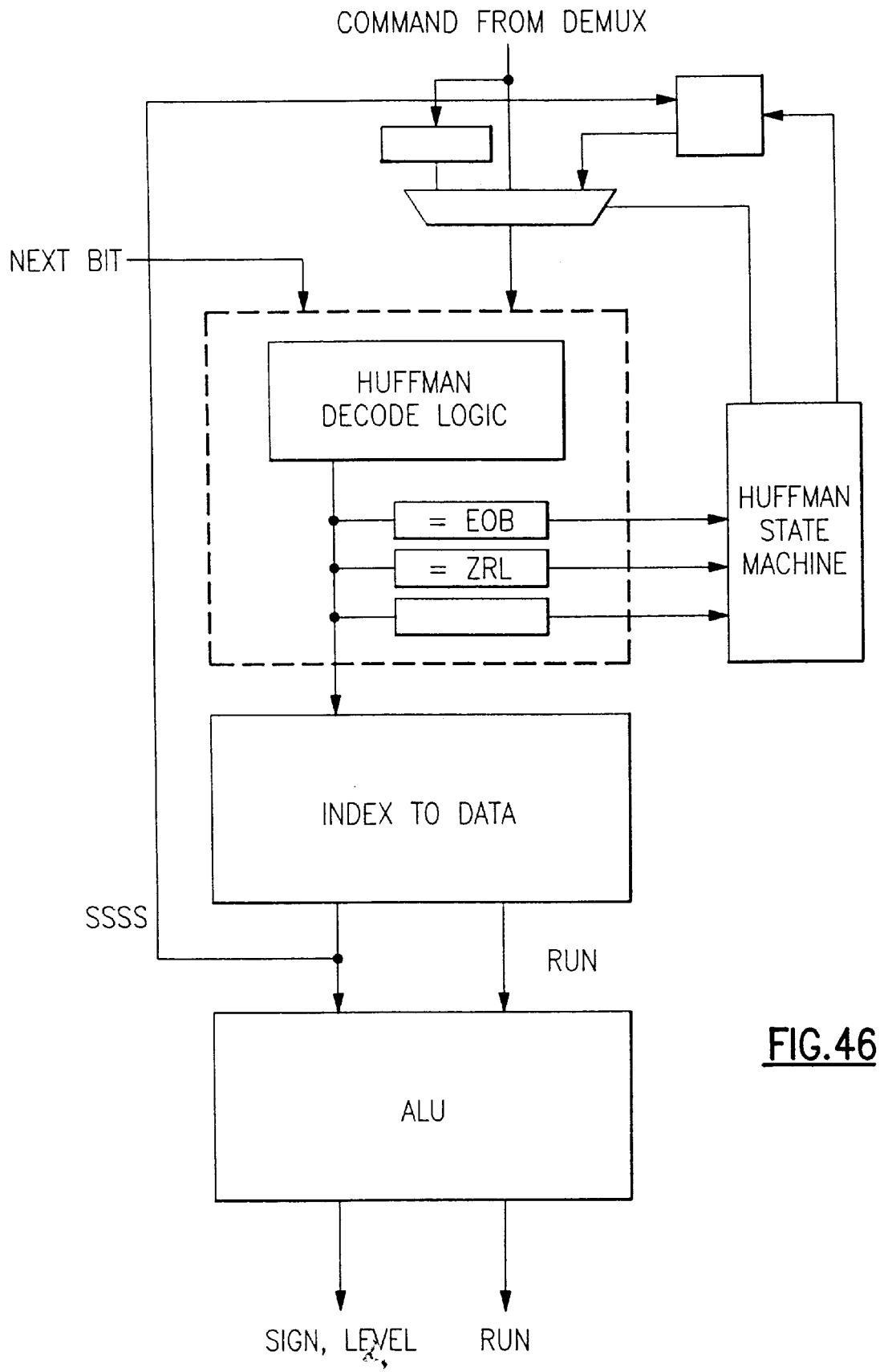
FIG. 46 is a block diagram showing the process of JPEG (AC and DC) coefficient decoding.

FIG. 46 shows a block diagram for the hardware for decoding JPEG AC Coefficients. Since the process for DC Coefficients is essentially a simplification of this process the diagram serves for both AC and DC Coefficients. The only real addition to the previous diagram for the MPEG AC coefficients is that the "SSSS" field is fed back and may be used as part of the Huffman Decoder command to specify the number of FLC bits to be read. The remainder of the command is supplied by the Huffman State Machine.

Figure 47:
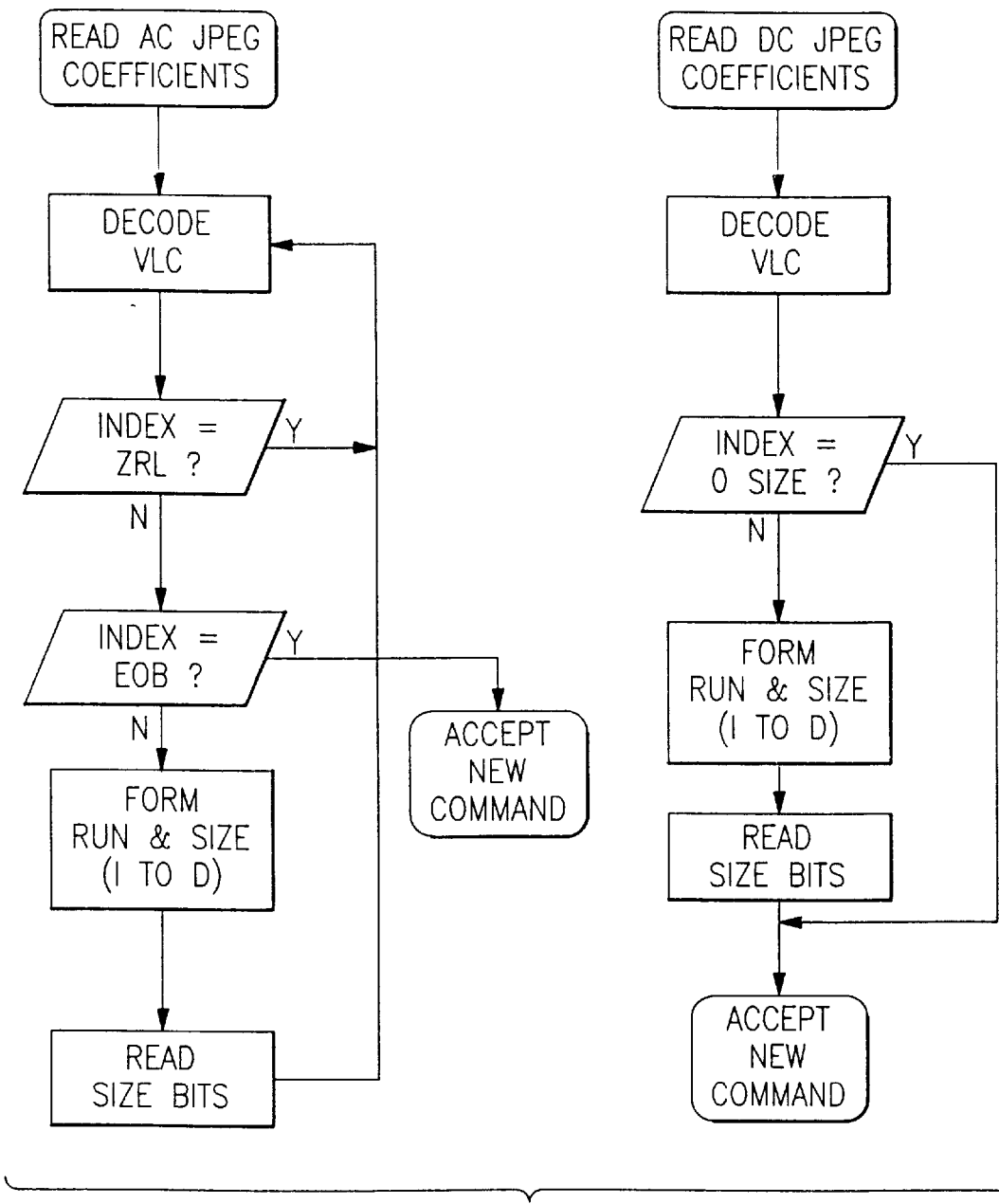
FIG. 47 is a flow chart further illustrating the process of JPEG (AC and DC) coefficient decoding.

FIG. 47 shows flow charts for the Huffman decoding of both AC and DC Coefficients.

Dealing first with the process for AC Coefficients, the process starts by reading a VLC using the appropriate tables (there are two AC tables). The Huffman index is converted into the RUN and SIZE values in the Index to Data Unit. Two values are trapped at the Huffman Index stage, these are for EOB and ZRL. These are the only two values for which no FLC bits are read. In the case when the decode index is neither of these two values the Huffman Decoder immediately reads one bit of FLC while it waits for the Index to Data to complete the look-up operation to determine how many bits are actually required. In the case of EOB no further processing is performed by the Huffman State Machine in the Huffman decoder and another command is read from the Demultiplexer State Machine.

In the case of ZRL no FLC bits are required but the block is not completed. In this case the Huffman decoder immediately commences decoding a further VLC (using the same table as before).

There is a particular problem with detecting the index values associated with ZRL and EOB. This is because (unlike H.261 and MPEG) the Huffman tables are downloadable. For each of the two JPEG AC tables two registers are provided (one for ZRL and one for EOB). These are loaded when the table is downloaded. They hold the value of index associated with the appropriate symbol.

The ALU must convert the SIZE bit FLC code to the appropriate sign-magnitude value. This can be done by first sign-extending the value with the wrong sign. If the sign bit is now set then the remaining bits are inverted (ones complement).

In the case of DC Coefficients the decision making in the Huffman Decoding Stage is somewhat easier because there is no equivalent of the ZRL field. The only symbol which causes zero FLC bits to be read is the one indicating zero DC difference. This is again trapped at the Huffman Index stage, a register being provided to hold this index for each of the (downloadable) JPEG DC tables.

The ALU has the job of forming the final decoded DC coefficient by retaining a copy of the last DC Coefficient value (known as the prediction). Four predictors are required, one for each of the four active color components. When the DC difference has been decoded the ALU adds on the appropriate predictor to form the decoded value. This is stored again as the predictor for the next DC difference of that colour component. Since DC coefficients are signed (because of the DC offset) conversion from twos complement to sign magnitude is required. The value is then output with a RUN of zero. In fact the instructions to perform some of the last stages of this are not supplied by the Huffman State Machine. They are simply executed by the Demultiplexer state machine.

In a similar manner to the AC Coefficients the ALU must first form the DC difference from the SIZE bits of FLC. However in this case a twos complement value is required to be added to the predictor. This can be formed by first sign extending with the wrong sign as before. If the result is negative then one must be added to form the correct value. This can, of course, be added at the same time as the predictor by jamming the carry into the adder.

B.2.2.3 Error Handling

Error handling deserves some mention. There are effectively four sources of error that are detected:

Ran off the end of a table.
Serial when token expected.
Token when serial expected.
Too many coefficients in a block.

The first of these occurs in two situations. If the bit counter reaches sixteen (legal values being 0 to 15) then an error has occurred because the longest legal Huffman code is sixteen bits. If any intermediate value of "index" exceeds 255 then an error has occurred as described in section B.2.2.1.3.

The second occurs when serial data is encountered when a Token was expected. The third when the opposite condition arises.

The last type of error occurs if there are too many coefficients in a block. This is actually detected in the Index to Data unit.

When any of these conditions arises the error is noted in the Huffman error register and the Parser state machine is interrupted. It is the responsibility of the Parser state machine to deal with the error and issue the commands to recover.

The Huffman decoder cooperates with the Parser state machine at the time of the interrupt in order to ensure correct operation. When the Huffman decoder interrupts the Parser state machine it is possible that a new command is waiting to be accepted at the output of the Parser state machine. The Huffman Decoder will not accept this command for two whole cycles after it has interrupted the Parser state machine. This allows the Parser state machine to remove the command that was there (which should not now be executed) and replace it with an appropriate one. After these two cycles the Huffman Decoder will resume normal operation and accept a command if a valid command is there. If not then it will do nothing until the Parser state machine presents a valid command.

When any of these errors occur the "Huffman Error" event bit is set and if the mask bit is set then the block will stop and the controlling microprocessor will be interrupted in the normal manner.

One complication occurs because in certain situations what looks like an error is not really an error. The most important place where this occurs is when reading the macroblock address. It is legal in the syntaxes of MPEG, H.261 and JPEG for a Token to occur in place of the expected macroblock address. If this occurs in a legal manner then the Huffman error register is loaded with zero (meaning no error) but the Parser State Machine is still interrupted. The Parser State Machine's code must recognize this "no error" situation and respond accordingly. In this case the "Huffman Error" event bit will not be set and the block will not stop processing.

Several situations must be dealt with.

The Token occurs immediately with no preceding serial bits. In this case a "Token when serial expected error" would occur. Instead a "no error" error occurs in the way just described.

The Token is preceded by a few serial bits. In this case a decision is made. If all of the bits preceding the Token had the value one (remember that in H.261 and MPEG the coded data is inverted so these are zero bits in the coded data file) then no error occurs. If however any of them were zero then they are not valid stuffing bits and thus an error has occurred and a "Token when serial expected" error does occur.

The token is preceded by many bits. In this case the same decision is made. If all sixteen bits are one they are treated as padding bits and a "no error" error occurs. If any of them had been zero then "Ran off Huffman Table" error occurs.

Another place that a token may occur unexpectedly is in JPEG. When dealing with either Huffman tables or Quantizer tables any number of tables may occur in the same Marker Segment. The Huffman decoder does not know how many there are. Because of this, after each table is completed it reads another 4-bit FLC assuming it to be a new table number. If however a new marker segment starts then a token will be encountered in place of the 4 bit FLC. This requirement is not foreseen and so an "Ignors Errors" command bit has been added.

B.2.2.4 Huffman Commands

Here are the bits used by the Parser State Machine to control the Huffman Decoder block and their definitions. The Index to Data unit command bits are also included in this table. From the microprogrammer's point of view the Huffman Decoder and the Index to Data unit operate as one coherent block.

TABLE B.2.2

Huffman Decoder Commands

| Bit | Name | Function |
|---|---|---|
| 11 | Ignore Errors | Used to disable errors in certain circumstances. |
| 10 | Download | Either nominate a table for download or download data into that table. |
| 9 | Alutab | Use information from the ALU registers to specify the table number (or number of bits of FLC) |
| 8 | Bypass | Bypass the index to Data Unit |
| 7 | Token | Decode a Token rather than FLC or VLC. |
| 6 | FirstCoeff | Selects first coefficient trick for Tcoeff table and other special modes. |
| 5 | Special | If set the Huffman State machine should take over control |
| 4 | VLC(not FLC) | Specify VLC or FLC |
| 3 | Table[3] | Specify the table to use for VLC |

TABLE B.2.2-continued

Huffman Decoder Commands

| Bit | Name | Function |
|---|---|---|
| 2 | Table[2] | or the number of bits to read for a FLC |
| 1 | Table[1] | |
| 0 | Table[0] | |

B.2.2.4.1 Reading FLC

In this mode Ignore Errors, Download, Alutab, Token, First Coeff, Special and VLC are all zero. Bypass will be set so that no Index to Data translation occurs.

The binary number in Table[3:0] indicates how many bits are to be read.

The numbers 0 to 12 are legal. The value zero does indeed read zero bits (as would be expected) and this instruction is thus the Huffman Decoder NOP instruction. The values 13, 14 and 15 will not work and the value 15 is used when the Huffman State Machine is in control to denote the use of "SSSS" as the number of bits of FLC to read.

B.2.2.4.2 Reading VLC

In this mode Ignore Errors, Download, Alutab, Token, First Coefficient and Special are zero and VLC is one. Bypass will usually be zero so that Index to Data translation occurs.

In this mode Token, First Coefficient and Special are all zero, VLC is one.

The binary number in Table[3:0] indicates which table to use as shown:

TABLE B.2.3

Huffman Tables

| Table[3:0] | VLC Table to use |
|---|---|
| 0000 | TCoefficient (MPEG and H.261) |
| 0001 | CBP (Coded Block Pattern) |
| 0010 | MBA (Macroblock Address) |
| 0011 | MVD (Motion Vector Data) |
| 0100 | intra Mtype |
| 0101 | Predicted Mtype |
| 0110 | Interpolated Mtype |
| 0111 | H.261 Mtype |
| 10x0 | JPEG (MPEG) DC Table 0 |
| 10x1 | JPEG (MPEG) DC Table 1 |
| 11x0 | JPEG AC Table 0 |
| 11x1 | JPEG AC Table 1 |

In the case of the tables held in RAM (i.e. the JPEG tables) bit 1 is not used so that the table selections occur twice. If a non-baseline JPEG decoder is built, then there will be four DC tables and four AC tables and Table[1] will then be required.

If Table[3] is zero then the input data is inverted as it is used in order that the tables are read correctly as H.261 style tables. In the case of Table[3:0]=0 the appropriate Ring modification is also applied.

B.2.2.4.3 NOP Instruction

As previously described the action of reading a FLC of zero bits is used as a No Operation instruction. No data is read from the input ports (either Token or Serial) and the Huffman Decoder outputs a data value of zero along with the instruction word.

B.2.2.4.4 TCoefficient First Coefficient

The H.261 and MPEG TCoefficient Table has a special non-Huffman code that is used for the very first coefficient in the block. In order to decode a TCoefficient at the start of a block the First Coefficient bit may be set along with a VLC instruction with table zero. One of the many effects of the First Coefficient bit is to enable this code to be decoded.

In normal operation it is unusual to issue a "simple" command to read a TCoefficient VLC. This is because control is usually handed to the Huffman Decoder by setting the Special Bit.

B.2.2.4.5 Reading Token Words

In order to read Token words the Token bit should be set to one. The Special and First Coefficient bits should be zero. The VLC bit should also be set if the Table[0] bit is to work correctly.

In this mode the bits Table[1] and Table[0] are used to modify the behavior of the Token reading as follows:

| Bit | Meaning |
|---|---|
| Table[0] | Discard padding bits of serial data |
| Table[1] | Discard all serial data |

If both Table[0] and Table[1] are zero then the presence of serial data before the token is considered to be an error and will be signalled as such.

If Table [1] is set then all serial data is discarded until a Token Word is encountered. No error will be caused by the presence of this serial data.

If Table[0] is set then padding bits will be discarded. It is, of course, necessary to know the polarity of the padding bits. This is determined by Table[3] in exactly the same way as for reading VLC data. If Table [3] is zero input data is first inverted and then any "one" bits are discarded. If Table [3] is set to one the input data is NOT inverted and "one" bits are discarded. Since the action of inverting the data depending upon the Table[3] bit is conditional on the VLC bit this bit must be set to one. If any bits that are not padding bits are encountered (i.e., "1" bits in H.261 and MPEG) an error is reported.

In these instructions only a single Token word is read. The state of the extn bit is ignored and it is the responsibility of the Demux to test this bit and act accordingly. Instructions to read multiple words are also provided—see the section on Special Instructions.

B.2.2.4.6 ALU Registers Specify Table

If the "Alutab" bit is set then registers in the ALU's register file can be used to determine the actual table number to use. The table number supplied in the command together with the VLC bit determines which ALU registers are used;

Table B.2.4

| ALU Register Selection | | |
|---|---|---|
| VLC | table[3:0] | ALU table |
| 0 | x0xx | fwd_r_size |
| 0 | x1xx | bwd_r_size |
| 1 | x0xx | dc_huff[compid] |
| 1 | x1xx | ac_huff[compid] |

In the case of fixed length codes, the correct number of bits are read for decoding the vectors. If r_size is zero, a NOP instruction results.

In the case of Huffman codes the generated table number has table[3] set to one so that the resulting number refers to one of the JPEG tables.

B.2.2.4.7 Special Instructions

All of the instructions (or modes of operation) described thus far are considered as "Simple" instructions. For each command that is received the appropriate amount of input data (of either serial of token data) is read and the resulting data is output. If no error is detected exactly one output will be generated per command.

Special instructions have the property that more than one output word may be generated for a single command. In order to do this the Huffman Decoder's internal state machine takes control and will issue itself instructions as required until it decides that the command which the Parser requested has been complete.

In all Special instructions the first real instruction of the sequence that is to be executed is issued with the Special bit set to one. This means that all sequences must have a unique first instruction. The advantage of this scheme is that the first real instruction of the sequence is available without a look-up operation being required based upon the command received from the Parser.

There are four recognized special instructions: TCoefficient; JPEG DC; JPEG AC; and Token.

The first of these reads H.261 and MPEG Transform coefficients etc. until the end-of-block symbol is read. If the block is a non-intra block then this command will read the entire block. In this case the "First Coefficient" bit should be set so that the first coefficient trick is applied. If the block is an intra block the DC term should already have been read and the "First Coefficient" bit should be zero.

In the case of an intra block in H.261 the DC term is read using a "simple" instruction to read the 8 bits FLC value. In MPEG the "JPEG DC" special instruction described below is used.

The "JPEG DC" command is used to read a JPEG style DC term (including the SSSS bits FLC indicated by the VLC). It is also used in MPEG. The First Coefficient bit must be set in order that a counter (counting the number of coefficients) in the Index to Data Unit is reset.

The "JPEG AC" command is used to read the remainder of a block, after the DC term until either an EOB is encountered or the $64^{th}$ coefficient is read.

The "Token" command is used to read an entire Token. Token words are read until the extension bit is clear. It is a convenient method of dealing with unrecognized tokens.

B.2.2.4.8 Downloading Tables.

The Huffman Decoder tables can be downloaded by using the "Download" bit. The first step is to nominate which table to download. This is done by issuing a command to read a FLC with both the Download and First Coeff bits set. This is treated as a NOP so no bits are actually read but the table number is stored in a register and is used to identify which table is being loaded in subsequent downloading.

TABLE B.2.5

JPEG Tables

| table[3:0] | Table nominated |
| --- | --- |
| 10xx | JPEG DC Codes per bit |
| 11xx | JPEG AC Codes per bit |
| 00xx | JPEG DC Index to Data |
| 01xx | JPEG AC Index to Data |

As the table shows, either the AC or DC tables can be loaded and table[3] determines whether it is the codes-per-bit table (in the Huffman decoder itself) or the Index to Data table that is loaded.

Once the table is nominated data is downloaded into it by issuing a command to read the required number of FLC (always 8 bits) with the Download bits set (and the First Coeff bit zero). This causes the decoded data to be written into the nominated table. An address counter is maintained, the data is written at the current address and then the address counter is incremented. The address counter is reset to zero whenever a table is nominated.

When downloading the Index to Data tables the data and addresses are monitored. The address is the Huffman Index number while the data loaded into that address is the final decoded symbol. This information is used to automatically load the registers that hold the Huffman index number for symbols of interest. So for instance in a JPEG AC table when the data that has the value corresponding to ZRL is recognized the current address is written into the register CED_H_KEY_ZRL_INDEX0 or CED_H_KEY_ZRL_INDEX1 as indicated by the table number.

Since decoded data is written into the codes-per-bit table one phase after it has been decoded it is not possible to read data from the table during this phase. Because of this an instruction attempting to read a VLC that is issued immediately after a table download instruction will fail. There is no reason why such a sequence should occur in any real application (i.e., when doing JPEG). It is however possible to build simulation tests that do this.

B.2.2.5 Huffman State Machine

The State Machine operates so as to give the Huffman Decoder commands that are internally generated in certain cases. All of the commands that may be generated by the internal state machine may also be given to the Huffman Decoder by the Demux.

The basic structure of the state machine is as follows. When a command is issued to the Huffman Decoder it is stored in a series of auxiliary latches so that it may be reused at a later time. The command is also executed by the Huffman Decoder and analyzed by the Huffman State Machine. If the command is recognized as being the first of a known instruction sequence and the SPECIAL bit is set then the Huffman Decoder State Machine takes over control of the Huffman Decoder from the Parser State Machine.

From this point there are three sources of instructions for the Huffman Decoder:

1) The Parser state machine—this choice is made at the completion of the special instruction sequence (e.g., when EOB has been decoded) and the next demux command is accepted.
2) The Huffman State Machine. The Huffman State Machine may provide itself with an arbitrary command.
3) The original instruction that was issued by the Parser State Machine to start the instruction.

In case (2) it is possible that the table number is provided by feedback from the Index to Data Unit, this would then replace the field in the Huffman State Machine ROM.

In case (1) in certain instances table numbers are provided by values obtained from the ALU register file (e.g., in the case of AC and DC table numbers and F-numbers). These values are stored in the auxiliary command storage mentioned so that when that command is later reused the table number is that which has been stored. It is not recovered again from the ALU as in general the counters will have advanced in order to refer to the next block.

Since the choice of the next instruction that will be used depends upon the data that is being decoded it is necessary for the decision to be made very late in a cycle. Because of this the general structure is one in which all of the possible instructions are prepared in parallel and multiplexing late in the cycle determines the actual instruction.

In each case, in addition to determining the instruction that will be used by the Huffman Decoder in the next cycle the state machine ROM also determines the instruction that will be attached to the current data as it passes to the I to D Unit and then onto the ALU. In exactly the same way all three of these instructions are prepared in parallel and then a choice is made late in the cycle.

Again there are three choices for this part of the instruction that correspond to the three choices for the next Huffman Decoder instruction above.

1) A constant instruction suitable for End of Block.
2) The Huffman State Machine. The Huffman State Machine may provide an arbitrary instruction for the I to D Unit.
3) The original instruction that was issued by the Parser to start the instruction.

B.2.2.5.1 EOB Comparator

The EOB comparator's output essentially forces selection of the constant instruction to be presented to the Index to Data Unit and will also cause the next Huffman Instruction to be the next instruction from the Parser. The exact function of the comparator is controlled by bits in the Huffman State Machine ROM.

Behind the EOB comparator, there are four registers holding the index of the EOB symbol in the AC and DC JPEG tables. In the case of the DC tables there is of course no End-Of-Block symbol but there is the zero-size symbol that is generated by a DC difference of zero. Since this causes zero bits of FLC to be read in exactly the same way as the EOB symbol they are treated identically.

In addition to the four index values held in registers the constant value, 1, can also be used. This is the index number of the EOB symbol in H.261 and MPEG.

B.2.2.5.2 ZRL Comparator

This is the more general purpose comparator. It causes the choice of either the Huffman State Machine instruction or the Original Instruction for use by the I to D.

Behind the ZRL comparator there are four values. Two are in registers and hold the index of the ZRL code in the AC tables. The other two values are constants, one is the value zero and the other is 12 (the index of ESCAPE in MPEG and H.261).

The constant zero is used in the case of an FLC. The constant 12 is used whenever the table number is less than 8 (and VLC). One of the two registers is used if the table number is greater than 7 (and VLC) as determined by the low order bit of the table number.

A bit in the state machine ROM is provided to enable the comparator and another is provided to invert its action.

If the TOKEN bit in the instruction is set then the comparator output is ignored and replaced instead by the extn bit. This allows for running until the end of a Token.

B.2.2.5.3 Huffman State Machine ROM

The instruction fields in the Huffman State Machine are as follows:

nxtstate[4:0]

The address to use in the next cycle. This address may be modified.

statectl

Allows modification of the next state address. If zero then the state machine address is unmodified otherwise the LSB of the address is replaced by the value of either of the two comparators as follows:

| nxtstate[0] | |
|---|---|
| 0 | Replace Lsb by EOB match |
| 1 | Replace Lsb by ZRL match |

In any case if the next Huffman Instruction is selected as "Re-run original command" the state machine will jump to location 0, 1, 2 or 3 as appropriate for the command.

eobctl[1:0]

This controls the selection of the next Huffman instruction based upon the EOB comparator and extn bit as follows:

| eobctl[1:0] | |
|---|---|
| 0 | No effect - see zrlctl[1:0] |
| 01 | Take new (Parser) command if EOB |
| 10 | Take new (Parser) command if extn low |
| 11 | Unconditional Demux instruction | zrlctl[1:0]

Controls the selection of the next Huffman instruction based upon the ZRL comparator. If the condition is met then it takes the state machine instruction, otherwise it re-runs the original instruction. In either case, if an eobctl[] condition takes a demux instruction then this (eobctl[]) takes priority as follows:

| zrlctl[1:0] | |
|---|---|
| 00 | Never take SM (always re-run) |
| 01 | Always take SM command |
| 10 | SM if ZRL matches |
| 11 | SM if ZRL does not match | smtab[3:0]

This is the table number that will be used by the Huffman Decoder if the selected instruction is the state machine instruction. However if the ZRL comparator matches then the zritab[3:0] field is used in preference.

If it is not required that a different table number be used depending upon whether a ZRL match occurs then both smtab[3:0] and zritab[3:0] will have the same value. Note, however, that this can lead to strange simulation problems in Lsim. In the case of MPEG there is no obvious requirement to load the registers that indicate the Huffman index number for ZRL (a JPEG only construction). However these are still selected and the output of the ZRL comparator becomes "unknown" despite the fact that both smtab[3:0] and zrltab [3:0] have the same value in all cases that the ZRL comparator may be "unknown" (so it does not matter which is selected) the next state still goes to "unknown".

zrltab[3:0]

This is the table number that will be used by the Huffman decoder if the selected instruction is the state machine instruction and the ZRL comparator matches.

smvlc

This is the VLC bits used by the Huffman Decoder if the selected instruction is the state machine instruction.

aluzrl[1:0]

This field controls the selection of the instruction that is passed to the ALU. It will either be the command from the Parser State Machine (that was stored at the start of the instruction sequence) or the command from the state machine:

| aluzrl[1:0] | |
|---|---|
| 00 | Always take the saved Parser State Machine Command |
| 01 | Always take the Huffman State Machine Command |
| 10 | Take the Huffman SM command if not EOB |
| 11 | Take the Huffman SM command if not ZRL | alueob

This wire controls modification of the instruction passed to the ALU based upon the EOB comparator. This simply forces the ALU's output mode to "zinput". This is an arbitrary choice; any output mode apart from "none" would do. This is to ensure that the end-of-block command word is passed to the Token Formatter block where it controls the proper formatting of DATA Tokens:

| alueob | |
|---|---|
| 0 | Do not modify ALU outsrc field |
| 1 | Force "zinput" into outsrc if EOB match |

The remainder of the fields are the ALU instruction fields. These are properly documented in the ALU description.

B.2.2.5.4 Huffman State Machine Modification

One late modification in the state machine occurred because it was found to be necessary for the Index to Data Unit to "know" when the RUN part of an escape-coded Tcoefficient is being passed to the Index to Data Unit. This should really have been a bit in the control ROM but to avoid changing the ROM at a late stage a modification was used. This simply looks at the address going into the ROM and detects when it has the value five. This happens to be the appropriate location in the ROM dealing with the RUN field. However, if the ROM were ever reprogrammed this may no longer be true.

B.2.3 The Token Formatter

The Huffman Decoder Token Formatter sits at the end of the Huffman block. Its function as its name suggests is to format the data from the Huffman Decoder into the propriety Token structure. The input data is multiplexed with data in the Microinstruction word, under control of the Microinstruction word command field. The block has two operating modes; DATA_WORD, and DATA_TOKEN.

B.2.3.1 The Microinstruction Word

TABLE B.2.7

The Microinstruction word consisting of seven fields

| Field Name | Bits |
|---|---|
| Token | 0:7 |
| Mask | 8:11 |
| Block Type (Bt) | 12:13 |
| External Extn (Ee) | 14 |
| Demux Extn (De) | 15 |
| End of Block (Eb) | 16 |
| Command (Cmd) | 17 |

| 17 | 16 | 15 | 14 | 12 | 8 | 0 |
|---|---|---|---|---|---|---|
| Cmd | Eb | De | Ee | Bt | Mask | Token |

The Microinstruction word is governed by the same accept as the Data word.

B.2.3.2 Operating Modes

TABLE B.2.8

Bit Allocation

| Cmd | Mode |
|---|---|
| 0 | Data_Word |
| 1 | Data_Token |

B.2.3.2.1 Data Word

In this mode the top eight bits of the input are fed to the output. The bottom eight bits will be either the bottom eight bits of the input, the Token field of the Microinstruction word or a mixture of both, depending on the mask field. Mask represents the number of input bits in the mix, i.e.

out_data[16:8]=in_data[16:8]

out_data{[7:0]=(Token[7:0]&(ff<<mask)}indata[7:0]

When mask is set to 0×8 (or greater) the output data will equal the input data. This mode is used to output words in non-DATA Tokens. With mask set to 0 out_data[7:0] will be the Token field of the Microinstruction word. This mode is used for outputting Token headers that contain no data. When Token headers do contain data, the number of data bits is given by the mask field.

If External Extn(Ee) is set, out_extn=in_extn, otherwise out_extn=De.Bt and Eb are "don't care".

B.2.3.2.2 Data Token

This mode is used for formatting DATA Tokens and has two functions dependent on a signal first_coefficient. At reset first_coefficient is set. When the first data coefficient arrives along with a Microinstruction word that has cmd set to 1, out_data[16:2] is set to 0×1 and out_data[1:0] takes the value of the Bt field in the Microinstruction word. This is the header of a DATA Token. When this word has been accepted, the coefficient that accompanied the command is loaded into a register, RL and first_coefficient takes the value of Eb. When the next coefficient arrives out_data [16:0] takes the previous coefficient, stored in RL. RL and first_coefficient are then updated. This ensures that when the end of the block is encountered and Eb is set, first_coefficient is set, ready for the next DATA Token i.e.,

```
If(first_coefficient)
{
    out_data[16:2] = 0×1
    out_data[1:0] = Bt[1:0]
    RL[16:0] = in_data[16:0]
}
else
{
    Out_data[16:0] = RL[16:0]
    RL[16:0] = in_data [16:0]
}
out_extn = –Eb
```

B.2.3.3 Explanatory Discussion

Most of the instruction bits are supplied in the normal manner by the Parser State Machine. However two of the fields are actually supplied by other circuitry. The "Bt" field mentioned above is connected directly to an output of the ALU block. This two bit field gives the current value of "cc" or "color component". Thus when a DATA Token header is constructed the lowest order two bits take the color component directly from the ALU counters. Secondly the "Eb" bit is asserted in the Huffman decoder whenever an End-of-block symbols is decoded (or in the case of JPEG when one is assumed because the last coefficient in the block is coded).

The in_extn signal is derived in the Huffman Decoder. It only has meaning with respect to Tokens when the extension bit is supplied along with the Token word in the normal way.

B.2.4 The Parser State Machine

The Parser State Machine is actually a very simple piece of circuitry. The complication lies in the programming of the microcode ROM which is discussed in Section B.2.5.

Essentially the machine consists of a register which holds the current address. This address is looked up in the microcode ROM to produce the microcode word. The address is also incremented in a simple incrementer and this incremented address is one of two possible addresses to be used for the next state. The other address is a field in the microcode ROM itself. Thus each instruction is potentially a jump instruction and may jump to a location specified in the program. If the jump is not taken then control passes to the next location in the ROM.

A series sixteen condition code bits are provided. Any one of these conditions may be selected (by a field in the microcode ROM) and in addition it may be inverted (again a bit in the microcode ROM). The resulting signal selects between either the incremented address or the jump address in the microcode ROM. One of the conditions is hard-wired to evaluate as "False". If this condition is selected then no jump will occur. Alternatively if this condition is selected and then inverted the jump is always taken; an unconditional jump.

TABLE B.2.9

Condition Code Bits

| Bit No. | Name | Description |
| --- | --- | --- |
| 0 | user[0] | Connected to a register programmable |
| 1 | user[1] | by the user from the microprocessor interface. |
| 2 | cbp_eight | They allow "user defined" condition codes |
| 3 | cbp_special | that can be tested with little overhead. Two are defined to control non-standard "Coded block Pattern" processing for experimental 4 block and 8 block macroblock structures. |
| 4 | he[0] | These bits connect directly to the Huffman |
| 5 | he[1] | decoder's Huffman Error register. |
| 6 | he[2] | |
| 7 | Extn | The Extension bit (for Tokens) |
| 8 | Btkptn | The Block Pattern Shifter |
| 9 | MBstart | At Start of a Macroblock |
| 10 | Picstart | At Start of a Picture |
| 11 | Restart | At Start af a Restart interval |
| 12 | Chngdet | The "Sticky" Change Detect bit |
| 13 | Zero | ALU zero condition |
| 14 | Sign | ALU sign condition |
| 15 | False | Hard wired to False |

B.2.4.1 Two wire Interface Control

The two-wire interface control is unusual in this block. There is a two-wire interface between the Parser State Machine and the Huffman Decoder. This is used to control the progress of commands. The Parser State Machine will wait until a given command has been accepted before it proceeds to read the next command from the ROM. In addition condition codes are fed back through a wire from the ALU.

Each command has a bit in the microcode ROM that allows it to specify that it should wait for feedback. If this occurs then after that instruction has been accepted by the Huffman Decoder then no new commands are presented until the feedback wire from the ALU becomes asserted. This wire, fb_valid, indicates that the condition codes currently being supplied by the ALU are valid in the sense that they reflect the data associated with the command that requested the wait for feedback.

The intended use of the feature is in constructing conditional jump commands that decide the next state to jump to as a result of decoding (or processing) a particular piece of data. Without this facility it would be impossible to test any conditions depending upon data in the pipeline since the two-wire control means that the time at which a certain command reaches a given processing block (i.e., the ALU in this case) is uncertain.

Not all instructions are passed to the Huffman Decoder. Some instructions may be executed without the need for the data pipeline. These tend to be jump instructions. A bit in the microcode ROM selects whether or not the instruction will be presented to the Huffman Decoder. If not then there is no requirement that the Huffman Decoder accept the instruction and so execution can continue in these circumstances even if the pipeline is stalled.

B.2.4.2 Event Handling

There are two event bits located in the Parser State Machine. One is referred to as the Huffman event and the other is referred to as the Parser Event.

The Parser Event is the simplest of these. The "condition" being monitored by this event is simply a bit in the microcode ROM. Thus an instruction may cause a Parser Event by setting this bit. Typically the instruction that does this will write an appropriate constant into the rom_control register so that the interrupt service routine can determine the cause of the interrupt.

After servicing a Parser Event (or immediately if the event is masked out) control resumes at the point where it left off. If the instruction that caused the event has a jump instruction (whose condition evaluates true) then the jump is taken in the normal manner. Thus it is possible to jump to an error handler after servicing by coding the jump.

A Huffman event is rather different. The condition being monitored is the "OR" of the three Huffman Error bits. In actual fact this condition is handled in a very similar manner to the Parser Event. However an additional wire from the Huffman Decoder, huffintrpt, is asserted whenever an error occurs. This causes control to jump to an error handler in the microcode program.

When a Huffman error occurs therefore the sequence is that an interrupt is generated and the block stops. After servicing control is transferred to the error handler. There is no "call" mechanism and unlike a normal interrupt it is not possible to return to the point in the microcode before the error occurred after error handling.

It is possible for huffintrpt to be asserted without a Huffman error being generated. This occurs in the special case of a "no-error" error as discussed in Section B.2.2.3. In this case no interrupt (to the microprocessor interface) is generated but control is still passed to the error handler (in the microcode). Since the Huffman error register will be clear in this case the microcode error handler can determine that this is the situation and respond accordingly.

B.2.4.3 Special Locations

There are several special locations in the microcode ROM. The first four locations in the ROM are entry points to the main program. Control passes to one of these four locations on reset. The location jumped to depends upon the coding standard selected in the ALU register, coding_std. Since this location is itself reset to zero by a true reset control passes to location zero. However it is possible to reset the Parser State Machine alone by using the UPI register bit CED_H_TRACE_RST in CED_H_TRACE. In this case the coding_std register is not reset and control passes to the appropriate one of the first four locations.

The second four locations (0x004 to 0x007) are used when a Huffman interrupt takes place. Typically a jump to the actual error handler is placed in each of these locations. Again, the choice of location is made as a result of the coding standard.

B.2.4.4 Tracing

As a diagnostic aid a trace mechanism is implemented. This allows the microcode to be single-stepped. The bits CED_H_TRACE_EVENT and CED_H_TRACE_MASK in the register CED_H_TRACE control this. As their names suggest they operate in a very similar fashion to the normal event bits. However, because of several differences (in particular no UPI interrupt is ever generated) they are not grouped with the other event bits.

The tracing mechanism is turned on when CED_H_TRACE_MASK is set to one. Then after each microcode instruction is read from the ROM but before it is presented to the Huffman Decoder a trace event occurs. CED_H_TRACE_EVENT becomes one. It must be polled because no interrupt will be generated. The entire microcode word is available in the registers CED_H_KEY_DMX_WORD_0 through CED_H_KEY_DMX_WORD_9. The instruction can be modified at this time if required. Writing a one to CED_H_TRACE_EVENT causes the instruction to be executed and clears CED_H_TRACE_EVENT. Shortly after this time when the next microcode word to be executed has been read from the ROM a new trace event will occur.

B.2.5 The Microcode

The microcode is programmed using an assembler "hpp" which is a very simple tool and much of the abstraction is achieved by using a macro preprocessor. The standard "C" preprocessor "cpp" may be used for this purpose.

The code is structured as follows:

Ucode.u is the main file. Firstly this "includes" tokens.h to define the tokens, then regfile.h which defines the ALU register map. The fields.u defines the various fields in the microcode word, giving a list of defined symbols for each possible bit pattern in the field. Then the labels that are used in the code are defined. After this instr.u is "included," this defines a large number of "cpp" macros which define the basic instructions. Then errors.h defines the numbers which define the Parser events. Lastly unword.u defines the order in which the fields are placed to build the microcode word.

The remainder of ucode.u is the microcode program itself.

B.2.5.1 The Instructions

In this section the various instructions defined in ucode.u are described. Not all instructions are described here since in many cases they are small variations on a theme (particularly the ALU instructions). ucode.u does include brief comments that should help in the cases not documented here.

B.2.5.1.1 Huffman and Index to Data Instructions

H_NOP. No-operation. The Huffman does nothing in the sense that no data is decoded. The data produced by this instruction is always zero. The associated instruction is passed onto the ALU.

The Token group; H_TOKSRCH, H_TOKSKIP_PAD, H_TOKSKIP_JPAD, H_TOKPASS and H_TOKREAD. These all read a token or tokens from the Input Shifter and pass them onto the rest of the machine. H_TOKREAD reads a single token word. H_TOKPASS can be used to read an entire token up to and including the word with a zero extn bit, the associated command is repeated for each word of the Token. H_TOKSRCH discards all serial data preceding a Token and then reads one token word. H_TOKSKIP_PAD skips any padding bits (H.261 and MPEG) and then reads one Token word. H_TOKSKIP_JPAD does the same thing for JPEG padding.

H_FLC(NB) reads a fixed length code of "NB" bits.

H_VLC(TBL) reads a vlc using the indicated, table (passed as mnemonic, e.g., H_VLC(tcoeff)).

H_FLC_IE(NB) is like H_FLC, but the "ignore errors" bit is set.

H_TEST_VLC(TBL) is like H_VLC but the bypass bit is set so that the Huffman Index is passed through the Index to Data Unit unmodified.

H_FWD_R and H_BWD_R read a FLC of the size indicated by the ALU registers r_fwd_r_size and r_bwd_r_size respectively.

H_DCJ reads JPEG style DC coefficients, the table number from the ALU.

H_ACJ reads JPEG style AC coefficients, the table number from the ALU.

H_DCH reads a H.261 DC term.

H_TCOEFF and H_DCTCOEFF read transform coefficients. In H_DCTCOEFF the first coeff bit is set for non-intra blocks whilst H_TCOEFF is for intra blocks after the DC term has already been read.

H_NOMINATE(TBL) nominates a table for subsequent download.

H_DNL(NB) reads NB bits and downloads them into the nominated table.

B.2.5.1.2 ALU Instructions

There many ALU instructions which are not explained in detail. The basic way in which the Mnemonics are constructed is discussed and this should make the instructions readable.

Most of the ALU instructions are concerned with moving data from place to place and so a generic "load" instruction is used. In the Mnemonic A_LDxy it is understood that the contents of y are loaded into x. i.e. the destination is listed first and the source second.

TABLE B.2.10

Letters used to denote possible sources and destinations of data

| Letter | Meaning |
|---|---|
| A | A register |
| R | Run register |
| I | Data Input |
| O | Data Output |
| F | ALU register File |
| C | Constant |
| Z | Constant of zero |

For example LDAI loads the A register with the data from the data input port of the ALU.

If the ALU register file is specified then the mnemonic will take an address so that LDAF(RA) loads A with the contents of location RA in the register file.

The ALU has the ability to modify data as it is moved from source to destination. In this case the arithmetic is indicated as part of the source data; so that the Mnemonic LDA_AADDF(RA) loads A with the existing contents of the A register plus the contents of the indicated location in the register file. Another example is LDA_ISGXR which takes the input data sign extends from the bit indicated in the RUN register and stores the result in the A register.

In many cases more than one destination for the same result is specified as in LDF_LDA_ASUBC(RA) which loads the result of A minus a constant into both the A register and the register file.

Other mnemonics exist for specific actions. For example "CLRA" is used for clearing the A register, "RMBC" to reset the macroblock counter. These are fairly obvious and are described in comments in instr.u.

One anomaly is the use of a suffix "_O" to indicate that the result of the operation is output to the Token formatter in addition to the normal action. Thus LDFI_O(RA) stores the input data and also passes it to the token formatter. This really should have been LDF_LDO_I(RA).

B.2.5.1.3 Token Formatter Instructions

T_NOP No-operation. Really a misnomer as it is impossible to construct a no-operation instruction. However this is used whenever the instruction is of no consequence because the ALU does not output to the Token Formatter.

T-TOK output a Token word.

T_DAT output a DATA Token word (used only with the Huffman State Machine instructions).

T-GENT8 generates a token word based on the 8 bits of constant field.

T_GENT8E like T_GENT8 but the extension bit is one.

T_OPD(NB) NB bits of data from the bottom NB bits of the output with the remainder of the bits coming from the constant field.

T_OPDE(NB) like T_OPD but the extension bit is high.

T_OPD8 short-hand for T_OPD(8)

T_OPD8E short-hand for T_OPDE(8)

B.2.5.1.4 Parser State Machine Instructions

D_NOP No-operation. i.e. the address increments as normal and the Parser State Machine does nothing special. The Remainder of the instruction is passed to the data pipeline. No waiting occurs.

D_WAIT is like D_NOP, but waits for feedback to occur.

The simple jump group. Mnemonics like D_JMP (ADDR) and D_JNX(ADDR) jump if the condition is met. The instruction is not output to the Huffman Decoder.

The external jump group. Mnemonics like D_XJMP (ADDR) and D_XJNX(ADDR). Like their simple counterparts but the instruction is output to the Huffman Decoder.

The jump and wait group. Mnemonics like D_WJNZ (ADDR). The instructions are output to the Huffman Decoder and the Parser waits for feedback from the ALU before evaluating the condition.

The following Mnemonics are used for the conditions themselves.

TABLE B.2.11

Mnemonics used for the conditions

| Mnemonic | | Meaning |
|---|---|---|
| JMP | — | Unconditional jump |
| JXT | JNX | Jump if extn=1(extn=0) |
| JHE0 | JNHE0 | Jump if Huffman error bit 0 set (clear) |
| JHE1 | JNHE1 | Jump if Huffman error bit 1 set (clear) |
| JHE2 | JNHE2 | Jump if Huffman error bit 2 set (clear) |
| JPTN | — | Jump if pattern shifter LSB is set |
| JPICST | JNPICST | Jump is at picture start (not at picture start) |
| JRSTST | JNRSTST | Jump if at start of restart interval (not at start) |
| — | JNCPBS | Jump if not special CPB coding |
| — | JNCPB8 | Jump if not 8 block (i.e. 4 block) macroblock |
| JMI | JPL | Jump if negative (jump if plus) |
| JZE | JNZ | Jump if zero (jump if non-zero) |
| JCHNG | JNCHNG | Jump if change detect bit set (clear) |
| JMBST | JNMBST | Jump if at start of macroblock (not at start) |

D_EVENT causes generation of an event.

D_DFLT for construction of a default instruction. Causes an event and then jumps to a location with the label "dflt". This instruction should never be executed of course, they are used to fill a ROM so that a jump to an unused location is trapped.

D_ERROR causes an event and then jumps to a label "srch_dispatch" which is assumed to attempt recovery from the error.

SECTION B.3 HUFFMAN DECODER ALU

B.3.1 Introduction

The Huffman Decoder ALU sub-block provides general arithmetic and logical functionality for the Huffman Decoder block. It has the ability to do add and subtract operations, various types of sign-extend operations, and formatting of the input data into run-sign-level triples. It has a flexible structure whose precise operation and configuration are specified by a microinstruction word which arrives at the ALU synchronously with the input data, i.e., under the control of the two-wire interface.

In addition to the 36-bit instruction and 12-bit data input ports, the ALU has a 6-bit run port, and an 8-bit constant port (which actually resides on the token bus). All of these, with the exception of the microinstruction word, drive buses of their respective widths through the ALU datapath. There is a single bit within the microinstruction word which represents an extension bit and is output together with the 17-bit-run-sign-level (out_data). There is a two-wire interface at each end of the ALU datapath, and a set of condition codes which are output together with their own valid signal, cc_valid. There is a register file which is accessible to other Huffman Decoder sub-blocks via the ALU, and also to the microprocessor interface.

B.3.2.2 Basic Structure

The basic structure of the Huffman ALU comprises the following:

Input block; output block; condition Codes block; "A" register with source multiplexing; run register (6 bits) with source multiplexing; adder/Subtractor with source; multiplexing; sign Extend logic with source multiplexing; and register file.

Each of these blocks (except the output block) drives its output onto a bus running through the datapath, and these buses are in turn used as inputs to the multiplexing for block sources. For example the adder output has its own datapath bus which is one of the possible inputs to the A register. Likewise the A register has its own bus which forms one of the possible inputs to the adder. Only a sub-set of all possibilities exist in this respect, as specified in Section 7 on the microinstruction word.

In a single cycle it is possible to execute either an add-based instruction or a sign-extend-based instruction; it is allowable to execute both of these in a single cycle provided that their operation is strictly parallel i.e. add then sign extend, or sign extend then add sequences are not allowed. The register file may be either read from or written to in a single cycle, but not both.

The output data has three fields: run—6 bits; sign—1 bit; and level—10 bits.

If data is to be passed straight through the ALU, the least significant 11 bits of the input data register are latched into the sign and level fields.

It is possible to program limited multi-cycle operations of the ALU: the number of cycles required is given by the contents of the register file location whose address is specified in the microinstruction, and the same operation is performed repeatedly while an iteration counter decrements to one. This facility is typically used to effect left shifts, using the adder to add the A register to itself and to store the result back in the A register.

B.3.3 The Adder/Subtractor Sub-Block

This is a 12-bit wide adder, with optional invert on its input2 and optional setting of the carry-in bit. Output is a 12 bit sum, and carry-out is not used. There are 7 modes of operation:

ADD: add with carry in set to zero: input1+input2

ADC: add with carry in set to one: input1+input2+1

SBC: invert input2, carry in set to zero: input1−input2−1

SUB: invert input2, carry in set to one: input1−input2

TCI: if input2<0, use SUB, else use ADD—this is used with input1 set to zero for obtaining a magnitude value from a two's compliment value.

DCD (DC difference): if input2<0 do ADC, otherwise do ADD.

VRA (vector residual add): if input1<0 do ADC, otherwise do SBC.

B.3.4 The Sign Extend Sub-Block

This is a 12-bit unit which sign extends, in various modes, the input data from the size input. Size is a 4 bit value ranging from 0 to 11 (0 relates to the least significant bit, 11 to the most significant).

Output is a 12 bit modified data value, and the "sign" bit.

In SGXMODE=NORMAL, all bits above (and including) the size-th bit take the value of the size-th bit. All those below remain unchanged. Sign takes the value of the size-th bit. For example:

data=1010 1010 1010 size=2 output=0000 0000 0010, sign=0

In SGXMODE=INVERSE all bits above (and including) the size-th bit take the inverse of the size-th bit, all those below remain unchanged. Sign takes the inverse of the size-th bit. For example:

data=1010 1010 1010 size=0 output=1111 1111 1111, sign=1

In SGXMODE=DIFMAG, if the size-th bit is zero, all the bits below (and including) the size-th bit are inverted, while all those above remain unchanged. If the size-th bit is one, all bits remain unchanged. In both cases sign takes the inverse of the size-th bit. This is used for obtaining the magnitude of AC difference values. For example:

data=0000 1010 1010 size=2 output=0000 1010 1101, sign=1 data=000010101010 size=1 output=0000 1010 1010, sign=0

Lastly, in SGXMODE=DIFCOMP, all bits above (but not including) the size-th bit take the inverse of the size-th bit, all those below (and including) remain unchanged. Sign takes the inverse of the size-th bit. This is used for obtaining two's compliment values for DC difference values. For example:

data=1010 1010 1010 size=0 output=1111 1111 1110, sign=1

B.3.5 Condition Codes

There are two bytes (16 bits) of condition codes used by the Huffman block, certain bits of which are generated by the ALU/register file. These are the Sign condition code, the Zero condition code, the Extension condition code and a Change Detect bit. The last two of these codes are not really condition codes since they are not used by the demux in the same way as the others.

The Sign, Zero and Extension condition codes are updated when the demux issues an instruction to do so, and for each of these instructions the condition code valid signal is pulsed high once.

The Sign condition code is simply the sign extend sign output latched, while the Zero condition code is set to 1 if the input to the A register is zero. The Extension condition code is the input extension bit latched regardless of OUT-SRC.

Condition codes may be used to evaluate certain condition types:

result equals constant—use subtract and Zero condition result equals register value—use subtract and Zero condition register equals constant—use subtract and Zero condition register bit set—use sign extend and Sign condition result bit set—use sign extend and Sign condition When using the sign extend and Sign condition code combination, it is possible only to evaluate a single specified bit, rather than multiple bits as would be the case with a conventional logical AND.

The Change Detect bit is generated using the same logic as for the Zero condition code, but it does not have an associated valid signal: a bit in the microinstruction indicates that the Change Detect bit should be updated if the value currently being written to the register file is different from that already present (this means that two clock cycles are necessary, the first with REG-MODE set to READ and second with REGMODE set to WRITE). A microprocessor interrupt can then be initiated if a changed value is detected. The Change Detect bit is reset by activating Change Detect in the normal way, but with REGMODE set to READ.

The hardwired macroblock counter structure (which forms part of the register file—see below) also generates condition codes as follows: Mb_Start, Pattern_Code, Restart and Pic_Start.

B.3.6 The Register File

The address map for the register file is shown below. It uses a 7-bit address space, which is common to both the ALU datapath and the UPI. A number of locations are not accessed by the ALU, these typically being counters in the hardwired macroblock structure, and registers within the ALU itself—the latter have dedicated access but form part of the address map for the UPI. Some multi-byte locations (denoted in the table by "O" for oversize) have a single ALU address but multiple UPI addresses. Similarly, groups of registers which are indexed by the component count, CC (Indicated by "I" in the table) are treated as a single location by the ALU—this eases microprogramming for initialization and resetting, and also for block-level operations.

All of the locations except the dedicated ALU registers (UPI read only) are read/write, and all of the counters are reset to zero by a bit in the instruction word. The pattern code register has a right shift capability, its least significant bit forming the Pattern_Code condition bit. All registers in the hardwired macroblock structure are denoted in the table by "M", and those which are also counters (n-bit) are annotated with Cn.

Certain locations have their contents hardwired to other parts of the Huffman sub-system-coding standard, two r-size locations, and a single location (2-bit word) for each of ac huff table and dc huff table to the Huffman Decoder.

Addresses in bold indicate that locations are accessible by both the ALU and the UPI, otherwise they have UPI access only. Groups of registers that are undirected through CC by the ALU can have a single ALU address specified in the instruction word and CC will select which physical location in the group to access. The ALU address may be that of any of the registers in the group, though conventionally the address of the first should be used. This is also the case for multi-byte locations which should be accessed using the lowest address of the pair, although in practice either address will suffice. Locations 2E and 2F are accessible in the top-level address map (denoted "T"), i.e. not only through the keyhole registers. These two locations are also reset to zero.

The register file is physically partitioned into four "banks" to improve access speed, but this does not affect the addressing in any way. The main table shows allocations for MPEG, and the two repeated sections give the variations for JPEG and H.261 respectively.

TABLE B.3.1

Table 1: Huffman Register File Address Map

| | Addr | Location | | Addr | Location | |
|---|---|---|---|---|---|---|
| | 00 | A register 1 | I | 3E | c2 | |
| | 01 | A register 0 | I | 3F | c3 | |
| | 02 | run | I,O | 40 | dc pred_0 1 | |
| | 10 | horiz pels 1 | I,O | 41 | dc pred_0 0 | |
| | 11 | horiz pels 0 | I,O | 42 | dc pred_1 1 | |
| | 12 | vert pels 1 | I,O | 43 | dc pred_1 0 | |
| | 13 | vert pels 0 | I,O | 44 | dc pred_2 1 | |
| | 14 | buff size 1 | I,O | 45 | dc pred_2 0 | |
| | 15 | buff size 0 | I,O | 46 | dc pred_3 1 | |
| | 16 | pel asp. ratio | I,O | 47 | dc pred_3 0 | |
| | 17 | bit rate 2 | O | 50 | prev mhf 1 | |
| | 18 | bit rate 1 | O | 51 | prev mhf 0 | |
| | 19 | bit rate 0 | O | 52 | prev mvf 1 | |
| | 1A | pic rate | O | 53 | prev mvf 0 | |
| | 1B | constrained | O | 54 | prev mhb 1 | |
| | 1C | picture type | O | 55 | prev mhb 0 | |
| | 1D | H261 picture type | O | 56 | prev mvb 1 | |
| | 1.00 | broken closed | O | 57 | prev mvb 0 | |
| | 1F | pred mode | M | 60 | mb horiz cnt1 | C13 |
| | 20 | vbv delay 1 | M | 61 | mb horiz cnt0 | " |
| | 21 | vbv delay 0 | M | 62 | mb vert cnt1 | C13 |
| | 22 | full pel fwd | M | 63 | mb vert cnt0 | " |
| | 23 | full pel bwd | M | 64 | horiz mb 1 | |
| | 24 | horiz mb copy | M | 65 | horiz mb 0 | |
| | 25 | pic number | M | 66 | vert mb 1 | |
| | 26 | max h | M | 67 | vert mb 0 | |
| | 27 | max v | M | 68 | restart count1 | C16 |
| | 28 | — | M | 69 | restart count0 | " |
| | 29 | — | M | 6A | restart gap1 | |
| | 2A | — | M | 6B | restart gap0 | |
| | 2B | — | M | 6C | horiz blk count | C2 |
| | 2C | first group | M | 6D | vert blk count | C2 |
| | 2D | in picture | H,M | 6E | comp id | C2 |
| T,R | 2E | rom control | M | 6F | max comp id | |
| T,R | 2F | rom revision | H,R | 70 | coding std | |
| I,H | 30 | dc huff 0 | M,H | 71 | pattern code | SR8 |

TABLE B.3.1-continued

Table 1: Huffman Register File Address Map

| | Addr | Location | | Addr | Location |
|---|---|---|---|---|---|
| I | 31 | dc huff 1 | H | 72 | fwd r size |
| I | 32 | dc huff 2 | H | 73 | bwd r size |
| I | 33 | dc huff 3 | | | |
| I,H | 34 | ac huff 0 | | | |
| I | 35 | ac huff 1 | | | |
| I | 36 | ac huff 2 | M,I | 78 | h0 |
| I | 37 | ac huff 3 | M,I | 79 | h1 |
| I | 38 | tq0 | M,I | 7A | h2 |
| I | 39 | tq1 | M,I | 7B | h3 |
| I | 3A | tq2 | M,I | 7C | v0 |
| I | 3B | tq3 | M,I | 7D | v1 |
| I | 3C | c0 | M,I | 7E | v2 |
| I | 3D | c1 | M,I | 7F | v3 |

JPEG Variations:

TABLE B.3.2

JPEG Variations:

| 10 | horiz pels 1 |
|---|---|
| 11 | horiz pels 0 |
| 12 | vert pels 1 |
| 13 | vert pels 0 |
| 14 | buff size 1 |
| 15 | buff size 0 |
| 16 | pel asp. ratio |
| 17 | bit rate 2 |
| 18 | bit rate 1 |
| 19 | bit rate 0 |
| 1A | pic rate |
| 1B | constrained |
| 1C | picture type |
| 1D | H261 picture type |
| 1E | broken closed |
| 1F | pred mode |
| 20 | vbv delay 1 |
| 21 | vbv delay 0 |
| 22 | pending frame ch |
| 23 | restart index |
| 24 | horiz mb copy |
| 25 | pic number |
| 26 | max h |
| 27 | max v |
| 28 | — |
| 29 | — |
| 2A | — |
| 2B | — |
| 2C | first scan |
| 2D | in picture |
| 2E | rom control |
| 2F | rom revision |

H.261 Variations:

TABLE B.3.3

H.261 Variations:

| 10 | horiz pels 1 |
|---|---|
| 11 | horiz pels 0 |
| 12 | vert pels 1 |
| 13 | vert pels 0 |
| 15 | buff size 0 |
| 14 | buff size 1 |
| 16 | pel asp. ratio |
| 17 | bit rate 2 |
| 18 | bit rate 1 |
| 19 | bit rate 0 |
| 1A | pic rate |
| 1B | constrained |
| 1C | picture type |

TABLE B.3.3-continued

H.261 Variations:

| | |
|---|---|
| 1D | H261 picture type |
| 1E | broken closed |
| 1F | pred mode |
| 20 | vbv delay 1 |
| 21 | vbv delay 0 |
| 22 | full pel fwd |
| 23 | full pel bwd |
| 24 | horiz mb copy |
| 25 | pic number |
| 26 | max h |
| 27 | max v |
| 28 | — |
| 29 | — |
| 2A | — |
| 2B | in gob |
| 2C | first group |
| 2D | in picture |
| 2E | rom control |
| 2F | rom revision |

B.3.7 The Microinstruction Word

The ALU microinstruction word is split into a number of fields, each controlling a different aspect of the structure described above. The total number of bits used in the instruction word is 36, (plus 1 for the extension bit input) and a minimum of encoding across fields has been adopted so that maximum flexibility of hardware configuration is maintained. The instruction word is partitioned as detailed below. The default field values, that is those which do not alter the state of the ALU or register file, are those given in the italics.

TABLE B.3.4

Table 2: Huffman ALU microinstruction fields

| Field | Value | Description | Bits |
|---|---|---|---|
| OUTSRC | RSA6 | run, sign, A register as 6 bits | 0000 |
| (specifies | ZZA | zero, zero, A register | 0001 |
| sources for | ZZA8 | zero, zero, A register ls 8 bits | 0010 |
| run, sign and | ZZADDU4 | zero, zero, adder o/p ms 4 bits | 0011 |
| level output) | ZINPUT | zero, input data | 0100 |
| | RSSGX | run, sign, sign extend o/p | 0111 |
| | RSADD | run, sign, adder o/p | 1000 |
| | RZADD | run, zero, adder o/p | 1001 |
| | RIZADD | input run, zero, adder output | |
| | ZSADD | zero, sign, adder o/p | 1010 |
| | ZZADD | zero, zero, adder o/p | 1011 |
| | NONE | no valid output - out_valid set to zero | 11XX |
| REGADDR | 00 - 7F | register file address for ALU access | 7 bits |
| REGSRC | ADD | drive adder o/p onto register file i/p | 0 |
| | SGX | drive sign extend o/p onto register file i/p | 1 |
| REGMODE | READ | read from register file | 0 |
| | WRITE | write to register file | 1 |
| CNGDET | TEST | update change detect if REGMODE is WRITE | 0 |
| (change | HOLD | do not update change detect bit | 1 |
| detect) | CLEAR | reset change detect if REGMODE is READ | 0 |
| RUNSRC | RUNIN | drive run i/p onto run register i/p | 0 |
| (run source) | ADD | drive adder o/p onto run register i/p | 1 |
| RUNMODE | LOAD | update run register | 0 |
| | HOLD | do not update run register | 1 |
| ASRC | ADD | drive adder o/p onto A register i/p | 00 |
| (A register | INPUT | drive input data onto A register i/p | 01 |
| source) | SGX | drive sign extend o/p onto A register i/p | 10 |
| | REG | drive register file o/p onto A register i/p | 11 |
| AMODE | LOAD | update A register | 00 |
| | HOLD | do not update A register | 1 |
| SGXMODE | NORMAL | sign extend with sign | 00 |
| (sign extend | INVERSE | sign extend with ~sign | 01 |
| mode - see | DIFMAG | invert lower bits if sign bit is 0 | 10 |
| Section 4) | DIFCOMP | Sign extend with ~sign from next bit up | 11 |
| SIZESRC | CONST | drive const. i/p onto sign extend size i/p | 00 |
| (source for | A | drive A register onto sign extend size i/p | 01 |
| sign extend | REG | drive reg.file o/p onto sign extend size i/p | 10 |
| size input) | RUN | drive run reg. onto sign extend size i/p | 11 |
| SGXSRC | INPUT | drive input data onto sign extend data i/p | 0 |
| (sgx input) | A | drive A register onto sign extend data i/p | 1 |
| ADDMODE | ADD | input1 + input2 | 000 |
| (adder mode | ADC | input1 + input2 + 1 | 001 |
| see sect. 3) | SBC | input1 − input2 − 1 | 010 |
| | SUB | input1 − input2 | 011 |
| | TCI | SUB if input2<0, else ADD − 2's comp. | 100 |
| | DCD | ADC if input2<0, else ADD − DC diff | 101 |

TABLE B.3.4-continued

Table 2: Huffman ALU microinstruction fields

| Field | Value | Description | Bits |
|---|---|---|---|
| | VRA | ADC if input1<0, else SBC-vec resid add | 110 |
| ADDSRC1 | A | drive A register onto adder input1 | 00 |
| (source for | REG | drive register file o/p onto adder i/pl | 01 |
| adder i/p 1 - | INPUT | drive input data onto adder input1 | 10 |
| non-invert) | ZERO | drive zero onto adder input1 | 11 |
| ADDSRC2 | CONST | drive constant i/p onto adder input2 | 00 |
| (source for | A | drive A register onto adder input2 | 01 |
| inverting | INPUT | drive input data onto adder input2 | 10 |
| input) | REG | drive register file o/p onto adder i/p2 | 11 |
| CNDC-MODE | TEST | update condition codes | 00 |
| (cond. codes) | HOLD | do not update condition codes | 01 |
| CNTMODE | NOCOUNT | do not increment counters | X00 |
| (mbstructure | BCINCR | increment block counter and ripple | 001 |
| count mode) | CCINCR | force the component count to incr | 10 |
| | RESET | reset all counters in mb structure | 11 |
| | DISABLE | disable all counters | 1XX |
| INSTMODE | MULTI | iterate current instr multi times | 0 |
| | SINGLE | single cycle instruction only | 1 |

SECTION B.4 Buffer Manager

B.4.1 Introduction

This document describes the purpose, actions and implementation of the Buffer Manager.

B.4.2 Overview

The buffer manager provides four addresses for the DRAM interface. These addresses are page addresses in the DRAM. The DRAM interface is maintaining two FIFOs in the DRAM, the Coded Data Buffer and the Token Data Buffer. Hence the four addresses; a read and a write address for each buffer.

B.4.3 Interfaces

The Buffer Manager is connected only to the DRAM interface and to the microprocessor. The microprocessor need only be used for setting up the "Initialization registers" shown in Table B.4.4. The interface with the DRAM interface is the four eighteen bit addresses controlled by a REQuest/ACKnowledge protocol for each address. (Not being in the datapath the Buffer Manager has no two-wire interfaces.)

Buffer Manager operates from DRAM interface clock generator and on the DRAM interface scan chain.

B.4.4 Address Calculation

The read and write addresses for each buffer are generated from 9 eighteen bit registers:

initialization registers (RW from microprocessor)
BASECB—base address of coded data buffer
LENGTHCB—maximum size (in pages) of coded data buffer
BASETB—base address of token data buffer
LENGTHTB—maximum size (in pages) of token data buffer
LIMIT—size (in pages) of the DRAM.
Dynamic registers (RO from microprocessor)
READCB—coded data buffer read pointer relative to BASECB
NUMBERCB—coded data buffer write pointer relative to READCB
READTB—token data buffer read pointer relative to BASETB
NUMBERTB—token data buffer write pointer relative to READTB To calculate addresses:
readaddr=(BASE+READ) mod LIMIT
writeaddr=(((READ+NUMBER) mod LENGTH)+ BASE) mod LIMIT The "mod LIMIT" term is used because a buffer may wrap around DRAM.

B.4.5 Block Description

The Buffer Manager is composed of three top level modules connected in a ring which snooper monitors the DRAM interface connection. The modules are bmprtize (prioritize), bminstr (instruction), and bmrecalc (recalculate) are arranged in a ring of that order and omsnoop (snoopers) on the address outputs.

Bmprtize deals with the REQ/ACK protocol, the FULL/EMPTY flags for the buffers and it maintains the state of each address, i.e., "is it a valid address?". From this information it dictates to bminstr which (if any) address should be recalculated. It also operates the BUF_CSR (status) microprocessor register, showing FULL/EMPTY flags, and the buf_access microprocessor register, controlling microprocessor write access to the buffer manager registers.

Bminstr on being told by bmprtize to calculate an address, issues six instructions (one every two cycles) to control bmrecalc into calculating an address.

Bmrecalc recalculates the addresses under the instruction of bminstr. Running an instruction every two cycles. It contains all of the initialization and dynamic registers, and a simple ALU capable of addition, subtraction and modulus. It informs Sbmprtize of FULL/EMPTY states it detects and when it has finished calculating an address.

B.4.6 Block Implementation

B.4.6.1 Bmprtize

At reset the buf_access microprocessor register is set to one to allow the setting up of the initialization registers. While buf_access reads back one no address calculations are initiated because they are meaningless without valid initialization registers.

Once buf_access is de-asserted (write zero to it) bmprtize goes about making all the addresses valid (by recalculating them), because this is its purpose to keep all four addresses valid. At this stage the Buffer Manager is "starting up" (i.e. all addresses have not yet been calculated), so no requests are asserted. Once all addresses have become valid start-up ends and all requests are asserted. From now on when an address becomes invalid (because it has been used and acknowledged) it will be recalculated.

No prioritizing between addresses will ever need to be done, because the DRAM interface can at its fastest use an address every seventeen cycles while the Buffer Manager can recalculate an address every twelve cycles. Therefore only one address will ever be invalid at one time after start-up. So bmprtize will recalculate any invalid address that is not currently being calculated.

Start-up will be re-entered whenever buf_access is asserted and so no addresses will be supplied to the DRAM interface during microprocessor accesses.

B.4.6.2 Bminstr

Bminstr contains a MOD 12 cycle counter (the number of cycles it takes to generate an address). Even cycles start an instruction, whereas odd cycles end an instruction. The top 3 bits along with whether it is a read or a write calculation are decoded into instructions for bmrecalc as follows:

For read addresses:

TABLE B.4.1

Read address calculation

| Cycle | Operation | BusA | BusB | Result | Meaning of result's sign |
|---|---|---|---|---|---|
| 0–1 | ADD | READ | BASE | | |
| 2–3 | MOD | Accum | LIMIT | Address | |
| 4–5 | ADD | READ | "1" | | |
| 6–7 | MOD | Accum | LENGTH | READ | |
| 8–9 | SUB | NUMBER | "1" | NUMBER | |
| 10–11 | MOD | "0" | Accum | | SET_EMPTY (NUMBER >= 0) |

For write addresses:

TABLE B.4.2

For write address calculations

| Cycle | Operation | BusA | BusB | Result | Meaning of result's sign |
|---|---|---|---|---|---|
| 0–1 | ADD | NUMBER | READ | | |
| 2–3 | MOD | Accum | LIMIT | | |
| 4–5 | ADD | Accum | BASE | | |
| 6–7 | MOD | Accum | LIMIT | Address | |
| 8–9 | ADD | NUMBER | "1" | NUMBER | |
| 10–11 | MOD | Accum | LENGTH | | SET_FULL (NUMBER >= LENGTH) |

Note: The result of the last operation is always held in the accummulator.

The result of the last operation is always held in the accumulator.

When there are no addresses to be recalculated the cycle counter idles at zero, thus causing an instruction that writes to none of the registers, and so has no affect.

B.4.6.3 Bmrecalc

Bmrecalc performs one operation every two clock cycles. It latches in the instruction from bminstr (and which buffer and io type) on an even counter cycle (start_alu_cyc), and latches the result of the operation on an odd counter cycle (end_alu_cyc). The result of the operation is always stored in the "Accum" register in addition to any registers specified by the instruction. Also on end_alu_cyc, bmrecalc informs bmprtize as to whether the use of the address just calculated will make the buffer full or empty, and when the address and full/empty has been successfully calculated (load_addr).

Full/empty are calculated using the sign bit of the operation's result.

The modulus operation is not a true modulus but A mod B is implemented as: (A>B? (A−B):A). However this is only wrong when A>(2B−1), which will never occur.

B.4.6.4 Bmsnoop

Bmsnoop, is composed of four eighteen bit super snoopers that monitor the addresses supplied to the DRAM interface. The snooper must be "super" (i.e., can be accessed with the clocks running) to allow on chip testing of the external DRAM. These snoopers must work on a REQ/ACK system and are, therefore, different to any other on the device.

REQ/ACK is used on this interface as opposed to a two-wire protocol because it is essential to transmit information (i.e. acknowledges) back to the sender which an accept will not do). This is to acutely monitor the FIFO pointers. Having a 2-wire piplene would not allow this, because it is not possible to know how full the pipeline of addresses is.

B.4.7 Registers

To gain microprocessor write access to the initialization registers one should be written to buf_access, access will be given when buf_access reads back one. Conversely to give up microprocessor write access zero should be written to buf_access. Access will be given when buf_access reads back zero. buf_access is reset to one.

The dynamic and initialization registers may be read at any time, however to ensure that the dynamic registers are not changing the microprocessor write access must be gained.

It is intended that the initialization registers be written to only once. Re-writing them may cause the buffers to operate incorrectly. It may be possible in a later revision to increase the buffer length on-the-fly and have the buffer manager use the new length when appropriate.

No check is ever made to see that the values in the initialization registers are sensible, e.g. that the buffers do not overlap. This is the user's responsibility.

TABLE B.4.3

Buffer manager non-keyhole registers

| Register Name | Usage | Address |
|---|---|---|
| CED_BUF_ACCESS | xxxxxxxD | 0x24 |
| CED_BUF_KEYHOLE_ADDR | xxDDDDDD | 0x25 |
| CED_BUF_KEYHOLE | DDDDDDDD | 0x26 |
| CED_BUF_CB_WR_SNP_2 | xxxxxxDD | 0x54 |
| CED_BUF_CB_WR_SNP_1 | DDDDDDDD | 0x55 |
| CED_BUF_CB_WR_SNP_0 | DDDDDDDD | 0x56 |
| CED_BUF_CB_RD_SNP_2 | xxxxxxDD | 0x57 |
| CED_BUF_CB_RD_SNP_1 | DDDDDDDD | 0x58 |
| CED_BUF_CB_RD_SNP_0 | DDDDDDDD | 0x59 |
| CED_BUF_TB_WR_SNP_2 | xxxxxxDD | 0x5a |
| CED_BUF_TB_WR_SNP_1 | DDDDDDDD | 0x5b |
| CED_BUF_TB_WR_SNP_0 | DDDDDDDD | 0x5c |

TABLE B.4.3-continued

Buffer manager non-keyhole registers

| Register Name | Usage | Address |
|---|---|---|
| CED_BUF_TB_RD_SNP_2 | xxxxxxDD | 0x5d |
| CED_BUF_TB_RD_SNP_1 | DDDDDDDD | 0x5e |
| CED_BUF_TB_RD_SNP_0 | DDDDDDDD | 0x5f |

Where D indicates a registers bit and x shows no register bit.

TABLE B.4.4

Registers in buffer manager keyhole

| Keyhole Register Name | Usage | Key hole Address |
|---|---|---|
| CED_BUF_CB_BASE_3 | xxxxxxxx | 0x00 |
| CED_BUF_CB_BASE_2 | xxxxxxDD | 0x01 |
| CED_BUF_CB_BASE_1 | DDDDDDDD | 0x02 |
| CED_BUF_CB_BASE_0 | DDDDDDDD | 0x03 |
| CED_BUF_CB_LENGTH_3 | xxxxxxxx | 0x04 |
| CED_BUF_CB_LENGTH_2 | xxxxxxDD | 0x05 |
| CED_BUF_CB_LENGTH_1 | DDDDDDDD | 0x06 |
| CED_BUF_CB_LENGTH_0 | DDDDDDDD | 0x07 |
| CED_BUF_CB_READ_3 | xxxxxxxx | 0x08 |
| CED_BUF_CB_READ_2 | xxxxxxDD | 0x09 |
| CED_BUF_CB_READ_1 | DDDDDDDD | 0x0a |
| CED_BUF_CB_READ_0 | DDDDDDDD | 0x0b |
| CED_BUF_CB_NUMBER_3 | xxxxxxxx | 0x0c |
| CED_BUF_CB_NUMBER_2 | xxxxxxDD | 0x0d |
| CED_BUF_CB_NUMBER_1 | DDDDDDDD | 0x0e |
| CED_BUF_CB_NUMBER_0 | DDDDDDDD | 0x0f |
| CED_BUF_TB_BASE_3 | xxxxxxxx | 0x10 |
| CED_BUF_TB_BASE_2 | xxxxxxDD | 0x11 |
| CED_BUF_TB_BASE_1 | DDDDDDDD | 0x12 |
| CED_BUF_TB_BASE_0 | DDDDDDDD | 0x13 |
| CED_BUF_TB_LENGTH_3 | xxxxxxxx | 0x14 |
| CED_BUF_TB_LENGTH_2 | xxxxxxDD | 0x15 |
| CED_BUF_TB_LENGTH_1 | DDDDDDDD | 0x16 |
| CED_BUF_TB_LENGTH_0 | DDDDDDDD | 0x17 |
| CED_BUF_TB_READ_3 | xxxxxxxx | 0x18 |
| CED_BUF_TB_READ_2 | xxxxxxDD | 0x19 |
| CED_BUF_TB_READ_1 | DDDDDDDD | 0x1a |
| CED_BUF_TB_READ_0 | DDDDDDDD | 0x1b |
| CED_BUF_TB_NUMBER_3 | xxxxxxxx | 0x1c |
| CED_BUF_TB_NUMBER_2 | xxxxxxDD | 0x1d |
| CED_BUF_TB_NUMBER_1 | DDDDDDDD | 0x1e |
| CED_BUF_TB_NUMBER_0 | DDDDDDDD | 0x1f |
| CED_BUF_LIMIT_3 | xxxxxxxx | 0x20 |
| CED_BUF_LIMIT_2 | xxxxxxDD | 0x21 |
| CED_BUF_LIMIT_1 | DDDDDDDD | 0x22 |
| CED_BUF_LIMIT_0 | DDDDDDDD | 0x23 |
| CED_BUF_CSR | xxxxDDDD | 0x24 |

B.4.8 Verification

Verification was conducted in Lsim with small FIFOs onto a dummy DRAM interface, and in C-code as part of the top level chip simulation.

B.4.9 Testing

Test coverage to the bman is through the snoopers in bmsnoop, the dynamic registers (shown in B.4.4) and using the scan chain which is part of the DRAM interface scan chain.

SECTION B.5 Inverse Modeller

B.5.1 Introduction

This document describes the purpose, actions and implementation of the Inverse Modeller (imodel) and the Token Formatter (hsppk). Hsppk is a hierarchically part of the Huffman Decoder, but functionally part of the Inverse Modeller. It is therefore discussed in this section.

B.5.2 Overview

The Token buffer, which is between the imodel and hsppk can contain a great deal of data, all in off-chip DRAM. To ensure that efficient use is made of this memory the data must be in a 16 bit format. The Formatter "packs" the data from the Huffman Decoder into this format for the Token buffer. The Inverse Modeller "unpacks" data from the Token buffer format.

However the Inverse Modeller's main function is the expanding out of "run/level" codes into a run of zero data followed by a level. Additionally the Inverse Modeller ensures that DATA tokens have at least 64 coefficients and it provides a "gate" for stopping streams which have not met their start-up criteria.

B.5.3 Interfaces

B.5.3.1 Hsppk

Hsppk has the Huffman Decoder as input and the Token buffer as output. Both interfaces are of the two-wire type, the input being a 17 bit token port, the output being 16 bit "packed data", plus a FLUSH signal. Hsppk is clocked from the Huffman clock generator and thus connected to the Huffman scan chain.

B.5.3.2 Imodel

Imodel has the Token buffer and buffer start-up output gate logic (bsogl) as inputs and the Inverse Quantizer as output. Input from the Token buffer is 16 bit "packed data", plus block_end signal, from the bsogl is one wirestream_enable. Output is an 11 bit token port. All interfaces are controlled by the two-wire interface protocol. Imodel has its own clock generator and scan chain.

Both blocks have microprocessor access only to the snoopers at their outputs.

B.5.4 Block description

B.5.4.1 Hsppk

Hsppk takes in the 17 bit data from the Huffman and outputs 16 bit data to the Token buffer. This is achieved by first either truncating or splitting the input data into 12 bit words, and second by packing these words into a 16 bit format.

B.5.4.1.1 Splitting

Hsppk receives 17 bit data from the Inverse Huffman. This data is formatted into 12 bits using the following formats.

Where F=specifies format; E=extension bit; R=Run bit; L=length bit (in sign mag.) or non-DATA token bit; x=don't care.

FLLLLLLLLLLLFormat 0

ELLLLLLLLLLLFormat 0a

FRRRRRR00000Format 1

Normal tokens only occupy the bottom 12 bits, having the form:

ExxxxxxLLLLLLLLLLL

This is truncated to format 0a

However, DATA tokens have a run and a level in each word in the form:

ERRRRRRLLLLLLLLLL.

This is broken into the formats:

ERRRRRRLLLLLLLLLL≧FRRRRRR00000 Format 1

ELLLLLLLLLLL Format 0a

Or if the run is zero format 0 is used:

E000000LLLLLLLLLLL≧FLLLLLLLLLLL Format 0

It can be seen that in the format 0 the extension bit is lost and assumed to be one. Therefore, it cannot be used where the extension is zero. In this case, format 1 is unconditionally used.

B.5.4.1.2 Packing

After splitting all data words are 12 bits wide. Every four 12 bit words are "packed" into three 16 bit words:

TABLE B.5.1

Packing method

| Input words | Output words |
|---|---|
| 0 | 0000000000001111 |
| 111111111111 | 1111111122222222 |
| 222222222222 | 2222333333333333 |
| 333333333333 | |

B.5.4.1.3 Flushing of the buffer

The DRAM interface collects a block, 32 sixteen bit "packed" words, before writing them to the buffer. This implies that data can get stuck in the DRAM interface at the end of a stream, if the block is only partially complete. Therefore a flushing mechanism is required. .Hsppk signals the DRAM interface to write its current partially complete block unconditionally.

B.5.4.2 Imodel

B.5.4.2.1 Imup (UnPacker)

Imup performs three functions:

Unpacking data from its sixteen bit format into 12 bit words.

TABLE B.5.2

Unpacking method

| Input words | Output words |
|---|---|
| 0000000000001111 | 0 |
| 1111111122222222 | 111111111111 |
| 2222333333333333 | 222222222222 |
| | 333333333333 |

Maintaining correct data during flushing of the Token buffer. When the DRAM interface flushes, by unconditionally writing current partially complete block, rubbish data is in the remainder of the block. The imup must delete rubbish data, i.e., delete all data from a FLUSH token until the end of a block.

Holding back data until Start-up Criteria are met. Output of data from the block is conditional on a "valid" being accepted from the Buffer Start-up circuitry. A new "Valid" (stream_enable) is accepted from the Buffer Start-up for each different stream.

Twelve bit data is output to imex in "run/level" format. It is not necessary to reverse the splitting process of hsppk.

B.5.4.2.2 Imex (EXpander)

Imex expands out all run length codes into runs of zeros followed by a level.

B.S.4.2.3 Impad (PADder)

Impad ensures that all DATA Token bodies contain 64 (or more) words. It does this by padding with zeros. DATA Tokens are not checked for having over 64 words in the body.

B.5.5 Block implementation

B.5.5.1 Hsppk

Both the Splitting and packing is done in a single cycle.

B.5.5.1.1 Splitting

Firstly the format must be determined

```
IF (datatoken)
    IF (lastformat == 1) use format 0a;
    ELSE IF (run == 0) use format 0;
        ELSE use format 1;
    ELSE use format 0a;
and format bit determined
    format 0 format bit = 0;
    format 0a format bit = extension bit;
    format 1 format bit = 1;
```

If format 1 is used no new data should be accepted in the next cycle because the level of the code has yet to be output.

B.5.5.1.2 Packing

The packing procedure cycles every four valid data inputs. The sixteen bit word output is formed from the last valid word which is held and the succeeding word. If this is not valid the output is not valid. The procedure is:

TABLE B.5.3

Packing procedure

| | Held Word | Succeeding Word | Packed Word | |
|---|---|---|---|---|
| valid cycle 0 | xxxxxxxxxxxx | 000000000000 | xxxxxxxxxxxxxxxx | don't output |
| valid cycle 1 | 000000000000 | 111111111111 | 0000000000001111 | output |
| valid cycle 2 | 111111111111 | 222222222222 | 1111111122222222 | output |
| valid cycle 3 | 222222222222 | 333333333333 | 2222333333333333 | output |

Where x indicates undefined bits.

During valid cycle 0 no word is output because it is not valid.

The valid cycle number is maintained by a ring counter. It is incremented by valid data from the splitter and an accepted output.

When a FLUSH (or picture_end) token is received and the token itself is ready to output a flush signal is output to the DRAM interface that also resets the valid cycle to zero. If a FLUSH token arrives on anything but cycle 3 the flush signal must be delayed a valid cycle to ensure the token itself is output.

B.5.5.2 Imodel

B5.5.2.1 Imup (Unpacker)

As with the packer the last valid input is stored and, combined with the next input, allows unpacking.

TABLE B.5.4

Unpacking procedure

| | Succeeding word | Held Word | Unpacked Word | |
|---|---|---|---|---|
| valid cycle 0 | 0000000000001111 | xxxxxxxxxxxxxxxx | 000000000000 | input |
| valid cycle 1 | 1111111122222222 | 0000000000001111 | 111111111111 | input |
| valid cycle 2 | 2222333333333333 | 1111111122222222 | 222222222222 | don't input |
| valid cycle 3 | 2222333333333333 | 1111111122222222 | 333333333333 | input |

Where x indicates undefined bits

The valid cycle is maintained by a ring counter. The unpacked data has the token's data, flush and PICTURE_END decoded from it. Additionally format and extension bit are decoded from the unpacked data.

formatbit_is_extn=(lastformat==1) II databody format=databody && (formatbit && lastformatbit) for token decoding and to be passed on to imex.

When a FLUSH (or picture_end) token is unpacked and output to imex, all data is deleted (Valid forced low) until the block end signal is received from the DRAM interface.

B.5.5.2.2 Imex (EXpander)

imex is a four state machine to expand run/level codes out. The state machine is:

state0: load run count from run code.

state 1: decrement run count, outputting zeros.

state 2: input data and output levels; default state.

state 3: illegal state.

B.5.5.2.3 Impad (PADder)

Impad is informed of DATA Token headers by imex. It then counts the number of coefficients in the body of the token. If the token ends before there are 64 coefficients then zero coefficients are inserted at the end of the token up to 64 coefficients. Unextended data headers have 64 zero coefficients inserted after them. DATA tokens with 64 or more coefficients are not affected by impad.

B.5.6 Registers

The imodel and hsppk have no microprocessor registers, with the exception of their snooper.

TABLE B.5.5

Imodel & hsppk registers

| Register Name | Usage | Address |
|---|---|---|
| CED_H_SNP_2 | VAxxxxxx | 0x49 |
| CED_H_SNP_1 | DDDDDDDD | 0x4a |
| CED_H_SNP_0 | DDDDDDDD | 0x4b |
| CED_IM_SNP_1 | VAExxDDD | 0x4a |
| CED_IM_SNP_0 | DDDDDDDD | 0x4d |

Where V=valid bit; A=accept bit; E=extension bit; D=data bit.

B.5.7 Verification

Selected streams run through Lsim simulations.

B.5.8 Testing

Test coverage to the imodel at the input is through the Token buffer output snooper, and at the output through the imodel's own snooper. Logic is covered by the imodel's own scan chain.

The output of the hsppk is accessible through the huffman output snooper. The logic is visible through the huffman scan chain.

SECTION B.6 Buffer Start-up

B.6.1 Introduction

This section describes the method and implementation of buffer start-up.

B.6.2 Overview

To ensure that a stream of pictures can be displayed smoothly and continuously a certain amount of data must be gathered before decoding can start. This is the start-up condition. The coding standard specifies a VBV delay which can be translated approximately into the amount of data needed to be gathered. It is the purpose of the "Buffer Start-up" to ensure that every stream fulfills its start-up condition, before its data progresses from the token buffer, allowing decoding. It is held in the buffers by a notional gate (the output gate) at the output of the token buffer (i.e. in the Inverse Modeler). This gate will only be open for the stream once its start-up condition has been met.

B.6.3 Interfaces

Bscntbit (Buffer Start-up bit counter) is in the datapath and communicates by two-wire interfaces, and is connected with the microprocessor. It also branches a two-wire interface to bsogl (Buffer Start-up Output Gate Logic). Bsogl with a two-wire interface controls imup (Inverse Modeler UnPacker), which implements the output gate.

B.6.4 Block Structure

Bscntbit lies in the datapath between the Start Code Detector and the coded data buffer. This single cycle block counts valid words of data leaving the block and compares this number with the start-up condition (or target) which will be loaded from the microprocessor. When the target is met bsogl is informed. Data is unaffected by bscntbit.

Bsogl lies between bscntbit and imup (in the inverse modeler). In effect it is a queue of indicators that streams have met their targets. The queue is moved along by streams leaving the buffers (i.e. FLUSH tokens received in the data stream at imup), when another "indicator" is accepted by imup. If the queue is empty (i.e. there are no streams in the buffers which have yet met their start-up target) the stream in imup is stalled.

The queue only has a finite depth, however this may be increased indefinitely by breaking the queue in bsogl and allowing the microprocessor to monitor the queue. These queue mechanisms are referred to as internal and external queues respectively.

B.6.5 Block Implementation

B.6.5.1 Bsbitcnt (Buffer Start-up bit counter)

Bscntbit counts all valid words that are input into the buffer start-up. The counter (bsctr) is a programmable counter of 16–24 bits width. bsctr has carry look ahead circuitry to give it sufficient speed. Bsctr's width is programmed by ced_bs_prescale. It does this by forcing bits 8–16 high, which makes them always pass a carry. They are therefore effectively not used. Only the top eight bits of bsctr are used for comparisons with the target (ced_bs_target).

The comparison (ced_bs_count >=ced_bs_target) is done by bscmp.

The target is derived from the stream when in the Huffman Decoder and calculated by the microprocessor. It will therefore only be set sometime after the start of the stream. Before this the target_valid is low. Writing to ced_bs_target sets target_valid high and allows comparisons in bscmp to take place. When the comparison shows ced_bs_count>=ced_bs_target, target_valid is set low. The target has been met.

When the target is met the count is reset (it is not reset at the end of a stream.) Counting is disabled after the target is met if it is before the end of the stream. The count saturates to 255.

When a stream ends (i.e. a flush) is detected in bsbitcnt, abs_flush_event is generated. If the stream ends before the target is met an additional event is also generated (bs_flush_before_target_met_event). When any event occurs the block is stalled. This allows the user to recommence the search for the next stream's target or in the case of a bs_flush_beforejtarget_met_event event either:

1) write a target of zero which will force a target_met or
2) note that target was not met and allow the next stream to proceed until this combined with the last stream reaches the target. The target for this next stream should adjust accordingly.

B.6.5.2 BSOGL (buffer start-up output gate logic)

Bsogl is a queue of indicators that a stream has met its target. The queue type is set by ced_bs_queue (internal(0) or external(1)). This is a reset to select an internal queue. The depth of the queue determines the maximum number of satisfied streams that can be in the coded data buffer, Huffman, and token buffer. When this number is reached (i.e., the queue is full) bsogl will force the datapath to stall at bsbitcnt.

Using an internal queue needs no action from the microprocessor. However if it is necessary to increase the depth of the queue an external queue can be set (by setting ced_bs_access to gain access to ced_bs_queue which should be set, target_met_event and stream_end_event enabled and access relinquished).

The external queue (a count maintained by the microprocessor) is inserted into the internal queue. The external queue is maintained by two events: target_met_event and stream_end_event [these can simply be referred to as service_queue_input and service_queue_output respectively] and a register ced_bs_enable_nxt_stream. In effect target_met_event is the up stream end of the internal queue supplying the queue. ced_bs_enable_nxt_stream is the down stream end of the internal queue consuming the queue. stream_end_event is a request to supply the down stream queue; stream_end_event resets ced_bs_enable_nxt_stream. The two events should be serviced thus:

```
/* TARGET_MET_EVENT */
j= micro_read(CED_BS_ENABLE_NXT_STM);
if (j == 0) /*Is next stream enabled ?*/
(/*no, enable it*/
        micro_write(CED_BS_ENABLE_NXT_STM, 1);
        printf(" enable next stream (queue = 0x%x))0\n", (context->queue);
}
else /*yes, increment the queue of "target_met" streams*/
{
        queue++;
        printf(* stream already enabled (queue = 0x%x)\n", (context->queue));
}
/* STREAM_EVENT */
if (queue > 01) /* are there any "target_mets" left? */
(/* yes, decrement the queue and enable another stream */
   queue--;
   micro_write(CED_BS_ENABLE_NXT_STM, 1);
   printf(* enable next stream (queue = 0x%x)\n*, (context->queue));
   }
else
```

-continued

```
    printf(" queue empty cannot enable next stream (queue = 0x%x)   n",
queue);
micro_write(CED_EVENT_1, 1 << BS_STREAM_END_EVENT); /* clear event
*/
```

The queue type can be changed from internal to external at any time (by the means described above), but they can only be changed external to internal when the external queue is empty (from above "queue==0"), by setting ced_bs_ access to gain access to ced_bs_queue which should be reset, target met event and stream_end_event masked, and access relinquished.

To allow no checking of stream start-up conditions set ced_bs_queue (external), mask target_met_event and stream_end_event and set ced_bs_enable_nxt_stream. In this way all streams will always be enabled.

B.6.6 Microprocessor registers

TABLE B.6.1

Bscntbit registers

| Register name | Usage | Address |
|---|---|---|
| CED_BS_ACCESS | xxxxxxxD | 0x10 |
| CED_BS_PRESCALE* | xxxxxDDD | 0x11 |
| CED_BS_TARGET* | DDDDDDDD | 0x12 |
| CED_BS_COUNT* | DDDDDDDD | 0x13 |
| BS_FLUSH_EVENT | rrrrrDrr | 0x02 |
| BS_FLUSH_MASK | rrrrrDrr | 0x03 |
| BS_FLUSH_BEFORE_TARGET_ME T_EVENT | rrrrDrrr | 0x02 |
| BS_FLUSH_BEFORE_TARGET_ME T_MASK | rrrrDrrr | 0x03 |

TABLE B.6.2

Bsogl registers

| Register name | Usage | Address |
|---|---|---|
| TARGET_MET_EVENT | rrrDrrrr | 0x02 |
| TARGET_MET_MASK | rrrDrrrr | 0x03 |
| STREAM_END_EVENT | rrDrrrrr | 0x02 |
| STREAM_END_MASK | rrDrrrrr | 0x03 |
| CED_BS_QUEUE* | xxxxxxxD | 0x14 |
| CED_BS_ENABLE_NXT_STM* | xxxxxxxD | 0x15 | where
 D is a register bit
 x is a non-existent register bit
 r is a reserved register bit
 to gain access to these registers ced_bs_access must be set to one and polled until it reads back one, unless in an interrupt service routine. Access is given up by setting ced_bs_access to zero.

SECTION B.7 The DRAM Interface

B.7.1 Overview

The Spatial Decoder, Temporal Decoder and Video Formatter each contain a DRAM interface block. In all three devices, the function of the DRAM interface is to transfer data from the chip to the external DRAM and from the external DRAM into the chip using block addresses supplied by an address generator.

The DRAM interface can operate from a clock which is asynchronous to both the address generator and to the clocks of the blocks through which data is passed. Special techniques have been used to handle this asynchronism, because although the clocks are asynchronous they may be approximately the same frequency.

Data is usually transferred between the DRAM Interface and the rest of the chip in blocks of 64 bytes (the only exception being prediction data in the Temporal Decoder). Transfers take place by means of a device known as a "swing buffer". This is essentially a pair of RAMs operated in a double-buffered configuration, with the DRAM interface filling or emptying one RAM while another part of the chip empties or fills the other RAM. A separate bus which carries an address from an address generator is associated with each swing buffer.

Each of the chips has four swing buffers, but the function of these swing buffers is different in each case. In the Spatial Decoder, one swing buffer is used to transfer coded data to the DRAM, another to read coded data from the DRAM, the third to transfer tokenized data to the DRAM and the fourth to read tokenized data from the DRAM. In the Temporal Decoder, one swing buffer is used to write Intra or Predicted picture data to the DRAM, the second to read Intra or Predicted data from the DRAM and the other two to read forward and backward prediction data. In the Video Formatter, one swing buffer is used to transfer data to the DRAM and the other three are used to read data from the DRAM, one for each of Luminance (Y) and the Red and Blue color difference data (Cr and Cb).

The following section describes the operation of a DRAM interface which has one write swing buffer and one read swing buffer, which is essentially the same as the operation of the Spatial Decoder DRAM Interface. This is illustrated in FIG. 48, "DRAM Interface".

B.7.2 A Generic DRAM Interface

Figure 48:
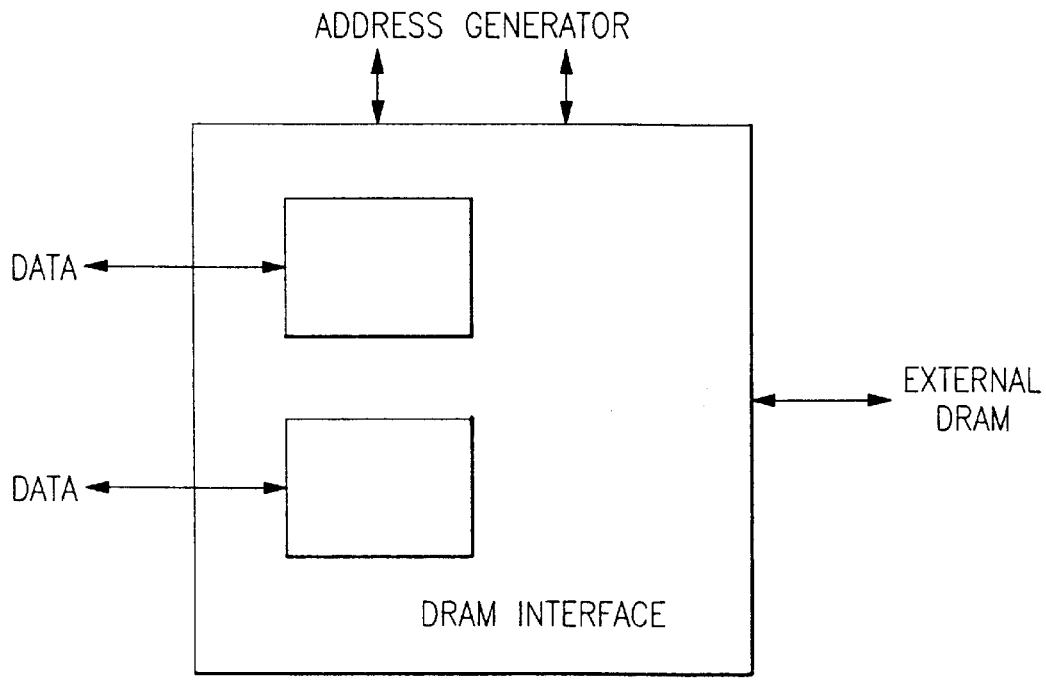
FIG. 48 is a block diagram of a DRAM interface.

Referring to FIG. 48, the interfaces to the address generator and to the blocks which supply and take the data are all two wire interfaces. The address generator may either generate addresses as the result of receiving control tokens, or it may merely generate a fixed sequence of addresses. The DRAM interface treats the two wire interfaces with the address generator in a special way. Instead of keeping the accept line high when it is ready to receive an address, it waits for the address generator to supply a valid address, processes that address and then sets the accept line high for one clock period. Thus it implements a request/acknowledge (REQ/ACK) protocol.

A unique feature of the DRAM Interface is its ability to communicate with the address generator and the blocks which provide or accept the data completely independently. For example, the address generator may generate an address associated with the data in the write swing buffer, but no action will be taken until the write swing buffer signals that there is a block of data ready to be written to the external DRAM. Similarly, the right swing buffer may contain a block of data which is ready to be written to the external DRAM, but no action is taken until an address is supplied on the appropriate bus from the address generator. Further, once one of the RAMs in the write swing buffer has been filled with data, the other may be completely filled and "swung" to the DRAM Interface side before the data input is stalled (the two-wire interface accept signal set low).

In understanding the operation of the DRAM Interface, it is important to note that in a properly configured system the DRAM Interface will be able to transfer data between the swing buffers and the external DRAM at least as fast as the sum of all the average data rates between the swing buffers and the rest of the chip.

Each DRAM Interface contains a method of determining which swing buffer it will service next. In general, this will be either a "round robin", in which the swing buffer which is serviced is the next available swing buffer which has less recently had a turn, or a priority encoder, in which some swing buffers have a higher priority than others. In both cases, an additional request will come from a refresh request generator which has a higher priority than all the other requests. The refresh request is generated from a refresh counter which can be programmed via the microprocessor interface.

B.7.2.1 The Swing Buffers

Figure 49:
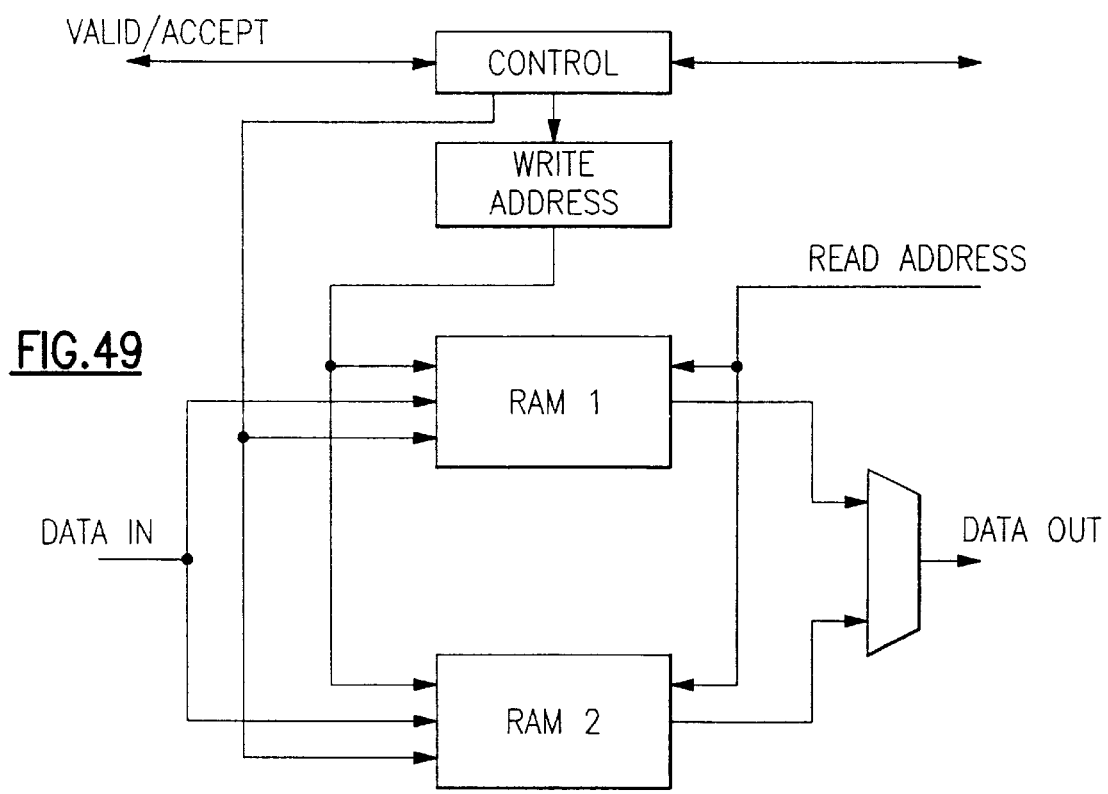
FIG. 49 is a block diagram of a write swing buffer.

FIG. 49 illustrates a write swing buffer. The operation is as follows:

1) Valid data is presented at the input (data in). As each piece of data is accepted it is written into RAM1 and the address is incremented.
2) When RAM1 is full, the input side gives up control and sends a signal to the read side to indicate that RAM1 is now ready to be read. This signal passes between two asynchronous clock regimes, and so passes through three synchronizing flip-flops.
3) The next item of data to arrive on the input side is written into RAM2, which is still empty.
4) When the round robin or priority encoder indicates that it is the turn of this swing buffer to be read, the DRAM Interface reads the contents of RAM1 and writes them to the external DRAM. A signal is then sent back across the asynchronous interface, as in (2), to indicate that RAM1 is now ready to be filled again.
5) If the DRAM Interface empties RAM1 and "swings" it before the input side has filled RAM2, then data can be accepted by the swing buffer continually, otherwise when RAM2 is filled the swing buffer will set its accept signal low until RAM1 has been "swung" back for use by the input side.
6) This process is repeated ad infinitum.

The operation of a read swing buffer is similar, but with input and output data busses reversed.

B.7.2.2 Addressing of External DRAM and Swing Buffers

The DRAM Interface is designed to maximize the available memory bandwidth. Consequently, it is arranged so that each 8×8 block of data is stored in the same DRAM page. In this way full use can be made of DRAM fast page access modes, where one row address is supplied followed by many column addresses. In addition, a facility is provided to allow the data bus to the external DRAM to be 8, 16 or 32 bits wide, so that the amount of DRAM used can be matched to the size and bandwidth requirements of the particular application.

In this example (which is exactly how the DRAM Interface on the Spatial Decoder works), the address generator provides the DRAM Interface with block addresses for each of the read and write swing buffers. This address is used as the row address for the DRAM. The six bits of column address are supplied by the DRAM Interface itself, and these bits are also used as the address for the swing buffer RAM. The data bus to the swing buffers is 32 bits wide, so if the bus width to the external DRAM is less than 32 bits, two or four external DRAM accesses must be made before the next word is read from a write swing buffer or the next word is written to a read swing buffer (read and write refer to the direction of transfer relative to the external DRAM).

The situation is more complex in the cases of the Temporal Decoder and the Video Formatter. These are covered separately below.

B.7.3 DRAM Interface Timing

The DRAM Interface Timing block uses timing chains to place the edges of the DRAM signals to a precision of a quarter of the system clock period. Two quadrature clocks from the phase locked loop are used. These are combined to form a notional 2× clock. Any one chain is then made from two shift registers in parallel, on opposite phases of the "2× clock".

First of all, there is one chain for the page start cycle and another for the read/write/refresh cycles. The length of each cycle is programmable via the microprocessor interface, after which the page start chain has a fixed length, and the cycle chain's length changes as appropriate during a page start.

On reset the chains are cleared and a pulse is created. This pulse travels along the chains, being directed by the state information from the DRAM Interface. The DRAM Interface clock is generated by this pulse. Each DRAM Interface clock period corresponds to one cycle of the DRAM. Thus, as the DRAM cycles have different lengths, the DRAM Interface clock is not at a constant rate.

Further timing chains combine the pulse from the above chains with the information from DRAM Interface to generate the output strobes and enables (notcas, notras, notwe, notoe).

SECTION B.8 Inverse Quantizer

B.8.1 Introduction

This document describes the purpose, actions and implementation of the inverse quantizer(iq).

B.8.2 Overview

The inverse quantizer reconstructs coefficients from quantized coefficients, quantization weights and step sizes, all of which are transmitted within the stream.

B.8.3 Interfaces

The iq lies between the inverse modeler and the inverse DCT in the datapath. It has a microprocessor connection. Datapath connections are by two-wire interfaces. Input data is 10 bits wide, output is 11 bits wide.

B.8.4 Mathematics of Inverse Quantization

B.8.4.1 H261 Equations

For blocks coded in intra mode:

$$C'_i = 8Q; \quad i = 0$$

-continued $$C_i'' = iq\_quant\_scale\,[2Q_i + \text{sign}(Q_i)]$$
$$\left.\begin{array}{ll}C_i' = C_i'' - \text{sign}(C_i'') & C_i'' = \text{even} \\ C_i' = C_i'' & C_i'' = \text{odd}\end{array}\right\} 0 < i < 64$$

$$C_i = \min(\max(C_i'' - 2048), 2047)$$

For all other coded blocks:

$$C_i'' = iq\_quant\_scale\,[2Q_i + \text{sign}(Q_i)]$$
$$\left.\begin{array}{ll}C_i' = C_i'' - \text{sign}(C_i'') & C_i'' = \text{even} \\ C_i' = C_i'' & C_i'' = \text{odd}\end{array}\right\} 0 \le i < 64$$

$$C_i = \min(\max(C_i'' - 2048), 2047)$$

B.8.4.2 JPEG Equation $$C_i' = W_{ij}Q_i + 1024 \quad i = 0$$
$$C_i' = W_{ij}Q_i \quad 0 < i < 64$$
$$C_i = \min(\max(C_i'' - 2048), 2047)$$
$$j = jpeg\_table\_indirection(c)$$

B.8.4.3 MPEG Equations

For blocks coded in intra mode:

$$C_i' = W_{ij}Q_i + 1024 \quad i = 0$$
$$\left.\begin{array}{l}C_i'' = \text{floor}\left(\dfrac{2iq\_quant\_scale\,W_{ij}Q_i}{16}\right) \\ C_i' = C_i'' - \text{sign}(C_i'') \quad C_i'' = \text{even} \\ C_i' = C_i'' \quad C_i'' = \text{odd}\end{array}\right\} \begin{array}{l}0 < i < 64 \\ j = 0, 2\end{array}$$

$$C_i = \min(\max(C_i'' - 2048), 2047)$$

1024 is added in intra DC case to account for predictors in huffman being reset to zero.

For all other coded blocks:

$$\left.\begin{array}{l}C_i'' = \text{floor}\left(\dfrac{iq\_quant\_scale\,W_{ij}[2Q_i + \text{sign}(Q_i)]}{16}\right) \\ C_i' = C_i'' - \text{sign}(C_i'') \quad C_i'' = \text{even} \\ C_i' = C_i'' \quad C_i'' = \text{odd}\end{array}\right\} \begin{array}{l}0 < i < 64 \\ j = 1, 3\end{array}$$

$$C_i = \min(\max(C_i'' - 2048), 2047)$$

B.8.4.4 JPEG Variation Equations $$C_i' = \text{floor}\left(\dfrac{2iq\_quant\_scale\,W_{ij}Q_i}{16}\right) + 1024 \quad i = 0$$

$$C_i' = \text{floor}\left(\dfrac{2iq\_quant\_scale\,W_{ij}Q_i}{16}\right) \quad 0 < i < 64$$

$$C_i = \min(\max(C_i'' - 2048)2047)$$

$$j = jpeg\_table\_indirection(c)$$

B.8.4.5 All other tokens

All tokens except DATA Tokens must pass through the iq unquantized

Where:

$$\text{sign}(a) = \begin{cases} -1 & a < 0 \\ 0 & a = 0 \\ 1 & a > 0 \end{cases}$$

$$\max(a, b) = \begin{cases} a & a > b \\ b & a \le b \end{cases}$$

Floor(a) returns an integer such that:

$$(a - 1) < \text{floor}(a) \le a \quad a \ge 0$$
$$a \le \text{floor}(a) < (a + 1) \quad a \le 0$$

$$\min(a, b) = \begin{cases} a & a \le b \\ b & a > b \end{cases}$$

$Q_i$ are the quantized coefficients.

$C_j$ are the reconstructed coefficients.

$W_{ij}$ are the values in the quantisation table matrices i is the coefficient index along the zig-zag j is the quantisation table matrix number ($0 \le j \le 3$)

B.8.4.6 Multiple Standards combined

It can be shown that all the above standards and their variations (also control data which must be unchanged by the iq) can be mapped on to single equation:

$$\text{OUTPUT} = \dfrac{(2\text{input} + k)\,(xy)}{16}$$

With the additional post inverse quantisation functions of:

* Add 1024

Convert from sign magnitude to 2's complement representation.

Round all even numbers to the nearest odd number towards zero.

Saturate result to +2047 or −2048.

The variables k, x, and y for each variation of the standards and which functions they use is shown in Table B.8.1.

TABLE B.8.1

Control decoding

| Standard | | x Weight | y Scale | k | Add 1024 | Round Even | Sat Res't | Convert 2's comp |
|---|---|---|---|---|---|---|---|---|
| H261 | intra DC | 8 | 8 | 0 | No | No | Yes | Yes |
| | intra | 16 | iq_quant_scale | 1 | No | Yes | Yes | Yes |
| | other | 16 | iq_quant_scale | 1 | No | Yes | Yes | Yes |
| JPEG | DC | $W_{ij}$ | 8 | 0 | Yes | No | Yes | Yes |
| | other | $W_{ij}$ | 8 | 0 | No | No | Yes | Yes |
| MPEG | intra DC | 8 | 8 | 0 | Yes | No | Yes | Yes |
| | intra | $W_{ij}$ | iq_quant_scale | 0 | No | No | Yes | Yes |
| | other | $W_{ij}$ | iq_quant_scale | 1 | No | Yes | Yes | Yes |
| XXX | DC | $W_{ij}$ | iq_quant_scale | 0 | Yes | No | Yes | Yes |
| | other | $W_{ij}$ | iq_quant_scale | 0 | No | No | Yes | Yes |
| Other Tokens | | 1 | 8 | 0 | No | No | No | No |

B.8.5 Block Structure

From B.8.4.6 and Table B.8.1 it can be seen that a single architecture can be used for a multi-standard inverse quantizer. Its arithmetic block diagram is shown in FIG. B.8.1 "Arithmetic Block":

Control for the arithmetic block can be functionally broken into two sections:

Decoding of tokens to load status registers or quantization tables.

Decoding of the status registers into control signals.

Figure 50:
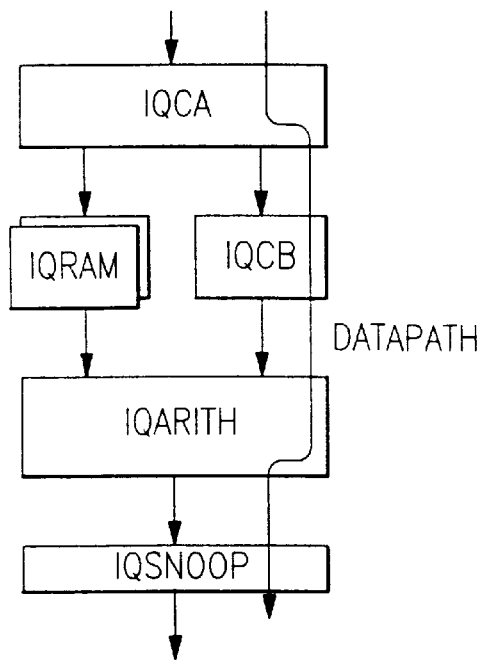
FIG. 50 is an iq block diagram used in an inverse quantizer.

Tokens are decoded in iqca which controls the next cycle, i.e., iqcb's bank of registers. It also controls the access to the four quantization tables in iqram. The arithmetic, that is two multipliers and the post functions are in iqarith. The complete block diagram for the iq is shown in FIG. 50.

B.8.6 Block Implementation

B.8.6.1 Iqca iqca is a state machine used to decode tokens into control wires for iqram and the register in iqcb. The state machine is better described as a state machine for each token since it is reset by each new token. For example:

The code for the QUANT_SCALE (see B.8.7.4, "QUANT_SCALE") and QUANT_TABLE (see B.8.7.6, "QUANT_TABLE") are as follows:

```
if (tokenheader == QUANT_SCALE)
{
 sprintf(preport, "QUANT_SCALE");
 reg_addr = ADDR_IQ_QUANT_SCALE;
 rnotw = WRITE;
 enable = 1;
}
if (tokenheader == QUANT_TABLE) /*QUANT_TABLE token */
switch (substate)
{
 case 0: /* quantisation table header */
    sprintf(preport. "QUANT_TABLE_%s_s0",
     (headerextn ? "(full)" : "(empty)"));
    nextsubstate = 1;
    insertnext = (headerextn ? 0 : 1);
    reg_addr = ADDR_IQ_COMPONENT;
    rnotw = WRITE;
    enable = 1;
    break;
 case 1: /* quantisation table body */
 sprintf(preport, "QUANT_TABLE_%s_s1",
    (headerextn ? "(full)" : "(empty)"));
    nextsubstate = 1;
    insertnext = (headerextn ? 0 : (qtm_addr_63 == 0));
    reg_addr = USE_QTM;
```

-continued

```
    rnotw = (headerextn ? WRITE : READ);
    enable = 1;
    break;
default:
 sprintf(preport, "ERROR in iq quantisation table tokendecoder
(substate %x) \n",
    substate);
    break;
 }
}
```

Where a substate is a state within a token QUANT_SCALE has for example only one substate; whereas the QUANT_TABLE has two, one being the header, the second the token body.

The state machine is implemented as a PLA. Unrecognized tokens cause no wordline to rise and the PLA to output default (harmless) controls.

Additionally iqca supplies addresses to iqram from Body-Word counter and inserts words into the stream for example in an unextended QUANT_TABLE (see B.8.7.4). This is achieved by stalling the input while maintaining the output valid. The words can be filled with the correct data in succeeding blocks (iqcb or iqarith).

iqca is a single cycle in the datapath controlled by two-wire interfaces.

B.8.6.2 iqcb iqcb holds the iq status registers. Under the control of iqca it loads or unloads these from/to the datapath.

The status registers are decoded (see Table B.8.1) into control wires for iqarith; to control the XY multiplier terms and the post quantization functions.

The sign bit of the datapath is separated here and sent to the post quantization functions. Also zero valued words on the datapath are detected here. The arithmetic is then ignored and zero muxed onto the datapath. This is the easiest way to comply with the "zero in; zero out" spec of the iq.

The status registers are accessible from the microprocessor only when the register iq_access has been set to one and reads back one. When in this situation iqcb has halted the datapath, so ensuring the registers have a stable value and no data is corrupted in the datapath.

iqcb is a single cycle in the datapath controlled by two wire interfaces.

B.8.6.3 Iqram

Iqram must hold up to four quantization table matrices (QTM), each 64*8 bits. It is therefore a 256*8 bits six transistor RAM, capable of one read or one write per cycle. The RAM is enclosed by two-wire interface logic receiving its control and write data from iqca. It reads out data to iqarith. iqram occupies the same cycle in the datapath as iqcb.

The RAM may be read and written from the microprocessor when iq_access reads back one. The RAM is placed behind a keyhole register, iq_qtm_keyhole and addressed by iq_qtm_keyhole_addr. Accessing iq_qtm_keyhole will cause the address to which it points, held in iq_qtm_keyhole_addr to be incremented. iq_qtm_keyhole-addr can be written to directly.

Figure 51:
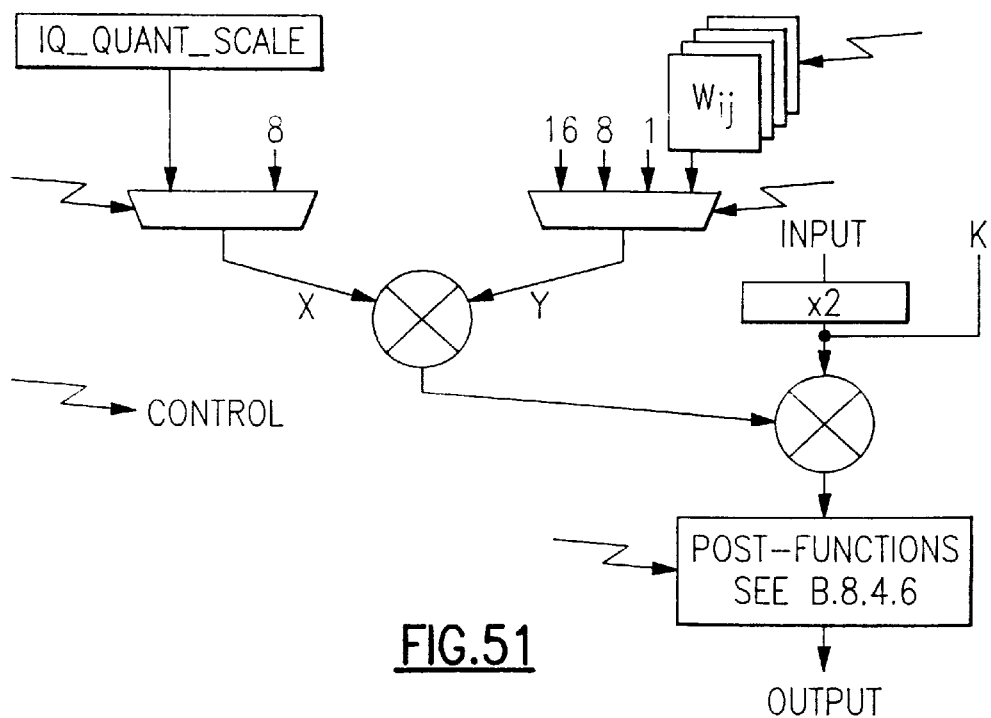
FIG. 51 is a diagram illustrating an arithmetic block of an inverse quantizer.

B.8.6.4 iqarith iqarith is three functions pipelined and split over three cycles. The functions are discussed below (see FIG. 51).

B.8.6.4.1 XY multiplier

This is a 5(X) by 8(Y) bit carry save unsigned multiplier feeding on to the datapath multiplier. The multiplier and multiplicand are selected with control wires from iqcb. The multiplication is in the first cycle, the resolving adder in the second.

At the input to the multiplier data from iqram can be muxed onto the datapath to read a QUANT_TABLE out onto the datapath.

B.8.6.4.2 (XY)* datapath multiplier

This 13 (XY) by 12 (datapath) bit carry save unsigned multiplier is split over the three cycles of the block. Three partial products in the first cycle, seven in the second and the remaining two in the third.

Since all output from the multiplier is less than 2047 (non-coefficient) or saturated to +2047/−2048 the top twelve bits don't ever need to be resolved. The resolving adder is just two bits wide. On the remainder of the high order bits a zero detect suffices as a saturate signal.

B.8.6.4.3 Post quantization functions

The post quantization functions are

Add 1024

Convert from sign magnitude to 2's complement representation.

Round all even numbers to the nearest odd number towards zero.

Saturate result to +2047 or −2048.

Set output to zero (see B.8.6.2)

The first three functions are implemented on a 12 bit adder (pipelined over the second and third cycles). From it can be seen what each function requires, these are combined onto the single adder.

TABLE B.8.2

Post quantization adder functions

| Function | if datapath > 0 | if datapath > 0 |
|---|---|---|
| Convert to 2's complement | nothing | invert add one |
| Round all even numbers | subtract one | add one |
| Add 1024 | add 1024 | add 1024 |

Care should be taken when reprogramming these functions as they are very interdependent when combined.

The saturate values, zero and zero+1024 are muxed onto the datapath at the end of the third cycle.

B.8.7 Inverse Quantizer Tokens

The following notes define the behavior of the Inverse Quantizer for each Token to which it responds. In all cases the Tokens are also transported to the output of the Inverse Quantizer. In most cases the Token is unmodified by the Inverse Quantizer, exceptions are noted below. All unrecognized Tokens are passed unmodified to the output of the Inverse Quantizer.

B.8.7.1 SEQUENCE_START

This Token causes the registers iq_prediction mode[1:0] and iq_mpeg_indirection[1:0] to be reset to zero.

B.8.7.2 CODING_STANDARD

This Token causes iq_standard[1:0] to be loaded with the appropriate value.

B.8.7.3 PREDICTION_MODE

This Token loads iq-prediction_mode[1:0]. Although the PREDICTION_MODE Token carries more than two bits the Inverse Quantizer only needs access to the two lowest order bits. These determine whether or not the block is intra coded.

B.8.7.4 QUANT_SCALE

This Token loads iq_quant-scale[4:0].

B.8.7.5 DATA

This Token carries the actual quantized coefficients. The head of the token contains two bits identifying the color component and these are loaded into iq_component[1:0]. The next sixty four Token words contain the quantized coefficients. These are modified as a result of the inverse quantization process and are replaced by the reconstructed coefficients.

If there are not exactly sixty four extension words in the Token the behavior of the Inverse Quantizer is undefined.

The DATA Token at the input of the Inverse Quantizer carries quantized coefficients. These are represented in eleven bits in a sign-magnitude format (ten bits plus a sign bit). The value "minus zero" should not be used but is correctly interpreted as zero.

The DATA Token at the output of the Inverse Quantizer carries reconstructed coefficients. These are represented in twelve bits in a twos complement format (eleven bits plus a sign bit). The DATA Token at the output will have the same number of Token Extension words as it had at the input of the Inverse Quantizer.

B.8.7.6 QUANT_TABLE

This Token may be used to load a new quantization table or to read out an existing table. Typically in the Inverse Quantizer the Token will be used to load a new table which has been decoded from the bit stream. The action of reading out an existing table is useful in the forward quantizer of an encoder if that table is to be encoded into the bit stream.

The Token Head contains two bits identifying the table number that is to be used. These are placed in iq_component [1:0]. This register now contains a "table number" not a color component.

If the extension bit of the Token Head is one the Inverse Quantizer expects there to be exactly sixty four extension Token Words. Each one is interpreted as a quantization table value and placed in a successive location of the appropriate table, starting at location zero. The ninth bit of each extension Token word is ignored. The Token is also passed to the output of the Inverse Quantizer, unmodified, in the normal way.

If the extension bit of the Token Head is zero then the Inverse Quantizer will read out successive locations of the appropriate table starting at location zero. Each location becomes an extension Token word (the ninth bit will be zero). At the end of this operation the Token will contain exactly sixty four extension Token words.

The operation of the Inverse Quantizer in response to this token is undefined for all numbers of extension words except zero and sixty four.

B.8.7.7 JPEG_TABLE_SELECT

The token is used to load or unload translations of color components to table numbers to/from iq_ipeg_indirection. These translations are used in JPEG and XXX standards.

The Token Head contains two bits identifying the color component that is being dealt with. These are placed in iq_component[1:0].

If the extension bit of the Token Head is one the Token should contain one extension word, the lowest two bits of which are written into the iq_ipeg_indirection[2*iq_component[1:0]+1:2*iq_component[1:0]] location. The value just read becomes a Token extension word (the upper seven bits will be zero). At the end of this operation, the Token will contain exactly one Token extension word.

TABLE B.8.3

| JPEG_TABLE_SELECT action | |
|---|---|
| Colour component in header | bits of iq_ipeg_indirection accessed |
| 0 | [1:0] |
| 1 | [3:2] |
| 2 | [5:4] |
| 3 | [7:6] |

B.8.7.8 MPEG_TABLE_SELECT

This Token is used to define whether to use the default or user defined quantization tables while using the MPEG standard. The Token Head contains two bits. Bit zero of the header determines which bit if iq_mpeg_indirection is written into. Bit one is written into that location.

Since the iq_mpeg_indirection[1:0] register is cleared by the SEQUENCE_START Token it will usually only be necessary to use this Token if a user defined quantization table has been transmitted in the bit stream.

B.8.8 Microprocessor Registers
B.8.8.1 iq_access

To gain microprocessor access to any of the iq registers iq_access must be set to one and polled until it reads back one (see B.8.6.2). Failure to do this will mean the registers being read are still controlled by the datapath and therefore not stable. In the case of the iqram, the accesses are locked out, reading back zeros.

Writing zero to iq_access relinquishes control back to the datapath.

B.8.8.2 Iq_coding_standard[1:0]

This register holds the coding standard that is being implemented by the Inverse Quantizer.

TABLE B.8.4

| Coding standard values | |
|---|---|
| iq_coding_standard | Coding Standard |
| 0 | H.261 |
| 1 | JPEG |
| 2 | MPEG |
| 3 | XXX |

This register is loaded by the CODING_STANDARD Token.

Although this is a two bit register at present eight bits are allocated in the memory map and future implementations may deal with more than the above standards.

B.8.8.3 Iq_mpeg_indirection[1:0]

This two bit register is used during MPEG decoding operation to maintain a record of which quantization tables are to be used.

Iq_mpeg_indirection[0] controls the table that is used for intra coded blocks. If it is zero then quantization table 0 is used and is expected to contain the default quantization table. If it is one then quantization table 2 is used and is expected to contain the user defined quantization table for intra coded blocks.

Iq_mpeg_indirection[1] controls the table that is used for non-intra coded blocks. If it is zero then quantisation table 1 is used which is expected to contain the default quanitisation table. If it is one then quantisation table 3 is used which is expected to contain the user defined quantisation table for non-intra coded blocks.

This register is loaded by the MPEG_TABLE_SELECT Token and is reset to zero by the SEQUENCE_START Token.

B.8.8.4 Iq_ipeg_indirection[7:0]

This eight bit register determines which of the four quantization tables will be used for each of the four possible color components that occur in a JPEG scan.

Bits [1:0] hold the table number that will be used for component zero.

Bits [3:2] hold the table number that will be used for component one.

Bits [5:4] hold the table number that will be used for component two.

Bits [7:6] hold the table number that will be used for component three.

This register is affected by the JPEG_TABLE_SELECT Token.

B.8.8.5 iq_quant-scale[4.0]

This register holds the current value of the quantization scale factor. This register is loaded by the QUANT_SCALE Token.

B.8.8.6 iq_component[1:0]

This register usually holds a value which is translated into the Quantization Table Matrix (QTM) number. It is loaded by a number of Tokens.

The DATA Token header causes this register to be loaded with the color component of the block which is about to be processed. This information is only used in JPEG and JPEG variations to determine the QTM number, which it does with reference to iq_ipeg_indirection[7:0]. In other standards, iq_component[1:0] is ignored.

The JPEG_TABLE_SELECT Token causes this register be loaded with a color component. It is then used as an index into iq_ipeg_indirection[7:0] which is accessed by the token's body.

The QUANT_SCALE Token causes this register to be loaded with the QTM number. This table is then either loaded from the Token (if the extended form of the Token is used) or read out from the table to form a properly extended Token.

B.8.8.7 iq_prediction_mode[1:0]

This two bit register holds the prediction mode that will be used for subsequent blocks. The only use that the Inverse Quantizer makes of this information is to decide whether or not intra coding is being used. If both bits of the register are zero, then subsequent blocks are intra coded.

This register is loaded by the PREDICTION_MODE Token. This register is reset to zero by the SEQUENCE_START Token.

Iq_prediction_mode[1:0] has no effect on the operation in JPEG and JPEG variation modes.

B.8.8.8 Iq_jpeg_indirection[7:0]

Iq_jpeg_indirection is used as a lookup table to translate color components into the QTM number. iq_component is used as an index to iq_jpeg_indirection as shown in Table B.8.3.

This register location is written to directly by the JPEG_TABLE_SELECT Token if the extended form of the Token is used.

This register location is read directly by the JPEG_TABLE_SELECT Token if the non-extended form of the Token is used.

B.8.8.9 Iq_quant_table[3:0][63:0][7:0]

These are the four quantization tables, each with 64 locations. Each location is an eight bit value. The value zero should not be used in any location.

These registers are implemented as a RAM described in B.8.6.3, "Iqram".

These tables may be loaded using the QUANT_TABLE Token.

Data in these tables are stored in zig-zag scan order. Many documents represent quantization table values as a square eight by eight array of numbers. Usually the DC term is at the top left with increasing horizontal frequency running left to right and increasing vertical frequency running top to bottom. Such tables must be read along the zig-zag scan path as the numbers are placed into the quantization table with consecutive "i".

B.8.9 Microprocessor Register Map

TABLE B.8.5

Memory Map

| Register | Location | Direction | Reset State |
| --- | --- | --- | --- |
| iq_access | 0x30 | R/W | 0 |
| iq_coding_standard[1:0] | 0x31 | R/W | 0 |
| iq_quant_scale[4:0] | 0x32 | R/W | ? |
| iq_component[1:0] | 0x33 | R/W | ? |
| iq_prediction_mode[1:0] | 0x34 | R/W | 0 |
| iq_jpeg_indirection[7:0] | 0x35 | R/W | ? |
| iq_mpeg_indirection[1:0] | 0x36 | R/W | 0 |
| iq_qtm_keyhole_addr[7:0] | 0x38 | R/W | 0 |
| iq_qtm_keyhole[7:0] | 0x39 | R/W | ? |

B.8.10 Test

Test coverage to the Inverse Quantizer at the input is through the Inverse Modeler's output snooper, and at the output through the Inverse Quantizer's own snooper. Logic is covered by the Inverse Quantizer's own scan chain.

Access can be gained to iqram without reference to iq_access if the ramtest signal is asserted.

SECTION B.9 IDCT

B.9.1 Introduction

The purpose of this description of the Inverse Discrete Cosine Transform (IDCT) block is to provide a source of engineering information for the IDCT. It includes information on the following.

purpose and main features of the IDCT
how it was designed and verified
structure It is intended that the description should provide enough information to facilitate or aid the following tasks.

appreciation of the IDCT as a "silicon macro function"
integration of the IDCT onto another device
development of test programs for the IDCT silicon
modification, re-design or maintenance of the IDCT
development of a forward DCT block B.9.2 Overview A Discrete Cosine Transform/Zig-Zag (DCT/ZZ) performs a transformation on blocks of pixels wherein each block represents an area of the screen 8 pixels high by 8 pixels wide. The purpose of the transform is to represent the pixel block in a frequency domain, sorted according to frequency. Since the eye is sensitive to DC components in a picture, but much less sensitive to high frequency components, the frequency data allows each component to be reduced in magnitude separately, according to the eye's sensitivity. The process of magnitude reduction is known as quantization. The quantization process reduces the information contained in the picture, that is, the quantization process is lossy. Lossy processes give overall data compression. The frequency data is sorted so that high frequencies, most likely to be quantized to zero, all appear consecutively. The consecutive zeros mean that coding the quantized data by using run-length coding schemes yields further data compression, although run-length coding is generally not a lossy process.

The IDCT block (which actually includes an Inverse Zig-Zag RAM, or IZZ, and an IDCT) takes frequency data which is sorted and transformed into spatial data. This inverse sorting process is the function of IZZ.

The picture decompression system, of which the IDCT block forms a part, specifies the pixels as integers. This means that the IDCT block must take, and yield, integer values. However, since the IDCT function is not integer based, the internal number representation uses fractional parts to maintain internal accuracy. Full floating-point arithmetic is preferable, but the implementation described here uses fixed-point arithmetic. There is some loss of accuracy using fixed-point arithmetic, but the accuracy of this implementation exceeds the accuracy specified by H.261 and the IEEE.

B.9.3 Design Objectives

The main design objective was to design a functionally correct IDCT block which uses a minimum silicon area. The design was also required to run with a clock speed of 30 MHz under the specified operating conditions but it was considered that the design should also be adaptable for the future. Higher clock rates will be needed in the future, and the architecture of the design allows for this wherever possible.

B.9.4 IDCT Interfaces Description

The IDCT block has the following interfaces.

- a 12-bit wide Token data input port
- a 9-bit wide Token data output port
- a microprocessor interface port
- a system services input port
- a test interface
- resynchronizing signals Both the Token data ports are the standard Two-Wire Interface type. The widths illustrated refer to the number of bits in the data representation, not the total number of wires in a port. Associated with the input Token data port are the clock and reset signals used for resynchronization to the output of the previous block. There are also two resynchronizing clocks associated with the output Token data port and used by the subsequent block.

The microprocessor interface is standard and uses four bits of addresses. There are also three externally decoded select inputs which are used to select the address spaces for events, internal registers and test registers. This mechanism provides the flexibility to map the IDCT address space into different positions in different chips. There is also a single event output idctevent and two i/o signals n__derrd and n__serrd which are the event tristate data wires to be connected externally to the IDCT and to the appropriate bits of the microprocessor notdata bus.

The system services port consists of the standard clock and reset input signals as well as the 2-phase override clocks and associated clock override mode select input.

The test interface consists of the JTAG clock and reset signals, the scan-path data and control signals and the ramtest and chiptest inputs.

In normal operation the microprocessor port is inactive since the IDCT does not require any microprocessor access to achieve the specified function. Similarly the test interface is only active when testing or verification is required.

B.9.5 The Mathematical Basis for the Discrete Cosine Transformation

In video bandwidth compression, the input data represents a square area of the picture. The transform applied must therefore be two-dimensional. Two-dimensional transforms are difficult to compute efficiently, but the two-dimensional DCT has the property of being separable. Separable transforms can be computed along each dimension independent of the other dimensions. This implementation uses a one-dimensional IDCT algorithm designed specifically for mapping onto hardware; the algorithm is not appropriate for software models. The one-dimensional algorithm is applied successively to obtain a two-dimensional result.

The mathematical definition of the two-dimensional DCT for an N by N block of pixels is as follows:

EQ 10 forward DCT $$Y(j,k) = \frac{2}{N} c(j)c(k) \sum_{m=0}^{N-1} \sum_{n=0}^{N-1} X(m,n) \cos\left[\frac{(2m+1)j\pi}{2N}\right] \cos\left[\frac{(2n+1)k\pi}{2N}\right]$$

EQ 11 inverse DCT $$X(m,n) = \frac{2}{N} \sum_{j=0}^{N-1} \sum_{k=0}^{N-1} c(j)c(k) Y(j,k) \cos\left[\frac{(2m+1)j\pi}{2N}\right] \cos\left[\frac{(2n+1)k\pi}{2N}\right]$$

Where $j, k = 0.1, \ldots, N-1$ $$c(j)c(k) = \begin{cases} \frac{1}{\sqrt{2}} & j,k = 0 \\ 1 & \text{otherwise} \end{cases}$$

The above definition is mathematically equivalent to multiplying two N by N matrices, twice in succession, with a matrix transposition between the multiplications. A one-dimensional DCT is mathematically equivalent to multiplying two N by N matrices. Mathematically the two-dimensional case is:

$$y = [X C]^T C$$

Where C is the matrix of cosine terms.

Thus the DCT is sometimes described in terms of matrix manipulation. Matrix descriptions can be convenient for mathematical reductions of the transform, but it must be stressed that this only makes notation easier. The 2/N term governs the DC level. The constants c(j) and c(k) are known as the normalization factors.

B.9.6 The IDCT Transform Algorithm

The algorithm used is optimized for an efficient hardware architecture and implementation. The main features of the algorithm are the use of √2 scaling in order to remove one multiplication and a transformation of the algorithm designed to yield a greater symmetry between the upper and lower sections. This symmetry results in an efficient re-use of many of the most costly arithmetic elements.

Figure 52:
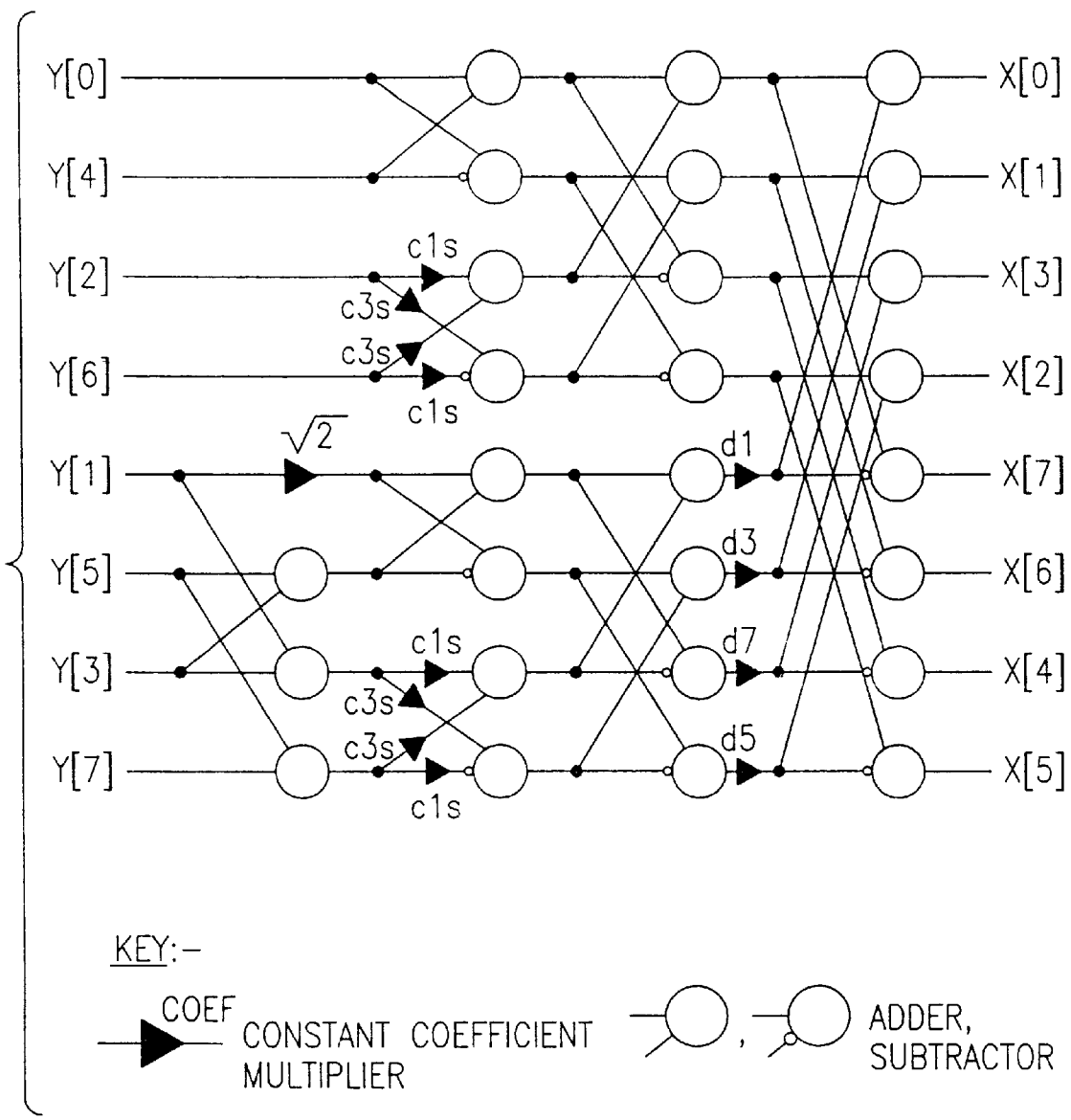
FIG. 52 illustrates an IDCT one dimensional transform algorithm.

In the diagram illustrating the algorithm (FIG. 52), the symmetry between the upper and lower halves is evident in the middle section. The final column of adders and subtractors also has a symmetry, the adders and subtractors can be combined with relatively little cost (4 adder/subtractors being significantly smaller than 4 adders+4 subtractors as illustrated).

All the outputs of a single dimensional transform are scaled by 29 2. This means that the final 2-dimensional answer will be scaled by 2. This can then be easily corrected in the final saturation and rounding stage by shifting.

The algorithm shown was coded in double precision floating-point C and the results of this compared with a reference IDCT (using straightforward matrix multiplication). A further stage was then used to code a bit-accurate integer version of the algorithm in C (no timing information was included) which could be used to verify the performance and accuracy of the algorithm as it would be implemented on silicon. The allowable inaccuracies of the transform are specified in the H.261 standard and this method was used to exercise the bit-accurate model and measure the delivered accuracy.

Figure 53:
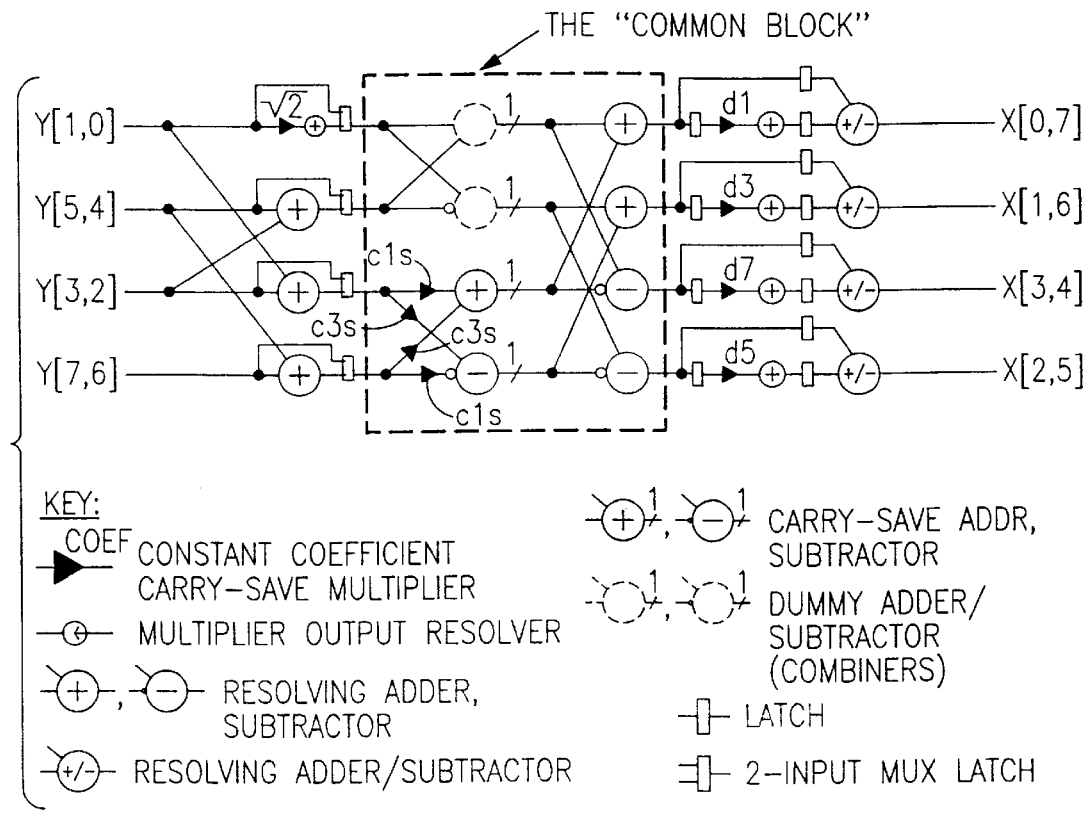
FIG. 53 is another diagram illustrating an IDCT one dimensional transform algorithm.

FIG. 53 shows the overall IDCT Architecture in a way that illustrates the commonality between the upper and lower sections and which also shows the points at which intermediate results need to be stored. The circuit is time multiplexed to allow the upper and lower sections to be calculated separately.

B.9.7 The IDCT Transform Architecture

As described previously, the IDCT algorithm is optimized for an efficient architecture. The key features of the resulting architecture are as follows:

- significant re-use of the costly arithmetic operations
- small number of multipliers, all being constant coefficient rather than general purpose (reduces multiplier size and removes need for separate coefficient store)
- small number of latches, no more than required for pipelining the architecture
- operations are arranged so that only a single resolving operation is required per pipeline stage
- can arrange to generate results in natural order
- no complex crossbar switching or significant multiplexing (both costly in a final implementation)
- advantage is taken of resolved results in order to remove two carry-save operations (one addition, one subtraction)
- architecture allows each stage to take 4 clock cycles, i.e., removes the requirement for very fast (large) arithmetic operations
- architecture will support much faster operation than current 30 MHz pixel-clock operation by simply changing resolving operations from small/slow ripple carry to larger/faster carry-lookahead versions. The resolving operations require the largest proportion of the time required in each stage so speeding up only these operations has a significant effect on the overall operations speed, whilst having only a relatively small increase on the overall size of the transform. Further increases in speed can also be achieved by increasing the depth of pipelining.
- control of the transform data-flow is very straightforward and efficient The diagram of the 1D Transform Micro-Architecture (FIG. 54) illustrates how the algorithm is mapped onto a small set of hardware resources and then pipelined to allow the necessary performance constraints to be met. The control of this architecture is achieved by matching a "control shift-register" to the data-flow pipeline. This control is straightforward to design and is efficient in silicon layout.

Figure 54:
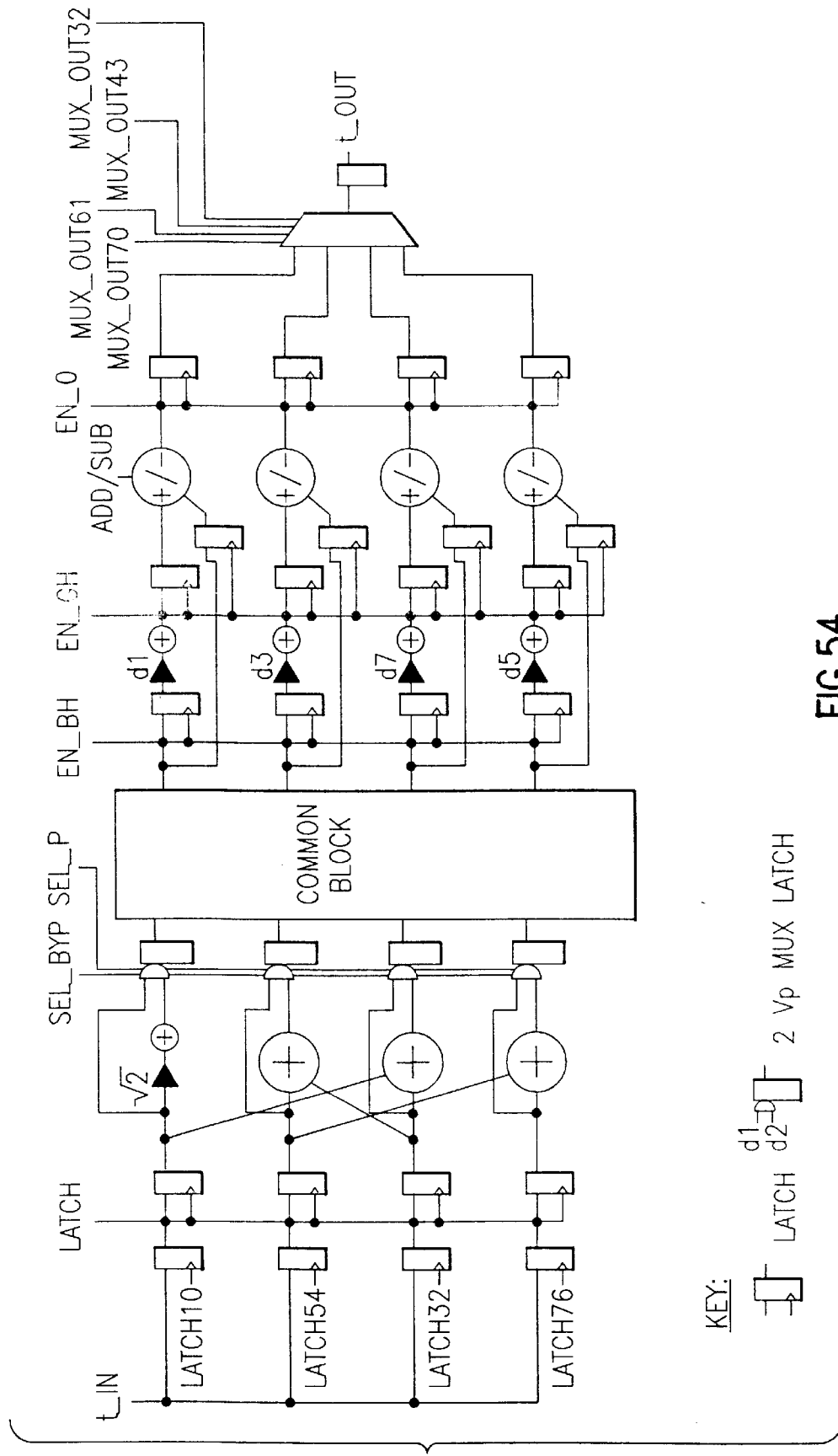
FIG. 54 is a diagram illustrating the micro-architecture of a one dimensional transform.

The named control signals on FIG. 54 (latch, sel_byp etc.) are the various enable signals used to control the latches and thus the signal flow. The clock signals to the latches are not shown.

Several implementation details are significant in terms of allowing the transform architecture to meet the required accuracy standards whilst minimizing the transform size. The techniques used generally fall into two major classes.

- Retention of maximum dynamic range, with a fixed word width, at each intermediate state by individual control of the fixed-point position.
- Making use of statistical definition of the accuracy requirement in order to achieve accuracy by selective manipulation of arithmetic operations (rather than increasing accuracy by simply increasing the word width of the entire transform).

The straightforward way to design a transform would involve a simple fixed-point implementation with a fixed word-width made large enough to achieve accuracy. Unfortunately this approach results in much larger word widths and therefore a larger transform. The approach used here allows the fixed point position to vary throughout the transform in a manner that makes the maximum use of the available dynamic range for any particular intermediate value, achieving the maximum possible accuracy. Because the allowable results are specified statistically, selective adjustments can be made to any intermediate value truncation operation in order to improve overall accuracy. The adjustments chosen are simple manipulations of LSB calculations, which have little or no cost. The alternative to this technique is to increase the word width, involving significant cost. The adjustments effectively "weigh" final results in a given direction if it is found that previously these results tend in the opposite direction. By adjusting the fractional parts of results we are effectively shifting the overall average of these results.

B.9.8 IDCT Block Diagram Description

Figure 55:
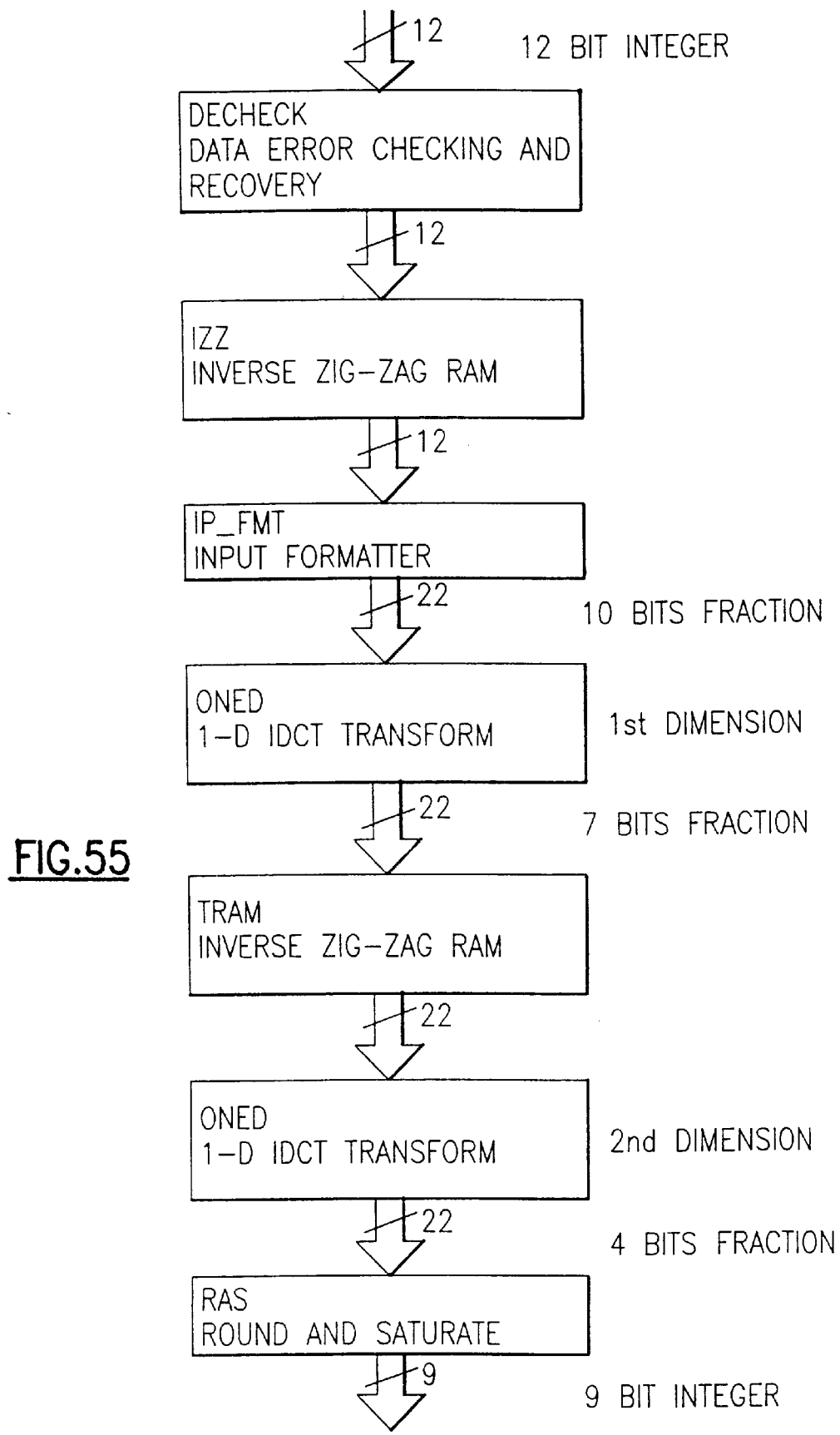
FIG. 55 is a block diagram of a token stream.

The block diagram of the IDCT shows all the blocks that are relevant to the processing of the Token Stream. This diagram, FIG. 55, does not show details of clocking, test and microprocessor access and the event mechanism. Snooper blocks, used to provide test access, are not shown in the diagram.

B.9.8.1 DATA Error Checker

The first block is the DATA error checker and corrector, called "decheck" and it takes and produces a 12-bit wide Token Stream, parses this stream and checks the DATA Tokens. All other Tokens are ignored and are passed straight through. The checks that are performed are for DATA Tokens with a number of extensions not equal to 64. The possible errors are termed "deficient" (<64 extensions) an idct_too_few_event, and "supernumerary" (>64 extensions), an idct_too_many_event. Such errors are signalled with the standard event mechanism but the block also attempts simple error recovery by manipulation of the Token Stream. In the case of deficient errors, the DATA Token is packed with "0" value extensions (stops accepting input and performs insert) to make up the correct 64 extensions. In the case of a supernumerary error the extension bit is forced to "0" for the 64th extension and all extra extensions are removed from the Token Stream.

B.9.8.2 Inverse Zig-Zag

The next block is the inverse zig-zag RAM, "izz", and again it takes and produces a 12-bit wide Token Stream. As with all other blocks the stream is parsed but only DATA Tokens are recognized. All other Tokens are passed through unchanged. Any DATA Token is also passed through but the order of the extensions is changed. This block relies on correct DATA Tokens (i.e., 64 extensions only), if this is not true then operation is unspecified. The reordering is done according to the standard inverse Zig-Zag pattern and, by default is done so as to provide horizontally scanned data at the IDCT output. It is also possible to change the ordering to provide vertically scanned output. In addition to the standard IZZ ordering this block performs an extra re-ordering of each 8-word row. This is done because of the specific requirements of the IDCT one-dimensional transform block and results in rows being output in the order (1,3,5,7,0,2,4,6) rather than (0,1,2,3,4,5,6,7).

B.9.8.3 Input Formatter

The next block is the input formatter, "ip_fmt", which formats DATA input for the first dimension of the IDCT transform. This block has a 12-bit wide Token Stream input and 22-bit wide token Stream output. DATA Tokens are shifted left so as to move the integer part to the correct significance in the IDCT transform standard 22-bit wide word, the fractional part being set to 0. This means that there are 10 bits of fraction at this point. All other Tokens are unshifted and the extra unused bits are simply set to 0.

B.9.8.4 1-Dimensional Transform—1st Dimension

The next block shown is the first single dimension IDCT transform block, "oned". This inputs and outputs 22-bit wide token Streams and as usual the stream is parsed and DATA Tokens are recognized, all other tokens being passed through unaltered. The DATA Tokens pass through a pipelined datapath that performs an implementation of a single dimension of an 8-by-8 Inverse Discrete Cosine Transform. At the output of the first dimension there are 7 bits of fraction in the data word. All other Tokens run through a simple shift register datapath that simply matches the DATA transform latency and are recombined into the Token Stream before output.

B.9.8.5 Transpose RAM

The transpose RAM, "tram", is similar in many ways to the inverse zig-zag RAM in the way it handles a Token Stream. The width of Tokens handled (22 bits) and the re-ordering performed are different but otherwise they work in the same way and actually share much of their control logic. Again, rows are additionally re-ordered for the requirements of the following IDCT dimension as well as the fundamental swapping of columns into rows.

B.9.8.6 1-Dimensional Transform—2nd Dimension

The next block shown is another instance of a single dimension IDCT transform and is identical in every way to the first dimension. At the output of this dimension there are 4 bits of fraction.

B.9.8.7 Round and Saturate

The round-and-saturate block, "ras", takes a 22-bit wide Token Stream containing DATA extensions in 22-bit fixed point format and outputs a 9-bit wide Token Stream where DATA extensions have been rounded (towards+ve infinity) into integers and saturated into 9-bit two's complement representation and all other Tokens have been passed straight through.

B.9.9 Hardware Descriptions of Blocks

B.9.9.1 Standard Block Structure

Figure 56:
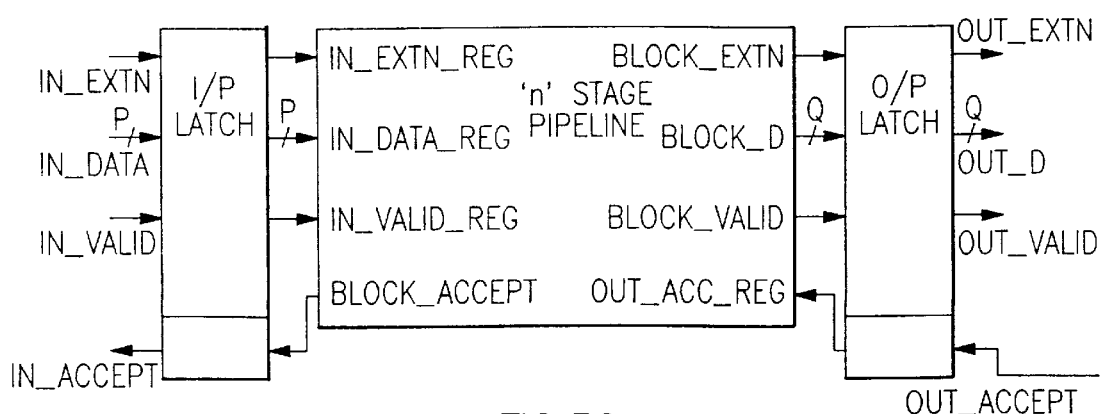
FIG. 56 is a block diagram of a standard block structure.

For all the blocks that handle a Token Stream there is a standard notional structure as shown in FIG. 56. This separates the two-wire interface latches from the section that performs manipulation of the Token Stream. Variations on this structure can include extra internal blocks (such as a RAM core). In some blocks the structure is made less obvious in the schematic (although it does actually still exist) because of the requirement of grouping together all the "datapath" logic and separate this from all the standard cell logic. In the case of a very simple block, such as "ras", it is possible to take the latched out_accept straight into the input two-wire latch without logical manipulation.

B.9.9.2 "Decheck"—DATA Error Checking/Recovery

The first block in the Token Stream performs DATA checking and correcting as specified in the Block Diagram Overview section. The detected errors are handled with the standard event mechanism which means that events can be masked and the block can either continue with the recovery procedure when an error is detected or be stopped depending on event mask status. The IDCT should never see incorrect DATA Tokens and the recovery that it attempted is only a fairly simple attempt to contain what may be a serious problem.

This block has a pipeline depth of two stages and is implemented entirely in zcells. The input two-wire interface latch is of the "front" type, meaning that all inputs arrive onto transistor gates to allow safe operation when this block (at the front of the IDCT) is on a separate power supply regime from the one preceding it. This block works by parsing a Token Stream and passing non-DATA Tokens straight through. When a DATA Token is found, a count is started of the number of extensions found after the header. If the extension bit is found to be "0" when the count does not equal 63 then an error signal is generated (which goes to the event logic) and depending on the state of the mask bit for that event then "decheck" will either be stopped (i.e., no longer accept input or generate output) or will begin error recovery. The recovery mechanism for "deficient" errors is to use the counter to control the insertion of the correct number of extensions into the Token Stream (the value inserted is always "0"). Obviously input is not accepted whilst this insertion proceeds. When it is found that the extension bit is not "0" on the 64th extension then a "supernumerary" error is generated, the DATA Token is completed by forcing the extension bit to "0", and all succeeding words with the extension bit set to "1" are deleted from the Token Stream by continuing to accept data but invalidating the output.

The two error signals are not persistent (unless the block is stopped) i.e., the error signal only remains active from the point when an error is detected until recovery is complete. This is a minimum of one complete cycle and can persist forever in the case of an infinitely supernumerary DATA Token.

B.9.9.3 "Izz" and "tram"—Reordering RAMs

The "izz" (inverse zig-zag RAM) and the "tram" (transpose RAM) are considered here together since they both perform a variation on the same function and they have more similarities than differences. Both these blocks take a Token Stream and re-order the extensions of a DATA Token whilst passing through all other Tokens unchanged. The widths of the extensions handled and the sequences of the re-ordering are different but a large section of the control logic for each RAM is identical and is actually organized into a "common control" block which is instanced in the schematic for each RAM. The difference in width has no effect upon this control section so it is only necessary to use a different "sequence address generator" for each RAM together with RAM cores and two-wire interface blocks of the appropriate width.

The overall behavior of each RAM is essentially that of a FIFO. This is strictly true at the Token level and a particular modification to the output order is made for the extension words of a DATA Token. The depth of the FIFO is 128 stages. This is necessary to fulfill the requirement for a sustainable 30 MHz throughout the system since output of the FIFO is held up after the start of the output of a DATA Token is detected. This is because the features of the reordering sequences used require that a complete block of 64 extensions be gathered in the FIFO before re-ordered output can begin. More precisely the minimum number required is different for inverse zig-zag and transpose sequences and is somewhat less than 64 in both cases. However, the complications of controlling a FIFO which has a length which is not a power of two mean that the small saving in RAM core would be outweighed by the additional complexity of control logic required.

The RAM core is implemented with a design which allows a read and a write (to the same or separate addresses) in a single 30 MHz cycle. This means that the RAM is effectively operating with an internal 60 MHz cycle time.

The re-ordering operation is performed by generating a particular sequence of read addresses ("sequence address generation") in the range $0 \geq 63$, but not in natural order. The sequences required are specified by the standard zig-zag sequence (for either horizontal or vertical scanning) or by the sequence needed for normal matrix transposition. These standard sequences are then further reordered by the requirement to output each row in Odd/Even format (i.e., 1,3,5,7, 0,2,4,6) rather than (0,1,2,3,4,5,6,7)) because of the requirements of the IDCT transform 1-dimensional blocks.

Transpose address sequence generation is quite straightforward algorithmically. Straight transpose sequence generation simply requires the generation of row and column addresses separately, both implemented with counters. The row re-ordering requirement simply means that row addresses are generated with a simple specific state machine rather than a natural counter.

Inverse zig-zag sequences are rather less straightforward to generate algorithmically. Because of this a small ROM is used to hold the entire 64 6 bit values of address, this being addressed with row and column counters which can be swapped in order to change between horizontal and vertical scan modes. A ROM based generator is very quick to design and it further has the advantage that it is trivial to implement a forward zig-zag (ROM re-program) or to add other alternative sequences in the future.

B.9.9.4 "Oned"—Single Dimension IDCT Transform

This block has a pipeline depth of 20 stages and the pipeline is rigid when stalled. This rigidity greatly simplifies the design and should not unduly affect overall dynamics since the pipeline depth is not that great and both dimensions come after a RAM which provides a certain amount of buffering anyway.

The block follows the standard structure but has separate paths internally for DATA Token extensions (which are to be processed) and all other items which should be passed through unchanged. The schematic is drawn in a particular way, first because of the requirements to group together all the datapath logic, and secondly to allow automatic compiled code generation (this explains the control logic at the top level).

Tokens are parsed as normal and then DATA extensions, and other values, are routed respectively through two different parallel paths before being re-combined with a multiplexer before the output two-wire interface latch block. The parallel paths are required because it is not possible to pass values unchanged through the transform datapath. The latency of the transform datapath is matched with a simple shift register to handle the remainder of the Token Stream.

The control section of "oned" needs to parse the Token Stream and control the splitting and re-combination of the Tokens. The other major section controls the transform datapath. The main mechanism for the control of this datapath is a control shift-register which matches the datapath pipeline and is tapped-off to provide the necessary control signals for each stage of the datapath pipeline.

The "oned" block has the requirement that it can only start operation on complete rows of DATA extensions, i.e., groups of 8. It is not able to handle invalid data ("Gaps") in the middle of rows although, in fact, the operation of "izz" and the "tram" ensure that complete DATA blocks are output as an uninterrupted sequence of 64 valid extension values.

B.9.9.4.1 Transform Datapath

The micro-architecture of the transform datapath, "t_dp" was previously shown in FIG. 54. Some detail (e.g., clocking, shifts, etc.) is not shown. This diagram does illustrate how the datapath operates on four values simultaneously at any stage in the pipeline. The basic sub-Structure of the datapath (the three main sections can also be seen, pre-common, common and post-common) as can the arithmetic and latch resources required. The named control signals are the enables for the pipeline latches (and the add/sub selector) which are sequenced with decodes of the control shift-register state. Each pipeline stage is actually four clock cycles in length.

Within the transform datapath there are a number of latch stages which are required to gather input, store intermediate results in the pipeline, and serialize the output. Some of latches are of the muxing type, i.e., they can be conditionally loaded from more than one source. All the latches are of the enabled type i.e., there are separate clock and enable inputs. This means that it is easy to generate enable signals with the correct timing, rather than having to consider issues of skew that would arise if a generated clock scheme was adopted.

The main arithmetic elements required are as follows.

a number of fixed coefficient multipliers(carry-save output)

carry-save adders carry-save subtractors resolving adders resolving adder/subtractors All arithmetic is performed in two's complement representation. This can either be in normal (resolved) form or in carry-save form (i.e. two numbers whose sum represents the actual value). All numbers are resolved before storage and only one resolving operation is performed per pipeline stage since this is the most expensive operation in terms of time. The resolving operations performed here all use simple ripple-carry. This means that the resolvers are quite small but relatively slow. Since the resolutions dominate the total time in each stage there is obviously an opportunity to speed up the entire transform by employing fast resolving arithmetic units.

B.9.9.5 "Ras"—Rounding and Saturation

The "ras" block has the task of taking 22-bit fixed point numbers from the output of the second dimension "oned" and turning these into the correctly rounded and saturated 9-bit signed integer results required. This block also performs the necessary divide-by-4 inherent in the scheme (the 2/N term) and a further divide-by-2 required to compensate for the √2 pre-scaling performed in each of the two dimensions. This division by 8 implies that the fixed point position is interpreted as being three bits further left than anticipated i.e., treat the result as having 15 bits of integer representation and 7 bits of fraction (rather than 4 bits of fraction). The rounding mode implemented is "round to positive infinity" i.e., add one for fractions of exactly 0.5. This is mainly done because it is the simplest rounding mode to implement. After rounding (a conditional increment of the integer part) is complete, this result is inspected to see whether the 9-bit signed result requires saturation to the maximum or minimum value in this range. This is done by inspection of the increment carry out together with the upper bits of the original integer value.

As usual the Token Stream is parsed and the round and saturation operation is only applied to DATA Token extension values. The block has a pipeline depth of two stages and is implemented entirely in zcells.

B.9.9.6 "Idctsels"—IDCT Register Select Decoder

This block is a simple decoder which decodes the 4 microprocessor interface address lines, and the "sel_test" input, into select lines for individual blocks test access (snoopers and RAMs). The block consists only of zcells combinatorial logic. The selects decoded are shown in Table B.9.2.

TABLE B.9.1

IDCT Test Address Space

| Addr. (hex) | Bit num. | Register Name |
|---|---|---|
| 0x0 | 7..1 | not used |
|  | 0 | TRAM keyhole address |
| 0x1 | 7..0 |  |
| 0x2 | 7..0 | TRAM keyhole data |
| 0x3 | 7..0 | TRAM keyhole data[a] |
| 0x4 | 7..0 | IZZ keyhole address |
| 0x5 | 7..0 | IZZ keyhole data |
| 0x6 | 7..3 | not used |
|  | 2 | ipfsnoop test select |
|  | 1 | ipfsnoop valid |
|  | 0 | ipfsnoop accept |
| 0x7 | 7..6 | not used |
|  | 5..0 | ipfsnoop bits[21:16] |
| 0x8 | 7..0 | ipfsnoop bits[15:8] |
| 0x9 | 7..0 | ipfsnoop bits[7:0] |
| 0xA | 7..3 | not used |
|  | 2 | d2snoop test select |
|  | 1 | d2snoop valid |
|  | 0 | d2snoop accept |
| 0xB | 7..6 | not used |
|  | 5..0 | d2snoop bits[21:16] |
| 0xC | 7..0 | d2snoop bits[15:6] |
| 0xD | 7..0 | d2snoop bits[7:0] |
| 0xE | 7 | outsnoop test select |
|  | 6 | outsnoop valid |
|  | 5 | outsnoop accept |
|  | 4..2 | not used |
| 0xE | 1..0 | outsnoop data[9:8] |
| 0xF | 7..0 | outsnoop data[7:0] |

[a]Repeated address a. Repeated address

B.9.9.7 "Idctregs"—IDCT Control Register and Events

This block contains instances of the standard event logic blocks to handle the DATA deficient and supernumerary errors and also a single memory mapped bit "vscan" which can be used to make the "izz" re-ordering change such that the IDCT output is vertically scanned. This bit is reset to the value "0" i.e., the default mode is horizontally scanned output. The two possible events are OR-ed together to form an idctevent signal which can be used as an interrupt. See Section B.9.10 for the addresses and bit positions of registers and events.

B.9.9.8 Clock Generators

Two "standard" type ("clkgen") clock generators are used in the IDCT. This is done so that there can be two separate scan-paths. The clock generators are called "idctcga" and "idctcgb". Functionally, the only difference is that "idctcgb" does not need to generate the "notrst1" signal. The amounts of buffering for each of the clock and reset outputs in the two clock generators are individually tailored to the actual loads driven by each clock or reset. The loads that are matched were actually measured from the gate and track capacitances of the final layout.

When the IDCT top-level Block Place and Route (BPR) was performed, advantage was taken of the capabilities of the interactive global routing feature to increase the widths of tracks of the first sections of the clock distribution trees for the more heavily loaded clocks (ph0_b and ph1_b) since these tracks will carry significant currents.

B.9.9.9 JTAG Control Blocks

Since the IDCT has two separate scan-chains, and two clock generators, there are two instances of the standard JTAG control block, "jspctle". These interface between the test port and the two scan-paths.

B.9.10 Event and Control Registers

The IDCT can generate two events and has a single bit of control. The two events are idct_too_few_event and idct_too_many_event which can be generated by the "decheck" block at the front of the IDCT if incorrect DATA Tokens are detected. The single control bit is "vscan" which is set if it is required to operate the IDCT with the output vertically scanned. This bit thus controls the "izz" block. All the event logic and the memory mapped control bit are located in the block "idctregs".

From the point of view of the IDCT, these registers are located in the following locations. The tristate i/o wires n_derrd and n-serrd are used to read and write to these locations as appropriate.

TABLE B.9.2

IDCT Control Register Address Space

| Addr. (hex) | Bit num. | Register Name |
|---|---|---|
| 0x0 | 7..1 | not used |
|  | 0 | vscan |

TABLE B.9.3

IDCT Event Address Space

| Addr. (hex) | Bit name | Register Name |
|---|---|---|
| 0x0 | n_derrd | idct_too_few_event |
|  | n_serrd | idct_too_many_event |
| 0x1 | n_derrd | idct_too_few_mask |
|  | n_serrd | idct_too_many_mask |

B.9.11 Implementation Issues
B.9.11.1 Logic Design Approach

In the design of all the IDCT blocks there was an attempt to use a unified and simple logic design strategy which would mean that it was possible to do a "safe" design in a quick and straightforward manner. For the majority of control logic a simple scheme of using master-slaves only was adopted. Asynchronous set/reset inputs were only connected to the correct system resets. Although it might often be possible to come up with clever non-standard circuit configurations to perform the same functions more efficiently, this scheme possesses the following advantages.

- conceptually simple
- easy to design
- speed of operation is fairly obvious (cf. latch≧logic≧latch≧logic style design) and amenable to automatic analysis
- glitches not a problem (cf. SR latches)
- using only system reset for initialization allows scan paths to work correctly
- allows automatic compiled C-code generation There are a number of places where transparent d-type latches were used and these are listed below.

B.9.11.1.1 two-wire interface latches

The standard block structure uses latches for the input and output two-wire interfaces. No logic exists between an output two-wire latch and the following input two-wire latch.

B.9.11.1.2 ROM interface

Because of the timing requirements of the ROM circuit, latches are used in the IZZ sequence generator at the output of the ROM.

B.9.11.1.3 Transform Datapath and Control Shift-Register

It would be possible to implement every pipeline storage stage as a full master-slave device, but because of the amount of storage required there is a significant savings to be had by using latches. This scheme has the following disadvantages.

- control shift-register must now produce control signals of both phases for use as enables (i.e., need to use latches in this shift-register)
- timing analysis complicated by use of latches
- the "t_postc" will no longer automatically produce compiled code since one latch outputs to another latch of the same phase (because of the timing of the enables this is not a problem for the circuit)

Nonetheless, the area saved by the use of latches makes it worthwhile to accept these factors in the present invention.

B.9.11.1.4 Microprocessor interfaces

Due to the nature of this interface there is a requirement for latches (and resynchronizers) in the Event and register block "idctregs" and in the keyhole logic for RAM cores.

B.9.11.1.5 JTAG Test Control

These standard blocks make use of latches.

B.9.11.2 Circuit Design Issues

Apart from the work done in the design of the library cells that were used in the IDCT design (standard cells, datapath library, RAMs, ROMs, etc.) there is no requirement for any transistor level circuit design in the IDCT. Circuit simulations (using Hspice) were performed of some of the known critical paths in the transform datapath and Hspice was also used to verify the results of the Critical Path Analysis (CPA) tool in the case of paths that were close to the allowed maximum length.

The IDCT is fully static in normal operation (i.e., we can stop the system clocks indefinitely) but there are dynamic nodes in scanable latches which will decay when test clocks are stopped (or very slow). Due to the non-restored nature of some nodes which exhibit a Vt drop (e.g., mux outputs) the IDCT will not be "micro-power" when static.

B.9.11.3 Layout Approach

The overall approach to the layout implementation of the present invention was to use BPR (some manual intervention) to lay out a complete IDCT which consisted of many zcells and a small number of macro blocks. These macro blocks were either hand-edited layout (e.g., RAMs, ROM, clock generators, datapaths) or, in the case of the "oned" block had been built using BPR themselves from further zcells and datapaths.

Datapaths were constructed from kdplib cells. Additionally, locally defined layout variations of kdplib cells were defined and used where this was perceived as providing a worthwhile size benefit. The datapath used in each of the "oned" blocks, "oned_d", is by far the largest single element in the design and considerable effort was put into optimizing the size (height) of this datapath.

The organization of the transform datapath, "t_dp", is rather crucial since the precise ordering of the elements within the datapath will affect the way the interconnect is handled. It is important to minimize the number of "overs" (vertical wires not connecting to a sub-block) which occur at the most congested point since there is a maximum allowed value (ideally 8, 10 is also possible, although highly inconvenient). The datapath is split logically into three major sub-sections and this is the way that the datapath layout was performed. In each subsection there are really four parallel data flows (which are combined at various points) and there are therefore many ways of organizing the flows of data (and thus the positions of all the elements) within each subsection. The ordering of the blocks within each subsection, and also the allocation of logical buses to physical bus pitches was worked out carefully before layout commenced in order to make it possible to achieve a layout that could be connected up correctly.

B.9.12 Verification

The verification of the IDCT was done at a number of levels, from top-level verification of the algorithms to final layout checks.

The initial work on the transform architecture was done in C, both full-precision and bit-accurate integer models were developed. Various tests were performed on the bit-accurate model in order to prove the conformance to the H.261 accuracy specification and to measure the dynamic ranges of the calculations within the transform architecture.

The design progressed in many cases by writing an M behavioral description of sub-blocks (for example, the control of datapaths and RAMs). Such descriptions were simulated in Lsim before moving on to the design of the schematic description of that block. In some cases (e.g., RAMs, clock generators) the behavioral descriptions were still used for top-level simulations.

The strategy for performing logic simulation was to simulate the schematics for everything that would simulate adequately at that level. The low-level library cells (i.e., zcells and kdplib) were mainly simulated using their behavioral descriptions since this results in far smaller and quicker simulations. Additionally, the behavioral library cells provide timing check features which can highlight some circuit configuration problems. As a confidence check, some simulations were performed using the transistor descriptions of the library cells. All the logic simulations were in the zero-delay manner and therefore were intended to verify functional performance. The verification of the real timing behavior is done with other techniques.

Lsim switch-level simulations (with RC_Timing mode being used) were done as a partial verification of timing performance, but also provide checks for some other potential transistor level problems (e.g., glitch sensitive circuits).

The main verification technique for checking timing problems was the use of the CPA tool, the "path" option for "datechk". This was used to identify the longer signal paths (some were already known) and Hspice was used to verify the CPA analysis in some critical cases.

Most Lsim simulations were performed with the standard source≧block≧sink methodology since the bulk of the IDCT behavior is exercised by the flow of Tokens through the device. Additional simulations are also necessary to test the features accessed through the microprocessor interface (configuration, event and test logic) and those test features accessed via JTAG/scan.

Compiled-code simulations were done for the entire IDCT, again using the standard source≧bloc≧sink method and many of the same Token Streams that were used in the Lsim verification.

The document "cedric/idctlsim/testlist.doc" contains descriptions of all the simulations that were done as a "sign-off" verification.

B.9.13 Testing and Test Support

This section deals with the mechanisms which are provided for testing and an analysis of how each of the blocks might be tested.

Figure 57:
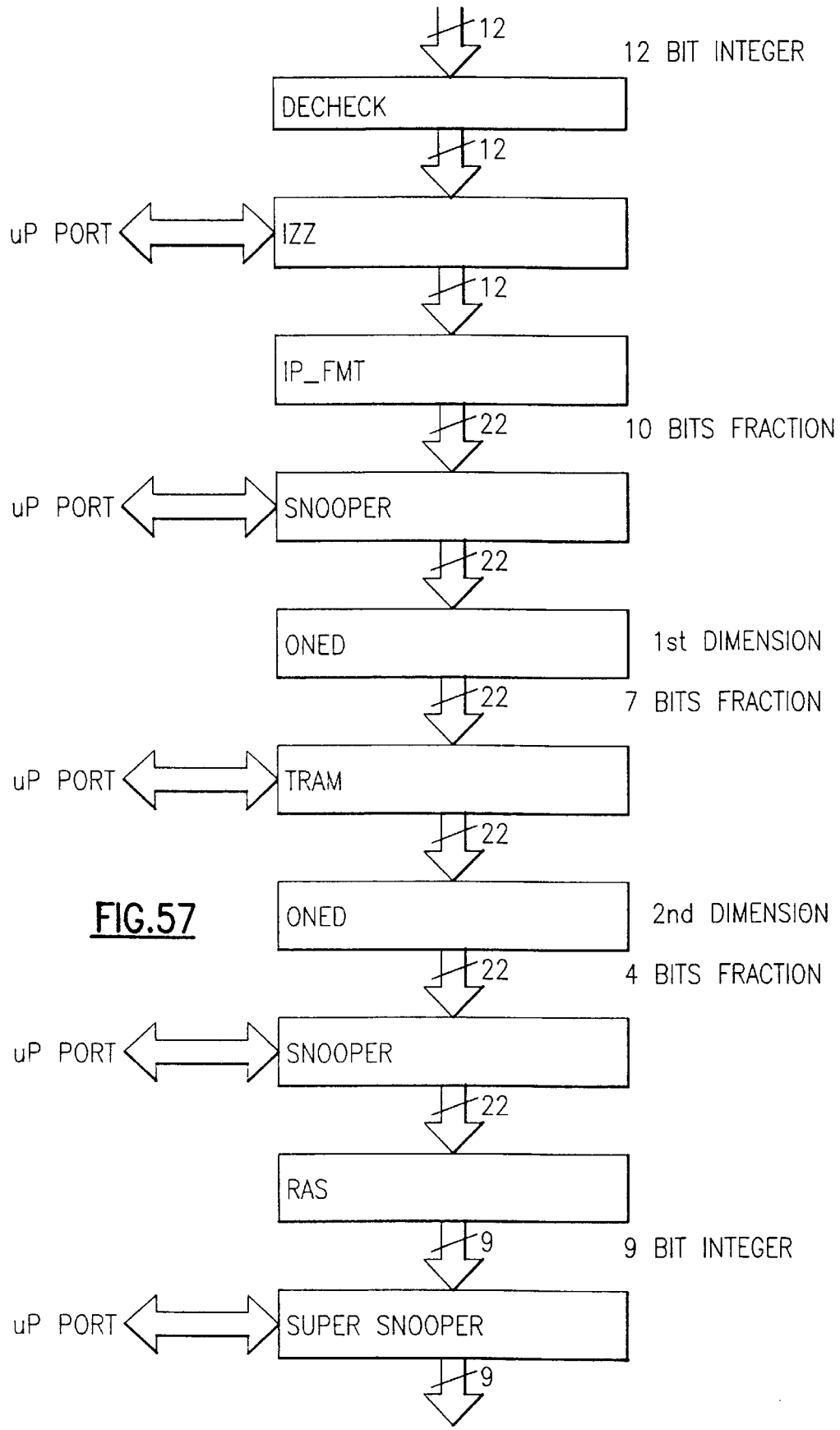
FIG. 57 is a block diagram illustrating microprocessor test access to the IDCT circuitry.

The three mechanisms provided for test access are as follows:

- microprocessor access to RAM cores
- microprocessor access to snooper blocks
- scan path access to control and datapath logic There are two "snooper" blocks and one "super snooper" block in the IDCT. FIG. 57 shows the positions of the snooper blocks and the other microprocessor test access.

Using these, and the two RAM blocks, it is possible to isolate each of the major blocks for the purpose of testing their behavior in relation to the Token flow. Using microprocessor access it is possible to control the Token inputs to any block and then to observe the Token port output of that block in isolation. Further to this there are two separate scan paths which run through (almost) all of the flip-flops and latches in the control sections of each block and also some of the datapath latches in the case of the "oned" transform datapath pipeline. The two scan paths are denoted "a" and "b", the former running from the "decheck" block to the "ip_fmt" block and the latter from the first "oned" block to the "ras" block.

Access to snoopers is possible by accessing the appropriate memory mapped locations in the normal manner. The same is true of the RAM cores (using the "ramtest" input as appropriate). The scan paths are accessed through the JTAG port in the normal way.

Each of the blocks is now discussed with reference to the various test issues.

B.9.13.1 "Decheck"

This block has the standard structure (see FIG. 56) where two latches for the input and output two-wire interfaces surround a processing block. As usual, no scan is provided to the two-wire latches since these simply pass on data whenever enabled and have no depth of logic to be tested. In this block the "control" section consists of a 1-stage pipeline of zcells which are all on scanpath "a". The logic in the control section is relatively simple, the most complex path is probably in the generation of the DATA extension count where a 6-bit incrementer is used.

B.9.13.2 "Izz"

This block is a variant of the standard structure where there is the addition of a RAM core block added to the two-wire interface latches and the control section. The control section is implemented with zcells and a small ROM used for address sequence generation. All the zcells are on scanpath "a" and there is access to the ROM address and data via zcell latches. There is some fairly complex logic e.g., for the generation of number which involves considerable random logic plus the ability to increment or decrement. There is also a 7-bit full adder used for read address generation. The RAM core is accessible through keyhole registers, via the microprocessor interface, see Table B.9.1.

B.9.13.3 "Ip_fmt"

This block again has the standard structure. Control logic is implemented with some rather simple zcell logic (all on scanpath "a") but the latching and shifting/muxing of the data is performed in a datapath with no direct access since the logic here is very shallow and simple.

B.9.13.4 "Oned"

Again this block follows the standard structure and divides into random logic and datapath sections. The zcell logic is relatively straightforward, all the zcells are on scanpath "a". The control signals for the transform pipeline datapath are derived from a long shift register consisting of zcell latches which are on the scanpath. Additionally, some of the pipeline latches are on the scanpath, this being done because there is a considerable depth of logic between some stages of the pipeline (e.g., multipliers and adders). The non-DATA Tokens are passed along a shift register, implemented as a datapath, and there is no test access to any of the stages.

B.9.13.5 Tram'

This block is very similar to the "izz" block. In this case there is no ROM used in the address sequence address generation, this being done algorithmically. All the zcell control states are on datapath "b".

B.9.13.6 Rras'

This block follows the standard structure and is entirely implemented with zcells. The most complex logical function is the 8-bit incrementer used when rounding up, all other logic is fairly simple. All states are scanpath "b".

B.9.13.7 Other top-level blocks

There are several other blocks that appear at the top level of the IDCT. The snoopers are obviously part of the test access logic, as are the JTAG control blocks. There are also the two clock generators which do not have any special test access (although they support various test features). The block "idctsels" is combinatorial zcell logic for decoding microprocessor addresses and the block "idctregs" contains the microprocessor accessible event and control bits associated with the IDCT.

SECTION B.10 Introduction
B.10.1 Overview of the Temporal Decoder

Figure 58:
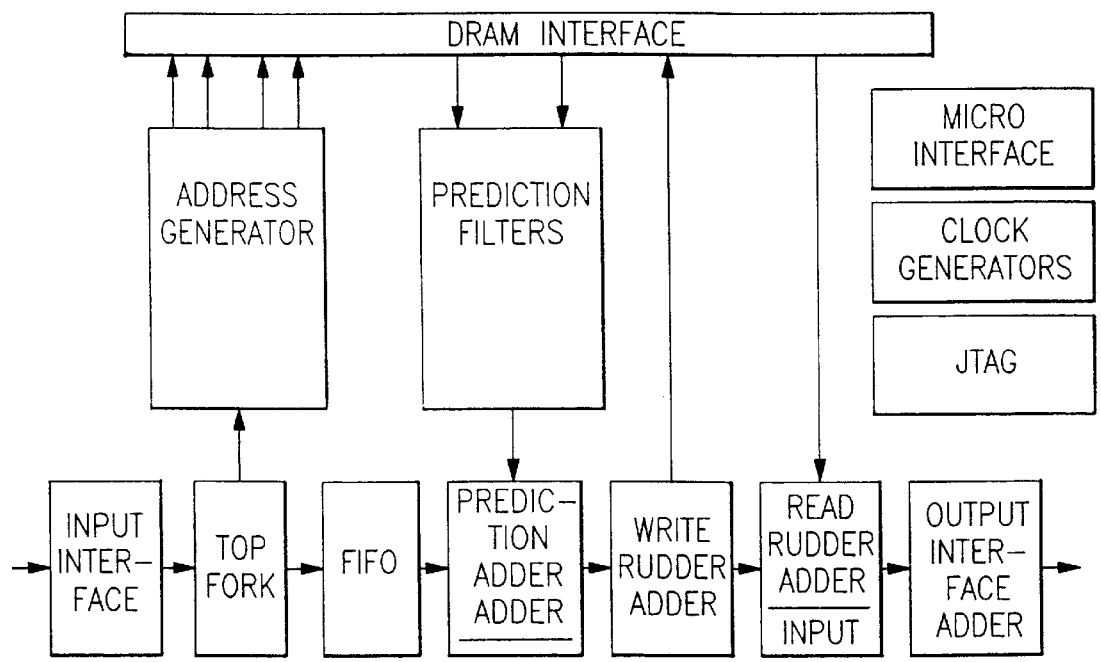
FIG. 58 is a block diagram of a temporal decoder.

The internal structure of the Temporal Decoder, in accordance with the invention, is shown in FIG. 58.

All data flow between the blocks of the chip (and much of the data flow within blocks) is controlled by means of the usual two-wire interfaces and each of the arrows in FIG. 58 represents a two-wire interface. The incoming token stream passes through the Input Interface which synchronizes the data from the external system clock to the internal clock derived from the phase-locked-loop (ph0/ph1). The token stream is then split into two in the Top Fork; one stream passes to the Address Generator and the other to a 256 word FIFO. The FIFO buffers data while data from previous I or P frames is fetched from the DRAM and processed in the Prediction Filters before being added to the incoming error data from the Spatial Decoder in the Prediction Adder (P and B frames). During MPEG frame reordering data must also be fetched for I and P frames so that the output frames are in the correct order, the reordered data being inserted into the stream in the Read Rudder block.

The Address Generator generates separate addresses for forward and backward predictions, reorder, read and write-back, the data which is written back being split from the stream in the Write Rudder block. Finally, data is resynchronized to the external clock in the Output Interface Block.

All the major blocks in the Temporal Decoder are connected to the internal microprocessor interface (UPI) bus. This is derived from the external microprocessor interface (MPI) bus in the Microprocessor Interface block. This block has address decodes for the various blocks in the chip associated with it. Also associated with the microprocessor interface is the event logic.

The rest of the logic of the Temporal Decoder is concerned primarily with test. First, the IEEE 1149.1 (JTAG) interface provides an interface to internal scan paths as well as to JTAG boundary-scan features. Secondly, two-wire interface stages which allow intrusive access to the data flow via the microprocessor interface while in test mode are included at strategic points in the pipeline architecture.

SECTION B.11 Clocking, Test and Related Issues
B.11.1 Clock Regimes

Before considering the individual functional blocks within the chip it is helpful to have an appreciation of the clock regimes within the chip and the relationship between them.

During normal operation most blocks of the chip run synchronously to the signal pllsysclk from the phase-locked-loop (PLL) block. The exception to this is the DRAM interface whose timing is governed by the need to be synchronous to the iftime sub-block, which generates the DRAM control signals (notwe, notoe, notcas, notras). The core of this block is clocked by the two-phase non-overlapping clocks clk0 and clk1, which are derived from the quadrature two-phase clocks supplied independently from the PLL cki0, cki1 and clkq0, ckq1.

Because the clk0, clk1 DRAM interface clocks are asynchronous to the clocks in the rest of the chip, measures have been taken to eliminate the possibility of metastable behavior (as far as practically possible) at the interfaces between the DRAM interface and the rest of the chip. The synchronization occurs in two areas: in the output interfaces of the Address Generator (addrgen/predread/psgsync, addrgen/ip_wrt2/sync18 and addrgerip_rd2/sync18) and in the blocks which control the "swinging" of the swing-buffer RAMs in the DRAM Interface (see section on the DRAM Interface). In each case the synchronization process is achieved by means of three metastable-hard flip-flops in series. It should be noted that this means that clk0/clk1 are used in the output stages of the Address Generator.

In addition to these completely asynchronous clock regimes, there are a number of separate clock generators which generate two-phase non-overlapping clocks (ph0, ph1) from pllsysclk. The Address Generator, Prediction Filters and DRAM Interface each have their own clock generators; the remainder of the chip is run off a common clock generator. The reasons for this are twofold. First, it reduces the capacitive load on individual clock generators, allowing smaller clock drivers and reduced clock routing widths. Second, each scan path is controlled by a clock generator, so increasing the number of clock generators allows shorter scan-paths to be used.

It is necessary to resynchronize signals which are driven across these clock-regime boundaries because the minor skews between the non-overlapping clocks derived from different clock generators could mean that underlap occurred at the interfaces. Circuitry built into each "Snooper" block (see Section B.11.4) ensures that this does not occur, and Snooper blocks have been placed at the boundaries between all the clock regimes, excepting at the front of the Address Generator, where the resynchronization is performed in the Token Decode block.

B.11.2 Control of Clocks

Each standard clock generator generates a number of different clocks which allow operation in normal mode and scan-test mode. The control of clocks in scan-test mode is described in detail elsewhere, but it is worth noting that several of the clocks generated by a clock generator (tph0, tph1, tckm, tcks) do not usually appear to be joined to any primitive symbols on the schematics. This is because scan paths are generated automatically by a post-processor which correctly connects these clocks. From a functional point of view the fact that the post-processor has connected different clocks from those shown on the schematics can be ignored; the behavior is the same.

During normal operation the master clocks can be derived in a number of different ways. Table B.11.1 indicates how various modes can be selected depending on the states of the pins pllselect and override.

TABLE B.11.1

Clock Control Modes

| pllselect | override | Mode |
|---|---|---|
| 0 | 0 | pllsysclk is connected directly to external sysclk, bypassing the PLL; DRAM interface clocks (cki0, |

TABLE B.11.1-continued

Clock Control Modes

| pllselect | override | Mode |
|---|---|---|
| | | cki1, ckq0, ckq1) are controlled directly from the pins ti and tq. |
| 0 | 1 | Override mode - ph0 and ph1 clocks are controlled directly from pins tphoish and tph1ish; DRAM interface clocks (cki0, cki1, ckq0, ckq1) are controlled directly from the pins ti and tq. |
| 1 | 0 | Normal operation. pllsysclk is the clock generated by the PLL; DRAM interface clocks are generated by the PLL. |
| 1 | 1 | External resistors connected to ti and tq are used instead of the internal resistors (debug only). |

B.11.3 The Two-wire Interface

The two-wire interface is used for all block-to-block communication within the Temporal Decoder and most blocks consist of a number of pipeline stages, all of which are themselves two-wire interface stages. It is therefore essential to understand the internal implementation of the two-wire interface in order to be able to interpret many of the schematics. In general, these internal pipeline stages are structured as shown in FIG. 59.

Figure 59:
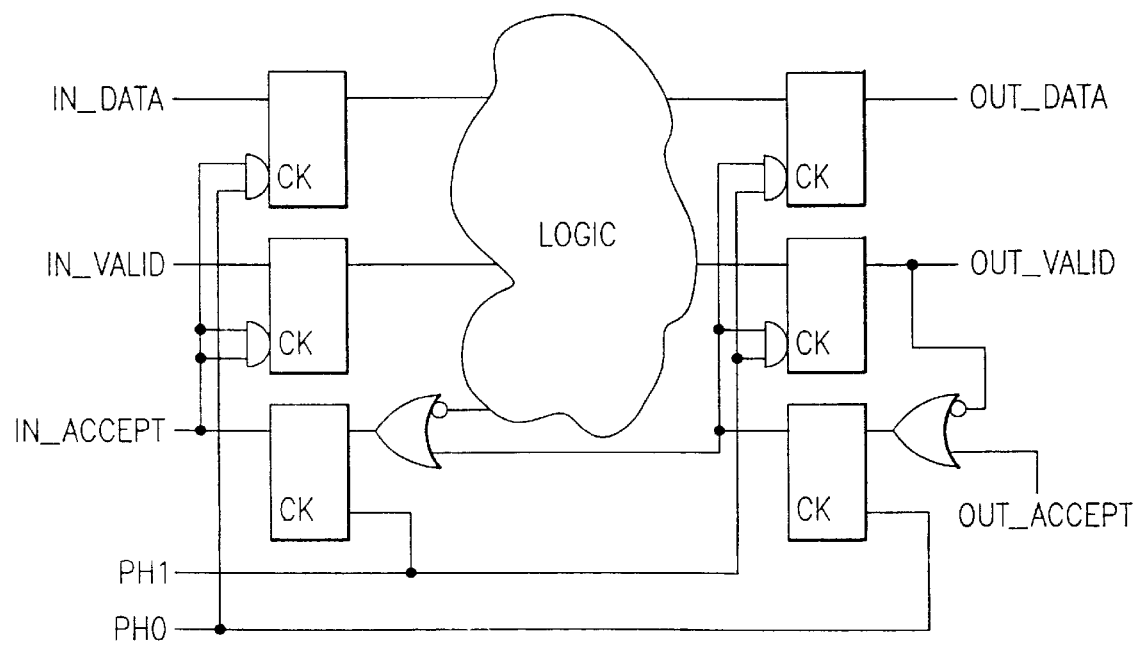
FIG. 59 is a diagram illustrating the structure of a two-wire interface stage.

FIG. 59 shows a latch-logic-latch representation as this is the configuration which is normally used. However, when a number of stages are put together it is equally valid to think of a "stage" as being latch-latch-logic (for many engineers a more familiar model). The use of the latch-logic-latch configuration allows all inter-block communication to be latch to latch, without any intervening logic in either the sending or receiving block.

Referring again to FIG. 59, a simple two-wire interface FIFO stage can be constructed by removing the logic block, connecting the data and valid signals directly between the latches and the latched in_valid directly into the NOR gate on the input to the in_accept latch in the same way as out_valid and out_accept are gated. Data and valid signals then propagate when the corresponding accept signal is high. By ORing in_valid with out_accept_reg in the manner shown, data will be accepted if in_valid in low, even if out_accept_reg is low. In this way gaps (data with the valid bit low) are removed from the pipeline whenever a stall (accept signal low) occurs.

With the logic block inserted, as shown in FIG. 59, in_accept and out_valid may also be dependent on the data or the state of the block. In the configuration shown it is standard for any state within the block to be held in master-slave devices with the master enabled by ph1 and the slave enabled by ph0.

Figure 80:
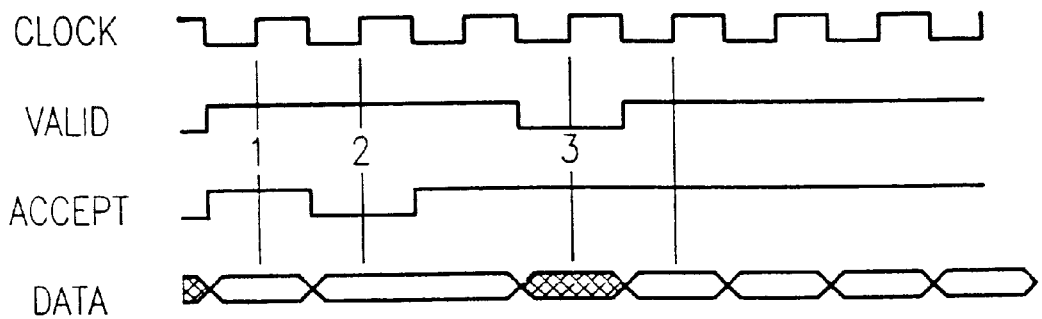
Figure 81:
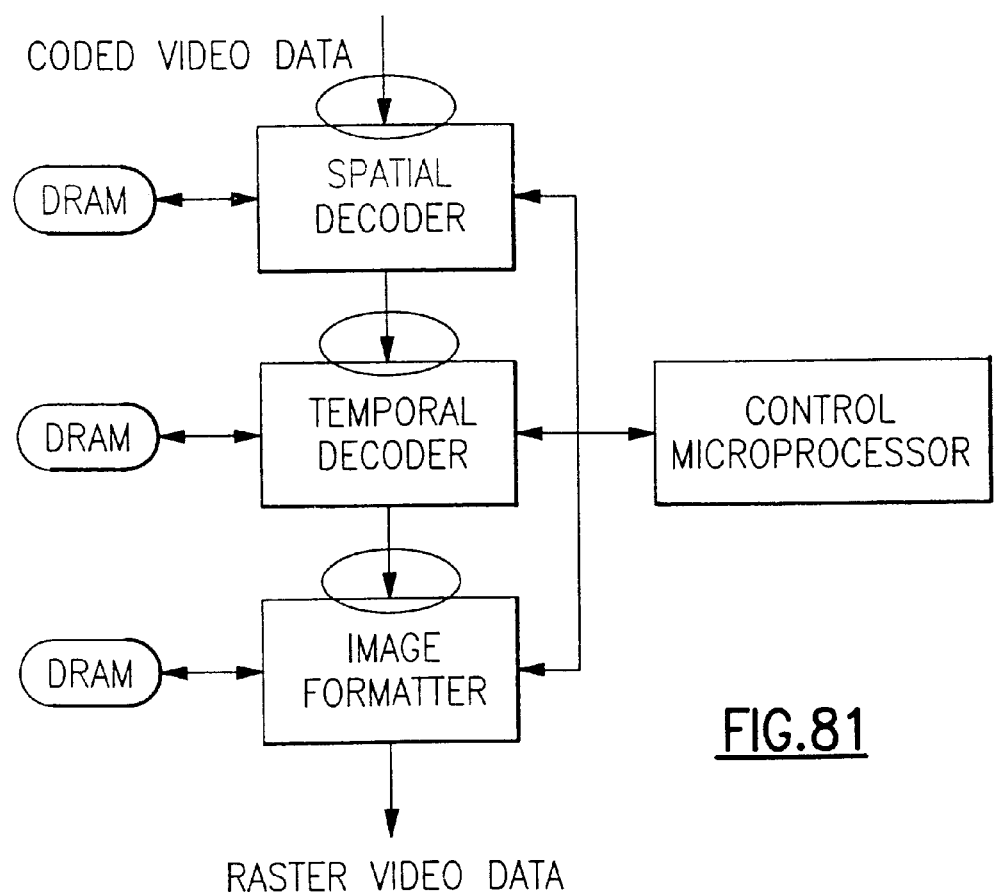
FIG. 81 is a block diagram of a portion of a video decompression apparatus illustrating the locations of two-wire interfaces in accordance with the invention.

The timing of the two wire interface is illustrated in FIG. 80.

B.11.4 Snooper Blocks

Snooper blocks enable access to the data stream at various points in the chip via the Microprocessor Interface. There are two types of snooper blocks. Ordinary Snoopers can only be accessed in test mode where the clocks can be controlled directly. "Super Snoopers" can be accessed while the clocks are running and contain circuitry which synchronizes the asynchronous data from the Microprocessor bus to the internal chip clocks. Table B.11.2 lists the locations and types of all Snoopers in the Temporal Decoder.

TABLE B.11.2

Snoopers in Temporal Decoder

| Location | Type |
|---|---|
| addrgervvec_pipe/snoopz31 | Snooper |
| addrgervcnt_pipe/midsnp | Snooper |
| addrgervcnt_pipe/endsnp | Snooper |
| addrgervpredread/snoopz44 | Snooper |
| addrgervvip_wrt2/superz10 | Super Snooper |
| addrgervvip_rd2/superz10 | Super Snooper |
| dramx/dramif/ifsnoops/snoopz15 (fsnp) | Snooper |
| dramx/dramif/ifsnoops/snoopz15 (bsnp) | Snooper |
| dramx/dramif/ifsnoops/superz9 | Super Snooper |
| wrudder/superz9 | Super Snooper |
| pflts/fwdflt/dimbuff/snoopk13 | Snooper |
| pflts/bwdflt.dimbuff/snoopk13 | Snooper |
| pflts/snoopz9 | Snooper |

Details on the use of both Snoopers and Super Snoopers are contained in the test section. Details of the operation of the JTAG interface are contained in the JTAG document.

SECTION B.12 Functional Blocks

B.12.1 Top Fork

The Top Fork serves two different functions. First, it forks the data stream into two separate streams: one to the Address Generator and the other to the FIFO. Second, it provides the means of starting and stopping the chip so that the chip can be configured.

The fork part aspect of the function is very simple. The same data is presented to both the Address Generator and the FIFO, but has to have been accepted by both blocks before an accept is sent back to the previous stage. Thus, the valids of the two branches of the fork are dependent on the accepts from the other branch. If the chip is in a stopped state, the valids to both branches are held low.

The chip powers up in a state where in_accept is held low until the configure bit is set high. This ensures that no data is accepted until the user has configured the chip. If the user needs to configure the chip at any other time, he must set the configure bit and wait until the chip has finished the current stream. The stopping process is as follows:

1) If the configure bit has been set, do not accept any more data after a flush token has been detected by the Top Fork.
2) The chip will have finished processing the stream when the FLUSH Token reaches the Read Rudder. This causes the signal seq_done to go high.
3) When seq_done goes high, set an event bit which can be read by the Microprocessor. The event signal can be masked by the Event block.

B.12.2 Address Generator

The address generator (addrgen) is responsible for counting the numbers of blocks within a frame, and for generating the correct sequence of addresses for DRAM data transfers. Its input is the token stream from the token input port (via topfork), and its output to the DRAM interface consists of addresses and other information, controlled by a request/acknowledge protocol.

The principal sections of the address generator are: token decode; block counting and generation of the DRAM block address; conversion of motion vector data into an address; offset; request and address generator for prediction; transfers; reorder read address generator; and write address generator.

B.12.2.1 Token Decode (tokdec)

Here tokens associated with coding standards, frame and block information and motion vectors are decoded. The information extracted from the stream is stored in a set of registers which may also be accessed via the upi. The detection of a DATA token header is signalled to subsequent blocks to enable block counting and address generation. Nothing happens when running JPEG.

List of tokens decoded:
CODING_STANDARD
DATA
DEFINE_MAX_SAMPLING
DEFINE_SAMPLING
HORIZONTAL_MBS
MVD_BACKWARDS
MVD_FORWARDS
PICTURE_START
PICTURE_TYPE
PREDICTION_MODE This block also combines information from the request generators to control the toggling of the frame pointers, and to stall the input stream. The stream is stalled when a new frame appears at the input (in the form of a PICTURE_START token) but the writeback or reorder read associated with the previous frame is incomplete.

B.12.2.2 Macroblock Counter (mblkcntr)

The macroblock counter in fact consists of four basic counters which point to the horizontal and vertical position of the macroblock in the frame, and to the horizontal and vertical position of the block within the macroblock. At the beginning of time, and on each PICTURE_START, all counters are reset to zero. As DATA Token headers arrive, the counters increment and reset according to the color component number in the token header and the frame structure. This frame structure is described by the sampling registers in the token decoder.

For a given color component, the counting proceeds as follows. The horizontal block count is incremented on each new DATA Token of the same component until it reaches the width of the macroblock, and then it resets. The vertical block count is incremented by this reset until it reaches the height of the macroblock, and then it resets. When this happens, the next color component is expected. So this sequence is repeated for each of the components in the macroblock—the horizontal and vertical size of the macroblock possibly being different for each component. If, for any component, fewer blocks are received than are expected, the count will still proceed to the next component without error.

When the color component of the DATA Token is less than the expected value, the horizontal macroblock count is incremented. This will also occur when more than the expected number of blocks appear for a given color component, as the counters will then be expecting a higher component index. This horizontal count is reset when the count reaches the picture width in macroblocks. This reset increments the vertical macroblock count.

There is a further capability to count macroblocks in H.261 CIF format. In this case there is an extra level hierarchy between macroblocks and the picture called the group of blocks. This is eleven macroblocks wide and three deep, and a picture is always two groups wide. The token decoder extracts the CIF bit from the PICTURE_TYPE token and passes this to the macroblock counter to instruct it to count groups of blocks. Instances of too few or too many blocks per component will provoke similar reactions as above.

B.12.2.3 Block Calculation (blkcalc)

Converts the macroblock and block-within-macroblock coordinates into coordinates for the block's position in the picture i.e., it knocks out the level of hierarchy. This of course has to take into account the sampling ratios of the different color components.

B.12.2.4 Base block Address (bsblkadr)

The information from the blkcalc, together with the color component offsets, is used to calculate the block address within the linear DRAM address space. Essentially, for a given color component the linear block address is the number of blocks down times the width of the picture plus the number of blocks long. This is added to the color component offset to form the base block address.

B.12.2.5 Vector Offset (vec_pipe)

The motion vector information presented by the token decoder is in the form of horizontal and vertical pixel offset coordinates. That is, for each of the forward and backward vectors there is an (x,y) which gives the displacement in half-pixels from the block being formed to the block from which it is being predicted. These coordinates may be positive or negative. They are first scaled according to the sampling of each color component, and used to form the block and new pixel offset coordinates.

Figure 60:
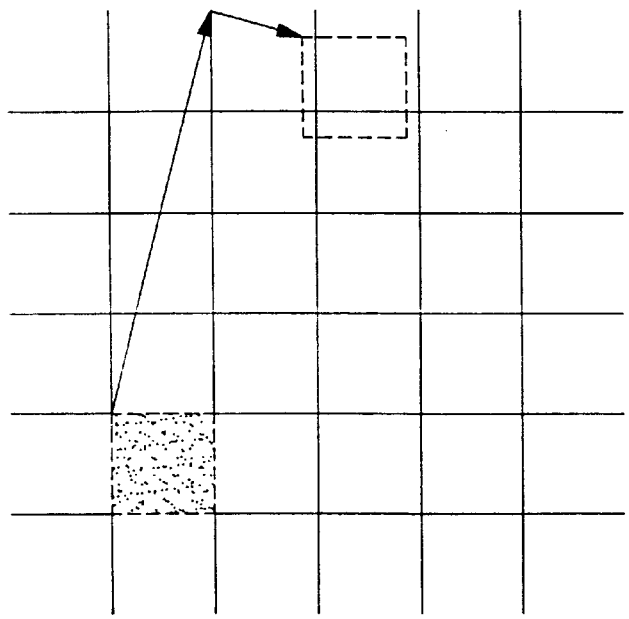
FIG. 60 is a diagram illustrating block and pixel offsets.

In FIG. 60, the shaded area represents the block that is being formed and the dotted outline is the block from which it is being predicted. The big arrow shows the block offset—the horizontal and vertical vector to the DRAM block that contains the prediction block's origin—in this case (1,4). The small arrow shows the new pixel offset—the position of the prediction block origin within that DRAM block. As the DRAM block is 8×8 bytes, the pixel offset looks to be (7,2).

The multiplier array vmarr1a then converts the block vector offset into a linear vector offset. The pixel information is passed to the prediction request generator as an (x,y) coordinate (pix_info).

B.12.2.6 Prediction Requests

The frame pointer, base block address and vector offset are added to form the address of the block to be fetched from the DRAM (Inblkad3). If the pixel offset is zero only one request is generated. If there is an offset in either the x OR y dimension then two requests are generated—the original block address and the one either immediately to the right or immediately below. With an offset in both x and y, four requests are generated.

Synchronization between the chip clock regime and the DRAM interface clock regime takes place between the first addition (Inblkad3) and the state machine that generates the appropriate requests. Thus the state machine (psgstate) is clocked by the DRAM interface clocks, and its scanned elements form part of the DRAM interface scan chain.

B.12.2.7 Reorder Read Requests and Write Requests

As there is no pixel offset involved here, each address is formed by adding the base block address to the relevant frame pointer. The reorder read uses the same frame store as the prediction and data is written back to the other frame store. Each block includes a short FIFO to store addresses as the transfer of read and write data is likely to lag the prediction transfer at the corresponding address. (This is because the read/write data interacts with stream further along the chip dataflow than the prediction data). Each block also includes synchronization between the chip clock and the DRAM interface clock.

B.12.2.8 Offsets

The DRAM is configured as two frame stores, each of which contains up to three color components. The frame store pointers and the color component offsets within each frame must be programmed via the upi.

B.12.2.9 Snoopers

Are positioned as follows:

Between blkcalc and bsblkadr—this interface comprises the horizontal and vertical block coordinates, the appropriate color component offset and the width of the picture in blocks (for that component).

After bsblkadr—the base block address.

After vec_pipe—the linear block offset, the pixel offset within the block, together with information on the prediction mode, color component and H.261 operation.

After Inbikad3—the physical block address, as described under "Prediction Requests".

Super snoopers are located in the reorder read and write request generators for use during testing of the external DRAM. See the DRAM Interface section for all the details.

B.12.2.10 Scan

The addrgen block has its own scan chain, the clocking of which is controlled by the block's own clock generator (adclkgen). The request generators at the back end of the block fall within the DRAM interface clock regime.

B.12.3 **Prediction Filters

Figure 61:
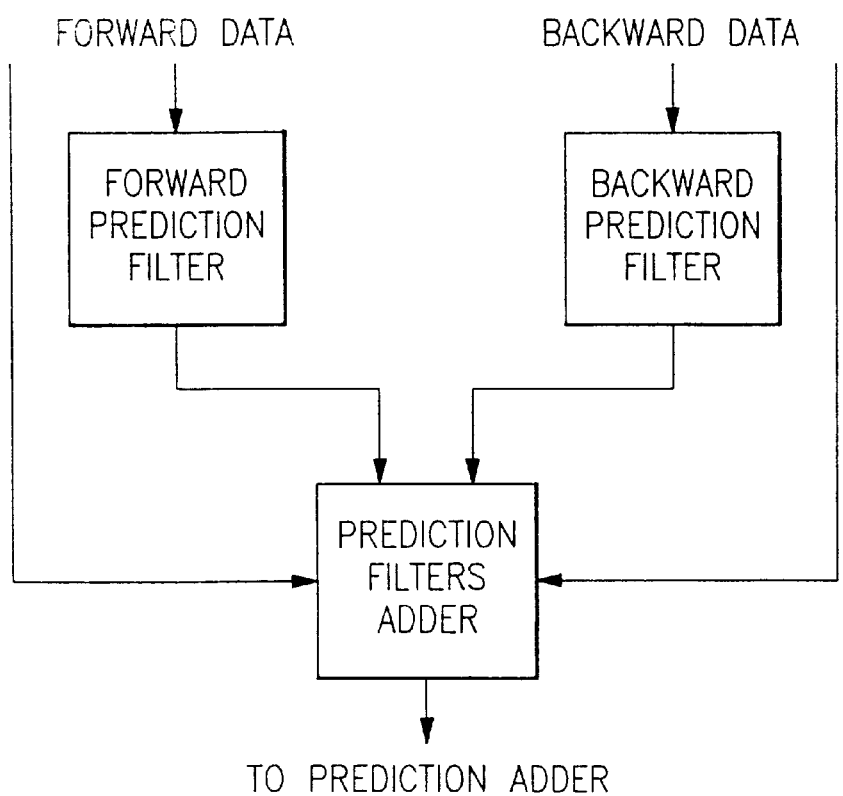
FIG. 61 is a block diagram of a portion of a prediction filter.

The overall structure of the Prediction Filters is shown in FIG. 61. The forward and backward filters are identical and filter the MPEG forward and backward prediction blocks. Only the forward filter is used in H.261 mode (the h261_on input of the backward filter should be permanently low because H.261 streams do not contain backward predictions). The entire Prediction Filters block is composed of pipelines of two-wire interface stages.

B.12.3.1 A Prediction Filter

Figure 62:
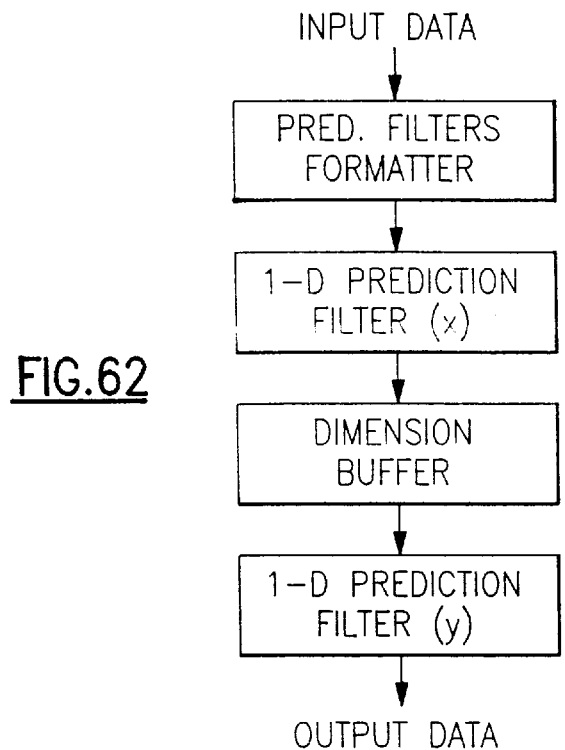
FIG. 62 is a block diagram of a prediction filter.

Each Prediction Filter acts completely independently of the other, processing data as soon as valid data appears at its input. It can be seen from FIG. 62 that a Prediction Filter consists of four separate blocks, two of which are identical. It is clearer if the operation of these blocks is described independently for MPEG and H.261 operation. H.261 operation, being the more complex, is described first.

B.12.3.1.1 H.261 Operation

The one-dimensional filter equation used is as follows:

$$F_i = \frac{X_{i+1} + 2X_i + X_{i-1}}{4} (1 < +i \leq 6)$$

Figure 63:
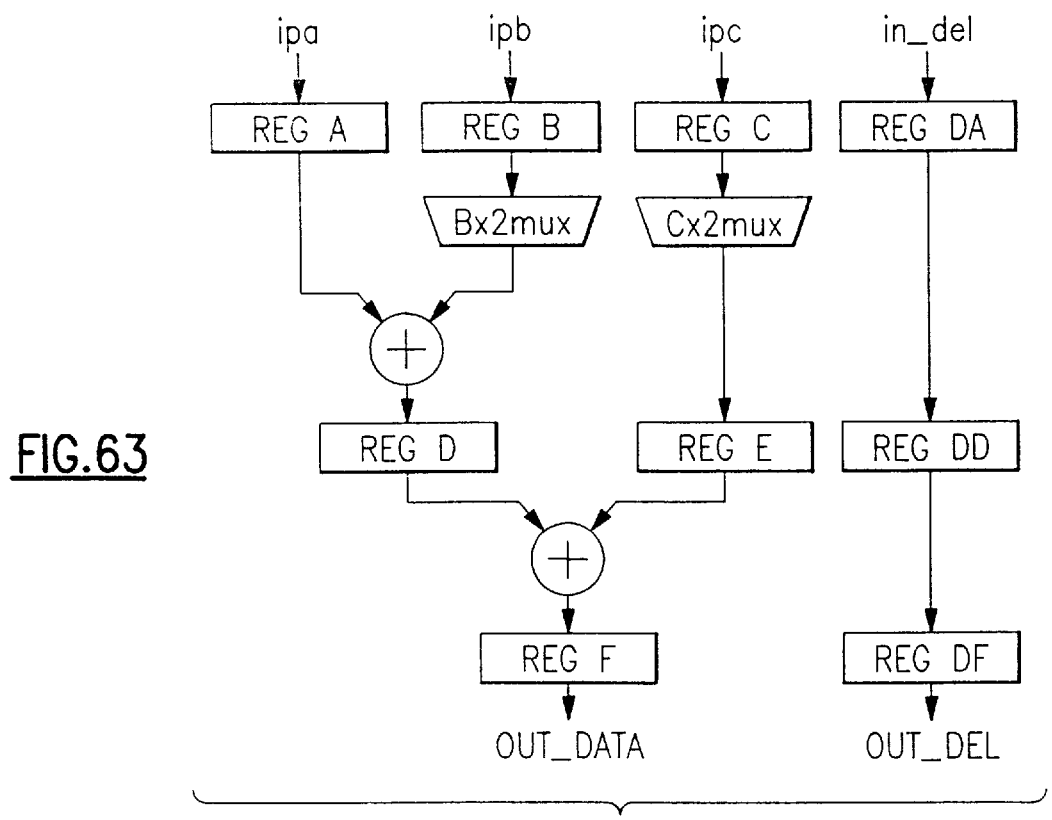
FIG. 63 is a block diagram of a one dimensional prediction filter.

This is applied to each row of the 8×8 block by the x Prediction Filter and to each column by the y Prediction Filter. The mechanism by which this is achieved is $F_i = X_i$ (otherwise)

illustrated in FIG. 63, which is basically a representation of the pflt1dd schematic. The filter consists of three two-wire interface pipeline stages. For the first and last pixels in a row registers A and C are reset and the data passes unaltered through registers B, D and F (the contents of B and D being added to zero). The control of Bx2mux is set so that the output of register B is shifted left by one. This shifting is in addition to the one place which it is always shifted in any event. Thus all values are multiplied by 4 (more of this later). For all other pixels, $x_{i+1}$, is loaded into register C, $x_i$ into register B and $x_{i-1}$ into register A. It can be seen from FIG. 63 that the H.261 filter equation is then implemented. Because vertical filtering is performed in horizontal groups of three (see the Dimension Buffer, below) there is no need to treat the first and last pixels in a row differently. The control and the counting of the pixels within a row is performed by the control logic associated with each 1-D filter. It should be noted that the result has not been divided by 4.

B.12.3.1.2 MPEG Operation

During MPEG operation a Prediction Filter performs a simple half pel interpolation:

$$F_i = \frac{x_i + x_{i+1}}{2} (0 \leq i \leq 8, \text{half} pel)$$

This is the default filter operation unless the h261_on input is low. If the signal dim into a 1-D filter is low then integer pel interpolation will be performed, so with h261_on low and xdim and ydim low all pixels are passed straight through without filtering. It is an obvious requirement that when the dim signal into a 1-D filter is high then the rows (or columns) will be 8 pixels wide (or high). This is summarized in Table B.12.2. Referring to FIG. 63, "1-D Prediction Filter," the

TABLE B.12.2

| 1-D Filter Operation | | | |
|---|---|---|---|
| h261_on | xdim | ydim | Function |
| 0 | 0 | 0 | $F_i = x_1$ |
| 0 | 0 | 1 | MPEG 8×9 block |
| 0 | 1 | 0 | MPEG 9×8 block |
| 0 | 1 | 1 | MPEG 9×9 block |
| 1 | 0 | 0 | H.261 Low-pass Filter |
| 1 | 0 | 1 | Illegal |
| 1 | 1 | 0 | Illegal |
| 1 | 1 | 1 | Illegal | operation of the 1-D filter is the same for MPEG integer pel as it is for the first and last pixels in a row in H.261. For MPEG half-pel operation, register A is permanently reset and the output of register C is shifted left by 1 (the output of register B is always shifted left by 1 anyway). Thus after a couple of clocks register F contains (2B+2C), four times the required result, but this is taken care of at the input of the Prediction Filters Adder, where the number, having passed through both x and y filters, is shifted right by 4.

The function of the Formatter and Dimension Buffer are also simpler in MPEG. The formatter must collect two valid pixels before passing them to the x-filter for half-pel interpolation; the Dimension Buffer only needs to buffer one row. It is worth noting that after data has passed through the x-filter there can only ever be 8 pixels in a row, because the filtering operation converts 9-pixel rows into 8-pixel rows. "Lost" pixels are replaced by gaps in the data stream. When performing half-pel interpolation the x-filter inserts a gap at the end of each row (after every 8 pixels); the y-filter inserts 8 gaps at the end of the block. This fact is significant because the group of 8 or 9 gaps at the end of a block align with DATA Token headers and other tokens between DATA Tokens in the stream coming out of the FIFO. This minimizes the worst-case throughput of the chip which occurs when 9×9 blocks are being filtered.

B.12.3.2 The Prediction Filters Adder.

During MPEG operation predictions may be formed using either an earlier or later picture, or the average of the two. Predictions formed from an earlier frame are termed forward predictions and those formed from a later frame backward predictions. The function of the Prediction Filters Adder (pfadd) is to determine which filtered prediction values are being used (forward, backward or both) and either pass through the forward or backward filtered predictions or the average of the two (rounded towards positive infinity).

The prediction mode can only change between blocks i.e., at power-up or after the fwd__lst byte and/or bwd__lst__byte signals are active, indicating the last byte of the current prediction block. If the current block is a forward prediction then only fwd__lst-byte is examined. If it is a backward prediction then only bwd__1st__byte is examined. If it is a bidirectional prediction then both fwd__1st-byte and bwd__1st-byte are examined.

The signals fwd__on and bwd__on determine which prediction values are used. At any time either, both or neither of these signals may be active. At start-up or if there is a gap when no valid data is present at the inputs of the block, the block enters a state when neither signal is active.

Two criteria are used to determine the prediction mode for the next block: the signals fwd__ima__twin and bwd__ima__twin, which indicate whether a forward or backward block is part of a bidirectional prediction pair, and the buses fwd__p__num[1:0] and bwd-p__num[1:0]. These buses contain numbers which increment by one for each new prediction block or pair of prediction blocks and are necessary because, if, for example, there are two forward prediction blocks followed by a bidirectional prediction block, the DRAM interface can fetch the backward block of the bidirectional prediction sufficiently far ahead so that it reaches the input of the Prediction Filters Adder before the second of the forward prediction blocks. Similarly, other sequences of backward and forward predictions can get out of sequence at the input of the Prediction Filters Adder. Thus, the next prediction mode is determined as follows:

1) If valid forward data is present and fwd__ima__twin is high then the block stalls until valid backward data arrives with bwd__ima__twin set and then it goes through the blocks averaging each pair of prediction values.
2) If valid backward data is present and bwd__ima__twin is high, then the block stalls until valid forward data arrives with fwd__ima__twin set and then it proceeds as above. If forward and backward data are valid together there is no stall.
3) If valid forward data is present, but fwd__ima__twin is not set then fwd__p__num is examined. If this equals the number from the previous prediction plus one (stored in pred__num) then the prediction mode is set to forward.
4) If valid backward data is present but bwd__ima twin is not set, then bwd__p__num is examined. If this equals the number from the previous prediction plus one (stored in pred__num) then the prediction mode is set to backward.

"Early__valid" signals from one stage back in the pipeline are used so that the Prediction Filters Adder mode can be set up before the first data from a new block arrives. This ensures that no stalls are introduced into the pipeline.

The ima__twin and pred__num signals are not passed along the forward and backward prediction filter pipelines with the filtered data. This is because:

1) These signals are only examined when fwd__lst__byte and/or bwd__lst__byte are valid. This saves about 25 three-bit pipeline stages in each prediction filter.
2) The signals remain valid throughout a block and, therefore, are valid at the time when fwd__lst__byte and/or bwd__lst__byte reach the Prediction Filters Adder.
3) The signals are examined a clock before data arrives anyway.

B.12.4 Prediction Adder and FIFO

The prediction adder (padder) forms the predicted frame by adding the data from the prediction filters to the error data. To compensate for the delay from the input through the address generator, DRAM interface and prediction filters, the error data passes through a 256 word FIFO (sfifo) before reaching padder.

The CODING__STANDARD, PREDICTION__MODE and DATA Tokens are decoded to determine when a predicted block is being formed. The 8-bit prediction data is added to the 9-bit two's complement error data in the DATA Token. The result is restricted to the range 0 to 255 and passes to the next block. This data restriction also applies to all intra-coded data, including JPEG.

The prediction adder of the present invention also includes a mechanism to detect mismatches in the data arriving from the FIFO and the prediction filters. In theory, the amount of data from the filters should exactly correspond to the number of DATA Tokens from the FIFO which involve prediction. In the event of a serious malfunction however, padder will attempt to recover.

The end of the data blocks from the FIFO and filters are marked respectively by the in__extn and fl__last inputs. Where the end of the filter data is detected before the end of the DATA Token, the remainder of the token continues to the output unchanged. If, on the other hand, the filter block is longer than the DATA Token, the input is stalled until all the extra filter data has been accepted and discarded.

There is no snooper in either the FIFO or the prediction adder, as the chip can be configured to pass data from the token input port directly to these blocks, and to pass their output directly to the token output port.

B.12.5 Write and Read Rudders

B.12.5.1 The Write Rudder (wrudder)

The Write Rudder passes all tokens coming from the Prediction Adder on to the Read Rudder, but also passes all data blocks in I or P pictures in MPEG and all data blocks in H.261 to the DRAM interface so that they can be written back into the external frame stores under the control of the Address Generator. All the primary functionality is contained within one two-wire interface stage, although the write-back data passes through a snooper on its way to the DRAM interface.

TABLE B.12.3

Tokens Decoded by the Write Rudder

| Token Name | Function in Write Rudder |
| --- | --- |
| CODING_STANDARD | Write-back is inhibited for JPEG streams. |
| PICTURE_TYPE | Write-back only occurs in I and P frames, not B frames. |
| DATA | Only the data within DATA tokens is written back. |

After the DATA Token header has been detected all data bytes are output to the DRAM Interface. The end of the DATA Token is detected by in_extn going low and this causes a flush signal to be sent to the DRAM Interface swing buffer. In normal operation this will align with the point when the swing buffer would swing anyway, but if the DATA Token does not contain 64 bytes of data this provides a recovery mechanism (although it is likely that the next few output pictures would be incorrect).

B.12.5.2 The Read Rudder (rrudder)

The Read Rudder has three functions, the two major ones relating to picture sequence reordering in MPEG:

1) To insert data which has been read-back from the external frame store into the token stream at the correct places.
2) To reorder picture header information in I and P pictures.
3) To detect the end of a token stream by detecting the FLUSH token (see Section B.12.1, "Top Fork").

Figure 64:
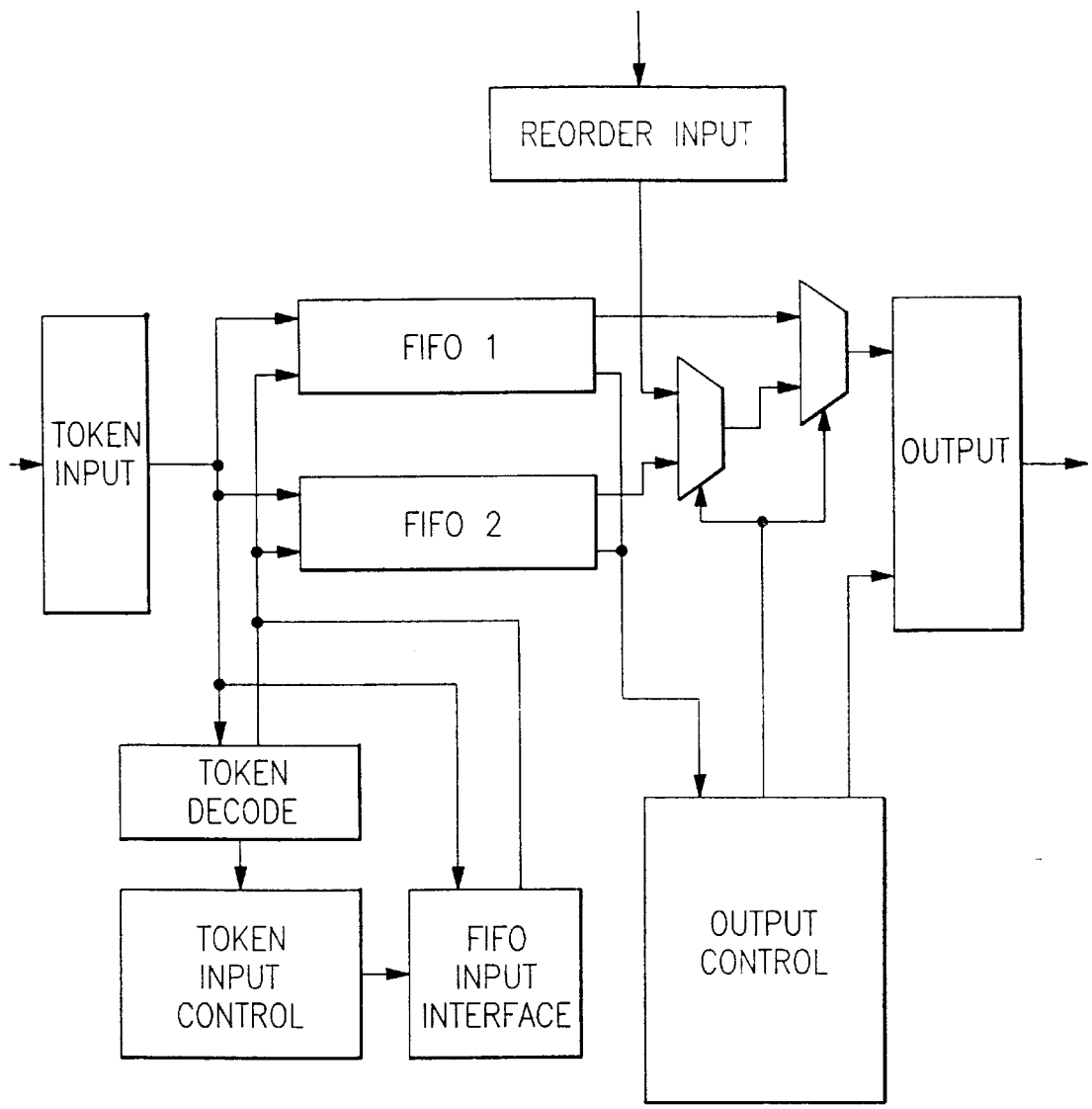
FIG. 64 is a block diagram of the structure of a read rudder in a prediction filter.

The structure of the Read Rudder is illustrated in FIG. 64. The entire block is made from standard two-wire interface technology. Tokens in the input interface latches are decoded and these decodes determine the operation of the block:

TABLE B.12.4

Tokens decoded by the Read Rudder

| Token Name | Function in Read Rudder |
| --- | --- |
| FLUSH | Signals to Top Fork. |
| CODING_STANDARD | Reordering is inhibited if the coding standard is not MPEG. |
| SEQUENCE_START | The read-back data for the first picture of a reordered sequence is invalid. |
| PICTURE_START | Signals that the current output FIFO must be swapped (I or P pictures). The first of the picture header tokens. |
| PICTURE_END | All tokens above the picture layer are allowed through |
| TEMPORAL_REFERENCE | The second of the picture header tokens. |
| PICTURE_TYPE | The third of the picture header tokens. |
| DATA | When reordering the contents of DATA tokens are replaced with reordered data. |

The reorder function is turned on via the Microprocessor Interface, but is inhibited if the coding standard is not MPEG, regardless of the state of the register. The same MPI register controls whether the Address Generator generates a reorder address, hence reorder is an output from this block. To understand how the Read Rudder works consider the input and output control logic separately, bearing in mind that the sequence of tokens is as follows:

CODING_STANDARD
  SEQUENCE_START
  PICTURE_START
  TEMPORAL_REFERENCE
  PICTURE_TYPE
  Picture containing DATA Tokens and other tokens
  PICTURE_END
  . . .
  PICTURE_START
  . . .

B.12.5.2.1 Input Control Logic

From power-up all tokens pass into FIFO 1 (called the current input FIFO) until the first PICTURE_TYPE token for an I or P picture is encountered. FIFO 2 then becomes the current input FIFO and all input is directed to it until the next PICTURE_TYPE for an I or P picture is encountered, when FIFO 1 becomes the current input FIFO again. Within I and P pictures, all tokens between PICTURE_TYPE and PICTURE_END except DATA Tokens are discarded. This is to prevent motion vectors, etc. from being associated with the wrong pictures in the reordered stream, where they would have no meaning.

A three-bit code is put into the FIFO along with the token stream which indicates the presence of certain token headers. This saves having to perform any token decoding on the output of the FIFOs.

B.12.5.2.2 Output Control Logic

From power-up tokens are accepted from FIFO I (called the current output FIFO) until a picture start code is encountered, after which FIFO 2 becomes the current output FIFO. Referring back to Section B.12.5.2.1 it can be seen that at this stage the three picture header tokens, PICTURE_START, TEMPORAL_REFERENCE and PICTURE_START are retained in FIFO 1. The current output FIFO is swapped every time a picture start code is encountered in an I or P frame. The three picture header tokens are stored until the next I or P frame, at which time they will become associated with the correctly reordered data. B pictures are not reordered and, hence, pass through without any tokens being discarded. All tokens in the first picture, including PICTURE_END are discarded.

During I and P pictures the data contained in DATA Tokens in the token stream is replaced by reordered data from the DRAM Interface. During the first picture "reordered" data is still present at the reordered data input because the Address Generator still requests the DRAM Interface to fetch it. This is garbage and is discarded.

SECTION B.13 The DRAM Interface

B.13.1 Overview

The Spatial Decoder, Temporal Decoder and Video Formatter each contain a DRAM Interface block. In all three devices, the function of the DRAM Interface is to transfer data from the chip to the external DRAM and from the external DRAM into the chip using block addresses supplied by an address generator.

The DRAM Interface can operate from a clock which is asynchronous to both the address generator and to the clocks of the blocks through which data is passed. Special techniques have been used to handle the asynchronism, because although the clocks are asynchronous they may be approximately the same frequency.

Data is usually transferred between the DRAM Interface and the rest of the chip in blocks of 64 bytes (the only exception being prediction data in the Temporal Decoder).

Transfers take place by means of a device known as a "swing buffer". This is essentially a pair of RAMs operated in a double-buffered configuration, with the DRAM interface filling or emptying one RAM while another part of the chip empties or fills the other RAM. A separate bus which carries an address from an address generator is associated with each swing buffer.

Each of the chips has four swing buffers, but the function of these swing buffers is different in each case. In the Spatial Decoder, one swing buffer is used to transfer coded data to the DRAM, another to read coded data from the DRAM, the third to transfer tokenized data to the DRAM and the fourth to read tokenized data from the DRAM. In the Temporal Decoder, one swing buffer is used to write Intra or Predicted picture data to the DRAM, the second to read Intra or Predicted data from the DRAM and the other two to read forward and backward prediction data. In the Video Formatter, one swing buffer is used to transfer data to the DRAM and the other three are used to read data from the DRAM, one of each of Luminance (Y) and the Red and Blue color difference data (Cr and Cb respectively).

The operation of the generic features of the DRAM Interface is described in the Spatial Decoder document. The following section describes the features peculiar to the Temporal Decoder.

B.13.2 The Temporal Decoder DRAM Interface

As mentioned in section B.13.1, the Temporal Decoder has four swing buffers: two are used to read and write decoded Intra and Predicted (I and P) picture data; these operate as described above. The other two are used to fetch prediction data.

Figure 65:
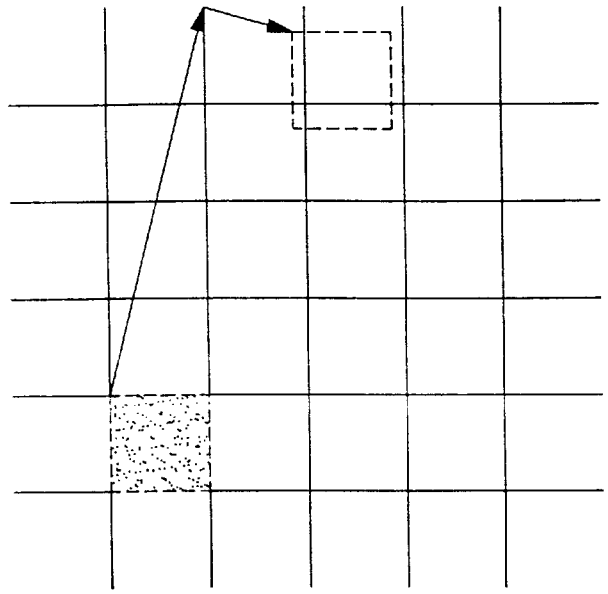
FIG. 65 is another diagram showing block and pixel offsets.

In general, prediction data will be offset from the position of the block being processed as specified in motion vectors in x and y. Thus, the block of data to be fetched will not generally correspond to the block boundaries of the data as it was encoded (and written into the DRAM). This is illustrated in FIG. 65, where the shaded area represents the block that is being formed and the dotted outline shows the block from which it is being predicted. The address generator converts the address specified by the motion vectors to a block offset (a whole number of blocks), as shown by the big arrow, and a pixel offset, shown by the little arrow.

In the address generator, the frame pointer, base block address and vector offset are added to form the address of the block to be fetched from the DRAM. If the pixel offset is zero only one request is generated. If there is an offset in either the x or y dimension then two requests are generated—the original block address and the one either immediately to the right or immediately below. With an offset in both x and y, four requests are generated. For each block which is to be fetched, the address generator calculates start and stop addresses parameters and passes these to the DRAM interface. The use of these start and stop addresses is best illustrated by an example, and is outlined below.

Figure 66:
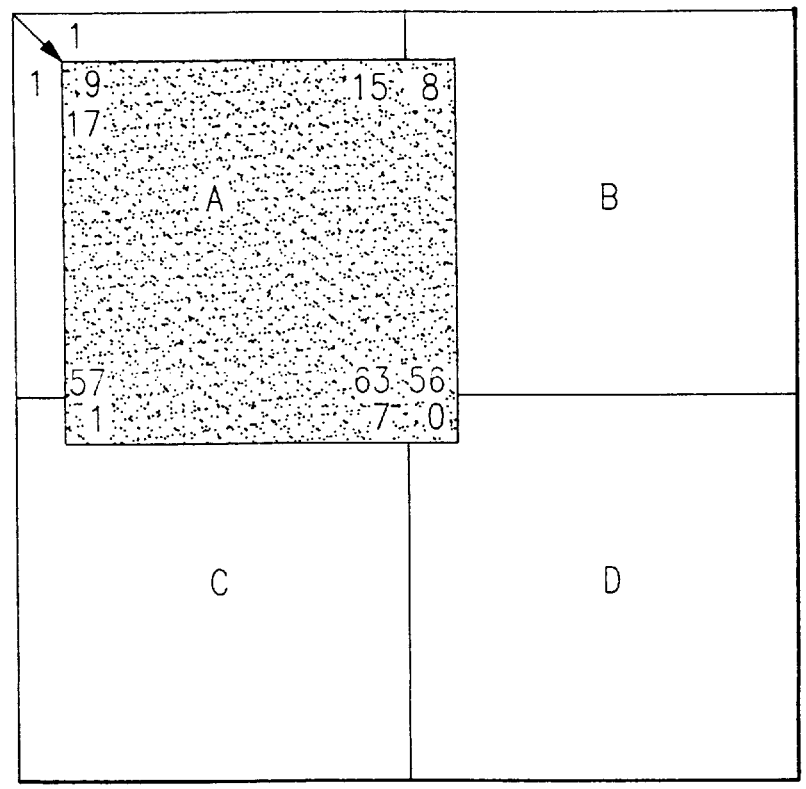
FIG. 66 illustrates a prediction example.

Consider a pixel offset of (1, 1), as illustrated by the shaded area in FIG. 66. The address generator makes four requests, labeled A through D in the figure. The problem to be solved is how to provide the required sequence of row addresses quickly. The solution is to use "start/stop" technology, and this is described below.

Consider block A in FIG. 66. Reading must start at position (1, 1) and end at position (7, 7). Assume for the moment that one byte is being read at a time (i.e. an 8 bit DRAM Interface). The x value in the coordinate pair forms the three LSBs of the address, the y value the three MSBs. The x and y start values are both 1, giving the address 9. Data is read from this address and the x value is incremented. The process is repeated until the x value reaches its stop value, at which point the y value is incremented by 1 and the x start value is reloaded, giving an address of 17. As each byte of data is read the x value is again incremented until it reaches its stop value. The process is repeated until both x and y values have reached their stop values. Thus, the address sequence of 9, 10, 11, 12, 13, 14, 15, 17, . . . , 23, 25, . . . , 31, 33, . . . , . . . , 57, . . . , 63 is generated.

In a similar manner, the start and stop coordinates for block B are: (1, 0) and (7, 0), for block C: (0, 1) and (0, 7), and for block D: (0, 0) and (0, 0).

The next issue is where this data should be written. Clearly, looking at block A, the data read from address 9 should be written to address 0 in the swing buffer, the data from address 10 to address 1 in the swing buffer, and so on. Similarly, the data read from address 8 in block B should be written to address 15 in the swing buffer and the data from address 16 into address 15 in the swing buffer. This function turns out to have a very simple implementation, outlined below.

Consider block A. At the start of reading, the swing buffer address register is loaded with the inverse of the stop value, the y inverse stop value forming the 3 MSBs and the x inverse stop value forming the 3 LSBs. In this case, while the DRAM Interface is reading address 9 in the external DRAM, the swing buffer address is zero. The swing buffer address register is then incremented as the external DRAM address register is incremented, as illustrated in Table B.13.1:

TABLE B.13.1

Illustration of Prediction Addressing

| Ext DRAM Address | Swing Buff Address | Ext DRAM Ad. (Binary) | Swing Buff Ad. (Binary) |
| --- | --- | --- | --- |
| 9 = y–start, x–start | 0 = $\overline{\text{y-stop}}$, $\overline{\text{x-stop}}$ | 001 001 | 000 000 |
| 10 | 1 | 111 110 | 000 001 |
| 11 | 2 | 001 011 | 000 010 |
| 15 | 6 | 001 111 | 000 110 |
| 17 = y+1, x–start | 8 = y+1, $\overline{\text{x-stop}}$ | 010 001 | 001 000 |
| 18 | 9 | 010 010 | 001 001 |

The discussion thus far has centered on an 8 bit DRAM Interface. In the case of a 16 or 32 bit interface a few minor modifications must be made. First, the pixel offset vector must be "clipped" so that it points to a 16 or 32 bit boundary. In the example we have been using, for block A, the first DRAM read will point to address 0, and data in addresses 0 through 3 will be read. Next, the unwanted data must be discarded. This is done by writing all the data into the swing buffer (which must now be physically bigger than was necessary in the 8 bit case) and reading with an offset. When performing MPEG half-pel interpolation, 9 bytes in x and/or y must be read from the DRAM Interface. In this case the address generator provides the appropriate start and stop addresses and some additional logic in the DRAM Interface is used, but there is no fundamental change in the way the DRAM Interface operates.

The final point to note about the Temporal Decoder DRAM Interface is that additional information must be provided to the prediction filters to indicate what processing is required on the data. This consists of the following:

a "last byte" signal indicating the last byte of a transfer (of 64, 72 or 81 bytes)

an H.261 flag a bidirectional prediction flag two bits to indicate the block's dimensions (8 or 9 bytes in x and y)

a two bit number to indicate the order of the blocks

The last byte flag can be generated as the data is read out of the swing buffer. The other signals are derived from the address generator and are piped through the DRAM Interface so that they are associated with the correct block of data as it is read out of the swing buffer by the prediction filter block.

SECTION B.14 UPI Documentation

B.14.1 Introduction

This document is intended to give the reader an appreciation of the operation of the microprocessor interface. The interface is basically the same on both the SPATIAL DECODER and the Temporal Decoder, the only difference being the number of address lines.

The logic described here is purely the microprocessor internal logic. The relevant schematics are:

UPI
UPI101
UPI102
DINLOGIC
DINCELL
UPIN
TDET
NONOVRLP
WRTGEN
READGEN
VREFCKT

The circuits UPI, UPI101, UPI102 are all the same except that the UPI01 has a 7 bit address input with the 8th bit hardwired to ground, while the other two have an 8 bit address input.

Input/Output Signals

The signals described here are a list of all the inputs and outputs (defined with respect to the UPI) to the UPI module, detailing the source or destination of these signals:

NOTRSTInputGlobal chip reset, active low, from Pad Input Driver.

E1InputEnable signal 1, active low, from the Pad Input Driver (Schmitt).

E2InputEnable signal 2, active low, from the Pad Input Driver (Schmitt).

RNOTWInputRead not Write signal from the Pad Input Driver (Schmitt).

ADDRIN[7:0]InputAddress bus signals from the Pad Input Drivers (Schmitt).

NOTDIN[7:0]InputInput data bus from the Input Pad Drivers of the Bi-directional Microprocessor Data pins (TTLin).

INT_RNOTWOutput The Internal Read not Write signal to the internal circuitry being accessed by microprocessor interface (See memory map).

INT_ADDR[7:0]Output The Internal Address Bus to all the circuits being accessed by the microprocessor interface (See memory map).

INTDBUS[7:0]Input/Output The Internal Data bus to all the circuits being accessed by the microprocessor interface (See the memory map) and also the microprocessor data output pads. The internal Data bus transfers data which is the inverse to that on the pins of the chip.

READ_STROutput An internal timing signal which indicates a read of a location in the device memory map.

WRITE_STROutput An internal timing signal which indicates a write of a location in the internal memory map.

TRISTATEDPADOutput An internal signal which connects to the microprocessor data output pads which indicates that they should be tristate.

General Comments

The UPI schematic consists of 6 smaller modules: NONOVRLP, UPIN, DINLOGIC, VREFCKT, READGEN, WRTGEN. It should be noted from the overall list of signals that there are no clock signals associated with the microprocessor interface other than the microprocessor bus timing signals which are asynchronous to all the other timing signals on the chip. Therefore no timing relationship should be assumed between the operation of the microprocessor and the rest of the device other than those that can be forced by external control. For instance, stopping of the System clock externally while accessing the microprocessor interface on a test system.

The other implication of not having a clock in the UPI is that some internal timing is self timed. That is the delay of some signals is controlled internally to the UPI block.

The overall function of the UPI is to take the address, data and enable and read/write signals from the outside world and format them so that they can drive the internal circuits correctly. The internal signals that define access to the memory map are INT_RNOTW, INT_ADDR[ . . . ], INTDBUS[ . . . ] and READ_STR and WRITE_STR. The timing relationship of these signals is shown below for a read cycle and a write cycle. It should be noted that although the datasheet definition and the following diagram always shows a chip enable cycle, the circuit operation is such that the enable can be held low and the address can be cycled to do successive read or write operations. This function is possible because of the address transition circuits.

Also the presence of the INT_RNOTW and the READ_STR, WRITE_STR does reflect some redundancy. It allows internal circuits to use either a separate READ_STR and WRITE_STR (and ignore INT_RNOTW) or to use the INT_RNOTW and a separate Strobe signal (Strobe signal being derived from OR of READ_STR and WRITE_STR).

The internal databus is precharged High during a read cycle and it also has resistive pullups so that for extended periods when the internal data bus is not driven it will default to the 0XFF condition. As the internal databus is the inverse of the data on the pins this translates to 0×00 on the external pins, when they are enabled. This means that if any external cycle accesses a register or a bit of a register which is a hole in the memory map, then the output data is determinate and is Low.

Circuit Details

UPIN

This circuit is the overall change detect block. It contains a sub-circuit called TDET which is a single bit change detect circuit. UPIN has a TDET module for each address bit and rnotw and for each enable signal. UPIN also contains some combinatorial logic to gate together the outputs of the change detect circuits. This gating generates the signals:

TRAN—which indicates a transition on one of the input signals, and

UPD-DONE—which indicates that transitions have been completed and a cycle can be performed.

CHIP_EN—which indicates that the chip has been selected.

TDET

This is the single bit change detect circuit. It consists of a 2 latches, and 2 exclusive OR. The first latch is clocked by the signal SAMPLE and the second by the signal UPDATE. These two non-overlapping signals come from the module NONOVRLP. The general operation is such that an input transition causes a CHANGE which in turn causes a SAMPLE. All input changes while SAMPLE is high are accepted and when input changes cease then CHANGE goes low and SAMPLE goes low which causes UPDATE to go high which then transfers data to the output latch and indicates UPD_DONE.

NONOVRLP

This circuit is basically a non-overlapping clock generator which inputs TRAN and generates SAMPLE and UPDATE. The external gating on the output of UPDATE stops UPDATE from going high until a write pulse has been completed.

DINLOGIC

This module consists of eight instances of the data input circuit DINCELL and some gating to drive the TRISTATE-PAD signal. This indicates that the output data port will only drive if Enable1 is low, Enable2 is low, RnotW is high and the internal read_str is high.

DINCELL

This circuit consists of the data input latch and a tristate driver to drive the internal databus. Data from the input pad is latched when the signal DATAHOLD is high and when both Enable1 and Enable2 are low. The tristate driver drives the internal data bus whenever the internal signal INT_RNOTW is low. The internal databus precharge transistor and the bus pullup are also included in this module.

WRTGEN

This module generates the WRITE_STR, and the latch signal DATAHOLD for the data latches. The write strobe is a self timed signal, however the self time delay is defined in the VREFCKT. The output from the timing circuit RESET-WRITE is used to terminate the WRITE_STR signal. It should be noted that the actual write pulse which writes a register only occurs after an access cycle is concluded. This is because the data input to the chip is sampled only on the back edge of the cycle, hence data is only valid after a normal access cycle has concluded.

READGEN

This circuit as its name suggests generates the READ_STR and it also generates the PRECH signal which is used to precharge the internal databus. The PRECH signal is also a self timed signal whose period is dependant on VREFCKT and also on the voltage on the internal databus. The READ_STR is not self timed but lasts from the end of the precharge period until the end of the cycle. The precharge circuitry uses inverters with their transfer characteristic biased so that they need a voltage of approximately 75% of supply before they invert. This circuit guarantees that the internal bus is correctly precharged before a READ_STR begins. In order to stop a PRECH pulse tending to zero width if the internal bus is already precharged, the timing circuit guarantees a minimum, width via the signal RESETREAD.

VREFCKT

The VREFCKT is the only circuit which controls the self timing of the interface. Both the delays, 1/Width of WRITE_STR and 2/Width of PRECH, are controlled by a current through a P transistor. The gate on this P transistor is controlled by a signal VREF and this voltage is set by a diffusion resistor of 25K ohm.

Timing Diagrams

The external timing diagrams are not specifically recreated here as they are defined in the datasheet. However the internal timing and the relation to the internal signals is defined.

PART C—Detailed Description

SECTION C.1 Overview

C.1.1. Introduction

Figure 67:
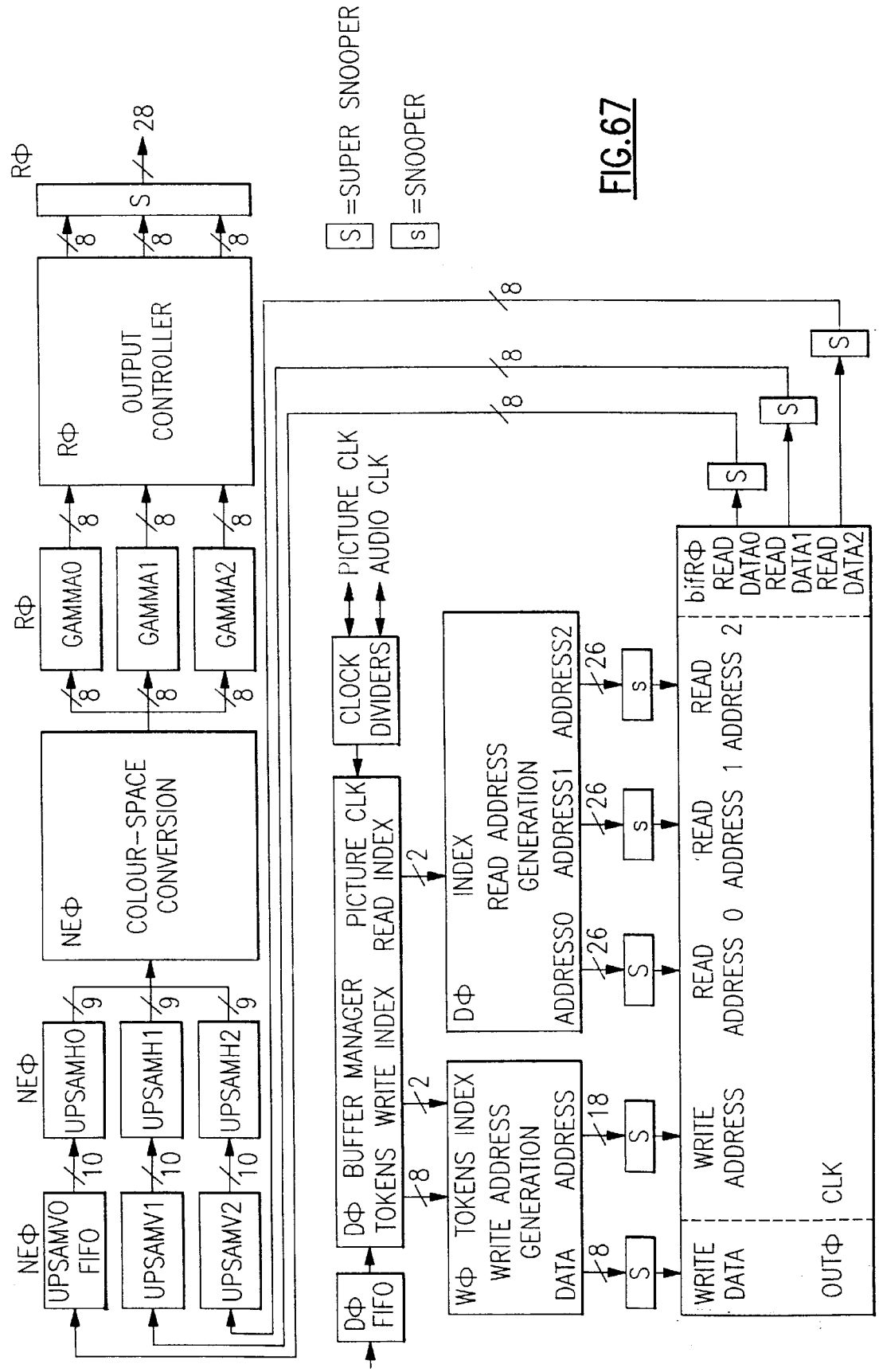
FIG. 67 is a detailed block diagram of a DRAM interface.

The Image Formatter is structured as shown in FIG. 67. There are two address generators, one for writing and one for reading, a buffer manager which supervises the two address generators and provides frame-rate conversion, a data processing pipeline, including both vertical and horizontal unsamplers, color-space conversion and gamma correction, and a final control block which regulates the output of the processing pipeline.

C.1.2 Buffer Manager

Tokens arriving at the input to the Image Formatter are buffered in the FIFO and transferred into the buffer manager. This block detects the arrival of new pictures and determines the availability of a buffer in which to store each one. If there is a buffer available, it is allocated to the arriving picture and its index is transferred to the write address generator. If there is no buffer available, the incoming picture will be stalled until one becomes free. All tokens are passed on to the write address generator.

Each time the read address generator receives a VSYNC signal from the display system, a request is made to the buffer manager for a new display buffer index. If there is a buffer containing complete picture data, and that picture is deemed ready for display, that buffer's index will be passed to the display address generator. If not, the buffer manager sends the index of the last buffer to be displayed. At start-up, zero is passed as the index until the first buffer is full.

A picture is ready for display if its number (calculated as each picture is input) is greater than or equal to the picture number which is expected at the display (presentation number) given the encoding frame rate. The expected number is determined by counting picture clock pulses, where picture clock can be generated either locally by the clock dividers, or externally. This technology allows frame-rate conversion (e.g., 2–3 pull-down).

External DRAM is used for the buffers, which can be either two or three in number. Three are necessary if frame-rate conversion is to be effected.

C.1.3 Write Address Generator

The write address generator receives tokens from the buffer manager and detects the arrival of each new DATA Token. As each arrives, it calculates a new address for the DRAM interface for storing the arriving block. The raw data is then passed to the DRAM interface where it is written into a swing buffer. DRAM addresses are block addresses, and pictures in the DRAM or organized as rasters of blocks. Incoming picture data, however, is actually organized sequences of macroblocks, so the address generation algorithm must take into account line-width (in blocks) offsets for the lower rows of blocks within a macroblock.

The arrival buffer index from the buffer manager is used to provide an address offset for the whole of the picture being stored. Also, each component is stored in a separate area within the specified buffer, so component offsets are also used in the calculation.

C.1.4 Read Address Generator

The Read Address Generator (dispaddr) does not receive or generate tokens, it generates addresses only. In response to a VSYNC, it may, depending on field_info, read_start, sync_mode, and lsb_invert, request a buffer index from the buffer manager. Having received an index, it generates three sets of addresses, one for each component, for the current picture to be read in raster order. Different setups allow for: interlaced/progressive display and/or data, vertical unsampling, and field synchronization (to an interlaced display). At the lower level the Read Address Generator converts base addresses into a sequence of block addresses and byte counts for each of the three components that are compatible with the page structure of the DRAM. The addresses provided to the DRAM interface are page and line addresses along with block start and block end counts.

C.1.5 Output Pipeline

Data from the DRAM interface feeds the output pipeline. The three component streams are first vertically interpolated, then horizontally interpolated. After the interpolators, the three components should be of equal ratios (4:4:4), and are passed through the color-space converter and color lookup tables/gamma correction. The output interface may hold the streams at this point until the display has reached an HSYSC. The output controller then directs the three components into one, two or three 8-bit buses, multiplexing as necessary.

C.1.6 Timing Regimes

There are basically two principal timing regimes associated with the Image Formatter: the system clock, which provides timing for the front end of the chip (address generators and buffer manager, plus the front end of the DRAM interface), and the pixel clock which drives all the timing for the back end (DRAM interface output, and the whole of the output pipeline).

Each of the two aforementioned clocks drives a number of on-chip clock generators: the FIFO, buffer manager and read address generator operate from the same clock (DO) with the write address generator using a similar, but separate, clock (Wφ). Data is clocked into the DRAM interface on an internal DRAM interface clock, (outφ). Dφ, Wφ and outφ are all generated from sysclk.

Read and write addresses are clocked in the DRAM interface by the DRAM interface's own clock.

Data is read out of the DRAM interface on bifRφ, and transferred to the section of the output pipeline named "bushy_ne" (north-east—by virtue of its physical location) which operates on clocks denoted by NEφ. The section of the pipeline from the gamma RAMs onward is clocked on a separate, but similar, clock (Rφ). bifRφ, NEφ and Rφ are all derived from the pixel clock, pixin.

For testing, all of the major interfaces between blocks have either snoopers or super-snoopers attached, depending on timing regimes and the type of access required. Block boundaries between separate but similar timing regimes have retiming latches associated with them.

SECTION C.2 Buffer Management

C.2.1. Introduction

The purpose of the buffer management block is to supply the address generators with indices indicating any of either two or three external buffers for writing and reading of picture data. The allocation of these indices is influenced by three principal factors, each representing the effect of one of the timing regimes in operation: the rate at which picture data arrives at the input to Image Formatter (coded data rate), the rate at which data is displayed (display data rate), and the frame rate of the encoded video sequence (presentation rate).

C.2.2 Functional Overview

A three-buffer system enables the presentation rate and the display rate to differ (e.g., 2–3 pulldown), so that frames are either repeated or skipped as necessary to achieve the best possible sequence of frames given the timing constraints of the system. Pictures which present some difficulty in decoding may also be accommodated in a similar way, so that if a picture takes longer than the available display time to decode, the previous frame will be repeated while everything else "catches up". In a two-buffer system the three timing regimes must be locked—it is the third buffer which provides the flexibility for taking up the slack.

The buffer manager operates by maintaining certain status information associated with each external buffer. This includes flags indicating if the buffer is in use, full of data, or ready for display, and the picture number within the sequence of the picture currently stored in the buffer. The presentation number is also recorded, this being a number which increments every time a picture clock pulse is received, and represents the picture number which is currently expected for display based on the frame rate of the encoded sequence.

An arrival buffer (a buffer to which incoming data will be written) is allocated every time a PICTURE_START token is detected at the input, and this buffer is then flagged as IN_USE. On PICTURE_END, the arrival buffer will be de-allocated (reset to zero) and the buffer flagged as either FULL or READY depending on the relationship between the picture number and the presentation number.

The display address generator requests a new display buffer, once every vsync, via a two-wire interface. If there is a buffer flagged as READY, then that will be allocated to display by the buffer manager. If there is no READY buffer, the previously displayed buffer will be repeated.

Each time the presentation number changes, this is detected and every buffer containing a complete picture is tested for READY-ness by examining the relationship between its picture number and the presentation number. Buffers are considered in turn, and when any of the buffers are deemed to be READY this automatically cancels the READY-ness of any which was previously flagged as READY, this then being flagged as EMPTY. This works because later picture numbers are stored, by virtue of the allocation scheme, in the buffers that are considered later.

TEMPORAL_REFERENCE tokens in H.261 should cause a buffer's picture number to be modified if skipped pictures in the input stream are indicated—this feature is not currently included, however. TEMPORAL-REFERENCE tokens in MPEG have no effect.

A FLUSH token causes the input to stall until every buffer is either EMPTY or has been allocated as the display buffer; presentation number and picture number are then reset and a new sequence can commence.

C.2.3 Architecture
C.2.3.1 Interfaces
C.2.3.1.1. Interface to bm Front All data is input to the buffer manager from the input FIFO, bm_front. This transfer takes place via a two-wire interface, the data being 8 bits wide plus an extension bit. All data arriving at the buffer manager is guaranteed to be complete tokens, a necessity for the continued processing of presentation numbers and display buffer requests in the event of significant gaps in the data upstream.

C.2.3.1.2 Interface to waddrgen

Tokens (8 bit data, 1 bit extension) are transferred to the write address generator via a two-wire interface. The arrival buffer index is also transferred on the same interface, so that the correct index is available for address generation at the same time as the PICTURE_START token arrives at waddrgen.

C.2.3.1.3 Interface to dispaddr

The interface to the read address generator comprises two separate two-wire interfaces which can be considered to act as "request" and "acknowledge" signals respectively. Single wires are not adequate, however, because of the two two-wire-based state machines at either end.

The sequence of events normally associated with the dispaddr interface is as follows: dis-paddr invokes a request, in response to a vsync from the display device, by asserting the drq_valid input to the buffer manager; when the buffer manager reaches an appropriate point in its state machine it will accept the request and go about allocating a buffer to be displayed; the disp_valid wire is then asserted, the buffer index is transferred, and this will normally be accepted immediately by dispaddr. There is an additional wire associated with this last two-wire interface (rst_fld) which indicates that the field number associated with the current index must be reset regardless of the previous field number.

C.2.3.1.4 Microprocessor Interface

The buffer manager block uses four bits of microprocessor address space, together with the 8-bit data bus and read and write strobes. There are two select signals, one indicating user-accessible locations and the other indicating test locations which should not require access under normal operating conditions.

C.2.3.1.5 Events

The buffer manager is capable of producing two different events: index found and late arrival. The first of these is asserted when a picture arrives and its PICTURE_START extension byte (picture index) matches the value written into the BU_BM_TARGET_IX register at setup. The second event occurs when a display buffer is allocated and its picture number is less than the current presentation number, i.e., the processing in the system pipeline up to the buffer manager has not managed to keep up with the presentation requirements.

C.2.3.1.6 Picture Clock

Picture clock is the clock signal for the presentation number counter and is either generated on-chip or taken from an external source (normally the display system). The buffer manager accepts both of these signals and selects one based on the value of pclk_ext (a bit in the buffer manager's control register). This signal also acts as the enable for the pad picoutpad, so that if the Image Formatter is generating its own picture clock this signal is also available as an output from the chip.

C.2.3.2. Major Blocks

The following sections describe the various hardware blocks that make up the buffer manager schematic (bmlogic).

C.2.3.2.1 Input/Output Block (bm input)

This module contains all of the hardware associated with the four two-wire interfaces of the buffer manager (input and output data, drq_valid/accept and disp_valid/accept). The input data register is here, together with some token decoding hardware attached to it. The signal vheader at the input to bm_tokdec is used to ensure that the token decoder outputs can only be asserted at a point where a header would be valid i.e., not in the middle of a token. The rtimd block acts as the output data registers, adjacent to the duplicate input data registers for the next block in the pipeline to account for timing differences due to different clock generators. Signals go and ngo are based on the AND of data valid, accept and not stopped, and are used elsewhere in the state machine to indicate if things are "bunged up" at either the input or the output.

The display index part of this module comprises the two-wire interfaces together with equivalent "go" signals as for data. The rst_fld bit also happens here, this being a signal which, if set, remains high until disp_valid has been high for one cycle and is then reset. rst_fld is set at reset and after a FLUSH token has caused all of the external buffers to be flagged either as EMPTY or IN_USE by the display buffer—the same point at which both picture numbers and presentation number are reset.

There is a small amount of additional circuitry associated with the input data register which appears at the next level up the hierarchy: this produces a signal which indicates that the input data register contains a value equal to that written into BU_BM_TARGIX and it is used for event generation.

C.2.3.2.2 Index Block (bm index)

The Index block consists mainly of the 2-bit registers denoting the various strategic buffer indices: arr_buf, the buffer to which arriving picture data is being written, disp_buf, the buffer from which picture data is being read for display, and rdy_buf, the index of the buffer containing the most up to date picture which could be displayed if a buffer was requested by dispaddr. There is also a register containing buf_ix, which is used as a general pointer to a buffer it is this which gets incremented ("D" input to mux) to cycle through the buffers examining their status, or which gets assigned the value of one of arr_buf, disp_buf or rdy_buf when the status needs changing. All of these registers (ph0 versions) are accessible from the microprocessor as part of the test address space. Old_ix is just a re-timed version of buf_ix, used for enabling buffer status and picture number registers in the bm_stus block. Both buf_ix and old_ix are decoded into three signals (each can hold the value 1 to 3) which are output from this block. Other outputs indicate whether buf_ix has the same value as either arr_buf or disp buf, and whether either of rdy_buf and disp_buf have the value zero. Zero is not a reference to a buffer—it indicates that there is no arrival/display/ready buffer currently allocated.

Arr_buf and disp_buf are enabled by their respective two-wire interface output accept registers.

Additional circuitry at the bmlogic level is used to determine if the current buffer index (buf_ix) is equal to the maximum index in use as defined by the value written into the control register at setup: a "1" in the control register indicates a three-buffer system, and a "0" indicates a two-buffer system.

C.2.3.2.3 Buffer Status

The main components here are status and picture number registers for each buffer. Each of the groups of three is a master-slave arrangement where the slaves are the banks of three registers, and the master is a single register whose output is directed to one of the slaves (switched, using register enables, by old_ix). One of the possible inputs to the master is multiplexed between the different slave outputs (indexed by buf_ix at the bmlogic level). Buffer status, which is decoded at the bmlogic level for use in the state machine logic, can take any of the values shown in Table C.2.1, or recirculate its previous value. Picture number can take the previous value or the previous value incremented by one (or one plus delta, the difference between actual and expected temporal reference, in the case of H.261). This value is supplied by the 8-bit adder present in the block. The first input to this adder is this_pnum, the picture number of the data currently being written.

TABLE C.2.1

Buffer Status Values

| Buffer Status | Value |
|---|---|
| EMPTY | 00 |
| FULL | 01 |
| READY | 10 |
| IN_USE | 11 |

This needs to be stored separately in its own master-slave arrangement so that any of the three buffer picture number registers can be easily updated based on the current (or previous) picture number rather than on their own previous picture number (which is almost always out of date). This_pnum is reset to −1 so that when the first picture arrives the output from the adder, and hence the input to the first buffer picture number register, is zero.

In the current version delta is connected to zero because of the absence of the temporal reference block which should supply the value.

C.2.3.2.4 Presentation Number

Figure 68:
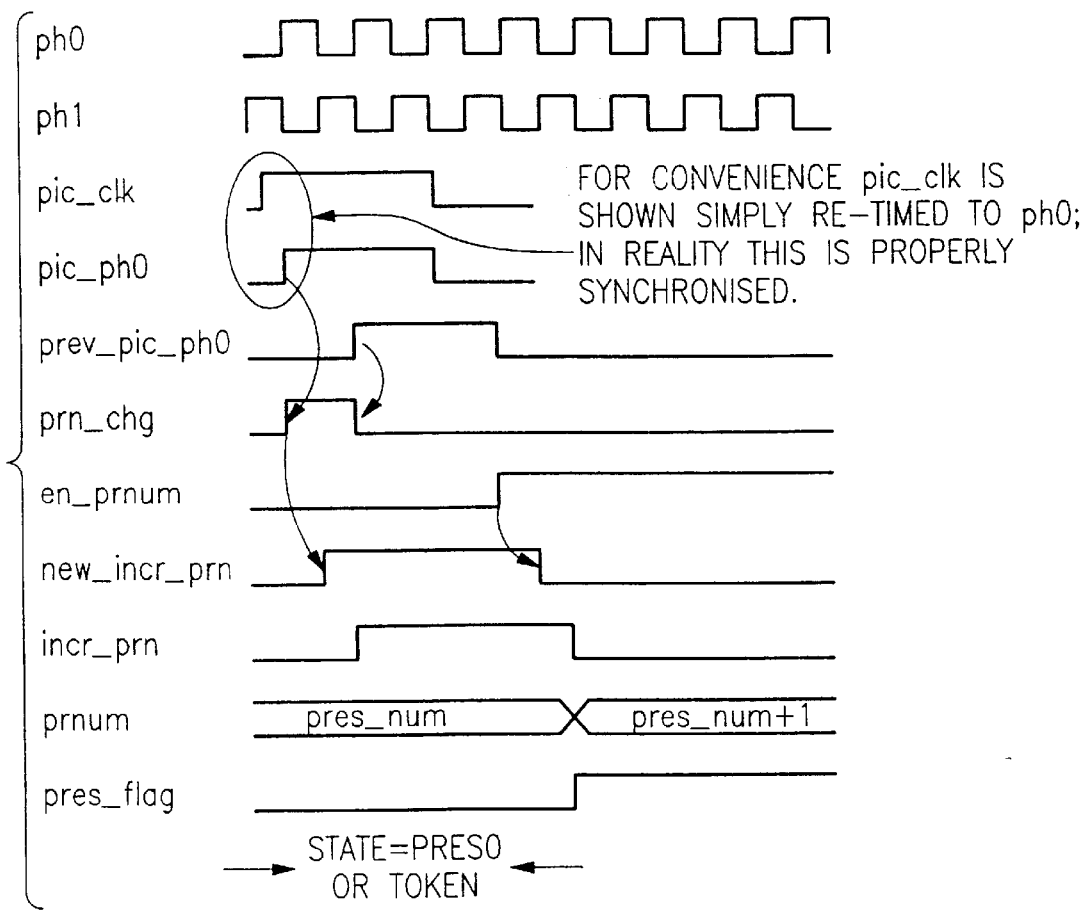
FIG. 68 is a timing diagram of the control for incrementing a presentation number.

The 8-bit presentation number register has an associated presentation flag which is used in the state machine to indicate that the presentation number has changed since it was last examined. This is necessary because the picture clock is essentially asynchronous and may be active during any state, not just those which are concerned with the presentation number. The rest of the circuitry in this block is concerned with detecting that a picture clock pulse has occurred and "remembering" this fact. In this way, the presentation number can be updated at a time when it is valid to do so. A representative sequence of events is shown in FIG. 68: the signal incr_prn goes active the cycle after the re-timed picture clock rising edge, and persists until a state is entered during which presentation number can be modified. This is indicated by the signal en_prnum. The reason for only allowing presentation number to be updated during certain states is that it is used to drive a significant amount of logic, including a standard-cell, not-very-fast 8-bit adder to provide the signal rdytst. It must therefore only be changed during states in which the subsequent state does not use the result.

C.2.3.2.5 Temporal Reference

The temporal reference block has been omitted from the current version of the Image Formatter, but its operation is described here for completeness.

The function of this block is to calculate delta, the difference between the temporal reference value received in a token in an H261 data stream, and the "expected" temporal reference (one plus the previous value). This allows frames to be skipped in H.261. Temporal reference tokens are ignored in any non-H.261 streams. The calculated value is used in the status block to calculate picture numbers for the buffers. The effect of omitting the block from bmlogic is that picture numbers will always be sequential in any sequence, even if the H261 stream indicates that some should be skipped.

The main components of the block (visible in the schematic bm_tref) are registers for tr, exptr and delta. tr is reset to zero and loaded, when appropriate, from the input data register; exptr is reset to −1, and is incremented by either 1 or delta during the sequence of temporal reference states; delta is reset to zero and is loaded with the difference between the other two registers. All three registers are reset after a FLUSH token. The adder in this block is used for calculation of both delta and exptr—a subtract and an add operation respectively—and is controlled by the signal delta_calc.

C.2.3.2.6 Control Registers (bm uregs)

Control registers for the buffer manager reside in the block bm_uregs. These are the access bit register, setup register (defining the maximum number of external buffers, and internal/external picture clock), and the target index register. The access bit is synchronized as expected. The signals stopd_0, stopd_1 and nstopd_1 are derived from the OR of the access bit and the two event stop bits. Upi address decoding for all of bmlogic is done by the block bm_udec, which takes the lower 4 bits of the upi data bus together with the 2 select signals from the Image Formatter top-level address decode.

C.2.3.2.7 Controlling State Machine

The state machine logic originally sat in its own block, bm_state. For code generation reasons, however, it has now been flattened and resides on sheet 2 of the bmlogic schematic.

The main sections of this logic are the state decoding, the generation of logic signals for the control of other bmlogic blocks, and the new state encoding, including the flags from_ps and from_fl which are used to select routes through the state machine. There are separate blocks to produce the mux control signals for bm_stus and bm_index.

Signals in the state machine hardware have been given simple alphabetic names for ease of typing and reference: they are all listed in Table C.2.2, together with the logic expressions which they represent. They also appear as comments in the behavioral M description of bmlogic (bmlogic.M).

an output each time one of its inputs changes.

C.2.3.3 Register Address Map

The buffer manager's address space is split into two areas: user-accessible and test, and there are therefore two separate enable wires derived from range decodes at the top-level. Table C.2.3 shows the user-accessible registers, and Table C.2.4 shows the contents of the test space.

TABLE C.2.2

Signal Names Used in the State Machine

| Signal Name | Logic Expression |
|---|---|
| A | ST_PRES1.presflg.(bstate==FULL).rdytst.(rdy==0).(ix==max) |
| B | ST_PRES1.presflg.(bstate==FULL).rdytst.(rdy==0).(ix!=max) |
| C | ST_PRES1.presflg.(bstate==FULL).rdytst.(rdy!=0) |
| D | ST_PRES1.presflg.!((bstate==FULL).rdytst).(ix==max) |
| E | ST_PRES1.presflg.!((bstate==FULL).rdytst).(ix!=max) |
| F | ST_PRES1.presflg |
| G | ST_DRQ.drq_valid.disp_acc.(rdy==0).(disp!=0) |
| PP | ST_DRQ.drq_valid.disp_acc.(rdy==0).(disp!=0).fromps |
| QQ | ST_DRQ.drq_valid.disp_acc.(rdy==0).(disp!=0).fromfl |
| RR | ST_DRQ.drq_valid.disp_acc.(rdy==0).(disp!=0).!(fromps+fromfl) |
| H | ST_DRQ.drq_valid.disp_acc.(rdy!=0).(disp!=0) |
| I | ST_DRQ.drq_valid.disp_acc.(rdy!=0).(disp==0) |
| J | ST_DRQ.drq_valid.disp_acc.(rdy==0).(disp==0).fromps |
| NN | ST_DRQ.drq_valid.disp_acc.(rdy==0).(disp==0).fromfl |
| OO | ST_DRQ.drq_valid.disp_acc.(rdy==0).(disp==0).!(fromps+fromfl) |
| K | ST_DRQ.!(drq_valid.disp_acc).fromps |
| LL | ST_DRQ.!(drq_valid.disp_acc).fromfl |
| MM | ST_DRQ.!(drq_valid.disp_acc).!(fromps+fromfl) |
| L | ST_TOKEN.ivr.oar.(idr==TEMPORAL_REFERENCE) |
| SS | ST_TOKEN.ivr.oar.(idr==TEMPORAL_REFERENCE).H261 |
| TT | ST_TOKEN.ivr.oar.(idr==TEMPORAL_REFERENCE).!H261 |
| M | ST_TOKEN.ivr.oar.(idr==FLUSH) |
| N | ST_TOKEN.ivr.oar.(idr==PICTURE_START) |
| O | ST_TOKEN.ivr.oar.(idr==PICTURE_END) |
| P | ST_TOKEN.ivr.oar.(idr==<OTHER_TOKEN>) |
| JJ | ST_TOKEN.ivr.oar.(idr==<OTHER_TOKEN>).in_extn |
| KK | ST_TOKEN.ivr.oar.(idr==<OTHER_TOKEN>).!in_extn |
| Q | ST_TOKEN.!(ivr.oar) |
| S | ST_PICTURE_END.(ix==arr).!rdytst.oar |
| T | ST_PICTURE_END.(ix==arr).rdytst.(rdy==0).oar |
| U | ST_PICTURE_END.(ix==arr).rdytst.(rdy!=0).oar |
| VV | ST_PICTURE_END.!oar |
| RorVV | ST_PICTURE_END.!((ix==arr).oar) |
| V | ST_TEMP_REF0.ivr.oar |
| W | ST_TEMP_REF0.!(ivr.oar) |
| X | ST_OUTPUT_TAIL.ivr.oar |
| FF | ST_OUTPUT_TAIL.ivr.oar.!in_extn |
| Y | ST_OUTPUT_TAIL.!(ivr.oar) |
| GG | ST_OUTPUT_TAIL.!(ivr.oar).in_extn |
| DD | ST_FLUSH.(ix==max).((bstate==VAC)+((bstate==USE).(ix==disp)) |
| Z | ST_FLUSH.(ix!=max).((bstate==VAC)+((bstate==USE).(ix==disp)) |
| DDorEE | !((bstate==VAC)+((bstate==USE).(ix==disp))+(ix==max) |
| AA | ST_ALLOC.(bstate==VAC).oar |
| BB | ST_ALLOC.(bstate!=VAC).(ix==max) |
| CC | ST_ALLOC.(bstate!=VAC).(ix!=max) |
| UU | ST_ALLOC.!oar |

C.2.3.2.8 Monitoring Operation (bminfo)

The module bminfo is included so that buffer status information, index values and presentation number can be observed during simulations. It is written in M and produces

TABLE C.2.3

User-Accessible Registers

| Register Name | Address | Bits | Reset State | Function |
|---|---|---|---|---|
| BU_BM_ACCESS | 0x10 | [0] | 1 | Access bit for buffer manager |

TABLE C.2.3-continued

User-Accessible Registers

| Register Name | Address | Bits | Reset State | Function |
| --- | --- | --- | --- | --- |
| BU_BM_CTL0 | 0x11 | [0] | 1 | Max buf isb: 1→3 |
|  |  | [1] | 1 | External picture clock select |
| BU_BM_TARGET_IX | 0x12 | [3:0] | 0x0 | For detecting arrival of picture |
| BU_BM_PRES_NUM | 0x13 | [7:0] | 0x00 | Presentation number |
| BU_BM_THIS_PNUM | 0x14 | [7:0] | 0xFF | Current picture number |
| BU_BM_PIC_NUM0 | 0x15 | [7:0] | none | Picture number in buffer 1 |
| BU_BM_PIC_NUM1 | 0x16 | [7:0] | none | Picture number in buffer 2 |
| BU_BM_PIC_NUM2 | 0x17 | [7:0] | none | Picture number in buffer 3 |
| BU_BM_TEMP_REF | 0x18 | [4:0] | 0x00 | Temporal reference from stream |

TABLE C.2.4

Test Registers

| Register Name | Address | Bits | Reset State | Function |
| --- | --- | --- | --- | --- |
| BU_BM_PRES_FLAG | 0x80 | [0] | 0 | Presentation flag |
| BU_BM_EXP_TR | 0x81 | [4:0] | 0xFF | Expected temporal reference |
| BU_BM_TR_DELTA | 0x82 | [4:0] | 0x00 | Delta |
| BU_BM_ARR_IX | 0x83 | [1:0] | 0x0 | Arrival buffer index |
| BU_BM_DSP_IX | 0x84 | [1:0] | 0x0 | Display buffer index |
| BU_BM_RDY_IX | 0x85 | [1:0] | 0x0 | Ready buffer index |
| BU_BM_BSTATE3 | 0x86 | [1:0] | 0x0 | Buffer 3 status |
| BU_BM_BSTATE2 | 0x87 | [1:0] | 0x0 | Buffer 2 status |
| BU_BM_BSTATE1 | 0x88 | [1:0] | 0x0 | Buffer 1 status |
| BU_BM_INDEX | 0x89 | [1:0] | 0x0 | Current buffer index |
| BU_BM_STATE | 0x8A | [4:0] | 0x00 | Buffer manager state |
| BU_BM_FROMPS | 0x8B | [0] | 0x0 | From PICTURE_START flag |
| BU_BM_FROMFL | 0x8C | [0] | 0x0 | From FLUSH_TOKEN flag |

C.2.4 Operation of the State Machine

Figure 69:
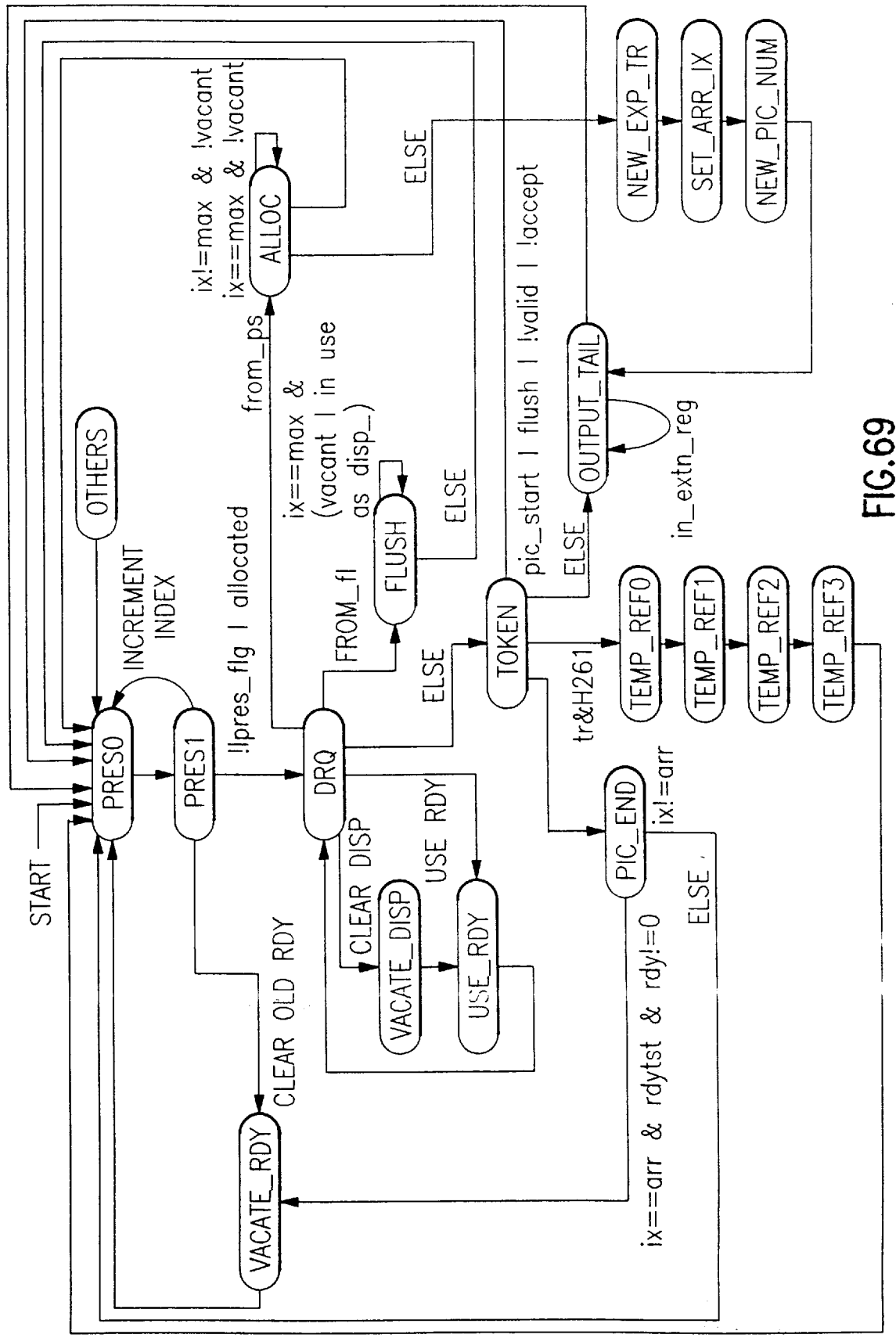
FIG. 69 is a state diagram of a buffer manager.

There are 19 states in the buffer manager's state machine, as detailed in Table C.2.5. These interact as shown in FIG. 69, and also as described in the behavioral description bmlogic.M.

TABLE C.2.5

Buffer States

| State | Value |
| --- | --- |
| PRES0 | 0x00 |
| PRES1 | 0x10 |
| ERROR | 0x1F |
| TEMP_REF0 | 0x04 |
| TEMP_REF1 | 0x05 |
| TEMP_REF2 | 0x06 |
| TEMP_REF3 | 0x07 |
| ALLOC | 0x03 |
| NEW_EXP_TR | 0x0D |
| SET_ARR_IX | 0x0E |
| NEW_PIC_NUM | 0x0F |
| FLUSH | 0x01 |
| DRQ | 0x0B |
| TOKEN | 0x0C |

TABLE C.2.5-continued

Buffer States

| State | Value |
| --- | --- |
| OUTPUT_TAIL | 0x08 |
| VACATE_RDY | 0x17 |
| USE_RDY | 0x0A |
| VACATE_DISP | 0x09 |
| PICTURE_END | 0x02 |

C.2.4.1 The Reset State

The reset state is PRES0, with flags set to zero such that the main loop is circulated initially.

C.2.4.2 The Main Loop

The main loop of the state machine comprises the states shown in Figure C.2.3 (highlighted in the main diagram—FIG. 69). States PRES0 and PRES1 are concerned with detecting a picture clock via the signal presflg. Two cycles are allowed for the tests involved since they all depend on the value of rdytst, the adder output signal described in C.2.3.2.4. If a presentation flag is detected, all of the buffers are examined for possible 'readiness', otherwise the state machine just advances to state DRQ. Each cycle around the PRES0–PRES1 loop examines a different buffer, checking for full and ready conditions. If these are met, the previous ready buffer (if one exists) is cleared, the new ready buffer is allocated and its status is updated. This process is repeated until all buffers have been examined (index==max buf) and the state then advances. A buffer is deemed to be ready for display when any of the following is true:

(pic_num>pres_num)&&((pic_num−pres_num)>=128) or (pic_num<pres_num)&&((pres_num−pic_num)<=128) or pic_num==pres_num State DRQ checks for a request for a display buffer drq_valid_reg && disp_acc_reg). If there is no request the state advances (normally to state TOKEN—more on this later), otherwise a display buffer index is issued as follows. If there is no ready buffer, the previous index is re-issued or, if there is no previous display buffer, a null index (zero) is issued. If a buffer is ready for display, its index is issued and its state is updated. If necessary the previous display buffer is cleared. The state machine then advances as before.

State TOKEN is the typical option for completing the main loop. If there is valid input and the output is not stalled, tokens are examined for strategic values (described in later sections), otherwise control returns to state PRES0.

Control only diverges from the main loop when certain conditions are met. These are described in the following sections.

C.2.4.3 Allocating the Ready Buffer Index

If during the PRES0–PRES1 loop a buffer is determined to be ready, any previous ready buffer needs to be vacated because only one buffer can be designated ready at any time. State VACATE_RDY clears the old ready buffer by setting its state to VACANT, and it resets the buffer index to 1 so that when control returns to the PRES0 state, all buffers will be tested for readiness. The reason for this is that the index is by now pointing at the previous ready buffer (for the purpose of clearing it) and there is no record of our intended new ready buffer index. It is necessary therefore to re-test all of the buffers.

C.2.4.4 Allocating the Display Buffer Index

Allocation of the display buffer index takes place either directly from state DRQ (state USE_RDY) or via state VACATE_DISP which clears the old display buffer state. The chosen display buffer is flagged as IN_USE, the value of rdy_buf is set to zero, and the index is reset to 1 to return to state DRQ. disp_buf is given the required index and the two-wire interface wires (disp_valid and drq_acc) are controlled accordingly. Control returns to state DRQ only so that the decision between states TOKEN, FLUSH and ALLOC does not need to be made in state USE_RDY.

C.2.4.5 Operation When PICTURE_END Received

On receipt of a PICTURE_END token control transfers from state TOKEN to state PICTURE_END where, if the index is not already pointing at the current arrival buffer, it is set to point there so that its status can be updated. Assuming both out_acc_reg and en_full are true, status can be updated as described below. If not, control remains in state PICTURE_END until they are both true. The en_full signal is supplied by the write address generator to indicate that the swing buffer has swung, i.e., the last block has been successfully written and it is therefore safe to update the buffer status.

The just-completed buffer is tested for readiness and given the status either FULL or READY depending on the result of the test. If it is ready, rdy_buf is given the value of its index and the set_la_ev signal (late arrival event) is set high (indicating that the expected display has got ahead in time of the decoding). The new value of arr_buf now becomes zero, and, if the previous ready buffer needs its status clearing, the index is set to point there and control moves to state VACATE_RDY. Otherwise, the index is reset to 1 and control returns to the start of the main loop.

C.2.4.6 Operation When PICTURE_START Received (Allocation of Arrival Buffer)

When a PICTURE_START token arrives during state TOKEN, the flag from_ps is set, causing the basic state machine loop to be changed such that state ALLOC is visited instead of state TOKEN. State ALLOC is concerned with allocating an arrival buffer (into which the arriving picture data can be written), and cycles through the buffers until it finds one whose status is VACANT. A buffer will only be allocated if out_acc_reg is high, since it is output on the data two-wire interface, so cycling around the loop will continue until this is the case. Once a suitable arrival buffer has been found, the index is allocated to arr_buf and its status is flagged as IN_USE. Index is set to 1, the flag from_ps is reset, and the state is set to advance to NEW_EXP_TR. A check is made on the picture's index (contained in the word following the PICTURE_START) to determine if it is the same as targ_ix (the target index specified at setup) and, if so, set_if+_ev (index found event) is set high.

The three states NEW_EXP_TR, SET_ARR_IX and NEW_PIC_NUM set up the new expected temporal reference and picture number for the incoming data. The middle state just sets the index to be arr_buf so that the correct picture number register is updated (this_pnum is also updated). Control then proceeds to state OUTPUT_TAIL which outputs data (assuming favorable two-wire interface signals) until a low extension is encountered at which point, the main loop is re-started. This means that whole data blocks (64 items) are output, in between which there are no tests for presentation flags or display requests.

C.2.4.7 Operation When FLUSH Received

A FLUSH token in the data stream indicates that sequence information (presentation number, picture number, rst_fld) should be reset. This can only occur when all of the data leading up to the FLUSH has been correctly processed and so it is necessary, having received a FLUSH, to monitor the status of all of the buffers until it is certain that all frames have been handed over to the display, i.e., all but one of the buffers have status EMPTY, and the other is IN_USE (as the display buffer). At that point a "new sequence" can safely be started.

When a FLUSH token is detected in state TOKEN, the flag from_fl is set, causing the basic state machine loop to be changed such that state FLUSH is visited instead of state TOKEN. State FLUSH examines the status of each buffer in turn, waiting for it to become VACANT or IN_USE as display. The state machine simply cycles around the loop until the condition is true, then increments its index and repeats the process until all of the buffers have been visited. When the last buffer fulfills the condition, presentation number, picture number and all of the temporal reference registers assume their reset values; rst_fld is set to 1. The flag from_fl is reset and the normal main loop operation is resumed.

C.2.4.8 Operation When TEMPORAL_REFERENCE Received

When a TEMPORAL_REFERENCE token is encountered, a check is made on the H261 bit and, if set, the four states TEMP_REF0 to TEMP_REF3 are visited. These perform the following operations:

TEMP_REF0:temp_ref=in_data_reg;
TEMP_REF1:delta=temp_ref-exp_tr;index=arr_buf;
TEMP_REF2:exp_tr=delta+exp_tr;
TEMP_REF3:pic_num[i]=this_pnum+delta;index=1.

C.2.4.9 Other Tokens and Tails

State TOKEN passes control to state OUTPUT_TAIL in all cases other than those outlined above; control remains here until the last word of the token is encountered (in_extn_reg is low) and the main loop is then re-entered.

C.2.5 Applications Notes

C.2.5.1 State Machine Stalling Buffer Manager Input

The requirement to repeatedly check for the "asynchronous" timing events of picture clock and display buffer request, and the necessity of having the buffer manager input stalled during these checks, means that when there is a continuous supply of data at the input to the buffer manager, there will be a restriction on the data rate through the buffer manager. A typical sequence of states may be PRES0, PRES1, DRQ, TOKEN, OUTPUT_TAIL, each, with the exception of OUTPUT_TAIL, lasting one cycle. This means that for each block of 64 data items, there will be an overhead of 3 cycles during which the input is stalled (during states PRES0, PRES1 and DRQ) thereby slowing the write rate by 3/64 or approximately 5%. This number may occasionally increase to up to 13 cycles of overhead when auxiliary branches of the state machine are executed under worst-case conditions. Such large overheads will only apply on a once-per-frame basis.

C.2.5.2 Presentation Number Behavior During an Access

The late change to the bm_pres schematic as described in C.2.3.2.4 means that presentation number free-runs during upi accesses. If presentation number is required to be the same when access is relinquished as it was when access was gained, this can be effected by reading presentation number after access is granted, and writing it back just before it is relinquished. This is asynchronous, so it may be desirable to repeat the accesses several times to be sure they are effective.

C.2.5.3 H261 Temporal Reference Numbers

The module bm_tref has been omitted (in error) from the bmlogic schematic. This means that H261 temporal reference values will not be correctly processed. The delta input to the bm_stus module has been tied to zero (rather than delta as would be supplied by bm_tref): this means that frames are always assumed to be sequential.

SECTION C.3 Write Address Generation

C.3.1 Introduction

The function of the write address generation hardware is to produce block addresses for data to be written away to the buffers. This takes account of buffer base addresses, the component indicated in the stream, horizontal and vertical sampling within a macroblock, picture dimensions, and coding standard. Data arrives in macroblock form, but must be stored so that lines may be retrieved easily for display.

C.3.2 Functional Overview

Each time a new block arrives in the data stream (indicated by a DATA token), the write address generator is required to produce a new block address. It is not necessary to produce the address immediately, because up to 64 data words can be stored by the DRAM interface (in the swing buffer) before the address is actually needed. This means that the various address components can be added to a running total in successive cycles, hence obviating the need for any hardware multipliers. The macroblock counter function is effected by storing strategic terminal values and running counts in the register file, these being the operands for comparisons and conditional updates after each block address calculation.

Considering the picture format shown in FIG. 70, expected address sequences can be derived for both standard and H261-like data streams. These are shown below. The format does not actually conform to the H261 specification because the slices are not wide enough (3 macroblocks rather than 11), but the same "half-picture-width-slice" concept is used here for convenience and the sequence is assumed to be "H.261-type". Data arrives as full macroblocks—4:2:0 in the example shown—and each component is stored in its own area of the specified buffer.

Standard address sequence:
000,001,00C,00D,100,200;
002,003,00E,00F,101,201;
004,005,010,011,102,202;
006,007,012,013,103,203;
008,009,014,015,104,105;
00A,00B,016,017,105,205;
018,019,024,025,106,107;
01A,01B,026 . . .
080,081,08C,08D,122,222;
082,083,08E,08F,123,223;
H261-type sequence:
000,001,00C,00D,100,200;
002,003,00E,00F,101,201;
004,005,010,011,102,202;
018,019,024,025,106,107;
01A,01B,026,027,107,207;
01C,01D,028,029,108,208;
030,031,03C,03D,10C,20C;
032,033,03E,03F,10D,20D;
034,035,040,041,10E,20E;
006,007,012,013,103,203;
008,009,014,015,104,105;
00A,00B,016,017,105,205;
01E,01F,02A,02B,109,209;
020,021,02C,02D,10A,20A;
022,023,02E,02F,10B,20B;
036,037,042,043,10F,20F;
038,039,044,045,110,210;
03A,03B,046,047,111,211;
048,049,054,055,112,212;
04A,04B,056 . . .
06A,06B,076,077,11D,21D;
07E,07F,08A,08B,121,221;
080,081,08C,08D,122,222;
082,083,08E,08F,123,223;

C.3.3 Architecture

C.3.3.1 Interfaces

C.3.3.1.1 Interface to Buffer Manager

The buffer manager outputs data, and the buffer index, directly to the write address generator. This is performed under the control of a two-wire-interface. In some senses, it is possible to consider the write address generator block as an extension of the buffer manager, because the two are very closely linked. They do, however, operate from two separate (but similar) clock generators.

C.3.3.1.2 Interface to dramif

The write address generator provides data and addresses for the DRAM interface. Each of these has their own two-wire-interface, and the dramif uses each of them in different clock regimes. In particular the address is clocked into the dramif on a clock which is not related to the write address generator clock—it is therefore synchronized at the output.

C.3.3.1.3 Microprocessor Interface

The write address generator uses three bits of microprocessor address space, together with 8-bit data bus and read and write strobes. There is a single select bit for register access.

C.3.3.1.4 Events

The write address generator is capable of producing five different events. Two are in response to picture size information appearing in the data stream (hmbs and vmbs), and three are in response to DEFINE_SAMPLING tokens (one event for each component).

C.3.3.2 Basic Structure

The structure of the write address generator is shown in the schematic waddrgen.sch. It comprises a datapath, some controlling logic, and snoopers and synchronization.

C.3.3.2.1 The Datapath (bwadpath)

The datapath is of the type described in Chapter C.5 of this document, comprising an 18-bit adder/subtractor and register file (see C.3.3.4), and producing a zero flag (based on the adder output) for use in the control logic.

C.3.3.2.2 The Controlling Logic

The controlling logic consists of hardware to generate all of the register file load and drive signals, the adder control signals, the two-wire-interface signals, and also includes the writable control registers.

C.3.3.2.3 Snoopers and Synchronization

Super snoopers exist on both the data and address ports—snoopers in the datapaths, controlled as super-snoopers from the zcells. The address has synchronization between the write address generator clock and the dramif's "clk" regime. Syncifs are used in the zcells for the two-wire interface signals, and simplified synchronizers are used in the datapath for the address.

C.3.3.3 Controlling Logic and State Machine

C.3.3.3.1 Input/Output Block (wa inout)

This block contains the input and two output two-wire interfaces, together with latches for the input data (for token decode) and arrival buffer index (for decoding four ways).

C.3.3.3.2 Two Cycle Control Block (wa fc)

The flag fc (first cycle) is maintained here, indicating whether the state machine is in the middle of a two-cycle operation (i.e., an operation involving an add).

C.3.3.3.3. Component Count (wa comp)

Separate addresses are required for data blocks in each component, and this block maintains the current component under consideration based on the type of DATA header received in the input stream.

C.3.3.3.4 Modulo-3 Control (wa mod3)

When generating address sequences for H261 data streams, it is necessary to count three rows of macroblocks to half way along the screen (see C.3.2). This is effected by maintaining a modulo-3 counter, incremented each time a new row of macroblocks is visited.

C.3.3.3.5 Control Registers (wa uregs)

Module wa_uregs contains the setup register and the coding standard register—the latter is loaded from the data stream. The setup register uses 3 bits: QCIF (lsb) and the maximum component expected in the data stream (bits 1 and 2). The access bit also resides in this block (synchronized as usual), with the "stopped" bits being derived at the next level up the hierarchy (walogic) as the OR of the access bit and the event stop bits. Microprocessor address decoding is done by the block wa_udec which takes read and write strobes, a select wire, and the lower two bits of the address bus,

C.3.3.3.6 Controlling State Machine (wa state)

The logic in this block is split into several distinct areas: the sate decode, new state encode, derivation of "intermediate" logic signals, datapath control signals (drivea, driveb, load, adder controls and select signals), multiplexer controls, two-wire-interface controls, and the five event signals.

C.3.3.3.7 Event Generation

The five event bits are generated as a result of certain tokens arriving at the input. It is important that, in each case, the entire token is received before any events are generated because the event service routines perform calculations based on the new values received. For this reason, each of the bits is delayed by a whole cycle before being input to the event hardware.

C.3.3.4 Register Address Map

There are two sets of registers in the write address generator block: top-level setup type registers located in the standard cell section, and keyholed datapath registers. These are listed in Table C.3.1 and C.3.2 respectively.

TABLE C.3.1

Top-Level Registers

| Register Name | Address | Bits | Reset State | Function |
| --- | --- | --- | --- | --- |
| BU_WADDR_COD_STD | 0x4 | 2 | 0 | Cod std from data stream |
| BU_WADDR_ACCESS | 0x5 | 1 | 0 | Access bit |
| BU_WADDR_CTL1 | 0x6 | 3 | 0 | max component [2:1] and QCIF[0] |
| BU_WA_ADDR_SNP2 | 0xB0 | 8 | | snooper on the write address generator address o/p |
| BU_WA_ADDR_SNP1 | 0xB1 | 8 | | |
| BU_WA_ADDR_SNP0 | 0xB2 | 8 | | |
| BU_WA_DATA_SNP1 | 0xB4 | 8 | | snooper on data output of WA |
| BU_WA_DATA_SNP0 | 0xB5 | 8 | | |

TABLE C.3.2

Image Formatter Address Generator Keyhole

| Keyhole Register Name | Keyhole Address | Bits | Comments |
| --- | --- | --- | --- |
| BU_WADDR_BUFFER0_BASE_MSB | 0x85 | 2 | Must be |
| BU_WADDR_BUFFER0_BASE_MID | 0x86 | 8 | Loaded |
| BU_WADDR_BUFFER0_BASE_LSB | 0x87 | 8 | |
| BU_WADDR_BUFFER1_BASE_MSB | 0x89 | 2 | Must be |
| BU_WADDR_BUFFER1_BASE_MID | 0x8a | 8 | Loaded |
| BU_WADDR_BUFFER1_BASE_LSB | 0x8b | 8 | |
| BU_WADDR_BUFFER2_BASE_MSB | 0x8d | 2 | Must be |
| BU_WADDR_BUFFER2_BASE_MID | 0x8e | 8 | Loaded |
| BU_WADDR_BUFFER2_BASE_LSB | 0x8f | 8 | |
| BU_WADDR_COMP0_HMBADDR_MSB | 0x91 | 2 | Test only |
| BU_WADDR_COMP0_HMBADDR_MID | 0x92 | 8 | |
| BU_WADDR_COMP0_HMBADDR_LSB | 0x93 | 8 | |
| BU_WADDR_COMP1_HMBADDR_MSB | 0x95 | 2 | Test only |

TABLE C.3.2-continued

Image Formatter Address Generator Keyhole

| Keyhole Register Name | Keyhole Address | Bits | Comments |
|---|---|---|---|
| BU_WADDR_COMP1_HMBADDR_MID | 0x96 | 8 | |
| BU_WADDR_COMP1_HMBADDR_LSB | 0x97 | 8 | |
| BU_WADDR_COMP2_HMBADDR_MSB | 0x99 | 2 | Test only |
| BU_WADDR_COMP2_HMBADDR_MID | 0x9a | 8 | |
| BU_WADDR_COMP2_HMBADDR_LSB | 0x9b | 8 | |
| BU_WADDR_COMP0_VMBADDR_MSB | 0x9d | 2 | Test only |
| BU_WADDR_COMP0_VMBADDR_MID | 0x9e | 8 | |
| BU_WADDR_COMP0_VMBADDR_LSB | 0x9f | 8 | |
| BU_WADDR_COMP1_VMBADDR_MSB | 0xa1 | 2 | Test only |
| BU_WADDR_COMP1_VMBADDR_MID | 0xa2 | 8 | |
| BU_WADDR_COMP1_VMBADDR_LSB | 0xa3 | 8 | |
| BU_WADDR_COMP2_VMBADDR_MSB | 0xa5 | 2 | Test only |
| BU_WADDR_COMP2_VMBADDR_MID | 0xa6 | 8 | |
| BU_WADDR_COMP2_VMBADDR_LSB | 0xa7 | 8 | |
| BU_WADDR_VBADDR_MSB | 0xa9 | 2 | Test only |
| BU_WADDR___VBADDR_MID | 0xaa | 8 | |
| BU_WADDR_VBADDR_LSB | 0xab | 8 | |
| BU_WADDR_COMP0_HALF_WIDTH_IN_BLOCKS_MSB | 0xad | 2 | Must be |
| BU_WADDR_COMP0_HALF_WIDTH_IN_BLOCKS_MID | 0xae | 8 | Loaded |
| BU_WADDR_COMP0_HALF_WIDTH_IN_BLOCKS_LSB | 0xaf | 8 | |
| BU_WADDR_COMP1_HALF_WIDTH_IN_BLOCKS_MSB | 0xb1 | 2 | Must be |
| BU_WADDR_COMP1_HALF_WIDTH_IN_BLOCKS_MID | 0xb2 | 8 | Loaded |
| BU_WADDR_COMP1_HALF_WIDTH_IN_BLOCKS_LSB | 0xb3 | 8 | |
| BU_WADDR_COMP2_HALF_WIDTH_IN_BLOCKS_MSB | 0xb5 | 2 | Must be |
| BU_WADDR_COMP2_HALF_WIDTH_IN_BLOCKS_MID | 0xb6 | 8 | Loaded |
| BU_WADDR_COMP2_HALF_WIDTH_IN_BLOCKS_LSB | 0xb7 | 8 | |
| BU_WADDR_HB_MSB | 0xb9 | 2 | Test only |
| BU_WADDR_HB_MID | 0xba | 8 | |
| BU_WADDR_HB_LSB | 0xbb | 8 | |
| BU_WADDR_COMP0_OFFSET_MSB | 0xbd | 2 | Must be |
| BU_WADDR_COMP0_OFFSET_MID | 0xbe | 8 | Loaded |
| BU_WADDR_COMP0_OFFSET_LSB | 0xbf | 8 | |
| BU_WADDR_COMP1_OFFSET_MSB | 0xc1 | 2 | Must be |
| BU_WADDR_COMP1_OFFSET_MID | 0xc2 | 8 | Loaded |
| BU_WADDR_COMP1_OFFSET_LSB | 0xc3 | 8 | |
| BU_WADDR_COMP2_OFFSET_MSB | 0xc5 | 2 | Must be |
| BU_WADDR_COMP2_OFFSET_MID | 0xc6 | 8 | Loaded |
| BU_WADDR_COMP2_OFFSET_LSB | 0xc7 | 8 | |
| BU_WADDR_SCRATCH_MSB | 0xc9 | 2 | Test only |
| BU_WADDR_SCRATCH_MID | 0xca | 8 | |
| BU_WADDR_SCRATCH_LSB | 0xcb | 8 | |
| BU_WADDR_MBS_WIDE_MSB | 0xcd | 2 | Must be |
| BU_WADDR_MBS_WIDE_MID | 0xce | 8 | Loaded |
| BU_WADDR_MBS_WIDE_LSB | 0xcf | 8 | |
| BU_WADDR_MBS_HIGH_MSB | 0xd1 | 2 | Must be |
| BU_WADDR_MBS_HIGH_MID | 0xd2 | 8 | Loaded |
| BU_WADDR_MBS_HIGH_LSB | 0xd3 | 8 | |
| BU_WADDR_COMP0_LAST_MB_IN_ROW_MSB | 0xd5 | 2 | Must be |
| BU_WADDR_COMP0_LAST_MB_IN_ROW_MID | 0xd6 | 8 | Loaded |
| BU_WADDR_COMP0_LAST_MB_IN_ROW_LSB | 0xd7 | 8 | |
| BU_WADDR_COMP1_LAST_MB_IN_ROW_MSB | 0xd9 | 2 | Must be |
| BU_WADDR_COMP1_LAST_MB_IN_ROW_MID | 0xda | 8 | Loaded |
| BU_WADDR_COMP1_LAST_MB_IN_ROW_LSB | 0xdb | 8 | |
| BU_WADDR_COMP2_LAST_MB_IN_ROW_MSB | 0xdd | 2 | Must be |
| BU_WADDR_COMP2_LAST_MB_IN_ROW_MID | 0xde | 8 | Loaded |
| BU_WADDR_COMP2_LAST_MB_IN_ROW_LSB | 0xdf | 8 | |
| BU_WADDR_COMP0_LAST_MB_IN_HALF_ROW_MSB | 0xe1 | 2 | Must be |
| BU_WADDR_COMP0_LAST_MB_IN_HALF_ROW_MID | 0xe2 | 8 | Loaded |
| BU_WADDR_COMP0_LAST_MB_IN_HALF_ROW_LSB | 0xe3 | 8 | |
| BU_WADDR_COMP1_LAST_MB_IN_HALF_ROW_MSB | 0xe5 | 2 | Must be |
| BU_WADDR_COMP1_LAST_MB_IN_HALF_ROW_MID | 0xe6 | 8 | Loaded |
| BU_WADDR_COMP1_LAST_MB_IN_HALF_ROW_LSB | 0xe7 | 8 | |
| BU_WADDR_COMP2_LAST_MB_IN_HALF_ROW_MSB | 0xe9 | 2 | Must be |
| BU_WADDR_COMP2_LAST_MB_IN_HALF_ROW_MID | 0xea | 8 | Loaded |
| BU_WADDR_COMP2_LAST_MB_IN_HALF_ROW_LSB | 0xeb | 8 | |
| BU_WADDR_COMP0_LAST_ROW_IN_MB_MSB | 0xed | 2 | Must be |
| BU_WADDR_COMP0_LAST_ROW_IN_MB_MID | 0xee | 8 | Loaded |
| BU_WADDR_COMP0_LAST_ROW_IN_MB_LSB | 0xef | 8 | |
| BU_WADDR_COMP1_LAST_ROW_IN_MB_MSB | 0xf1 | 2 | Must be |
| BU_WADDR_COMP1_LAST_ROW_IN_MB_MID | 0xf2 | 8 | Loaded |
| BU_WADDR_COMP2_LAST_ROW_IN_MB_LSB | 0xf3 | 8 | |
| BU_WADDR_COMP2_LAST_ROW_IN_MB_MSB | 0xf5 | 2 | Must be |
| BU_WADDR_COMP2_LAST_ROW_IN_MB_MID | 0xf6 | 8 | Loaded |
| BU_WADDR_COMP2_LAST_ROW_IN_MB_LSB | 0xf7 | 8 | |

TABLE C.3.2-continued

Image Formatter Address Generator Keyhole

| Keyhole Register Name | Keyhole Address | Bits | Comments |
|---|---|---|---|
| BU_WADDR_COMP0_BLOCKS_PER_MB_ROW_MSB | 0xf9 | 2 | Must be |
| BU_WADDR_COMP0_BLOCKS_PER_MB_ROW_MID | 0xfa | 8 | Loaded |
| BU_WADDR_COMP0_BLOCKS_PER_MB_ROW_LSB | 0xfb | 8 | |
| BU_WADDR_COMP1_BLOCKS_PER_MB_ROW_MSB | 0xfd | 2 | Must be |
| BU_WADDR_COMP1_BLOCKS_PER_MB_ROW_MID | 0xfe | 8 | Loaded |
| BU_WADDR_COMP1_BLOCKS_PER_MB_ROW_LSB | 0xff | 8 | |
| BU_WADDR_COMP2_BLOCKS_PER_MB_ROW_MSB | 0x101 | 2 | Must be |
| BU_WADDR_COMP2_BLOCKS_PER_MB_ROW_MID | 0x102 | 8 | Loaded |
| BU_WADDR_COMP2_BLOCKS_PER_MB_ROW_LSB | 0x103 | 8 | |
| BU_WADDR_COMP0_LAST_MB_ROW_MSB | 0x105 | 2 | Must be |
| BU_WADDR_COMP0_LAST_MB_ROW_MID | 0x106 | 8 | Loaded |
| BU_WADDR_COMP0_LAST_MB_ROW_LSB | 0x107 | 8 | |
| BU_WADDR_COMP1_LAST_MB_ROW_MSB | 0x109 | 2 | Must be |
| BU_WADDR_COMP1_LAST_MB_ROW_MID | 0x10a | 8 | Loaded |
| BU_WADDR_COMP1_LAST_MB_ROW_LSB | 0x10b | 8 | |
| BU_WADDR_COMP2_LAST_MB_ROW_MSB | 0x10d | 2 | Must be |
| BU_WADDR_COMP2_LAST_MB_ROW_MID | 0x10e | 8 | Loaded |
| BU_WADDR_COMP2_LAST_MB_ROW_LSB | 0x10f | 8 | |
| BU_WADDR_COMP0_HBS_MSB | 0x111 | 2 | Must be |
| BU_WADDR_COMP0_HBS_MID | 0x112 | 8 | Loaded |
| BU_WADDR_COMP0_HBS_LSB | 0x113 | 8 | |
| BU_WADDR_COMP1_HBS_MSB | 0x115 | 2 | Must be |
| BU_WADDR_COMP1_HBS_MID | 0x116 | 8 | Loaded |
| BU_WADDR_COMP1_HBS_LSB | 0x117 | 8 | |
| BU_WADDR_COMP2_HBS_MSB | 0x119 | 2 | Must be |
| BU_WADDR_COMP2_HBS_MID | 0x11a | 8 | Loaded |
| BU_WADDR_COMP2_HBS_LSB | 0x11b | 8 | |
| BU_WADDR_COMP0_MAXHB | 0x11f | 2 | Must be |
| BU_WADDR_COMP1_MAXHB | 0x123 | 2 | Loaded |
| BU_WADDR_COMP2_MAXHB | 0x127 | 2 | |
| BU_WADDR_COMP0_MAXVB | 0x12b | 2 | Must be |
| BU_WADDR_COMP1_MAXVB | 0x12f | 2 | Loaded |
| BU_WADDR_COMP2_MAXVB | 0x133 | 2 | |

The keyhole registers fall broadly into two categories: those which must be loaded with picture size parameters prior to any address calculation, and those which contain running totals of various (horizontal and vertical) block and macroblock counts. The picture size parameters may be loaded in response to any of the interrupts generated by the write address generator, i.e., when any of the picture size or sampling tokens appear in the data stream. Alternatively, if the picture size is known prior to receiving the data stream, they can be written just after reset. Example setups are given in Section C.13, and the picture size parameter registers are defined in the next section.

C.3.4 Programming the Write Address Generator

Figure 71:
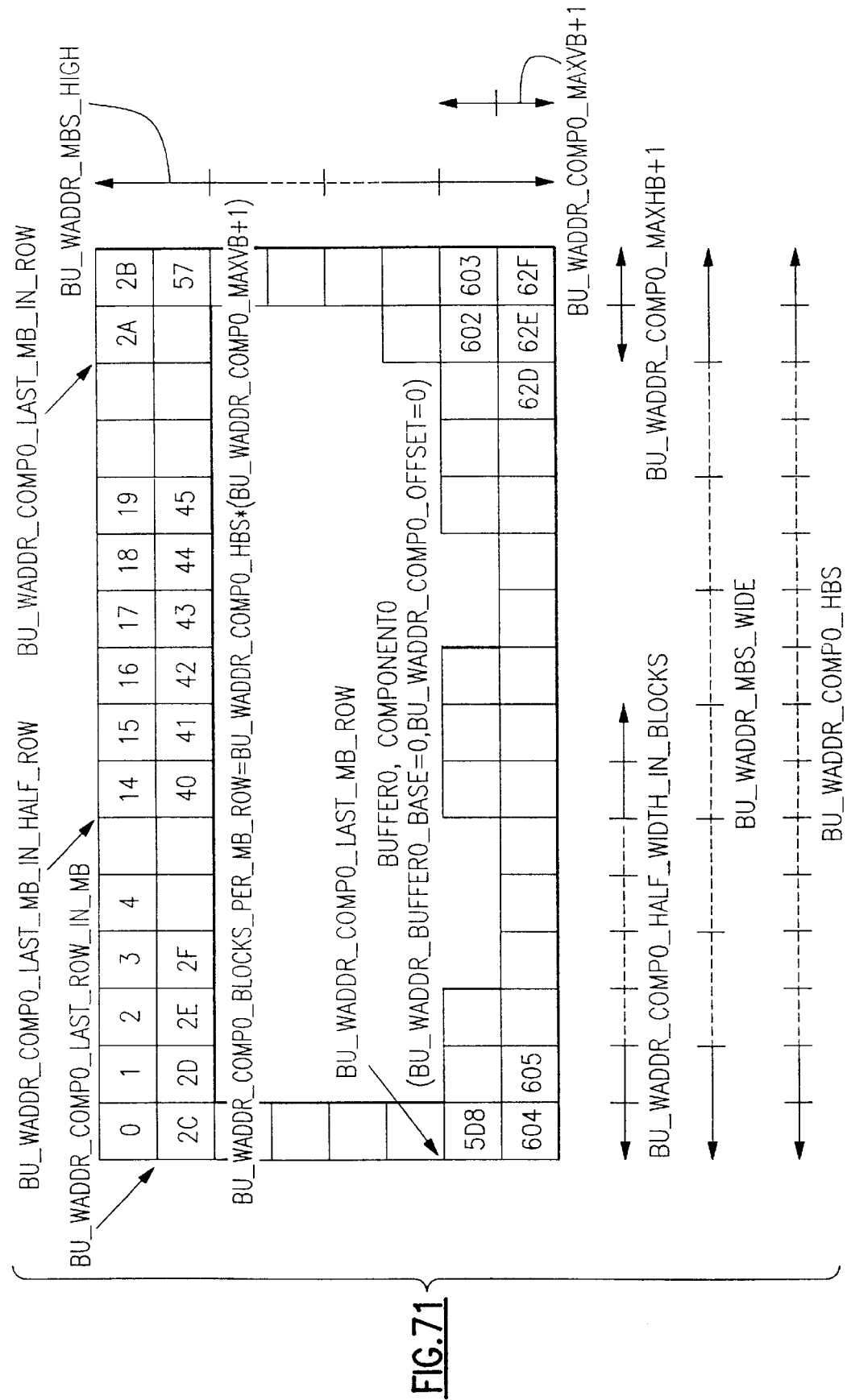
FIG. 71 illustrates a buffer containing a 22 by 18 macroblock SIF picture.

The following datapath registers must contain the correct picture size information before address calculation can proceed. They are illustrated in FIG. 71.

1) WADDR_HALF_WIDTH_IN_BLOCKS: this defines the half width, in blocks, of the incoming picture.
2) WADDR_MBS_WIDE: this defines the width, in macroblocks, of the incoming picture.
3) WADDR_MBS_HIGH: this defines the height, in macroblocks, of the incoming picture.
4) WADDR_LAST_MB_IN_ROW: this defines the block number of the top left hand block of the last macroblock in a single, full-width row of macroblocks. Block numbering starts at zero in the top left corner of the left-most macroblock, increases across the frame with each block and subsequently with each following row of blocks within the macroblock row.
5) WADDR_LAST_MB_IN_HALF_ROW: this is similar to the previous item, but defines the block number of the top left block in the last macroblock in a half-width row of macroblocks.
6) WADDR_LAST_ROW_IN_MB: this defines the block number of the left most block in the last row of blocks within a row of macroblocks.
7) WADDR_BLOCKS_PER_MB_ROW: this defines the total number of blocks contained in a single, full-width row of macroblocks.
8) WADDR_LAST_MB_ROW: this defines the top left block address of the left-most macroblock in the last row of macroblocks in the picture.
9) WADDR_HBS: this defines the width in blocks of the incoming picture.
10) WADDR_MAXHB: this defines the block number of the right-most block in a row of blocks in a single macroblock.
11) WADDR_MAXVB: this defines the height-1, in blocks, of a single macroblock.

In addition, the registers defining the organization of the DRAM must be programmed. These are the three buffer base registers, and the n component offset registers, where n is the number of components expected in the data stream (it can be defined in the data stream, and can be 1 minimum and 3 maximum).

Many of the parameters specify block numbers or block addresses. This is because the final address is expected to be a block address, and the calculation is based on a cumulative algorithm.

275

The screen configuration illustrated in FIG. 71 yields the following register values:
1) WADDR_HALF_WIDTH_IN_BLOCKS =0x16
2) WADDR_MBS_WIDE=0x16
3) WADDR_MBS_HIGH=0x12
4) WADDR_LAST_MB_IN_ROW=0x2A
5) WADDR_LAST_MB_IN_HALF_ROW=0x14
6) WADDR_LAST_ROW_IN_MB=0x2C
7) WADDR_BLOCKS_PER_MB_ROW=0x58
8) WADDR_LAST_MB_ROW=0x5D8
9) WADDR_HBS=0x2C
10) WADDR_MAXVB=1
11) WADDR_MAXHB=1

C.3.5 Operation of the State Machine

Figure 72:
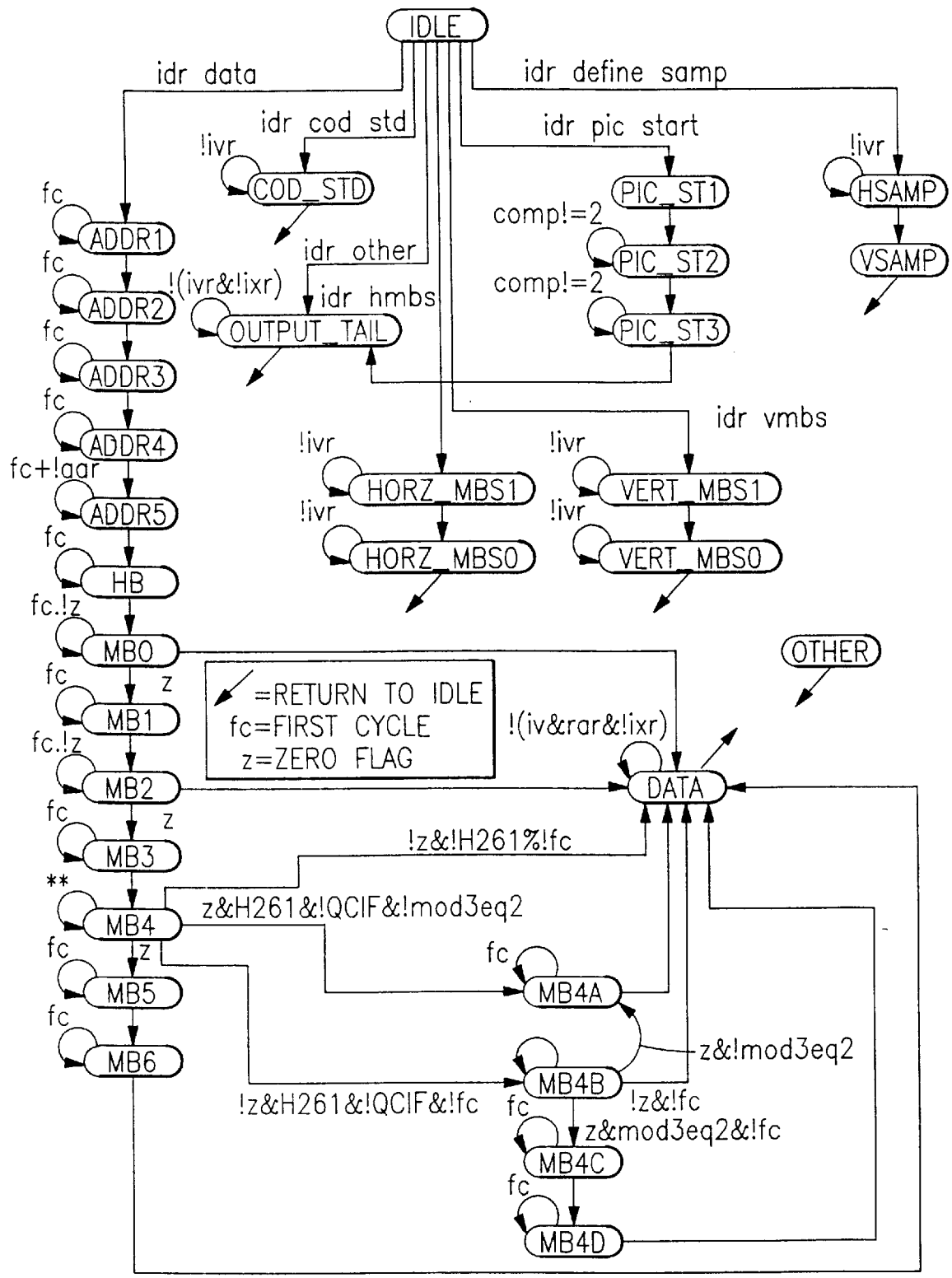
FIG. 72 is a state diagram showing write address generation.

There are 19 states in the buffer manager's state machine, as detailed in Table C.3.3. These interact as shown in FIG. 72, and also as described in the behavioral description, bmlogic.M.

TABLE C.3.3

Write Address Generator States

| State | Value |
|---|---|
| IDLE | 0x00 |
| DATA | 0x10 |
| CODING_STANDARD | 0x0C |
| HORZ_MBS0 | 0x07 |
| HORZ_MBS1 | 0x06 |
| VERT_MBS0 | 0x0B |
| VERT_MBS1 | 0x0A |
| OUTPUT_TAIL | 0x08 |
| HB | 0x11 |
| MB0 | 0x1D |
| MB1 | 0x12 |
| MB2 | 0x1E |
| MB3 | 0x13 |
| MB4 | 0x0E |
| MB5 | 0x14 |
| MB6 | 0x15 |
| MB4A | 0x18 |
| MB4D | 0x18 |
| ADDR1 | 0x16 |
| ADDR2 | 0x16 |
| ADDR3 | 0x16 |
| ADDR4 | 0x16 |
| ADDR5 | 0x16 |
| HSAMP | 0x05 |
| VSAMP | 0x04 |
| PIC_ST1 | 0x0f |
| PIC_ST2 | 0x01 |
| PIC_ST3 | 0x02 |

C.3.5.1 Calculation of the Address

The major section of the write address generator state machine is illustrated down the left hand side of FIG. 72. On receipt of a DATA token, the state machine moves from state IDLE to state ADDR1 and then through to state ADDR5, from which an 18-bit block address is output with two-wire-interface controls. The calculations performed by the states ADDR1 through to ADDR5 are:

BU_WADDR_SCRATCH=BU_BUFFERn_BASE+ BU_COMPm_OFFSET;
BU_WADDR_SCRATCH=BU_WADDR_SCRATCH+BU_WADDR_VMBADDR;
BU_WADDR_SCRATCH=BU_WADDR-SCRATCH+BU_WADDR_HMBADDR;
BU_WADDR_SCRATCH=BU_WADDR_SCRATCH+BU_WADDR_VBADDR;

276 out_addr=BU_WADDR_SCRATCH+BU_WADDR_HB;

The registers used are defined as follows:

1) BU_WADDR_VMBADDR: the block address (the top left block) of the leftmost macroblock of the row of macroblocks in which the block whose address is being calculated is contained.
2) BU_WADDR_HMBADDR: the block address (top left block) of the top macroblock of the column of macroblocks in which the block whose address is being calculated is contained.
3) BU_WADDR_VBADDR: the block address, within the macroblock row, of the left-most block of the row of blocks in which the block whose address is being calculated is contained.
4) BU_WADDR_HB: the horizontal block number, within the macroblock, of the block whose address is being calculated.
5) BU_WADDR_SCRATCH: the scratch register used for temporary storage of intermediate results.

Considering FIG. 73, and taking, for example, the calculation of the block whose address is 0x62D, the following sequence of calculations will take place;

SCRATCH=BUFFERn_BASE+COMPm_OFFSET; (assume 0)
SCRATCH=0+0x5D8;
SCRATCH=0x5D8+0x28;
SCRATCH=0x600+0x2C;
block address=0x62C+1=0x62D;

The contents of the various registers are illustrated in the Figure.

C.3.5.2 Calculation of New Screen Location Parameters

When the address has been output, the state machine continues to perform calculations in order to update the various screen location parameters described above. The states HB and MBO through to MB6 do the calculations, transferring control at some point to state DATA from which the remainder of the DATA Token is output.

These states proceed in pairs, the first of a pair calculating the difference between the current count and its terminal value and hence generating a zero flag. The second of the pair either resets the register or adds a fixed (based on values in the setup registers derived from screen size) offset. In each case, if the count under consideration has reached its terminal value (i.e., the zero flag is set), control continues down the "MB" sequence of states. If not, all counts are deemed to be correct (ready for the next address calculation) and control transfers to state DATA.

All states which involve the use of an addition or subtraction take two cycles to complete (allowing the use of a standard, ripple-carry adder), this being effected by the use of a flag, fc (first cycle) which alternates between 1 and 0 for adder-based states.

All of the address calculation and screen location calculation states allow data to be output assuming favorable two-wire interface conditions.

C.3.5.2.1 Calculations for Standard (MPEG-style) Sequences

The sequence of operations is as follows (in which the zero flag is based on the output of the adder):

```
    states HB and MBO:
    scratch = hb - maxhb;
    if (z)
        hb = 0;
    else
    (
        hb = hb + 1
        new_state = DATA;
    )
    states MB1 and MB2:
    scratch = vb_addr - last_row_in_mb;
    if (z)
        vb_addr = 0;
    else
    (
        vb_addr = vb_addr + width_in_blocks;
        new_state = DATA;
    )
    states MB3 and MB4:
    scratch = hmb_addr - last_mb_in_row;
    if (z)
        hmb_addr = 0;
    else
    (
        hmb_addr = hmb_addr + maxhb;
        new_state = DATA;
    )
    states MB5 and MB6:
    scratch = vmb_addr - last_mb_row;
    if (!z)
        vmb_addr = vmb_addr + blocks_per_mb_row;
    (vmb_addr is reset after a PICTURE_START token is
    detected, rather than when the end of a picture is inferred
    from the calcuations).
``` when the end of a picture is inferred from the calculations).
C.3.5.2.2 Calculations for H.261 Sequences The sequence for H261 calculations diverges from the standard sequence at state MB4:

```
states HB and MBO:-as above
states MB1 and MB2:-as above
states MB3 and MB4:
scratch = hmb_addr - last_mb_in_row;
if (z & (mod3==2)) /*end of slice on right of screen*/
(
    hmb_addr = 0;
    new_state = MB5;
)
else if (z) /*end of row on right of screen*/
(
    hmb_addr = half_width_in_blocks;
    new_state = MB4A;
)
else
(
    scratch = hmb_addr - last_mb_in_half_row;
    new-state = MB4B;
)
state MB4A:
vmb_addr = vmb_addr + blocks_per_mb_row;
new_state = DATA;
state (MB4) and MB4B:
(scratch = hmb_addr - last_mb_in_half_row;)
if (z & (mod3==2)) /*end of slice on left of screen*/
{
    hmb_addr = hmb_addr + maxhb;
    new_state = MB4C;
}
else if (z) /*end of row on left of screen*/
{
    hmb_addr = 0;
    new_state = MB4A;
}
else
{
    hmb_addr = hmb_addr + maxhb;
    new_state = DATA;
}
states MB4C and MB4D:
vmb_addr = vmb_addr - blocks_per_mb_row;
vmb_addr = vmb_addr - blocks_per_mb_row;
new_state = DATA;
states MB5and MB6:-as above
```

C.3.5.3 Operation on PICTURE_START Token

When a PICTURE_START token is received, control passes to state PIC_ST1 where the vb_addr register (BU_WADDR_VBADDR) is reset to 0. Each of states PIC_ST2 and PIC_ST3 are then visited, once for each component, resetting hmb_addr and vmb_addr, respectively. Control then returns, via state OUTPUT_TAIL, to IDLE.

C.3.5.4 Operation on DEFINE_SAMPLING Token

When a DEFINE_SAMPLING token is received, the component register is loaded with the least significant two bits of the input data. And through states HSAMP and VSAMP, the maxhb and maxvb registers for that component are loaded. Furthermore, the appropriate define sampling event bit is triggered (delayed by one cycle to allow the whole token to be written).

C.3.5.5 Operation on HORIZONTAL_MBS and VERTICAL_MBS

When each of HORIZONTAL_MBS and VERTICAL_MBS arrive, the 14-bit value contained in the token is written, in two cycles, to the appropriate register. The relevant event bit is triggered, delayed by one cycle.

C.3.5.6 Other Tokens

The CODING_STANDARD token is detected and causes the top-level BU_WADDR_COD_STD register to be written with the input data. This is decoded and the nh261 flag (not H261) is hardwired to the buffer manager block. All other tokens cause control to move to state OUTPUT_TAIL, which accepts data until the token finishes. It does not actually output any data.

SECTION C.4 Read Address Generator

C.4.1 Overview

The read address generator consists of four state machine/datapath blocks. The first, "dline", generates line addresses and distributes them to the other three (one for each component) identical page/block address generators, "dramctls". All blocks are linked by two wire interfaces. The modes of operation include all combinations of interlaced/progressive, first field upper/lower, and frame start on upper/lower/both. The Table C.3.4 shows the names, addresses, and reset states of the dispaddr control registers, and Chapter C.13 gives a programming example for both address generators.

C.4.2 Line Address Generator (dline)

This block calculates the line start addresses for each component. Table C.3.4 shows the 18 bit datapath registers in dline.

Note the distinction between DISP_register_name and ADDR_register_name. DISP_name registers are in dispaddr only which means that the register is specific to the display area to be read out of the DRAM. ADDR_name means that the register describes something about the structure of the external buffers.

Operation

The basic operation of dline, ignoring all modes repeats etc. is:

```
if (vsync_start)/* first active cycle of vsync*/
(
comp = 0
DISP_VB_CNT_COMP[comp]=0;
LINE[comp]=BUFFER_BASE[comp]+0;
LINE[comp]=LINE[comp]+DISP_COMP_OFFSET[comp];
while (VB_CNT_COMP[comp]<DISP_VBS_COMP[comp]
(
while (line_count[comp]<8)
(
while (comp<3)
(
→OUTPUT LINE[comp]to dramctl[comp]
LINE[comp]=LINE[comp]+ADDR_HBS_COMP[comp];
comp = comp + 1;
)
line_count[comp]=line_count[comp]+1;
)
VB_CNT_COMP[comp]=VB_CNT_COMP[comp]+1;
line_count[comp]==0;
)
)
```

The above operation is modified by the dispaddr control registers which are shown in the Table C.4.3 below.

TABLE C.3.4

Dispaddr Datapath Registers

| Register Names | Bus | Keyhole Address | Description | Comments |
|---|---|---|---|---|
| BUFFER_BASE0 | A | 0x00,01,02,03 | Block address | These registers |
| BUFFER_BASE1 | A | 0x04,05,06,07 | of the start of | must be loaded |
| BUFFER_BASE2 | A | 0x08,09,0a,0b | each buffer. | by the upi before |
| DISP_COMP_OFFSET0 | B | 0x24,25,26,27 | Offsets from the | operation can |
| DISP_COMP_OFFSET1 | B | 0x28,29,2a,2b | buffer base to | begin. |
| DISP_COMP_OFFSET2 | B | 0x2c,2d,2e,2f | where reading begins. | |
| DISP_VBS_COMP0 | B | 0x30,31,32,33 | Number of | |
| DISP_VBS_COMP1 | B | 0x34,35,36,37 | vertical blocks | |
| DISP_VBS_COMP2 | B | 0x38,39,3a,3b | to be read | |
| ADDR_HBS_COMP0 | B | 0x3c,3d,3e,3f | Number of | |
| ADDR_HBS_COMP1 | B | 0x40,41,42,43 | horizontal | |
| ADDR_HBS_COMP2 | B | 0x44,45,46,4 | blocks IN THE DATA | |
| LINE0 | A | 0x0c,0d,0e,0f | Current line | These registers |
| LINE1 | A | 0c10,11,12,13 | address | are temporary |
| LINE2 | A | 0x14,15,16,17 | | locations used |
| DISP_VB_CNT_COMP0 | A | 0x18,19,1a,1b | Number of | by dispaddr. |
| DISP_VB_CNT_COMP1 | A | 0x1c,1d,1e,1f | vertical blocks | All |
| DISP_VB_CNT_COMP2 | A | 0x20,21,22,23 | remaining to be read. | registers are R/W from the upi |

C.4.3 Dline Control Registers

TABLE C.4.3

DISPADDR CONTROL REGISTERS

| Register Name | Address | Bits | Reset State | Function |
|---|---|---|---|---|
| LINES_IN_LAST_ROW0 | 0x08 | [2:0] | 0x07 | These three registers |
| LINES_IN_LAST_ROW1 | 0x09 | [2:0] | 0x07 | determine the number of |
| LINES_IN_LAST_ROW2 | 0x0a | [2:0] | 0x07 | lines (out of 8) of the last row of blocks to read out |
| DISPADDR_ACCESS | 0x0b | [0] | 0x00 | Access bit for dispaddr |
| DISPADDR_CTL0 | 0x0c | [1:0] | 0x0 | SYNC_MODE |
| See below for a detailed | | [2] | 0x0 | READ_START |
| description of these | | [3] | 0x1 | INTERLACED/PROG |
| control bits | | [4] | 0x0 | LSB_INVERT |

TABLE C.4.3-continued
DISPADDR CONTROL REGISTERS

| Register Name | Address | Bits | Reset State | Function |
|---|---|---|---|---|
| DISPADDR_CTL1 | 0x0d | [7:5] | 0x0 | LINE_RPT |
|  |  | [0] | 0x1 | COMP0HOLD |

C.4.3.1 LINES_IN_LAST_ROW[component]

These three registers determine, for each component, the number of lines in the last row of blocks that are to be read. Thus the height of the read window may be an arbitrary number of lines. This is a redundant feature on the whole, considering that the top, left and right edges of the window must be on block boundaries, and the output controller can clip (discard) excess lines.

C.4.3.2 DISPADDR_ACCESS

This is the access bit for the whole of dispaddr. On writing a "1" to this location, dispaddr is halted synchronously to the clocks. The value read back from the access bit will remain "0" until dispaddr has safely halted. Having reached this state, it is safe to perform asynchronous upi accesses to all the dispaddr registers. The upi is actively locked out from the datapath registers until the access bit is "1". In order that access to dispaddr to be achieved without disrupting the current display or datapath operation, access will only given and released under the following circumstances.

Stopping: Access will only be granted if the datapath has finished its current two cycle operation (if it were doing one), and the "safe" signal from the output controller is high. This signal represents the area on the screen below the display window and is programmed in the output controller (not dispaddr). It is therefore necessary to program the output controller before trying to gain access to dispaddr.

Starting-Access will only be released when "safe" is high, or during vsync. This ensures that display will not start too close to the active window.

This scheme allows the controlling software to request access, poll until end of display, modify dispaddr, and release access. If the software is too slow and doesn't release the access bit until after vsync, dispaddr will not start until the next safe period. Border color will be displayed during this "lost" picture.

C.4.3.3 DISPADDR_CTL0[7:0]

When reading the following descriptions it is important to understand the distinction between interlaced data and an interlaced display.

Interlaced data can be of two forms. The Top-Level Registers supports field-pictures (each buffer contains one field), and frames (each buffer contains an entire frame—interlaced or not)

DISPADDR_CTL0[7:0] contains the following control bits:

SYNC_MODE[1:0]

With an interlaced display, vsyncs referring to top and bottom fields are differentiated by the field_info pin. field_info=HIGH meaning the top field. These two control bits determine which vsyncs dispaddr will request a new display buffer from the buffer manager and thus synchronize the fields in the buffers (if the data were interlaced) with the fields on the display:

0: New Display Buffer On Top Field
1: Bottom Field
2: Both Fields
3: Both Fields At startup, dispaddr will request a buffer from the buffer manager on every vsync, and, until a buffer is ready, will receive a zero (no display) buffer. When it finally gets a good buffer index, dispaddr has no idea where it is on the display. It may therefore be necessary to synchronize the display startup with the correct vsync.

READ_START

For interlaced displays at startup. This bit determines on which vsync display will actually start. Having received a display buffer index, dispaddr may "sit out" the current vsync in order to line up fields on the display with the fields in the buffer.

INTERLACED/PROGRESSIVE

0: Progressive
1: Interlaced

In progressive mode, all lines are read out of the display area of the buffer.

In interlaced mode, only alternate lines are read. Whether reading starts on the first or second line depends on field_info. With (interlaced) field-pictures, the system wants to read all lines from each buffer so the setting of this bit would be progressive. The mapping between field_info and first/second line start may be inverted by lsb_invert. LSB_INVERT When set, this bit inverts the field_info signal seen by the line counter. Thus reading may be started on the correct line of a frame and aligned to the display regardless of the convention adopted by the encoder, the display or the Top-Level Registers.

LINE RPT[2:0]

Each bit, when set, causes the lines of the corresponding component to be read twice (bit 0 affects component 0 etc.). This forms the first part of the vertical unsampling. It is used in the 8 times chroma upsampling required for conversion from QCIF to 601.

COMP0HOLD

This bit is used to program the ratio of the number of lines to be read (as opposed to displayed) for component 0 to those of components 1 and 2).

0: Same number of lines, i.e., 4:4:4 data in the buffers.
1: Twice as many component 0 lines, i.e., 4:2:0.

Page/Block Address Generators (dramctls)

When passed a line address, these blocks generate a series of page/line addresses and blocks to read along the line. The minimum page width of 8 blocks is always assumed and the resulting outputs consist of a page address, a 3 bit line number, a 3 bit block start, and a 3 bit block stop address.

(The line number is calculated by dline and passed through the dramctls unmodified). Thus to read out 48 pixels of line 5 form page Oxaa starting from the third block from the left (an arbitrary point along an arbitrary line), the addresses passed to the DRAM interface would be:

| | |
|---|---|
| Page | = 0xaa |
| Line | = 5 |
| Block start | = 2 |
| Block stop | = 7 |

Each of these three machines has 5 datapath registers. These are shown in Table C.3.4. The basic behaviour of each dramctl is:

```
while (true)
{
CNT_LEFT=0;
GET_A_NEW_LINE_ADDRESS from dline;
BLOCK_ADDR=input_block_addr + 0;
PAGE_ADDR=input_page_addr + 0;
CNT_LEFT=DISP_HBS + 0;
while (CNT_LEFT>BLOCKS_LEFT)
{
BLOCKS_LEFT=8-BLOCK_ADDR;
→output PAGE_ADDR,start=BLOCK_ADDR,stop=7.
PAGE_ADDR=PAGE_ADDR + 1;
BLOCK_ADDR=0;
CNT_LEFT=CNT_LEFT-BLOCKS_LEFT;
}
/*Last Page of line*/
CNT_LEFT=CNT_LEFT + BLOCK_ADDR;
CNT_LEFT=CNT_LEFT-1;
→output PAGE_ADDR,start=BLOCK_ADDR,stop=CNT_LEFT
}
```

Figure 74:
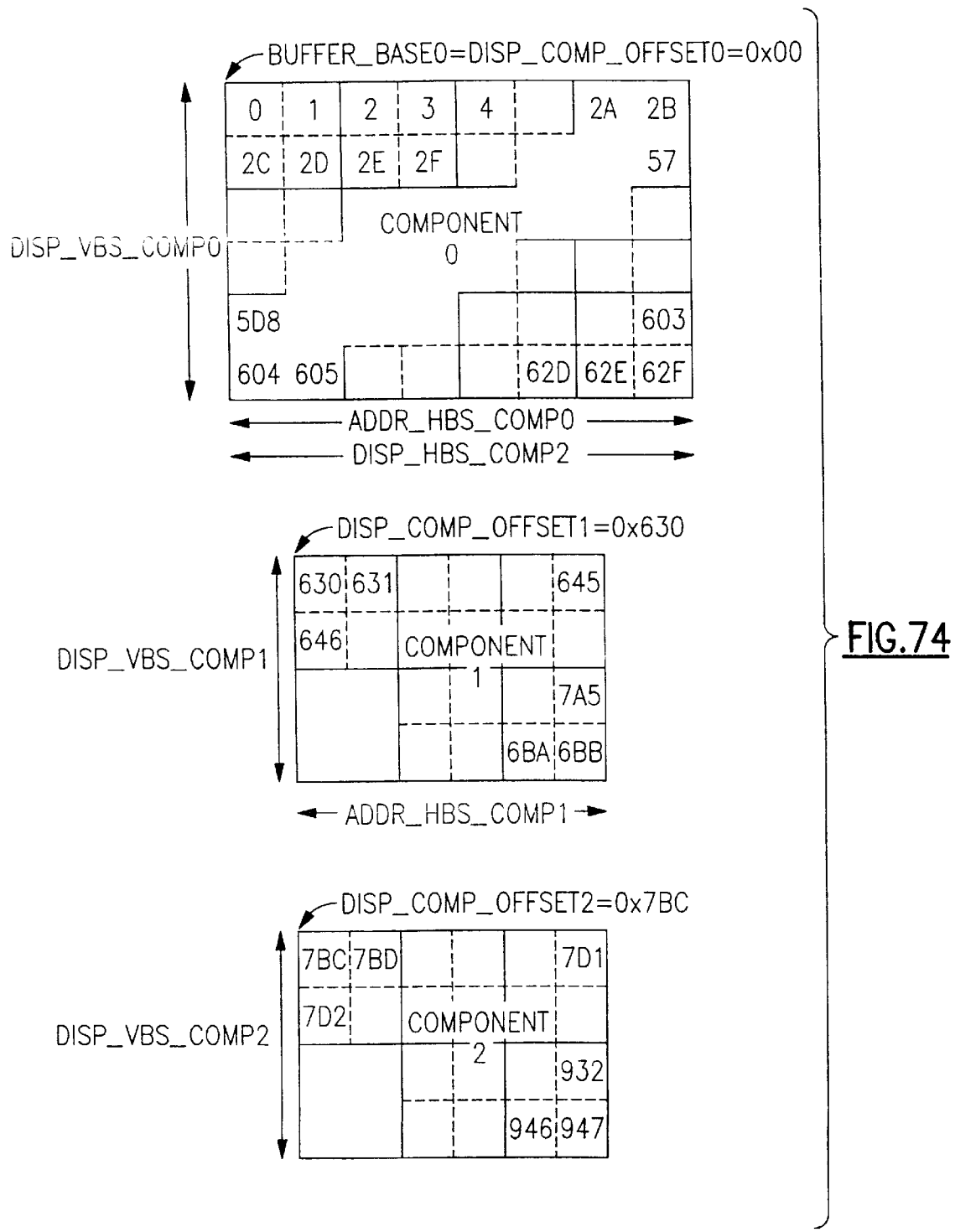
FIG. 74 is diagram of a buffer which contains a 22 by 18 macroblock SIF picture.

Using the reset state of the dispaddr control registers will give a 4:2 n interlaced display with no line repeats, synchronized and starting on the top field (field_info=HIGH). FIG. 74, "Buffer 0 Containing a SIF (22 by 18 macroblocks) picture," shows a typical buffer setup for a SIF picture. (This example is covered in more detail in Section C.13). In this example, DISP_HBS_COMPn is equal to ADDR_HBS_COMPn and likewise the vertical registers DISP_VBS_COMPn and the equivalent write address generator register are equal i.e., the area to be read is the entire buffer.

Windowing with the Read Address Generator

Figure 75:
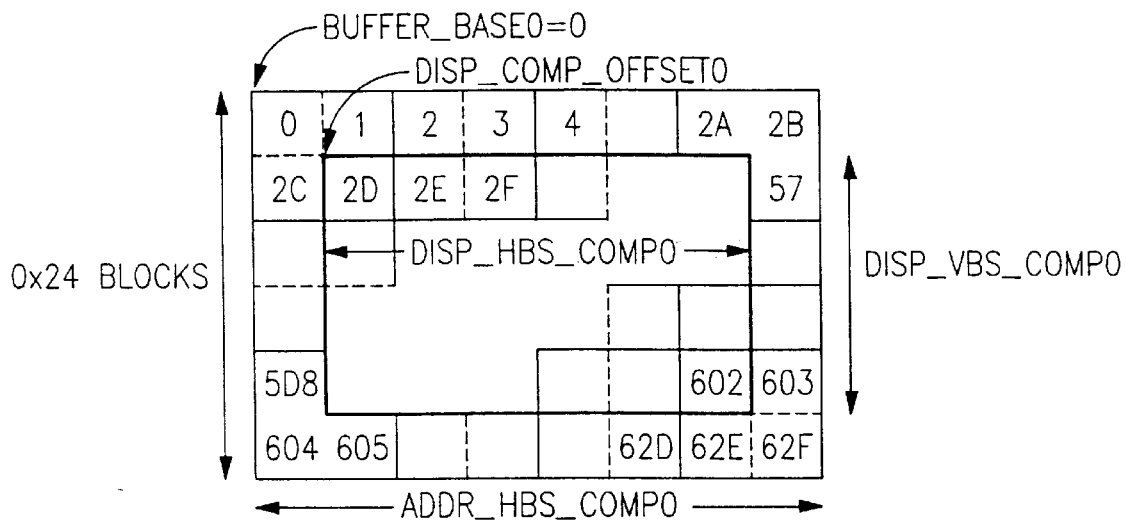
FIG. 75 illustrates a display window in a buffer which contains a 22 by 18 macroblock SIF picture.

It is possible to program dispaddr such that it will read only a portion (window) of the buffer. The size of the window is programmed for each component by the registers DISP_HBS, DISP_VBS, COMPONENT_OFFSET, and LINES_IN_LAST_ROW. FIG. 75, "SIF Component O with a display window," shows how this is achieved (for component O only).

In this example, the register setting would be:
BUFFER_BASE0=0x00
DISP_COMP_OFFSET0=0x2D
DISP_VBS_COMP0=0x22
ADDR_HBS_COMP0=0x2C
DISP_HBS_COM0=0x2A The window may only start and stop on block boundaries. In this example we have left LINES_IN_LAST_ROW equal to 7 (meaning all eight). This example is not practical with anything other than 4:4:4 data. In order to correspond, the window edges for the other two components could not be on block boundaries. The color space converter will hang up if the data it receives is not 4:4:4. This means that these read windows, in conjunction with the upsamplers must be programmed to achieve this.

TABLE C.3.5

Dramctl(0,1 & 2) Datapath Registers

| Register Names | Bus | Keyhole Address | Description | Comments |
|---|---|---|---|---|
| DISP_COMP0_HBS | A | 0x48,49,4a,4b | The number of | This register |
| DISP_COMP1_HBS | A | 0x4c,4d,4e,4f | horizontal | must be loaded |
| DISP_COMP2_HBS | A | 0x50,51,52,53 | blocks to be read. c.f. ADDR_HBS | before operation can begin. |
| CNT_LEFT0 | A | 0x54,55,56,57 | Number of | These registers |
| CNT_LEFT1 | A | 0x58,59,5a,5b | blocks remaining | are temporary |
| CNT_LEFT2 | A | 0x5c,5d,5e,5f | to be read | locations used |
| PAGE_ADDR0 | A | 0x60,61,62,63 | The address of | by dispaddr. |
| PAGE_ADDR1 | A | 0x64,65,66,67 | the current | All |
| PAGE_ADDR2 | A | 0x68,69,6a,6b | page. | registers are R/ |
| BLOCK_ADDR0 | B | 0x6c,6d,6e,6f | Current block | W from the upi |
| BLOCK_ADDR1 | B | 0x70,71,72,73 | address | |
| BLOCK_ADDR2 | B | 0x74,75,76,77 | | |
| BLOCKS_LEFT0 | B | 0x78,79,7a,7b | Blocks left in | |
| BLOCKS_LEFT1 | B | 0x7c,7d,7e,7f | current page | |
| BLOCKS_LEFT2 | B | 0x80,81,82,83 | | |

Programming

Figure 77:
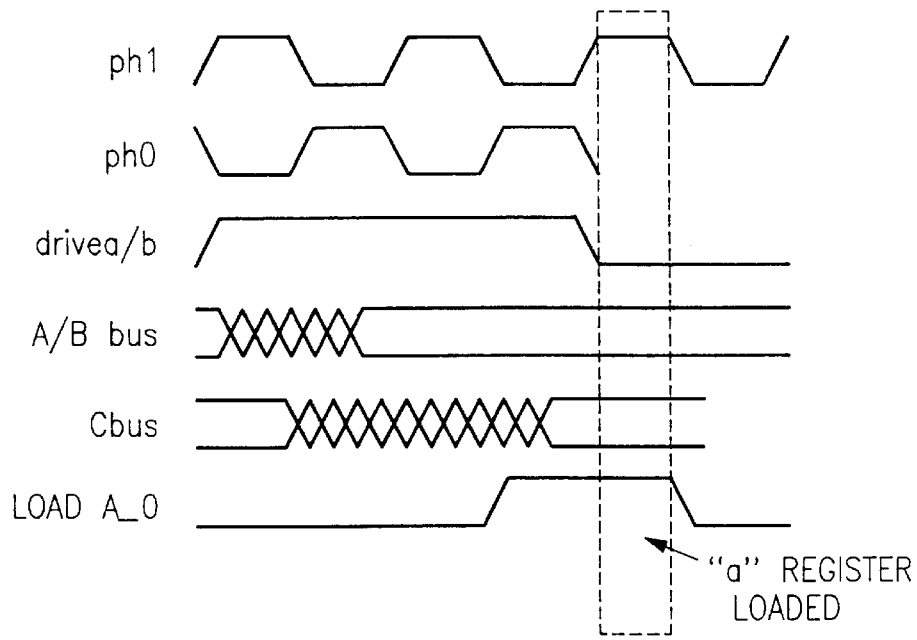
FIG. 77 is a timing diagram illustrating a two cycle operation on the data path shown in FIG. 76.
Figure 76:
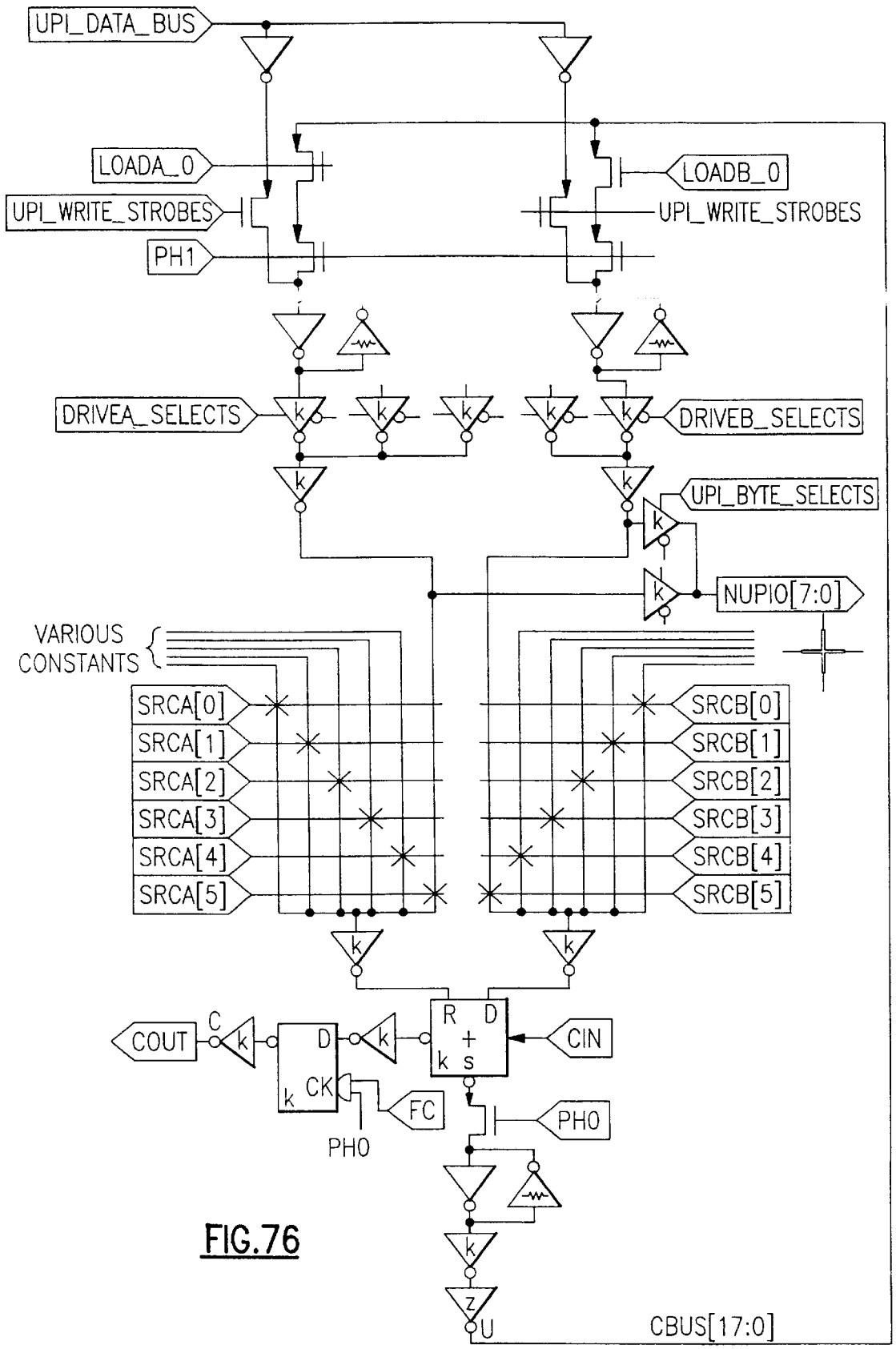
FIG. 76 is a diagram illustrating a slice of a data path.

The following 15 dispaddr registers must be programmed before operation can begin.
BUFFER_BASE0,1,2
DISP_COMP_OFFSET0,1,2
DISP_VBS_COMP0,1,2
ADDR_HBS_COMP0,1,1
DISP_COMP0,1,2_HBS SECTION C.5 Datapaths for Address Generation The datapaths used in dispaddr and waddrgen are identical in structure and width (18 bits), only differing in the number of registers, some masking, and the flags returned to the state machine. The circuit of one slice is shown in FIG. 76, "Slice Of Datapath,". Registers are uniquely assigned to drive the A or B bus and their use (assignment) is optimized in the controller. All registers are loadable from the C bus—although not all "load" signals are driven. All operations involving the adder cover two cycles allowing the adder to have ordinary ripple carry. FIG. 77, "Two cycle operation of the datapath," shows the timing for the two cycle sum of two registers being loaded back into the "A" bus register. The various flags are "phO"ed within the datapath to allow ccode generation. For the same reason, the structure of the datapath schematics is a little odd: the tristates for all the registers (onto the A and B buses) are in one box eliminating the combinatorial path in the cell (which the Cedric Huffman suffered from) and thus allowing better code generation. To gain upi access to the datapaths, the access bit must be set—without this the upi is locked out. Upi access is different from read and write:

Writing: When the access bit is set, all load signals are disabled and one of a set of three byte addressed write strobes driven to the appropriate byte of one of the registers. The upi data bus passes vertically down the datapath (replicated, 2-8-8 bits) and the 18 bit register is written as three separate byte writes Reading: This is achieved using the A and B buses. Once again, the access bit must be set. The addressed register is driven onto the A or B bus and a upi byte select picks a byte from the relevant bus and drives it onto the upi bus.

As double cycle datapath operations require the A and B buses to retain their values, and upi accesses disrupt these, access must only be given by the controlling state machine before the start of any datapath operation.

All datapath registers in both address generators are addressed through a 9 bit wide keyhole at the top level address O×28 (msb) and O×29 (lsb) for the keyhole, and O×2A for the data. The keyhole addresses are given in Table C.11.2.

All address registers in the address generators (dispaddr and waddrgen) contain blocked addresses. Pixel addresses are never used and the only registers containing line addresses are the three LINES_IN_LAST_ROW registers.

Some registers are duplicated between the address generators, e.g., BUFFER_BASE0 occurs in the address space for dispaddr and waddrgen. These are two separate registers which BOTH need loading. This allows display windowing (only reading a portion of the display store), and eases the display of formats other than 3 component video.

SECTION C.6 The DRAM Interface
C.6.1 Overview

The Spatial Decoder, Temporal Decoder and Video Formatter each contain a DRAM Interface block for that particular chip. In all three devices, the function of the DRAM Interface is to transfer data from the chip to the external DRAM and from the external DRAM into the chip via block addresses supplied by an address generator.

The DRAM Interface can operate from a clock which is asynchronous to both the address generator and to the clocks of the blocks through which data is passed. Special techniques have been used to handle the asynchronism, because although the clocks are asynchronous they may be approximately the same frequency.

Data is usually transferred between the DRAM Interface and the rest of the chip in blocks of 64 bytes (the only exception being prediction data in the Temporal Decoder). Transfers take place by means of a device known as a "swing buffer". This is essentially a pair of RAMs operated in a double-buffered configuration, with the DRAM interface filling or emptying one RAM while another part of the chip empties or fills the other RAM. A separate bus which carries an address from an address generator is associated with each swing buffer.

Each of the chips has four swing buffers, but the function of these swing buffers is different in each case. In the Spacial Decoder, one swing buffer is used to transfer coded data to the DRAM, another to read coded data from the DRAM, the third to transfer tokenized data to the DRAM and the fourth to read tokenized data from the DRAM. In the Temporal Decoder, one swing buffer is used to write Intra or Predicted picture data to the DRAM, the second to read Intra or Predicted data from the DRAM and the other two to read forward and backward prediction data. In the Video Formatter, one swing buffer is used to transfer data to the DRAM and the other three are used to read data from the DRAM, one for each of Luminance (Y) and the Red and Blue color difference data (Cr and Cb).

The operation of a generic DRAM Interface is described in the Spatial Decoder document. The following section describes those features of the DRAM Interface peculiar to the Video Formatter.

C.6.2 The Video Formatter DRAM Interface

In the video formatter, data is written into the external DRAM in blocks but read out in raster order. Writing is exactly the same as already described for the Spatial Decoder, but reading is a little more complex.

The data in the Video Formatter external DRAM is organized so that at least 8 blocks of data fit into a single page. These 8 blocks are 8 consecutive horizontal blocks. When rasterizing, 8 bytes need to be read out of each of 8 consecutive blocks and written into the swing buffer (i.e., the same row in each of the 8 blocks).

Considering the top row (and assuming a byte-wide interface), the x address (the three LSBs) is set to zero, as is the y address (3 MSBs). The x address is then incremented as each of the first 8 bytes are read out. At this point the top part of the address (bit 6 and above–LSB=bit 0) is incremented and the x address (3 LSBs) is reset to zero. This process is repeated until 64 bytes have been read. With a 16 or 32 bit wide interface to the external DRAM the x address is merely incremented by two or four instead of by one.

The address generator can signal to the DRAM Interface that less than 64 bytes should be read (this may be required at the beginning or end of a raster line), although a multiple of 8 bytes is always read. This is achieved by using start and stop values. The start value is used for the top part of the address (bit 6 and above), and the stop value is compared with this and a signal generated which indicates when reading should stop.

SECTION C.7 Vertical Upsampling
C.7.1 Introduction

Given a raster scan of pixels of one color component at its input, this block can provide an output scan of twice the height. Mode selection allows the output pixel values to be formed in a number of ways.

C.7.2 Ports
Input two wire interface:
in_valid
in_accept
in_data[7:0]

in_lastpel
in_lastline
Output two wire interface:
out_valid
out_accept
out_data[9:0]
out_last
mode[2:0]
nupdata[7:0], upaddr, upsel[3:0], uprstr, upwstr, ramtest
tdin, tdout, tph0, tckm, tcks
ph0, ph1, notrst0

C.7.3 Mode

As selected by the input bus mode[2:0].

Mode register values 1 and 7 are not used.

In each of the above modes, the output pixels are represented as 10-bit values, not as bytes. No rounding or truncation takes place in this block. Where necessary, values are shifted left to use the same range.

C.7.3.1 Mode 0: Fifo

The block simply acts as a FIFO store. The number of output pixels is exactly the same as at the input. The values are shifted left by two.

C.7.3.2 Mode 2: Repeat

Every line in the input scan is repeated to produce an output scan twice as high. Again the pixel values are shifted left by two.

A→ABACBDBCCDD

C.7.3.3 Mode 4: Lower

Each input line produces two output lines. In this mode the second of these two lines (the lower on the display) is the same as the input line. The first of the pair is the average of the current input line and the previous input line. In the case of the first input line, where there is no previous line to use, the input line is repeated.

This should be selected where chroma samples are co-sited with the lower luma samples.

A→ABAC(A+B)/2DB(B+C)/2C(C+D)/2D

C.7.3.4 Mode 5: Upper

Similar to the "lower" mode, but in this case the input line forms the upper of the output pair, and the lower is the average of adjacent input lines. The last output line is a repeat of the last input line.

This should be selected where chroma samples are co-sited with the upper luma samples.

A→AB(A+B)/2CBD(B+C)/2C(C+D)/2D

C.7.3.5 Mode 6: Central

This mode corresponds to the situation where chroma samples lie midway between luma samples. In order to co-site the output chroma pixels with the luma pixels, a weighted average is used to form the output lines.

A→AB(3A+B)/4C(A+3B)/4D(3B+C)/4(B+3C)/4(3C+D)/4(C+3D)/4D

C.7.4 How It Works

There are two linestores, designated "a" and "b". In "FIFO" and "repeat" modes, only linestore "a" is used. Each store can accommodate a line of up to 512 pixels (vertical upsampling should be performed before any horizontal upsamplng). There is no restriction on the length of the line in "FIFO" mode.

The input signals in_lastpel and in_lastline are used to indicate the end of the input line and the end of the picture. In_lastpel should be high coincident with the last pixel of each line. In_lastline should be high coincident with the last pixel of the last line of the picture.

The output signal out_last is high coincident with the last pixel of each output line.

In "repeat" mode, each line is written into store "a". The line is then read out twice. As it is read out for the second time, the next line may start to be written.

In "lower", "upper" and "central" modes, lines are written alternately into stores "a" and "b". The first line of a picture is always written into store "a". Two tiny state machines, one for each store, keep track of what is in each store and which output line is being formed. From these states are generated the read and write requests to the linestore RAMs, and signals that determine when the next line may overwrite the present data.

A register (lastaddr) stores the write address when in_lastpel is high, thereby providing the length of the line for the formation of the output lines.

C.7.5 UPI

This block contains two 512×8 bit RAM arrays, which may be accessed via the microprocessor interface in the typical way. There are no registers with microprocessor access.

SECTION C.8 The Horizontal Up-Samplers

C.8.1 Overview

Top-Level Registers contain three identical Horizontal Up-samplers, one for each color component. All three are controlled independently and so only one will be described here. From the user's point of view the only difference is that each Horizontal Up-sampler is mapped into a different set of addresses in the memory map.

The Horizontal Up-sampler performs a combined replication and filtering operation. In all, there are four modes of operation:

TABLE C.7.1

Horizontal Up-sampler Modes

| Mode | Function |
| --- | --- |
| 0 | Straight-through (no processing). The reset state. |
| 1 | No up-sampling, filter using a 3-tap FIR filter. |
| 2 | x2 up-sampling and filtering |
| 3 | x4 up-sampling and filtering |

C.8.2 Using a Horizontal Up-Sampler

The address map for each Horizontal Up-sampler consists of 25 locations corresponding to 12 13-bit coefficient registers and one 2-bit mode register. The number written to the mode register determines the mode of operation, as outlined in Table C.7.1. Depending on the mode, some or all of the coefficient registers may be used. The equivalent FIR filter is illustrated below.

Depending on the mode of operation, the input, $x_n$, is held constant for one, two or four clock periods. The actual coefficients that are programmed for each mode are as follows:

TABLE C.7.2

Coefficients for Mode 1

| Coeff | All clock periods |
|---|---|
| k0 | c00 |
| k1 | c10 |
| k2 | c20 |

TABLE C.7.3

Coefficients for Mode 2

| Coeff | 1st clock period | 2nd clock period |
|---|---|---|
| k0 | c00 | c01 |
| k1 | c10 | c11 |
| k2 | c20 | c21 |

TABLE C.7.4

Coefficients for Mode 3

| Coeff | 1st clock period | 2nd clock period | 3rd clock period | 4th clock period |
|---|---|---|---|---|
| k0 | c00 | c01 | c02 | c03 |
| k1 | c10 | c11 | c12 | c13 |
| k2 | c20 | c21 | c22 | c23 |

Coefficients which are not used in a particular mode need not be programmed when operating in that mode.

In order to achieve symmetrical filtering the first and last pixels of each line are repeated prior to filtering. For example, when up-sampling by two the first and last pixels of each line are replicated four times rather than two. Because residual data in the filter is discarded at the end of each line the number of pixels output is still always exactly one, two or four times the number in the input stream.

Depending on the values of the coefficients, output samples can be placed either coincident with or shifted from the input samples. Here are some example values for coefficients in some sample modes. A "-" indicates that the value of the coefficient is "don't care." All values are in hexadecimal.

TABLE C.7.5

Sample Coefficients

| Coefficient | x2 up-sample, o/p pels coincident with i/p | x2 up-sample, o/p pels in between i/p | x4 up-sample, o/p pels in between i/p |
|---|---|---|---|
| c00 | 0 | 01BD | 0 |
| c01 | 0 | 010B | 00B6 |
| c02 | — | — | 012A |
| c03 | — | — | 0102 |
| c10 | 0800 | 0538 | 0661 |
| c11 | 0400 | 0538 | 0661 |
| c12 | — | — | 0446 |
| c13 | — | — | 029F |
| c20 | 0 | 010B | 00B6 |
| c21 | 0400 | 01BD | 0 |
| c22 | — | — | 0290 |
| c23 | — | — | 045F |

C.8.3 Description of a Horizontal Up-Sampler

Figure 78:
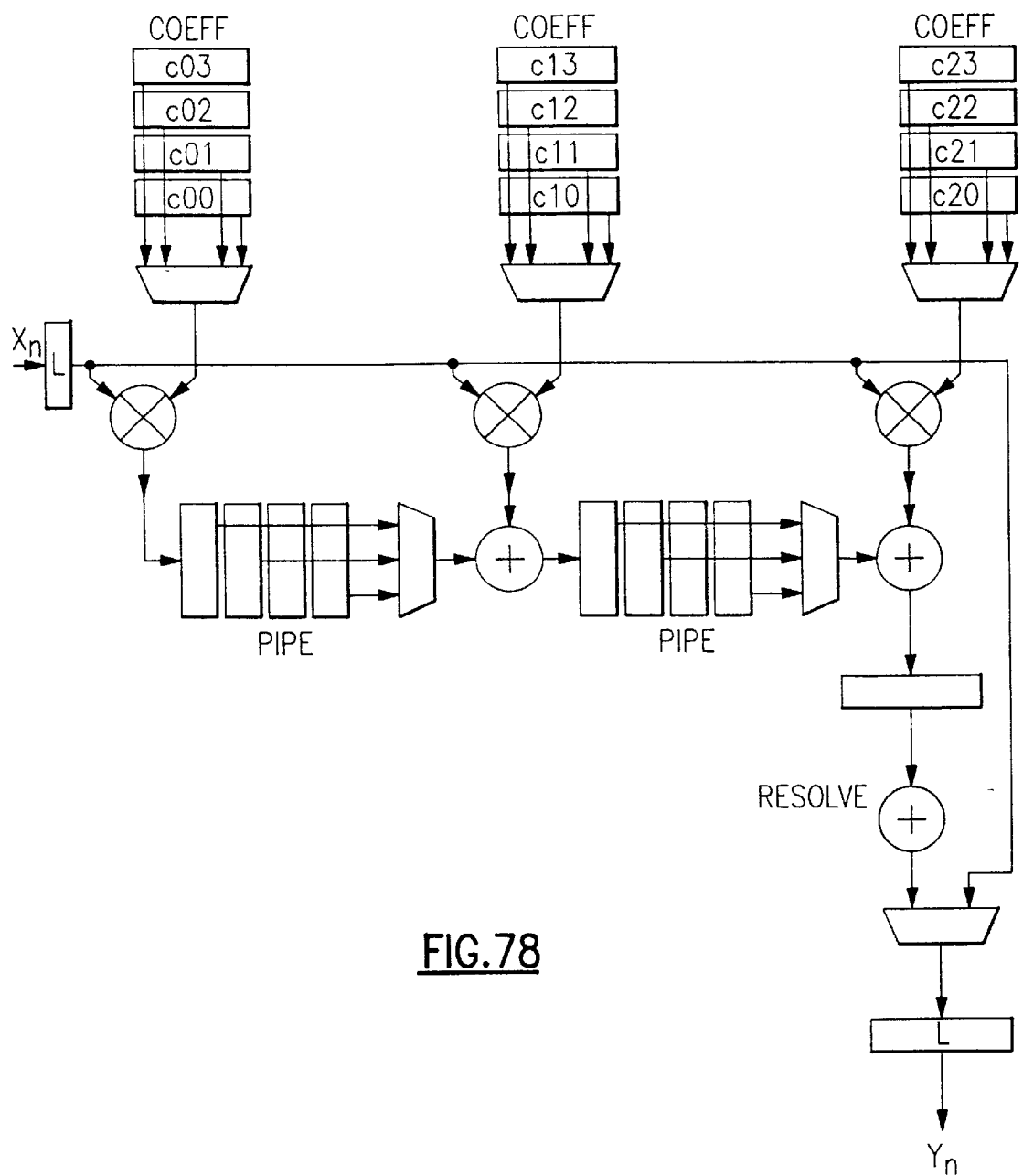
FIG. 78 illustrates a horizontal up-sampler data path.

The datapath of the Horizontal Up-sampler is illustrated in FIG. 78.

The operation is outlined below for the x4 upsample case. x2 upsampling and x1 filtering (modes 2 and 1) are degenerate cases of this, and bypass (mode O) bypasses the entire filter, data passing straight from the input latch to the output latch via the final mux, as illustrated.

When valid data is latched in the input latch ("L"), it is held for 4 clock periods.

The coefficient registers (labeled "COEFF") are multiplexed onto the multipliers for one clock period, each in turn, at the same time as the two sets of four pipeline registers (labeled "PIPE") are clocked. Thus, for input data $x_n$, the first PIPE will fill up with the values $c00.x_n$, $c01.x_n$, $c02.x_n$, $c03.x_n$.

Similarly, the second multiplier will multiply $x_n$ by all of its coefficients, in turn, and the third multiplier by all its coefficients, in turn. It can be seen that the output will be of the form shown in Table C.7.6.

TABLE C.7.6

Output Sequence for Mode 3

| Clock1 Period | Output |
|---|---|
| 0 | $c20.x_n + c10.x_{n-1} + c00.x_{n-2}$ |
| 1 | $c21.x_n + c11.x_{n-1} + c01.x_{n-2}$ |
| 2 | $c22.x_n + c12.x_{n-1} + c02.x_{n-2}$ |
| 3 | $c23.x_n + c13.x_{n-1} + c03.x_{n-2}$ |

From the point of view of the output, each clock period produces an individual pixel and since each output pixel is dependent on the weighted values of 12 input pixels (although there are only three different values), this can be thought of as implementing a 12 tap filter on x4 up-sampled input pixels.

For x2 upsampling, the operation is essentially the same, except the input data is only held for two clock periods, only two coefficients are used and the "PIPE" blocks are shortened by means of the multiplexers illustrated. For x1 filtering the input is only held for one clock period and one coefficient and one "PIPE" stage are used.

The datapath width and coefficient width (13 bit 2's complement) were chosen so that the same multiplier could be used as was designed for the Color-Space Converter. These widths are more than adequate for the purpose of the Horizontal Up-sampler.

The multiplexers which multiplex the coefficients onto the multipliers are shared with the UPI readback. This has led to some complications in the structure of the schematics (primarily because of difficulty in CCODE generation), but the actual circuit is smaller.

As in the Color-Space Converter, carry-save multipliers are used, the result only being resolved at the end.

Control for the entire Horizontal Up-sampler can be regarded as a single two-wire interface stage which may produce two or four times the amount of data at its output as there is on its input. The mode which is programmed in via the UPI determines the length of a programmable shift register (bob), which produces an output pulse every clock period, every two clock periods or every four clock periods. This in turn controls the main state machine, whose state is also determined by in_valid, out_accept (for the two-wire interface) and the signal "in_last". This signal is passed on from the vertical up-sampler and is high for the last pixel of every line. This allows the first and last pixels of each line to be replicated twice-over and the clearing down of the pipeline between lines (the pipeline contains partially-processed redundant data immediately after a line has been completed).

SECTION C.9 The Color-Space Converter

C.9.1 Overview

The Color-Space Converter (CSC) performs a 3×3 matrix multiplication on the incoming 9-bit data, followed by an addition:

$$\begin{bmatrix} y0 \\ y1 \\ y2 \end{bmatrix} = \begin{bmatrix} c01 & c02 & c03 \\ c11 & c12 & c13 \\ c12 & c22 & c23 \end{bmatrix} \times \begin{bmatrix} x0 \\ x1 \\ x2 \end{bmatrix} + \begin{bmatrix} c04 \\ c14 \\ c24 \end{bmatrix}$$

Where x0–2 are the input data, y0–2 are the output data and cnm are the coefficients. The slightly unconventional naming of the matrix coefficients is deliberate, since the names correspond to signal names in the schematics.

The CSC is capable of performing conversions between a number of different color spaces, although a limited set of these conversions are used in Top-Level Registers. The design color-space conversions are as follows:

$E_R$, $E_G$, $E_B \rightarrow Y$, $C_R$, $C_B$

R, G, B $\rightarrow$ Y, $C_R$, $C_B$

Y, $C_R$, $C_B \rightarrow E_R$, $E_G$, $E_B$

Y, $C_R$, $C_B \rightarrow$ R, G, B

Where R, G and B are in the range (0 ... 511) and all other quantities are in the range of (32 ... 470). Since the input to the Top-Level Registers CSC is Y, $C_R$, $C_B$, only the third and fourth of these equations are of relevance.

In the CSC design, the precision of the coefficients was chosen so that, for 9 bit data, all output values were within plus or minus 1 bit of the values produced by a full floating point simulation of the algorithm (this is the best accuracy that it is possible to achieve). This gave 13 bit twos-complement coefficients for cx0–cx3 and 14 bit twos-complement coefficients for cx4. The coefficients for all the design conversions are given below in both decimal and hex.

TABLE C.8.1

| | Coefficients for Various Conversions | | | | | | |
|---|---|---|---|---|---|---|---|
| | $E_R$->Y | | R->Y | | Y->$E_R$ | | Y->R |
| Coeff | Dec | Hex | Dec | Hex | Dec | Hex | Dec | Hex |
| c01 | 0.299 | 0132 | 0.256 | | 1.0 | 0400 | 1.169 | 04AD |
| c02 | 0.587 | 0259 | 0.502 | | 1.402 | 059C | 1.639 | 068E |
| c03 | 0.114 | 0075 | 0.098 | | 0.0 | 0000 | 0.0 | 0000 |
| c04 | 0.0 | 0000 | 16 | | −179.46 | F4C8 | −228.478 | F1B8 |
| c11 | 0.5 | 0200 | 0.428 | | 1.0 | 0400 | 1.169 | 04AD |
| c12 | −0.419 | FE53 | −0.358 | | −0.714 | FD25 | −0.835 | FCA9 |
| c13 | −0.081 | FFAD | −0.070 | | −0.344 | FEA0 | −0.402 | FE64 |
| c14 | 128.0 | 0800 | 128 | | 135.5 | 0878 | 139.7 | 08BA |
| c21 | −0.169 | FF53 | −0.144 | | 1.0 | 0400 | 1.169 | 04AD |
| c22 | −0.331 | FEAD | −0.283 | | 0.0 | 0000 | 0.0 | 0000 |
| c23 | 0.5 | 0200 | 0.427 | | 1.772 | 0717 | 2.071 | 0849 |
| c24 | 128 | 0800 | 128 | | −226.816 | F1D2 | −283.84 | EE42 |

All these numbers are calculated from the fundamental equation:

$$Y = 0.299 E_R + 0.587 E_G + 0.0114 E_B$$

and the following color-difference equations:

$$C_R = E_R - Y$$
$$C_B = E_B - Y$$

The equations in R, G and B are derived from these after the full-scale ranges of these quantities are considered.

C.9.2 Using the Color-Space Converter

On reset, c01, c12, and c23 are set to 1 and all other coefficients are set to 0. Thus, y0=x0, y1=x1 and y2=x2 and all data is passed through unaltered. To select a color-space conversion, simply write the appropriate coefficients (from Table C.8.1, for example) into the locations specified in the address map.

Referring to the schematics, x0 . . . 2 correspond to in_data0 . . . 2 and y0 . . . 2 correspond to out_data0 . . . 2. Users should remember that input data to the CSC must be up-sampled to 4:4:4. If this is not the case, not only will the color-space transforms have no meaning, but the chip will lock.

It should be noted that each output can be formed from any allowed combination of coefficients and inputs plus (or minus) a constant. Thus, for any given color-space conversion, the order of the outputs can be changed by swapping the rows in the transform matrix (i.e., the addresses into which the coefficients are written).

The CSC is guaranteed to work for all the transforms in Table C.8.1. If other transforms are used the user must remember the following:

1) The hardware will not work if any intermediate result in the calculation requires greater than 10 bits of precision (excluding the sign bit).
2) The output of the CSC is saturated to 0 and 511, i.e. any number less than 0 is replaced with 0 and any number more than 511 is replaced with 511. The implementation of the saturation logic assumes that the results will only be slightly above 511 or slightly below 0. If the CSC is programmed incorrectly then a common symptom will be that the output appears to saturate all (or most of) the time.

C.9.3 Description of the CSC

Figure 79:
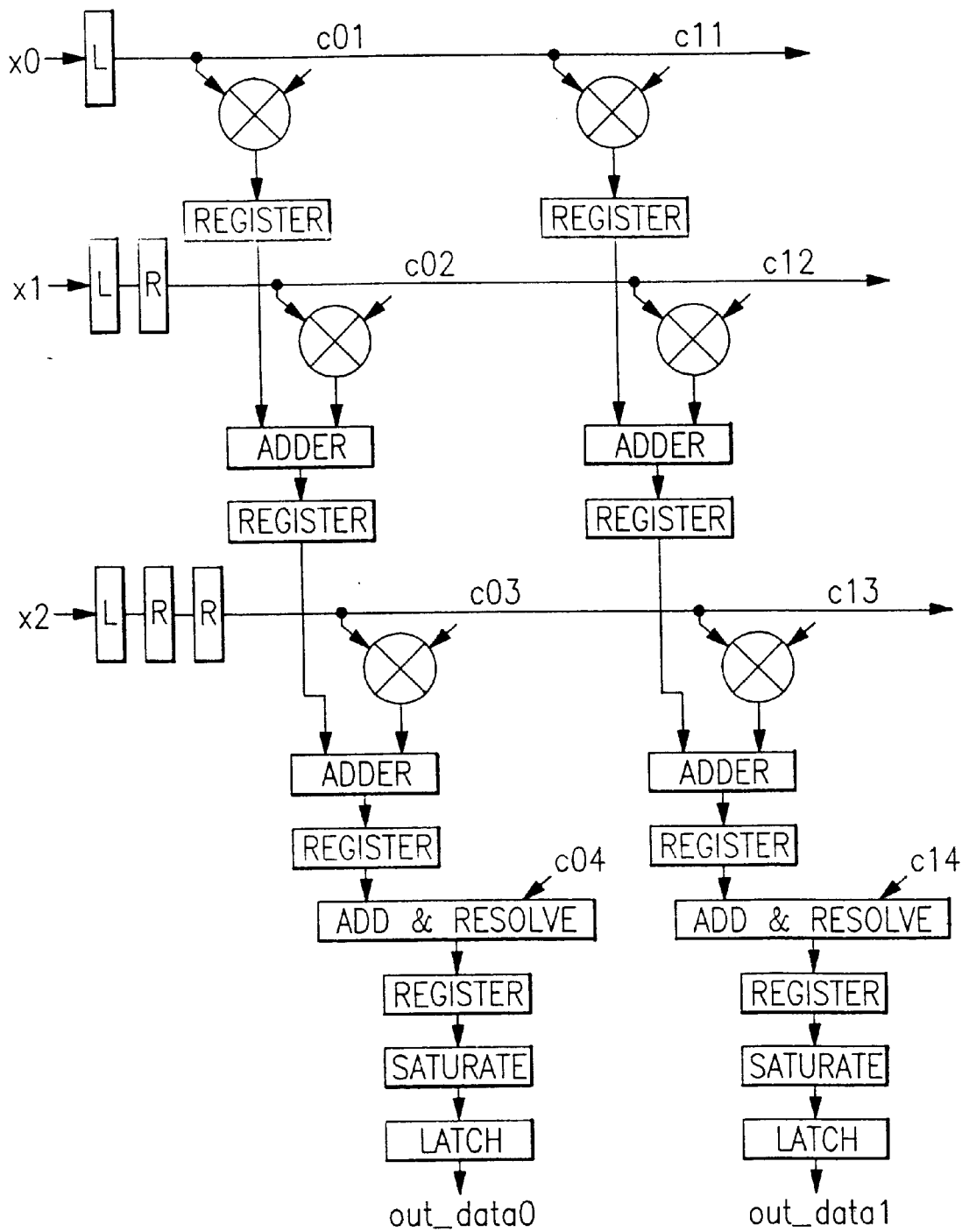
FIG. 79 is a block diagram of a color space converter.

The structure of the CSC is illustrated in FIG. 79, where only two of the three "components" have been shown because of space limitations. In the FIG. 79, "register" or "R" implies a master-slave register and "latch" or "L" implies a transparent latch.

All coefficients are loaded into read-write UPI registers which are not shown explicitly in the FIG. 79. To understand the operation consider the following sequence with reference to the left-most "component" (that which produces output out_data0):

1) Data arrives at inputs x0–2 (in_data0–2). This represents a single pixel in the input color-space. This is latched.
2) x0 is multiplied by c01 and latched into the first pipeline register. x1 and x2 move on one register.
3) x1 is multiplied by c02, added to (x1.c01) and latched into the next pipeline register. x2 moves on one register.
4) x2 is multiplied by c03 and added to the result of (3), producing (x1.c01+x2.c02+x3.c03). The result is latched into the next pipeline register.
5) The result of (4) is added to c04. Since data is kept in carry-save format through the multipliers this adder is also used to resolve the data from the multiplier chain. The result is latched in the next pipeline register.
6) The final operation is to saturate the data. Partial results are passed from the resolving adder to the saturate block to achieve this.

It can be seen that the result is y0, as specified in the matrix equation at the start of this section. y1 and y2 are formed in the same manner.

Three multipliers are used, with the coefficients as the multiplicand and the data as the multiplicator. This allows an efficient layout to be achieved, with partial results flowing down the datapath and the same input data being routed across three parallel and identical datapaths, one for each output.

To achieve the reset state described in Section C.9.2 each of the three "components" must be reset in a different way. In order to avoid having three sets of schematics and three slightly different layouts this is achieved by having inputs to the UPI registers which are tied high or low at the top level.

The CSC has almost no control associated with it, although each pipeline stage is a two-wire interface stage, so there is a chain of valid and accept latches with their associated control (in_accept=out_accept_r+lin_valid_r). The CSC is therefore a 5-stage deep two-wire interface, capable of holding 10 levels of data when stalled.

The output of the CSC contain re-synchronizing latches because the next function in the output pipe runs off a different clock generator.

SECTION C.10 Output Controller

C.10.1 Introduction

This block handles the following functions:

provides data in one of three modes
  24-bit 4:4:4
  16-bit 4:2:2
  8-bit 4:2:2
aligns the data to the video display window defined by the vsync and hsync pulses and by programmed timing registers
adds a border around the video window, if required

C.10.2 Ports

Input two wire interface:
  in_valid
  in_accept
  in_data[23:0]
Output two wire interface:
  out_valid
  out_accept
  out_data[23:0]
  out_active
  out_window
  out_comp[1:0]
  in_vsync, in_hsync
  nupdata[7:0], upaddr[4:0], upsel, rstr, wstr
  tdin, tdout, tph0, tckm, tcks chiptest
  ph0, ph1, notrst0, notrst1

C.10.3 Out Modes

The format of the output is selected by writing to the opmode register.

C.10.3.1 Mode 0

24-bit 4:4:4 RGB or YCrCb. Input data passes directly to the output.

C.10.3.2 Modes 1 and 2

These present 4:2:2 YCrCb. Assuming in_data[23:16] is Y, in_data[15:8] is Cr and in_data[7:0] is Cb, then:

C.10.3.2.1 Mode 1

16-bit YcrCb. Y is presented on out_data[15:8]. Cr and Cb are time multiplexed on out_data[7:0], Cb first. Out_data[23:16] not used.

C.10.3.2.2 Mode 2

8-bit YCrCb, Y, Cr and Cb are time multiplexed on out_data[7:0] in the order Cb, Y, Cr, Y. Out_data[23:8] not used.

C.10.3.3 Output Timing

The following registers are used to place the data in a video display window.

- vdelay—The number of hsync pulses following a vsync pulse before the first line of video or border.
- hdelay—The number of clock cycles between hsync and the first pixel of video or border.
- height—The height of the video window, in lines.
- width—The width of the video window, in pixels.
- north, south—The height of the border respectively above and below the video window, in lines.
- west, east—The width of the border respectively to the left and to the right of the video window, in pels.

The minimum vdelay is zero—the first hsync is the first active line. The minimum value that can be programmed into hdelay is 2. However the actual delay from in_hsync to the first active output pixel is hdelay+1 cycles.

Any edge of the border can have the value zero. The color of the border is selected by writing to the registers border_r, border_g and border_b. The color of the area outside the border is selected by writing to the registers blank_r, blank_g and blank_b. The multiplexing performed in output modes 1 and 2 will also affect the border and blank components. That is, the values in these registers correspond with in_data[23:16], in_data[15:8] and in_data [7:0].

C.10.4 Output Flags

- out_active indicates that the output data is part of the active window i.e., video data or border.
- out_window indicates that the output data is part of the video window.
- out_comp[1:0] indicates which color component is present on out_data[7:0] in output modes 1 and 2. In mode 1, 0=Cb, 1=Cr. In mode 2, 0=Y, 1=Cr, 2=Cb.

C.10.5 Two-Wire Mode

This is selected by writing 1 to the two wire register. It is not selected following reset. In two wire mode, the output timing registers and sync signals are ignored and the flow of data through the block is controlled by out_accept. In normal operation, out_accept should be tied high.

C.10.6 Snooper

There is a super-snooper on the output of the block, which includes access to the output flags.

C.10.7 How It Works

Two identical down-counters keep track of the current position in the display. "Vcount" decrements on hsyncs and loads from the appropriate timing register on vsync or at its terminal count. "Hcount" decrements on every pixel and loads on hsync or at its terminal count. In output mode 2, one pixel corresponds to two clock cycles.

SECTION C.11 The Clock Dividers

C.11.1 Overview

Top-Level Registers contain two identical Clock Dividers, one to generate a PICTURE_CLK and one to generate an AUDIO_CLK. The Clock Dividers are identical and are controlled independently and so only one need be described here. From the user's point of view the only difference is that each Clock Divider's divisor register is mapped into a different set of addresses in the memory map.

The Clock Divider's function is to provide a 4X sysclk divided clock frequency, with no requirement for an even mark-space ratio.

The divisor is required to lie in the range ~0 to ~16,000,000 and so can be represented using 24 bits with the restriction that the minimum divisor be 16. This is because the Clock Divider will approximate an equal mark-space ratio (to within one sysclk cycle) by using divisor/2. As the maximum clock frequency available is sysclk, the maximum divided frequency available is sysclk/2 and because four counters are used in cascade divisor/2 must never be less than 8, else the divided clock output will be driven to the positive power rail.

C.11.2 Using a Clock Divider

The address map for each Clock Divider consists of 4 locations corresponding to three 8-bit divisor registers and one 1-bit access register. The Clock Divider will power-up inactive and is activated by the completion of an access to its divisor register.

The divisor registers may be written in any order according to the address map in Table C.10.1. The Clock Divider is activated by sensing a synchronized 0 to 1 transition in its access bit. The first time a transition is sensed, the Clock Divider will come out of reset and generate a divided clock. Subsequent transitions (assuming the divisor has also been altered) will merely cause the Clock Divider to lock to its new frequency "on-the-fly"—once activated there is no way of halting the Clock Divider other than by Chip RESET.

TABLE C.10.1

Clock Divider Registers

| Address | Register |
|---------|----------|
| 00b | access bit |
| 01b | divisor MSB |
| 10b | divisor |
| 11b | divisor LSB |

Any divisor value in the range 16 to 16,777,216 may be used.

C.11.3 Description of the Clock Divider

The Clock Divider is implemented as four 22 bit counters which are cascaded such that as one counter carries, it will activate the next counter in turn. A counter will count down the value of divisor/4 before carrying and so each counter will take it in turn to generate a pulse of the divided clock frequency.

After carrying, the counter will reload with divisor/8 and this is counted down to produce the approximate equal mark-space ratio divided clock. As each counter reloads from the divisor register when it is activated by the previous counter, this enables the divided clock frequency to be changed on the fly by simply altering the contents of the divisor.

Each counter is clocked by its own independent clock generator in order to control clock skew between counters precisely and to allow each counter to be clocked by a different set of clocks.

A state machine controls the generation of the divisor/4 and divisor/8 values and also multiplexes the correct source clocks from the PLL to the clock generators. The counters are clocked by different clocks dependent on the value of the divisor—this is because different divisor values will produce a divided clock whose edges are placed using different combinations of the clocks provided from the PLL.

C.11.4 Testing the Clock Divider

The Clock Divider may be tested by powering up the Chip with CHIPTEST High. This will have the effect of forcing all of the clocked logic in the Clock Divider to be clocked by sysclk as opposed to the clocks generated by the PLL.

The Clock Divider has been designed with full scan and so may subsequently be tested using standard JTAG access, as long as the Chip has been powered up as above.

The functionality of the Clock Divider is NOT guaranteed if CHIPTEST is held High while the device is running in normal operation.

SECTION C.12 Address Maps

TABLE C.11.1

Top-Level Registers A Top Level Address Map

| REGISTER NAME | Address | Bits | COMMENT |
|---|---|---|---|
| BU_EVENT | 0x0 | 8 | Write 1 to reset |
| BU_MASK | 0x1 | 8 | R/W |
| BU_EN_INTERRUPTS | 0x2 | 1 | R/W |
| BU_WADDR_COD_STD | 0x4 | 2 | R/W |
| BU_WADDR_ACCESS | 0x5 | 1 | R/W-access |
| BU_WADDR_CTL1 | 0x6 | 3 | R/W |
| BU_DISPADDR_LINES_IN_LAST_ROW0 | 0x8 | 3 | R/W |
| BU_DISPADDR_LINES_IN_LAST_ROW1 | 0x9 | 3 | R/W |
| BU_DISPADDR_LINES_IN_LAST_ROW2 | 0xa | 3 | R/W |
| BU_DISPADDR_ACCESS | 0xb | 1 | R/W-access |
| BU_DISPADDR_CTL0 | 0xc | 8 | R/W |
| BU_DISPADDR_CTL1 | 0xd | 1 | R/W |
| BU_BM_ACCESS | 0x10 | 1 | R/W-access |
| BU_BM_CTL0 | 0x11 | 2 | R/W |
| BU_BM_TARGET_IX | 0x12 | 4 | R/W |
| BU_BM_PRES_NUM | 0x13 | 8 | R/W-asynchronous |
| BU_BM_THIS_PNUM | 0x14 | 8 | R/W |
| BU_BM_PIC_NUM0 | 0x15 | 8 | R/W |
| BU_BM_PIC_NUM1 | 0x16 | 8 | R/W |
| BU_BM_PIC_NUM2 | 0x17 | 8 | R/W |
| BU_BM_TEMP_REF | 0x18 | 5 | RO |
| BU_ADDRGEN_KEYHOLE_ADDR_MSB | 0x28 | 1 | R/W-Address generator |
| BU_ADDRGEN_KEYHOLE_ADDR_LSB | 0x29 | 8 | keyhole. See |
| BU_ADDRGEN_KEYHOLE_DATA | 0x2a | 8 | Table C.11.2 for contents |
| BU_IT_PAGE_START | 0x30 | 5 | R/W |
| BU_IT_READ_CYCLE | 0x31 | 4 | R/W |
| BU_IT_WRITE_CYCLE | 0x32 | 4 | R/W |
| BU_IT_REFRESH_CYCLE | 0x33 | 4 | R/W |
| BU_IT_RAS_FALLING | 0x34 | 4 | R/W |
| BU_IT_CAS_FALLING | 0x35 | 4 | R/W |
| BU_IT_CONFIG | 0x36 | 1 | R/W |
| BU_OC_ACCESS | 0x40 | 1 | R/W-access |
| BU_OC_MODE | 0x41 | 2 | R/W |
| BU_OC_2WIRE | 0x42 | 1 | R/W |
| BU_OC_BORDER_R | 0x49 | 8 | R/W |
| BU_OC_BORDER_G | 0x4a | 8 | R/W |
| BU_OC_BORDER_B | 0x4b | 8 | R/W |
| BU_OC_BLANK_R | 0x4d | 8 | R/W |
| BU_OC_BLANK_G | 0x4e | 8 | R/W |
| BU_OC_BLANK_B | 0x4f | 8 | R/W |
| BU_OC_HDELAY_1 | 0x50 | 3 | R/W |
| BU_OC_HDELAY_0 | 0x51 | 8 | R/W |
| BU_OC_WEST_1 | 0x52 | 3 | R/W |
| BU_OC_WEST_0 | 0x53 | 8 | R/W |
| BU_OC_EAST_1 | 0x54 | 3 | R/W |
| BU_OC_EAST_0 | 0x55 | 8 | R/W |
| BU_OC_WIDTH_1 | 0x56 | 3 | R/W |
| BU_OC_WIDTH_0 | 0x57 | 8 | R/W |
| BU_OC_VDELAY_1 | 0x58 | 3 | R/W |
| BU_OC_VDELAY_0 | 0x59 | 8 | R/W |
| BU_OC_NORTH_1 | 0x5a | 3 | R/W |
| BU_OC_NORTH_0 | 0x5b | 8 | R/W |
| BU_OC_SOUTH_1 | 0x5c | 3 | R/W |
| BU_OC_SOUTH_0 | 0x5d | 8 | R/W |
| BU_OC_HEIGHT_1 | 0x5e | 3 | R/W |
| BU_OC_HEIGHT_0 | 0x5f | 8 | R/W |
| BU_IF_CONFIGURE | 0x60 | 5 | R/W |
| BU_UV_MODE | 0x61 | 6 | R/W-xnnnxnnn |

TABLE C.11.1-continued

Top-Level Registers A Top Level Address Map

| REGISTER NAME | Address | Bits | COMMENT |
|---|---|---|---|
| BU_COEFF_KEYADDR | 0x62 | 7 | R/W-See Table C.11.3 |
| BU_COEFF_KAYDATA | 0x63 | 8 | for contents. |
| BU_GA_ACCESS | 0x68 | 1 | R/W |
| BU_GA_BYPASS | 0x69 | 1 | R/W |
| BU_GA_RAM0_ADDR | 0x6a | 8 | R/W |
| BU_GA_RAM0_DATA | 0x6b | 8 | R/W |
| BU_GA_RAM1_ADDR | 0x6c | 8 | R/W |
| BU_GA_RAM1_DATA | 0x6d | 8 | R/W |
| BU_GA_RAM2_ADDR | 0x6e | 8 | R/W |
| BU_GA_RAM2_DATA | 0x6f | 8 | R/W |
| BU_DIVA_3 | 0x70 | 1 | R/W |
| BU_DIVA_2 | 0x71 | 8 | R/W |
| BU_DIVA_1 | 0x72 | 8 | R/W |
| BU_DIVA_0 | 0x73 | 8 | R/W |
| BU_DIVP_3 | 0x74 | 1 | R/W |
| BU_DIVP_2 | 0x75 | 8 | R/W |
| BU_DIVP_1 | 0x76 | 8 | R/W |
| BU_DIVP_0 | 0x77 | 8 | R/W |
| BU_PAD_CONFIG_1 | 0x78 | 7 | R/W |
| BU_PAD_CONFIG_0 | 0x79 | 8 | R/W |
| BU_PLL_RESISTORS | 0x7a | 8 | R/W |
| BU_REF_INTERVAL | 0x7b | 8 | R/W |
| BU_REVISION | 0xff | 8 | RO-revision |
| The following registers are in the "test space". | | | |
| BU_BM_PRES_FLAG | 0x80 | 1 | R/W |
| BU_BM_EXP_TR | 0x81 | ** | These registers are |
| BU_BM_TR_DELTA | 0x82 | ** | missing on RevA |
| BU_BM_ARR_IX | 0x83 | 2 | R/W |
| BU_BM_DSP_IX | 0x84 | 2 | R/W |
| BU_BM_RDY_IX | 0x85 | 2 | R/W |
| BU_BM_BSTATE3 | 0x86 | 2 | R/W |
| BU_BM_BSTATE2 | 0x87 | 2 | R/W |
| BU_BM_BSTATE1 | 0x88 | 2 | R/W |
| BU_BM_INDEX | 0x89 | 2 | R/W |
| BU_BM_STATE | 0x8a | 5 | R/W |
| BU_BM_FROMPS | 0x8b | 1 | R/W |
| BU_BM_FROMFL | 0x8c | 1 | R/W |
| BU_DA_COMP0_SNP3 | 0x90 | 8 | R/W-These are the three |
| BU_DA_COMP0_SNP2 | 0x91 | 8 | snoopers on the display |
| BU_DA_COMP0_SNP1 | 0x92 | 8 | address generators |
| BU_DA_COMP0_SNP0 | 0x93 | 8 | address output |
| BU_DA_COMP1_SNP3 | 0x94 | 8 | |
| BU_DA_COMP1_SNP2 | 0x95 | 8 | |
| BU_DA_COMP1_SNP1 | 0x96 | 8 | |
| BU_DA_COMP1_SNP0 | 0x97 | 8 | |
| BU_DA_COMP2_SNP3 | 0x98 | 8 | |
| BU_DA_COMP2_SNP2 | 0x99 | 8 | |
| BU_DA_COMP2_SNP1 | 0x9a | 8 | |
| BU_DA_COMP2_SNP0 | 0x9b | 8 | |
| BU_UV_RAM1A_ADDR_1 | 0xa0 | 8 | R/W-upi test access into |
| BU_UV_RAM1A_ADDR_0 | 0xa1 | 8 | the vertical upsamplers |
| BU_UV_RAM1A_DATA | 0xa2 | 8 | RAMs |
| BU_UV_RAM1B_ADDR_1 | 0xa4 | 8 | |
| BU_UV_RAM1B_ADDR_0 | 0xa5 | 8 | |
| BU_UV_RAM1B_DATA | 0xa6 | 8 | |
| BU_UV_RAM2A_ADDR_1 | 0xa8 | 8 | |
| BU_UV_RAM2A_ADDR_0 | 0xa9 | 8 | |
| BU_UV_RAM2A_DATA | 0xaa | 8 | |
| BU_UV_RAM2B_ADDR_1 | 0xac | 8 | |
| BU_UV_RAM2B_ADDR_0 | 0xad | 8 | |
| BU_UV_RAM2B_DATA | 0xae | 8 | |
| BU_WA_ADDR_SNP1 | 0xb0 | 8 | R/W-snooper on the write |
| BU_WA_ADDR_SNP0 | 0xb1 | 8 | address generator address |
| BU_WA_ADDR_SNP0 | 0xb2 | 8 | o/p. |
| BU_WA_DATA_SNP1 | 0xb4 | 8 | R/W-snooper on data |
| BU_WA_DATA_SNP0 | 0xb5 | 8 | output of WA |
| BU_IF_SNP0_1 | 0xb8 | 8 | R/W-Three snoopers on |
| BU_IF_SNP0_0 | 0xb9 | 8 | the dramif data outputs. |
| BU_IF_SNP1_1 | 0xba | 8 | |
| BU_IF_SNP1_0 | 0xbb | 8 | |
| BU_IF_SNP2_1 | 0xbc | 8 | |
| BU_IF_SNP2_0 | 0xbd | 8 | |
| BU_IFRAM_ADDR_1 | 0xc0 | 1 | R/W-upi access it IF RAM |
| BU_IFRAM_ADDR_0 | 0xc1 | 8 | |
| BU_IFRAM_DATA | 0xc2 | 8 | |

TABLE C.11.1-continued

Top-Level Registers A Top Level Address Map

| REGISTER NAME | Address | Bits | COMMENT |
|---|---|---|---|
| BU_OC_SNP_3 | 0xc4 | 8 | R/W-snooper on output of |
| BU_OC_SNP_2 | 0xc5 | 8 | chip |
| BU_OC_SNP_1 | 0xc6 | 8 | |
| BU_OC_SNP_0 | 0xc7 | 8 | |
| BU_YAPLL_CONFIG | 0xc8 | 8 | R/W |
| BU_BM_FRONT_BYPASS | 0xca | 1 | R/W |

C.12.2 Address Generator Keyhole Space

Address Generator Keyhole Table

1) All registers in the address generator keyhole take up 4 bytes of address space regardless of their width. The missing addresses (0x00, 0x04 etc.) will always read back zero.

2) The access bit of the relevant block (dispaddr or waddrgen) must be set before accessing this keyhole.

TABLE C.11.2

Top-Level RegistersA Address Generator Keyhole

| Keyhole Register Name | Keyhole Address | Bits | Comments |
|---|---|---|---|
| BU_DISPADDR_BUFFER0_BASE_MSB | 0x01 | 2 | 18 bit |
| BU_DISPADDR_BUFFER0_BASE_MID | 0x02 | 8 | register- |
| BU_DISPADDR_BUFFER0_BASE_LSB | 0x03 | 8 | Must be loaded |
| BU_DISPADDR_BUFFER1_BASE_MSB | 0x05 | 2 | Must be |
| BU_DISPADDR_BUFFER1_BASE_MID | 0x06 | 8 | Loaded |
| BU_DISPADDR_BUFFER1_BASE_LSB | 0x07 | 8 | |
| BU_DISPADDR_BUFFER2_BASE_MSB | 0x09 | 2 | Must be |
| BU_DISPADDR_BUFFER2_BASE_MID | 0x0a | 8 | Loaded |
| BU_DISPADDR_BUFFER2_BASE_LSB | 0x0b | 8 | |
| BU_DLDPATH_LINE0_MSB | 0x0d | 2 | Test only |
| BU_DLDPATH_LINE0_MID | 0x0e | 8 | |
| BU_DLDPATH_LINE0_LSB | 0x0f | 8 | |
| BU_DLDPATH_LINE1_MSB | 0x11 | 2 | Test only |
| BU_DLDPATH_LINE1_MID | 0x12 | 8 | |
| BU_DLDPATH_LINE1_LSB | 0x13 | 8 | |
| BU_DLDPATH_LINE2_MSB | 0x15 | 2 | Test only |
| BU_DLDPATH_LINE2_MID | 0x16 | 8 | |
| BU_DLDPATH_LINE2_LSB | 0x17 | 8 | |
| BU_DLDPATH_VBCNT0_MSB | 0x19 | 2 | Test only |
| BU_DLDPATH_VBCNT0_MID | 0x1a | 8 | |
| BU_DLDPATH_VBCNT0_LSB | 0x1b | 8 | |
| BU_DLDPATH_VBCNT1_MSB | 0x1d | 2 | Test only |
| BU_DLDPATH_VBCNT1_MID | 0x1e | 8 | |
| BU_DLDPATH_VBCNT1_LSB | 0x1f | 8 | |
| BU_DLDPATH_VBCNT2_MSB | 0x21 | 2 | Test only |
| BU_DLDPATH_VBCNT2_MID | 0x22 | 8 | |
| BU_DLDPATH_VBCNT2_LSB | 0x23 | 8 | |
| BU_DISPADDR_COMP0_OFFSET_MSB | 0x25 | 2 | Must be |
| BU_DISPADDR_COMP0_OFFSET_MID | 0x26 | 8 | Loaded |
| BU_DISPADDR_OFFSET_LSB | 0x27 | 8 | |
| BU_DISPADDR_COMP1_OFFSET_MSB | 0x29 | 2 | Must be |
| BU_DISPADDR_COMP1_OFFSET_MID | 0x2a | 8 | Loaded |
| BU_DISPADDR_COMP1_OFFSET_LSB | 0x2b | 8 | |
| BU_DISPADDR_COMP2_OFFSET_MSB | 0x2d | 2 | Must be |
| BU_DISPADDR_COMP2_OFFSET_MID | 0x2e | 8 | Loaded |
| BU_DISPADDR_COMP2_OFFSET_LSB | 0x2f | 8 | |
| BU_DISPADDR_COMP0_VBS_MSB | 0x31 | 2 | Must be |
| BU_DISPADDR_COMP0_VBS_MID | 0x32 | 8 | Loaded |
| BU_DISPADDR_COMP0_VBS_LSB | 0x33 | 8 | |
| BU_DISPADDR_COMP1_VBS_MSB | 0x35 | 2 | Must be |
| BU_DISPADDR_COMP1_VBS_MID | 0x36 | 8 | Loaded |
| BU_DISPADDR_COMP1_VBS_LSB | 0x37 | 8 | |
| BU_DISPADDR_COMP2_VBS_MSB | 0x39 | 2 | Must be |
| BU_DISPADDR_COMP2_VBS_MID | 0x3a | 8 | Loaded |
| BU_DISPADDR_COMP2_VBS_LSB | 0x3b | 8 | |
| BU_ADDR_COMP0_HBS_MSB | 0x3d | 2 | Must be |
| BU_ADDR_COMP0_HBS_MID | 0x3e | 8 | Loaded |
| BU_ADDR_COMP0_HBS_LSB | 0x3f | 8 | |

TABLE C.11.2-continued

Top-Level RegistersA Address Generator Keyhole

| Keyhole Register Name | Keyhole Address | Bits | Comments |
|---|---|---|---|
| BU_ADDR_COMP1_HBS_MSB | 0x41 | 2 | Must be |
| BU_ADDR_COMP1_HBS_MID | 0x42 | 8 | Loaded |
| BU_ADDR_COMP1_HBS_LSB | 0x43 | 8 | |
| BU_ADDR_COMP2_HBS_MSB | 0x45 | 2 | Must be |
| BU_ADDR_COMP2_HBS_MID | 0x46 | 8 | Loaded |
| BU_ADDR_COMP2_HBS_LSB | 0x47 | 8 | |
| BU_DISPADDR_COMP0_HBS_MSB | 0x49 | 2 | Must be |
| BU_DISPADDR_COMP0_HBS_MID | 0x4a | 8 | Loaded |
| BU_DISPADDR_COMP0_HBS_LSB | 0x4b | 8 | |
| BU_DISPADDR_COMP1_HBS_MSB | 0x4d | 2 | Must be |
| BU_DISPADDR_COMP1_HBS_MID | 0x4e | 8 | Loaded |
| BU_DISPADDR_COMP1_HBS_LSB | 0x4f | 8 | |
| BU_DISPADDR_COMP2_HBS_MSB | 0x51 | 2 | Must be |
| BU_DISPADDR_COMP2_HBS_MID | 0x52 | 8 | Loaded |
| BU_DISPADDR_COMP2_HBS_LSB | 0x53 | 8 | |
| BU_DISPADDR_CNT_LEFT0_MSB | 0x55 | 2 | Test only |
| BU_DISPADDR_CNT_LEFT0_MID | 0x56 | 8 | |
| BU_DISPADDR_CNT_LEFT0_LSB | 0x57 | 8 | |
| BU_DISPADDR_CNT_LEFT1_MSB | 0x59 | 2 | Test only |
| BU_DISPADDR_CNT_LEFT1_MID | 0x5a | 8 | |
| BU_DISPADDR_CNT_LEFT1_LSB | 0x5b | 8 | |
| BU_DISPADDR_CNT_LEFT2_MSB | 0x5d | 2 | Test only |
| BU_DISPADDR_CNT_LEFT2_MID | 0x5e | 8 | |
| BU_DISPADDR_CNT_LEFT2_LSB | 0x5f | 8 | |
| BU_DISPADDR_PAGE_ADDR0_MSB | 0x61 | 2 | Test only |
| BU_DISPADDR_PAGE_ADDR0_MID | 0x62 | 8 | |
| BU_DISPADDR_PAGE_ADDR0_LSB | 0x63 | 8 | |
| BU_DISPADDR_PAGE_ADDR1_MSB | 0x65 | 2 | Test only |
| BU_DISPADDR_PAGE_ADDR1_MID | 0x66 | 8 | |
| BU_DISPADDR_PAGE_ADDR1_LSB | 0x67 | 8 | |
| BU_DISPADDR_PAGE_ADDR2_MSB | 0x69 | 2 | Test only |
| BU_DISPADDR_PAGE_ADDR2_MID | 0x6a | 8 | |
| BU_DISPADDR_PAGE_ADDR2_LSB | 0x6b | 8 | |
| BU_DISPADDR_BLOCK_ADDR0_MSB | 0x6d | 2 | Test only |
| BU_DISPADDR_BLOCK_ADDR0_MID | 0x5e | 8 | |
| BU_DISPADDR_BLOCK_ADDR0_LSB | 0x6f | 8 | |
| BU_DISPADDR_BLOCK_ADDR1_MSB | 0x71 | 2 | Test only |
| BU_DISPADDR_BLOCK_ADDR1_MID | 0x72 | 8 | |
| BU_DISPADDR_BLOCK_ADDR1_LSB | 0x73 | 8 | |
| BU_DISPADDR_BLOCK_ADDR2_MSB | 0x75 | 2 | Test only |
| BU_DISPADDR_BLOCK_ADDR2_MID | 0x76 | 8 | |
| BU_DISPADDR_BLOCK_ADDR2_LSB | 0x77 | 8 | |
| BU_DISPADDR_BLOCKS_LEFT0_MSB | 0x79 | 2 | Test only |
| BU_DISPADDR_BLOCKS_LEFT0_MID | 0x7a | 8 | |
| BU_DISPADDR_BLOCKS_LEFT0_LSB | 0x7b | 8 | |
| BU_DISPADDR_BLOCKS_LEFT1_MSB | 0x7d | 2 | Test only |
| BU_DISPADDR_BLOCKS_LEFT1_MID | 0x7e | 8 | |
| BU_DISPADDR_BLOCKS_LEFT1_LSB | 0x7f | 8 | |
| BU_DISPADDR_BLOCKS_LEFT2_MSB | 0x81 | 2 | Test only |
| BU_DISPADDR_BLOCKS_LEFT2_MID | 0x82 | 8 | |
| BU_DISPADDR_BLOCKS_LEFT2_LSB | 0x83 | 8 | |
| BU_WADDR_BUFFER0_BASE_MSB | 0x85 | 2 | Must be |
| BU_WADDR_BUFFER0_BASE_MID | 0x86 | 8 | Loaded |
| BU_WADDR_BUFFER0_BASE_LSB | 0x87 | 8 | |
| BU_WADDR_BUFFER1_BASE_MSB | 0x89 | 2 | Must be |
| BU_WADDR_BUFFER1_BASE_MID | 0x8a | 8 | Loaded |
| BU_WADDR_BUFFER1_BASE_LSB | 0x8b | 8 | |
| BU_WADDR_BUFFER2_BASE_MSB | 0x8d | 2 | Must be |
| BU_WADDR_BUFFER2_BASE_MID | 0x8e | 8 | Loaded |
| BU_WADDR_BUFFER2_BASE_LSB | 0x8f | 8 | |
| BU_WADDR_COMP0_HMBADDR_MSB | 0x91 | 2 | Test only |
| BU_WADDR_COMP0_HMBADDR_MID | 0x92 | 8 | |
| BU_WADDR_COMP0_HMBADDR_LSB | 0x93 | 8 | |
| BU_WADDR_COMP1_HMBADDR_MSB | 0x95 | 2 | Test only |
| BU_WADDR_COMP1_HMBADDR_MID | 0x96 | 8 | |
| BU_WADDR_COMP1_HMBADDR_LSB | 0x97 | 8 | |
| BU_WADDR_COMP2_HMBADDR_MSB | 0x99 | 2 | Test only |
| BU_WADDR_COMP2_HMBADDR_MID | 0x9a | 8 | |
| BU_WADDR_COMP2_HMBADDR_LSB | 0x9b | 8 | |
| BU_WADDR_COMP0_VMBADDR_MSB | 0x9d | 2 | Test only |
| BU_WADDR_COMP0_VMBADDR_MID | 0x9e | 8 | |
| BU_WADDR_COMP0_VMBADDR_LSB | 0x9f | 8 | |
| BU_WADDR_COMP1_VMBADDR_MSB | 0xa1 | 2 | Test only |
| BU_WADDR_COMP1_VMBADDR_MID | 0xa2 | 8 | |

TABLE C.11.2-continued

Top-Level RegistersA Address Generator Keyhole

| Keyhole Register Name | Keyhole Address | Bits | Comments |
|---|---|---|---|
| BU_WADDR_COMP1_VMBADDR_LSB | 0xa3 | 8 | |
| BU_WADDR_COMP2_VMBADDR_MSB | 0xa5 | 2 | Test only |
| BU_WADDR_COMP2_VMBADDR_MID | 0xa6 | 8 | |
| BU_WADDR_COMP2_VMBADDR_LSB | 0xa7 | 8 | |
| BU_WADDR_VBADDR_MSB | 0xa9 | 2 | Test only |
| BU_WADDR_VBADDR_MID | 0xaa | 8 | |
| BU_WADDR_VBADDR_LSB | 0xab | 8 | |
| BU_WADDR_COMP0_HALF_WIDTH_IN_BLOCKS_MSB | 0xad | 2 | Must be |
| BU_WADDR_COMP0_HALF_WIDTH_IN_BLOCKS_MID | 0xae | 8 | Loaded |
| BU_WADDR_COMP0_HALF_WIDTH_IN_BLOCKS_LSB | 0xaf | 8 | |
| BU_WADDR_COMP1_HALF_WIDTH_IN_BLOCKS_MSB | 0xb1 | 2 | Must be |
| BU_WADDR_COMP1_HALF_WIDTH_IN_BLOCKS_MID | 0xb2 | 8 | Loaded |
| BU_WADDR_COMP1_HALF_WIDTH_IN_BLOCKS_LSB | 0xb3 | 8 | |
| BU_WADDR_COMP2_HALF_WIDTH_IN_BLOCKS_MSB | 0xb5 | 2 | Must be |
| BU_WADDR_COMP2_HALF_WIDTH_IN_BLOCKS_MID | 0xb6 | 8 | Loaded |
| BU_WADDR_COMP2_HALF_WIDTH_IN_BLOCKS_LSB | 0xb7 | 8 | |
| BU_WADDR_HB_MSB | 0xb9 | 2 | Test only |
| BU_WADDR_HB_MID | 0xba | 8 | |
| BU_WADDR_HB_LSB | 0xbb | 8 | |
| BU_WADDR_COMP0_OFFSET_MSB | 0xbd | 2 | Must be |
| BU_WADDR_COMP0_OFFSET_MID | 0xbe | 8 | Loaded |
| BU_WADDR_COMP0_OFFSET_LSB | 0xbf | 8 | |
| BU_WADDR_COMP1_OFFSET_MSB | 0xc1 | 2 | Must be |
| BU_WADDR_COMP1_OFFSET_MID | 0xc2 | 8 | Loaded |
| BU_WADDR_COMP1_OFFSET_LSB | 0xc3 | 8 | |
| BU_WADDR_COMP2_OFFSET_MSB | 0xc5 | 2 | Must be |
| BU_WADDR_COMP2_OFFSET_MID | 0xc6 | 8 | Loaded |
| BU_WADDR_COMP2_OFFSET_LSB | 0xc7 | 8 | |
| BU_WADDR_SCRATCH_MSB | 0xc9 | 2 | Test only |
| BU_WADDR_SCRATCH_MID | 0xca | 8 | |
| BU_WADDR_SCRATCH_LSB | 0xcb | 8 | |
| BU_WADDR_MBS_WIDE_MSB | 0xcd | 2 | Must be |
| BU_WADDR_MBS_WIDE_MID | 0xce | 8 | Loaded |
| BU_WADDR_MBS_WIDE_LSB | 0xcf | 8 | |
| BU_WADDR_MBS_HIGH_MSB | 0xd1 | 2 | Must be |
| BU_WADDR_MBS_HIGH_MID | 0xd2 | 8 | Loaded |
| BU_WADDR_MBS_HIGH_LSB | 0xd3 | 8 | |
| BU_WADDR_COMP0_LAST_MB_IN_ROW_MSB | 0xd5 | 2 | Must be |
| BU_WADDR_COMP0_LAST_MB_IN_ROW_MID | 0xd6 | 8 | Loaded |
| BU_WADDR_COMP0_LAST_MB_IN_ROW_LSB | 0xd7 | 8 | |
| BU_WADDR_COMP1_LAST_MB_IN_ROW_MSB | 0xd9 | 2 | Must be |
| BU_WADDR_COMP1_LAST_MB_IN_ROW_MID | 0xda | 8 | Loaded |
| BU_WADDR_COMP1_LAST_MB_IN_ROW_LSB | 0xdb | 8 | |
| BU_WADDR_COMP2_LAST_MB_IN_ROW_MSB | 0xdd | 2 | Must be |
| BU_WADDR_COMP2_LAST_MB_IN_ROW_MID | 0xde | 8 | Loaded |
| BU_WADDR_COMP2_LAST_MB_IN_ROW_LSB | 0xdf | 8 | |
| BU_WADDR_COMP0_LAST_MB_IN_HALF_ROW_MSB | 0xe1 | 2 | Must be |
| BU_WADDR_COMP0_LAST_MB_IN_HALF_ROW_MID | 0xe2 | 8 | Loaded |
| BU_WADDR_COMP0_LAST_MB_IN_HALF_ROW_LSB | 0xe3 | 8 | |
| BU_WADDR_COMP1_LAST_MB_IN_HALF_ROW_MSB | 0xe5 | 2 | Must be |
| BU_WADDR_COMP1_LAST_MB_IN_HALF_ROW_MID | 0xe6 | 8 | Loaded |
| BU_WADDR_COMP1_LAST_MB_IN_HALF_ROW_LSB | 0xe7 | 8 | |
| BU_WADDR_COMP2_LAST_MB_IN_HALF_ROW_MSB | 0xe9 | 2 | Must be |
| BU_WADDR_COMP2_LAST_MB_IN_HALF_ROW_MID | 0xea | 8 | Loaded |
| BU_WADDR_COMP2_LAST_MB_IN_HALF_ROW_LSB | 0xeb | 8 | |
| BU_WADDR_COMP0_LAST_ROW_IN_MB_MSB | 0xed | 2 | Must be |
| BU_WADDR_COMP0_LAST_ROW_IN_MB_MID | 0xee | 8 | Loaded |
| BU_WADDR_COMP0_LAST_ROW_IN_MB_LSB | 0xef | 8 | |
| BU_WADDR_COMP1_LAST_ROW_IN_MB_MSB | 0xf1 | 2 | Must be |
| BU_WADDR_COMP1_LAST_ROW_IN_MB_MID | 0xf2 | 8 | Loaded |
| BU_WADDR_COMP1_LAST_ROW_IN_MB_LSB | 0xf3 | 8 | |
| BU_WADDR_COMP2_LAST_ROW_IN_MB_MSB | 0xf5 | 2 | Must be |
| BU_WADDR_COMP2_LAST_ROW_IN_MB_MID | 0xf6 | 8 | Loaded |
| BU_WADDR_COMP2_LAST_ROW_IN_MB_LSB | 0xf7 | 8 | |
| BU_WADDR_COMP0_BLOCKS_PER_MB_ROW_MSB | 0xf9 | 2 | Must be |
| BU_WADDR_COMP0_BLOCKS_PER_MB_ROW_MID | 0xfa | 8 | Loaded |
| BU_WADDR_COMP0_BLOCKS_PER_MB_ROW_LSB | 0xfb | 8 | |
| BU_WADDR_COMP1_BLOCKS_PER_MB_ROW_MSB | 0xfd | 2 | Must be |
| BU_WADDR_COMP1_BLOCKS_PER_MB_ROW_MID | 0xfe | 8 | Loaded |
| BU_WADDR_COMP1_BLOCKS_PER_MB_ROW_LSB | 0xff | 8 | |
| BU_WADDR_COMP2_BLOCKS_PER_MB_ROW_MSB | 0x101 | 2 | Must be |
| BU_WADDR_COMP2_BLOCKS_PER_MB_ROW_MID | 0x102 | 8 | Loaded |
| BU_WADDR_COMP2_BLOCKS_PER_MB_ROW_LSB | 0x103 | 8 | |
| BU_WADDR_COMP0_LAST_MB_ROW_MSB | 0x105 | 2 | Must be |

TABLE C.11.2-continued

Top-Level RegistersA Address Generator Keyhole

| Keyhole Register Name | Keyhole Address | Bits | Comments |
|---|---|---|---|
| BU_WADDR_COMP0_LAST_MB_ROW_MID | 0x106 | 8 | Loaded |
| BU_WADDR_COMP0_LAST_MB_ROW_LSB | 0x107 | 8 | |
| BU_WADDR_COMP1_LAST_MB_ROW_MSB | 0x109 | 2 | Must be |
| BU_WADDR_COMP1_LAST_MB_ROW_MID | 0x10a | 8 | Loaded |
| BU_WADDR_COMP1_LAST_MB_ROW_LSB | 0x10b | 8 | |
| BU_WADDR_COMP2_LAST_MB_ROW_MSB | 0x10d | 2 | Must be |
| BU_WADDR_COMP2_LAST_MB_ROW_MID | 0x10e | 8 | Loaded |
| BU_WADDR_COMP2_LAST_MB_ROW_LSB | 0x10f | 8 | |
| BU_WADDR_COMP0_HBS_MSB | 0x111 | 2 | Must be |
| BU_WADDR_COMP0_HBS_MID | 0x112 | 8 | Loaded |
| BU_WADDR_COMP0_HBS_LSB | 0x113 | 8 | |
| BU_WADDR_COMP1_HBS_MSB | 0x115 | 2 | Must be |
| BU_WADDR_COMP1_HBS_MID | 0x116 | 8 | Loaded |
| BU_WADDR_COMP1_HBS_LSB | 0x117 | 8 | |
| BU_WADDR_COMP2_HBS_MSB | 0x119 | 2 | Must be |
| BU_WADDR_COMP2_HBS_MID | 0x11a | 8 | Loaded |
| BU_WADDR_COMP2_HBS_LSB | 0x11b | 8 | |
| BU_WADDR_COMP0_MAXHB | 0x11f | 2 | Must be |
| BU_WADDR_COMP1_MAXHB | 0x123 | 2 | Loaded |
| BU_WADDR_COMP2_MAXHB | 0x127 | 2 | |
| BU_WADDR_COMP0_MAXVB | 0x12b | 2 | Must be |
| BU_WADDR_COMP1_MAXVB | 0x12f | 2 | Loaded |
| BU_WADDR_COMP2_MAXVB | 0x133 | 2 | |

TABLE C.11.3

H-Upsamplers and Cspace Keyhole Address Map

| Keyhole Register Name | Keyhole Address | Bits | Comment |
|---|---|---|---|
| BU_UH0_A00_1 | 0x0 | 5 | R/W- Coeff 0,0 |
| BU_UH0_A00_0 | 0x1 | 8 | |
| BU_UH0_A01_1 | 0x2 | 5 | R/W- Coeff 0,1 |
| BU_UH0_A01_0 | 0x3 | 8 | |
| BU_UH0_A02_1 | 0x4 | 5 | R/W- Coeff 0,2 |
| BU_UH0_A02_0 | 0x5 | 8 | |
| BU_UH0_A03_1 | 0x6 | 5 | R/W- Coeff 0,0 |
| BU_UH0_A03_0 | 0x7 | 8 | |
| BU_UH0_A10_1 | 0x8 | 5 | R/W- Coeff 1,0 |
| BU_UH0_A10_0 | 0x9 | 8 | |
| BU_UH0_A11_1 | 0xa | 5 | R/W- Coeff 1,1 |
| BU_UH0_A11_0 | 0xb | 8 | |
| BU_UH0_A12_1 | 0xc | 5 | R/W- Coeff 1,2 |
| BU_UH0_A12_0 | 0xd | 8 | |
| BU_UH0_A13_1 | 0xe | 5 | R/W- Coeff 1,3 |
| BU_UH0_A13_0 | 0xf | 8 | |
| BU_UH0_A20_1 | 0x10 | 5 | R/W- Coeff 2.0 |
| BU_UH0_A20_0 | 0x11 | 8 | |
| BU_UH0_A21_1 | 0x12 | 5 | R/W- Coeff 2.1 |
| BU_UH0_A21_0 | 0x13 | 8 | |
| BU_UH0_A22_1 | 0x14 | 5 | R/W- Coeff 2,2 |
| BU_UH0_A22_0 | 0x15 | 8 | |
| BU_UH0_A23_1 | 0x16 | 5 | R/W- Coeff 2,3 |
| BU_UH0_A23_0 | 0x17 | 8 | |
| BU_UH0_MODE | 0x18 | 2 | R/W |
| BU_UH1_A00_1 | 0x20 | 5 | R/W- Coeff 0,0 |
| BU_UH1_A00_0 | 0x21 | 8 | |
| BU_UH1_A01_1 | 0x22 | 5 | R/W- Coeff 0,1 |
| BU_UH1_A01_0 | 0x23 | 8 | |
| BU_UH1_A02_1 | 0x24 | 5 | R/W- Coeff 0,2 |
| BU_UH1_A02_0 | 0x25 | 8 | |
| BU_UH1_A03_1 | 0x26 | 5 | R/W- Coeff 0,0 |
| BU_UH1_A03_0 | 0x27 | 8 | |
| BU_UH1_A10_1 | 0x28 | 5 | R/W- Coeff 1,0 |
| BU_UH1_A10_0 | 0x29 | 8 | |
| BU_UH1_A11_1 | 0x2a | 5 | R/W- Coeff 1,1 |
| BU_UH1_A11_0 | 0x2b | 8 | |
| BU_UH1_A12_1 | 0x2c | 5 | R/W- Coeff 1,2 |
| BU_UH1_A12_0 | 0x2d | 8 | |
| BU_UH1_A13_1 | 0x2e | 5 | R/W- Coeff 1,3 |
| BU_UH1_A13_0 | 0x2f | 8 | |
| BU_UH1_A20_1 | 0x30 | 5 | R/W- Coeff 2,0 |
| BU_UH1_A20_0 | 0x31 | 8 | |
| BU_UH1_A21_1 | 0x32 | 5 | R/W- Coeff 2,1 |
| BU_UH1_A21_0 | 0x33 | 8 | |
| BU_UH1_A22_1 | 0x34 | 5 | R/W- Coeff 2,2 |
| BU_UH1_A22_0 | 0x35 | 8 | |
| BU_UH1_A23_1 | 0x36 | 5 | R/W- Coeff 2,3 |
| BU_UH1_A23_0 | 0x37 | 8 | |
| BU_UH1_MODE | 0x38 | 2 | R/W |
| BU_UH2_A00_1 | 0x40 | 5 | R/W- Coeff 0,0 |
| BU_UH2_A00_0 | 0x41 | 8 | |
| BU_UH2_A01_1 | 0x42 | 5 | R/W- Coeff 0,1 |
| BU_UH2_A01_0 | 0x43 | 8 | |
| BU_UH2_A02_1 | 0x44 | 5 | R/W- Coeff 0,2 |
| BU_UH2_A02_0 | 0x45 | 8 | |
| BU_UH2_A03_1 | 0x46 | 5 | R/W- COeff 0,0 |
| BU_UH2_A03_0 | 0x47 | 8 | |
| BU_UH2_A10_1 | 0x48 | 5 | R/W- Coeff 1,0 |
| BU_UH2_A10_0 | 0x49 | 8 | |
| BU_UH2_A11_1 | 0x4a | 5 | R/W- Coeff 1,1 |
| BU_UH2_A11_0 | 0x4b | 8 | |
| BU_UH2_A12_1 | 0x4c | 5 | R/W- COeff 1,2 |
| BU_UH2_A12_0 | 0x4d | 8 | |
| BU_UH2_A13_1 | 0x4e | 5 | R/W- Coeff 1,3 |
| BU_UH2_A13f_0 | 0x4f | 8 | |
| BU_UH2_A20_1 | 0x50 | 5 | R/W- Coeff 2,0 |
| BU_UH2_A20_0 | 0x51 | 8 | |
| BU_UH2_A21_1 | 0x52 | 5 | R/W- Coeff 2,1 |
| BU_UH2_A21_0 | 0x53 | 8 | |
| BU_UH2_A22_1 | 0x54 | 5 | R/W- Coeff 2,2 |
| BU_UH2_A22_0 | 0x55 | 8 | |
| BU_UH2_A23_1 | 0x56 | 5 | R/W- Coeff 2,3 |
| BU_UH2_A23_0 | 0x57 | 8 | |
| BU_UH2_MODE | 0x58 | 2 | R/W |
| BU_CS_A00_1 | 0x60 | 5 | R/W |
| BU_CS_A00_0 | 0x61 | 8 | |
| BU_CS_A10_1 | 0x62 | 5 | R/W |

TABLE C.11.3-continued

H-Upsamplers and Cspace Keyhole Address Map

| Keyhole Register Name | Keyhole Address | Bits | Comment |
|---|---|---|---|
| BU_CS_A10_0 | 0x63 | 8 | |
| BU_CS_A20_1 | 0x64 | 5 | R/W |
| BU_CS_A20_0 | 0x65 | 8 | |
| BU_CS_B0_1 | 0x66 | 6 | R/W |
| BU_CS_B0_0 | 0x67 | 8 | |
| BU_CS_A01_1 | 0x68 | 5 | R/W |
| BU_CS_A01_0 | 0x69 | 8 | |
| BU_CS_A11_1 | 0x6a | 5 | R/W |
| BU_CS_A11_0 | 0x6b | 8 | |
| BU_CS_A21_1 | 0x6c | 5 | R/W |
| BU_CS_A21_0 | 0x6d | 8 | |
| BU_CS_B1_1 | 0x6e | 6 | R/W |
| BU_CS_B1_0 | 0x6f | 8 | |
| BU_CS_A02_1 | 0x70 | 5 | R/W |
| BU_CS_A02_0 | 0x71 | 8 | |
| BU_CS_A12_1 | 0x72 | 5 | R/W |
| BU_CS_A12_0 | 0x73 | 8 | |
| BU_CS_A22_1 | 0x74 | 5 | R/W |
| BU_CS_A22_0 | 0x75 | 8 | |
| BU_CS_B2_1 | 0x76 | 6 | R/W |
| BU_CS_B2_0 | 0x77 | 8 | |

SECTION C.13 Picture Size Parameters

C.13.1 Introduction

The following stylized code fragments illustrate the processing necessary to respond to picture size interrupts from the write address generator. The picture size parameters can be changed "on-the-fly" by sending combinations of HORIZONTAL_MBS, VERTICAL_MBS, and DEFINE_SAMPLING (for each component) tokens, resulting in write address generator interrupts. These tokens may arrive in any order and, in general, any one should necessitate the re-calculation of all of the picture size parameters. At setup time, however, it would be more efficient to detect the arrival of all of the events before performing any calculations.

It is possible to write specific values into the picture size parameter registers at setup and, therefore to not rely on interrupt processing in response to tokens. For this reason, the appropriate register values for SIF pictures are also given.

C.13.2 Interrupt Processing for Picture Size Parameters

There are five picture size events, and the primary response of each is given below:

```
if (hmbs_event)
    load(mbs_wide);
else if (vmbs_event)
    load(mbs_high);
else if (def_samp0_event)
{
    load (maxhb[0]);
    load (maxvb[0]);
}
else if (def_samp1_event)
{
    load (maxhb[1]);
    load (maxvb[1]);
}
else if (def_samp2_event)
{
    load (maxhb[2]);
    load (maxvb[2]);
}
```

In addition, the following calculations are necessary to retain consistent picture size parameters:

```
if (hmbs_event||vmbs_event||
    def_samp0_event||def_samp1_event||def_samp2_event)
{
    for (i=0; i<max_component; i++)
    {
        hbs[i] = addr_hbs[i] = (maxhb[i]+1) * mbs_wide;
        half_width_in_blocks[i] = ((maxhb[i]+1) * mbs_wide)/2;
        last_mb_in_row[i] = hbs[i] - (maxhb[i]+1);
        last_mb_in_half_row[i] = half_width_in_blocks[i] - (maxhb[i]+1);
        last_row_in_mb[i] = hbs[i] * maxvb[i];
        blocks_per_mb_row[i] = last_row_in_mb[i] + hbs[i];
        last_mb_row[i] = blocks_per_mb_row[i] * (mbs_high-1);
    }
}
```

Although it is not strictly necessary to modify the dispaddr register values (such as the display window size) in response to picture size interrupts, this may be desirable depending on the application requirements.

C.13.3 Register Values for SIF Pictures

The values contained in all the picture size registers after the above interrupt processing for an SIF, 4:2:0 stream will be as follows:

C.13.3.1 Primary Values
  BU_WADDR_MBS_WIDE=0x16
  BU_WADDR_MBS_HIGH=0x12
  BU_WADDR_COMP0_MAXHB=0x01
  BU_WADDR_COMP1_MAXHB=0x00
  BU_WADDR_COMP2_MAXHB=0x00
  BU_WADDR_COMP0_MAXVB=0x01
  BU_WADDR_COMP1_MAXVB=0x00
  BU_WADDR_COMP2_MAXVB=0x00

C.13.3.2 Secondary Values—After Calculation
  BU_WADDR_COMP0_HBS=0x2C
  BU_WADDR_COMP1 HBS=0x16
  BU_WADDR_COMP2_HBS=0x16
  BU_ADDR_COMP0_HBS=0x2C
  BU_ADDR_COMP1_HBS=0x16
  BU_ADDR_COMP2_HBS=0x16
  BU_WADDR_COMP0_HALF_WIDTH_IN_BLOCKS=0x16
  BU_WADDR_COMP1_HALF_WIDTH_IN_BLOCKS=0x0B
  BU_WADDR_COMP2_HALF_WIDTH_IN_BLOCKS=0x0B
  BU_WADDR_COMP0_LAST_MB_IN_ROW=0x2A
  BU_WADDR_COMP1_LAST_MB_IN_ROW=0x15
  BU_WADDR_COMP2_LAST_MB_IN_ROW=0x15
  BU_WADDR_COMP0_LAST_MB_IN_HALF_ROW=0x14
  BU_WADDR_COMP1_LAST_MB_IN_HALF_ROW=0x0A
  BU_WADDR_COMP2_LAST_MB_IN_HALF_ROW=0x0A
  BU_WADDR_COMP0_LAST_ROW_IN_MB=0x2C
  BU_WADDR_COMP1_LAST_ROW_IN_MB=0x0
  BU_WADDR_COMP2_LAST_ROW_IN_MB=0x0

BU_WADDR_COMP0_BLOCKS_PER_MB_ROW=0x58
BU_WADDR_COMP1_BLOCKS_PER_MB_ROW=0x16
BU_WADDR_COMP2_BLOCKS_PER_MB_ROW=0x16
BU_WADDR_COMP0_LAST_MB_ROW=0x5D8
BU_WADDR_COMP1_LAST_MB_ROW=0x176
BU_WADDR_COMP2_LAST_MB_ROW=0x176

If these values are to be written explicitly at setup, account must be taken of the multi-byte nature of most of the locations.

A single high performance, configurable DRAM interface 100 is illustrated in FIG. 67. This interface is a standard-independent block and is designed to directly drive the DRAMs required, for example, by a spatial decoder, a temporal decoder and a video formatter. No external logic, buffers or components will be required to connect the DRAM interface to DRAM in those systems.

The interface is configurable in two ways. First, the detailed timing of the interface can be configured to accommodate a variety of different DRAM types. Second, the width of the data interface to the DRAM can be configured to provide a cost/performance trade-off for different applications.

On each chip the DRAM interface connects the chip to external DRAM. External DRAM is used, because at present, it is not practical to fabricate on the chips the relatively large amount of DRAM needed. However, it is possible to fabricate on the chips the large amount of DRAM that is needed.

Although the DRAM interface is standard-independent, it still must be configured to implement each of the multiple standards, H.261, JPEG and MPEG. How the DRAM interface is reconfigured for multi-standard operation is discussed further herein.

An important aspect in understanding the operation of the DRAM interface 100 is to understand the relationship between the DRAM interface 100 and the address generator 110, and how the two communicate using the two wire interface. There are two address generators, one for writing 120 and one for reading 130. A buffer manager 140 supervises the two address generators 120 and 130. This buffer manager 140 is described in greater detail in the application entitled "Buffer Manager", Ser. No. 08/399,801 filed Mar. 7, 1995.

In brief, as its name implies, the address generator generates the addresses the DRAM interface needs to address the DRAM (e.g., to read from or to write to a particular address in DRAM). With a two-wire interface, reading and writing only occurs when the DRAM interface has both data (from preceding stages in the pipeline), and a valid address (from address generator). The use of a separate address generator simplifies the construction of both the address generator and the DRAM interface, as discussed further below.

The DRAM interface can operate from a clock which is asynchronous to both the address generator and to the clocks of the blocks which data is passed from and to. Special techniques have been used to handle this asynchronous nature of the operation.

Data is usually transferred between the DRAM interface and the rest of the chip in blocks of 64 bytes. Transfers take place by means of a device known as a "swing buffer". This is essentially a pair of RAMs operated in a double-buffered configuration, with the DRAM interface filling or emptying one RAM while another part of the chip empties or fills the other RAM. A separate bus which carries an address from an address generator is associated with each swing buffer.

Each of the chips has four swing buffers, but the function of these swing buffers is different in each case. In the spatial decoder, one swing buffer is used to transfer coded data to the DRAM, another to read coded data from the DRAM, the third to transfer tokenized data to the DRAM and the fourth to read tokenized data from the DRAM. In the temporal decoder, one swing buffer is used to write intra or predicted picture data to the DRAM, the second to read intra or predicted data from the DRAM and the other two to read forward and backward prediction data. In the video formatter, one swing buffer issued to transfer data to the DRAM and the other three are used to read data from the DRAM, one for each of the luminance (Y) and the red and blue color difference data (Cr and Cb).

The following section describes the operation of a DRAM interface which has one write swing buffer 210 and one read swing buffer 220, and may be understood with reference to FIG. 18.

A control 230 interfaces between the address generator 240, the DRAM interface 250, and the remaining blocks of the chip which supply and take the data are all two wire interfaces. The address generator may either generate addresses as the result of receiving control tokens, or it may merely generate a fixed sequence of addresses. The DRAM interface treats the two wire interfaces with the address generator in a special way. Instead of keeping the accept line high when it is ready to receive and address, it waits for the address generator to supply a valid address, processes that address, and then sets the accept line high for one clock period. Thus it implements a request/acknowledge (REQ/ACK) protocol.

A unique feature of the DRAM interface is its ability to communicate independently with the address generator and with the blocks which provide or accept the data. For example, the address generator may generate an address associated with the data in the write swing buffer, but no action will be taken until the write swing buffer signals that there is a block of data ready to be written to the external DRAM. Similarly, the write swing buffer may contain a block of data which is ready to be written to the external DRAM, but no action is taken until an address is supplied on the appropriate bus from the address generator. Further, once one of the RAMs in the write swing buffer has been filled with data, the other may be completely filled and "swung" to the DRAM interface side before the data input is stalled (the two-wire interface accept signal set low).

In understanding the operation of the DRAM interface, it is important to note that in a properly configured system, the DRAM interface will be able to transfer data between the swing buffers and the external DRAM at least as fast as the sum of all the average data rates between the swing buffers and the rest of the chip.

Each DRAM interface contains a method of determining which swing buffer it will service next. In general, this will either be a "round robin" (i.e. the swing buffer which is serviced is the next available swing buffer which has least recently had a turn) or a priority encoder, (i.e. in which some swing buffers have a higher priority than others). In both cases, an additional request will come from a refresh request generator which has a higher priority than all the other requests. The refresh request is generated from a refresh counter which can be programmed via a microprocessor interface.

The write swing buffer interface two blocks of RAM, RAM1 and RAM2. As discussed further herein, data is written into RAM 1 and RAM 2 from the previous block or stage, under control of the write address and control. From RAM1 and RAM 2, the data is written into DRAM. When writing data into DRAM, the DRAM row address is provided by the address generator, and the column address is provided by the write address and control, as described further herein. In operation, valid data is presented at the input (data in). The data is received from the previous stage. As each piece of data is accepted by the DRAM interface, it is written into RAM1 and the write address control increments the RAM1 address to allow the next piece of data to be written into RAM1. Data continues to be written into RAM1 until either there is no more data, or RAM1 is full. When RAM1 is full, the input side gives up control and sends a signal to the read side to indicate that RAM1 is now ready to be read. This signal passes between two asynchronous clock regimes, and so passes through three synchronizing flip flops.

Provided RAM2 is empty, the next item of data to arrive on the input side is written into RAM2, otherwise, this occurs when RAM2 has emptied. When the round robin or priority encoder (depending on which is used by the particular chip) indicates that it is the turn of this swing buffer to be read, the DRAM interface reads the contents of RAM1 and writes them to the external DRAM. A signal is then sent back across the asynchronous interface, to indicate that RAM1 is now ready to be filled again.

If the DRAM interface empties RAM1 and "swings" it before the input side has filled RAM2, then data can be accepted by the swing buffer continually. Otherwise when RAM2 is filled the swing buffer will set its accept single low until RAM1 has been "swung" back for use by the input side.

The operation of a read swing buffer is similar, but with input and output data busses reversed.

The DRAM interface is designed to maximize the available memory bandwidth. Each 8×8 block of data is stored in the same DRAM page. In this way, full use can be made of DRAM fast page access modes, where one row address is supplied followed by many column addresses. In particular, row addresses are supplied by the address generator, while column addresses are supplied by the DRAM interface, as discussed further below.

In addition, the facility is provided to allow the data bus to the external DRAM to be 8, 16 or 32 bits wide, so that the amount of DRAM used can be matched to size and bandwidth requirements of the particular application.

In this example, the address generator provides the DRAM interface with block addresses for each of the read and write swing buffers. This address is used as the row address for the DRAM. The six bits of column address are supplied by the DRAM interface itself, and these bits are also used as the address for the swing buffer RAM. The data bus to the swing buffers is 32 bits wide, so if the bus width to the external DRAM is less than 32 bits, two or four external DRAM accesses must be made before the next word is read from a write swing buffer or the next word is written to a read swing buffer (read and write refer to the direction of transfer relative to the external DRAM).

It should be recognized that the DRAM interface is not limited to two swing buffers.

I claim:

1. A configurable RAM interface for connecting a bus to RAM comprising:

a bus configuration register for specifying a number of bits on the bus;

means for receiving from the bus a plurality of data words comprising multiword tokens;

means for receiving from the bus a complete address associated with the plurality of data words;

means for generating a series of addresses in RAM into which the buffered data words will be written;

means for writing the buffered data words into RAM at the generated addresses; and means for buffering the received data words comprising:
at least three memory buffers for use as a swing buffer including an arrival buffer, an output buffer and at least one intermediate buffer;
a buffer manager for allocating said buffers for reference by said means for generating a series of addresses, clearing said buffers for occupation by subsequently arriving data, and maintaining status information of said buffers, wherein said status information comprises a state VACANT, wherein one of said buffers is available, a state IN_USE, wherein said one buffer is referenced by said means for receiving from the bus an address and by said means for receiving from the bus a plurality of data words, a state FULL, wherein said one buffer is occupied by data, and a state READY wherein said buffer manager asserts a late arrival signal indicating that a buffer in said state READY is not in synchronization with a data output rate;
a state machine in said buffer manager that transitions among a plurality of states, the transitions including:
a first transition from a first state PRES0, to a second state PRES1, wherein said status information of said buffers are evaluated;
a second transition from said state PRES1 to a third state DRQ wherein a pending request for said output buffer is evaluated; and
a third transition from said state DRQ to a fourth state TOKEN, wherein tokens of received data are examined; whereby a status of said arrival buffer can be updated.

2. The RAM interface of claim 1 wherein:

the RAM operates in page addressing mode; and the address generating means includes means for generating row addresses, and means for generating column addresses based on the received address.

3. The RAM interface of claim 2, wherein:

the RAM is a DRAM;

a first two wire interface is disposed between said bus and said address receiving means;

the data word receiving and buffering means includes a second two wire interface;

wherein said first two wire interface, and said second two wire interface each comprise: a sender, a receiver, and a clock connected to said sender and said receiver, wherein data is transferred from said sender to said receiver upon a transition of said clock only when said sender is ready and said receiver is ready.

4. The RAM interface of claim 1 further including means for determining whether the data word receiving means has received and buffered the plurality of data words.

5. The interface according to claim 1, further comprising an on-chip phase lock loop circuit for generating clock signals.

6. The interface according to claim 1, wherein said tokens each comprise a plurality of data words, said data words each including an extension bit which indicates a presence of additional words in said token.

7. A RAM interface for connecting a bus to RAM comprising:

a plurality of data words stored in RAM at predetermined addresses;

means for receiving from the bus a RAM address associated with the plurality of data words;

means for generating a series of complete RAM addresses for addressing the plurality of data words in RAM, the series of addresses being derived from the received address;

means for buffering the data words read from RAM comprising:

at least three memory buffers for use as a swing buffer including an arrival buffer; an output buffer, and at least one intermediate buffer;

a buffer manager for allocating said buffers for reference by said means for generating a series of addresses, clearing said buffers for occupation by subsequently arriving data, and maintaining status information of said buffers, wherein said status information comprises a state VACANT, wherein one of said buffers is available, a state IN_USE, wherein said one buffer is referenced by said means for receiving from the bus an address and by said means for receiving from the bus a plurality of data words, a state FULL, wherein said one buffer is occupied by data, and a state READY wherein said buffer manager asserts a late arrival signal indicating that a buffer in said state READY is not in synchronization with a data output rate;

a state machine in said buffer manager that transitions among a plurality of states, the transitions including:

a first transition from a first state PRES0, to a second state PRES1, wherein said status information of said buffers are evaluated;

a second transition from said state PRES1 to a third state DRQ wherein a pending request for said output buffer is evaluated; and a third transition from said state DRQ to a fourth state TOKEN, wherein variable length tokens of received data are examined; whereby a status of said arrival buffer can be updated; and means for reading from RAM the plurality of data words, using the series of RAM addresses generated by the address generating means, and writing the data words into the buffer means; wherein said data words each include an extension bit which indicates a presence of additional words to define said variable length tokens.

8. The RAM interface of claim 7 wherein:

the RAM operates in page addressing mode; and the address generating means includes means for generating row addresses, and means for generating column addresses based on the received address.

9. The RAM interface of claim 8, wherein:

the RAM is a DRAM;

a first two wire interface is disposed between said bus and said address receiving means;

the data word receiving and buffering means includes a second two wire interface;

wherein said first two wire interface and said second two wire interface each comprise: a sender, a receiver, and a clock connected to said sender and said receiver, wherein data is transferred from said sender to said receiver upon a transition of said clock only when said sender is ready and said receiver is ready.

10. The RAM interface of claim 7 further including means for determining whether the data word receiving means has received and buffered the plurality of data words.

* * * * *